US011380077B2

(12) United States Patent
Scapel et al.

(10) Patent No.: US 11,380,077 B2
(45) Date of Patent: Jul. 5, 2022

(54) AVATAR CREATION USER INTERFACE

(71) Applicant: Apple Inc., Cupertino, CA (US)

(72) Inventors: Nicolas Scapel, Sunnyvale, CA (US); Arian Behzadi, San Francisco, CA (US); Lisa K. Forssell, Palo Alto, CA (US); Robert Garcia, III, San Francisco, CA (US); Aurelio Guzman, San Jose, CA (US); Marcel Van Os, San Francisco, CA (US); Christopher Wilson, Sonoma, CA (US); Giancarlo Yerkes, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/091,460

(22) Filed: Nov. 6, 2020

(65) Prior Publication Data

US 2021/0056769 A1 Feb. 25, 2021

Related U.S. Application Data

(63) Continuation of application No. 16/519,850, filed on Jul. 23, 2019, now Pat. No. 10,861,248, which is a
(Continued)

(51) Int. Cl.
*G06F 3/0482* (2013.01)
*G06T 19/20* (2011.01)
(Continued)

(52) U.S. Cl.
CPC ............ *G06T 19/20* (2013.01); *G06F 3/0482* (2013.01); *G06F 3/0485* (2013.01);
(Continued)

(58) Field of Classification Search
CPC ...... G06T 19/20; G06T 13/40; G06T 2200/24; G06T 2219/2012; G06F 3/0482; G06F 3/04847
See application file for complete search history.

(56) References Cited

U.S. PATENT DOCUMENTS 4,847,819 A 7/1989 Hong
4,945,521 A 7/1990 Klaus
(Continued)

FOREIGN PATENT DOCUMENTS

AU 2015101639 A4 12/2015
AU 2017100683 B4 1/2018
(Continued)

OTHER PUBLICATIONS

Office Action received for Chinese Patent Application No. 202010330318.1, dated Nov. 19, 2020, 18 pages (9 pages of English Translation and 9 pages of Official Copy).
(Continued)

*Primary Examiner* — Antonio A Caschera
(74) *Attorney, Agent, or Firm* — Dentons US LLP

(57) ABSTRACT

The present disclosure generally relates to creating and editing avatars, and navigating avatar selection interfaces. In some examples, an avatar feature user interface includes a plurality of feature options that can be customized to create an avatar. In some examples, different types of avatars can be managed for use in different applications. In some examples, an interface is provided for navigating types of avatars for an application.

75 Claims, 157 Drawing Sheets

Related U.S. Application Data continuation of application No. 16/142,288, filed on Sep. 26, 2018, now Pat. No. 10,410,434.

(60) Provisional application No. 62/679,950, filed on Jun. 3, 2018, provisional application No. 62/668,200, filed on May 7, 2018.

(51) Int. Cl.

| | | |
|---|---|---|
| G06T 13/40 | (2011.01) | |
| G06T 7/70 | (2017.01) | |
| G06T 7/246 | (2017.01) | |
| G06F 3/04847 | (2022.01) | |
| G06F 3/0488 | (2022.01) | |
| G06T 11/60 | (2006.01) | |
| G06F 3/0485 | (2022.01) | |
| G06F 3/04883 | (2022.01) | |
| G06T 3/40 | (2006.01) | |
| G06T 11/00 | (2006.01) | |
| G06T 13/80 | (2011.01) | |
| G06V 40/16 | (2022.01) | |
| G06F 3/04842 | (2022.01) | |
| G06F 3/04845 | (2022.01) | |

(52) U.S. Cl.
CPC ........ *G06F 3/0488* (2013.01); *G06F 3/04842* (2013.01); *G06F 3/04845* (2013.01); *G06F 3/04847* (2013.01); *G06F 3/04883* (2013.01); *G06T 3/40* (2013.01); *G06T 7/246* (2017.01); *G06T 7/70* (2017.01); *G06T 11/001* (2013.01); *G06T 11/60* (2013.01); *G06T 13/40* (2013.01); *G06T 13/80* (2013.01); *G06V 40/161* (2022.01); *G06T 2200/24* (2013.01); *G06T 2207/30201* (2013.01); *G06T 2219/2012* (2013.01); *G06T 2219/2016* (2013.01); *G06T 2219/2021* (2013.01); *G06T 2219/2024* (2013.01)

(56) References Cited

U.S. PATENT DOCUMENTS

| | | |
|---|---|---|
| 5,559,947 A | 9/1996 | Wugofski |
| 5,995,119 A | 11/1999 | Cosatto et al. |
| 6,084,598 A | 7/2000 | Chekerylla |
| 6,088,040 A | 7/2000 | Oda et al. |
| 6,173,402 B1 | 1/2001 | Chapman |
| 6,323,846 B1 | 11/2001 | Westerman et al. |
| 6,570,557 B1 | 5/2003 | Westerman et al. |
| 6,621,524 B1 | 9/2003 | Iijima et al. |
| 6,919,892 B1 | 7/2005 | Cheiky et al. |
| 7,027,054 B1 | 4/2006 | Cheiky et al. |
| 7,046,838 B1 | 5/2006 | Sakagawa et al. |
| 7,180,524 B1 | 2/2007 | Axelrod |
| 7,227,976 B1 | 6/2007 | Jung et al. |
| 7,657,849 B2 | 2/2010 | Chaudhri et al. |
| 7,751,285 B1 | 7/2010 | Cain et al. |
| 7,908,554 B1 | 3/2011 | Blattner |
| 8,130,219 B2 | 3/2012 | Fleury et al. |
| 8,156,060 B2 | 4/2012 | Borzestowski et al. |
| 8,169,438 B1 | 5/2012 | Baraff et al. |
| 8,234,218 B2 | 7/2012 | Robinson et al. |
| 8,254,647 B1 | 8/2012 | Nechyba et al. |
| 8,295,546 B2 | 10/2012 | Craig et al. |
| 8,423,089 B2 | 4/2013 | Song et al. |
| 8,488,040 B2 | 7/2013 | Chen et al. |
| 8,601,379 B2 | 12/2013 | Marks et al. |
| 8,867,849 B1 | 10/2014 | Kirkham et al. |
| 8,896,652 B2 | 11/2014 | Ralston |
| 8,949,618 B1 | 2/2015 | Lee et al. |
| 9,094,576 B1 | 7/2015 | Karakotsios |
| 9,104,908 B1 | 8/2015 | Rogers et al. |
| 9,153,031 B2 | 10/2015 | El-Saban et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,264,660 B1 | 2/2016 | Petterson et al. |
| 9,269,196 B1 | 2/2016 | Fan et al. |
| 9,298,257 B2 | 3/2016 | Hwang et al. |
| 9,298,263 B2 | 3/2016 | Geisner et al. |
| 9,349,414 B1 | 5/2016 | Furment et al. |
| 9,411,506 B1 | 8/2016 | Marra et al. |
| 9,448,708 B1 | 9/2016 | Bennett et al. |
| 9,576,400 B2 | 2/2017 | Van Os et al. |
| 9,602,559 B1 | 3/2017 | Barros et al. |
| 9,628,416 B2 | 4/2017 | Henderson |
| 9,639,974 B2 | 5/2017 | Smith et al. |
| 9,686,497 B1 | 6/2017 | Terry |
| 9,747,716 B1 | 8/2017 | Mallet et al. |
| 9,948,589 B2 | 4/2018 | Gonnen et al. |
| 9,949,697 B2 | 4/2018 | Iscoe et al. |
| 10,062,133 B1 | 8/2018 | Mishra et al. |
| 10,095,385 B2 | 10/2018 | Walkin et al. |
| 10,169,897 B1 | 1/2019 | Geiger et al. |
| 10,171,985 B1 | 1/2019 | Czajka et al. |
| 10,237,276 B2 | 3/2019 | Gupta |
| 10,262,327 B1 | 4/2019 | Hardebeck et al. |
| 10,270,983 B1 | 4/2019 | Van Os et al. |
| 10,289,265 B2 | 5/2019 | Kulkarni |
| 10,325,416 B1 | 6/2019 | Scapel et al. |
| 10,325,417 B1 | 6/2019 | Scapel et al. |
| 10,375,313 B1 | 8/2019 | Van Os et al. |
| 10,376,153 B2 | 8/2019 | Tzvieli et al. |
| 10,379,719 B2 | 8/2019 | Scapel et al. |
| 10,397,391 B1 | 8/2019 | Czajka et al. |
| 10,410,434 B1 | 9/2019 | Scapel et al. |
| 10,521,091 B2 | 12/2019 | Anzures et al. |
| 10,521,948 B2 | 12/2019 | Rickwald et al. |
| 10,607,065 B2 | 3/2020 | Milman et al. |
| 10,607,419 B2 | 3/2020 | Os et al. |
| 10,620,590 B1 | 4/2020 | Guzman et al. |
| 10,628,985 B2 | 4/2020 | Mishra et al. |
| 10,657,695 B2 | 5/2020 | Chand et al. |
| 10,659,405 B1 | 5/2020 | Chang et al. |
| 10,698,575 B2 | 6/2020 | Walkin et al. |
| 10,708,545 B2 | 7/2020 | Rivard et al. |
| 10,789,753 B2 | 9/2020 | Miller et al. |
| 10,796,480 B2 | 10/2020 | Chen et al. |
| 10,798,035 B2 | 10/2020 | Lewis et al. |
| 10,810,409 B2 | 10/2020 | Bacivarov et al. |
| 10,817,981 B1 | 10/2020 | Belkin |
| 10,845,968 B2 | 11/2020 | Scapel et al. |
| 10,902,661 B1 | 1/2021 | Mourkogiannis et al. |
| 11,055,889 B2 | 7/2021 | Lee et al. |
| 11,061,372 B1 | 7/2021 | Chen et al. |
| 2001/0019330 A1 | 9/2001 | Bickmore et al. |
| 2001/0033675 A1 | 10/2001 | Maurer et al. |
| 2001/0047365 A1 | 11/2001 | Yonaitis |
| 2001/0050689 A1 | 12/2001 | Park |
| 2002/0015024 A1 | 2/2002 | Westerman et al. |
| 2002/0054157 A1 | 5/2002 | Hayashi et al. |
| 2002/0061130 A1 | 5/2002 | Kirk et al. |
| 2002/0072993 A1 | 6/2002 | Sandus et al. |
| 2003/0154446 A1 | 8/2003 | Constant et al. |
| 2004/0075699 A1 | 4/2004 | Franchi et al. |
| 2004/0203342 A1 | 10/2004 | Sibecas et al. |
| 2004/0225966 A1 | 11/2004 | Besharat et al. |
| 2005/0027716 A1 | 2/2005 | Apfel |
| 2005/0124389 A1 | 6/2005 | Yang |
| 2005/0190059 A1 | 9/2005 | Wehrenberg |
| 2005/0190653 A1 | 9/2005 | Chen |
| 2005/0193343 A1 | 9/2005 | Kawabe et al. |
| 2005/0202748 A1 | 9/2005 | Porter |
| 2005/0231513 A1 | 10/2005 | Lebarton et al. |
| 2005/0231625 A1 | 10/2005 | Parulski et al. |
| 2005/0248574 A1 | 11/2005 | Ashtekar et al. |
| 2005/0248582 A1 | 11/2005 | Scheepers et al. |
| 2005/0261031 A1 | 11/2005 | Seo et al. |
| 2006/0017692 A1 | 1/2006 | Wehrenberg et al. |

(56) References Cited

U.S. PATENT DOCUMENTS

| | | |
|---|---|---|
| 2006/0143569 A1 | 6/2006 | Kinsella et al. |
| 2006/0166708 A1 | 7/2006 | Kim et al. |
| 2006/0188144 A1 | 8/2006 | Sasaki et al. |
| 2006/0294465 A1 | 12/2006 | Ronen et al. |
| 2007/0024614 A1 | 2/2007 | Tam et al. |
| 2007/0025723 A1 | 2/2007 | Baudisch et al. |
| 2007/0052851 A1 | 3/2007 | Ochs et al. |
| 2007/0081081 A1 | 4/2007 | Cheng |
| 2007/0113181 A1 | 5/2007 | Blattner et al. |
| 2007/0168357 A1 | 7/2007 | Mo |
| 2007/0171091 A1 | 7/2007 | Nisenboim et al. |
| 2007/0192718 A1 | 8/2007 | Voorhees et al. |
| 2007/0260984 A1 | 11/2007 | Marks et al. |
| 2008/0052242 A1 | 2/2008 | Merritt et al. |
| 2008/0095470 A1 | 4/2008 | Chao et al. |
| 2008/0133580 A1 | 6/2008 | Wanless et al. |
| 2008/0201438 A1 | 8/2008 | Mandre et al. |
| 2008/0242423 A1 | 10/2008 | Kerr et al. |
| 2008/0267459 A1 | 10/2008 | Nakada et al. |
| 2008/0298571 A1 | 12/2008 | Kurtz et al. |
| 2008/0300572 A1 | 12/2008 | Rankers et al. |
| 2009/0027337 A1 | 1/2009 | Hildreth |
| 2009/0044113 A1 | 2/2009 | Jones et al. |
| 2009/0055484 A1 | 2/2009 | Vuong et al. |
| 2009/0066817 A1 | 3/2009 | Sakamaki |
| 2009/0077497 A1 | 3/2009 | Cho et al. |
| 2009/0083847 A1 | 3/2009 | Fadell et al. |
| 2009/0132371 A1 | 5/2009 | Strietzel et al. |
| 2009/0144173 A1 | 6/2009 | Mo et al. |
| 2009/0144639 A1 | 6/2009 | Nims et al. |
| 2009/0168756 A1 | 7/2009 | Kurapati et al. |
| 2009/0175509 A1 | 7/2009 | Gonion et al. |
| 2009/0195545 A1 | 8/2009 | Debevec et al. |
| 2009/0202114 A1 | 8/2009 | Morin et al. |
| 2009/0216691 A1 | 8/2009 | Borzestowski et al. |
| 2009/0251484 A1 | 10/2009 | Zhao et al. |
| 2009/0254859 A1 | 10/2009 | Arrasvuori et al. |
| 2009/0254862 A1 | 10/2009 | Viginisson et al. |
| 2009/0297022 A1 | 12/2009 | Pettigrew et al. |
| 2009/0300513 A1 | 12/2009 | Nims et al. |
| 2009/0307629 A1 | 12/2009 | Horiuchi et al. |
| 2009/0325701 A1 | 12/2009 | Andres Del Valle |
| 2010/0007665 A1 | 1/2010 | Smith et al. |
| 2010/0009747 A1 | 1/2010 | Reville et al. |
| 2010/0026640 A1 | 2/2010 | Kim et al. |
| 2010/0097375 A1 | 4/2010 | Tadaishi et al. |
| 2010/0123915 A1 | 5/2010 | Kashimoto |
| 2010/0124941 A1 | 5/2010 | Cho |
| 2010/0149573 A1 | 6/2010 | Pat et al. |
| 2010/0153847 A1 | 6/2010 | Fama |
| 2010/0164684 A1 | 7/2010 | Sasa et al. |
| 2010/0169376 A1 | 7/2010 | Chu |
| 2010/0188426 A1 | 7/2010 | Ohmori et al. |
| 2010/0199200 A1 | 8/2010 | Fujioka |
| 2010/0203968 A1 | 8/2010 | Gill et al. |
| 2010/0207721 A1 | 8/2010 | Nakajima et al. |
| 2010/0211899 A1 | 8/2010 | Fujioka |
| 2010/0211900 A1 | 8/2010 | Fujioka |
| 2010/0218089 A1 | 8/2010 | Chao et al. |
| 2010/0257469 A1 | 10/2010 | Kim et al. |
| 2010/0277470 A1 | 11/2010 | Margolis |
| 2010/0317410 A1 | 12/2010 | Song et al. |
| 2010/0322111 A1 | 12/2010 | Li |
| 2011/0007174 A1 | 1/2011 | Bacivarov et al. |
| 2011/0025707 A1 | 2/2011 | Fujioka |
| 2011/0064388 A1 | 3/2011 | Brown et al. |
| 2011/0067098 A1 | 3/2011 | Ruggiero et al. |
| 2011/0072394 A1 | 3/2011 | Victor et al. |
| 2011/0074807 A1 | 3/2011 | Inada et al. |
| 2011/0080356 A1 | 4/2011 | Kang et al. |
| 2011/0221755 A1 | 9/2011 | Geisner et al. |
| 2011/0248992 A1 | 10/2011 | Van et al. |
| 2011/0249073 A1 | 10/2011 | Cranfill et al. |
| 2011/0249078 A1 | 10/2011 | Abuan et al. |
| 2011/0252344 A1 | 10/2011 | Van |
| 2011/0256848 A1 | 10/2011 | Bok et al. |
| 2011/0296324 A1 | 12/2011 | Goossens et al. |
| 2011/0298808 A1 | 12/2011 | Rovik |
| 2011/0304629 A1 | 12/2011 | Winchester |
| 2011/0304632 A1 | 12/2011 | Evertt et al. |
| 2012/0011453 A1 | 1/2012 | Shimono et al. |
| 2012/0069028 A1 | 3/2012 | Bouguerra |
| 2012/0075328 A1 | 3/2012 | Goossens |
| 2012/0079377 A1 | 3/2012 | Goossens |
| 2012/0079378 A1 | 3/2012 | Goossens |
| 2012/0081282 A1 | 4/2012 | Chin |
| 2012/0139830 A1 | 6/2012 | Hwang et al. |
| 2012/0206452 A1 | 8/2012 | Geisner et al. |
| 2012/0218125 A1 | 8/2012 | Demirdjian et al. |
| 2012/0223952 A1 | 9/2012 | Kanemaru et al. |
| 2012/0233120 A1 | 9/2012 | Nijim et al. |
| 2012/0256967 A1 | 10/2012 | Baldwin et al. |
| 2012/0289290 A1 | 11/2012 | Chae et al. |
| 2012/0293686 A1 | 11/2012 | Karn et al. |
| 2012/0299945 A1 | 11/2012 | Aarabi |
| 2012/0309520 A1 | 12/2012 | Evertt et al. |
| 2012/0314047 A1 | 12/2012 | Kasahara et al. |
| 2013/0015946 A1 | 1/2013 | Lau et al. |
| 2013/0038759 A1 | 2/2013 | Jo et al. |
| 2013/0067453 A1 | 3/2013 | Luan |
| 2013/0101164 A1 | 4/2013 | Leclerc et al. |
| 2013/0135315 A1 | 5/2013 | Bares et al. |
| 2013/0136341 A1 | 5/2013 | Yamamoto |
| 2013/0141513 A1 | 6/2013 | Setton et al. |
| 2013/0147933 A1 | 6/2013 | Kulas et al. |
| 2013/0148867 A1 | 6/2013 | Wang |
| 2013/0157646 A1 | 6/2013 | Ferren et al. |
| 2013/0159900 A1 | 6/2013 | Pendharkar |
| 2013/0194378 A1 | 8/2013 | Brown |
| 2013/0198210 A1 | 8/2013 | Lee et al. |
| 2013/0201104 A1 | 8/2013 | Ptucha et al. |
| 2013/0234964 A1 | 9/2013 | Kim et al. |
| 2013/0235045 A1 | 9/2013 | Corazza et al. |
| 2013/0258040 A1 | 10/2013 | Kaytaz et al. |
| 2013/0286161 A1 | 10/2013 | Lv et al. |
| 2013/0290905 A1 | 10/2013 | Luvogt et al. |
| 2013/0293686 A1 | 11/2013 | Blow et al. |
| 2013/0305189 A1 | 11/2013 | Kim |
| 2013/0318347 A1 | 11/2013 | Moffat |
| 2013/0322218 A1 | 12/2013 | Burkhardt et al. |
| 2013/0342672 A1 | 12/2013 | Gray et al. |
| 2013/0342730 A1 | 12/2013 | Lee et al. |
| 2014/0013422 A1 | 1/2014 | Janus et al. |
| 2014/0040066 A1 | 2/2014 | Fujioka |
| 2014/0047560 A1 | 2/2014 | Meyer et al. |
| 2014/0055554 A1 | 2/2014 | Du et al. |
| 2014/0078144 A1 | 3/2014 | Berriman et al. |
| 2014/0085293 A1 | 3/2014 | Konoplev et al. |
| 2014/0085460 A1 | 3/2014 | Park et al. |
| 2014/0085487 A1 | 3/2014 | Park et al. |
| 2014/0092130 A1 | 4/2014 | Anderson et al. |
| 2014/0115451 A1 | 4/2014 | Sheldon-Dante |
| 2014/0137013 A1 | 5/2014 | Matas |
| 2014/0143693 A1 | 5/2014 | Goossens et al. |
| 2014/0157153 A1 | 6/2014 | Yuen et al. |
| 2014/0165000 A1 | 6/2014 | Fleizach et al. |
| 2014/0198121 A1 | 7/2014 | Tong et al. |
| 2014/0213318 A1 | 7/2014 | Leem et al. |
| 2014/0218371 A1 | 8/2014 | Du et al. |
| 2014/0254434 A1 | 9/2014 | Jain et al. |
| 2014/0267311 A1 | 9/2014 | Evertt et al. |
| 2014/0267618 A1 | 9/2014 | Esteban et al. |
| 2014/0279062 A1 | 9/2014 | Hackman et al. |
| 2014/0283128 A1 | 9/2014 | Shepherd et al. |
| 2014/0292641 A1 | 10/2014 | Cho et al. |
| 2014/0300635 A1 | 10/2014 | Suzuki |
| 2014/0313307 A1 | 10/2014 | Oh et al. |
| 2014/0333671 A1 | 11/2014 | Phang et al. |
| 2014/0336808 A1 | 11/2014 | Taylor et al. |
| 2014/0351720 A1 | 11/2014 | Yin |
| 2014/0354401 A1 | 12/2014 | Soni et al. |
| 2014/0361974 A1 | 12/2014 | Li et al. |
| 2014/0362091 A1 | 12/2014 | Bouaziz et al. |
| 2014/0366159 A1 | 12/2014 | Cohen |

(56) References Cited

U.S. PATENT DOCUMENTS

| | | |
|---|---|---|
| 2014/0368601 A1 | 12/2014 | Decharms |
| 2015/0011204 A1 | 1/2015 | Seo et al. |
| 2015/0033192 A1 | 1/2015 | Bohannon et al. |
| 2015/0033364 A1 | 1/2015 | Wong |
| 2015/0035825 A1 | 2/2015 | Zhou et al. |
| 2015/0036883 A1 | 2/2015 | Deri et al. |
| 2015/0037545 A1 | 2/2015 | Sun |
| 2015/0043046 A1 | 2/2015 | Iwamoto |
| 2015/0058754 A1 | 2/2015 | Rauh |
| 2015/0078621 A1 | 3/2015 | Choi et al. |
| 2015/0082193 A1 | 3/2015 | Wallace et al. |
| 2015/0084950 A1 | 3/2015 | Li et al. |
| 2015/0091896 A1 | 4/2015 | Tarquini et al. |
| 2015/0121251 A1 | 4/2015 | Kadirvel et al. |
| 2015/0149927 A1 | 5/2015 | Walkin et al. |
| 2015/0172238 A1 | 6/2015 | Ahmed et al. |
| 2015/0172584 A1 | 6/2015 | Park et al. |
| 2015/0208244 A1 | 7/2015 | Nakao |
| 2015/0213307 A1 | 7/2015 | Beeler et al. |
| 2015/0213604 A1 | 7/2015 | Li et al. |
| 2015/0248235 A1 | 9/2015 | Offenberg et al. |
| 2015/0253740 A1 | 9/2015 | Nishijima et al. |
| 2015/0254886 A1 | 9/2015 | Li |
| 2015/0281145 A1 | 10/2015 | Ji |
| 2015/0302624 A1 | 10/2015 | Burke |
| 2015/0310259 A1 | 10/2015 | Lau et al. |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0317945 A1 | 11/2015 | Andress et al. |
| 2015/0325029 A1 | 11/2015 | Li et al. |
| 2015/0334075 A1 | 11/2015 | Wang et al. |
| 2015/0346912 A1 | 12/2015 | Yang et al. |
| 2015/0350125 A1 | 12/2015 | Henderson |
| 2015/0350141 A1 | 12/2015 | Yang et al. |
| 2015/0370529 A1 | 12/2015 | Zambetti et al. |
| 2015/0379252 A1 | 12/2015 | Tang et al. |
| 2016/0005206 A1 | 1/2016 | Li et al. |
| 2016/0005211 A1 | 1/2016 | Sarkis et al. |
| 2016/0006987 A1 | 1/2016 | Li et al. |
| 2016/0030844 A1 | 2/2016 | Nair et al. |
| 2016/0034133 A1 | 2/2016 | Wilson et al. |
| 2016/0037331 A1 | 2/2016 | Vernon et al. |
| 2016/0042548 A1 | 2/2016 | Du et al. |
| 2016/0050169 A1 | 2/2016 | Ben Atar et al. |
| 2016/0055370 A1 | 2/2016 | Garcia |
| 2016/0057087 A1 | 2/2016 | Gomba |
| 2016/0086387 A1 | 3/2016 | Os et al. |
| 2016/0092035 A1 | 3/2016 | Crocker et al. |
| 2016/0092043 A1 | 3/2016 | Missig et al. |
| 2016/0104034 A1 | 4/2016 | Wilder et al. |
| 2016/0105388 A1 | 4/2016 | Bin Mahfooz et al. |
| 2016/0110922 A1 | 4/2016 | Haring |
| 2016/0132200 A1 | 5/2016 | Walkin et al. |
| 2016/0134635 A1 | 5/2016 | Thelin et al. |
| 2016/0134840 A1 | 5/2016 | Mcculloch |
| 2016/0150215 A1 | 5/2016 | Chen et al. |
| 2016/0163084 A1 | 6/2016 | Corazza et al. |
| 2016/0182661 A1 | 6/2016 | Brezina et al. |
| 2016/0191958 A1 | 6/2016 | Nauseef et al. |
| 2016/0192324 A1 | 6/2016 | Zhang et al. |
| 2016/0217601 A1 | 7/2016 | Tsuda et al. |
| 2016/0226926 A1 | 8/2016 | Singh et al. |
| 2016/0227115 A1 | 8/2016 | Bin Mahfooz et al. |
| 2016/0231878 A1 | 8/2016 | Tsuda et al. |
| 2016/0247308 A1 | 8/2016 | Jiao et al. |
| 2016/0247309 A1 | 8/2016 | Li et al. |
| 2016/0259413 A1 | 9/2016 | Anzures et al. |
| 2016/0259497 A1 | 9/2016 | Bauer et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0267699 A1 | 9/2016 | Borke et al. |
| 2016/0275724 A1 | 9/2016 | Adeyoola et al. |
| 2016/0284123 A1 | 9/2016 | Hare et al. |
| 2016/0291822 A1 | 10/2016 | Ahuja et al. |
| 2016/0292901 A1 | 10/2016 | Li et al. |
| 2016/0292903 A1 | 10/2016 | Li et al. |
| 2016/0300379 A1 | 10/2016 | Du et al. |
| 2016/0307028 A1 | 10/2016 | Fedorov |
| 2016/0327911 A1 | 11/2016 | Eim et al. |
| 2016/0328874 A1 | 11/2016 | Tong et al. |
| 2016/0328875 A1 | 11/2016 | Fang et al. |
| 2016/0328876 A1 | 11/2016 | Tong et al. |
| 2016/0328886 A1 | 11/2016 | Tong et al. |
| 2016/0350957 A1 | 12/2016 | Woods et al. |
| 2016/0364600 A1 | 12/2016 | Shah et al. |
| 2016/0370974 A1 | 12/2016 | Stenneth |
| 2016/0378304 A1 | 12/2016 | Bahgat et al. |
| 2017/0018289 A1 | 1/2017 | Morgenstern |
| 2017/0046045 A1 | 2/2017 | Tung et al. |
| 2017/0046065 A1 | 2/2017 | Zeng et al. |
| 2017/0046426 A1 | 2/2017 | Pearce et al. |
| 2017/0046507 A1 | 2/2017 | Archer et al. |
| 2017/0069124 A1 | 3/2017 | Tong et al. |
| 2017/0080346 A1 | 3/2017 | Abbas |
| 2017/0082983 A1 | 3/2017 | Katzer et al. |
| 2017/0083086 A1 | 3/2017 | Mazur et al. |
| 2017/0083524 A1 | 3/2017 | Huang et al. |
| 2017/0083586 A1 | 3/2017 | Huang et al. |
| 2017/0098122 A1 | 4/2017 | El Kaliouby et al. |
| 2017/0111616 A1 | 4/2017 | Li et al. |
| 2017/0113140 A1 | 4/2017 | Blackstock et al. |
| 2017/0132828 A1 | 5/2017 | Zelenin et al. |
| 2017/0140214 A1 | 5/2017 | Matas et al. |
| 2017/0147802 A1 | 5/2017 | Li |
| 2017/0164888 A1 | 6/2017 | Matsuda et al. |
| 2017/0178287 A1 | 6/2017 | Anderson |
| 2017/0206095 A1 | 7/2017 | Gibbs et al. |
| 2017/0220212 A1 | 8/2017 | Yang et al. |
| 2017/0236298 A1 | 8/2017 | Vetter |
| 2017/0255169 A1 | 9/2017 | Lee et al. |
| 2017/0256086 A1 | 9/2017 | Park et al. |
| 2017/0285764 A1 | 10/2017 | Kim et al. |
| 2017/0286423 A1 | 10/2017 | Shorman et al. |
| 2017/0286913 A1 | 10/2017 | Liu et al. |
| 2017/0323266 A1 | 11/2017 | Seo |
| 2017/0336926 A1 | 11/2017 | Chaudhri et al. |
| 2017/0336928 A1 | 11/2017 | Chaudhri et al. |
| 2017/0346772 A1 | 11/2017 | Albouyeh et al. |
| 2017/0358117 A1 | 12/2017 | Goossens et al. |
| 2018/0004404 A1 | 1/2018 | Delfino et al. |
| 2018/0025219 A1 | 1/2018 | Baldwin et al. |
| 2018/0047200 A1 | 2/2018 | O'hara et al. |
| 2018/0059903 A1 | 3/2018 | Lim et al. |
| 2018/0063603 A1 | 3/2018 | Tang et al. |
| 2018/0067633 A1 | 3/2018 | Wilson et al. |
| 2018/0074693 A1 | 3/2018 | Jones et al. |
| 2018/0088787 A1 | 3/2018 | Bereza et al. |
| 2018/0091732 A1 | 3/2018 | Wilson et al. |
| 2018/0095649 A1 | 4/2018 | Valdivia et al. |
| 2018/0114543 A1 | 4/2018 | Novikoff |
| 2018/0121060 A1 | 5/2018 | Jeong et al. |
| 2018/0130094 A1 | 5/2018 | Tung et al. |
| 2018/0131878 A1 | 5/2018 | Charlton et al. |
| 2018/0157901 A1 | 6/2018 | Arbatman et al. |
| 2018/0165862 A1 | 6/2018 | Sawaki |
| 2018/0189549 A1 | 7/2018 | Inomata |
| 2018/0191944 A1 | 7/2018 | Carbonell et al. |
| 2018/0197343 A1 | 7/2018 | Hare et al. |
| 2018/0225263 A1 | 8/2018 | Zhong et al. |
| 2018/0268589 A1 | 9/2018 | Grant |
| 2018/0316775 A1 | 11/2018 | Kwon et al. |
| 2018/0321826 A1 | 11/2018 | Bereza et al. |
| 2018/0324353 A1 | 11/2018 | Kim et al. |
| 2018/0329587 A1 | 11/2018 | Ko et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |

(56) References Cited

U.S. PATENT DOCUMENTS

| | | | |
|---|---|---|---|
| 2018/0349795 A1 | 12/2018 | Boyle et al. | |
| 2019/0087082 A1 | 3/2019 | Chaudhri et al. | |
| 2019/0139207 A1 | 5/2019 | Jeong et al. | |
| 2019/0158735 A1 | 5/2019 | Wilson et al. | |
| 2019/0171338 A1 | 6/2019 | Voss et al. | |
| 2019/0171869 A1 | 6/2019 | Fortune et al. | |
| 2019/0180088 A1 | 6/2019 | Norimatsu | |
| 2019/0235748 A1 | 8/2019 | Seol et al. | |
| 2019/0266775 A1 | 8/2019 | Lee et al. | |
| 2019/0266807 A1 | 8/2019 | Lee et al. | |
| 2019/0279410 A1 | 9/2019 | Orvalho et al. | |
| 2019/0295056 A1 | 9/2019 | Wright | |
| 2019/0339847 A1 | 11/2019 | Scapel et al. | |
| 2019/0342507 A1 | 11/2019 | Dye et al. | |
| 2019/0347868 A1 | 11/2019 | Scapel et al. | |
| 2019/0370492 A1 | 12/2019 | Falchuk et al. | |
| 2020/0045245 A1 | 2/2020 | Van Os et al. | |
| 2020/0068095 A1 | 2/2020 | Nabetani | |
| 2020/0074711 A1 | 3/2020 | Barlier et al. | |
| 2020/0226848 A1 | 7/2020 | Van Os et al. | |
| 2020/0234481 A1 | 7/2020 | Scapel et al. | |
| 2020/0234508 A1 | 7/2020 | Shaburov et al. | |
| 2020/0285851 A1 | 9/2020 | Lin et al. | |
| 2020/0302669 A1 | 9/2020 | Barlier et al. | |
| 2020/0306640 A1 | 10/2020 | Kolen et al. | |
| 2020/0358725 A1 | 11/2020 | Scapel et al. | |
| 2020/0358726 A1 | 11/2020 | Dryer et al. | |
| 2020/0380768 A1 | 12/2020 | Harris et al. | |
| 2020/0380781 A1 | 12/2020 | Barlier et al. | |
| 2020/0410763 A1 | 12/2020 | Hare et al. | |
| 2020/0412975 A1 | 12/2020 | Al Majid et al. | |
| 2021/0005003 A1 | 1/2021 | Chong et al. | |
| 2021/0027514 A1 | 1/2021 | Kwon et al. | |
| 2021/0058351 A1 | 2/2021 | Viklund et al. | |
| 2021/0065448 A1 | 3/2021 | Goodrich et al. | |
| 2021/0065454 A1 | 3/2021 | Goodrich et al. | |
| 2021/0096703 A1 | 4/2021 | Anzures et al. | |
| 2021/0099568 A1 | 4/2021 | Depue et al. | |
| 2021/0099761 A1 | 4/2021 | Zhang | |
| 2021/0152505 A1 | 5/2021 | Baldwin et al. | |
| 2021/0168108 A1 | 6/2021 | Antmen et al. | |
| 2021/0264656 A1 | 8/2021 | Barlier et al. | |
| 2021/0335055 A1 | 10/2021 | Scapel et al. | |
| 2021/0349426 A1 | 11/2021 | Chen et al. | |
| 2021/0349427 A1 | 11/2021 | Chen et al. | |
| 2021/0349611 A1 | 11/2021 | Chen et al. | |
| 2021/0349612 A1 | 11/2021 | Triverio | |
| 2021/0390753 A1 | 12/2021 | Scape et al. | |
| 2022/0070385 A1 | 3/2022 | Van Os et al. | |

FOREIGN PATENT DOCUMENTS

| | | |
|---|---|---|
| AU | 2015297035 B2 | 6/2018 |
| CA | 2356232 A1 | 3/2002 |
| CN | 1581901 A | 2/2005 |
| CN | 101055646 A | 10/2007 |
| CN | 101329707 A | 12/2008 |
| CN | 101472158 A | 7/2009 |
| CN | 101692681 A | 4/2010 |
| CN | 101742053 A | 6/2010 |
| CN | 101930284 A | 12/2010 |
| CN | 102035990 A | 4/2011 |
| CN | 102075727 A | 5/2011 |
| CN | 102142149 A | 8/2011 |
| CN | 102271241 A | 12/2011 |
| CN | 102298797 A | 12/2011 |
| CN | 102394919 A | 3/2012 |
| CN | 102479388 A | 5/2012 |
| CN | 102750070 A | 10/2012 |
| CN | 102841683 A | 12/2012 |
| CN | 102854979 A | 1/2013 |
| CN | 102999934 A | 3/2013 |
| CN | 103116902 A | 5/2013 |
| CN | 103209642 A | 7/2013 |
| CN | 103294171 A | 9/2013 |
| CN | 103346957 A | 10/2013 |
| CN | 103516894 A | 1/2014 |
| CN | 103703438 A | 4/2014 |
| CN | 103886632 A | 6/2014 |
| CN | 103927190 A | 7/2014 |
| CN | 103947190 A | 7/2014 |
| CN | 104011738 A | 8/2014 |
| CN | 104115503 A | 10/2014 |
| CN | 104170358 A | 11/2014 |
| CN | 104182741 A | 12/2014 |
| CN | 104246793 A | 12/2014 |
| CN | 104270597 A | 1/2015 |
| CN | 104376160 A | 2/2015 |
| CN | 104732396 A | 6/2015 |
| CN | 104753762 A | 7/2015 |
| CN | 104753766 A | 7/2015 |
| CN | 104836879 A | 8/2015 |
| CN | 104935497 A | 9/2015 |
| CN | 104952063 A | 9/2015 |
| CN | 105051651 A | 11/2015 |
| CN | 105099861 A | 11/2015 |
| CN | 105100462 A | 11/2015 |
| CN | 105139438 A | 12/2015 |
| CN | 105374055 A | 3/2016 |
| CN | 105391843 A | 3/2016 |
| CN | 105391937 A | 3/2016 |
| CN | 105611215 A | 5/2016 |
| CN | 105611275 A | 5/2016 |
| CN | 105653031 A | 6/2016 |
| CN | 105844101 A | 8/2016 |
| CN | 106101358 A | 11/2016 |
| CN | 106303690 A | 1/2017 |
| CN | 106575444 A | 4/2017 |
| CN | 107171934 A | 9/2017 |
| CN | 107533356 A | 1/2018 |
| CN | 107613085 A | 1/2018 |
| CN | 107924113 A | 4/2018 |
| EP | 0579093 A1 | 1/1994 |
| EP | 1215867 A2 | 6/2002 |
| EP | 1429291 A1 | 6/2004 |
| EP | 1592212 A1 | 11/2005 |
| EP | 2416563 A2 | 2/2012 |
| EP | 2713298 A1 | 4/2014 |
| EP | 2960822 A1 | 12/2015 |
| EP | 2990887 A2 | 3/2016 |
| EP | 3026636 A1 | 6/2016 |
| EP | 3051525 A1 | 8/2016 |
| EP | 3101958 A1 | 12/2016 |
| EP | 3118761 A1 | 1/2017 |
| EP | 3190563 A1 | 7/2017 |
| EP | 3211587 A1 | 8/2017 |
| EP | 3308563 A1 | 4/2018 |
| EP | 2556665 B1 | 8/2018 |
| EP | 3396618 A1 | 10/2018 |
| JP | 53-31170 A | 3/1978 |
| JP | 56-621 A | 1/1981 |
| JP | 3007616 U | 2/1995 |
| JP | 9-9072 A | 1/1997 |
| JP | H11109066 A | 4/1999 |
| JP | 2000-076460 A | 3/2000 |
| JP | 2000-283720 A | 10/2000 |
| JP | 2001-92783 A | 4/2001 |
| JP | 2001-273064 A | 10/2001 |
| JP | 2001-313886 A | 11/2001 |
| JP | 2002-222412 A | 8/2002 |
| JP | 2002-251238 A | 9/2002 |
| JP | 2003-150550 A | 5/2003 |
| JP | 2003-219217 A | 7/2003 |
| JP | 2003-233616 A | 8/2003 |
| JP | 2004-028918 A | 1/2004 |
| JP | 2004-184396 A | 7/2004 |
| JP | 2005-115480 A | 4/2005 |
| JP | 2005-521890 A | 7/2005 |
| JP | 2006-520053 A | 8/2006 |
| JP | 2007-52770 A | 3/2007 |
| JP | 2007-528240 A | 10/2007 |
| JP | 2008-015800 A | 1/2008 |
| JP | 2010-28404 A | 2/2010 |
| JP | 2010-541046 A | 12/2010 |

(56) References Cited

FOREIGN PATENT DOCUMENTS

| | | |
|---|---|---|
| JP | 2011-70623 A | 4/2011 |
| JP | 2011-517810 A | 6/2011 |
| JP | 2011-192228 A | 9/2011 |
| JP | 2011-209887 A | 10/2011 |
| JP | 2012-38292 A | 2/2012 |
| JP | 2012-208719 A | 10/2012 |
| JP | 2013-003671 A | 1/2013 |
| JP | 2013-088906 A | 5/2013 |
| JP | 2013-092989 A | 5/2013 |
| JP | 2013-097760 A | 5/2013 |
| JP | 2013-97814 A | 5/2013 |
| JP | 2013-114498 A | 6/2013 |
| JP | 2013-232230 A | 11/2013 |
| JP | 2014-206817 A | 10/2014 |
| JP | 2015-036925 A | 2/2015 |
| JP | 2015-056142 A | 3/2015 |
| JP | 2016-136324 A | 7/2016 |
| JP | 2016-162000 A | 9/2016 |
| JP | 2016-534435 A | 11/2016 |
| JP | 2017-527917 A | 9/2017 |
| JP | 2017-531225 A | 10/2017 |
| JP | 6240301 B1 | 11/2017 |
| JP | 6266736 B1 | 1/2018 |
| JP | 2018-514838 A | 6/2018 |
| JP | 2018-106365 A | 7/2018 |
| JP | 2018-116067 A | 7/2018 |
| JP | 2019-145108 A | 8/2019 |
| JP | 2001-273064 A | 12/2021 |
| JP | 2002-251238 A | 12/2021 |
| JP | 2003-233616 A | 12/2021 |
| JP | 2004-028918 A | 12/2021 |
| JP | 2004-184396 A | 12/2021 |
| JP | 2008-015800 A | 12/2021 |
| JP | 2013-003671 A | 12/2021 |
| JP | 2013-092989 A | 12/2021 |
| JP | 2013-232230 A | 12/2021 |
| JP | 2015-036925 A | 12/2021 |
| JP | H11109066 A | 12/2021 |
| JP | 2011-192228 A | 1/2022 |
| JP | 2013-088906 A | 1/2022 |
| JP | 2015-056142 A | 1/2022 |
| JP | 2012-208719 A | 2/2022 |
| JP | 2000-076460 A | 4/2022 |
| JP | 2003-219217 A | 4/2022 |
| JP | 2013-097760 A | 4/2022 |
| KR | 10-2004-0046272 A | 6/2004 |
| KR | 10-2005-0086630 A | 8/2005 |
| KR | 1 0-2008-0050336 A | 6/2008 |
| KR | 10-2010-0086052 A | 7/2010 |
| KR | 10-2011-0028581 A | 3/2011 |
| KR | 10-2012-0006610 A | 1/2012 |
| KR | 10-2012-0130627 A | 12/2012 |
| KR | 10-2014-0033088 A | 3/2014 |
| KR | 10-2014-0039737 A | 4/2014 |
| KR | 10-2014-0049340 A | 4/2014 |
| KR | 10-2015-0024899 A | 3/2015 |
| KR | 10-1540544 B1 | 7/2015 |
| KR | 10-1587115 B1 | 1/2016 |
| KR | 10-2016-0014623 A | 2/2016 |
| KR | 10-2016-0016910 A | 2/2016 |
| KR | 10-2017-0023063 A | 3/2017 |
| KR | 10-2018-0017227 A | 2/2018 |
| KR | 10-2005-0086630 A | 2/2022 |
| KR | 10-2012-0006610 A | 2/2022 |
| KR | 10-2012-0130627 A | 2/2022 |
| WO | 98/40795 A1 | 9/1998 |
| WO | 03/085460 A2 | 10/2003 |
| WO | 2007/120981 A2 | 10/2007 |
| WO | 2009/073607 A2 | 6/2009 |
| WO | 2009/114239 A1 | 9/2009 |
| WO | 2009/133710 A1 | 11/2009 |
| WO | 2012/068193 A2 | 5/2012 |
| WO | 2012/170354 A2 | 12/2012 |
| WO | 2013/082325 A1 | 6/2013 |
| WO | 2013/097139 A1 | 7/2013 |
| WO | 2013/097264 A1 | 7/2013 |
| WO | 2013/152453 A1 | 10/2013 |
| WO | 2013/152454 A1 | 10/2013 |
| WO | 2013/152455 A1 | 10/2013 |
| WO | 2013/169849 A2 | 11/2013 |
| WO | 2013/189058 A1 | 12/2013 |
| WO | 2014/012456 A1 | 1/2014 |
| WO | 2014/094199 A1 | 6/2014 |
| WO | 2014/105276 A1 | 7/2014 |
| WO | 2014/193465 A1 | 12/2014 |
| WO | 2014/200734 A1 | 12/2014 |
| WO | 2015/065928 A1 | 5/2015 |
| WO | 2015/069153 A1 | 5/2015 |
| WO | 2015/144209 A1 | 10/2015 |
| WO | 2015/167590 A1 | 11/2015 |
| WO | 2015/195216 A1 | 12/2015 |
| WO | 2015/196448 A1 | 12/2015 |
| WO | 2016/022203 A1 | 2/2016 |
| WO | 2016/022204 A1 | 2/2016 |
| WO | 2016/022205 A1 | 2/2016 |
| WO | 2016/026402 A2 | 2/2016 |
| WO | 2016/036218 A1 | 3/2016 |
| WO | 2016/042926 A1 | 3/2016 |
| WO | 2016/045005 A1 | 3/2016 |
| WO | 2016/057062 A1 | 4/2016 |
| WO | 2016/064435 A1 | 4/2016 |
| WO | 2016/101124 A1 | 6/2016 |
| WO | 2016/101131 A1 | 6/2016 |
| WO | 2016/101132 A1 | 6/2016 |
| WO | 2016/144385 A1 | 9/2016 |
| WO | 2016/145129 A1 | 9/2016 |
| WO | 2016/161556 A1 | 10/2016 |
| WO | 2017/012302 A1 | 1/2017 |
| WO | 2017/015949 A1 | 2/2017 |
| WO | 2017/043314 A1 | 3/2017 |
| WO | 2017/153771 A1 | 9/2017 |
| WO | 2017/201326 A1 | 11/2017 |
| WO | 2017/218193 A1 | 12/2017 |
| WO | 2018/006053 A1 | 1/2018 |
| WO | 2018/049430 A2 | 3/2018 |
| WO | 2018/057272 A1 | 3/2018 |
| WO | 2018/212802 A1 | 11/2018 |
| WO | 2019/216999 A1 | 11/2019 |
| WO | 2021/050190 A1 | 3/2021 |

OTHER PUBLICATIONS

Applicant-Initiated Interview Summary received for U.S. Appl. No. 16/663,062, dated Dec. 18, 2020, 3 pages.
Minutes of the Oral Proceedings received for European Patent Application No. 19181242.9, mailed on Dec. 15, 2020, 6 pages.
Notice of Acceptance received for Australian Patent Application No. 2018269375, dated Dec. 3, 2020, 3 pages.
Notice of Allowance received for Japanese Patent Application No. 2019-511975, dated Dec. 14, 2020, 4 pages (1 page of English Translation and 3 pages of Official Copy).
Office Action received for Japanese Patent Application No. 2020-120086, dated Nov. 20, 2020, 6 pages (3 pages of English Translation and 3 pages of Official Copy).
Singh, Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 1 page.
Vidstube, "Bitmoji Clockface on Fitbit Versa Sense/Versa 3/Versa 2", Available online at: <https://www.youtube.com/watch?v=4V_xDnSLeHE>, Jun. 30, 2019, 1 page.
Woolsey, Amanda, "How to Customize the Clock on the Apple Watch", Available online at: <https://www.youtube.com/watch?v=t-3Bckdd9B4>, Apr. 25, 2015, 1 page.
Applicant-Initiated Interview Summary received for U.S. Appl. No. 16/833,436, dated Jul. 1, 2021, 2 pages.
Decision to Refuse received for European Patent Application No. 19724959.2, dated Jun. 22, 2021, 13 pages.
Office Action received for Chinese Patent Application No. 201911199054.4, dated Jun. 10, 2021, 13 pages (7 pages of English Translation and 6 pages of Official Copy).

(56) References Cited

OTHER PUBLICATIONS

Office Action received for European Patent Application No. 18703184.4, dated Jul. 2, 2021, 6 pages.
Office Action received for Japanese Patent Application No. 2019-563560, dated Jun. 14, 2021, 6 pages (3 pages of English Translation and 3 pages of Official Copy).
Office Action received for Japanese Patent Application No. 2020-120086, dated May 21, 2021, 6 pages (3 pages of English Translation and 3 pages of Official Copy).
Rosa et al., "Stripe Generator—a Free Tool for the Web Design Community", Available online at: http://www.stripegenerator.com/, Mar. 28, 2019, 2 pages.
Office Action received for European Patent Application No. 20722020.3, dated May 12, 2021, 9 pages.
Notice of Allowance received for U.S. Appl. No. 16/896,457, dated Jan. 8, 2021, 22 pages.
Office Action received for Chinese Patent Application No. 201780053143.0, dated Dec. 24, 2020, 21 pages (11 pages of English Translation and 10 pages of Official Copy).
Office Action received for Japanese Patent Application No. 2019-563560, dated Nov. 30, 2020, 7 pages (3 pages of English Translation and 4 pages of Official Copy).
Corrected Notice of Allowance received for U.S. Appl. No. 16/896,457, dated Apr. 6, 2021, 3 pages.
Notice of Allowance received for Chinese Patent Application No. 202010776600.2, dated Apr. 1, 2021, 8 pages (4 pages of English Translation and 4 pages of Official Copy).
Notice of Allowance received for Korean Patent Application No. 10-2020-7031855, dated Mar. 22, 2021, 5 pages (1 page of English Translation and 4 pages of Official Copy).
Office Action received for Danish Patent Application No. PA201970530, dated Mar. 25, 2021, 4 pages.
Office Action received for European Patent Application No. 17853657.9, dated Apr. 1, 2021, 6 pages.
Summons to Attend Oral Proceedings received for European Patent Application No. 19724959.2, mailed on Mar. 31, 2021, 3 pages.
Applicant-Initiated Interview Summary received for U.S. Appl. No. 16/582,500, dated Feb. 1, 2021, 6 pages.
Corrected Notice of Allowance received for U.S. Appl. No. 16/896,457, dated Jan. 28, 2021, 2 pages.
Non-Final Office Action received for U.S. Appl. No. 16/599,433, dated Jan. 28, 2021, 16 pages.
Office Action received for Chinese Patent Application No. 201911199054.4, dated Jan. 20, 2021, 19 pages (11 pages of English Translation and 8 pages of Official Copy).
Office Action received for European Patent Application No. 19211833.9, dated Jan. 29, 2021, 5 pages.
Pre-Appeal Review Report received for Japanese Patent Application No. 2018-182607, mailed on Jan. 21, 2021, 4 pages (2 pages of English Translation and 2 pages of Official Copy).
Summons to Attend Oral Proceedings received for European Patent Application No. 19724959.2, mailed on Feb. 1, 2021, 9 pages.
Neurotechnology, "Sentimask SDK", Available at: ttps://www.neurotechnology.com/sentimask.html, Apr. 22, 2018, 5 pages.
ZY News, "Generate Cartoon Face within Three Seconds, You are the New-generation Expression Emperor", Online available at: <http://inews.ifeng.com/48551936/news.shtml>, Apr. 22, 2016, 3 pages (Official Copy Only) (See communication under 37 CFR § 1.98(a) (3).
Intention to Grant received for European Patent Application No. 19172407.9, dated Feb. 11, 2021, 9 pages.
Invitation to Pay Search Fees received for European Patent Application No. 20722020.3, dated Feb. 16, 2021, 3 pages.
Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).

AppLivGames, ""Super Mario Run" Stickers for iMessage: Free Delivery Started!", Available online at: <https://games.app-liv.jp/archives/178627>, Sep. 13, 2016, 3 pages (Official Copy Only) (See Communication under 37 CFR § 1.98(a) (3)).
Contents Pocket, "Line Stamp Information", Available online at: <https://web.archive.org/web/20150404080541/http://contents-pocket.net/linestamp.html>, Apr. 2015, 2 pages (Official Copy Only) (See Communication under 37 CFR § 1.98(a) (3)).
Corrected Notice of Allowance received for U.S. Appl. No. 16/896,457, dated Feb. 24, 2021, 2 pages.
Non-Final Office Action received for U.S. Appl. No. 16/583,706, dated Mar. 4, 2021, 34 pages.
Notice of Allowance received for Korean Patent Application No. 10-2019-7005136, dated Feb. 19, 2021, 5 pages (2 pages of English Translation and 3 pages of Official Copy).
Office Action received for Australian Patent Application No. 2020201721, dated Feb. 26, 2021, 7 pages.
Office Action received for Chinese Patent Application No. 201910563974.3, dated Feb. 7, 2021, 7 pages (4 pages of English Translation and 3 pages of Official Copy).
Office Action received for Chinese Patent Application No. 201910691865.X, dated Feb. 4, 2021, 16 pages (9 pages of English Translation and 7 pages of Official Copy).
Office Action received for Indian Patent Application No. 201814036470, dated Feb. 26, 2021, 7 pages.
Office Action received for Japanese Patent Application No. 2019-215503, dated Feb. 5, 2021, 12 pages (6 pages of English Translation and 6 pages of Official Copy).
Office Action received for Korean Patent Application No. 10-2020-7032147, dated Feb. 16, 2021, 6 pages (2 pages of English Translation and 4 pages of Official Copy).
Advisory Action received for U.S. Appl. No. 13/082,035, dated Jun. 19, 2015, 5 pages.
Advisory Action received for U.S. Appl. No. 13/082,035, dated Oct. 23, 2013, 3 pages.
Ali et al., "Facial Expression Recognition Using Human to Animated-Character Expression Translation", Oct. 12, 2019, 8 pages.
Applicant Initiated Interview Summary received for U.S. Appl. No. 15/714,887, dated Aug. 19, 2020, 4 pages.
Applicant-Initiated Interview Summary received for U.S. Appl. No. 13/082,035, dated Apr. 4, 2013, 3 pages.
Applicant-Initiated Interview Summary received for U.S. Appl. No. 13/082,035, dated Aug. 1, 2016, 3 pages.
Applicant-Initiated Interview Summary received for U.S. Appl. No. 13/082,035, dated Jan. 29, 2015, 3 pages.
Applicant-Initiated Interview Summary received for U.S. Appl. No. 13/082,035, dated Oct. 30, 2013, 3 pages.
Applicant-Initiated Interview Summary received for U.S. Appl. No. 14/866,560, dated Jan. 30, 2019, 3 pages.
Applicant-Initiated Interview Summary received for U.S. Appl. No. 14/866,560, dated Jul. 26, 2018, 3 pages.
Applicant-Initiated Interview Summary received for U.S. Appl. No. 14/866,560, dated May 14, 2019, 4 pages.
Applicant-Initiated Interview Summary received for U.S. Appl. No. 14/866,560, dated Oct. 21, 2019, 3 pages.
Applicant-Initiated Interview Summary received for U.S. Appl. No. 16/582,500, dated Aug. 25, 2020, 5 pages.
Applicant-Initiated Interview Summary received for U.S. Appl. No. 16/583,706, dated Nov. 18, 2020, 7 pages.
Brief Communication Regarding Oral Proceedings received for European Patent Application No. 19172407.9, mailed on Nov. 9, 2020, 1 page.
Brief Communication Regarding Oral Proceedings received for European Patent Application No. 19172407.9, mailed on Nov. 20, 2020, 2 pages.
Carretero et al., "Preserving Avatar Genuineness in Different Display Media", Mobile Networks and Applications, Kluwer Academic Publishers, BO, vol. 13, No. 6, Jul. 15, 2008, pp. 627-634.
Corrected Notice of Allowance received for U.S. Appl. No. 15/940,017, dated Aug. 27, 2020, 2 pages.
Corrected Notice of Allowance received for U.S. Appl. No. 15/940,017, dated Oct. 21, 2020, 3 pages.

(56) References Cited

OTHER PUBLICATIONS

Corrected Notice of Allowance received for U.S. Appl. No. 16/676,087, dated Aug. 19, 2020, 2 pages.
Decision to Grant received for European Patent Application No. 18704335.1, dated Sep. 24, 2020, 2 pages.
Examiner's Answer to Appeal Brief received for U.S. Appl. No. 16/259,771, mailed on Oct. 23, 2020, 15 pages.
Extended European Search Report received for European Patent Application No. 20191533.7, dated Nov. 13, 2020, 8 pages.
Final Office Action received for U.S. Appl. No. 13/082,035, dated Apr. 16, 2015, 24 pages.
Final Office Action received for U.S. Appl. No. 13/082,035, dated Aug. 15, 2013, 24 pages.
Final Office Action received for U.S. Appl. No. 14/866,560, dated Oct. 9, 2018, 22 pages.
Final Office Action received for U.S. Appl. No. 15/714,887, dated Nov. 13, 2020, 60 pages.
Final Office Action received for U.S. Appl. No. 16/582,500, dated Nov. 30, 2020, 20 pages.
Gao et al., "Automatic Unpaired Shape Deformation Transfer", ACM Transactions on Graphics, Online available at: https://doi.org/10.1145/3272127.3275028, 2018, 11 pages.
Intention to Grant received for European Patent Application No. 17853654.6, dated Nov. 23, 2020, 8 pages.
International Preliminary Report on Patentability received for PCT Patent Application No. PCT/US2011/031616, dated Oct. 18, 2012, 6 pages.
International Preliminary Report on Patentability received for PCT Patent Application No. PCT/US2019/023793, dated Nov. 19, 2020, 12 pages.
International Preliminary Report on Patentability received for PCT Patent Application No. PCT/US2019/024067, dated Nov. 19, 2020, 12 pages.
International Search Report and Written Opinion received for PCT Patent Application No. PCT/US2011/031616, dated Aug. 30, 2011, 8 pages.
International Search Report and Written Opinion received for PCT Patent Application No. PCT/US2020/025913, dated Sep. 15, 2020, 19 pages.
Invitation to Pay Additional Fees received for PCT Patent Application No. PCT/US2020/025913, dated Jul. 24, 2020, 11 pages.
Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.
Non-Final Office Action received for U.S. Appl. No. 13/082,035, dated Apr. 21, 2016, 25 pages.
Non-Final Office Action received for U.S. Appl. No. 13/082,035, dated Dec. 19, 2012, 19 pages.
Non-Final Office Action received for U.S. Appl. No. 13/082,035, dated Sep. 11, 2014, 23 pages.
Non-Final Office Action received for U.S. Appl. No. 14/866,560, dated Apr. 19, 2018, 10 pages.
Non-Final Office Action received for U.S. Appl. No. 14/866,560, dated Apr. 30, 2019, 23 pages.
Non-Final Office Action received for U.S. Appl. No. 16/663,062, dated Oct. 28, 2020, 14 pages.
Notice of Acceptance received for Australian Patent Application No. 2019266049, dated Nov. 24, 2020, 3 pages.
Notice of Acceptance received for Australian Patent Application No. 2020213402, dated Sep. 21, 2020, 3 pages.
Notice of Allowance received for Chinese Patent Application No. 201880022585.3, dated Oct. 28, 2020, 6 pages (3 pages of English Translation and 3 pages of Official Copy).
Notice of Allowance received for Chinese Patent Application No. 201910278273.5, dated Nov. 19, 2020, 2 pages (1 page of English Translation and 1 page of Official Copy).
Notice of Allowance received for Chinese Patent Application No. 201910379481.4, dated Nov. 9, 2020, 6 pages (3 pages of English Translation and 3 pages of Official Copy).
Notice of Allowance received for Chinese Patent Application No. 201911219525.3, dated Sep. 29, 2020, 2 pages (1 page of English Translation and 1 page of Official Copy).
Notice of Allowance received for Korean Patent Application No. 10-2019-7005369, dated Oct. 26, 2020, 4 pages (1 page of English Translation and 3 pages of Official Copy).
Notice of Allowance received for U.S. Appl. No. 13/082,035, dated Oct. 5, 2016, 9 pages.
Notice of Allowance received for U.S. Appl. No. 14/866,560, dated Nov. 15, 2019, 9 pages.
Notice of Allowance received for U.S. Appl. No. 16/676,087, dated Oct. 21, 2020, 9 pages.
Office Action received for Australian Patent Application No. 2018269375, dated Sep. 7, 2020, 3 pages.
Office Action received for Australian Patent Application No. 2020101043, dated Aug. 14, 2020, 5 pages.
Office Action received for Australian Patent Application No. 2020101043, dated Oct. 30, 2020, 4 pages.
Office Action received for Chinese Patent Application No. 201880000798.6, dated Aug. 5, 2020, 18 pages (9 pages of English Translation and 9 pages of Official Copy).
Office Action received for Chinese Patent Application No. 201910692978.1, dated Nov. 4, 2020, 4 pages (1 page of English Translation and 3 pages of Official Copy).
Office Action received for Chinese Patent Application No. 201911202668.3, dated Aug. 4, 2020, 13 pages (7 pages of English Translation and 6 pages of Official Copy).
Office Action received for Chinese Patent Application No. 201911219525.3, dated Jul. 10, 2020, 7 pages (1 page of English Translation and 6 pages of Official Copy).
Office Action received for European Patent Application No. 18703184.4, dated Nov. 23, 2020, 8 pages.
Office Action received for European Patent Application No. 18732519.6, dated Oct. 6, 2020, 5 pages.
Office Action received for European Patent Application No. 19204230.7, dated Sep. 28, 2020, 6 pages.
Office Action received for Japanese Patent Application No. 2018-182607, dated Jul. 20, 2020, 5 pages (2 pages of English Translation and 3 pages of Official Copy).
Office Action received for Japanese Patent Application No. 2019-563408, dated Nov. 2, 2020, 4 pages (2 pages of English Translation and 2 pages of Official Copy).
Office Action received for Korean Patent Application No. 10-2019-7033634, dated Sep. 28, 2020, 15 pages (7 pages of English Translation and 8 pages of Official Copy).
Office Action received for Korean Patent Application No. 10-2020-7031855, dated Nov. 24, 2020, 6 pages (2 pages of English Translation and 4 pages of Official Copy).
Office Action received for Taiwanese Patent Application No. 100111887, dated Oct. 7, 2013, 23 pages (9 pages of English Translation and 14 pages of Official Copy).
Pumarola et al., "GANimation: Anatomically-aware Facial Animation from a Single Image", Proceedings of the European Conference on Computer Vision (ECCV), Jul. 24, 2018, 16 pages.
Pyun et al., "An Example-Based Approach for Facial Expression Cloning", SIGGRAPH Symposium on Computer Animation, The Eurographics Association (2003), 2003, 10 pages.
Result of Consultation received for European Patent Application No. 19172407.9, mailed on Nov. 5, 2020, 17 pages.
Result of Consultation received for European Patent Application No. 19204230.7, mailed on Nov. 16, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Result of Consultation received for European Patent Application No. 19181242.9, mailed on Dec. 1, 2020, 12 pages.
Zhang et al., "Facial Expression Retargeting from Human to Avatar Made Easy", IEEE Transactions on Visualization and Computer Graphics, Aug. 2020, 14 pages.

(56) References Cited

OTHER PUBLICATIONS

Zhao et al., "An Event-related Potential Comparison of Facial Expression Processing between Cartoon and Real Faces", Online available at https://www.biorxiv.org/content/10.1101/333898v2, Jun. 18, 2018, 31 pages.
Notice of Allowance received for Korean Patent Application No. 10-2020-7032147, dated May 12, 2021, 4 pages (1 page of English Translation and 3 pages of Official Copy).
Notice of Allowance received for U.S. Appl. No. 16/599,433, dated May 14, 2021, 11 pages.
Summons to Attend Oral Proceedings received for European Patent Application No. 19204230.7, mailed on May 25, 2021, 10 pages.
Applicant-Initiated Interview Summary received for U.S. Appl. No. 17/031,654, dated Feb. 1, 2021, 2 pages.
Non-Final Office Action received for U.S. Appl. No. 17/031,654, dated Nov. 19, 2020, 12 pages.
Non-Final Office Action received for U.S. Appl. No. 17/031,671, dated Apr. 30, 2021, 27 pages.
Non-Final Office Action received for U.S. Appl. No. 17/031,765, dated Jun. 28, 2021, 32 pages.
Notice of Acceptance received for Australian Patent Application No. 2020201721, dated Jul. 6, 2021, 3 pages.
Notice of Allowance received for U.S. Appl. No. 16/663,062, dated Jul. 13, 2021, 7 pages.
Notice of Allowance received for U.S. Appl. No. 17/031,654, dated Feb. 10, 2021, 9 pages.
Notice of Allowance received for U.S. Appl. No. 17/031,654, dated May 27, 2021, 8 pages.
Office Action received for Danish Patent Application No. PA202070624, dated Jun. 16, 2021, 5 pages.
Office Action received for Danish Patent Application No. PA202070625, dated Jun. 16, 2021, 3 pages.
Office Action received for Indian Patent Application No. 201814036472, dated Jul. 8, 2021, 8 pages.
Result of Consultation received for European Patent Application No. 19211833.9, mailed on Jul. 15, 2021, 3 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2020, 10 pages.
Search Report and Opinion received for Danish Patent Application No. PA202070625, dated Dec. 17, 2020, 9 pages.
Applicant Initiated Interview Summary received for U.S. Appl. No. 17/031,671, dated Aug. 2, 2021, 5 pages.
Corrected Notice of Allowance received for U.S. Appl. No. 16/663,062, dated Jul. 21, 2021, 2 pages.
Invitation to Pay Additional Fees received for PCT Patent Application No. PCT/US2021/031212, dated Jul. 28, 2021, 19 pages.
Notice of Acceptance received for Australian Patent Application No. 2018270420, dated Jul. 21, 2021, 3 pages.
Notice of Allowance received for Korean Patent Application No. 10-2021-7019525, dated Jul. 13, 2021, 5 pages (1 page of English Translation and 4 pages of Official Copy).
Office Action received for Australian Patent Application No. 2020239749, dated Jul. 16, 2021, 5 pages.
Office Action received for Chinese Patent Application No. 201880000798.6, dated Jul. 2, 2021, 15 pages (8 pages of English Translation and 7 pages of Official Copy).
Office Action received for Chinese Patent Application No. 201910691872.X, dated Jun. 23, 2021, 10 pages (5 pages of English Translation and 5 pages of Official Copy).
[B612] Addition of facial recognition bear/cat stamps and AR background function having moving sparkles or hearts, Available Online at: <URL, htpps://apptopi.jp/2017/01/22/b612>, Jan. 22, 2017, 11 pages.
Advisory Action received for U.S. Appl. No. 16/259,771, dated Feb. 26, 2020, 3 pages.
Advisory Action received for U.S. Appl. No. 16/259,771, dated Jul. 14, 2020, 6 pages.
Applicant Initiated Interview Summary received for U.S. Appl. No. 15/714,887, dated Mar. 17, 2020, 5 pages.
Applicant Initiated Interview Summary received for U.S. Appl. No. 15/940,017, dated Dec. 26, 2019, 5 pages.
Applicant Initiated Interview Summary received for U.S. Appl. No. 16/259,771, dated May 5, 2020, 10 pages.
Applicant-Initiated Interview Summary received for U.S. Appl. No. 15/940,017, dated Jun. 30, 2020, 5 pages.
Applicant-Initiated Interview Summary received for U.S. Appl. No. 16/519,850, dated Jun. 26, 2020, 4 pages.
Applicant-Initiated Interview Summary received for U.S. Appl. No. 16/583,706, dated Feb. 27, 2020, 6 pages.
Certificate of Examination received for Australian Patent Application No. 2019100420, dated Jul. 3, 2019, 2 pages.
Certificate of Examination received for Australian Patent Application No. 2019100497, dated Jul. 29, 2019, 2 pages.
Certificate of Examination received for Australian Patent Application No. 2019100794, dated Dec. 19, 2019, 2 pages.
Certificate of Examination received for Australian Patent Application No. 2019101019, dated Nov. 12, 2019, 2 pages.
Certificate of Examination received for Australian Patent Application No. 2019101667, dated Mar. 20, 2020, 2 pages.
Certificate of Examination received for Australian Patent Application No. 2020100189, dated May 12, 2020, 2 pages.
Certificate of Examination received for Australian Patent Application No. 2020100675, dated Jun. 30, 2020, 2 pages.
Certificate of Examination received for Australian Patent Application No. 2020101715, dated Oct. 6, 2020, 2 pages.
Corrected Notice of Allowance received for U.S. Appl. No. 15/713,490, dated May 1, 2019, 2 pages.
Corrected Notice of Allowance received for U.S. Appl. No. 15/981,754, dated Oct. 15, 2019, 2 pages.
Corrected Notice of Allowance received for U.S. Appl. No. 15/981,754, dated Oct. 24, 2019, 2 pages.
Corrected Notice of Allowance received for U.S. Appl. No. 16/142,288, dated Jul. 30, 2019, 5 pages.
Corrected Notice of Allowance received for U.S. Appl. No. 16/143,097, dated Nov. 8, 2019, 3 pages.
Corrected Notice of Allowance received for U.S. Appl. No. 16/519,850, dated Nov. 2, 2020, 5 pages.
Corrected Notice of Allowance received for U.S. Appl. No. 16/519,850, dated Sep. 8, 2020, 5 pages.
Corrected Notice of Allowance received for U.S. Appl. No. 16/582,570, dated Mar. 31, 2020, 2 pages.
Corrected Notice of Allowance received for U.S. Appl. No. 16/676,087, dated Aug. 3, 2020, 2 pages.
Corrected Notice of Allowance received for U.S. Appl. No. 16/676,087, dated Jul. 8, 2020, 2 pages.
Decision to Grant received for Danish Patent Application No. PA201770418, dated Oct. 25, 2019, 3 pages.
Decision to Grant received for Danish Patent Application No. PA201770419, dated Oct. 25, 2018, 2 pages.
Decision to Grant received for Danish Patent Application No. PA201770720, dated Aug. 8, 2019, 2 pages.
Decision to Grant received for Danish Patent Application No. PA201770721, dated Jun. 17, 2019, 2 pages.
Decision to Grant received for Danish Patent Application No. PA201870372, dated Jun. 17, 2020, 2 pages.
Decision to Grant received for Danish Patent Application No. PA201870375, dated Jul. 24, 2019, 2 pages.
Decision to Grant received for Danish Patent Application No. PA201870377, dated May 14, 2019, 2 pages.
Decision to Grant received for Danish Patent Application No. PA201870381, dated Oct. 14, 2019, 2 pages.
European Search Report received for European Patent Application No. 19172407.9, dated Oct. 9, 2019, 4 pages.
European Search Report received for European Patent Application No. 19181242.9, dated Nov. 27, 2019, 4 pages.
European Search Report received for European Patent Application No. 19186042.8, dated Sep. 12, 2019, 4 pages.
European Search Report received for European Patent Application No. 19211833.9, dated Jul. 1, 2020, 4 pages.

(56) References Cited

OTHER PUBLICATIONS

European Search Report received for European Patent Application No. 20168021.2, dated Jul. 8, 2020, 4 pages.
Extended European Search Report received for European Patent Application No. 17853654.6, dated Jul. 8, 2019, 9 pages.
Extended European Search Report received for European Patent Application No. 17853657.9, dated May 28, 2020, 9 pages.
Extended European Search Report received for European Patent Application No. 19204230.7, dated Feb. 21, 2020, 7 pages.
Extended European Search Report received for European Patent Application No. 19212057.4, dated Feb. 27, 2020, 8 pages.
Final Office Action received for U.S. Appl. No. 15/714,887, dated Nov. 15, 2019, 55 pages.
Final Office Action received for U.S. Appl. No. 15/870,195, dated Dec. 13, 2018, 27 pages.
Final Office Action received for U.S. Appl. No. 15/940,017, dated Apr. 15, 2020, 19 pages.
Final Office Action received for U.S. Appl. No. 15/940,017, dated Dec. 20, 2018, 17 pages.
Final Office Action received for U.S. Appl. No. 15/940,232, dated Jan. 10, 2019, 27 pages.
Final Office Action received for U.S. Appl. No. 16/116,221, dated Mar. 22, 2019, 35 pages.
Final Office Action received for U.S. Appl. No. 16/259,771, dated Nov. 18, 2019, 13 pages.
Final Office Action received for U.S. Appl. No. 16/583,706, dated Jun. 11, 2020, 31 pages.
"Here are Warez Files:Eve Online Character Creator", Online Available at: <http://theherearewarezfiles.blogspot.com/2014/03/eve-online-character-creator-download.html>, Mar. 3, 2014, 7 pages.
"How to Use MSQRD", Available Online at: <https://web.archive.org/web/20160505072814/https:/www.wikihow.com/Use-MSQRD>, May 5, 2016, 3 pages.
Intention to Grant received for Danish Patent Application No. PA201770418, dated Aug. 22, 2019, 2 pages.
Intention to Grant received for Danish Patent Application No. PA201770418, dated Nov. 16, 2018, 3 pages.
Intention to Grant received for Danish Patent Application No. PA201770419, dated Mar. 28, 2018, 2 pages.
Intention to Grant received for Danish Patent Application No. PA201770720, dated Apr. 4, 2019, 2 pages.
Intention to Grant received for Danish Patent Application No. PA201770720, dated Jun. 21, 2019, 2 pages.
Intention to Grant received for Danish Patent Application No. PA201770721, dated Apr. 4, 2019, 2 pages.
Intention to Grant received for Danish Patent Application No. PA201870372, dated Feb. 13, 2020, 2 pages.
Intention to Grant received for Danish Patent Application No. PA201870375, dated Jun. 3, 2019, 2 pages.
Intention to Grant received for Danish Patent Application No. PA201870375, dated Mar. 26, 2019, 2 pages.
Intention to Grant received for Danish Patent Application No. PA201870377, dated Mar. 26, 2019, 2 pages.
Intention to Grant received for Danish Patent Application No. PA201870381, dated Jul. 18, 2019, 2 pages.
Intention to grant received for European Patent Application No. 18704335.1, dated Apr. 17, 2020, 6 pages.
International Preliminary Report on Patentability received for PCT Patent Application No. PCT/US2018/014658, dated Nov. 28, 2019, 14 pages.
International Preliminary Report on Patentability received for PCT Patent Application No. PCT/US2018/014892, dated Nov. 28, 2019, 8 pages.
International Preliminary Report on Patentability received for PCT Patent Application No. PCT/US2017/049760, dated Apr. 4, 2019, 9 pages.
International Preliminary Report on Patentability received for PCT Patent Application No. PCT/US2017/049795, dated Apr. 4, 2019, 16 pages.
International Preliminary Report on Patentability received for PCT Patent Application No. PCT/US2018/033044, dated Nov. 28, 2019, 8 pages.
International Search Report and Written Opinion received for PCT Application No. PCT/US2017/049795, dated Dec. 27, 2017, 26 pages.
International Search Report and Written Opinion received for PCT Patent Application No. PCT/US17/49760, dated Jan. 19, 2018, 12 pages.
International Search Report and Written Opinion received for PCT Patent Application No. PCT/US2018/014658, dated Jun. 6, 2018, 20 pages.
International Search Report and Written Opinion received for PCT Patent Application No. PCT/US2018/014892, dated Mar. 7, 2018, 10 pages.
International Search Report and Written Opinion received for PCT Patent Application No. PCT/US2018/033044, dated Sep. 11, 2018, 13 pages.
International Search Report and Written Opinion received for PCT Patent Application No. PCT/US2019/023793, dated Aug. 27, 2019, 17 pages.
International Search Report and Written Opinion received for PCT Patent Application No. PCT/US2019/024067, dated Oct. 9, 2019, 18 pages.
International Search Report and Written Opinion received for PCT Patent Application No. PCT/US2020/14176, dated Mar. 26, 2020, 12 pages.
Invitation to Pay Addition Fees received for PCT Patent Application No. PCT/US2018/014658, dated Apr. 11, 2018, 14 pages.
Invitation to Pay Additional fees received for PCT Patent Application No. PCT/US17/49760, dated Nov. 21, 2017, 2 pages.
Invitation to Pay Additional Fees received for PCT Patent Application No. PCT/US2017/049795, dated Nov. 3, 2017, 3 pages.
Invitation to Pay Additional Fees received for PCT Patent Application No. PCT/US2019/023793, dated Jul. 5, 2019, 11 pages.
Invitation to Pay Additional Fees received for PCT Patent Application No. PCT/US2019/024067, dated Jul. 16, 2019, 13 pages.
Invitation to Pay Search Fees received for European Patent Application No. 19724959.2, dated Feb. 25, 2020, 3 pages.
Non-Final Office Action received for U.S. Appl. No. 15/714,887, dated May 27, 2020, 48 pages.
Non-Final Office Action received for U.S. Appl. No. 15/714,887, dated May 30, 2019, 47 pages.
Non-Final Office Action received for U.S. Appl. No. 15/940,017, dated Jun. 18, 2018, 15 pages.
Non-Final Office Action received for U.S. Appl. No. 15/940,017, dated Sep. 30, 2019, 16 pages.
Non-Final Office Action received for U.S. Appl. No. 15/940,232, dated Jun. 18, 2018, 23 pages.
Non-Final Office Action received for U.S. Appl. No. 16/035,419, dated Jan. 30, 2019, 24 pages.
Non-Final Office Action received for U.S. Appl. No. 16/116,221, dated Nov. 13, 2018, 27 pages.
Non-Final Office Action received for U.S. Appl. No. 16/142,288, dated Nov. 20, 2018, 15 pages.
Non-Final Office Action received for U.S. Appl. No. 16/142,305, dated Nov. 23, 2018, 32 pages.
Non-Final Office Action received for U.S. Appl. No. 16/142,328, dated Nov. 8, 2018, 18 pages.
Non-Final Office Action received for U.S. Appl. No. 16/143,097, dated Feb. 28, 2019, 17 pages.
Non-Final Office Action received for U.S. Appl. No. 16/259,771, dated May 8, 2019, 11 pages.
Non-Final Office Action received for U.S. Appl. No. 16/519,850, dated Mar. 23, 2020, 8 pages.
Non-Final Office Action received for U.S. Appl. No. 16/582,500, dated Jun. 2, 2020, 15 pages.
Non-Final Office Action received for U.S. Appl. No. 16/583,706, dated Jan. 10, 2020, 27 pages.
Non-Final Office Action received for U.S. Appl. No. 16/676,087, dated Apr. 9, 2020, 55 pages.
Non-Final Office Action received for U.S. Appl. No. 15/870,195, dated May 2, 2018, 22 pages.

(56) References Cited

OTHER PUBLICATIONS

Notice of Acceptance received for Australian Patent Application No. 2017330208, dated Nov. 28, 2019, 3 pages.
Notice of Acceptance received for Australian Patent Application No. 2017330212, dated Apr. 28, 2020, 3 pages.
Notice of Allowance received for Chinese Patent Application No. 201910692958.4, dated Jul. 21, 2020, 2 pages (1 page of English Translation and 1 page of Official Copy).
Notice of Allowance received for Japanese Patent Application No. 2018-184254, dated Jun. 15, 2020, 4 pages (1 page of English Translation and 3 pages of Official Copy).
Notice of Allowance received for Japanese Patent Application No. 2019-511767, dated Mar. 30, 2020, 4 pages (1 page of English Translation and 3 pages of Official Copy).
Notice of Allowance received for U.S. Appl. No. 15/713,490, dated Mar. 20, 2019, 15 pages.
Notice of Allowance received for U.S. Appl. No. 15/870,195, dated Sep. 23, 2019, 13 pages.
Notice of Allowance received for U.S. Appl. No. 15/940,017, dated Aug. 6, 2020, 10 pages.
Notice of Allowance received for U.S. Appl. No. 15/940,232, dated Jun. 4, 2019, 12 pages.
Notice of Allowance received for U.S. Appl. No. 15/981,754, dated Jul. 17, 2019, 15 pages.
Notice of Allowance received for U.S. Appl. No. 15/981,754, dated Sep. 18, 2019, 14 pages.
Notice of Allowance received for U.S. Appl. No. 16/035,419, dated May 24, 2019, 14 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/116,221, dated Nov. 22, 2019, 13 pages.
Notice of Allowance received for U.S. Appl. No. 16/116,221, dated Sep. 20, 2019, 13 pages.
Notice of Allowance received for U.S. Appl. No. 16/142,288, dated Jun. 24, 2019, 10 pages.
Notice of Allowance received for U.S. Appl. No. 16/142,288, dated Mar. 27, 2019, 9 pages.
Notice of Allowance received for U.S. Appl. No. 16/142,288, dated May 1, 2019, 4 pages.
Notice of Allowance received for U.S. Appl. No. 16/142,305, dated Apr. 3, 2019, 5 pages.
Notice of Allowance received for U.S. Appl. No. 16/142,305, dated May 1, 2019, 2 pages.
Notice of Allowance received for U.S. Appl. No. 16/142,328, dated Apr. 5, 2019, 7 pages.
Notice of Allowance received for U.S. Appl. No. 16/143,097, dated Aug. 29, 2019, 23 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/519,850, dated Aug. 26, 2020, 8 pages.
Notice of Allowance received for U.S. Appl. No. 16/582,570, dated Mar. 6, 2020, 28 pages.
Notice of Allowance received for U.S. Appl. No. 16/676,087, dated Jun. 19, 2020, 9 pages.
Office Action received for Australian Patent Application No. 2017330208, dated Jul. 25, 2019, 5 pages.
Office Action received for Australian Patent Application No. 2017330212, dated Feb. 21, 2020, 2 pages.
Office Action received for Australian Patent Application No. 2018269375, dated Jun. 19, 2020, 4 pages.
Office Action received for Australian Patent Application No. 2018270420, dated Jul. 21, 2020, 5 pages.
Office Action received for Australian Patent Application No. 2019100794, dated Oct. 3, 2019, 4 pages.
Office Action received for Australian Patent Application No. 2020100189, dated Apr. 1, 2020, 3 pages.
Office Action received for Chinese Patent Application No. 201780053143.0, dated May 22, 2020, 21 pages (11 pages of English Translation and 10 pages of Official Copy).
Office Action received for Chinese Patent Application No. 201880022585.3, dated May 22, 2020, 11 pages (6 pages of English Translation and 5 pages of Official Copy).
Office Action received for Chinese Patent Application No. 201910278273.5, dated Jan. 3, 2020, 17 pages (10 pages of English Translation and 7 pages of Official Copy).
Office Action received for Chinese Patent Application No. 201910278273.5, dated Jun. 9, 2020, 8 pages (5 pages of English Translation and 3 pages of Official Copy).
Office Action received for Chinese Patent Application No. 201910379481.4, dated Mar. 2, 2020, 18 pages (10 pages of English Translation and 8 pages of Official Copy).
Office Action received for Chinese Patent Application No. 201910563974.3, dated May 8, 2020, 18 pages (8 pages of English Translation and 10 pages of Official Copy).
Office Action received for Chinese Patent Application No. 201910691865.X, dated Jul. 8, 2020, 17 pages (8 pages of English Translation and 9 pages of Official Copy).
Office Action received for Chinese Patent Application No. 201910691872.X, dated Jun. 3, 2020, 10 pages (5 pages of English Translation and 5 pages of Official Copy).
Office Action received for Chinese Patent Application No. 201910692958.4, dated Mar. 19, 2020, 20 pages (9 pages of English Translation and 11 pages of Official Copy).
Office Action received for Chinese Patent Application No. 201910692978.1, dated Apr. 3, 2020, 19 pages (8 pages of English Translation and 11 pages of Official Copy).
Office Action received for Chinese Patent Application No. 201911199054.4, dated Jul. 3, 2020, 15 pages (9 pages of English Translation and 6 pages of Official Copy).
Office Action received for Danish Patent Application No. PA201770393, dated Dec. 12, 2018, 7 pages.
Office Action received for Danish Patent Application No. PA201770393, dated Jan. 31, 2020, 6 pages.
Office Action received for Danish Patent Application No. PA201770393, dated Jul. 11, 2019, 2 pages.
Office Action received for Danish Patent Application No. PA201770393, dated Mar. 19, 2018, 8 pages.
Office Action received for Danish Patent Application No. PA201770418, dated May 8, 2018, 3 pages.
Office Action received for Danish Patent Application No. PA201770419, dated Jan. 10, 2018, 4 pages.
Office Action received for Danish Patent Application No. PA201770720, dated Apr. 26, 2018, 3 pages.
Office Action received for Danish Patent Application No. PA201770720, dated Nov. 16, 2018, 3 pages.
Office Action received for Danish Patent Application No. PA201770720, dated Oct. 18, 2017, 8 pages.
Office Action received for Danish Patent Application No. PA201770721, dated Apr. 26, 2018, 3 pages.
Office Action received for Danish Patent Application No. PA201770721, dated Nov. 16, 2018, 3 Pages.
Office Action received for Danish Patent Application No. PA201770721, dated Oct. 19, 2017, 8 pages.
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 Pages.
Office Action received for Danish Patent Application No. PA201870368, dated Oct. 1, 2019, 6 pages.
Office Action received for Danish Patent Application No. PA201870372, dated Aug. 20, 2019, 2 pages.
Office Action received for Danish Patent Application No. PA201870372, dated Jan. 31, 2019, 4 pages.

(56) References Cited

OTHER PUBLICATIONS

Office Action received for Danish Patent Application No. PA201870374, dated Feb. 6, 2019, 5 pages.
Office Action received for Danish Patent Application No. PA201870374, dated Jun. 17, 2019, 5 pages.
Office Action received for Danish Patent Application No. PA201870375, dated Jan. 31, 2019, 4 pages.
Office Action received for Danish Patent Application No. PA201870377, dated Jan. 31, 2019, 4 pages.
Office Action received for Danish Patent Application No. PA201970530, dated Mar. 4, 2020, 4 pages.
Office Action received for Danish Patent Application No. PA201970531, dated Feb. 17, 2020, 3 pages.
Office Action received for European Patent Application No. 17853654.6, dated Mar. 23, 2020, 4 pages.
Office Action received for European Patent Application No. 18703184.4, dated May 6, 2020, 7 pages.
Office Action received for European Patent Application No. 18704335.1, dated Sep. 23, 2019, 7 pages.
Office Action received for European Patent Application No. 18732519.6, dated Apr. 24, 2020, 6 pages.
Office Action received for European Patent Application No. 19172407.9, dated Oct. 18, 2019, 7 pages.
Office Action received for European Patent Application No. 19181242.9, dated Dec. 6, 2019, 9 pages.
Office Action received for European Patent Application No. 19186042.8, dated May 12, 2020, 5 pages.
Office Action received for European Patent Application No. 19186042.8, dated Sep. 24, 2019, 6 pages.
Office Action received for European Patent Application No. 19211833.9, dated Jul. 13, 2020, 7 pages.
Office Action received for European Patent Application No. 19724959.2, dated Apr. 23, 2020, 10 pages.
Office Action received for European Patent Application No. 20168021.2, dated Jul. 22, 2020, 8 pages.
Office Action received for European Patent Application No. 18703184.4, dated Oct. 29, 2019, 6 pages.
Office Action received for Japanese Patent Application No. 2018-182607, dated Apr. 6, 2020, 6 pages (3 pages of English Translation and 3 pages of Official Copy).
Office Action received for Japanese Patent Application No. 2018-184254, dated Mar. 2, 2020, 8 pages (4 pages of English Translation and 4 pages of Official Copy).
Office Action received for Japanese Patent Application No. 2019-215503, dated Jul. 3, 2020, 12 pages (6 pages of English Translation and 6 pages of Official Copy).
Office Action received for Japanese Patent Application No. 2019-511975, dated Apr. 10, 2020, 6 pages (3 pages of English Translation and 3 pages of Official Copy).
Office Action received for Korean Patent Application No. 10-2019-7005136, dated Jan. 28, 2020, 5 pages (2 pages of English Translation and 3 pages of Official Copy).
Office Action received for Korean Patent Application No. 10-2019-7005369, dated Mar. 13, 2020, 12 pages (5 pages of English Translation and 7 pages of Official Copy).
Search Report and Opinion received for Danish Patent Application No. PA201770393, dated Jun. 21, 2017, 9 pages.
Search Report and Opinion received for Danish Patent Application No. PA201770418, dated Jun. 23, 2017, 8 pages.
Search Report and Opinion received for Danish Patent Application No. PA201770419, dated Jun. 19, 2017, 6 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870372, dated Sep. 14, 2018, 8 pages.
Search Report and Opinion received for Danish Patent Application No. PA201870372, dated Sep. 17, 2018, 10 pages.
Search Report and Opinion received for Danish Patent Application No. PA201870374, dated Aug. 27, 2018, 9 pages.
Search Report and Opinion received for Danish Patent Application No. PA201870375, dated Aug. 23, 2018, 8 pages.
Search Report and Opinion received for Danish Patent Application No. PA201870377, dated Sep. 4, 2018, 8 pages.
Search Report and Opinion received for Danish Patent Application No. PA201970530, dated Oct. 11, 2019, 8 pages.
Search Report and Opinion received for Danish Patent Application No. PA201970531, dated Oct. 11, 2019, 9 pages.
Search Report received for Danish Patent Application No. PA201870381, dated Sep. 13, 2018, 7 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Supplemental Notice of Allowance received for U.S. Appl. No. 15/713,490, dated May 30, 2019, 2 pages.
Supplemental Notice of Allowance received for U.S. Appl. No. 15/870,195, dated Nov. 14, 2019, 9 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
A Day in the Life of Mike, "#SnapChat Vs #Msqrd", Available Online at: <https://www.youtube.com/watch?v=vS_1mrWXmC8>, See especially 4:22-6:05, Mar. 9, 2016, 4 pages.
AKG Technical, "Mojipop app//Mozipop gif maker app//How to use mojipop app ;AKG Technical", Available online at: https://www.youtube.com/watch?v=_9pdQ3CpWA4, Feb. 4, 2019, 4 pages.
AndroidSlide, "Camera Zoom FX", Available at: <https://www.youtube.com/watch?v=AHmPn8y74wY>, Nov. 5, 2011, 3 pages.
Appes Stela, "Gif Me! Camera [Android] Video review by Stelapps", Available Online at: <https://www.youtube.com/watch?v=uae0xUucOyY>, Jul. 17, 2014, 3 pages.
AT&T Customer Care, "How to Access & Manage Contacts on Your Samsung Galaxy S9 I S9+ I AT&T Wireless", Online Available at: https://www.youtube.com/watch?v=nb4Zf9Xi5ZQ, Mar. 9, 2018, 8 pages.
Beyouravatar, "Faceshift studio tutorial part 4.8: tracking—fbx export", Available online at: https://www.youtube.com/watch?v=_yqmc9yzKLM, Nov. 19, 2012, 3 pages.
Bomen XYZ, "Cara membuat stikerdi android, WhatsApp, Fb Messenger dll II Work 100%", Available online at: https://www.youtube.com/watch?v=cafBfzD1Bbo, Feb. 21, 2019, 3 pages.
Canchichi, "Mii Creation", Online available at https://www.youtube.com/watch?v=bYm7IEYu42k, Jan. 16, 2007, 4 pages.
Chicaview, "What Is New! Make Funny GIFs Clips—Gif Me (Phone App)", Available online at: <https://www.youtube.com/watch?v=0LPGSFFP-V0>, See especially 1:15-2:25, Sep. 20, 2016, 3 pages.
EnterBrain, "No. 5 Create your own Avatar Mii Studio", vol. 26, No. 11, p. 138, Feb. 24, 2011, 4 pages.
FaceRig, "FaceRig Mobile Selfie Tip", Available online at: https://www.youtube.com/watch?v=x3DZHnXWZ3U, Oct. 18, 2016, 3 pages.
FaceRig, "FaceRig Mobile Tip: How to record with and without the camera feed", Available Online at: https://www.youtube.com/watch?v=lwk9FIWGvVM, Nov. 8, 2016, 3 pages.
Fedko Daria, "AR Hair Styles", Online Available at <https://www.youtube.com/watch?v=FrS6tHRbFE0>, Jan. 24, 2017, 2 pages.
FlatLineVertigo, "Black Desert Online:: Intro to Hair Customization", Online Available at: <https://www.youtube.com/watch?v=9MCbfd_eMEg>, Sep. 9, 2015, 3 pages.
Flyme Global, "Flyme 6—Setup Contact Avatar", Available online at: https://www.youtube.com/watch?v=HvmyZdovhEk, May 15, 2017, 3 pages.

(56) References Cited

OTHER PUBLICATIONS

Gardener Ricardo, "How to Create and Use AR Emoji Galaxy S10,S10 Plus", Available online at: https://www.youtube.com/watch?v=wNjgUQzFYto, May 9, 2019, 3 pages.
Gavin Brady, "Howto Remove Old User Account Pictures in Windows 10", Available online at: https://www.howtogeek.com/369601/how-to-remove-old-user-account-pictures-in-windows-10/, Oct. 16, 2018, 5 pages.
Giphy Inc. Communication, "Giphy Cam. The GIF Camera", Available at: <https://web.archive.org/web/20170309234909/https://play.google.com/store/apps/details?id=com.giphy.camera>, Mar. 9, 2017, pp. 1-3.
Holotech Studios Entertainment, "FaceRig", Available at: <https://web.archive.org/web/20161120090627/https://play.google.com/store/apps/details?id=com.holotech.facerig&hl=da>, Nov. 9, 2016, 3 pages.
ITJungles, "Samsung Galaxy S8: How to Assign a Photo to a Contact", Available online at: <https://www.youtube.com/watch?v=2ZdwxijxDzE>, Feb. 13, 2018, 3 pages.
ITJungles, "Samsung Galaxy S9: How to Add Stickers to Text Messages", Available online at: https://www.youtube.com/watch?v=ojGC_UMQds0, Jan. 22, 2019, 3 pages.
Jabbari Ibrahim, "How to set up Google Gboard's 'Mini' stickers", Available online at: https://www.youtube.com/watch?v=z_sWkctRr8Q, Aug. 30, 2018, 3 pages.
Koti Kotresh, "Colour with Asian Paints.A Mobail App by Android Application—2018", Available Online at <https://www.youtube.com/watch?v=M6EIO7ErYd0&feature=youtu.be&t=81 >, May 6, 2018, 2 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Kyoko Makino, "Howto Make a Lookalike Face Icon for Your Friend", ASCII, Japan Weekly, ASCII Media Works Inc., vol. 24, pp. 90-93, Jul. 17, 2014, 7 pages.
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Latest Technology, "How to Create Personalized Emojis on Gboard Using Your Selfies II Personal Emojis", Available online at: https://www.youtube.com/watch?v=udyom84oqqA, Nov. 1, 2018, 3 pages.
Mega Ninja, "Face rig review", Available online at : https://www.youtube.com/watch?v=8YqeeiEVkRg, Feb. 6, 2017, 3 pages.
Mitsuru Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages.
Nathan B Tech, "New Samsung SIO AR Emojis in Depth", Available online at: https://www.youtube.com/watch?v=xXeNSuNoEHc, Mar. 17, 2019, 4 pages.
NCCU DCT, "Faceshift", Available online at: https://www.youtube.com/watch?v=4Ph0_SP8tpA, Dec. 1, 2014, 3 pages.
Nineverything, "Making a Mii on Switch—all of the options", Online available at: https://www.youtube.com/watch?v=kUDPmbBK7ys, Feb. 23, 2017, 3 pages.
Opuni Kojo, "FaceShift Studio Demo", Available online at: https://www.youtube.com/watch?v=72ty7PYKwGU, Oct. 1, 2012, 3 pages.
PC World, "How to make AR Emojis on the Samsung Galaxy S9", You Tube, Available Online: https://www.youtube.com/watch?v=8wQICfulkz0, Feb. 25, 2018, 2 pages.
Sambrook Jade, "Video Selfie Filters with MSQRD for Facebook Live", Available Online at: <https://www.youtube.com/watch?v=JZrWK2NEFeg>, See especially 2:44-3:03, Jul. 2, 2016, 3 pages.
SlashGear, "Samsung AR Emoji demo on the Galaxy S9", Available Online at <https://www.youtube.com/watch?v=GQwNKzY4C9Y>, Feb. 25, 2018, 3 pages.

SpellBurst, "The SIMS 3: Create a SIM With Me | #2—Dark Fairy + Full CC List!", Available online at: <https://www.youtube.com/watch?v=Dy_5g9B-wkA>, Oct. 9, 2017, 2 pages.
StateofTech, "iPhone 6 Tips—How to Access the Camera from the Lock Screen", Screen captures with generated transcript from YouTube video clip, Online Available at: <https://www.youtube.com/watch?v=frB151RYB7U>, Jul. 2, 2015, 23 pages.
SwitchForce, "Nintendo Switch Mil Creation+ NEW Mii Options and Poses", Online Available at: https://www.youtube.com/watch?v=n4ZFuaf2k4M, Feb. 23, 2017, 8 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Ting, "Giphy Cam (iOS) | Ting Download", Available online at : https://www.youtube.com/watch?v=mykfBpyD3gg, Oct. 2, 2015, 3 pages.
Tsuchihashi et al., "Generation of Caricatures by Automatic Selection of Templates for Shapes and Placement of Facial Parts", Technical Report of the Institute of Image Information and Television Engineers, Japan, The Institute of Image Information and Television Engineers,vol. 33, No. 11, pp. 77-80., Feb. 8, 2009, 7 pages.
Twins Tornado, "New Tutorial: Add Facial Expressions to your Game Characters!", Available online at: https://www.youtube.com/watch?v=wKSjByNyaKA, Mar. 14, 2014, 4 pages.
Yom Mama, "SnapChat Tutorial For Beginners!", Available Online at: <https://www.youtube.com/watch?v=zUmj039NNOU>, See especially 6:55-7:22, Jun. 6, 2016, 3 pages.
Decision to Grant received for European Patent Application No. 19172407.9, dated Jun. 17, 2021, 2 pages.
Minutes of the Oral Proceedings received for European Patent Application No. 19724959.2, mailed on Jun. 14, 2021, 6 pages.
Notice of Allowance received for Chinese Patent Application No. 201910563974.3, dated Jun. 2, 2021, 2 pages (1 page of English Translation and 1 page of Official Copy).
Office Action received for Chinese Patent Application No. 201910691872.X, dated Mar. 24, 2021, 19 pages (9 pages of English Translation and 10 pages of Official Copy).
Office Action received for Chinese Patent Application No. 202010330318.1, dated Mar. 31, 2021, 13 pages (7 pages of English Translation and 6 pages of Official Copy).
Office Action received for Korean Patent Application No. 10-2019-7033799, dated Apr. 27, 2021, 9 pages (4 pages of English Translation and 5 pages of Official Copy).
Office Action received for Korean Patent Application No. 10-2021-7002582, dated Apr. 16, 2021, 13 pages (6 pages of English Translation and 7 pages of Official Copy).
Non-Final Office Action received for U.S. Appl. No. 16/833,436, dated Mar. 29, 2021, 27 pages.
Notice of Allowance received for U.S. Appl. No. 16/663,062, dated Mar. 24, 2021, 8 pages.
Office Action received for European Patent Application No. 19212057.4, dated Mar. 9, 2021, 6 pages.
Applicant-Initiated Interview Summary received for U.S. Appl. No. 16/599,433, dated Apr. 20, 2021, 7 pages.
Corrected Notice of Allowance received for U.S. Appl. No. 16/663,062, dated Apr. 14, 2021, 2 pages.
Decision to Grant received for European Patent Application No. 17853654.6, dated Apr. 15, 2021, 2 pages.
Intention to Grant received for European Patent Application No. 20168021.2, dated Apr. 15, 2021, 8 pages.
Office Action received for Australian Patent Application No. 2018270420, dated Apr. 19, 2021, 4 pages.
Office Action received for Chinese Patent Application No. 201911219517.9, dated Mar. 2, 2021, 20 pages (11 pages of English Translation and 9 pages of Official Copy).
Office Action received for Japanese Patent Application No. 2020-193703, dated Apr. 19, 2021, 4 pages (2 pages of English Translation and 2 pages of Official Copy).
Certificate of Examination received for Australian Patent Application No. 2020101043, dated Dec. 22, 2020, 2 pages.
Notice of Acceptance received for Australian Patent Application No. 2019265357, dated Dec. 24, 2020, 3 pages.

(56) References Cited

OTHER PUBLICATIONS

Office Action received for Australian Patent Application No. 2018270420, dated Jan. 7, 2021, 5 pages.
Examiner's Pre-Review Report received for Japanese Patent Application No. 2019-215503, dated Aug. 20, 2021, 15 pages (8 pages of English Translation and 7 pages of Official Copy).
Notice of Allowance received for U.S. Appl. No. 16/599,433, dated Oct. 4, 2021, 13 pages.
Office Action received for Chinese Patent Application No. 201780053143.0, dated Sep. 3, 2021, 24 pages (15 pages of English Translation and 9 pages of Official Copy).
Corrected Notice of Allowance received for U.S. Appl. No. 16/599,433, dated Oct. 14, 2021, 3 pages.
Applicant-Initiated Interview Summary received for U.S. Appl. No. 16/582,500, dated Dec. 27, 2021, 8 pages.
Notice of Allowance received for Korean Patent Application No. 10-2021-7023617, dated Dec. 21, 2021, 6 pages (2 pages of English Translation and 4 pages of Official Copy).
Office Action received for Australian Patent Application No. 2020294208, dated Dec. 17, 2021, 2 pages.
Office Action received for Chinese Patent Application No. 201910315328.5, dated Nov. 30, 2021, 21 pages (10 pages of English Translation and 11 pages of Official Copy).
Office Action received for Chinese Patent Application No. 201910691872.X, dated Nov. 10, 2021, 16 pages (9 pages of English Translation and 7 pages of Official Copy).
Office Action received for Japanese Patent Application No. 2020-159823, dated Dec. 23, 2021, 8 pages (4 pages of English Translation and 4 pages of Official Copy).
Applicant Initiated Interview Summary received for U.S. Appl. No. 17/031,671, dated Nov. 8, 2021, 5 pages.
Extended European Search Report received for European Patent Application No. 21166287.9, dated Nov. 5, 2021, 10 pages.
Final Office Action received for U.S. Appl. No. 17/031,765, dated Oct. 29, 2021, 34 pages.
Intention to Grant received for European Patent Application No. 19181242.9, dated Oct. 28, 2021, 16 pages.
International Search Report and Written Opinion received for PCT Patent Application No. PCT/US2021/031096, dated Oct. 13, 2021, 16 pages.
Invitation to Pay Additional Fees received for PCT Patent Application No. PCT/US2021/031096, dated Aug. 19, 2021, 8 pages.
Office Action received for Korean Patent Application No. 10-2021-7002582, dated Oct. 29, 2021, 6 pages (3 pages of English Translation and 3 pages of Official Copy).
Final Office Action received for U.S. Appl. No. 17/031,671, dated Sep. 7, 2021, 27 pages.
Office Action received for Chinese Patent Application No. 201910691865.X, dated Aug. 4, 2021, 10 pages (6 pages of English Translation and 4 pages of Official Copy).
Office Action received for Korean Patent Application No. 10-2021-7015473, dated Aug. 25, 2021, 5 pages (2 page of English Translation and 3 pages of Official Copy).
Applicant-Initiated Interview Summary received for U.S. Appl. No. 16/583,706, dated Aug. 9, 2021, 5 pages.
Corrected Notice of Allowance received for U.S. Appl. No. 16/599,433, dated Aug. 13, 2021, 5 pages.
Decision to Grant received for Japanese Patent Application No. 2020-193703, dated Aug. 10, 2021, 3 pages (1 page of English Translation and 2 pages of Official Copy).
International Preliminary Report on Patentability received for PCT Patent Application No. PCT/US2020/014176, dated Jul. 29, 2021, 9 pages.
Office Action received for Chinese Patent Application No. 202010330318.1, dated Jul. 13, 2021, 12 pages (6 pages of English Translation and 6 pages of Official Copy).
Office Action received for Indian Patent Application No. 201917046737, dated Aug. 9, 2021, 8 pages.
Record of Oral Hearing received for U.S. Appl. No. 16/259,771, mailed on Aug. 4, 2021, 15 pages.
Decision on Appeal received for U.S. Appl. No. 16/259,771, mailed on Aug. 19, 2021, 12 pages.
Decision to Grant received for Japanese Patent Application No. 2019-563408, dated Aug. 25, 2021, 3 pages (1 page of English Translation and 2 pages of Official Copy).
Examiner's Answer to Appeal Brief received for U.S. Appl. No. 15/714,887, dated Aug. 27, 2021, 23 pages.
Notice of Allowance received for Korean Patent Application No. 10-2019-7033634, dated Aug. 20, 2021, 4 pages (1 page of English Translation and 3 pages of Official Copy).
Office Action received for Danish Patent Application No. PA201970531, dated Aug. 13, 2021, 3 pages.
Office Action received for Danish Patent Application No. PA202070623, dated Aug. 24, 2021, 3 pages.
Applicant-Initiated Interview Summary received for U.S. Appl. No. 17/031,765, dated Sep. 22, 2021, 5 pages.
Final Office Action received for U.S. Appl. No. 16/833,436, dated Sep. 21, 2021, 29 pages.
Intention to Grant received for European Patent Application No. 20168021.2, dated on Sep. 20, 2021, 8 pages.
International Search Report and Written Opinion received for PCT Patent Application No. PCT/US2021/031212, dated Sep. 21, 2021, 21 pages.
Non-Final Office Action received for U.S. Appl. No. 16/582,500, dated Sep. 17, 2021, 18 pages.
Office Action received for Japanese Patent Application No. 2018-182607, dated Sep. 8, 2021, 7 pages (4 pages of English Translation and 3 pages of Official Copy).
Space-O Digicom Private Limited, "Tongue Piercing Booth—The Barbell Tongue Rings & Oral Piercings App", May 30, 2017, 5 pages.
Final Office Action received for U.S. Appl. No. 16/583,706, dated Nov. 18, 2021, 39 pages.
International Preliminary Report on Patentability received for PCT Patent Application No. PCT/US2020/025913, dated Nov. 18, 2021, 11 pages.
Notice of Allowance received for Japanese Patent Application No. 2020-120086, dated Nov. 15, 2021, 4 pages (1 page of English Translation and 3 pages of Official Copy).
Office Action received for Australian Patent Application No. 2021201681, dated Nov. 11, 2021, 4 pages.
Applicant-Initiated Interview Summary received for U.S. Appl. No. 17/031,765, dated Dec. 15, 2021, 4 pages.
Non-Final Office Action received for U.S. Appl. No. 17/093,408, dated Dec. 8, 2021, 37 pages.
Office Action received for European Patent Application No. 18703184.4, dated Dec. 14, 2021, 4 pages.
Office Action received for European Patent Application No. 19186042.8, dated Dec. 2, 2021, 5 pages.
Office Action received for Korean Patent Application No. 10-2019-7033799, dated Nov. 23, 2021, 6 pages (3 pages of English Translation and 3 pages of Official Copy).
TheUnlockr, "Galaxy Watch Complete Walkthrough: The Best Watch They've Made So Far", Available online at: https://www.youtube.com/watch?v=xiEClfe1SN4, Sep. 11, 2018, 27 pages.
Decision to Grant received for European Patent Application No. 20168021.2, dated Feb. 3, 2022, 2 pages.
Advisory Action received for U.S. Appl. No. 16/583,706, dated Mar. 21, 2022, 3 pages.
Applicant-Initiated Interview Summary received for U.S. Appl. No. 16/259,771, dated Apr. 18, 2022, 2 pages.
Applicant-Initiated Interview Summary received for U.S. Appl. No. 16/833,436, dated Jan. 27, 2022, 2 pages.
Applicant-Initiated Interview Summary received for U.S. Appl. No. 17/093,408, dated Mar. 1, 2022, 3 pages.
Applicant-Initiated Interview Summary received for U.S. Appl. No. 17/373,163, dated Apr. 11, 2022, 2 pages.
Decision on Appeal received for U.S. Appl. No. 15/714,887, dated Feb. 18, 2022, 14 pages.
Decision to Grant received for Japanese Patent Application No. 2018-182607, dated Apr. 13, 2022, 3 pages (1 page of English Translation and 2 pages of Official Copy).

(56) References Cited

OTHER PUBLICATIONS

Decision to Refuse received for European Patent Application No. 19204230.7, dated Feb. 4, 2022, 15 pages.
Examiner's Pre-Review Report received for Japanese Patent Application No. 2019-563560, dated Dec. 27, 2021,4 pages (2 pages of English Translation and 2 pages of Official Copy).
Minutes of the Oral Proceedings received for European Patent Application No. 19204230.7, dated Feb. 2, 2022, 9 pages.
Non-Final Office Action received for U.S. Appl. No. 16/259,771, dated Jan. 25, 2022, 20 pages.
Non-Final Office Action received for U.S. Appl. No. 17/031,671, dated Apr. 1, 2022, 32 pages.
Non-Final Office Action received for U.S. Appl. No. 17/031,765, dated Mar. 29, 2022, 33 pages.
Non-Final Office Action received for U.S. Appl. No. 17/220,752, dated Apr. 15, 2022, 21 pages.
Non-Final Office Action received for U.S. Appl. No. 17/373,163, dated Jan. 27, 2022, 14 pages.
Notice of Acceptance received for Australian Patent Application No. 2020294208, dated Mar. 2, 2022, 3 pages.
Notice of Acceptance received for Australian Patent Application No. 2021201681, dated Feb. 3, 2022, 3 pages.
Notice of Allowance received for Japanese Patent Application No. 2020-159825, dated Mar. 25, 2022, 5 pages (1 page of English Translation and 4 pages of Official Copy).
Notice of Allowance received for Korean Patent Application No. 10-2021-7015473, dated Feb. 24, 2022, 5 pages (1 page of English Translation and 4 pages of Official Copy).
Notice of Allowance received for Korean Patent Application No. 10-2021-7038284, dated Feb. 25, 2022, 5 pages (1 page of English Translation and 4 pages of Official Copy).
Notice of Allowance received for Korean Patent Application No. 10-2022-7002829, dated Feb. 12, 2022, 6 pages (1 page of English Translation and 5 pages of Official Copy).
Office Action received for Australian Patent Application No. 2020239749, dated Jan. 21, 2022, 4 pages.
Office Action received for Australian Patent Application No. 2021201295, dated Jan. 14, 2022, 3 pages.
Office Action received for Chinese Patent Application No. 201780053143.0, dated Dec. 16, 2021, 19 pages (10 pages of English Translation and 9 pages of Official Copy).
Office Action received for Chinese Patent Application No. 201880000798.6, dated Dec. 30, 2021, 10 pages (5 pages of English Translation and 5 pages of Official Copy).
Office Action received for Chinese Patent Application No. 201911219517.9, dated Jan. 19, 2022, 11 pages (6 pages of English Translation and 5 pages of Official Copy).
Office Action received for Chinese Patent Application No. 202110820692.4, dated Mar. 15, 2022, 18 pages (9 pages of English Translation and 9 pages of Official Copy).
Office Action received for Danish Patent Application No. PA202070624, dated Feb. 4, 2022, 4 pages.
Office Action received for Danish Patent Application No. PA202070625, dated Feb. 8, 2022, 2 pages.
Office Action received for Japanese Patent Application No. 2020-159824, dated Dec. 17, 2021, 13 pages (7 pages of English Translation and 6 pages of Official Copy).
Office Action received for Japanese Patent Application No. 2020-159825, dated Dec. 10, 2021, 4 pages (2 pages of English Translation and 2 pages of Official Copy).
Office Action received for Japanese Patent Application No. 2021-001028, dated Jan. 31, 2022, 10 pages (5 pages of English Translation and 5 pages of Official Copy).
Office Action received for Japanese Patent Application No. 2021-092483, dated Apr. 1, 2022, 8 pages (4 pages of English Translation and 4 pages of Official Copy).
Office Action received for Korean Patent Application No. 10-2022-7004578, dated Mar. 22, 2022, 11 pages (5 pages of English Translation and 6 pages of Official Copy).
Record of Oral Hearing received for U.S. Appl. No. 15/714,887, dated Feb. 15, 2022, 16 pages.
ILOVEX,""Stripe Generator", a tool that makes it easy to create striped materials", Online available at: https://www.ilovex.co.jp/blog/system/webconsulting/stripe-generator.html, May 2, 2012, 3 pages (Official Copy Only) See Communication under 37 CFR § 1.98(a) (3)s.
ILOVEX,""Stripe Generator", a tool that makes it easy to create striped materials", Online available at: https://www.ilovex.co.jp/blog/system/webconsulting/stripe-generator.html, May 2, 2012, 3 pages.
Final Office Action received for U.S. Appl. No. 16/582,500, dated Apr. 29, 2022, 23 pages.
Notice of Allowance received for U.S. Appl. No. 17/373,163, dated May 11, 2022, 8 pages.
Office Action received for Chinese Patent Application No. 201780053143.0, dated Mar. 30, 2022, 12 pages (5 pages of English Translation and 7 pages of Official Copy).
Office Action received for Korean Patent Application No. 10-2022-7003364, dated Apr. 22, 2022, 14 pages (6 pages of English Translation and 8 pages of Official Copy).
MODESTNEKO,"Howto Use Facerig", Available Online at: https://www.youtube.com/watch?v=e25_nuRNIOM, Mar. 31, 2019, 4 pages.

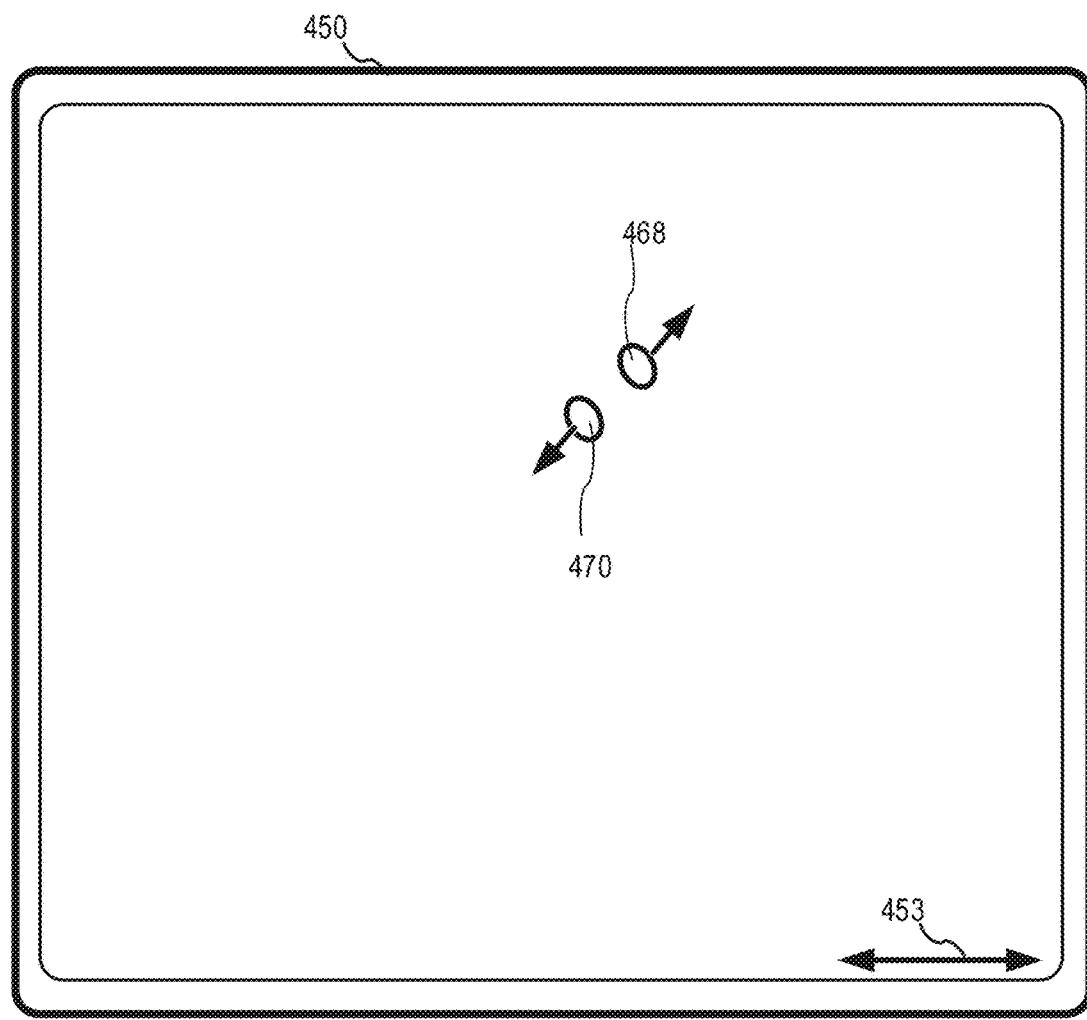
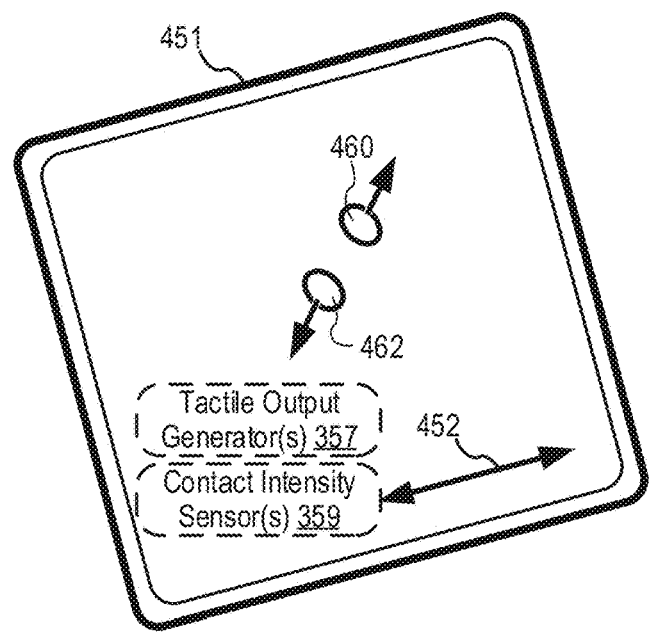
FIG. 4B

1000

1014
In response to detecting the input that corresponds to the first color adjustment control, modify the color of the respective feature from the second set of one or more colors to a modified version of the second set of one or more colors based on the second color.

1016
Display a second plurality of color options for a second feature.

1018
Detect a selection of a second color option of the second plurality of color options.

1020
In response to detecting the selection of the second color option:

1022
Change a color of the second feature to the second color option.

1024
Display a second color adjustment control for the second color option that corresponds to a third set of one or more colors.

1210
In response to detecting selection of the respective accessory option of the plurality of avatar accessory options, change an appearance of the avatar to include a representation of the respective accessory option, including, in accordance with a determination that the respective accessory option is a first accessory option:

1216
After displaying the representation of the first accessory option position on the avatar, detect selection of a second respective accessory option.

1218
In response to detecting the selection of the second respective accessory option of the plurality of avatar accessory options, change the appearance of the avatar to include a representation of the second respective accessory option and the representation of the respective accessory option.

1402
Display, via the display apparatus, a virtual avatar, having a plurality of avatar features, that changes appearance in response to detected changes in pose of a face in a field of view of the one or more cameras.

1404
While the face is detected in the field of view of the one or more cameras, the face including a plurality of detected facial features including a first facial feature other than a tongue of the user, detect movement of the first facial feature.

1406
In response to detecting movement of the first facial feature:

> 1408
> In accordance with a determination that the tongue of the user meets respective criteria wherein the respective criteria include a requirement that the tongue of the user is visible in order for the respective criteria to be met, display an avatar tongue and modify a position of the avatar tongue based on the movement of the first facial feature.
>
> 1410
> In accordance with a determination that the first facial feature moves in a first direction, modify the position of the avatar tongue in the first direction.
>
> 1412
> In accordance with a determination that the first facial feature moves in a second direction different from the first direction, modifying the position of the avatar tongue in the second direction.

1414
In accordance with a determination that the tongue of the user does not meet the respective criteria, forgo displaying the avatar tongue.

1408
In accordance with a determination that the tongue of the user meets respective criteria wherein the respective criteria include a requirement that the tongue of the user is visible in order for the respective criteria to be met, display an avatar tongue and modify a position of the avatar tongue based on the movement of the first facial feature.

1416
While the avatar tongue is displayed, detect that the tongue of the user no longer meets the respective criteria.

1418
In response to detecting that the tongue of the user no longer meets the respective criteria, cease to display the avatar tongue.

FIG. 14B

AVATAR CREATION USER INTERFACE

CROSS-REFERENCE TO RELATED APPLICATIONS

This application is a continuation of U.S. application Ser. No. 16/519,850, filed Jul. 23, 2019, and entitled "Avatar Creation User Interface," which is a continuation of U.S. application Ser. No. 16/142,288, filed Sep. 26, 2018, and entitled "Avatar Creation User Interface," which claims the benefit of U.S. Provisional Application No. 62/668,200, filed May 7, 2018, and entitled "Avatar Creation User Interface," and the benefit of U.S. Provisional Application No. 62/679,950, filed Jun. 3, 2018, and entitled "Avatar Creation User Interface," the contents of which are hereby incorporated by reference in their entirety.

FIELD

The present disclosure relates generally to computer user interfaces, and more specifically to techniques for creating and editing avatars.

BACKGROUND

Avatars are used to represent the users of electronic devices. The avatars can represent the appearance of a user or can represent an idealized or completely fictional representation of the user. Avatars can then be associated with a user so that the appearance of the avatar to others triggers an association or link with the user. Avatars can be created and edited for such use, including use in multimedia communications.

BRIEF SUMMARY

Some techniques for creating and editing avatars using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for creating and editing avatars. Such methods and interfaces optionally complement or replace other methods for creating avatars. Such methods and interfaces reduce the cognitive burden on a user and produce a more efficient human-machine interface. For battery-operated computing devices, such methods and interfaces conserve power and increase the time between battery charges.

A method is described. The method is performed at an electronic device having a display apparatus and one or more input devices. The method comprises: displaying, via the display apparatus, an avatar navigation user interface, the avatar navigation user interface including an avatar; while the avatar navigation user interface is displayed, detecting a gesture, via the one or more input devices directed to the avatar navigation user interface; and in response to detecting the gesture: in accordance with a determination that the gesture is in a first direction, displaying an avatar of a first type in the avatar navigation user interface; and in accordance with a determination that the gesture is in a second direction opposite the first direction, displaying an avatar of a second type different from the first type in the avatar navigation user interface.

A non-transitory computer-readable storage medium is described. The non-transitory computer-readable storage medium stores one or more programs configured to be executed by one or more processors of an electronic device with a display apparatus and one or more input devices. The one or more programs including instructions for: displaying, via the display apparatus, an avatar navigation user interface, the avatar navigation user interface including an avatar; while the avatar navigation user interface is displayed, detecting a gesture, via the one or more input devices directed to the avatar navigation user interface; and in response to detecting the gesture: in accordance with a determination that the gesture is in a first direction, displaying an avatar of a first type in the avatar navigation user interface; and in accordance with a determination that the gesture is in a second direction opposite the first direction, displaying an avatar of a second type different from the first type in the avatar navigation user interface.

A transitory computer-readable storage medium is described. The transitory computer-readable storage medium stores one or more programs configured to be executed by one or more processors of an electronic device with a display apparatus and one or more input devices. The one or more programs including instructions for: displaying, via the display apparatus, an avatar navigation user interface, the avatar navigation user interface including an avatar; while the avatar navigation user interface is displayed, detecting a gesture, via the one or more input devices directed to the avatar navigation user interface; and in response to detecting the gesture: in accordance with a determination that the gesture is in a first direction, displaying an avatar of a first type in the avatar navigation user interface; and in accordance with a determination that the gesture is in a second direction opposite the first direction, displaying an avatar of a second type different from the first type in the avatar navigation user interface.

An electronic device is described. The electronic device comprises: a display apparatus; one or more input devices; one or more processors; and memory storing one or more programs configured to be executed by the one or more processors, the one or more programs including instructions for: displaying, via the display apparatus, an avatar navigation user interface, the avatar navigation user interface including an avatar; while the avatar navigation user interface is displayed, detecting a gesture, via the one or more input devices directed to the avatar navigation user interface; and in response to detecting the gesture: in accordance with a determination that the gesture is in a first direction, displaying an avatar of a first type in the avatar navigation user interface; and in accordance with a determination that the gesture is in a second direction opposite the first direction, displaying an avatar of a second type different from the first type in the avatar navigation user interface.

An electronic device is described. The electronic device comprises: a display apparatus; one or more input devices; means for displaying, via the display apparatus, an avatar navigation user interface, the avatar navigation user interface including an avatar; means, while the avatar navigation user interface is displayed, for detecting a gesture, via the one or more input devices directed to the avatar navigation user interface; and means, responsive to detecting the gesture, for: in accordance with a determination that the gesture is in a first direction, displaying an avatar of a first type in the avatar navigation user interface; and in accordance with a determination that the gesture is in a second direction opposite the first direction, displaying an avatar of a second type different from the first type in the avatar navigation user interface.

A method is described. The method is performed at an electronic device having a display apparatus. The method comprises: displaying, via the display apparatus, an avatar editing user interface that includes concurrently displaying: an avatar having a plurality of avatar features; a first option selection region for a respective avatar feature including a first set of feature options corresponding to a set of candidate values for a first characteristic of the respective avatar feature; and a second option selection region for the respective avatar feature including a second set of feature options corresponding to a set of candidate values for a second characteristic of the respective avatar feature, wherein the second characteristic of the respective avatar feature is different from the first characteristic of the respective avatar feature; and in response to detecting a selection of one of the feature options in the first set of feature options, changing an appearance of at least one of the second set of feature options from a first appearance to a second appearance.

A non-transitory computer-readable storage medium is described. The non-transitory computer-readable storage medium stores one or more programs configured to be executed by one or more processors of an electronic device with a display apparatus, the one or more programs including instructions for: displaying, via the display apparatus, an avatar editing user interface that includes concurrently displaying: an avatar having a plurality of avatar features; a first option selection region for a respective avatar feature including a first set of feature options corresponding to a set of candidate values for a first characteristic of the respective avatar feature; and a second option selection region for the respective avatar feature including a second set of feature options corresponding to a set of candidate values for a second characteristic of the respective avatar feature, wherein the second characteristic of the respective avatar feature is different from the first characteristic of the respective avatar feature; and in response to detecting a selection of one of the feature options in the first set of feature options, changing an appearance of at least one of the second set of feature options from a first appearance to a second appearance.

A transitory computer-readable storage medium is described. The transitory computer-readable storage medium stores one or more programs configured to be executed by one or more processors of an electronic device with a display apparatus, the one or more programs including instructions for: displaying, via the display apparatus, an avatar editing user interface that includes concurrently displaying: an avatar having a plurality of avatar features; a first option selection region for a respective avatar feature including a first set of feature options corresponding to a set of candidate values for a first characteristic of the respective avatar feature; and a second option selection region for the respective avatar feature including a second set of feature options corresponding to a set of candidate values for a second characteristic of the respective avatar feature, wherein the second characteristic of the respective avatar feature is different from the first characteristic of the respective avatar feature; and in response to detecting a selection of one of the feature options in the first set of feature options, changing an appearance of at least one of the second set of feature options from a first appearance to a second appearance.

An electronic device is described. The electronic device comprises: a display apparatus; one or more processors; and memory storing one or more programs configured to be executed by the one or more processors, the one or more programs including instructions for: displaying, via the display apparatus, an avatar editing user interface that includes concurrently displaying: an avatar having a plurality of avatar features; a first option selection region for a respective avatar feature including a first set of feature options corresponding to a set of candidate values for a first characteristic of the respective avatar feature; and a second option selection region for the respective avatar feature including a second set of feature options corresponding to a set of candidate values for a second characteristic of the respective avatar feature, wherein the second characteristic of the respective avatar feature is different from the first characteristic of the respective avatar feature; and in response to detecting a selection of one of the feature options in the first set of feature options, changing an appearance of at least one of the second set of feature options from a first appearance to a second appearance.

An electronic device is described. The electronic device comprises: a display apparatus; means for displaying, via the display apparatus, an avatar editing user interface that includes concurrently displaying: an avatar having a plurality of avatar features; a first option selection region for a respective avatar feature including a first set of feature options corresponding to a set of candidate values for a first characteristic of the respective avatar feature; and a second option selection region for the respective avatar feature including a second set of feature options corresponding to a set of candidate values for a second characteristic of the respective avatar feature, wherein the second characteristic of the respective avatar feature is different from the first characteristic of the respective avatar feature; and means, responsive to detecting a selection of one of the feature options in the first set of feature options, for changing an appearance of at least one of the second set of feature options from a first appearance to a second appearance.

A method is described. The method is performed at an electronic device having a display apparatus. The method comprises: displaying, via the display apparatus: a user interface object including a respective feature having a first set of one or more colors; and a plurality of color options for the respective feature; detecting a selection of a color option of the plurality of color options that corresponds to a second color; in response to detecting the selection: changing the color of the respective feature to the color option; and displaying a first color adjustment control for the color option that corresponds to a second set of one or more colors; while the respective feature of the user interface object has the second set of one or more colors, detecting an input that corresponds to the first color adjustment control; and in response to detecting the input that corresponds to the first color adjustment control, modifying the color of the respective feature from the second set of one or more colors to a modified version of the second set of one or more colors based on the second color.

A non-transitory computer-readable storage medium is described. The non-transitory computer-readable storage medium stores one or more programs configured to be executed by one or more processors of an electronic device with a display apparatus, the one or more programs including instructions for: displaying, via the display apparatus: a user interface object including a respective feature having a first set of one or more colors; and a plurality of color options for the respective feature; detecting a selection of a color option of the plurality of color options that corresponds to a second color; in response to detecting the selection: changing the color of the respective feature to the color option; and displaying a first color adjustment control for the color option that corresponds to a second set of one or more colors; while the respective feature of the user interface object has the second set of one or more colors, detecting an input that corresponds to the first color adjustment control; and in response to detecting the input that corresponds to the first color adjustment control, modifying the color of the respective feature from the second set of one or more colors to a modified version of the second set of one or more colors based on the second color.

A transitory computer-readable storage medium is described. The transitory computer-readable storage medium stores one or more programs configured to be executed by one or more processors of an electronic device with a display apparatus, the one or more programs including instructions for: displaying, via the display apparatus: a user interface object including a respective feature having a first set of one or more colors; and a plurality of color options for the respective feature; detecting a selection of a color option of the plurality of color options that corresponds to a second color; in response to detecting the selection: changing the color of the respective feature to the color option; and displaying a first color adjustment control for the color option that corresponds to a second set of one or more colors; while the respective feature of the user interface object has the second set of one or more colors, detecting an input that corresponds to the first color adjustment control; and in response to detecting the input that corresponds to the first color adjustment control, modifying the color of the respective feature from the second set of one or more colors to a modified version of the second set of one or more colors based on the second color.

An electronic device is described. The electronic device comprises: a display apparatus; one or more processors; and memory storing one or more programs configured to be executed by the one or more processors, the one or more programs including instructions for: displaying, via the display apparatus: a user interface object including a respective feature having a first set of one or more colors; and a plurality of color options for the respective feature; detecting a selection of a color option of the plurality of color options that corresponds to a second color; in response to detecting the selection: changing the color of the respective feature to the color option; and displaying a first color adjustment control for the color option that corresponds to a second set of one or more colors; while the respective feature of the user interface object has the second set of one or more colors, detecting an input that corresponds to the first color adjustment control; and in response to detecting the input that corresponds to the first color adjustment control, modifying the color of the respective feature from the second set of one or more colors to a modified version of the second set of one or more colors based on the second color.

An electronic device is described. The electronic device comprises: a display apparatus; and means for displaying, via the display apparatus: a user interface object including a respective feature having a first set of one or more colors; and a plurality of color options for the respective feature; means for detecting a selection of a color option of the plurality of color options that corresponds to a second color; in response to detecting the selection: means for changing the color of the respective feature to the color option; and means for displaying a first color adjustment control for the color option that corresponds to a second set of one or more colors; means for while the respective feature of the user interface object has the second set of one or more colors, detecting an input that corresponds to the first color adjustment control; and means for in response to detecting the input that corresponds to the first color adjustment control, modifying the color of the respective feature from the second set of one or more colors to a modified version of the second set of one or more colors based on the second color.

A method is described. The method is performed at an electronic device having a display apparatus. The method comprises: displaying, via the display apparatus, an avatar editing user interface that includes displaying: an avatar having a plurality of avatar features including a first avatar feature having a first set of one or more colors and a second avatar feature having a set of one or more colors based on the first set of one or more colors and different from the first set of one or more colors; and a plurality of color options corresponding to the first avatar feature; detecting selection of a respective color option of the plurality of color options; and in response to detecting selection of the respective color option of the plurality of color options of the first avatar feature, in accordance with a determination that the respective color option corresponds to a second set of one or more colors, updating an appearance of the avatar, including: changing the first avatar feature to the second set of one or more colors; and changing the second avatar feature to a set of one or more colors based on the second set of one or more colors and different from the second set of one or more colors.

A non-transitory computer-readable storage medium is described. The non-transitory computer-readable storage medium stores one or more programs configured to be executed by one or more processors of an electronic device with a display apparatus, the one or more programs including instructions for: displaying, via the display apparatus, an avatar editing user interface that includes displaying: an avatar having a plurality of avatar features including a first avatar feature having a first set of one or more colors and a second avatar feature having a set of one or more colors based on the first set of one or more colors and different from the first set of one or more colors; and a plurality of color options corresponding to the first avatar feature; detecting selection of a respective color option of the plurality of color options; and in response to detecting selection of the respective color option of the plurality of color options of the first avatar feature, in accordance with a determination that the respective color option corresponds to a second set of one or more colors, updating an appearance of the avatar, including: changing the first avatar feature to the second set of one or more colors; and changing the second avatar feature to a set of one or more colors based on the second set of one or more colors and different from the second set of one or more colors.

A transitory computer-readable storage medium is described. The transitory computer-readable storage medium stores one or more programs configured to be executed by one or more processors of an electronic device with a display apparatus, the one or more programs including instructions for: displaying, via the display apparatus, an avatar editing user interface that includes displaying: an avatar having a plurality of avatar features including a first avatar feature having a first set of one or more colors and a second avatar feature having a set of one or more colors based on the first set of one or more colors and different from the first set of one or more colors; and a plurality of color options corresponding to the first avatar feature; detecting selection of a respective color option of the plurality of color options; and in response to detecting selection of the respective color option of the plurality of color options of the first avatar feature, in accordance with a determination that the respective color option corresponds to a second set of one or more colors, updating an appearance of the avatar, including: changing the first avatar feature to the second set of one or more colors; and changing the second avatar feature to a set of one or more colors based on the second set of one or more colors and different from the second set of one or more colors.

An electronic device is described. The electronic device comprises: a display apparatus; one or more processors; and memory storing one or more programs configured to be executed by the one or more processors, the one or more programs including instructions for: displaying, via the display apparatus, an avatar editing user interface that includes displaying: an avatar having a plurality of avatar features including a first avatar feature having a first set of one or more colors and a second avatar feature having a set of one or more colors based on the first set of one or more colors and different from the first set of one or more colors; and a plurality of color options corresponding to the first avatar feature; detecting selection of a respective color option of the plurality of color options; and in response to detecting selection of the respective color option of the plurality of color options of the first avatar feature, in accordance with a determination that the respective color option corresponds to a second set of one or more colors, updating an appearance of the avatar, including: changing the first avatar feature to the second set of one or more colors; and changing the second avatar feature to a set of one or more colors based on the second set of one or more colors and different from the second set of one or more colors.

An electronic device is described. The electronic device comprises: a display apparatus; and means for displaying, via the display apparatus, an avatar editing user interface that includes displaying: an avatar having a plurality of avatar features including a first avatar feature having a first set of one or more colors and a second avatar feature having a set of one or more colors based on the first set of one or more colors and different from the first set of one or more colors; and a plurality of color options corresponding to the first avatar feature; means for detecting selection of a respective color option of the plurality of color options; and means for in response to detecting selection of the respective color option of the plurality of color options of the first avatar feature, in accordance with a determination that the respective color option corresponds to a second set of one or more colors, updating an appearance of the avatar, including: means for changing the first avatar feature to the second set of one or more colors; and means for changing the second avatar feature to a set of one or more colors based on the second set of one or more colors and different from the second set of one or more colors.

A method is described. The method is performed at an electronic device having a display apparatus. The method comprises: displaying, via the display apparatus, an avatar editing user interface that includes displaying: an avatar having a plurality of avatar features including avatar hair having a selected avatar hairstyle; and a plurality of avatar accessory options; detecting selection of a respective accessory option; and in response to detecting the selection of the respective accessory option of the plurality of avatar accessory options, changing an appearance of the avatar to include a representation of the respective accessory option, including, in accordance with a determination that the respective accessory option is a first accessory option: displaying the representation of the first accessory option positioned on the avatar; and modifying a geometry of a first portion of the avatar hair based on the position of the representation of the first accessory option on the avatar, while maintaining the selected avatar hairstyle.

A non-transitory computer-readable storage medium is described. The non-transitory computer-readable storage medium stores one or more programs configured to be executed by one or more processors of an electronic device with a display apparatus, the one or more programs including instructions for: an avatar having a plurality of avatar features including avatar hair having a selected avatar hairstyle; and a plurality of avatar accessory options; detecting selection of a respective accessory option; and in response to detecting the selection of the respective accessory option of the plurality of avatar accessory options, changing an appearance of the avatar to include a representation of the respective accessory option, including, in accordance with a determination that the respective accessory option is a first accessory option: displaying the representation of the first accessory option positioned on the avatar; and modifying a geometry of a first portion of the avatar hair based on the position of the representation of the first accessory option on the avatar, while maintaining the selected avatar hairstyle.

A transitory computer-readable storage medium is described. The transitory computer-readable storage medium stores one or more programs configured to be executed by one or more processors of an electronic device with a display apparatus, the one or more programs including instructions for: an avatar having a plurality of avatar features including avatar hair having a selected avatar hairstyle; and a plurality of avatar accessory options; detecting selection of a respective accessory option; and in response to detecting the selection of the respective accessory option of the plurality of avatar accessory options, changing an appearance of the avatar to include a representation of the respective accessory option, including, in accordance with a determination that the respective accessory option is a first accessory option: displaying the representation of the first accessory option positioned on the avatar; and modifying a geometry of a first portion of the avatar hair based on the position of the representation of the first accessory option on the avatar, while maintaining the selected avatar hairstyle.

An electronic device is described. The electronic device comprises: a display apparatus; one or more processors; and memory storing one or more programs configured to be executed by the one or more processors, the one or more programs including instructions for: an avatar having a plurality of avatar features including avatar hair having a selected avatar hairstyle; and a plurality of avatar accessory options; detecting selection of a respective accessory option; and in response to detecting the selection of the respective accessory option of the plurality of avatar accessory options, changing an appearance of the avatar to include a representation of the respective accessory option, including, in accordance with a determination that the respective accessory option is a first accessory option: displaying the representation of the first accessory option positioned on the avatar; and modifying a geometry of a first portion of the avatar hair based on the position of the representation of the first accessory option on the avatar, while maintaining the selected avatar hairstyle.

An electronic device is described. The electronic device comprises: a display apparatus; and means for displaying, via the display apparatus, an avatar editing user interface that includes displaying: an avatar having a plurality of avatar features including avatar hair having a selected avatar hairstyle; and a plurality of avatar accessory options; means for detecting selection of a respective accessory option; and means for in response to detecting the selection of the respective accessory option of the plurality of avatar accessory options, changing an appearance of the avatar to include a representation of the respective accessory option, including, in accordance with a determination that the respective accessory option is a first accessory option: means for displaying the representation of the first accessory option positioned on the avatar; and means for modifying a geometry of a first portion of the avatar hair based on the position of the representation of the first accessory option on the avatar, while maintaining the selected avatar hairstyle.

A method is described. The method is performed at an electronic device having one or more cameras and a display apparatus. The method comprises: displaying, via the display apparatus, a virtual avatar, having a plurality of avatar features, that changes appearance in response to detected changes in pose of a face in a field of view of the one or more cameras; while the face is detected in the field of view of the one or more cameras, the face including a plurality of detected facial features including a first facial feature other than a tongue of the user, detecting movement of the first facial feature; and in response to detecting movement of the first facial feature: in accordance with a determination that the tongue of the user meets respective criteria wherein the respective criteria include a requirement that the tongue of the user is visible in order for the respective criteria to be met, displaying an avatar tongue and modifying a position of the avatar tongue based on the movement of the first facial feature; and in accordance with a determination that the tongue of the user does not meet the respective criteria, forgoing displaying the avatar tongue.

A non-transitory computer-readable storage medium is described. The non-transitory computer-readable storage medium stores one or more programs configured to be executed by one or more processors of an electronic device with a display apparatus and one or more cameras, the one or more programs including instructions for: displaying, via the display apparatus, a virtual avatar, having a plurality of avatar features, that changes appearance in response to detected changes in pose of a face in a field of view of the one or more cameras; while the face is detected in the field of view of the one or more cameras, the face including a plurality of detected facial features including a first facial feature other than a tongue of the user, detecting movement of the first facial feature; and in response to detecting movement of the first facial feature: in accordance with a determination that the tongue of the user meets respective criteria wherein the respective criteria include a requirement that the tongue of the user is visible in order for the respective criteria to be met, displaying an avatar tongue and modifying a position of the avatar tongue based on the movement of the first facial feature; and in accordance with a determination that the tongue of the user does not meet the respective criteria, forgoing displaying the avatar tongue.

A transitory computer-readable storage medium is described. The transitory computer-readable storage medium stores one or more programs configured to be executed by one or more processors of an electronic device with a display apparatus and one or more cameras, the one or more programs including instructions for: displaying, via the display apparatus, a virtual avatar, having a plurality of avatar features, that changes appearance in response to detected changes in pose of a face in a field of view of the one or more cameras; while the face is detected in the field of view of the one or more cameras, the face including a plurality of detected facial features including a first facial feature other than a tongue of the user, detecting movement of the first facial feature; and in response to detecting movement of the first facial feature: in accordance with a determination that the tongue of the user meets respective criteria wherein the respective criteria include a requirement that the tongue of the user is visible in order for the respective criteria to be met, displaying an avatar tongue and modifying a position of the avatar tongue based on the movement of the first facial feature; and in accordance with a determination that the tongue of the user does not meet the respective criteria, forgoing displaying the avatar tongue.

An electronic device is described. The electronic device comprises: a display apparatus; one or more cameras; one or more processors; and memory storing one or more programs configured to be executed by the one or more processors, the one or more programs including instructions for: displaying, via the display apparatus, a virtual avatar, having a plurality of avatar features, that changes appearance in response to detected changes in pose of a face in a field of view of the one or more cameras; while the face is detected in the field of view of the one or more cameras, the face including a plurality of detected facial features including a first facial feature other than a tongue of the user, detecting movement of the first facial feature; and in response to detecting movement of the first facial feature: in accordance with a determination that the tongue of the user meets respective criteria wherein the respective criteria include a requirement that the tongue of the user is visible in order for the respective criteria to be met, displaying an avatar tongue and modifying a position of the avatar tongue based on the movement of the first facial feature; and in accordance with a determination that the tongue of the user does not meet the respective criteria, forgoing displaying the avatar tongue.

An electronic device is described. The electronic device comprises: a display apparatus; one or more cameras; and means for displaying, via the display apparatus, a virtual avatar, having a plurality of avatar features, that changes appearance in response to detected changes in pose of a face in a field of view of the one or more cameras; means for while the face is detected in the field of view of the one or more cameras, the face including a plurality of detected facial features including a first facial feature other than a tongue of the user, detecting movement of the first facial feature; and means for in response to detecting movement of the first facial feature: means for in accordance with a determination that the tongue of the user meets respective criteria wherein the respective criteria include a requirement that the tongue of the user is visible in order for the respective criteria to be met, displaying an avatar tongue and modifying a position of the avatar tongue based on the movement of the first facial feature; and means for in accordance with a determination that the tongue of the user does not meet the respective criteria, forgoing displaying the avatar tongue.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for creating and editing avatars, thereby increasing the effectiveness, efficiency, and user satisfaction with such devices. Such methods and interfaces may complement or replace other methods for creating and editing avatars.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 10A and 10B are a flow diagram illustrating a method for displaying an avatar editing user interface.

FIGS. 12A and 12B are a flow diagram illustrating a method for displaying an avatar editing user interface.

FIGS. 14A and 14B are a flow diagram illustrating a method for modifying an avatar in an avatar navigation user interface.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for creating and editing avatars. For example, while programs already exist for creating and editing avatars, these programs are inefficient and difficult to use compared to the techniques below, which allow a user to create and edit avatars to be as realistic or unrealistic as desired. Such techniques can reduce the cognitive burden on a user who creates and edits an avatar, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for creating and editing avatars.

Figure 6A:
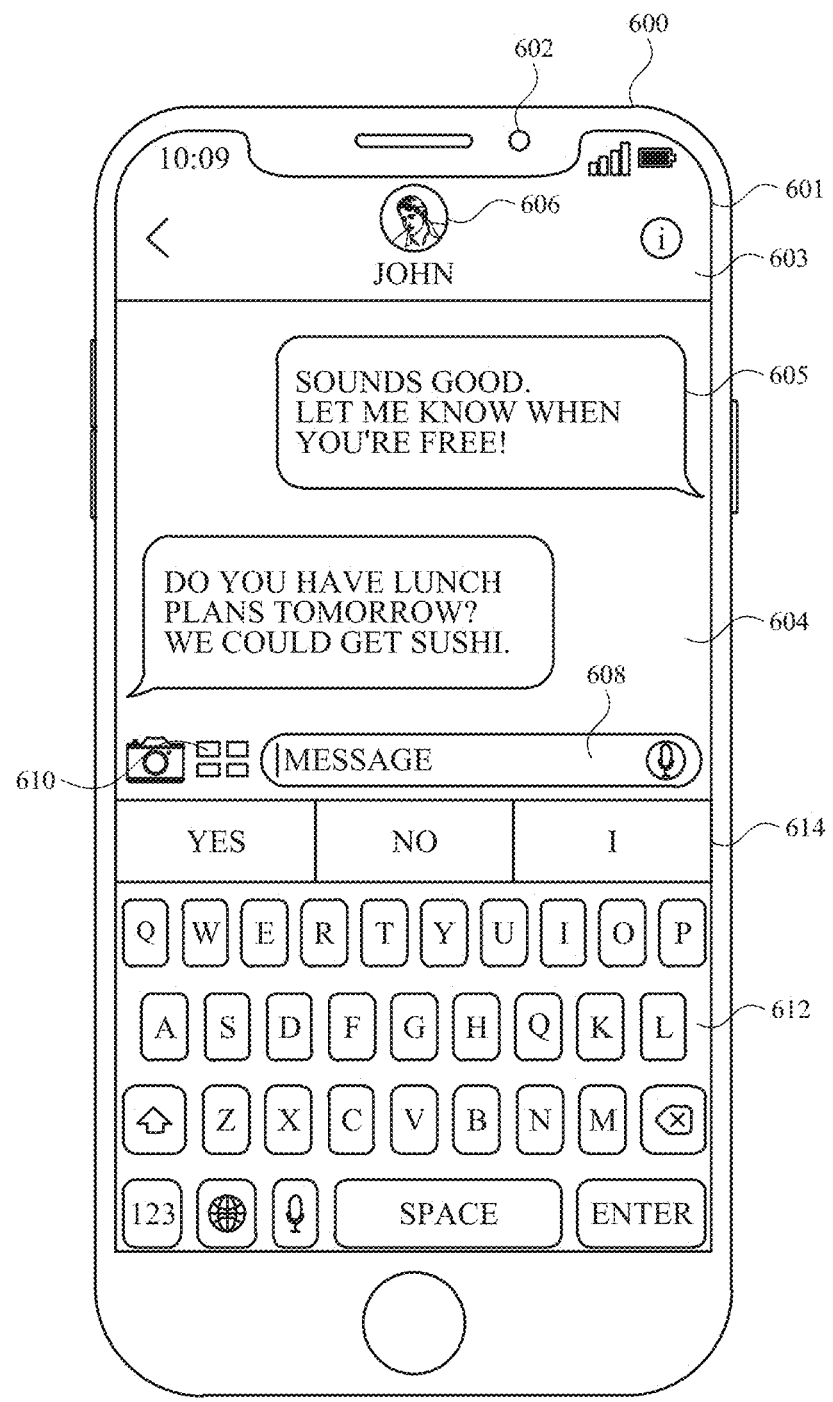
FIGS. 6A-6AN illustrate exemplary user interfaces for navigating among avatars in an application.
Figure 7:
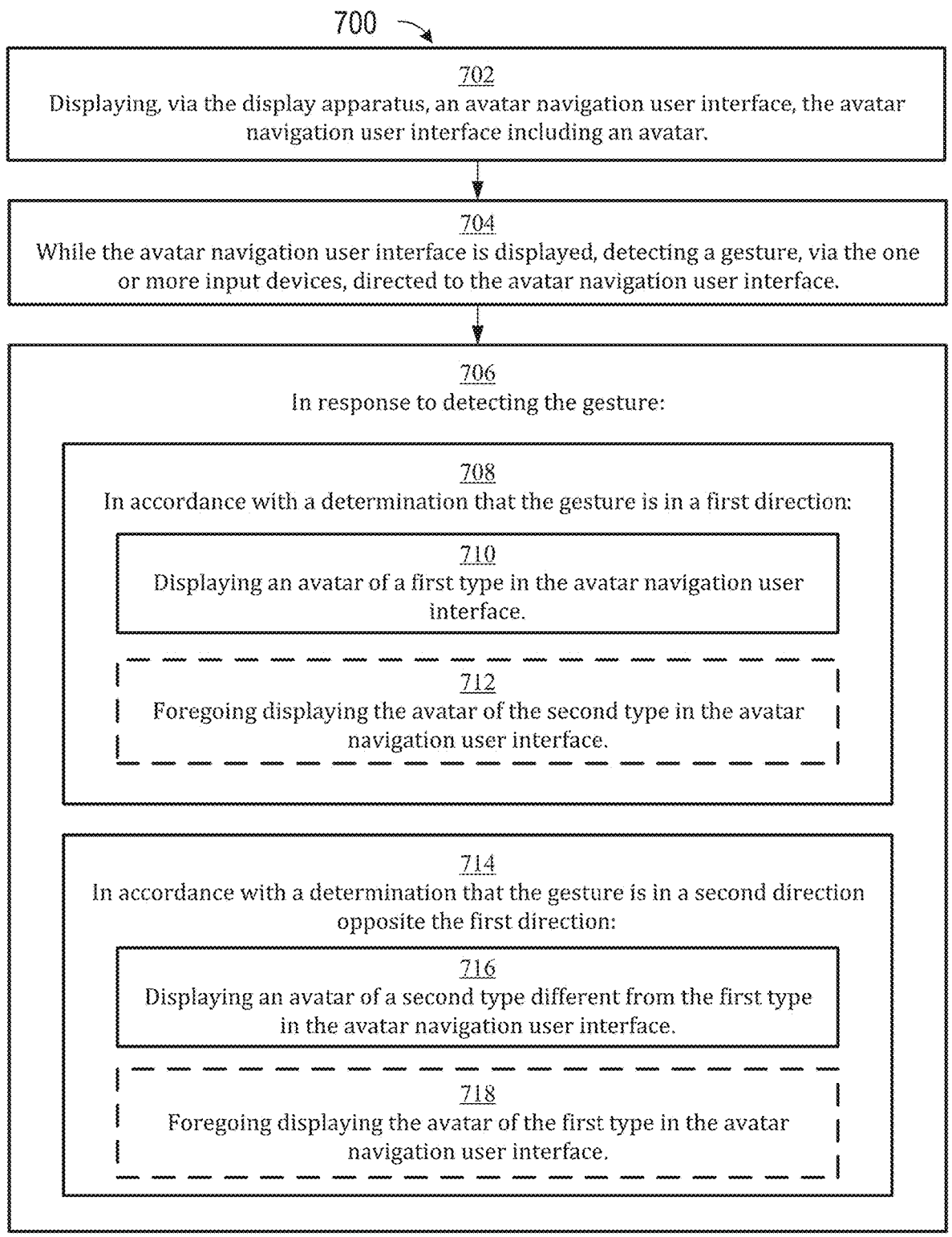
FIG. 7 is a flow diagram illustrating a method for navigating among avatars in an application.

FIGS. 6A-6AN illustrate exemplary user interfaces for navigating among avatars in an application, in accordance with some embodiments. FIG. 7 is a flow diagram illustrating methods of navigating among avatars in an application, in accordance with some embodiments. The user interfaces in FIGS. 6A-6AN are used to illustrate the processes described below, including the processes in FIG. 7.

Figure 8A:
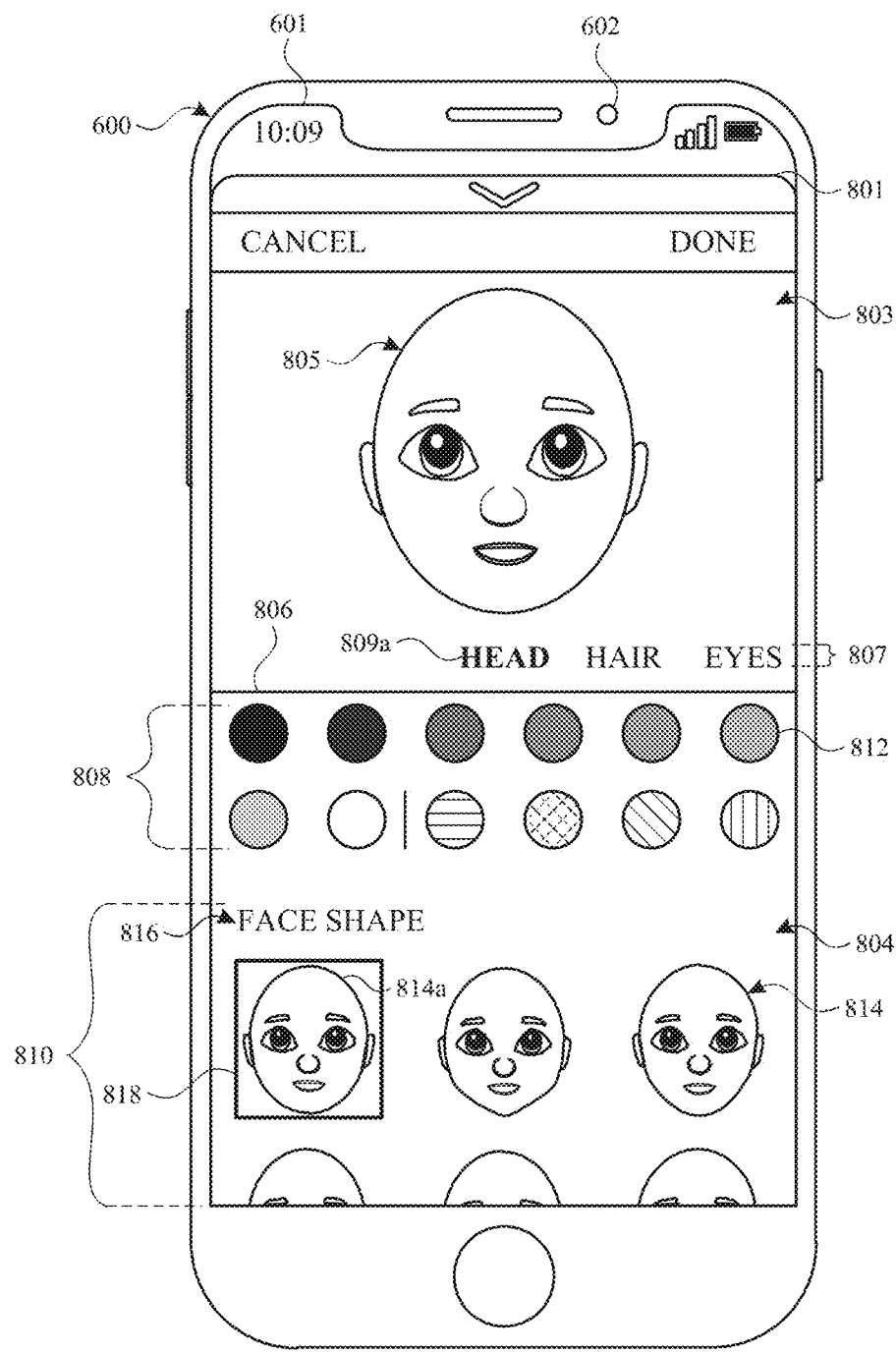
FIGS. 8A-8CF illustrate exemplary user interfaces for displaying an avatar editing user interface.
Figure 8B:
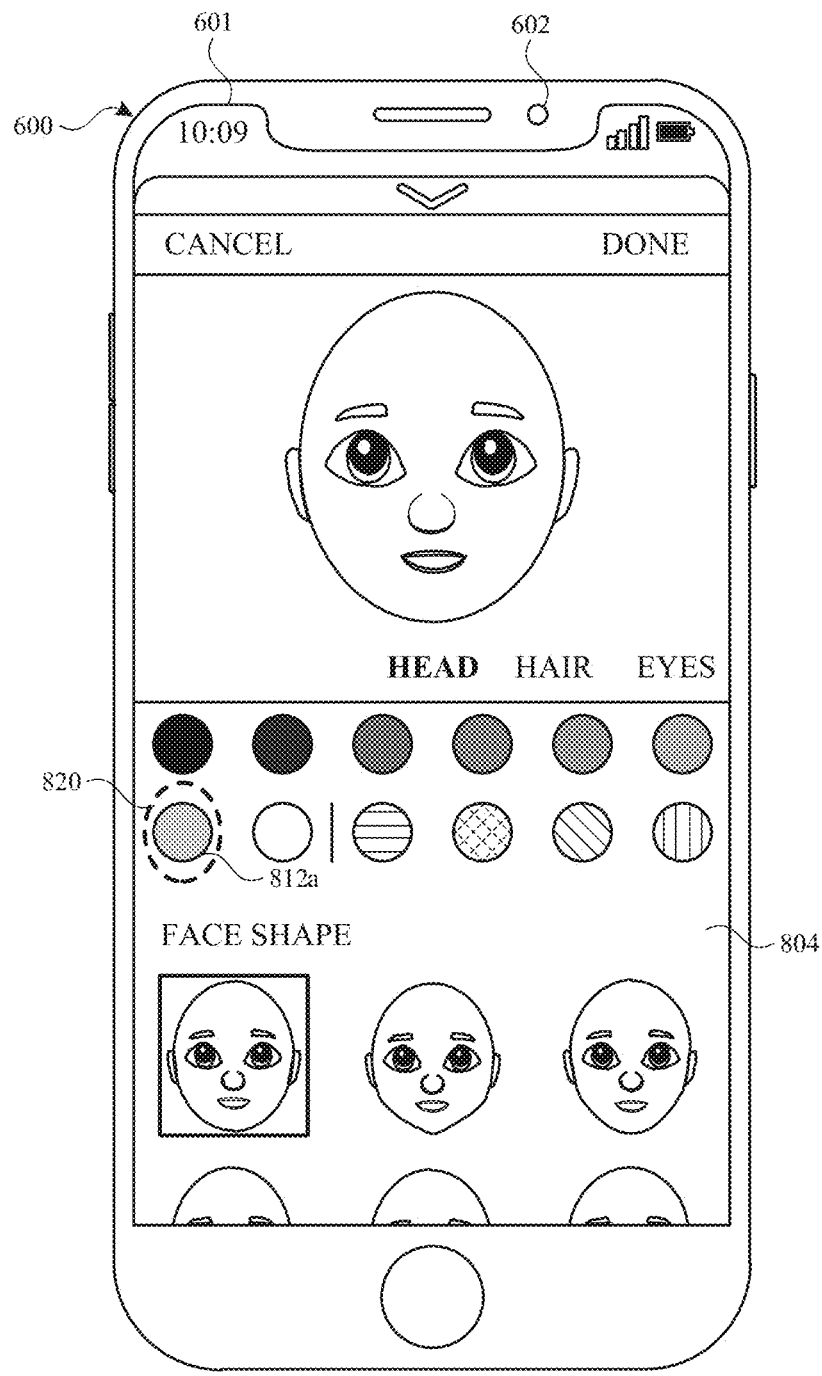
Figure 8C:
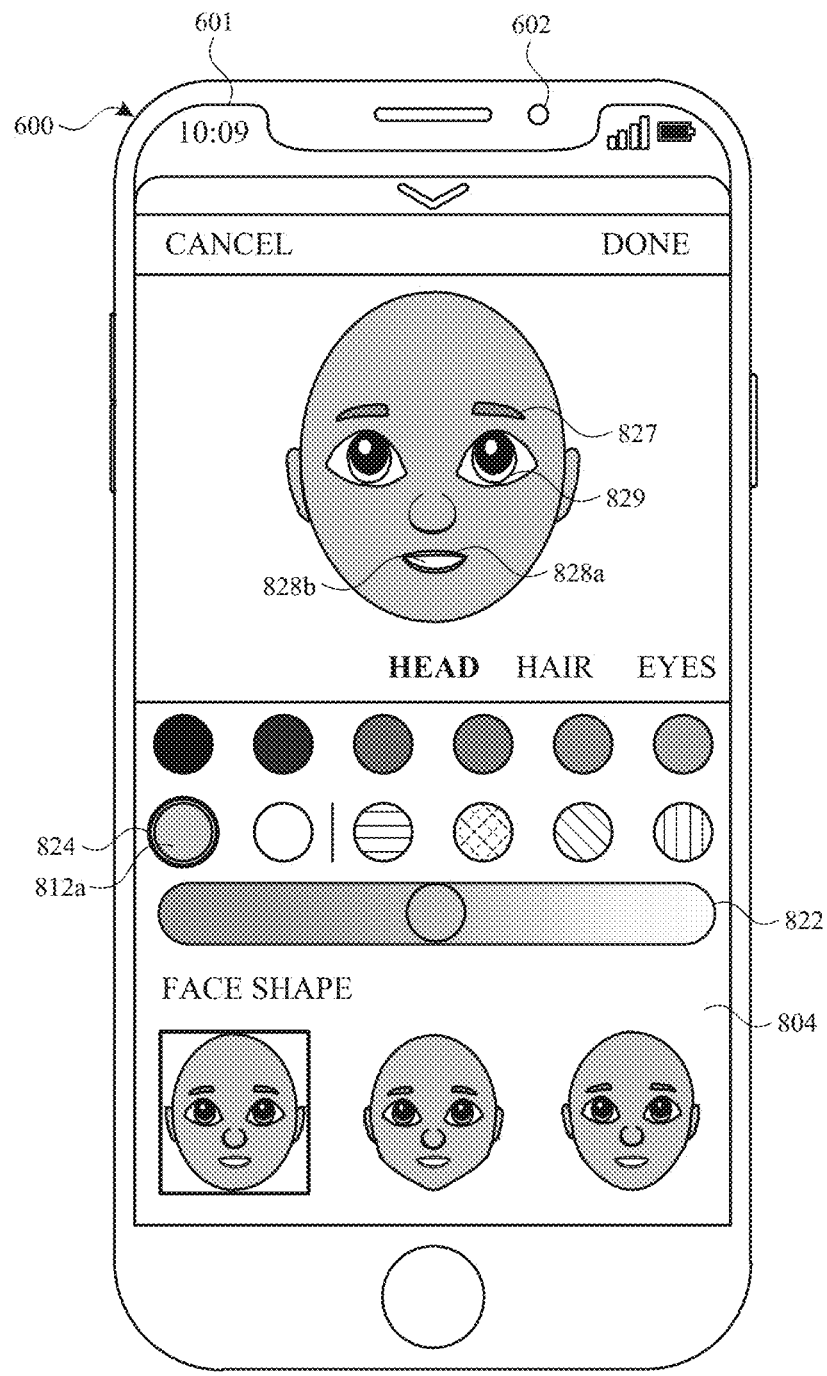

FIGS. 8A-8CF illustrate exemplary user interfaces for displaying an avatar editing user interface. FIGS. 9A, 9B, 10A, 10B, 11A, 11B, 12A, and 12B are flow diagrams illustrating methods for displaying an avatar editing user interface, in accordance with some embodiments. The user interfaces in FIGS. 8A-8CF are used to illustrate the processes described below, including the processes in FIGS. 9A, 9B, 10A, 10B, 11A, 11B, 12A, and 12B.

Figure 13A:
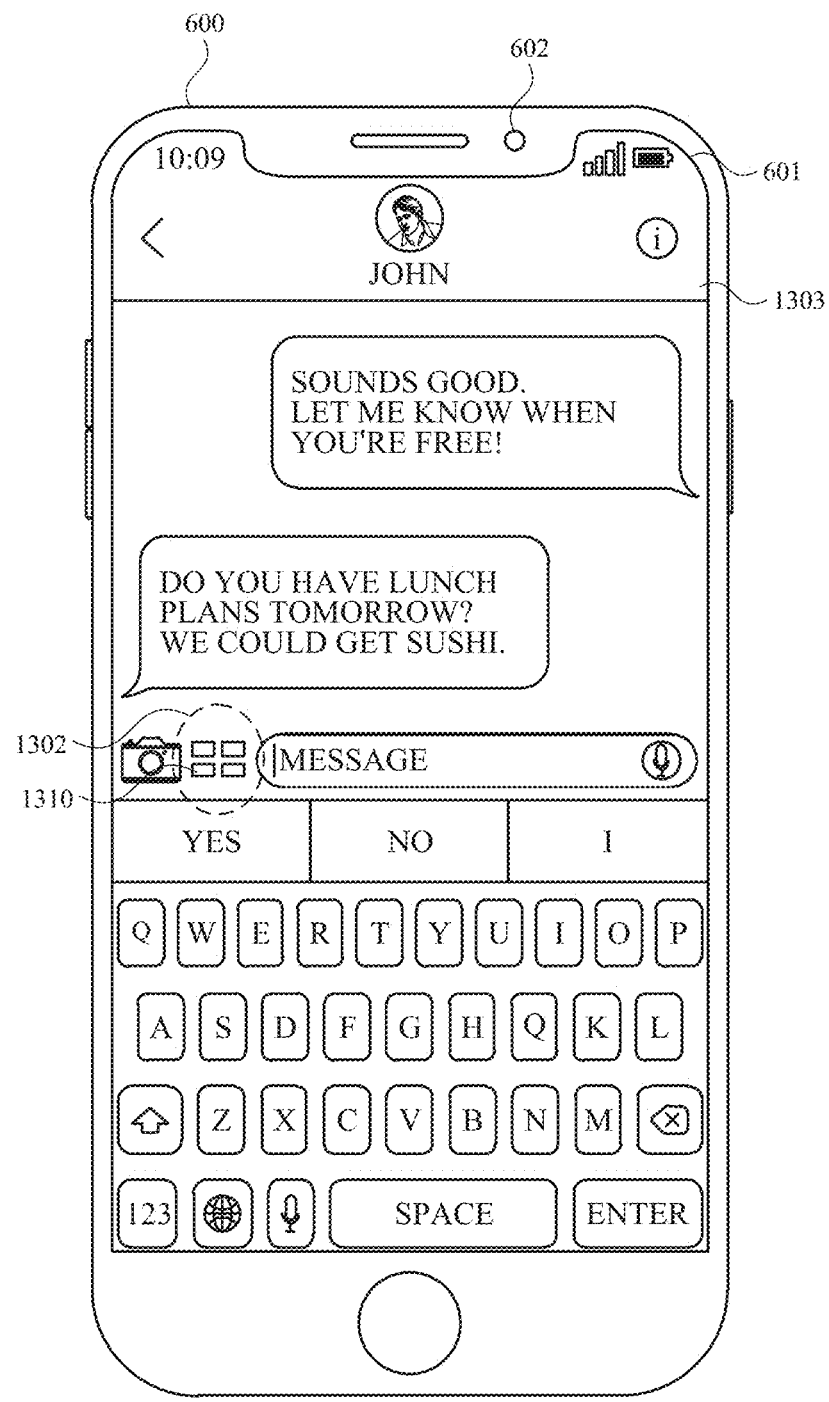
FIGS. 13A-13O illustrate exemplary user interfaces for modifying an avatar in an avatar navigation user interface.

FIGS. 13A-13O illustrate exemplary user interfaces for modifying an avatar in an avatar navigation user interface. FIGS. 14A and 14B are a flow diagram illustrating a method for modifying an avatar in an avatar navigation user interface, in accordance with some embodiments. The user interfaces in FIGS. 13A-13O are used to illustrate the processes described below, including the processes in FIGS. 14A and 14B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
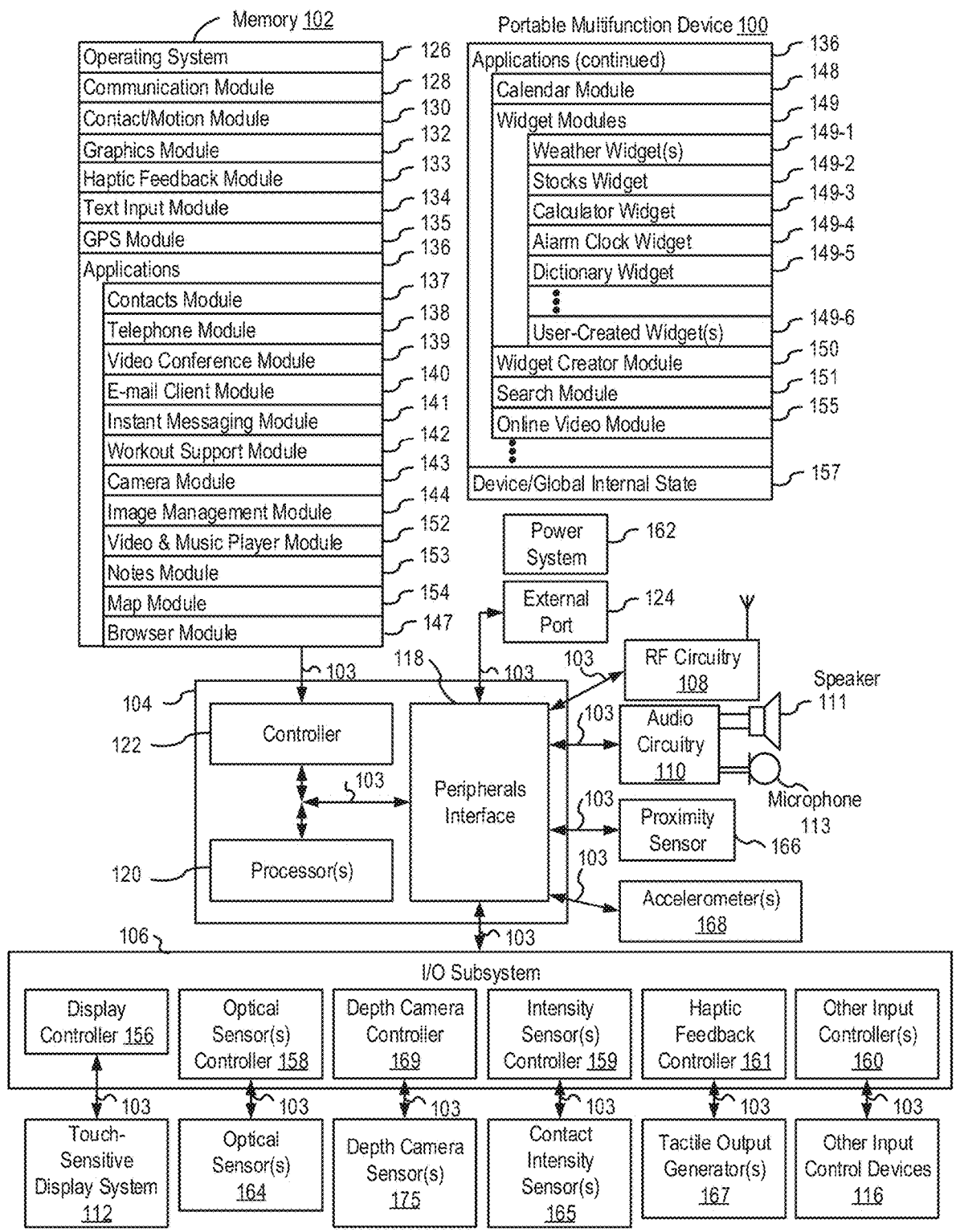
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
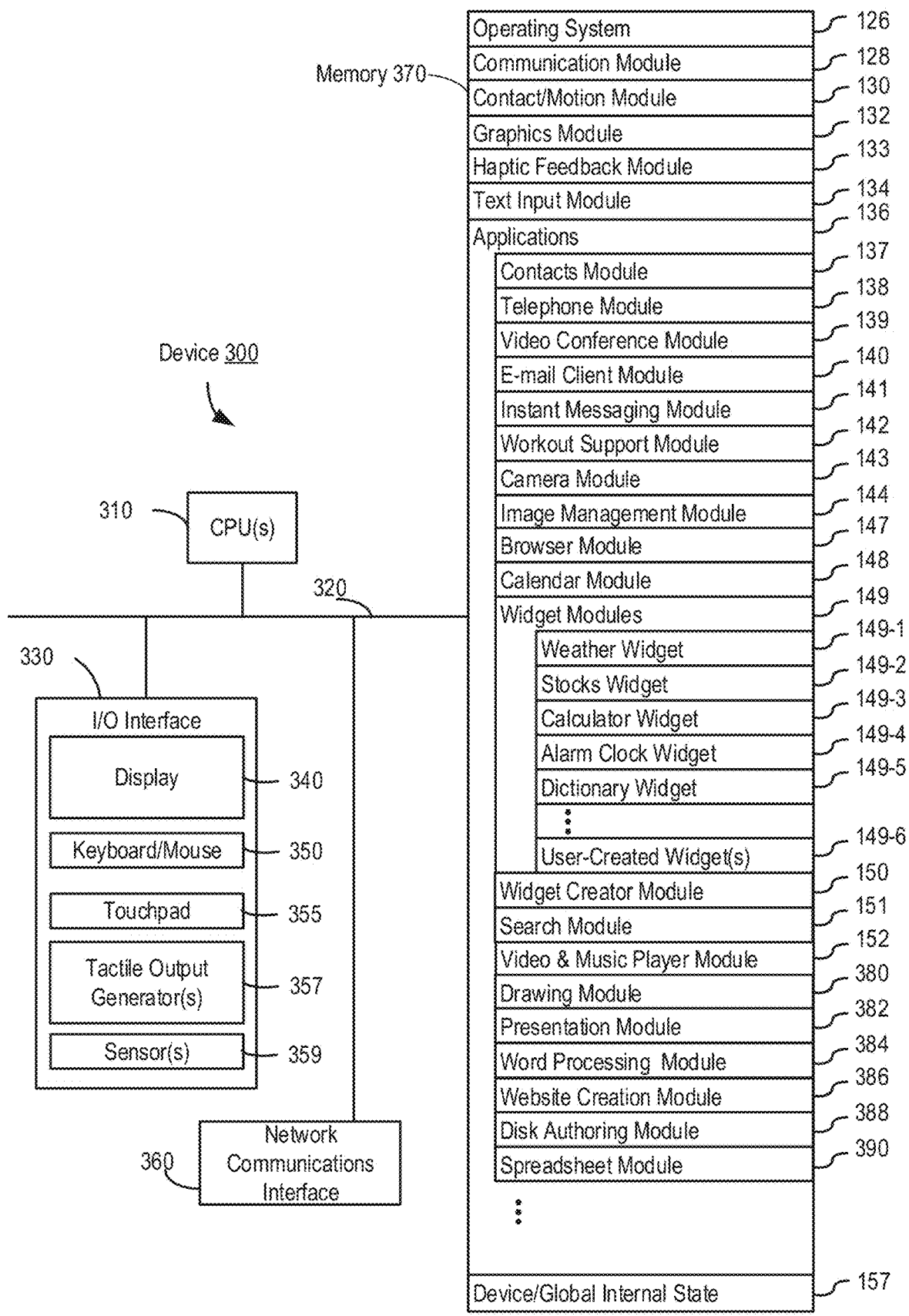
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
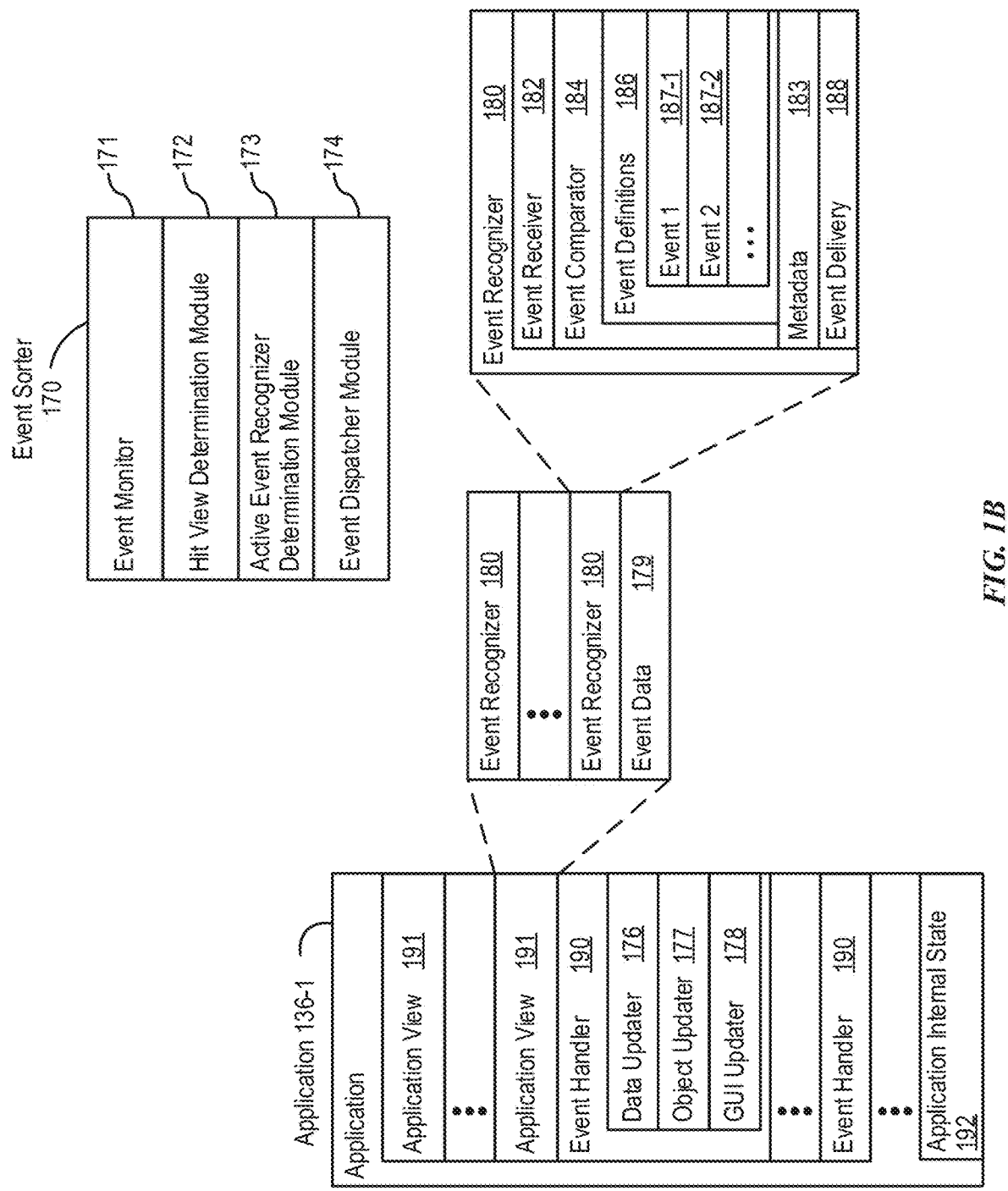
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
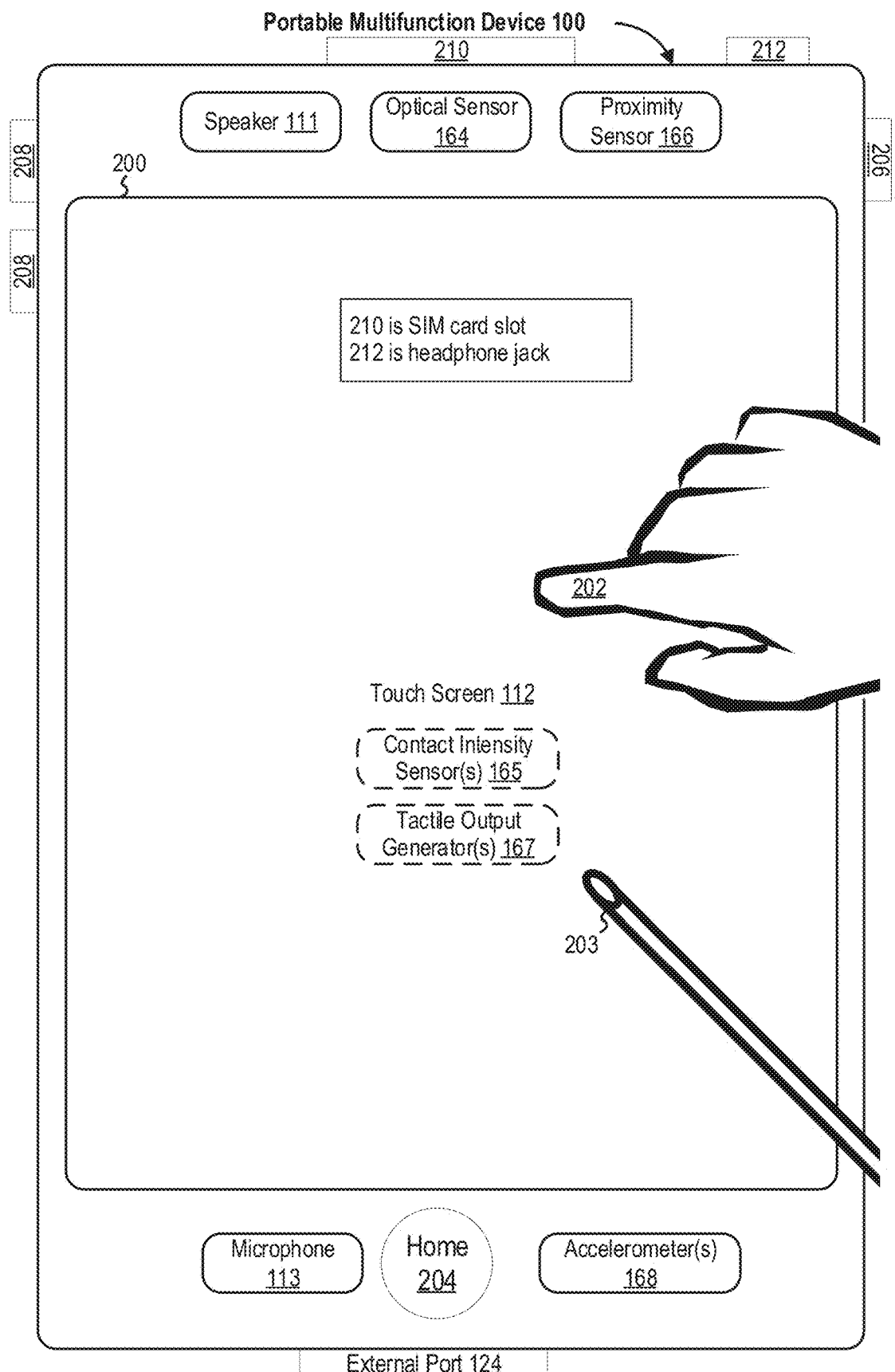
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
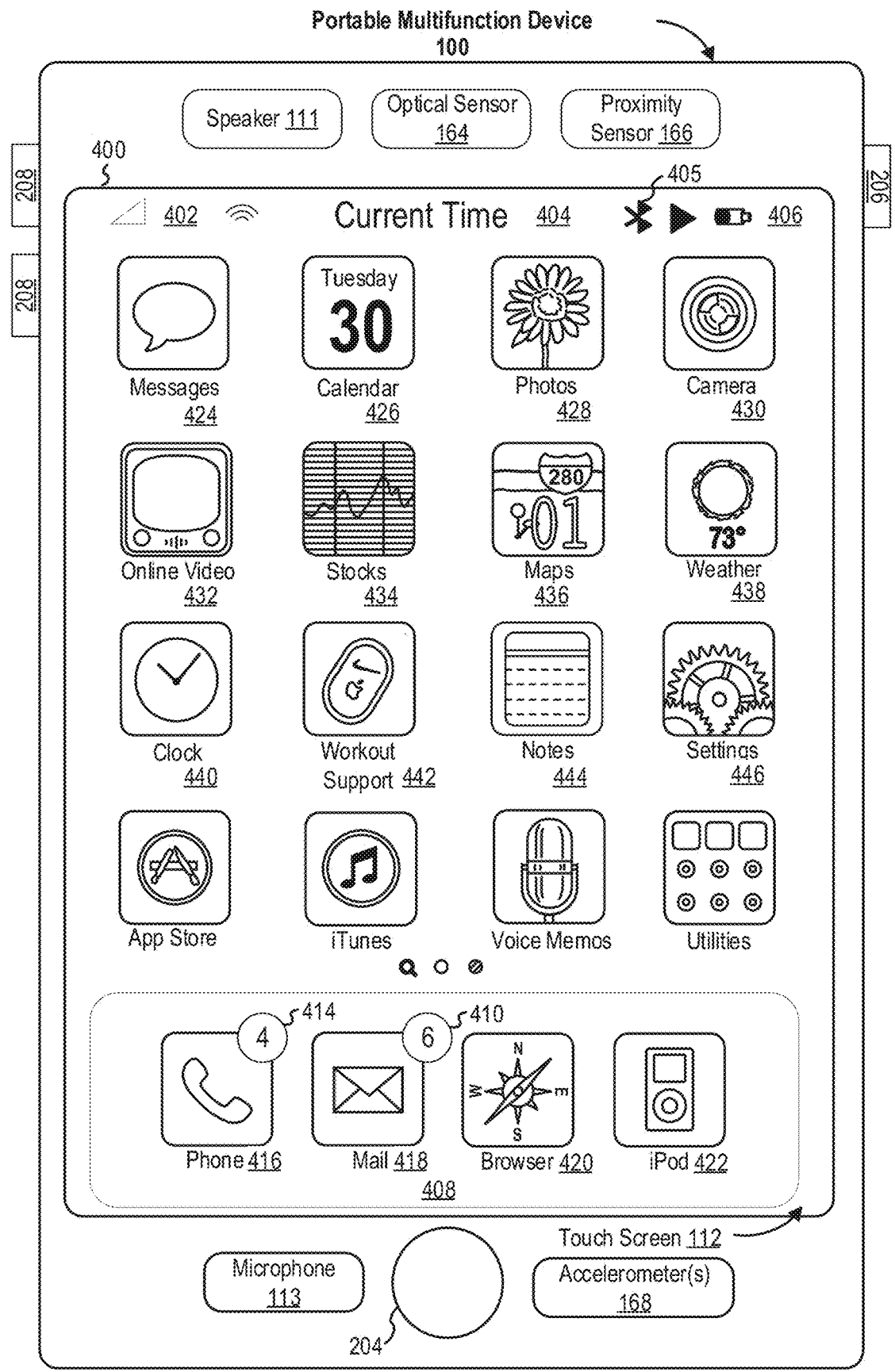
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
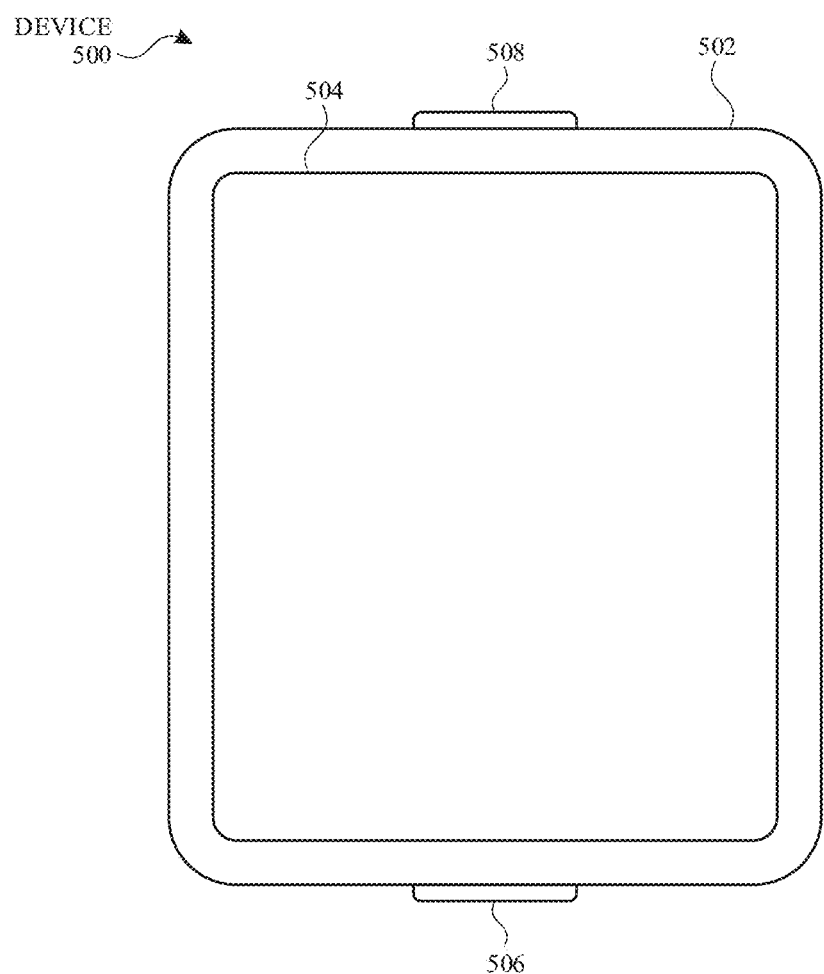
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
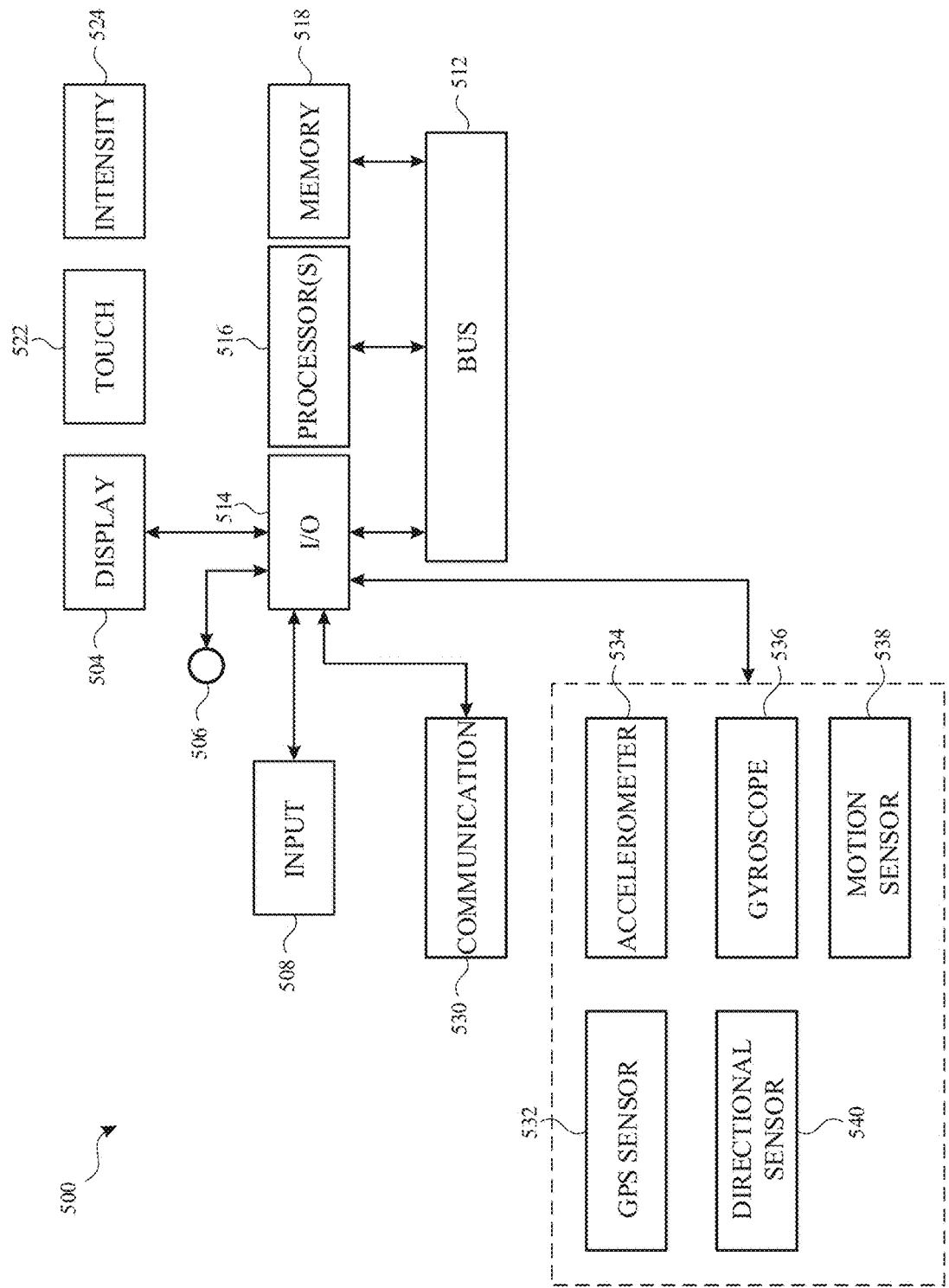
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1000, 1100, 1200, and 1400 (FIGS. 7, 9A, 9B, 10A, 10B, 11A, 11B, 12A, 12B, 14A and 14B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6AN illustrate exemplary user interfaces for navigating among avatars in an application (e.g., a messaging application), in accordance with some embodiments. The user interfaces in these figures are used to illustrate the processes described below, including the processes in FIG. 7.

FIG. 6A depicts device 600 having display 601, which in some cases is a touch-sensitive display. In some embodiments, device 600 also includes camera 602, which, at a minimum, includes an image sensor that is capable of capturing data representing a portion of the light spectrum (e.g., visible light, infrared light, or ultraviolet light). In some embodiments, camera 602 includes multiple image sensors and/or other types of sensors. In addition to capturing data representing sensed light, in some embodiments, camera 602 is capable of capturing other types of data, such as depth data. For example, in some embodiments, camera 602 also captures depth data using techniques based on speckle, time-of-flight, parallax, or focus. Image data that device 600 captures using camera 602 includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum. In some embodiments, device 600 includes one or more features of devices 100, 300, or 500.

In some examples, electronic device 600 includes a depth camera, such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint.) In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

In FIG. 6A, device 600 is displaying messaging user interface 603 of a messaging application. Messaging user interface 603 includes message display region 604 including messages 605 transmitted to a participant (represented by recipient identifier 606) in a message conversation. Messaging user interface 603 also includes a message-compose field 608 for displaying input (e.g., text input, multimedia input, etc.) for sending to the participant in the message conversation. Messaging user interface 603 also includes application dock affordance 610, keyboard display region 612, and text-suggestion region 614.

Figure 6B:
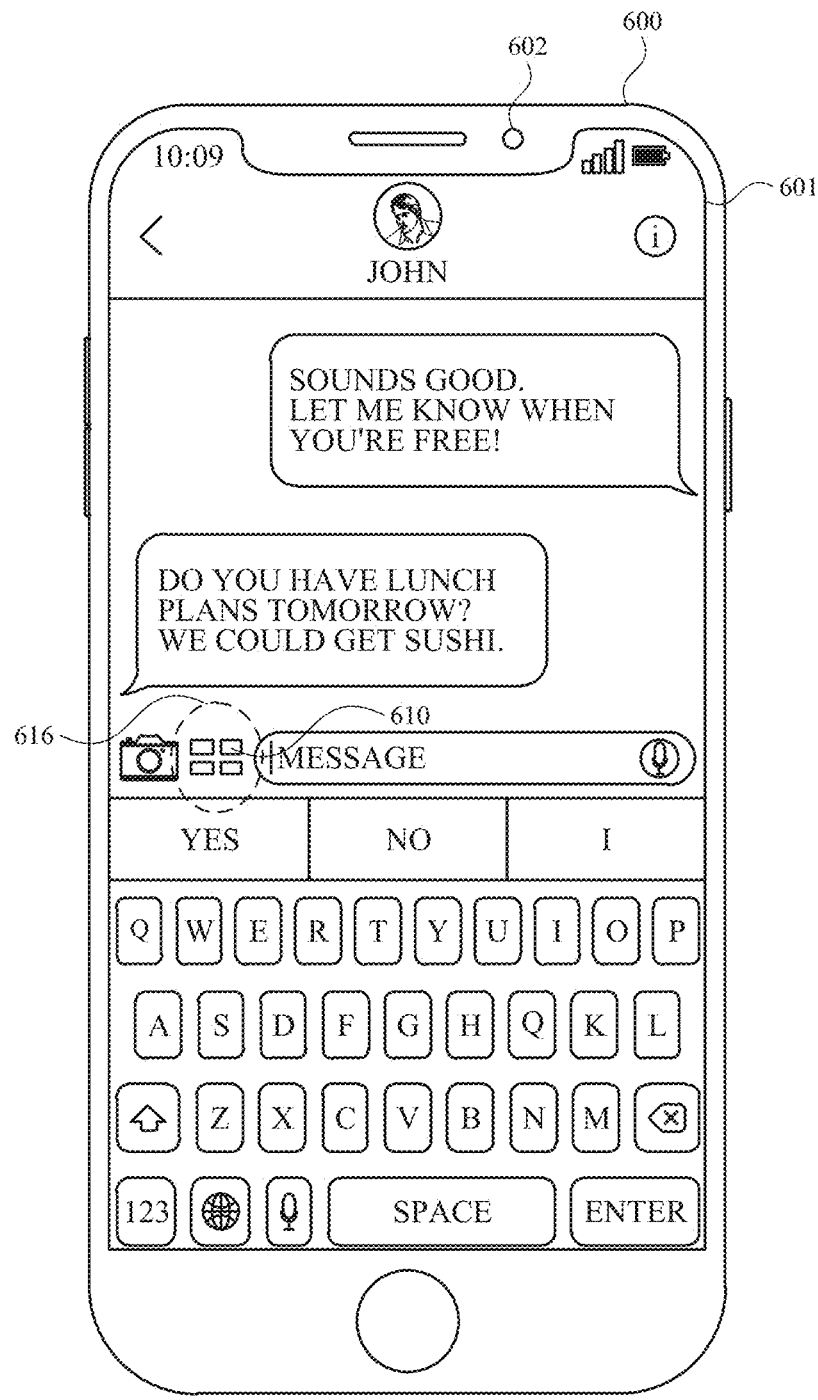

In FIG. 6B, device 600 detects input 616 (e.g., a touch input on display 601) at a location corresponding to application dock affordance 610.

Figure 6C:
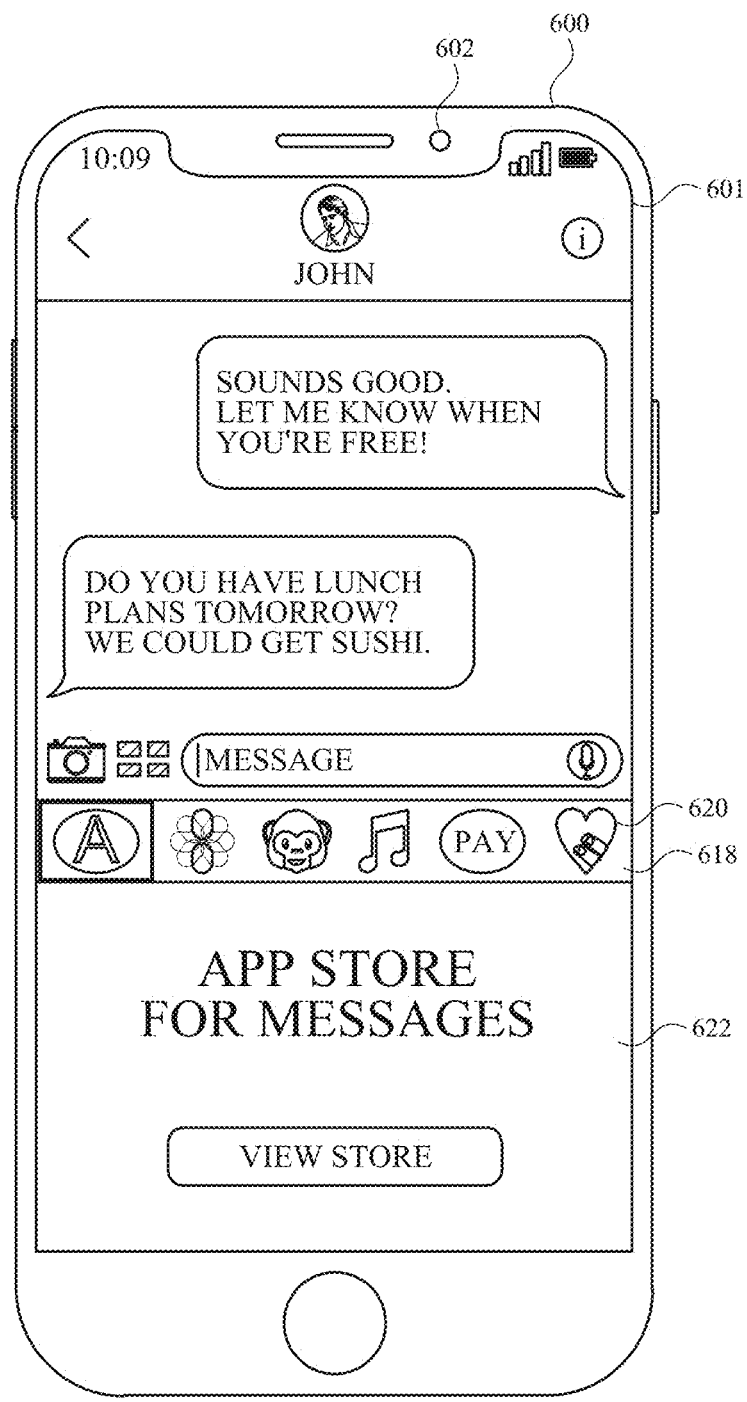

In FIG. 6C, in response to detecting input 616, device 600 replaces text-suggestion region 614 with application dock 618 having application affordances 620 corresponding to various applications. Device 600 also replaces keyboard display region 612 with application display region 622 for showing an application user interface that corresponds to a selected one of the application affordances.

Figure 6D:
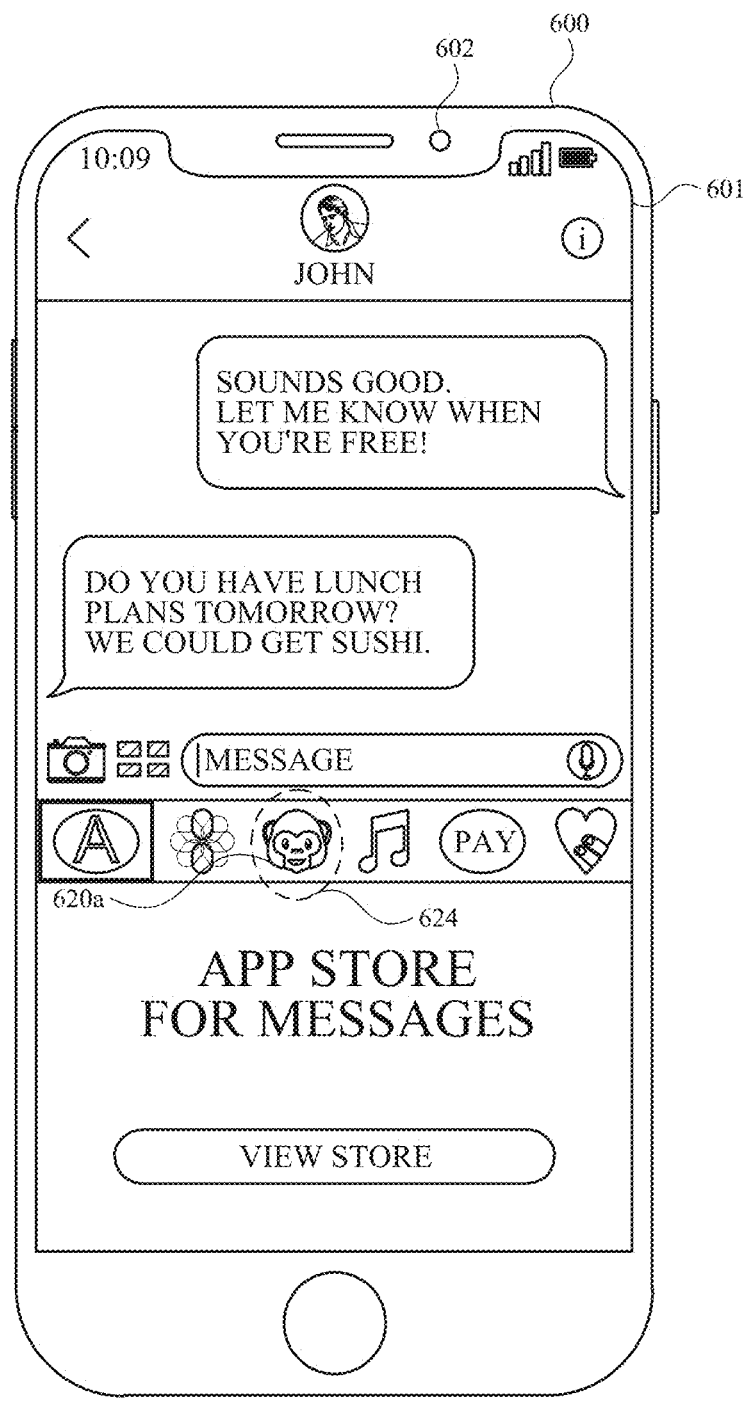

In FIG. 6D, device 600 detects input 624 (e.g., a touch input on display 601 at a location corresponding to application affordance 620*a*) selecting application affordance 620*a*.

Figure 6E:
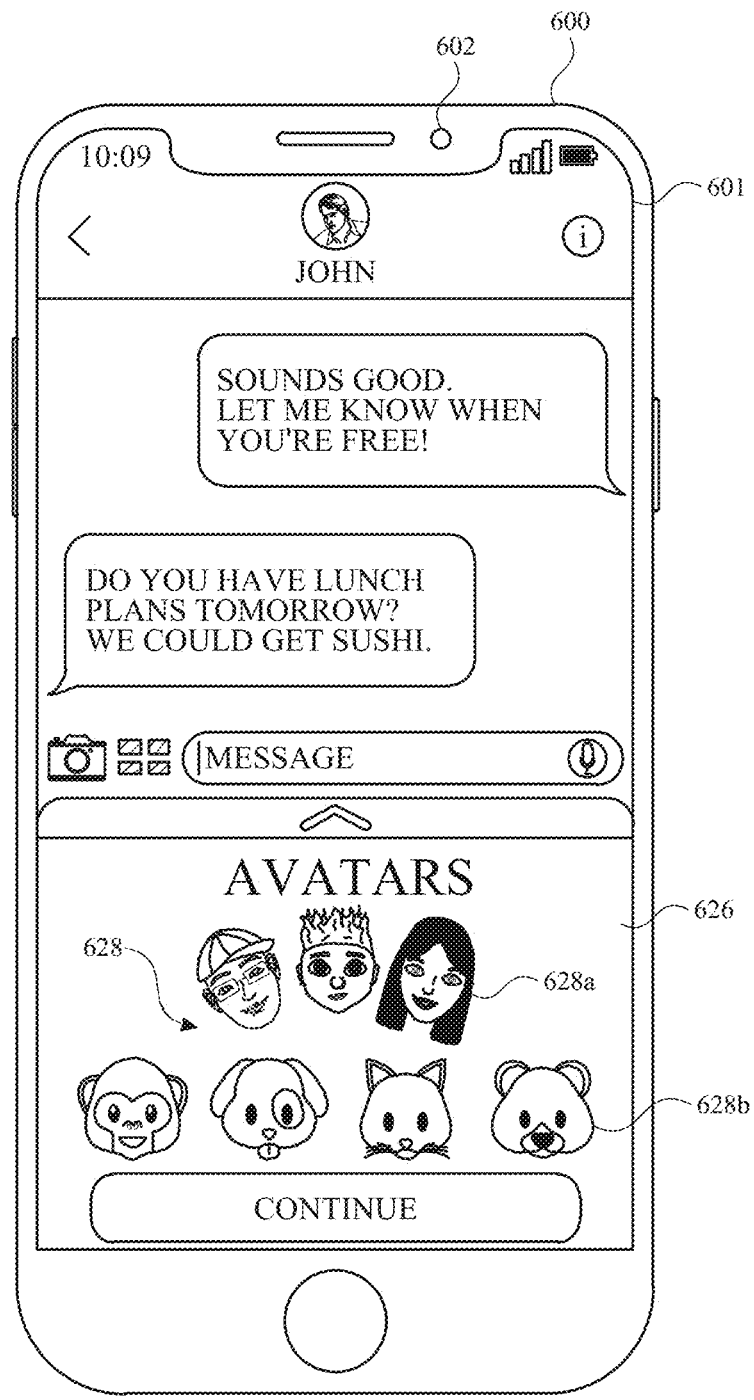

In FIG. 6E, in response to detecting input 624, device 600 replaces application dock 618 and application display region 622 with avatar splash screen 626 having example avatars 628. The example avatars include example customizable avatars 628*a* and example non-customizable avatars 628*b*. In the embodiment illustrated in FIG. 6E, customizable avatars 628*a* are positioned above non-customizable avatars 628*b*. In some embodiments, avatar splash screen 626 includes an animated display of example avatars 628 moving and changing facial expressions to give the appearance of the example avatars interacting with each other (e.g., appearing to talk to each other, winking, laughing, smiling, etc.). In some embodiments, device 600 only displays avatar splash screen 626 the first time application affordance 620*a* is selected or when no customizable avatars have been created. In some embodiments, when avatar splash screen 626 is not displayed, device 600 optionally displays an avatar selection interface such as, for example, condensed avatar selection interface 668 (see FIG. 6L and corresponding discussion below).

In some embodiments, a virtual avatar is a representation of the user that can be graphically depicted (e.g., a graphical representation of the user). In some embodiments, the virtual avatar is non-photorealistic (e.g., is cartoonish). In some embodiments, the virtual avatar includes an avatar face having one or more avatar features (e.g., avatar facial features). In some embodiments, the avatar features correspond (e.g., are mapped) to one or more physical features of a user's face such that detected movement of the user's physical features (e.g., as determined based on a camera such as a depth sensing camera) affects the avatar feature (e.g., affects the feature's graphical representation).

In some examples, a user is able to manipulate characteristics or features of a virtual avatar using a camera sensor (e.g., camera module 143, optical sensor 164) and, optionally, a depth sensor (e.g., depth camera sensor 175). As a user's physical features (such as facial features) and position (such as head position, head rotation, or head tilt) changes, the electronic device detects the changes and modifies the displayed image of the virtual avatar to reflect the changes in the user's physical features and position. In some embodiments, the changes to the user's physical features and position are indicative of various expressions, emotions, context, tone, or other non-verbal communication. In some embodiments, the electronic device modifies the displayed image of the virtual avatar to represent these expressions, emotions, context, tone, or other non-verbal communication.

In some embodiments, customizable avatars are virtual avatars that can be selected and customized by a user, for example, to achieve a desired appearance (e.g., to look like the user). The customizable avatars generally have an appearance of a human character, rather than a non-human character such as an anthropomorphic construct of an animal or other nonhuman object. Additionally, features of the avatar can be created or changed, if desired, using an avatar editing user interface (e.g., such as the avatar editing user interface discussed below with respect to FIGS. 8A-8CF). In some embodiments, customizable avatars can be created and configured to achieve a customized physical appearance, physical construct, or modeled behavior.

In some embodiments, non-customizable avatars are virtual avatars that can be selected by a user, but generally are not fundamentally configurable, though their appearance can be altered via face tracking, as described in more detail below. Instead, non-customizable avatars are preconfigured and generally do not have feature components that can be modified by a user. In some embodiments, the non-customizable avatars have an appearance of a non-human character, such as an anthropomorphic construct of an animal or other nonhuman object. Non-customizable avatars cannot be created by a user or modified to achieve a significant change in the physical appearance, physical construct, or modeled behavior of non-customizable avatars.

Figure 6F:
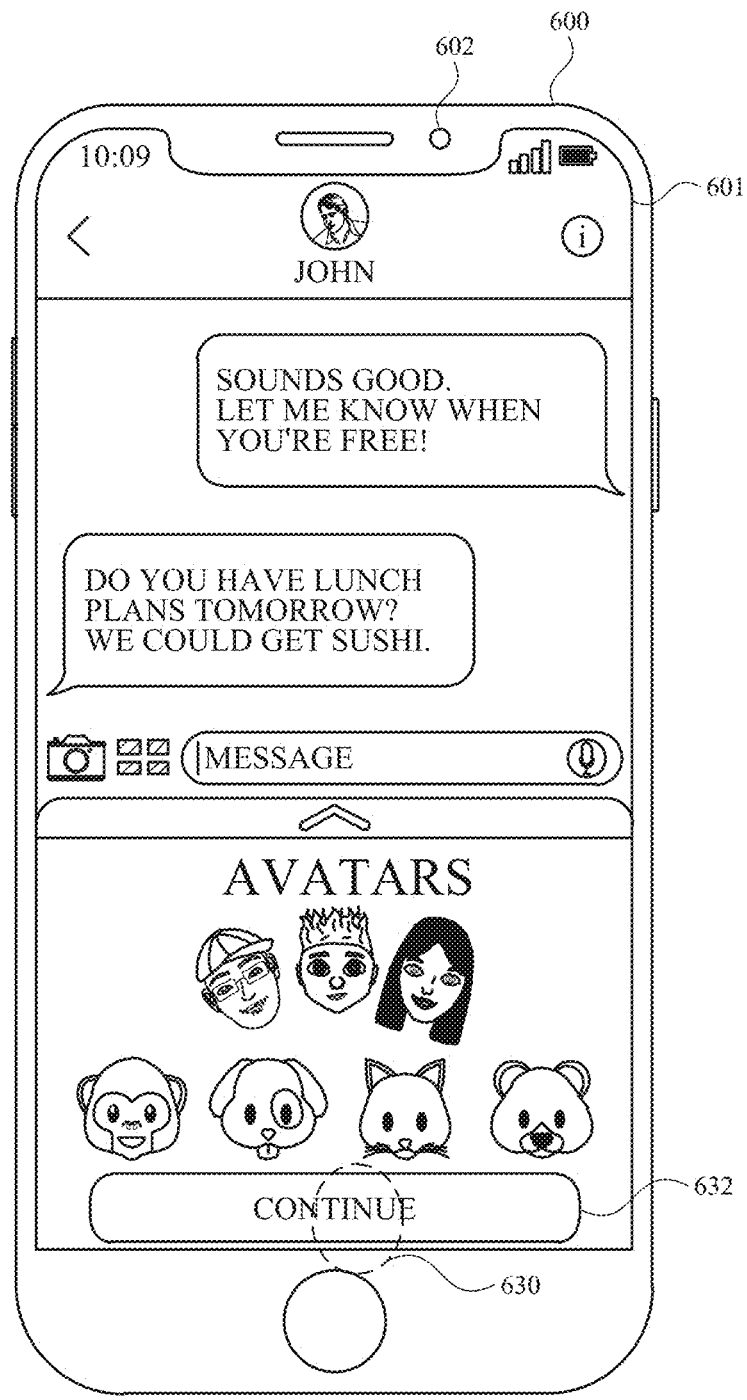

In FIG. 6F, device 600 detects input 630 (e.g., a touch gesture on display 601) on continue affordance 632.

Figure 6G:
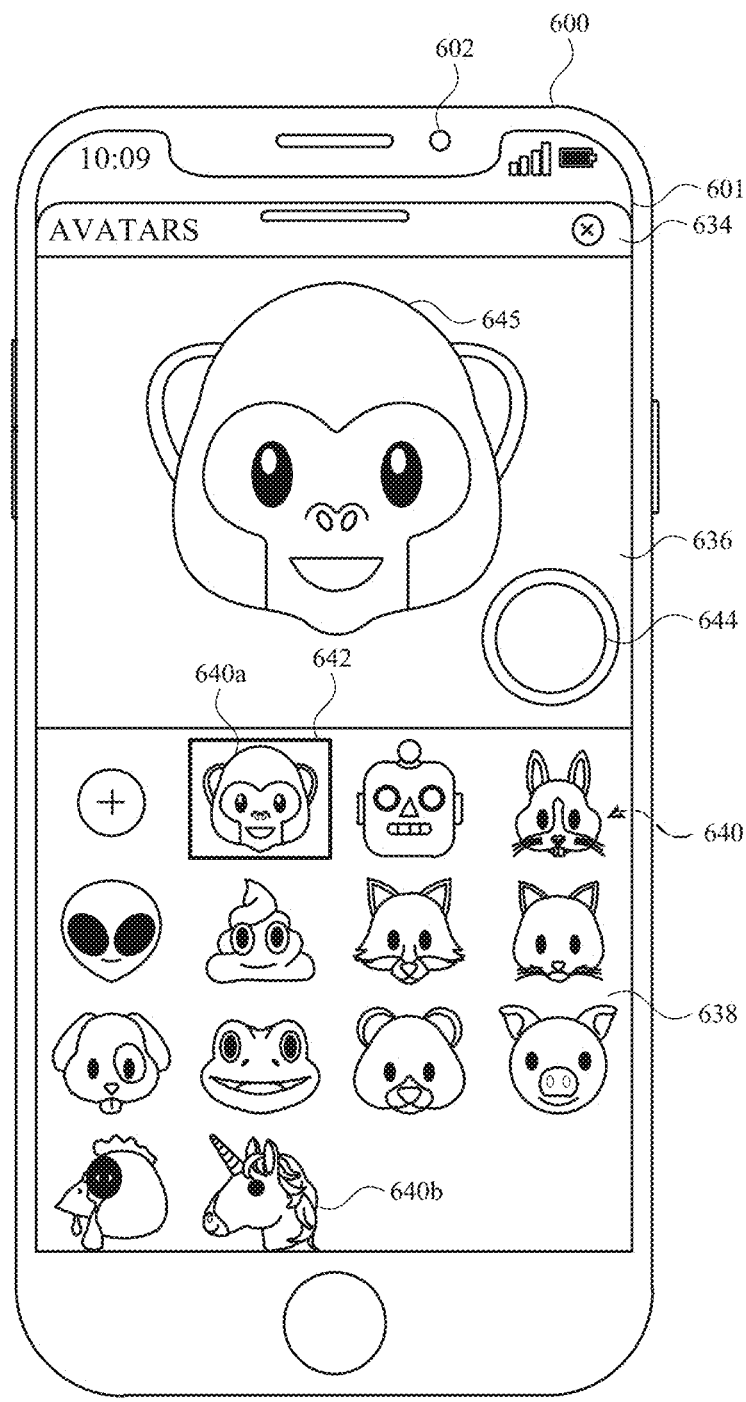

In FIG. 6G, in response to detecting input 630, device 600 displays expanded avatar selection interface 634, which provides an initial set of avatar options that can be selected for messaging user interface 608 (e.g., to send to a participant in the message conversation). In the embodiments discussed herein, an avatar is a representation of a virtual character that can be animated to display changes (e.g., in response to device detecting changes in a user's face). An avatar can correspond to an avatar option, which is a static representation of the avatar having the same appearance and characteristics as the avatar, but generally is not animated. An avatar option is typically a selectable representation of the avatar. Often, when the avatar option is selected, the corresponding avatar is displayed.

Expanded avatar selection interface 634 includes avatar display region 636 and avatar option region 638. Avatar option region 638 includes a set of selectable avatar options 640. A selected avatar option is indicated by border 642, which, in FIG. 6G, is shown displayed around initially selected monkey avatar option 640*a*. The selected avatar option is represented in avatar display region 636 as avatar 645 (e.g., avatar 645 is a monkey that corresponds to monkey avatar option 640*a*). Each avatar option 640 can be selected by tapping on a respective avatar option. Thus, in response to receiving a selection of a different one of avatar options 640, device 600 modifies the displayed avatar 645 to represent the newly selected avatar option, and moves border 642 to the selected avatar option. Thus, if device 600 detected a selection of unicorn avatar option 640*b*, device 600 would display border 642 around unicorn avatar option 640*b* and modify avatar 645 to appear as a unicorn corresponding to unicorn avatar option 640*b*.

Avatar display region 636 also includes capture affordance 644, which can be selected to capture an image of avatar 645 to send to a participant in the message conversation (see messaging user interface 603). In some embodiments, the captured image is a still image or a video recording, depending on the type of gesture detected on capture affordance 644. For example, if device 600 detects a tap gesture on capture affordance 644, device 600 captures a still image of avatar 645 at the time the tap gesture occurs. If device 600 detects a tap-and-hold gesture on capture affordance 644, device 600 captures a video recording of avatar 645 during a period of time for which the tap-and-hold gesture persists. In some embodiments, the video recording stops when the finger lifts off of the affordance. In some embodiments, the video recording continues until a subsequent input (e.g., a tap input) is detected at a location corresponding to the affordance. In some embodiments, the captured image (e.g., still image or video recording) of avatar 645 is then inserted into message-compose field 608 to be subsequently sent to a participant in the message conversation. In some embodiments, the captured image of avatar 645 is sent directly to the participant in the message conversation without inserting the captured image in message-compose field 608.

Figure 6H:
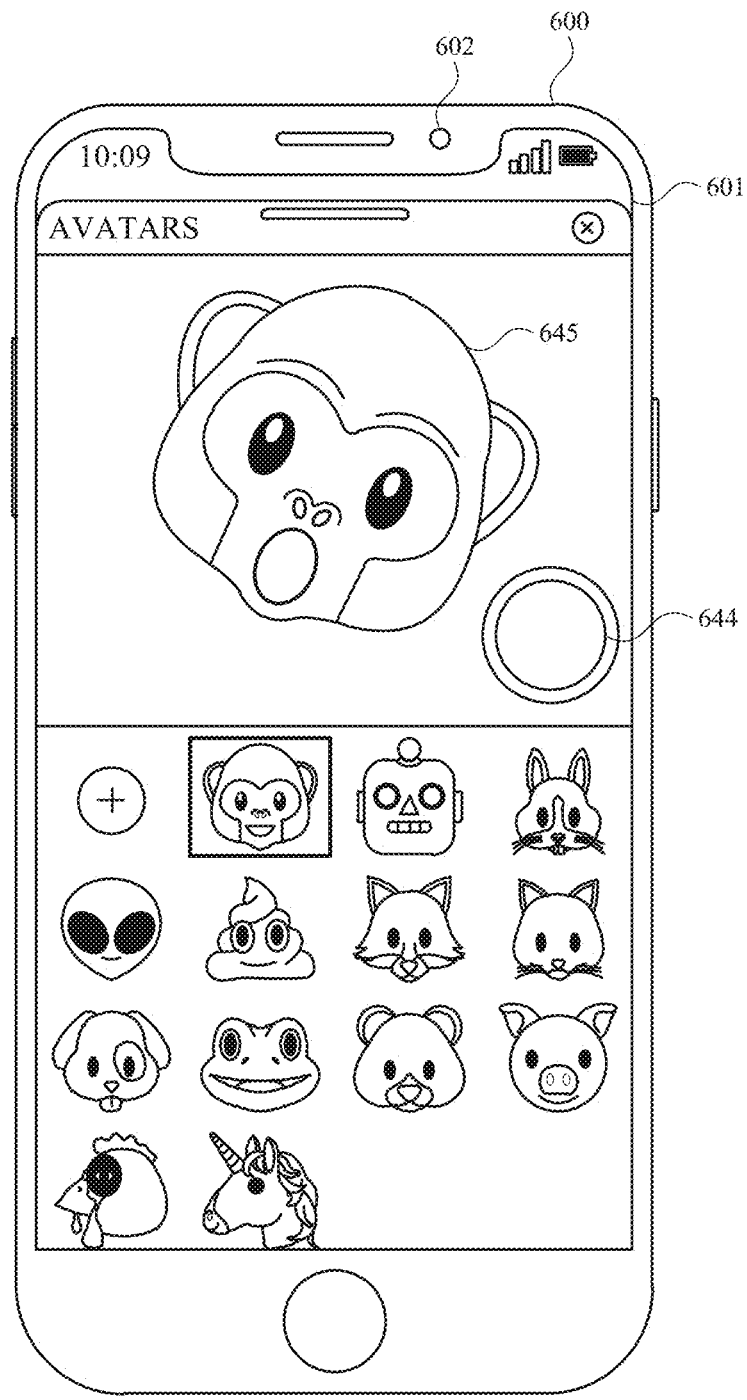

In some embodiments, device 600 tracks movement and positioning (e.g., rotational movement and/or translational movement) of a user's face positioned in a field-of-view of a camera (e.g., camera 602) and, in response, updates an appearance of avatar 645 based on the detected changes in the user's face (often referred to herein as a "face tracking" function). For example, as shown in FIG. 6H, device 600 updates an appearance of avatar 645 in response to detecting (e.g., using camera 602) changes in a user's face. In the example in FIG. 6H, avatar 645 is shown tilted with an open mouth and wide eyes, mirroring a similar expression and position of a user's face that is positioned in the field-of-view of camera 602. Such changes to avatar 645 can be captured using capture affordance 644 and, optionally, sent to a participant in the message conversation shown in FIG. 6A. Although avatar 645 shown in FIG. 6H is a non-customizable avatar, device 600 can modify customizable avatars in a similar manner.

Figure 6I:
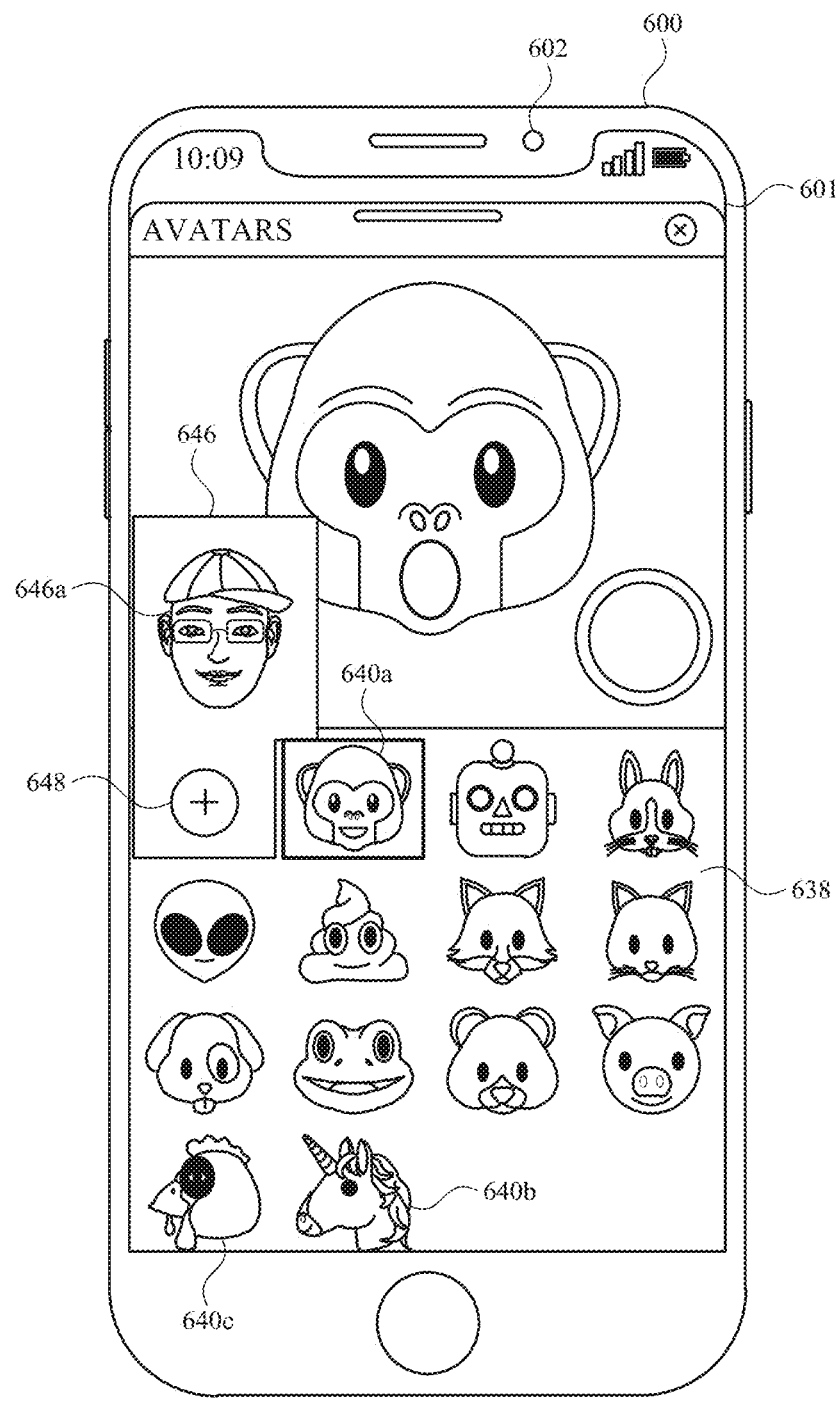

In the expanded avatar selection interface illustrated in FIGS. 6G-6I, all avatar options 640 displayed in avatar option region 638 are non-customizable avatars that are preconfigured for the user's immediate selection. This is because no customizable avatars have been created. As shown in FIG. 6I, however, device 600 displays avatar creation prompt 646 extending from avatar creation icon 648 to prompt the user to select avatar creation icon 648, which causes device 600 to initiate a process for creating a new customizable avatar that can be subsequently added to avatar option region 638 and, optionally, used in messaging user interface 603. The displayed combination of avatar creation prompt 646 and avatar creation icon 648 (having a "+" shape in FIG. 6I) inform the user that selecting avatar creation icon 648 allows the user to create a customizable avatar that can be added to expanded avatar selection interface 634 and library interface 686 in FIG. 6U.

Figure 6J:
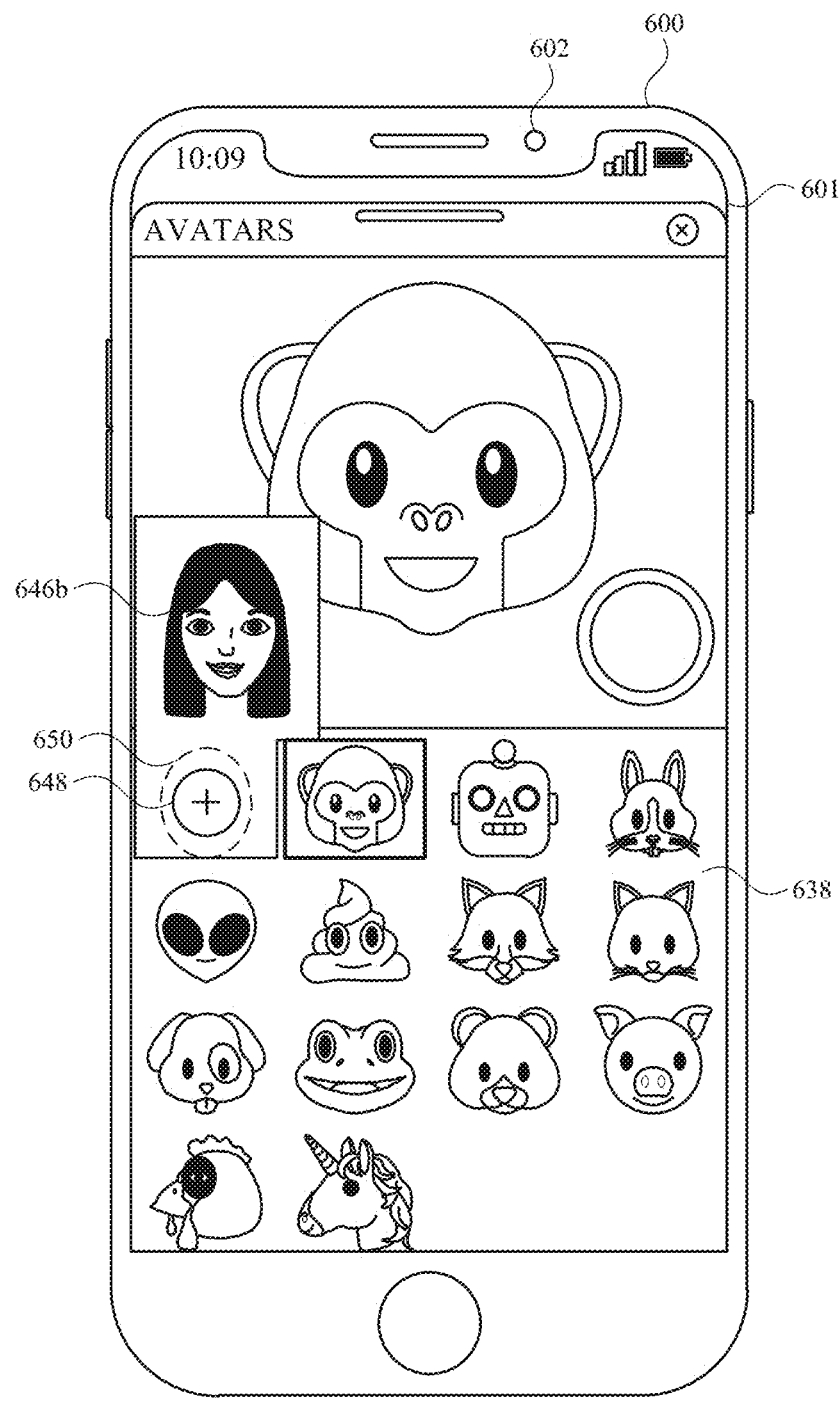

In some embodiments, avatar creation prompt 646 appears after a slight delay and displays an animation of various example customizable avatars appearing and, for example, changing facial expressions. For example, in FIG. 6I, avatar creation prompt 646 shows example customizable avatar 646a having an appearance of a man wearing a hat and glasses and having a slight smiling facial expression. In FIG. 6J, avatar creation prompt 646 transitions to show example customizable avatar 646b having an appearance of a woman with dark hair parted in the middle and having a full smiling facial expression.

In some embodiments, device 600 displays new customizable avatars, such as those created after selecting avatar creation icon 648, appearing in avatar option region 638 at an end of the set of avatar options 640, but not between any two non-customizable avatars. For example, all newly created customizable avatars can be displayed at the back end of the set of avatars (e.g., after unicorn avatar option 640b, but not between unicorn avatar option 640b and chicken avatar option 640c) or at the front end of the set of avatars (e.g., next to avatar creation icon 648 or between avatar creation icon 648 and monkey avatar option 640a). Thus, all customizable avatars are displayed grouped together and separate (e.g., segregated or set apart) from non-customizable avatars. This separation of customizable and non-customizable avatars is maintained in the various user interfaces described with respect to FIGS. 6A-6AN.

In FIG. 6J, device 600 detects input 650 (e.g., a tap gesture on display 601) at a location corresponding to avatar creation icon 648.

Figure 6K:
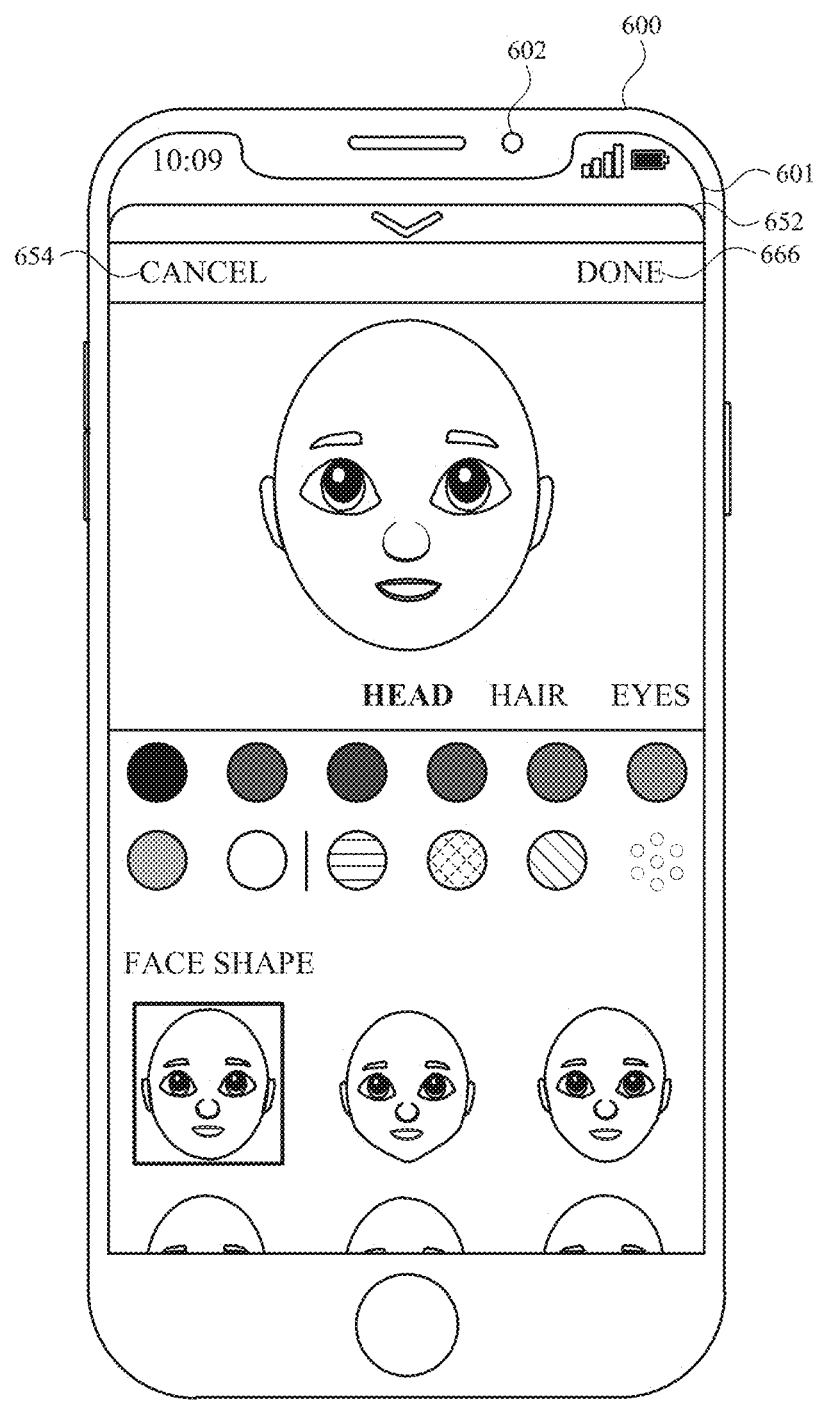

In FIG. 6K, in response to detecting input 650, device 600 displays avatar editing user interface 652 having cancel affordance 654 and done affordance 666. Avatar editing user interface 652 is similar to avatar editing user interface 801 shown in FIG. 8A. Avatar editing user interface 652 can be used to create a customizable avatar in accordance with the disclosure provided below for FIGS. 8A-8CF. For the sake of brevity, details regarding creating and editing an avatar are not repeated here, but can be found in the disclosure below (e.g., FIGS. 8A to 8CE and related disclosure).

Figure 6L:
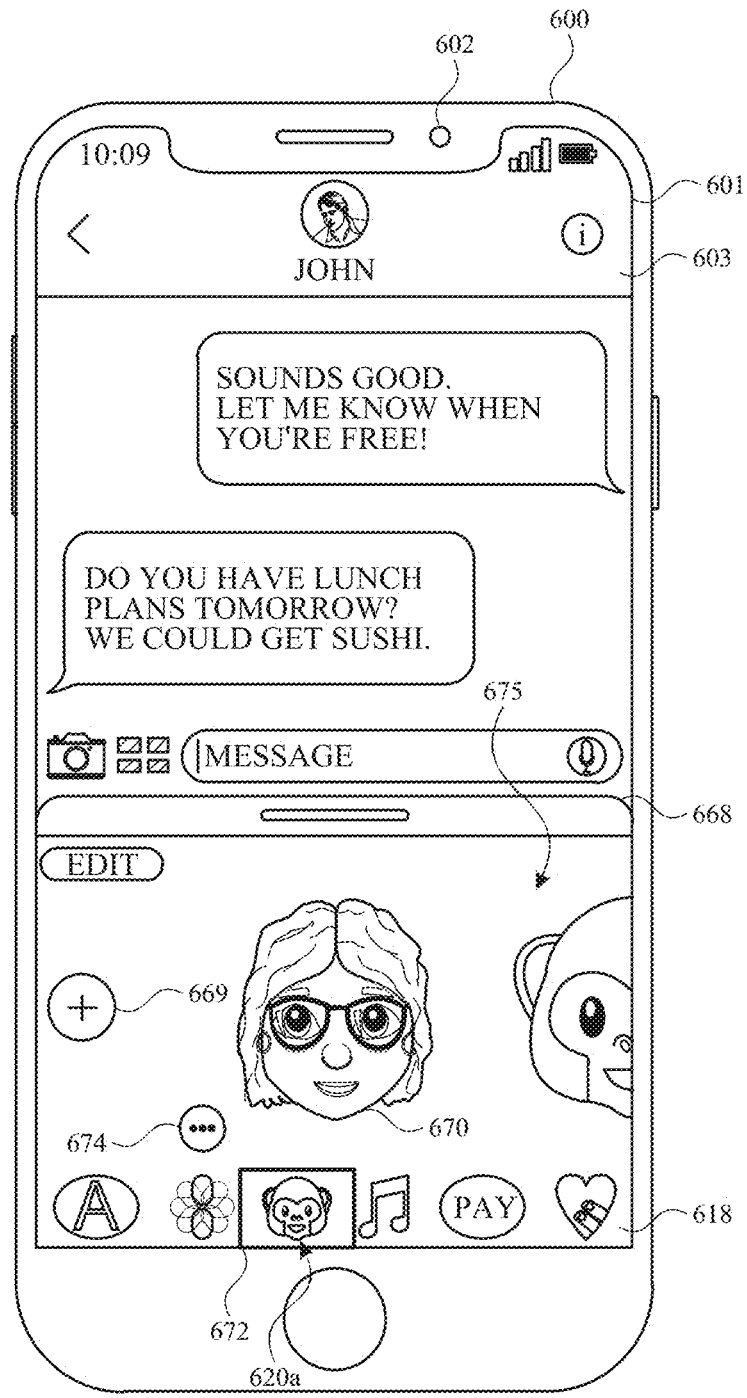

After a user has customized an avatar in avatar editing user interface 652, the user can select done affordance 652 to save the avatar as a new customized avatar (shown as customizable woman avatar 670 in FIG. 6L). In response to detecting the selection of done affordance 652, device 600 saves the new customized avatar and displays messaging user interface 603 having condensed avatar selection interface 668, as shown in FIG. 6L. Alternatively, the user can select cancel affordance 654 to discard the new customized avatar and return to expanded avatar selection interface 634 shown in FIG. 6H. After device 600 saves the new customized avatar, it can be viewed in expanded avatar selection interface 634 by returning to expanded avatar selection interface 634 as discussed below. Because the new customized avatar is a customizable avatar, rather than a non-customizable avatar, when viewing the new customized avatar in expanded avatar selection interface 634, it will be located separate from the non-customizable avatars (e.g., located at an end of the set of avatar options 640, but not between any two non-customizable avatars) and grouped with other customizable avatars.

In FIG. 6L, device 600 displays condensed avatar selection interface 668, which provides a close-up view of the avatar options shown in expanded avatar selection interface 634 (e.g., avatar options 640). Condensed avatar selection interface 668 contains a scrollable listing of avatars 675 (corresponding to avatar options 640) available for user selection. Device 600 displays a currently selected avatar (e.g., woman avatar 670 in FIG. 6L) at a center position in condensed avatar selection interface 668. When the currently selected avatar is a customizable avatar (e.g., woman avatar 670), device 600 also displays option affordance 674, which can be selected to display an option menu (discussed below with respect to FIG. 6W). Different avatars can be selected in condensed avatar selection interface 668 by positioning them in the center position as discussed in greater detail below.

In FIG. 6L, condensed avatar selection interface 668 is displayed in messaging user interface 603 at a location that was previously occupied by text-suggestion region 614 and keyboard display region 612. Application dock 618 is optionally displayed under condensed avatar selection interface 668 showing selected application affordance 620a indicated by border 672. By displaying condensed avatar selection interface 668 in the messaging user interface 603, device 600 provides convenient access for a user to select an avatar for sending to a participant in the message conversation (e.g., as a sticker, image of an avatar, or recording of an avatar).

Device 600 groups displayed customized and non-customized avatars by type and arranges the groupings in series such that scrolling in one direction provides access to avatars of one type (e.g., non-customized avatars), and scrolling in the opposite direction, provides access to avatars of a different type (e.g., customizable avatars).

Device 600 displays customizable woman avatar 670 in the center of condensed avatar selection region 668 and at a border region between customizable and non-customizable avatars (e.g., having customizable avatars on one side of woman avatar 670 and non-customizable avatars on the other side of woman avatar 670—see also FIGS. 6AE-6AG). Thus, scrolling the displayed listing of avatars 675 in one direction displays non-customizable avatars, and scrolling in the opposite direction displays customizable avatars. In some embodiments, the listing of avatars 675 can be scrolled to display avatar creation affordance 669 (similar in function to avatar creation icon 648), positioned at an end of the customizable avatars opposite the non-customizable avatars such that avatar creation affordance 669 is positioned at one end of the grouping of customizable avatars, and the grouping of non-customizable avatars is positioned at the opposite end of the grouping of customizable avatars. In such embodiments, avatar creation affordance 669 can be selected to create a new customizable avatar in a manner similar to that discussed above with respect to FIGS. 6I-6K.

As shown in FIGS. 6M-6R, device 600 modifies avatars displayed in condensed avatar selection interface 668 (e.g., customizable woman avatar 670) in response to detected changes in a face. For reference, FIGS. 6M-6R include a representation of a face 673 detected in a field of view of a camera (e.g., 602). FIGS. 6M-6R show modifications to a displayed avatar (e.g., customizable avatar 670 and non-customizable avatar 671) in response to detected changes in face 673. In some embodiments, the view of face 673 in FIGS. 6M-6R is shown from a perspective of the device, which is positioned facing face 673. Thus, corresponding changes to the displayed avatar are shown in FIGS. 6M-6R mirrored with respect to the movements of face 673.

Figure 6M:
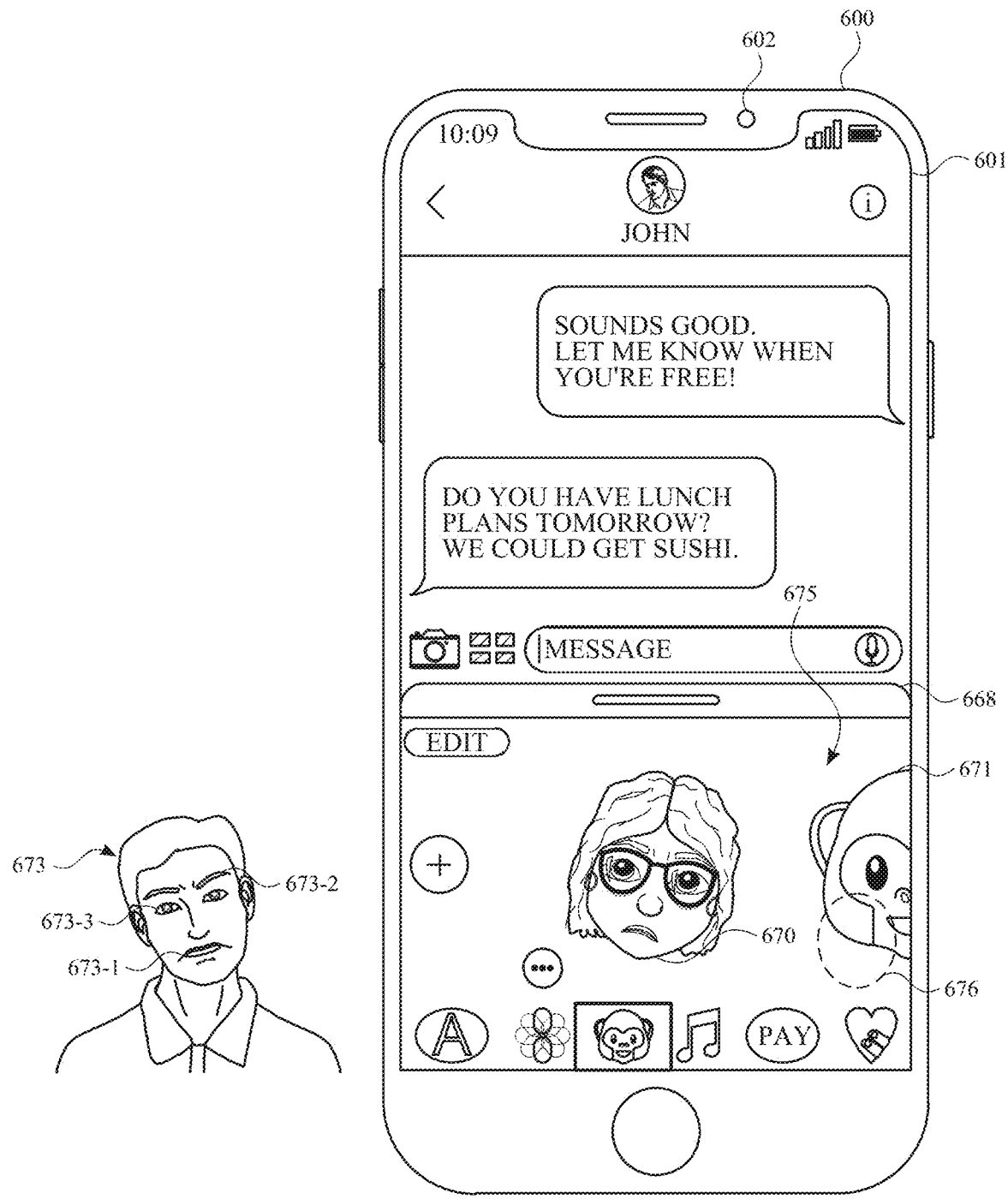

In FIG. 6M, device 600 detects face 673 tilted and making a frowning expression with lips 673-1 turned downward, eyebrows 673-2 furrowed, and eyes 673-3 slightly squinting. In response, device 600 modifies the displayed avatar, customizable avatar 670, to have the same facial expression (e.g., head tilted with frowning expression).

Figure 6N:
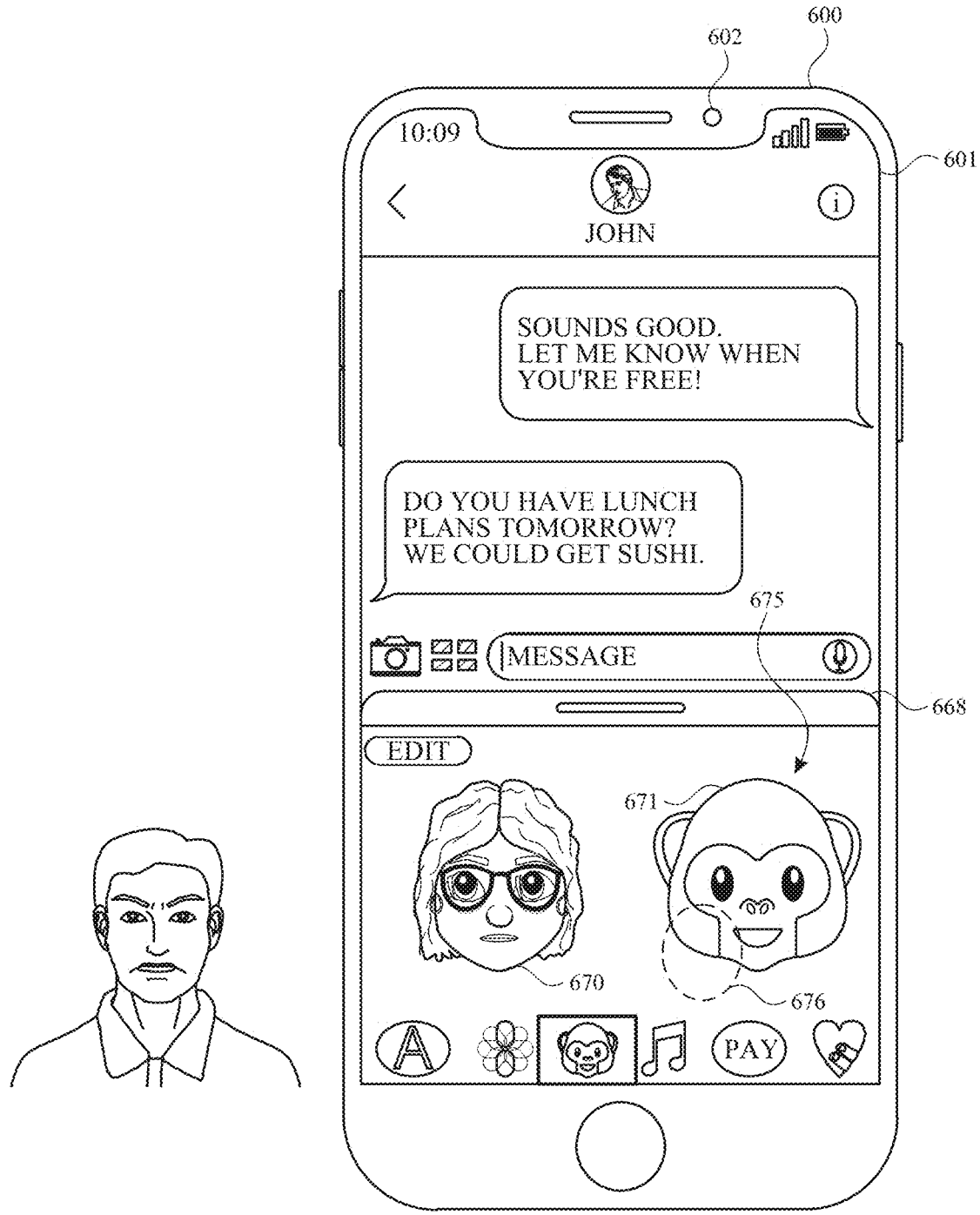
Figure 6O:

In FIGS. 6M-6O, device 600 detects horizontal gesture 676 (e.g., a swipe or touch-and-drag input on display 601) starting on a right side of the listing of avatars 675, and moving to the left towards the left side of the listing of avatars 675. In response to detecting horizontal gesture 676, device 600 displays the listing of avatars 675 scrolling to the left, based on the magnitude (and direction) of horizontal gesture 676, such that customizable woman avatar 670 is scrolled to the left, and non-customizable monkey avatar 671 is scrolled to the center of the condensed avatar selection interface 668.

As woman avatar 670 is scrolled from the center position in FIG. 6M to a leftward-shifted position in FIG. 6O, device 600 displays an animation of woman avatar 670 transitioning from the 3D, face tracking state in FIG. 6M (with avatar 670 having a pose matching the pose of face 673) to a static state in FIG. 6O (with avatar 670 having a default pose that is not determined based on the pose of face 673). When displaying the animated transition, device 600 stops modifying woman avatar 670 based on face 673 (although face 673 can still optionally be tracked by device 600). For example, face 673 still has the frowning pose in FIGS. 6N and 6O, but now without the head tilt, whereas woman avatar 670 has a different pose than face 673 in both FIGS. 6N and 6O.

FIG. 6N shows an intermediate state of the animation of avatar 670 moving from the face tracking state in FIG. 6M, to the static position in FIG. 6O. In FIG. 6N, device 600 is not modifying woman avatar 670 based on the detected face 673, and is instead showing woman avatar 670 transitioning from the frown in FIG. 6M to the static smiling pose in FIG. 6O. Specifically, FIG. 6N shows the woman avatar's head is moved to an upright position, her mouth is in a position between a frown and a smile (e.g., between the mouth position of the detected face and the mouth position of the static avatar), and she is not furrowing her eyebrows.

FIG. 6N also shows monkey avatar 671 in a slightly off-center position as monkey avatar 671 is moving from the right-shifted position in FIG. 6M to the center position in FIG. 6O. Monkey avatar 671 has a static smiling pose in FIGS. 6M-6O.

In FIG. 6O, woman avatar 670 is completely shifted to the left position with the static smiling pose, and monkey avatar 671 is in the center position. Device 600 is not yet modifying monkey avatar 671 based on detected face 673. In some embodiments, device 600 produces a haptic feedback (e.g., a tactile output) and, optionally, an audio output to indicate when scrolling avatars 675 are positioned in the center of condensed avatar selection interface 668. This haptic feedback informs a user that an avatar is positioned such that releasing horizontal gesture 676 causes device 600 to select that avatar.

Figure 6P:

After the monkey appears in the center of the screen in FIG. 6O, device 600 detects termination of input 676 and resumes modifying the centered avatar (e.g., monkey avatar 671) based on detected face 673 in FIG. 6P. Thus, in FIG. 6P, monkey avatar 671 assumes the frowning pose of face 673 (e.g., device 600 modifies monkey avatar 671 to transition from the static pose to the pose of face 673).

In some embodiments, as a user scrolls through the listing of avatars 675, as each avatar stops in the center position of the condensed avatar selection interface 668, device 600 modifies the avatar to assume the pose (e.g., position and facial expression) of face 673. Thus, a user can hold a particular facial expression, and device 600 will modify the center avatar to match the facial expression. As the user holds the facial expression and swipes to a different avatar, device 600 displays an animation of the currently selected avatar transitioning from the held facial expression of the user's face to a static, default pose, while the next avatar is scrolled to the center position. Device 600 then displays the next avatar transitioning from its static pose to the user's held facial expression. In some embodiments, device 600 does not begin to modify an avatar positioned in the center of condensed avatar selection interface 668 (either in response to a detected face or as an animated transition from a tracked face to a static pose), until after the avatar pauses in the centered position. Thus, as a user quickly scrolls through the listing of avatars 675 (e.g., scrolling the avatars without stopping on an avatar), device 600 does not animate or modify the avatars, based on a detected face, as they are scrolling.

Because monkey avatar 671 is a non-customizable avatar selected in FIG. 6P, device 600 does not display option affordance 674. Because customizable avatars and non-customizable avatars are grouped as previously discussed, continued scrolling in the left direction causes device 600 to display additional non-customizable avatars (e.g., such as robot avatar 678), but not customizable avatars. Customizable avatars can be displayed by scrolling in the right direction, as discussed below with respect to FIGS. 6Q and 6R.

Figure 6Q:
Figure 6R:

In FIGS. 6Q and 6R, device 600 detects horizontal gesture 680 (e.g., a swipe or touch-and-drag input on display 601) moving to the right towards the right side of the listing of avatars 675. In response to detecting horizontal gesture 680, device 600 displays the listing of avatars 675 scrolling to the right, based on the magnitude (and direction) of horizontal gesture 680, such that non-customizable robot avatar 678 is scrolled off display 601, monkey avatar 671 is scrolled to the right-shifted position, and customizable woman avatar 670 is scrolled to the center of the display. Because customizable avatars and non-customizable avatars are grouped as previously discussed, continued scrolling in the right direction causes device 600 to display additional customizable avatars (or, optionally, avatar creation affordance 669) but not non-customizable avatars. Non-customizable avatars can be displayed by scrolling in the left direction, as previously discussed.

FIGS. 6Q and 6R also illustrate scrolling the avatars with an animated transition similar to that described above with respect to FIGS. 6M-6P, but moving in the opposite direction. In FIGS. 6Q and 6R, as the avatars shift to the right, device 600 animates the transition of monkey avatar 671 from the face tracking state in FIG. 6P, to the static state shown in FIG. 6R, with a transitional appearance shown in FIG. 6Q. For example, in FIG. 6P, device 600 is modifying monkey avatar 671 based on face 673 (e.g., monkey avatar 671 has a pose matching that of face 673). As shown in FIGS. 6Q and 6R, device 600 stops modifying monkey avatar 671 based on face 673 (e.g., face 673 maintains the frowning expression, but monkey avatar 671 has a different pose), and displays an animated transition of monkey avatar 671 moving from the pose of FIG. 6P to the static appearance in FIG. 6R. FIG. 6Q shows an intermediate state of the animated transition with monkey avatar 671 having its mouth in a position between a frown and a smile, and its eyebrows in a non-furrowed position. Woman avatar 670 is shifted slightly to the right, moving to the center position, while maintaining the static, default smiling pose.

In FIG. 6R, the woman avatar 670 is positioned in the center of condensed avatar selection interface 668 with the static, smiling pose. Monkey avatar 671 is in the right-shifted position with the static pose (the static pose for monkey avatar 671 is also a smiling pose similar to the static pose for woman avatar 670, but the static poses can be different for each avatar). Face 673 is transitioned to a neutral pose (e.g., a slight smile with no furrow of the eyebrows in FIG. 6R, device 600 is not modifying woman avatar 670 based on detected face 673.

Figure 6S:
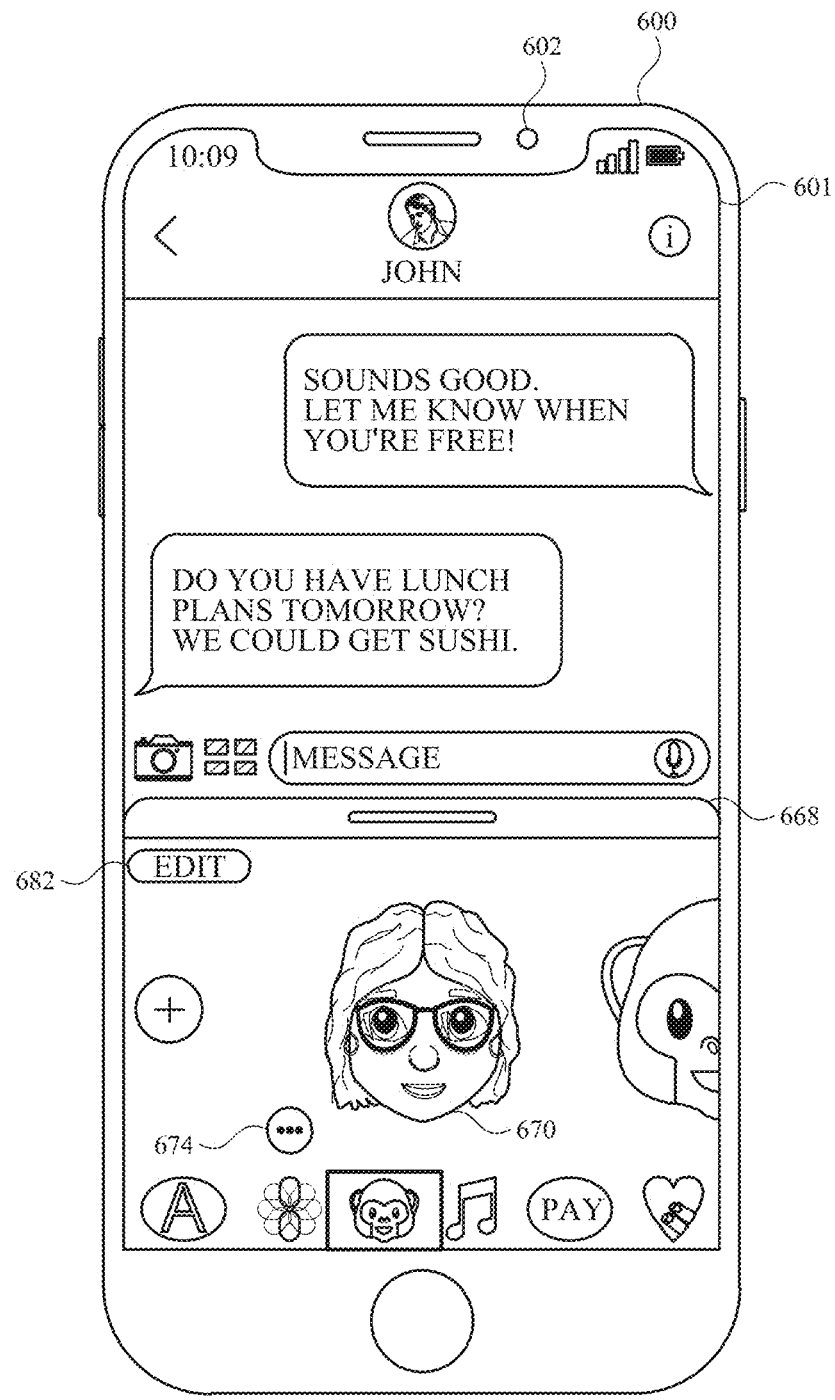

In FIG. 6S, device 600 displays customizable woman avatar 670 selected by being positioned in the center of condensed avatar selection interface 668. Again, because woman avatar 670 is a customizable avatar, device 600 displays option affordance 674. Device 600 also displays edit affordance 682, which can be selected to access a library of avatars. In some embodiments, device 600 displays edit affordance 682 regardless of whether the displayed avatar is customizable or non-customizable.

Figure 6T:
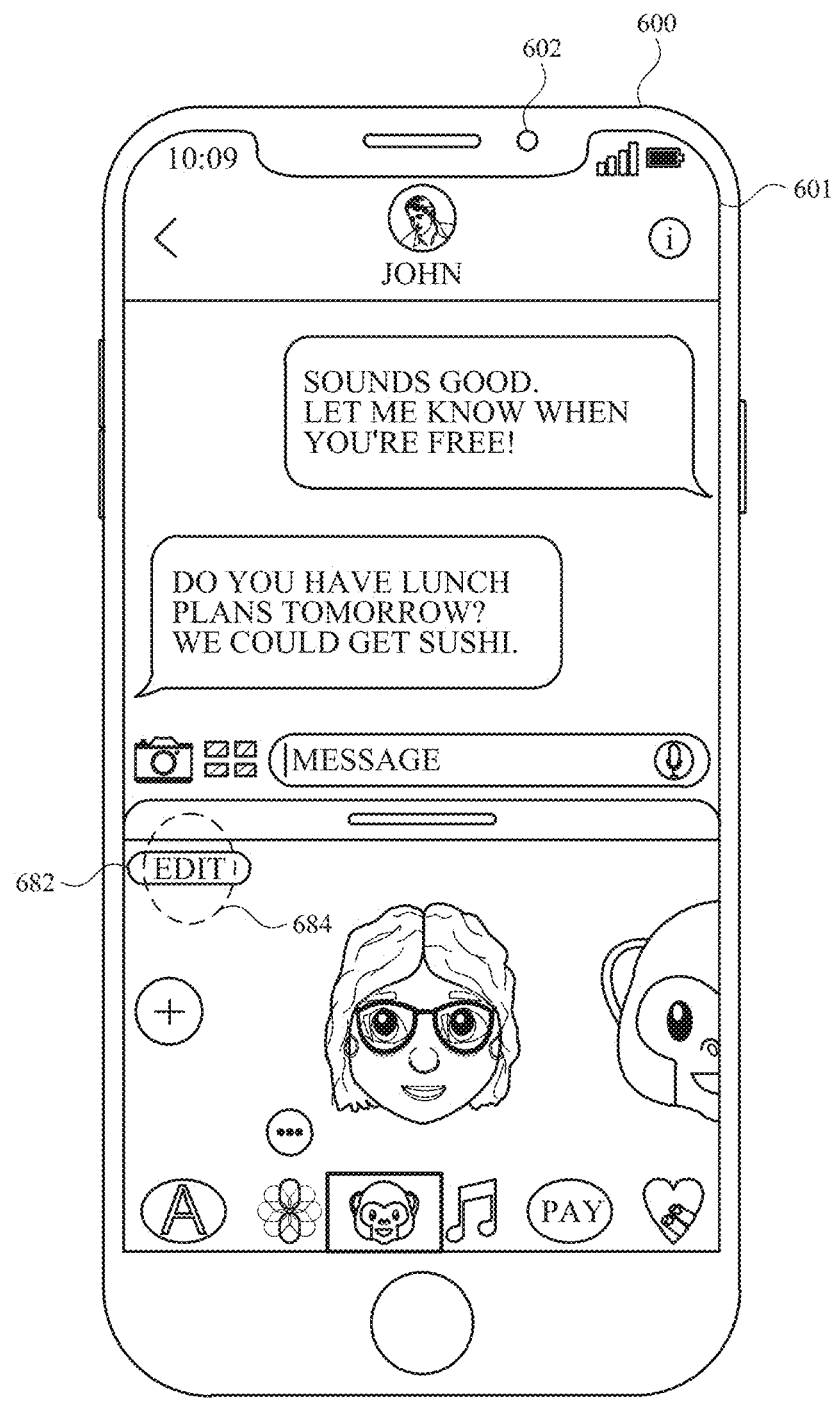

In FIG. 6T, device 600 detects input 684 (e.g., a tap gesture on display 601) on edit affordance 682. In response to detecting input 684, device 600 displays library interface 686 shown in FIG. 6U.

Figure 6U:

In FIG. 6U, device 600 displays library interface 686 in response to detecting a user input on an edit affordance (e.g., edit affordance 682). In the embodiment illustrated in FIG. 6U, device 600 shows library interface 686 having woman avatar option 670a and new customized man avatar option 688a. Woman avatar option 670a corresponds to woman avatar 670, and man avatar option 688a corresponds to man avatar 688 (shown in FIG. 6AE). In the embodiment illustrated in FIG. 6U, customized man avatar option 688a is a customizable avatar option that corresponds to a customizable man avatar (e.g., 688) that was created in accordance with the steps discussed above for FIGS. 6I-6K. For the sake of brevity, these steps are not repeated here. Device 600 displays man avatar option 668a and woman avatar option 670a (customizable avatar options) grouped together and set apart from non-customizable avatar options.

Figure 6V:

In FIG. 6V, device 600 detects input 690 (e.g., a touch input on display 601) for selecting woman avatar option 670a.

Figure 6W:
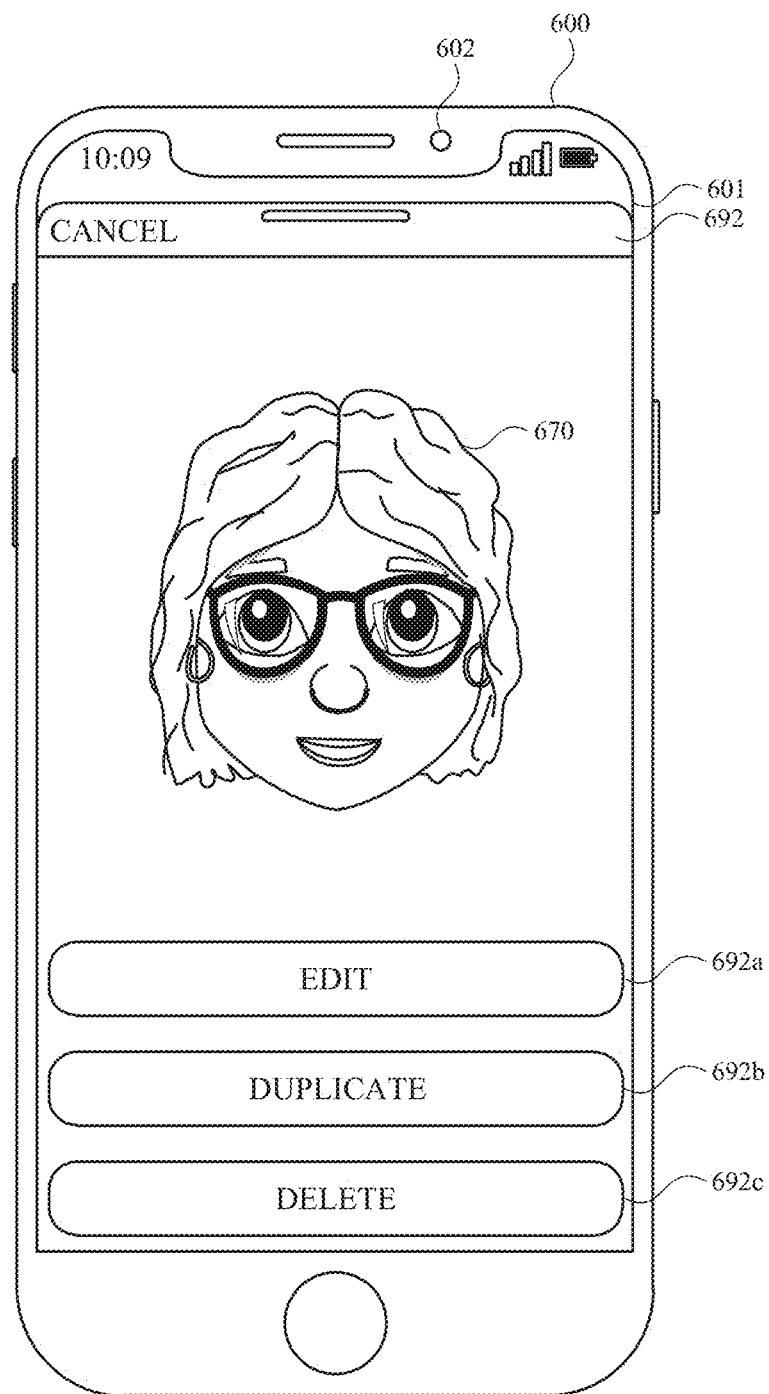

In FIG. 6W, in response to detecting input 690 to select woman avatar option 670a, device 600 displays option menu 692. Device 600 displays option menu 692 having the avatar (e.g., woman avatar 670) corresponding to the avatar option selected from library interface 686 (e.g., woman avatar option 670a) and edit option 692a, duplicate option 692b, and delete option 692c. Each of the edit, duplicate, and delete options are selectable to initiate a respective process for editing, duplicating, or deleting the avatar option (and the corresponding avatar) selected in library interface 686. In some embodiments, device 600 modifies the avatar displayed in option menu 692 in accordance with the face tracking feature discussed herein.

Figure 6X:
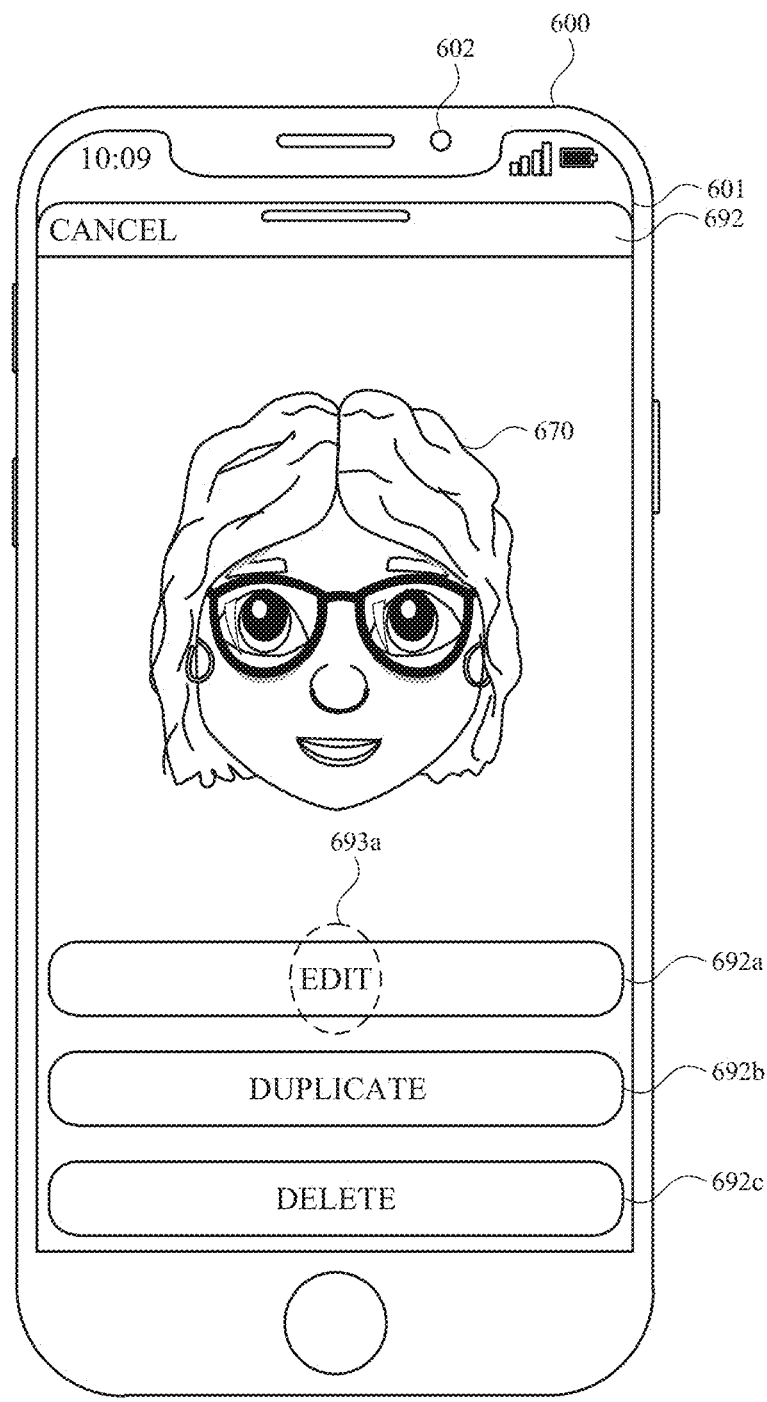

In FIG. 6X, device 600 detects input 693a (e.g., a touch input on display 601) on edit option 692a. In response to detecting input 693a, device 600 displays avatar editing user interface 694 (shown in FIG. 6Z), which is similar to avatar editing user interface 652 (but showing selected avatar 670, or a duplicate of selected avatar 670, instead of a default new avatar).

Figure 6Y:
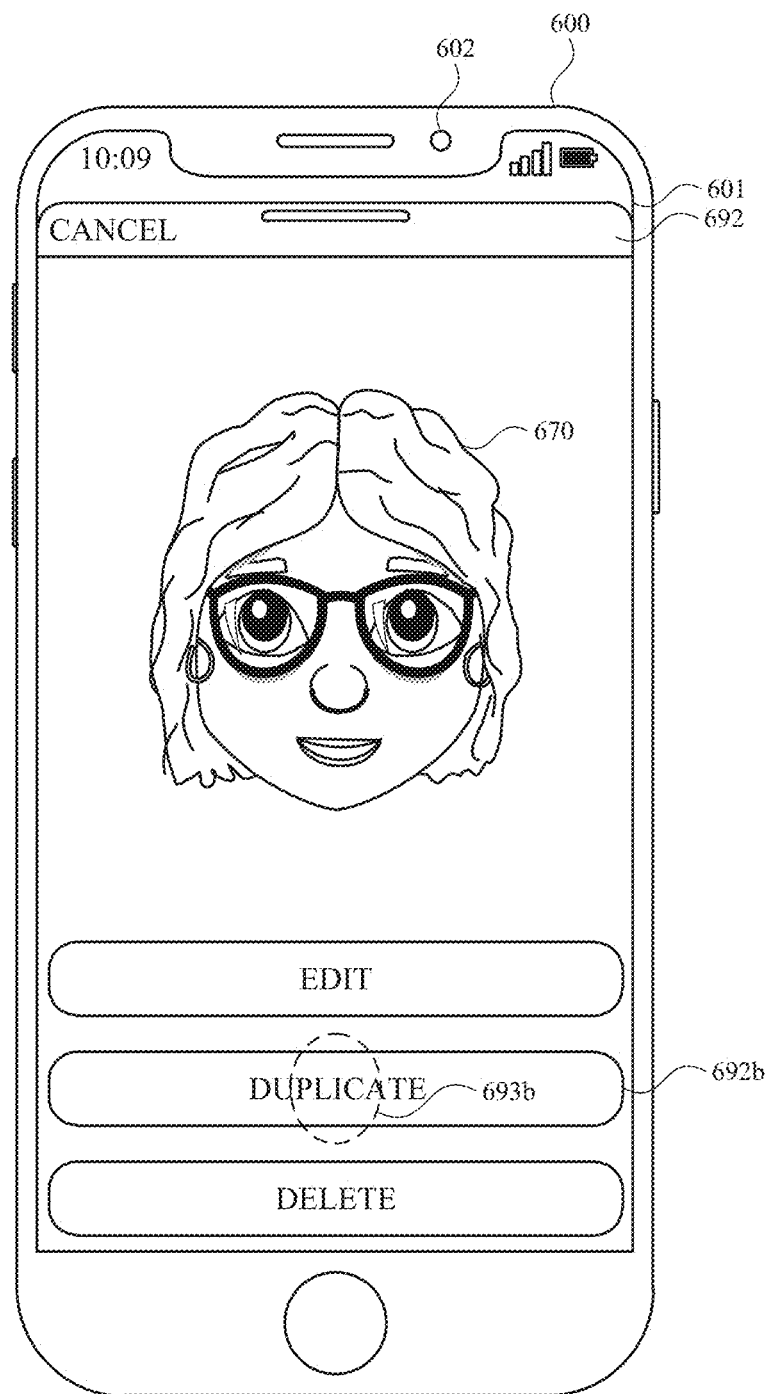

In FIG. 6Y, device 600 detects input 693b (e.g., a touch input on display 601) on duplicate option 692b. In response to detecting input 693b, device 600 creates a duplicate version of the avatar option selected in library interface 686 (e.g., a duplicate of woman avatar 670a) and a duplicate version of the corresponding avatar (e.g., woman avatar 670). Device 600 displays avatar editing user interface 694 (shown in FIG. 6Z) having the duplicated avatar.

Figure 6Z:
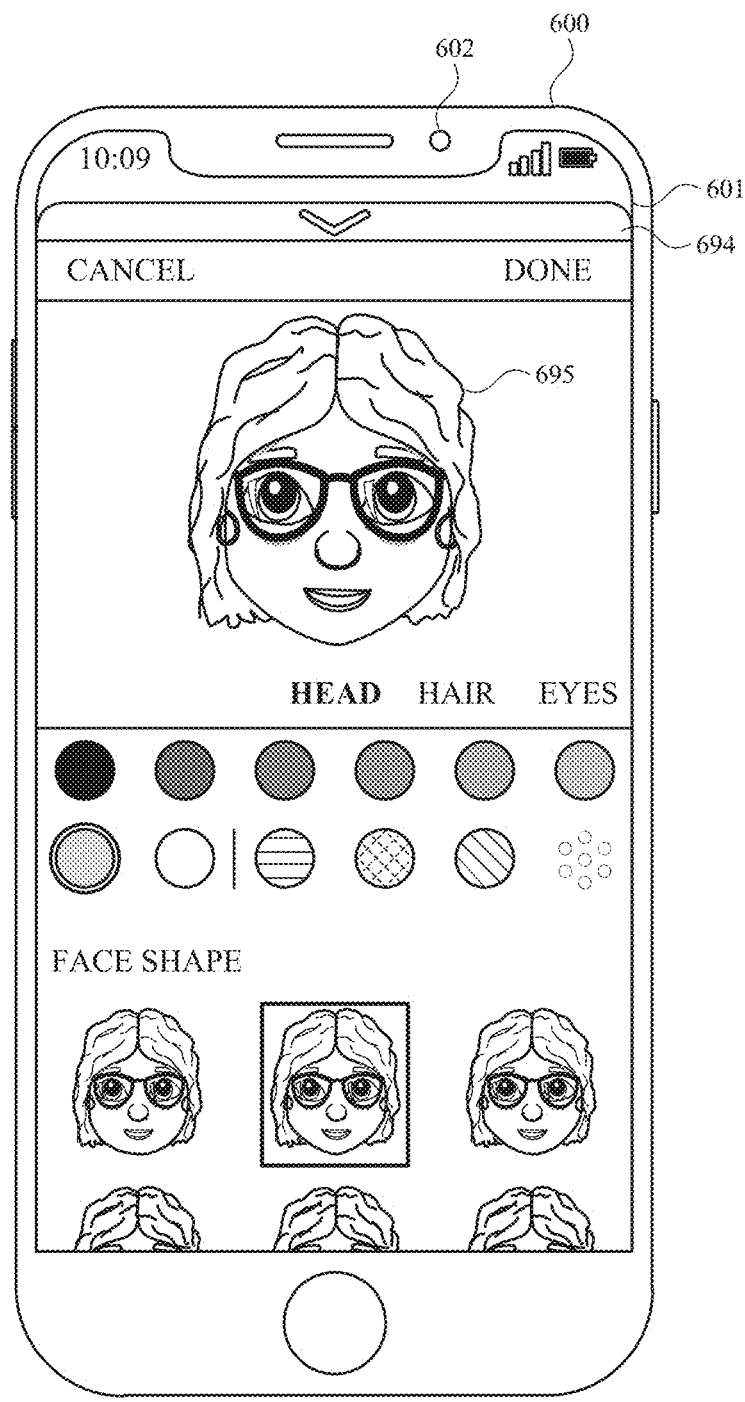
Figure 6A:
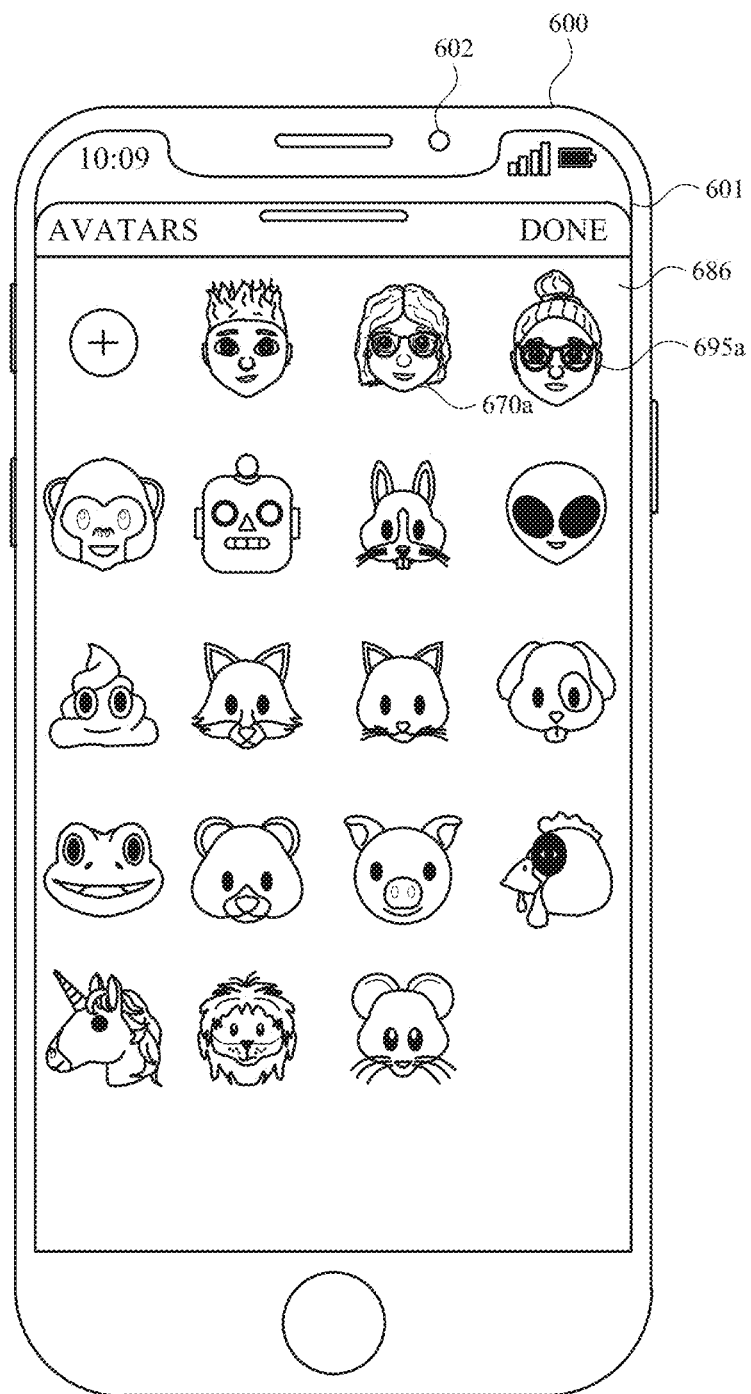
Figure 6A:
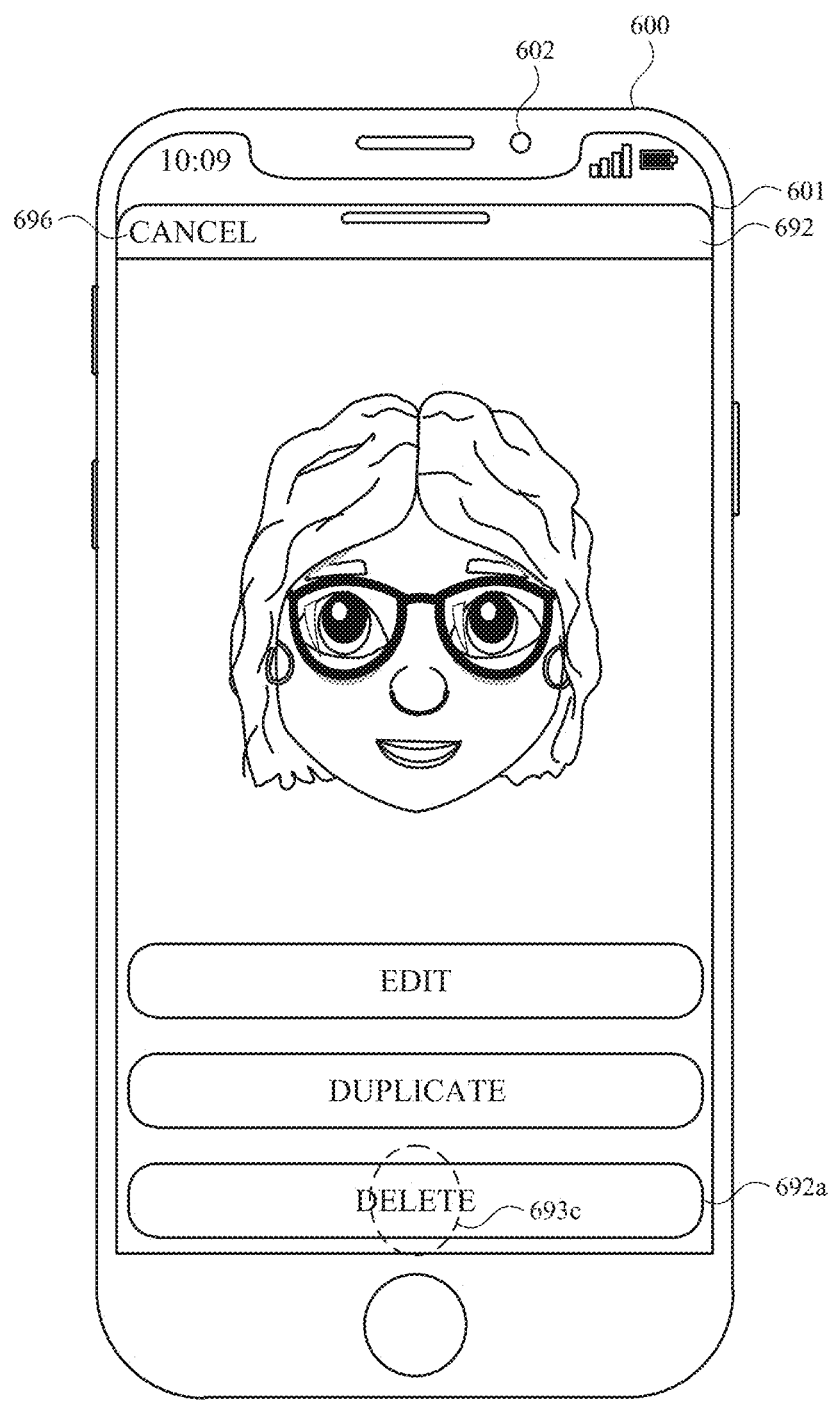
Figure 6A:
Figure 6A:
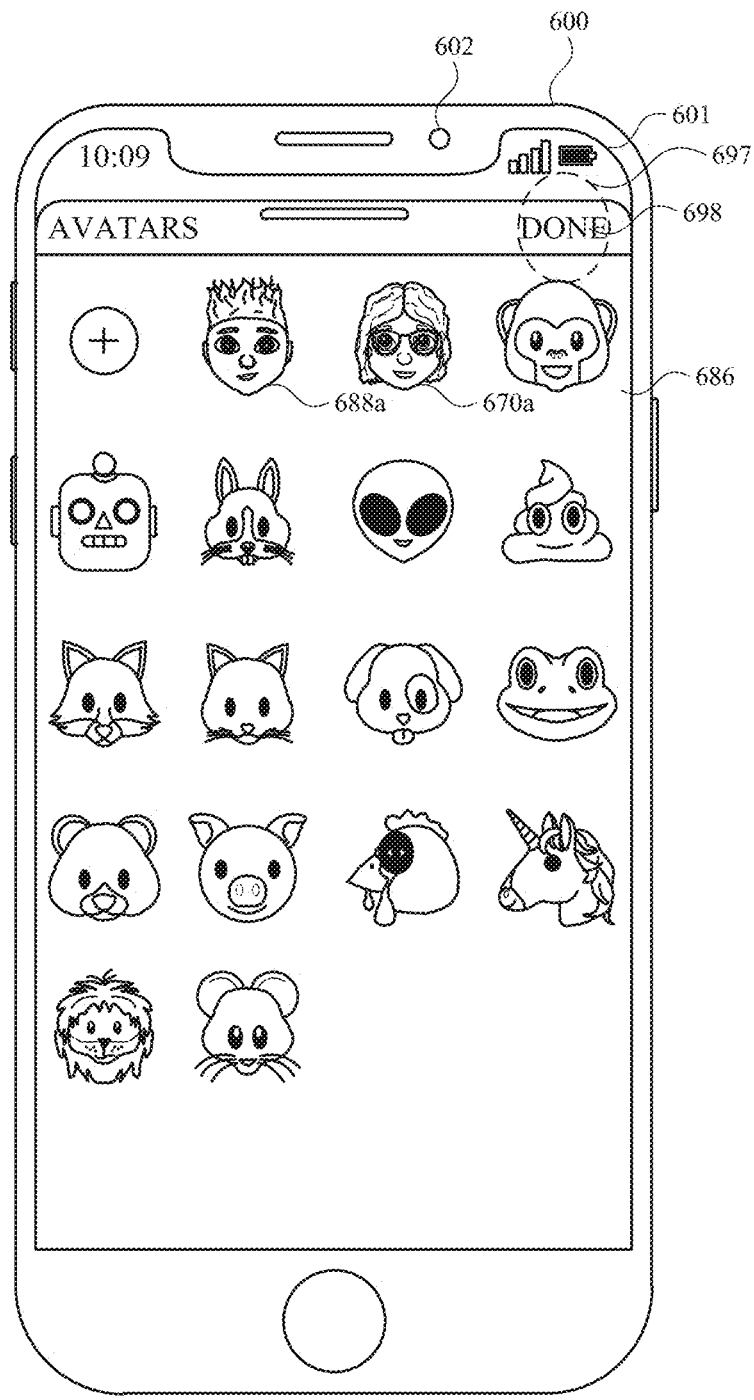
Figure 6A:
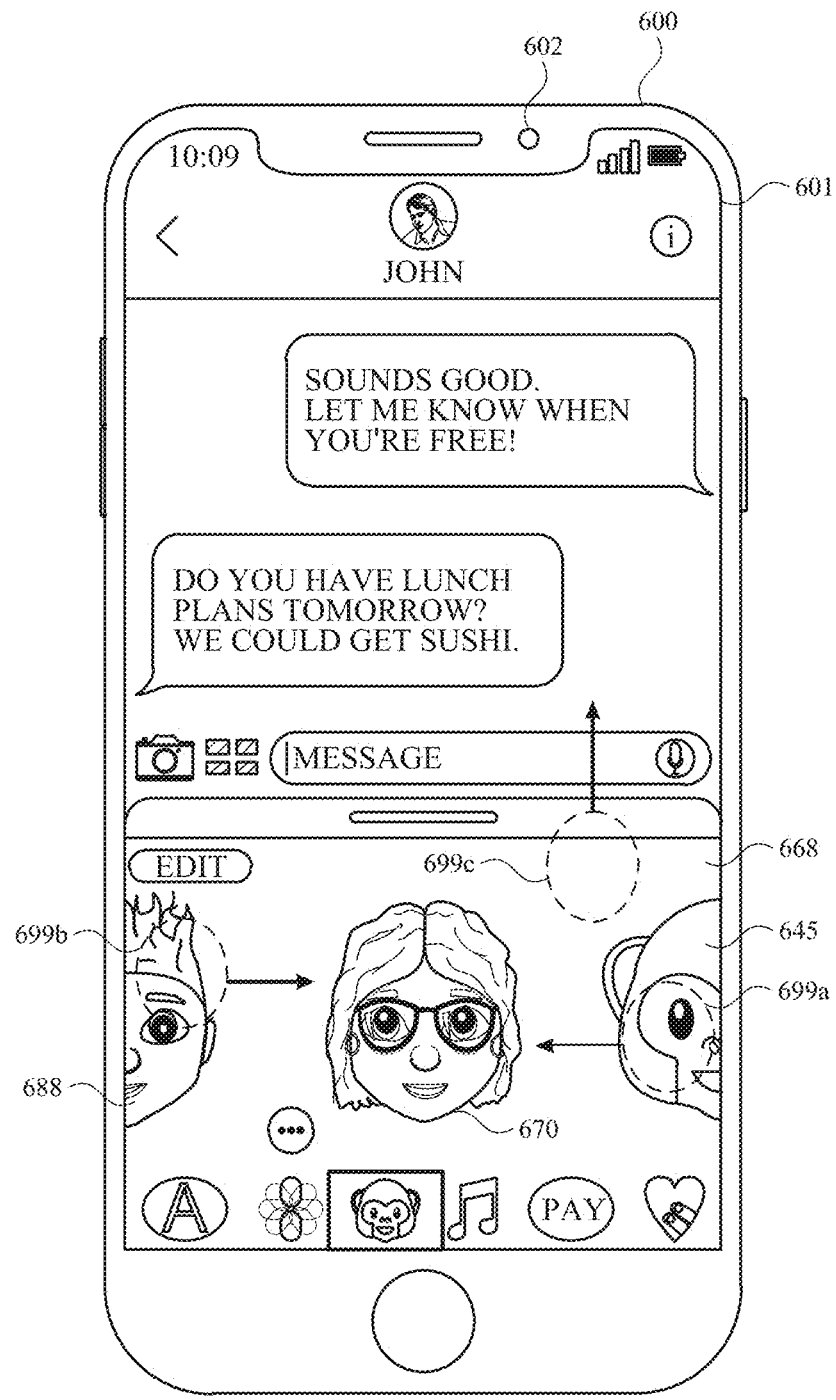
Figure 6A:
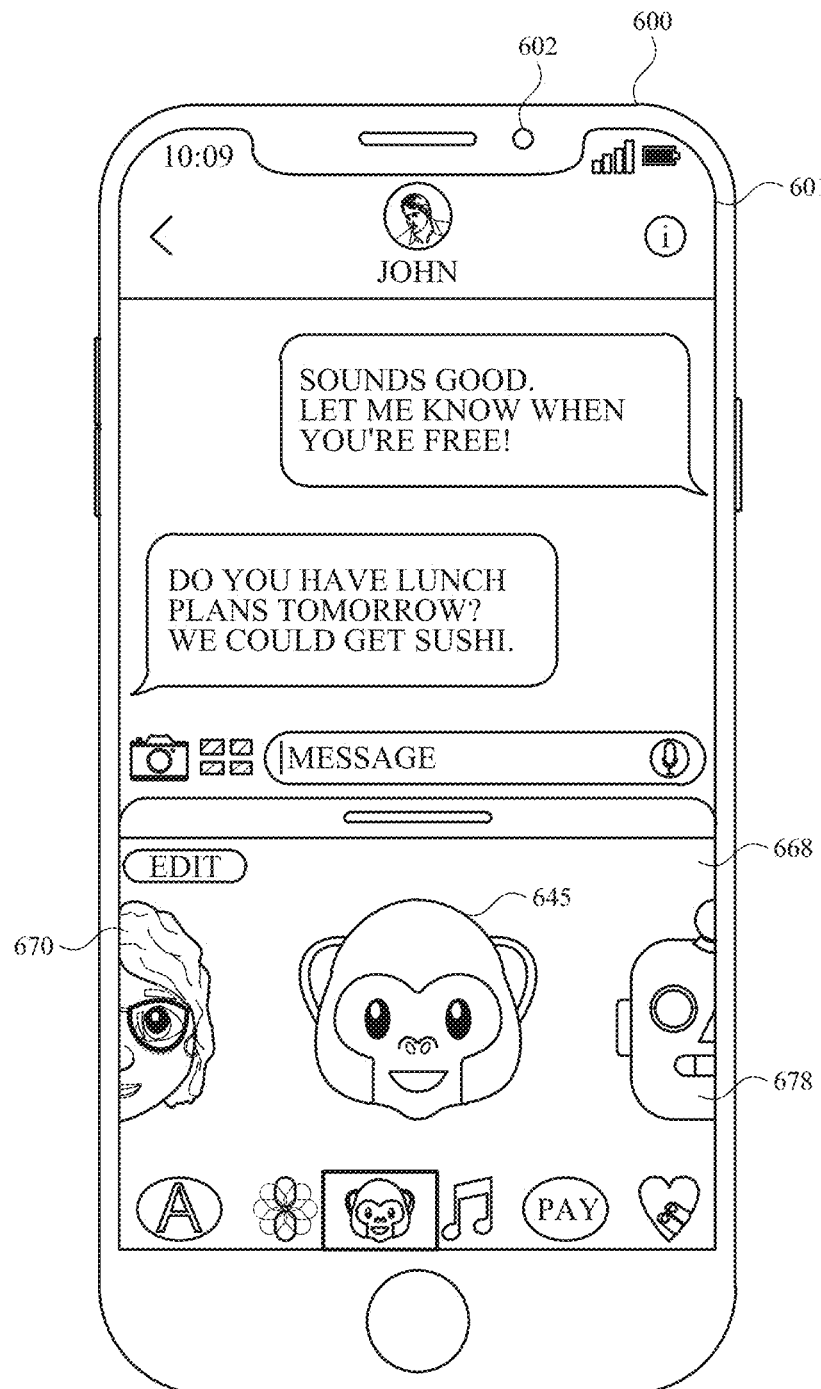
Figure 6A:
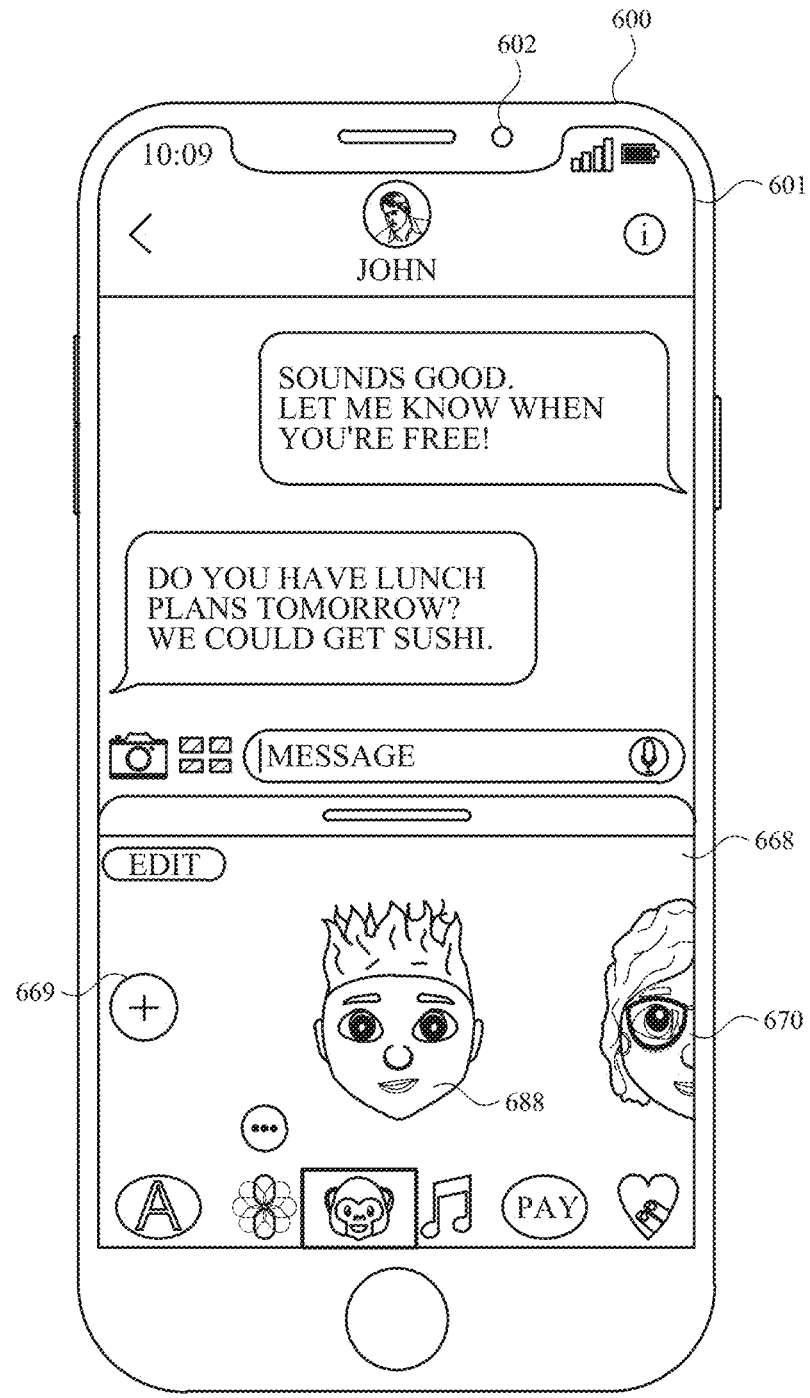
Figure 6A:
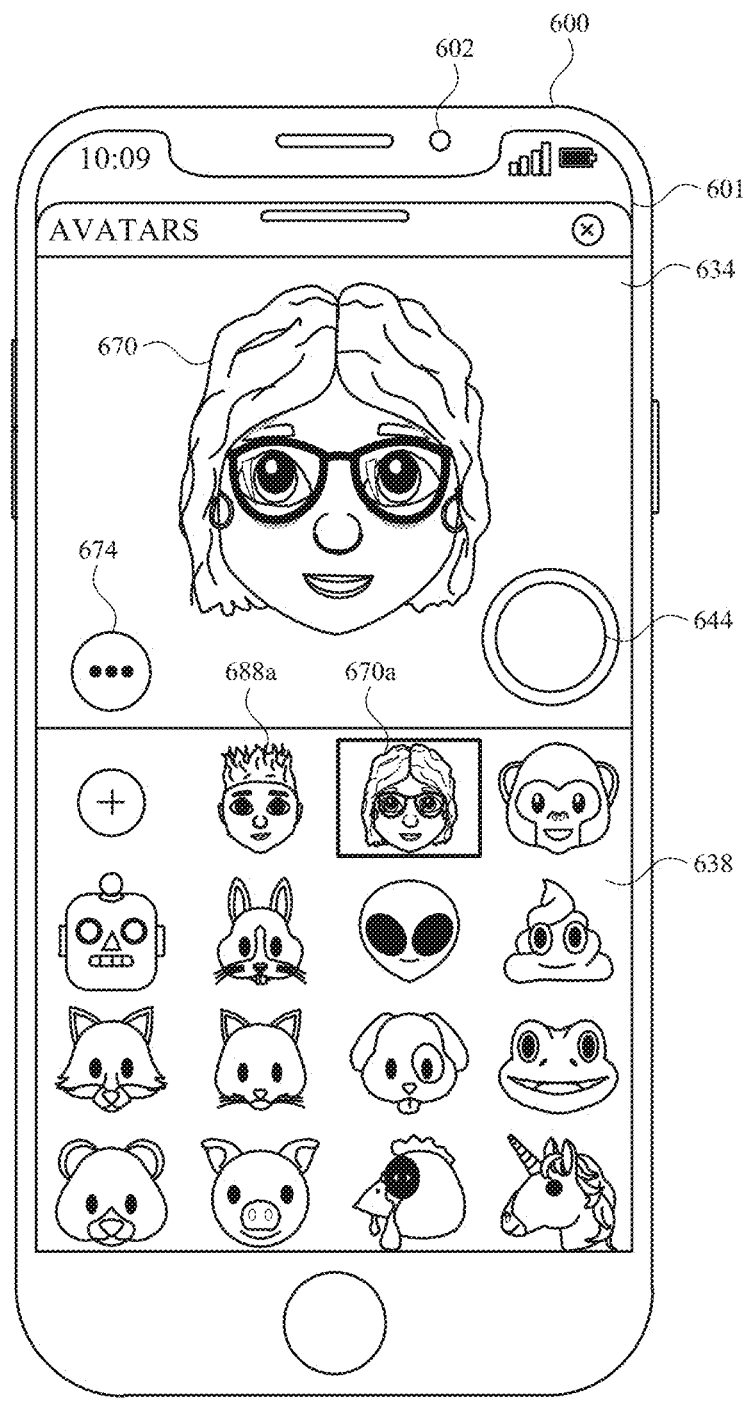
Figure 6A:
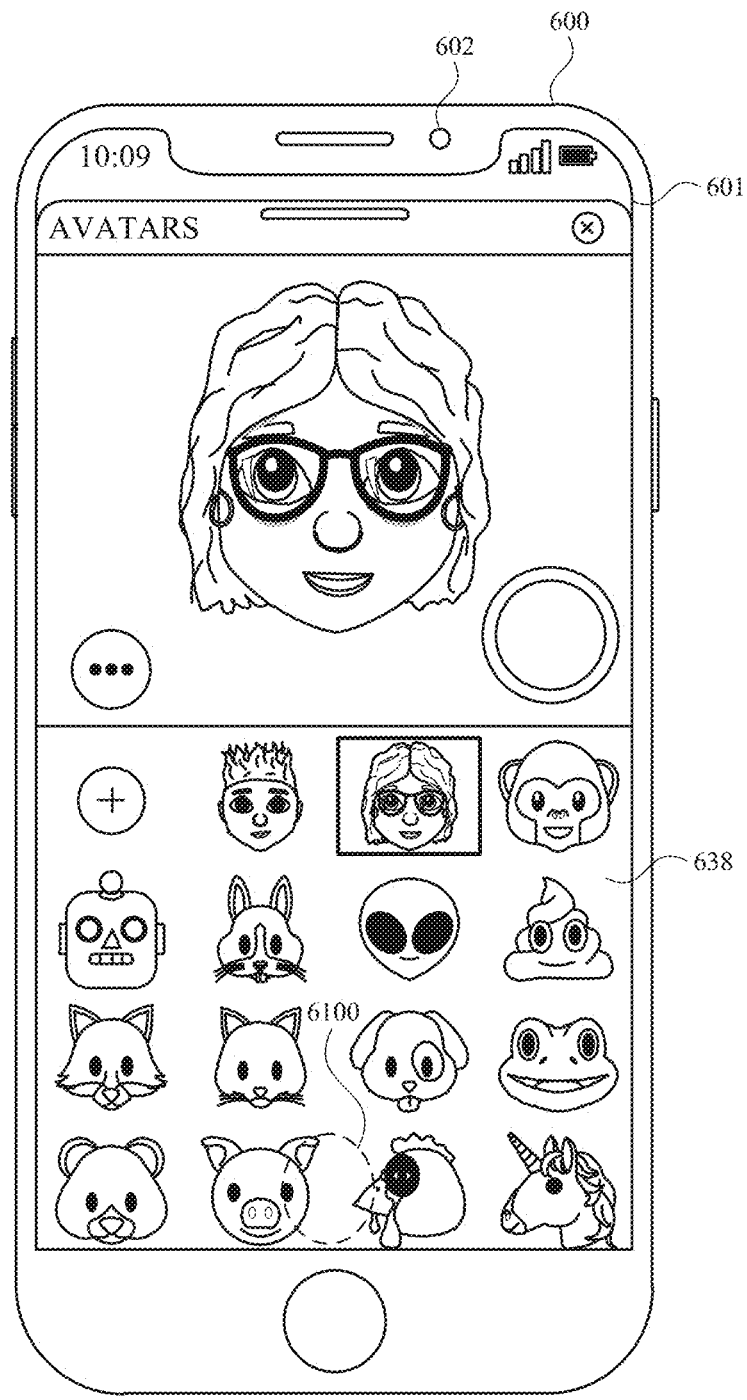
Figure 6A:
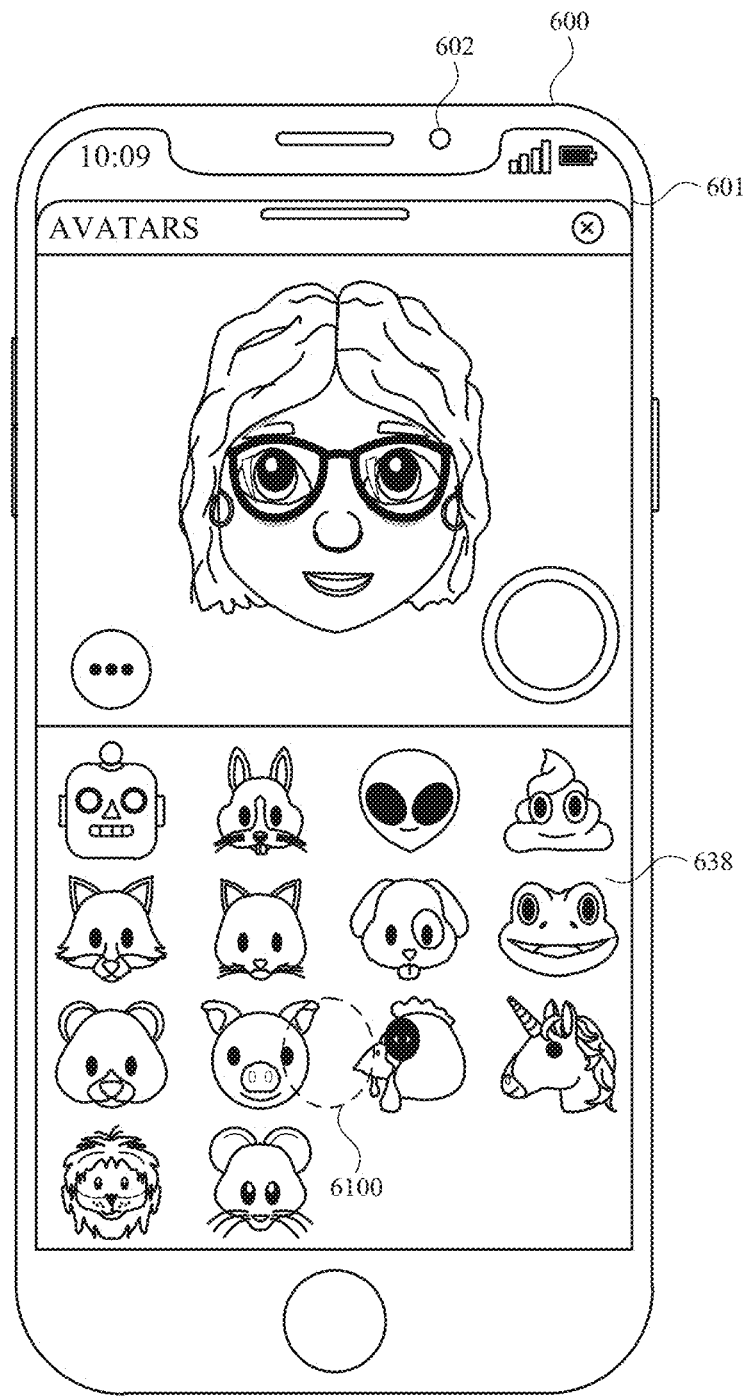
Figure 6A:
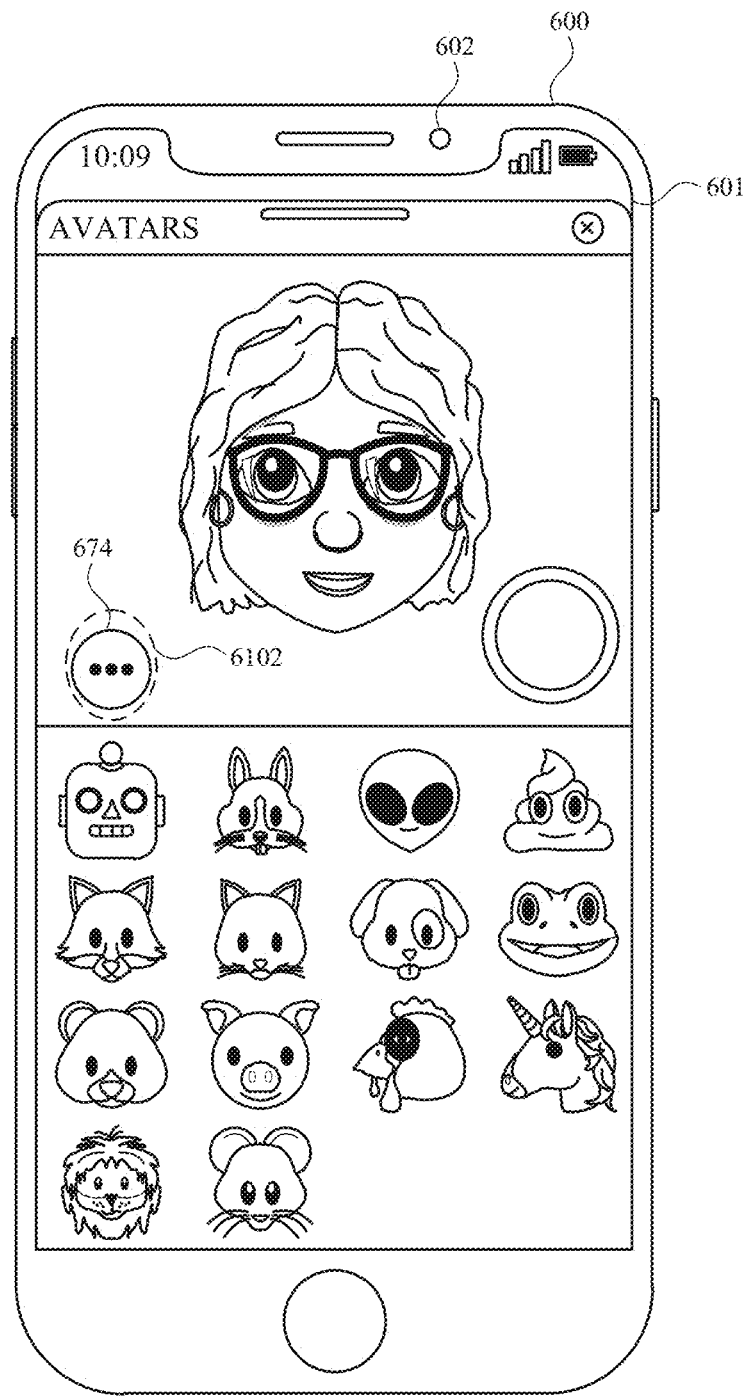
Figure 6A:
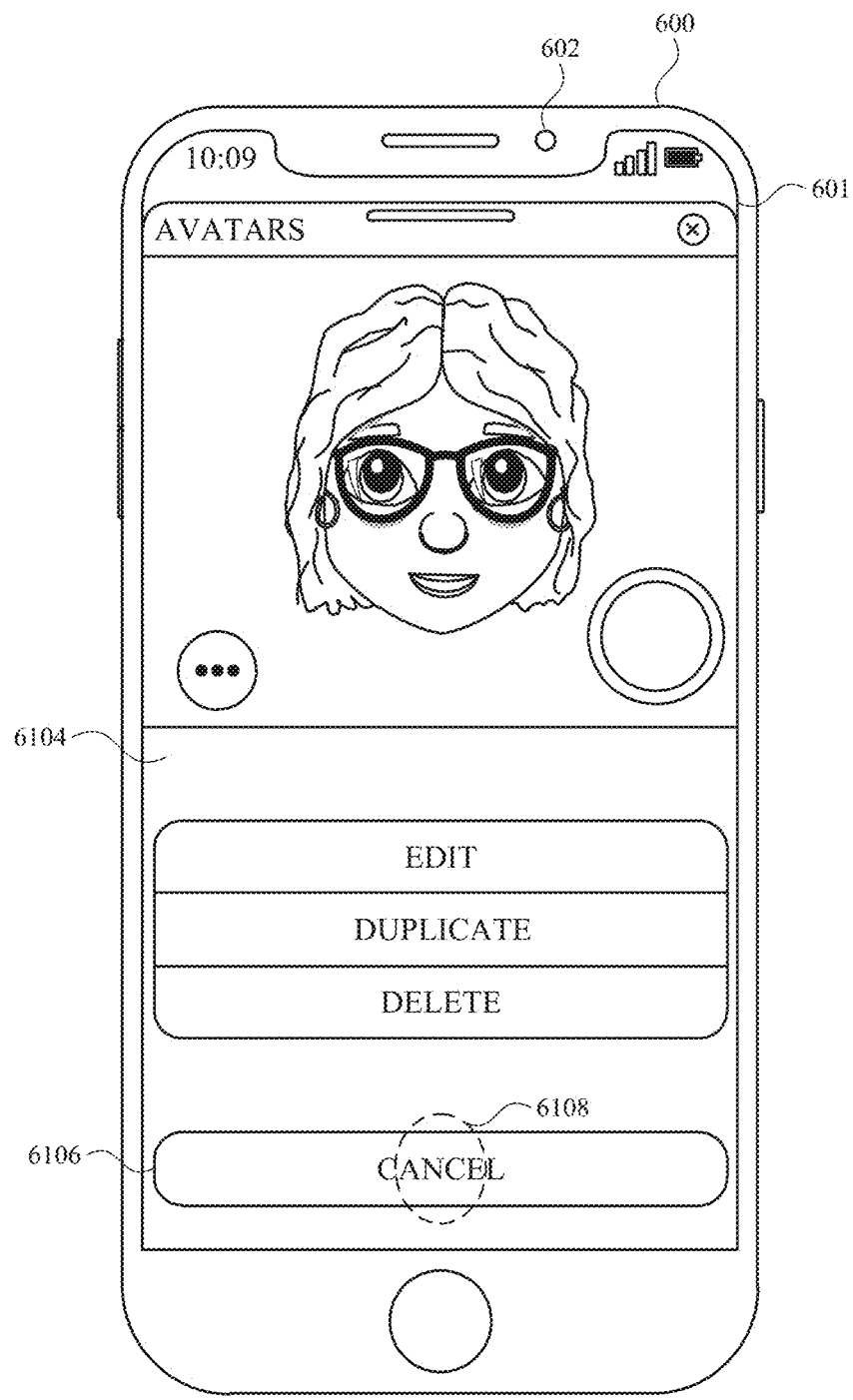
Figure 6A:
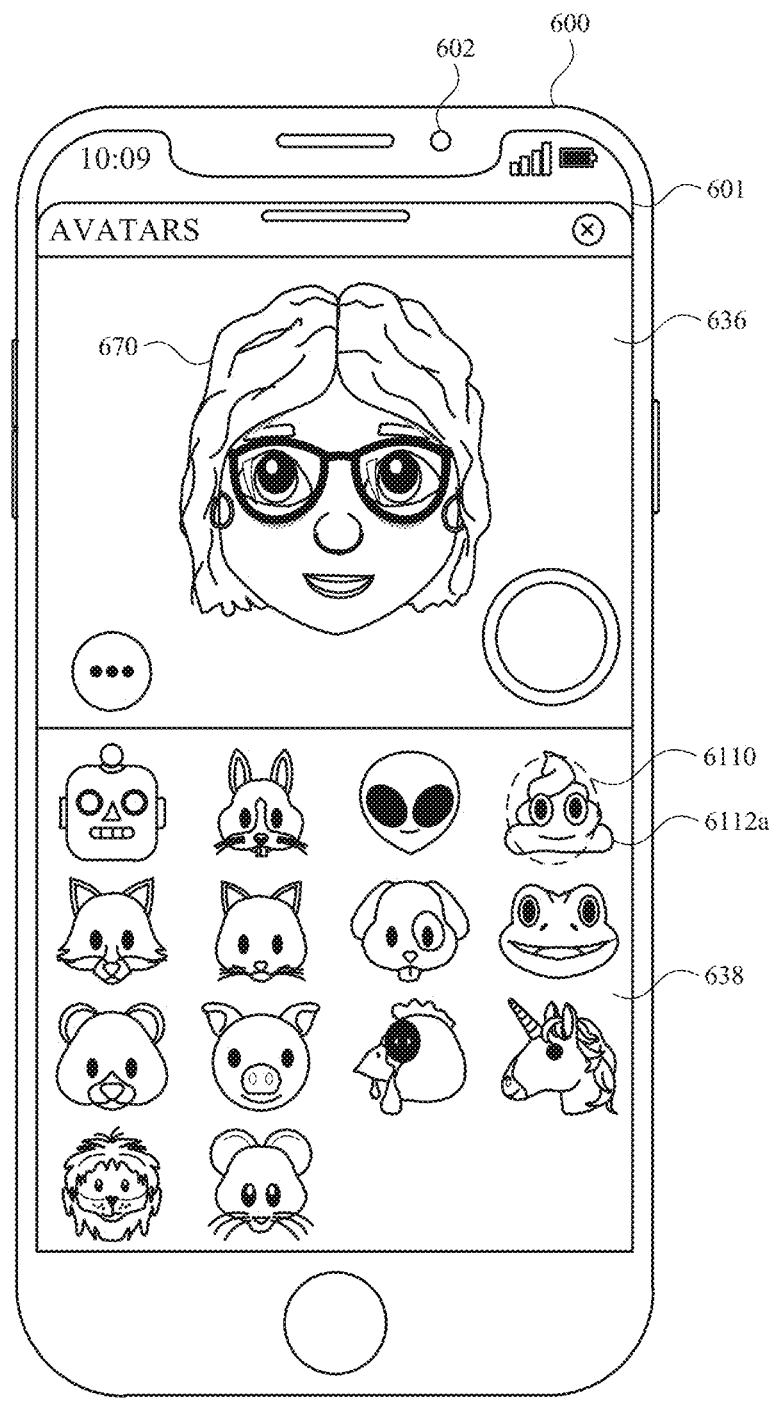
Figure 6A:
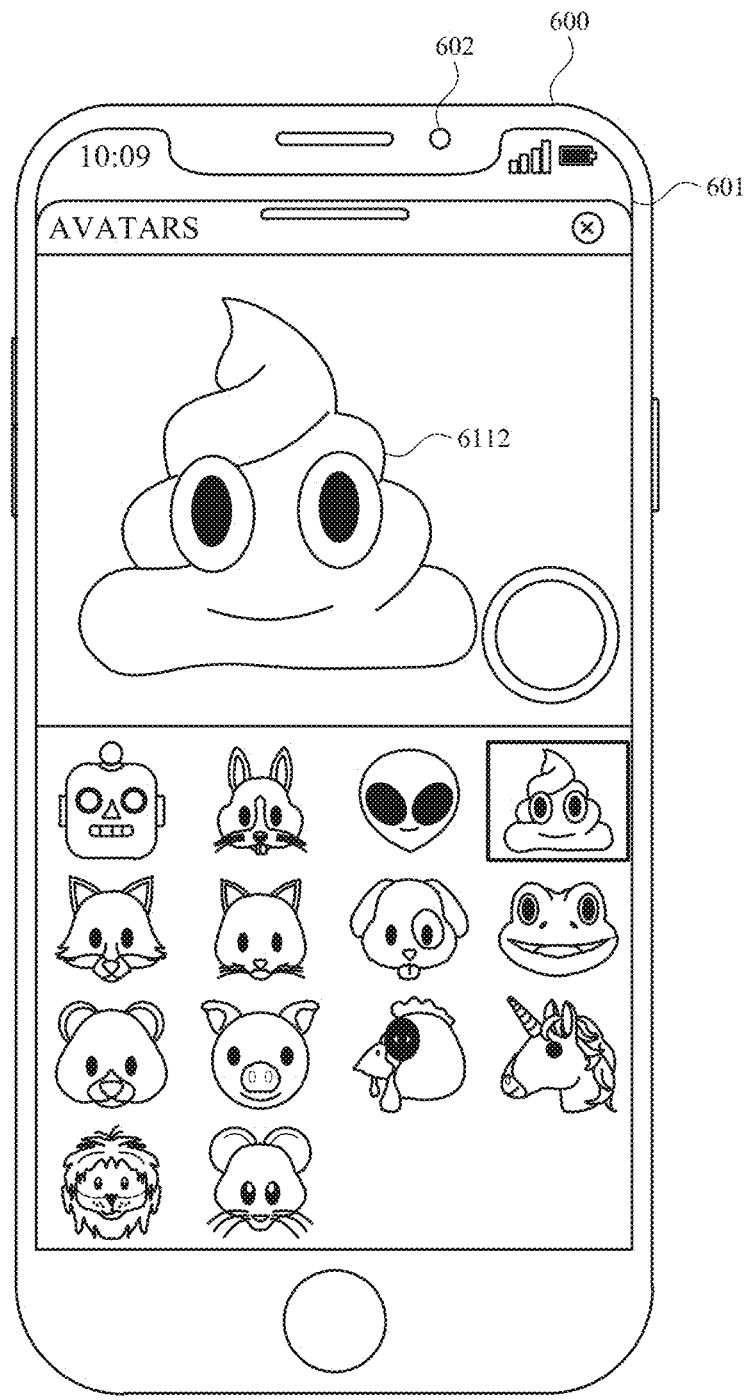

In FIG. 6Z, device 600 shows avatar editing user interface 694 in response to detecting input 693a or 693b. When device 600 detects input 693a on edit option 692a, device 600 shows avatar editing user interface 694 displaying the avatar corresponding to the avatar option selected in library interface 686 (e.g., avatar 670). However, when device 600 detects input 693b on duplicate option 692b, device 600 creates a duplicate of the selected avatar (e.g., a duplicate of woman avatar 670) and displays the duplicate avatar in avatar editing user interface 694. In the embodiment illustrated in FIG. 6Z, device 600 is displaying duplicate avatar 695. In some embodiments, in response to detecting input 693*a*, device displays library interface 686 with a duplicate avatar option, rather than displaying the avatar editing user interface.

Avatar editing user interface 694 is similar to the avatar editing user interface described below with reference to FIGS. 8A-8CF. For brevity, details for editing an avatar using avatar editing user interface 694 are not repeated.

In FIG. 6AA, device 600 displays library interface 686 having duplicate avatar option 695*a* corresponding to duplicate avatar 695 (shown modified based on selecting different avatar features using avatar editing user interface 694). After saving the modified duplicate avatar 695 (e.g., detecting selection of "done" in avatar editing user interface 694), device 600 displays the duplicate avatar option 695*a* in a location next to the selected avatar option from which the duplicate was created (e.g., next to avatar option 670*a*).

FIG. 6AB shows option menu 692 after avatar option 670*a* is selected in FIG. 6V. In response to detecting input 693*c* on delete option 692*c*, device deletes selected avatar option 670*a* from library interface 686. In such cases, device 600 removes avatar option 670*a* from library interface as shown, for example, in FIG. 6AC. If, however, device 600 does not detect any of inputs 693*a*-693*c*, and instead detects selection of cancel affordance 696, option menu 692 is closed, and device 600 displays library interface 686 having man avatar option 688*a* and woman avatar option 670*a*, as shown in FIG. 6AD (similar to the state of library interface 686 shown in FIG. 6U).

In FIG. 6AD, device 600 detects input 697 (e.g., a touch gesture on display 601) on done affordance 698 and, in response, exits library interface 686 and displays condensed avatar selection interface 668, as shown in FIG. 6AE. Condensed avatar selection interface 668 includes man avatar 688, woman avatar 670, and non-customizable avatar 645.

In FIG. 6AE, there are three distinct gestures represented on condensed avatar selection interface 668. As discussed below, when device 600 detects a gesture in a particular direction (e.g., left or right), device 600 replaces the displayed avatar (e.g., customizable woman avatar 670) with an avatar of a particular type determined by the direction of the gesture. For example, if the gesture is in a leftward direction, the displayed avatar is replaced with an avatar of a first type (e.g., a non-customizable avatar, or an avatar modeled to represent a non-human character). Conversely, if the gesture is in a rightward direction, the displayed avatar is replaced with an avatar of a second type (e.g., a customizable avatar, or an avatar modeled to represent a human).

For example, in FIG. 6AE, when device 600 detects left horizontal gesture 699*a* (e.g., a swipe or touch-and-drag gesture in a leftward direction on display 601), device 600 displays the embodiment illustrated in FIG. 6AF, which shows customizable woman avatar 670 moved to the left (out of the center (e.g., a position indicating woman avatar 670 is not selected) of condensed avatar selection interface 668), and non-customizable monkey avatar 645 positioned in the center (e.g., a position indicating monkey avatar 645 is selected) of condensed avatar selection interface 668. Thus, in response to detecting left horizontal gesture 699*a*, device 600 displays a selection of a non-customizable avatar. In some embodiments, the left horizontal gesture 699*a* causes device 600 to scroll condensed avatar selection interface 668 such that customizable woman avatar 670 is moved entirely off-screen, and only one or more non-customizable avatars are displayed (e.g., similar to the embodiment shown in FIG. 6O).

When device 600 detects right horizontal gesture 699*b* (e.g., a swipe or touch-and-drag gesture in a rightward direction on display 601), device 600 displays the embodiment illustrated in FIG. 6AG, which shows customizable woman avatar 670 moved to the right (out of the center (e.g., a position indicating woman avatar 670 is not selected) of condensed avatar selection interface 668), and customizable man avatar 688 positioned in the center (e.g., a position indicating man avatar 688 is selected) of condensed avatar selection interface 668 and, optionally, showing avatar creation affordance 669. Thus, in response to detecting right horizontal gesture 699*b*, device 600 displays a selection of a customizable avatar, with no displayed non-customizable avatars.

In some embodiments, device 600 can display a scenario in which the originally selected avatar (at the center position of condensed avatar selection interface 668) is a non-customizable avatar and, in response to detecting a horizontal gesture, display condensed avatar selection interface 668 scrolling such that the non-customizable avatar is moved entirely off-screen, and showing only one or more customizable avatars in condensed avatar selection region 668.

When device 600 detects vertical gesture 699*c* (e.g., a vertical swipe or a vertical touch-and-drag gesture on display 601) in an upward direction, device 600 expands condensed avatar selection interface 668 to show expanded avatar selection interface 634 in FIG. 6AH.

In FIG. 6AH, device 600 displays expanded avatar selection interface 634 having custom man avatar option 688*a* and custom woman avatar option 670*a* in avatar option region 638. Woman avatar option 670*a* is selected and woman avatar option 670 is displayed in avatar display region 636. Device 600 also displays option affordance 674 in avatar display region 638. Device 600 also displays capture affordance 644, which can be selected to record avatar 670 (e.g., while being modified based on detected changes in a user's face).

In FIGS. 6AI-6AJ, device 600 detects scroll gesture 6100 (e.g., a vertical swipe or tap-and-drag gesture on display 601), on avatar option region 638. In respond to detecting scroll gesture 6100, device 600 scrolls the display of the avatar options shown in avatar option region 638.

In FIG. 6AK, device 600 detects input 6102 (e.g., a tap gesture on display 601) on option affordance 674. In response to detecting input 6102, in FIG. 6AL, device 600 replaces the displayed avatar option region 638 with option menu region 6104, including edit, duplicate, and delete options similar to the respective edit, duplicate, and delete options (e.g., 692*a*, 962*b*, 962*c*) discussed above. Device 600 also displays a cancel affordance 6106. In response to detecting input 6108 (e.g., a tap gesture on display 601) on cancel affordance 6106, device 600 removes option menu region 6104 and again displays avatar option region 638 as shown in FIG. 6AM.

In some embodiments, device 600 changes the avatar displayed in avatar display region 636 in response to a selection of a different avatar option. For example, in FIG. 6AM, device 600 detects input 6110 (e.g., a tap gesture on display 601) on poop avatar option 6112*a*. In response, device 600 removes avatar 670, and displays poop avatar 6112, as shown in FIG. 6AN. In addition, device 600 removed edit affordance 674 because the selected avatar option (e.g., 6112*a*) corresponds to a non-customizable avatar (e.g., poop avatar 6112).

FIG. 7 is a flow diagram illustrating a method for navigating among avatars in an application using an electronic device (e.g., 600) in accordance with some embodiments. Method 700 is performed at a device (e.g., 100, 300, 500, 600) with a display apparatus and one or more input devices. Some operations in method 700 are, optionally, combined, the orders of some operations are, optionally, changed, and some operations are, optionally, omitted.

As described below, method 700 provides an intuitive way for navigating among avatars in an application. The method reduces the cognitive burden on a user for managing avatars, thereby creating a more efficient human-machine interface. For battery-operated computing devices, enabling a user to navigate among avatars in an application faster and more efficiently conserves power and increases the time between battery charges.

The electronic device displays (702), via the display apparatus, an avatar navigation user interface (e.g., 668). The avatar navigation user interface includes an avatar (e.g., 670).

While the avatar navigation user interface (e.g., 668) is displayed, the electronic device detects (704) a gesture (e.g., 699*a*, 699*b*), via the one or more input devices (e.g., a swipe gesture on a touch screen display at a location that corresponds to the avatar navigation user interface), directed to the avatar navigation user interface (e.g., 668).

In response (706) to detecting the gesture (e.g., 699*a*, 699*b*), in accordance with a determination (708) that the gesture is in a first direction (e.g., a horizontal swipe gesture in a rightward direction), the electronic device displays (710) an avatar of a first type (e.g., 670, 688, avatars modeled to represent humans, rather than non-human characters, or avatars that are configurable or can be created from an avatar prototype or template) in the avatar navigation user interface (e.g., 668). Displaying an avatar of the first type provides visual feedback to the user confirming that the input has been received and that the device is now in a state where the avatar of the first type can be selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response (706) to detecting the gesture (e.g., 699*a*), in accordance with a determination (714) that the gesture (e.g., 699*a*) is in a second direction opposite the first direction (e.g., a horizontal swipe gesture in a leftward direction), the electronic device displays (716) an avatar of a second type (e.g., 645) different from the first type (e.g., 670, 688) in the avatar navigation user interface (e.g., avatars modeled to represent non-human characters, or avatars that are selectable, but not configurable). Displaying an avatar of the second type provides visual feedback to the user confirming that the input has been received and that the device is now in a state where the avatar of the second type can be selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, further in accordance with the determination (708) that the gesture is in the first direction, the electronic device foregoes (712) displaying the avatar of the second type (e.g., 645) in the avatar navigation user interface (e.g., 668). Further in accordance with the determination (714) that the gesture is in the second direction opposite the first direction, the electronic device foregoes (718) displaying the avatar of the first type (e.g., 670, 688) in the avatar navigation user interface (e.g., 668). By not displaying avatars of particular types, the electronic device provides visual feedback to the user confirming that the input has been received and that the device is not in a state where the avatar of that particular type can be selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, after displaying the avatar of the first type (e.g., 670), the electronic device detects a second gesture (e.g., 699*b*) in the first direction. In response to detecting the second gesture, the electronic device displays a second avatar of the first type (e.g., 688).

In accordance with some embodiments, after displaying the avatar of the second type (e.g., 645), the electronic device detects a third gesture in the second direction. In response to detecting the third gesture, the electronic device displays a second avatar of the second type (e.g., 678).

In accordance with some embodiments, the avatar of the first type (e.g., avatar 670) has an appearance of a human character (e.g., an avatar modeled to represent a human, rather than a non-human character.). In some embodiments, such avatars include customizable (e.g., selectable or configurable) avatar features (e.g., head, hair, eyes, and lips as seen in FIGS. 8A to 8BB) that generally correspond to physical traits of a human. For example, such an avatar may include a representation of a person having various physical, human features or characteristics (e.g., an older woman with a dark skin tone and having long, straight, brown hair). Such an avatar would also include a representation of a person having various non-human characteristics that are typically associated with an appearance of a human (e.g., cosmetic enhancements, hats, glasses, etc.) (e.g., as shown in FIGS. 8BB to 8CF). In some embodiments, such an avatar would not include an anthropomorphic construct such as a stylized animal, a stylized robot, or a stylization of a normally inanimate or normally inhuman object. The appearance of the avatar provides feedback to the user indicating the types of characteristics of the avatar that can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the avatar of the second type (e.g., avatar 645; avatars corresponding to avatar options shown in FIG. 6G) has an appearance of a non-human character (e.g., an avatar modeled to represent a non-human character, including, for example, a non-human character that is an anthropomorphic construct (e.g., a stylized animal, a stylized robot, or a stylization of a normally inanimate or normally nonhuman object)). The appearance of the avatar provides feedback to the user indicating the types of characteristics of the avatar that can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the avatar of the first type (e.g., 670) includes a plurality of avatar features (e.g., 851, 828) that are configurable (e.g., creatable, selectable, customizable) by a user. In some embodiments, such an avatar can be created by a user or can be preconfigured with multiple features that can be configured by the user. In some embodiments, configuration of the avatar features results in a significant change in the physical appearance or physical construction of the virtual avatar.

In accordance with some embodiments, the avatar of the second type (e.g., 645) does not include user configurable (e.g., creatable, selectable, customizable) avatar features. In some embodiments, such an avatar is preconfigured and does not have features that can be configured by a user. In some instances, such an avatar may be slightly altered (e.g., changing a color of the avatar or changing a size of the avatar), but such changes do not significantly alter the physical appearance or physical construction of the virtual avatar.

In accordance with some embodiments, the avatar navigation user interface includes a subregion (e.g., 686) having a plurality of avatars. The plurality of avatars includes a first set of avatars of the first type (e.g., 670*a*, 688*a*, 670*a*) and a second set of avatars of the second type (e.g., 640*a*). The first set of avatars of the first type are separated (e.g., set apart) from the second set of avatars of the second type. In some embodiments, the avatars of the first type are separated from the avatars from the second type so that when the avatar navigation user interface is displayed, and the electronic device detects a user gesture (e.g., a swipe gesture), the device displays or selects, in the avatar navigation user interface, an avatar of the first type when the gesture is in a first direction, or displays an avatar of the second type when the gesture is in a second direction opposite the first direction. In some embodiments, this allows the user to immediately select an avatar of a first or second type, without having to scroll thorough multiple avatars of the same type to get to an avatar of a different type. Providing visual separation of the avatars of the various types provides feedback to the user indicating that multiple types of avatars are displayed (and available to be customized) and informs the user as to the types of characteristics of the avatars that can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the avatar (e.g., 670) is a selected one of the plurality of avatars displayed at a location (e.g., a border region (e.g., 675)) between one or more of the first set of avatars of the first type and one or more of the second set of avatars of the second type (e.g., the avatar initially displayed in the avatar navigation user interface is positioned between a group of avatars of the first type and a group of avatars of the second type).

In accordance with some embodiments, the first set of avatars of the first type includes the selected one of the plurality of avatars. In accordance with a determination that the gesture is in the first direction, the electronic device replaces the selected one of the plurality of avatars with a different avatar of the first type (e.g., the selected avatar (e.g., 670) is replaced with a different one of the avatars of the first type (e.g., 688) from the first set of avatars of the first type). In accordance with a determination that the gesture is in the second direction, the electronic device replaces the selected one of the plurality of avatars with an avatar of the second type (e.g., the selected avatar (e.g., 670) is replaced with one of the avatars of the second type (e.g., 645) from the second set of avatars of the second type).

In accordance with some embodiments, the second set of avatars of the second type includes the selected one of the plurality of avatars. In accordance with a determination that the gesture is in the first direction, the electronic device replaces the selected one of the plurality of avatars with an avatar of the first type (e.g., the selected avatar (e.g., 645) is replaced with one of the avatars of the first type (e.g., 670) from the first set of avatars of the first type). In accordance with a determination that the gesture is in the second direction, the electronic device replaces the selected one of the plurality of avatars with a different avatar of the second type (e.g., the selected avatar (e.g., 645) is replaced with a different one (e.g., 678) of the avatars of the second type from the second set of avatars of the second type).

Displaying avatars of particular types provides visual feedback to the user confirming that input has been received and that the device is now in a state where the avatar of the particular type can be selected. By replacing avatars, the electronic device provides visual feedback that the device is in a state in which the replaced avatar can no longer be selected by the user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the avatar navigation user interface includes a first affordance (e.g., 682) (e.g., a selectable, displayed avatar or an "edit" affordance (that is not an avatar)). While the avatar navigation user interface is displayed, the electronic device detects, via the one or more input devices, a gesture directed to the first affordance (e.g., a touch gesture on a touch screen display at a location that corresponds to the "edit" affordance or the displayed avatar or a swipe gesture in a third direction that is different from the first direction such as a swipe up gesture). In response to detecting the gesture directed to the first affordance, the electronic device displays an avatar library user interface (e.g., 686). The avatar library user interface includes a second affordance (e.g., 648) (e.g., "new avatar" or "plus" affordance) and one or more avatars of the first type.

In accordance with some embodiments, while the avatar library user interface is displayed, the electronic device detects, via the one or more input devices, a gesture directed to the second affordance (e.g., 648) (e.g., a touch gesture on a touch screen display at a location that corresponds to the "new avatar" affordance). In response to detecting the gesture directed to the second affordance, the electronic device displays an avatar editing user interface (e.g., 652). The avatar editing user interface is a user interface for generating (e.g., editing a new avatar to be added to the avatar library user interface) a new avatar of the first type. In some embodiments, the electronic device displays the avatar editing user interface and receives user input to create a new avatar of the first type. Once the new avatar of the first type is created, the device displays the new avatar of the first type in the avatar library user interface. For example, the new avatar of the first type is added to the end of the displayed avatars of the first type in the avatar library.

In accordance with some embodiments, the electronic device generates the new avatar of the first type and displays the new avatar in the avatar library user interface (e.g., 686). The new avatar is displayed at a position following a last one of the one or more avatars of the first type (e.g., at a last location in an order of the one or more avatars of the first type).

In accordance with some embodiments, the avatar navigation user interface further includes an affordance (e.g., a "delete" affordance) (e.g., 692c) associated with a function for removing (e.g., deleting or hiding) the avatar from the displayed avatar navigation user interface. The electronic device detects, via the one or more input devices, a gesture directed to the affordance associated with the function (e.g., a touch gesture on a touch screen display at a location that corresponds to the "delete" affordance). In response to detecting the gesture directed to the affordance associated with the function, the electronic device removes (e.g., deleting or hiding) the avatar from the displayed avatar navigation user interface.

In accordance with some embodiments, the avatar navigation user interface is displayed in a messaging user interface (e.g., 603) (e.g., an interface for sending messages between participants of a conversation hosted by a communication platform). In some embodiments, an avatar can be accessed from the avatar navigation user interface displayed as a portion of the messaging user interface, such that an avatar selected from the avatar navigation user interface is displayed in the messaging user interface for sending to a participant in a conversation.

Displaying the avatar navigation user interface in a messaging user interface enables the user to navigate among avatars without leaving the messaging user interface, thus avoiding the need to provide user input to switch between applications of the electronic device. Reducing the number of required user inputs enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in accordance with a determination that the avatar navigation user interface does not include an avatar of the first type, the electronic device displays an avatar initiation user interface (e.g., 626) (e.g., the avatar splash screen) having an affordance (e.g., 632) (e.g., a "continue" affordance) associated with generating a new avatar of the first type. While the avatar initiation user interface is displayed, the electronic device detects a gesture (e.g., 630) (e.g., a touch gesture on a touch screen display at a location that corresponds to the "continue" affordance) directed to the affordance associated with generating a new avatar of the first type. In response to detecting the gesture directed to the affordance associated with generating a new avatar of the first type, the electronic device displays an avatar editing user interface (e.g., 652, 801). The avatar editing user interface is a user interface for generating (e.g., editing a new avatar to be added to the avatar library user interface) a new avatar of the first type.

In accordance with some embodiments, in accordance with a determination that the avatar navigation user interface includes an avatar of the first type, the electronic device displays the avatar of the first type and an affordance (e.g., 682) (e.g., "edit" affordance) associated with managing one or more features of the displayed avatar of the first type (e.g., 670). In some embodiments, when one or more avatars of the first type have been created, the avatar navigation user interface displays one of the avatars of the first type and an affordance (e.g., an "edit" affordance). In some embodiments, in response to detecting a selection of the affordance, the electronic device displays the avatar library user interface (e.g., 686), which includes a representation of the avatar of the first type (e.g., 670) and other avatars of the first type (e.g., 688). In some embodiments, the electronic device displays the avatar library user interface in response to detecting selection of the displayed avatar of the first type. In some embodiments, in response to detecting a selection of the affordance or the displayed avatar of the first type, the electronic device displays the avatar editing user interface (e.g., 652, 801), which provides a user interface for editing the avatar of the first type.

In accordance with some embodiments, displaying the avatar of the first type includes displaying the avatar of the first type transitioning from a non-interactive state (e.g., 670 in FIG. 6L) (e.g., the avatar of the first type has a static, predetermined appearance that is not reactive to changes in a user's face) to an interactive state (e.g., 670 in FIG. 6M) (e.g., the avatar of the first type has a dynamic appearance that is reactive to changes in a user's face). In accordance with some embodiments, displaying the avatar of the second type includes displaying the avatar of the second type (e.g., 678) transitioning from a non-interactive state (e.g., 678 in FIG. 6O) (e.g., the avatar of the second type has a static, predetermined appearance that is not reactive to changes in a user's face) to an interactive state (e.g., 678 in FIG. 6P) (e.g., the avatar of the second type has a dynamic appearance that is reactive to changes in a user's face).

In accordance with some embodiments, the electronic device displays, via the display apparatus, an avatar library user interface (e.g., 686) including one or more saved (e.g., previously created) avatars of the first type (e.g., 688, 670). The electronic device detects selection of (e.g., detecting a gesture directed to) one of the saved avatars of the first type (e.g., a touch gesture on a touch screen display at a location that corresponds to the saved avatar of the first type). In response to detecting selection of (e.g., detecting a gesture directed to) the one of the saved avatars of the first type, the electronic device displays a menu (e.g., 692) having one or more menu affordances (e.g., an "edit" affordance 692a, a "duplicate" affordance 692b, or a "delete" affordance 692c) associated with one of an edit function, a duplicate function, and a delete function for the one of the saved avatars of the first type.

In accordance with some embodiments, the electronic device detects selection of (e.g., detecting a gesture directed to) a first affordance (e.g., 692b) associated with the duplicate function (e.g., a touch gesture on a touch screen display at a location that corresponds to the "duplicate" affordance). In response to detecting selection of the first affordance, the electronic device generates a duplicate version (e.g., 695) of the one of the saved avatars and displaying the duplicate version in an avatar editing user interface (e.g., 694) (e.g., after selecting the "duplicate" affordance, the selected avatar is duplicated and then the duplicate version of the avatar is shown in an avatar editing user interface having avatar features that match those of the selected one of the saved avatars). In some embodiments, the duplicated avatar can be edited in the avatar editing user interface (e.g., 652, 694, 801) and then saved in the library (e.g., 686) after editing. In some embodiments, after the duplicate avatar is saved, it is displayed in the avatar library at a location adjacent the selected one of the saved avatars (e.g., immediately adjacent the duplicated avatar, or at a next location in an order, wherein the next location in the order immediately proceeds the location of the duplicated avatar in the order) in the avatar library user interface.

In accordance with some embodiments, the electronic device detects selection of (e.g., detecting a gesture directed to) a second affordance (e.g., 692*a*) associated with the edit function (e.g., a touch gesture on a touch screen display at a location that corresponds to the "edit" affordance). In response to detecting the gesture directed to the second affordance, the electronic device displays an avatar editing user interface (e.g., 652, 694, 801) including the one of the saved avatars (e.g., the avatar that was selected when the edit function was selected).

In accordance with some embodiments, the electronic device detects selection of (e.g., detecting a gesture directed to) a third affordance (e.g., 692*c*) associated with the delete function (e.g., a touch gesture on a touch screen display at a location that corresponds to the "delete" affordance). In response to detecting selection of (e.g., detecting a gesture directed to) the third affordance, the electronic device removes the displayed one of the saved avatars from the avatar library user interface.

In accordance with some embodiments, the electronic device (e.g., 600) displays a respective avatar of the first or second type (e.g., 670, 671) including displaying, via the display apparatus (e.g., 601), the respective avatar moving in a direction across the avatar navigation user interface (e.g., 671 moving across interface 668 in FIGS. 6M-6O) in accordance with a magnitude and direction of the detected gesture (e.g., 676). In accordance with a determination that the respective avatar reaches a first position (e.g., a first threshold position determined based on the magnitude and direction of the detected gesture; e.g., a position associated with selecting the respective avatar), the electronic device displays an animation of the respective avatar transitioning from a non-interactive state (e.g., a static state in which the respective avatar has a predetermined appearance that does not change in response to detected changes in a user's face) (e.g., 671 in FIG. 6O) having a predetermined appearance to an interactive state (e.g., 671 in FIG. 6P) (e.g., a dynamic state in which the respective avatar changes in response to detected changes in the user's face) having an appearance determined based on a detected face (e.g., 673) (e.g., a face detected within the field of view of one or more cameras of the electronic device). In some embodiments, the animation of the respective avatar transitioning from the non-interactive state to the interactive state includes gradually changing a facial expression, position, orientation, and/or size of the avatar from a neutral facial expression, position, orientation, and/or size to a facial expression, position, orientation, and/or size for the avatar based on the face/head tracking of the user. The appearance of the avatar provides feedback to the user indicating the movement of the avatar in accordance with the magnitude and direction of the user's gesture. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the respective avatar (e.g., 671) reaches a second position (e.g., 671 in FIG. 6Q) (e.g., a second threshold position determined based on the magnitude and direction of the detected gesture; e.g., a position associated with swiping past the respective avatar (e.g., to select a different avatar)), the electronic device (e.g., 600) displays an animation of the respective avatar transitioning from the interactive state (e.g., 671 in FIG. 6P) having the appearance determined based on the detected face (e.g., 673) to the non-interactive state (e.g., 671 in FIG. 6R) having the predetermined appearance. In some embodiments, the animation of the respective avatar transitioning from the interactive state to the non-interactive state includes gradually changing a facial expression, position, orientation, and/or size of the avatar from the facial expression, position, orientation, and/or size based on the face/head tracking of the user to a neutral facial expression, position, orientation, and/or size for the avatar. Displaying an animation of the avatar transitioning from an interactive state to a non-interactive state provides visual feedback of the avatar's non-interactive appearance. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, in some embodiments, the navigation user interface invokes a process for creating or editing a customizable avatar, which may be achieved in accordance with the method 900 described below with respect to FIG. 9. As additional examples, methods 1000, 1100, 1200, and 1400 optionally include one or more of the characteristics of the various methods described above with reference to method 700. For example, in some embodiments, the navigation user interface invokes a process for creating or editing a customizable avatar, which may be achieved in accordance with the methods described below with respect to FIGS. 10-12. As another example, in some embodiments, the navigation user interface invokes a process for modifying a virtual avatar, which may be achieved in accordance with the methods described below with respect to FIGS. 14A and 14B. For brevity, these details are not repeated below.

FIGS. 8A-8CF illustrate exemplary user interfaces for displaying an avatar editing user interface, in accordance with some embodiments. The user interfaces in these figures are used to illustrate the processes described below, including the processes in FIGS. 9-12.

In FIG. 8A, device 600 is displaying an avatar editing user interface 801 having avatar display region 803 and avatar characteristics region 804. Avatar display region 803 is visually distinguished from avatar characteristics region 804 by, for example, line 806, and includes avatar 805 and avatar feature region 807. Avatar feature region 807 includes avatar feature affordances 809 that correspond to avatar features that can be edited in the avatar editing user interface. Avatar characteristic region 804 includes displayed avatar feature characteristics and corresponding feature options. The avatar feature characteristics and feature options correspond to a currently selected avatar feature in avatar feature region 807. In FIG. 8A, the device displays avatar head affordance 809a positioned directly below avatar 805 and highlighted to indicate the avatar head feature is currently selected for editing. Because the avatar head feature is selected for editing, device 600 displays, in avatar characteristics region 804, avatar feature characteristics and feature options that correspond to the avatar head feature.

The device displays avatar 805 to represent a current state of the avatar based on modifications to the avatar features that have been made when editing the avatar in the avatar editing user interface. In the embodiment illustrated in FIG. 8A, no avatar features have been selected or modified, therefore, avatar 805 is displayed with several default (e.g., preset or predetermined) features. For example, avatar 805 has a predetermined facial structure (e.g., a predetermined face shape, nose, lips, eyes, ears, and eyebrows). Avatar 805 also has no selected skin tone, no hair or hairstyle, no facial hair (other than eyebrows), and no accessories. As the device receives input updating the avatar features, device 600 updates avatar 805 to reflect the selected updates to the avatar features.

In some embodiments, prior to detecting a selection or modification of any of the avatar features, device 600 displays avatar 805 oscillating between two or more colors (e.g., yellow and white), which can indicate to a user that device 600 is prepared to receive input to modify avatar 805. In some embodiments, prior to detecting a selection or modification of any of the avatar features, device 600 displays avatar 805 without tracking the user's face (e.g., avatar 805 is displayed, but not modified in response to changes in a user's face). In some embodiments, after detecting an input on avatar editing user interface 801 (e.g., a selection of a color option, scrolling the displayed feature options, a gesture on the avatar, a gesture on an affordance (e.g., a "begin face tracking" affordance) etc.), device 600 stops oscillating the display of avatar 805 and/or begins tracking the user's face (e.g., modifying avatar 805 in response to detected changes in the user's face).

Avatar characteristics region 804 includes a displayed listing of avatar feature characteristics that correspond to the currently selected avatar feature (e.g., avatar head). Each avatar feature characteristic includes a set of selectable feature options that can be selected to modify the corresponding characteristic of the selected avatar feature. More specifically, each of the selectable feature options in the set of selectable feature options corresponds to a value for modifying the corresponding characteristic of the selected avatar feature. The changed characteristic is then reflected in displayed changes to avatar 805 and other avatar feature options that include a displayed representation of the characteristic.

Device 600 displays avatar feature options to represent available options for modifying a characteristic of a currently selected avatar feature. The displayed avatar feature options can be dynamically updated based on other selected avatar feature options. The other selected avatar feature options include different avatar feature options corresponding to the same currently selected avatar feature as well as selected avatar feature options corresponding to a different avatar feature (e.g., an avatar feature that is not currently selected, such as a previously modified avatar feature). For example, changes to characteristics of an avatar head feature (e.g., selecting a skin tone) can be shown in the avatar feature options corresponding to the avatar head feature (e.g., face shape feature options), and, optionally, in avatar feature options corresponding to other avatar features such as, for example, hair or eyes. In this example, in response to detecting selection of a skin tone, the device updates the currently displayed avatar feature options (e.g., face shape options) to show the selected skin tone. Additionally, when a different avatar feature is selected (e.g., eyes), the avatar feature options displayed for the eyes also include the selected skin tone.

As shown in FIG. 8A, avatar head affordance 809a is selected, therefore device 600 displays avatar feature characteristics and feature options that correspond to an avatar head feature. The displayed avatar feature characteristics include skin tone characteristic 808, and face shape characteristic 810 (the avatar head feature can include other avatar feature characteristics). Skin tone characteristic 808 includes color options 812 that can be selected to modify the color of the avatar head feature (e.g., the skin tone of avatar 805). When the device detects a selection of a specific color option 812, the device modifies the skin tone color of the currently selected avatar feature (e.g., avatar head in FIG. 8A) to match the selected color. In some embodiments, selection of a skin tone color option 812 also affects a color of another avatar feature such as a facial hair feature (e.g., eyebrows, beard, etc.), eye color, or lip color. In the embodiment shown in FIG. 8A, the skin tone characteristic 808 includes a set of color options 808 that is expanded relative to the initially displayed set of color options for other avatar features (e.g., see hair color characteristic 838 in FIG. 8P). In some embodiments, the expanded set of color options 808 is not scrollable in a horizontal direction (but can be scrollable in a vertical direction) and does not include a selectable option (such as color picker option 886 in FIG. 8AX) for expanding the set of color options. Face shape characteristic 810 includes face shape options 814, that can be selected to modify the facial shape of avatar 805.

In some embodiments, a selected feature option is indicated by a displayed border around the selected feature option. For example, border 818 displayed around face shape option 814a indicates face shape option 814a is the currently selected avatar face shape. Accordingly, avatar 805 is displayed having the same face shape (e.g., rounded chin) as selected face shape option 814a. Conversely, no color options 812 are selected, so avatar 805 and face shape options 814 are displayed with no skin tone (e.g., a default or preselected skin tone).

In some embodiments, each of the displayed avatar feature characteristics are visually distinguished from other, adjacent avatar feature characteristics. In some embodiments, the avatar feature characteristics are visually distinguished by a respective header of an avatar feature characteristic. For example, in FIG. 8A, skin tone characteristic 808 is visually distinguished from face shape characteristic 810 by face shape header 816. In some embodiments, the avatar feature characteristics are visually distinguished by other indicators such as, for example, a horizontal line that extends fully or partially across a width of display 601.

In FIG. 8B, device 600 detects selection of color option 812a in response to receiving input 820 (e.g., a touch input on display 601) on color option 812a.

In FIG. 8C, device 600 indicates color option 812a is selected by displaying border 824 around color option 812a. Device 600 also modifies avatar 805 and face shape options 814 to have a skin tone matching selected color option 812a. In addition, device 600 displays skin color slider 822, which can be adjusted in a manner similar to that discussed below with respect to hair color slider 856 (see FIGS. 8W-8AC).

Color slider 822 is used to adjust a gradient of selected color option 812*a*. In some embodiments, the gradient can represent various characteristics of the selected color option (e.g., skin color option 812*a*) such as, for example, shading, saturation, undertone, midtones, highlights, warmth, or hue. In some embodiments, the particular characteristic is determined based on the selected skin tone color. For example, in some embodiments, if a lighter skin color is selected, the characteristic adjusted with the slider is a shading characteristic, whereas the characteristic adjusted with the slider is saturation when a dark skin color is selected. In response to detecting adjustments to the shade of a selected color option (e.g., selected color option 812*a*), device 600 modifies the skin tone of the avatar (e.g., avatar 805), any feature options that display a skin tone (e.g., face shape options 814), and any avatar features that are affected by the skin tone color.

In some embodiments, the selected skin tone affects a color or color property (e.g., base color, hue, luminance, shading, saturation, midtone, highlight, warmth, undertone, etc.) for other avatar features (e.g., hair, lips, etc.). For example, avatar hair or facial hair (e.g., eyebrows or a beard) may have an undertone that is determined based on a selected skin tone. For example, darker skin tones produce hair having a darker undertone (e.g., a brown or black undertone), whereas lighter skin tones produce a lighter hair undertone (e.g., a blonde or red undertone). These undertones can affect a color applied to a particular avatar feature, as discussed in greater detail below. Similarly, an avatar lip color can have an undertone that is based on the selected skin tone. For example, the avatar lip color can have a color that is based on the selected skin tone and, optionally, a different color such as red or pink. In some embodiments, the different color is combined with the skin tone color by an amount determined based on the settings of adjustment of color slider 822. For example, adjusting slider 822 in one direction increases the different color value comprising the avatar lip color (e.g., the amount of red or pink in the avatar lip color), and adjusting slider 822 in a different direction decreases the different color value comprising the avatar lip color.

As shown in FIG. 8C, updating the skin tone of the avatar head feature includes changing the skin tone of the avatar's nose, ears, face, and lips 828. In some embodiments, updating the skin tone of the avatar's lips 828 includes changing the skin tone of outer region 828*a* of the lips, and leaving inner portion 828*b* of the lips unchanged. In some embodiments, device 600 also updates the color of other avatar features that are different from the avatar's skin, such as eyebrows 827, and avatar eyes 829. In some embodiments, the updated colors of the other features (e.g., eyebrows 827 and eyes 829) are based on the selected skin tone color. For example, the updated color of eyebrows 827 are updated to a color that is determined to be darker than the selected skin tone color option 812*a*. These updates are shown in both avatar 805 and in other avatar feature options such as face shape options 814.

Figure 8D:
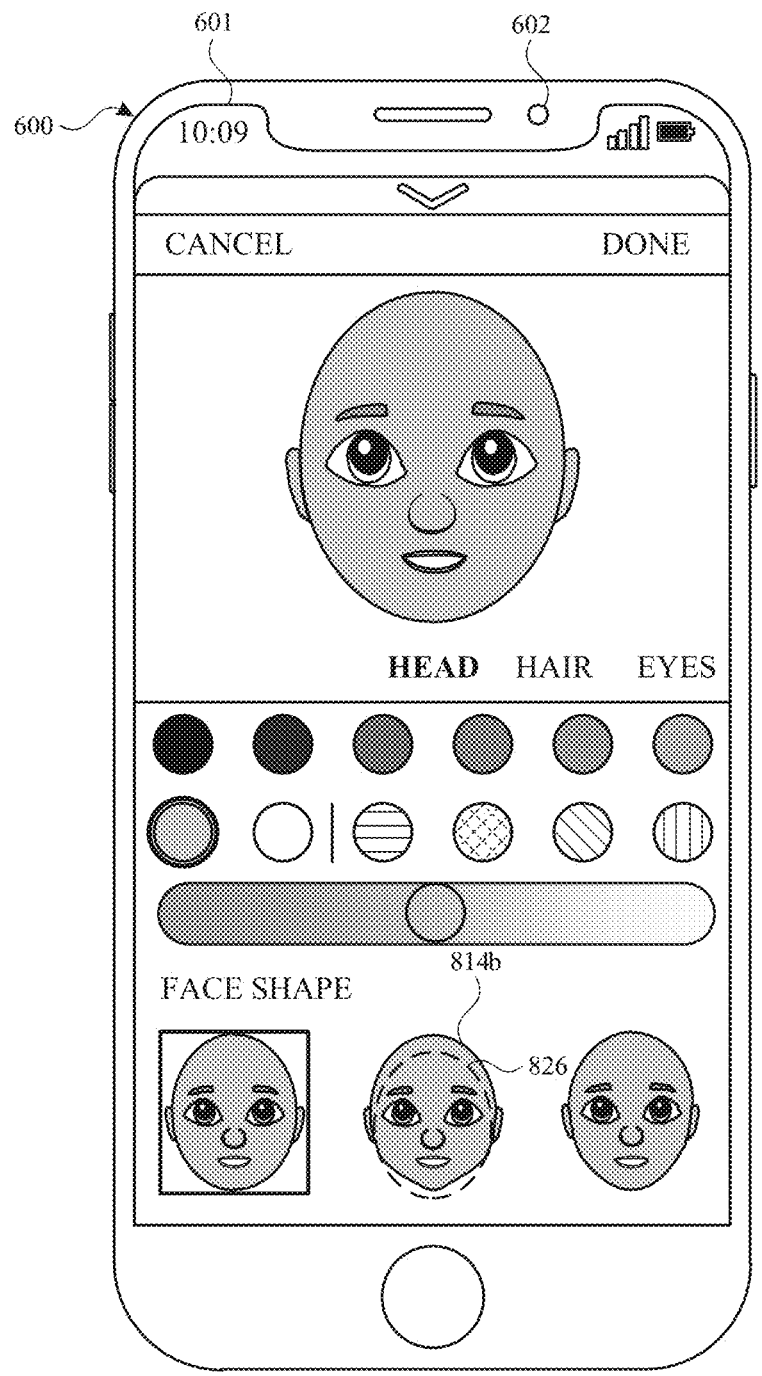
Figure 8E:
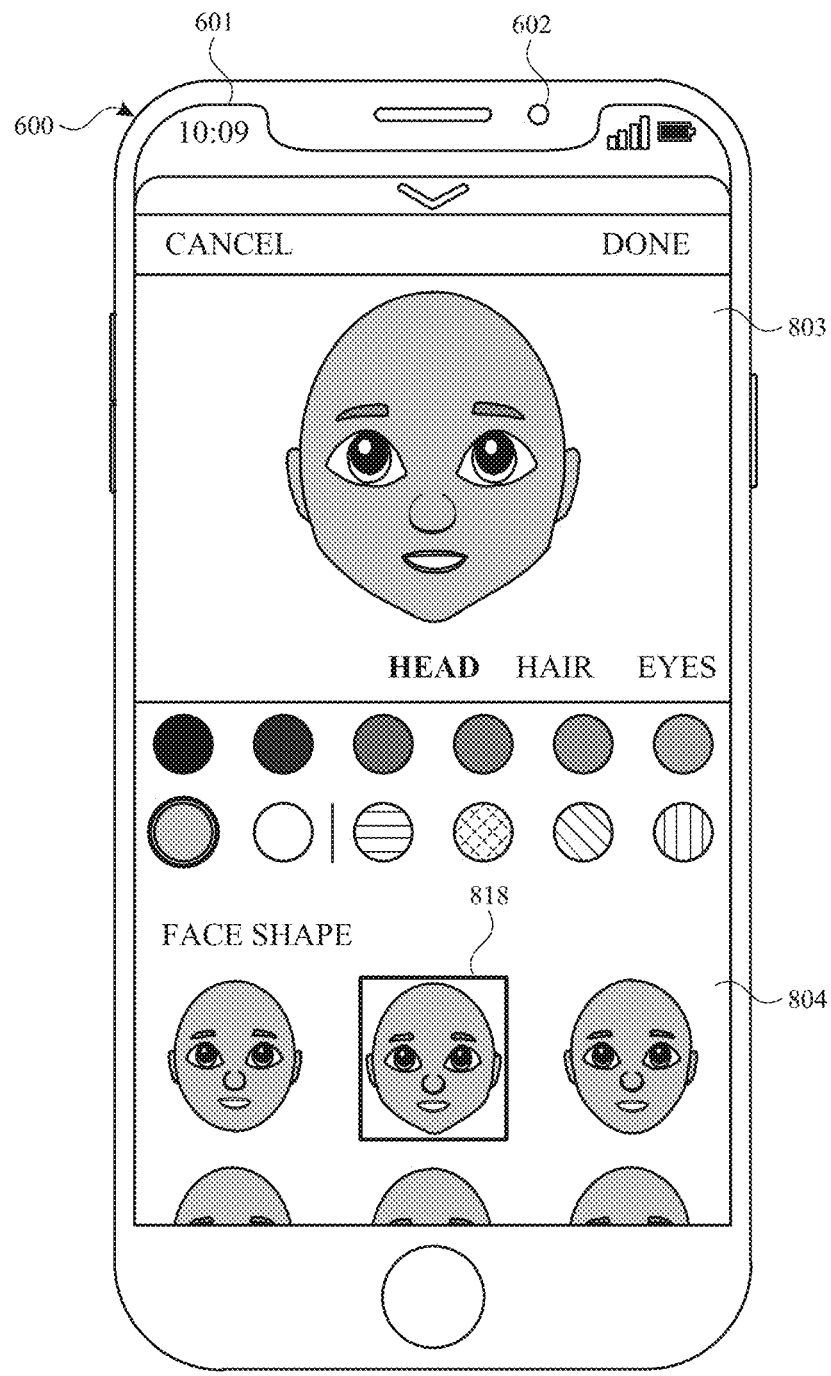

In FIG. 8D, device 600 detects selection of face shape option 814*b* in response to receiving input 826 (e.g., a touch input on display 601) on face shape option 814*b*. In response, device 600 removes skin color slider 822 from avatar characteristics region 804 in FIG. 8E, and indicates the selected face shape option by moving border 818 from face shape option 814*a* to face shape option 814*b* and modifies avatar 805 to transition from the rounded face shape option of 814*a* to a different face shape (e.g., pointed chin, narrow cheeks) represented in face shape option 814*b*. Thus, avatar 805 is displayed transitioning from having a rounded chin as shown in FIG. 8D to a pointed chin with narrow cheeks as shown in FIG. 8E.

Figure 8F:
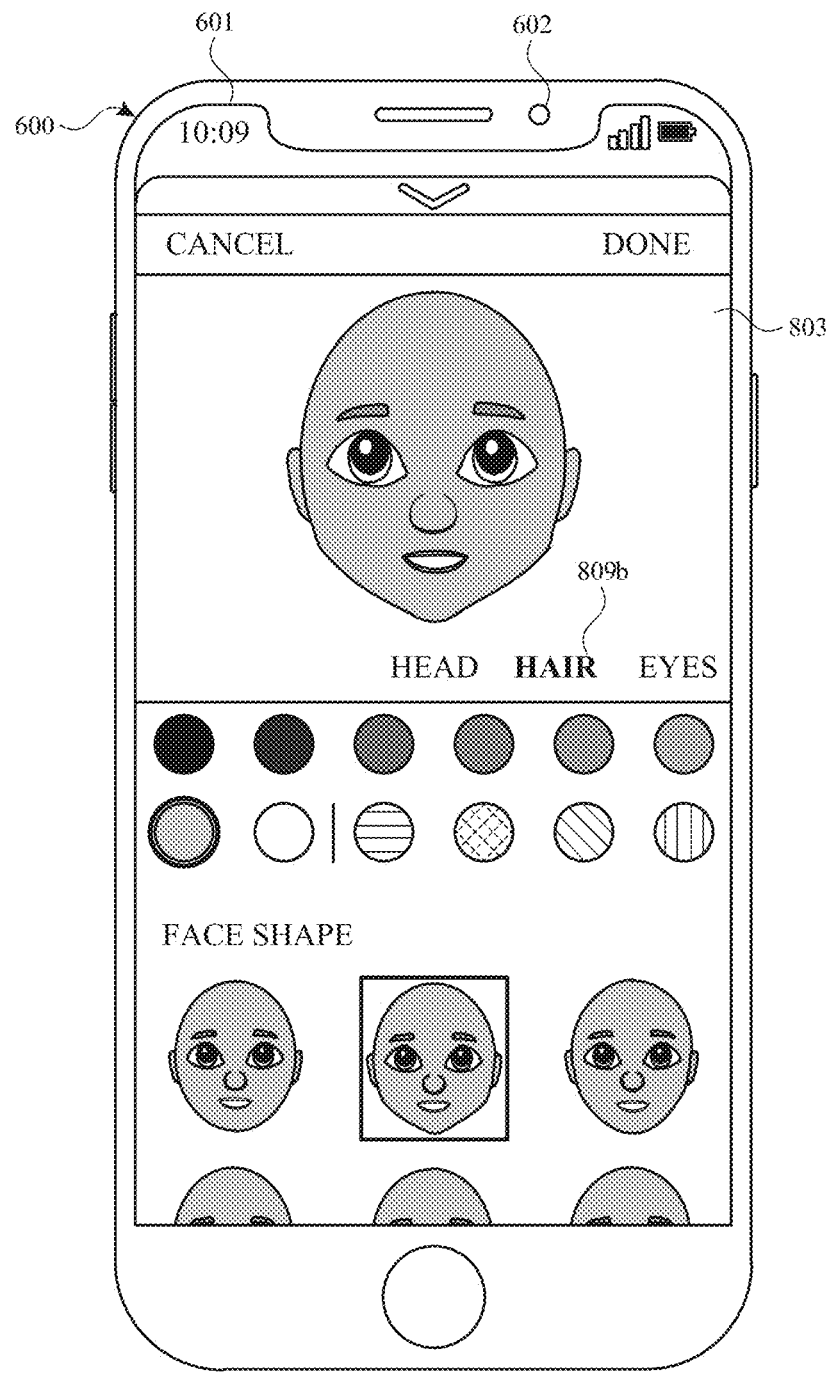

In some embodiments, after a feature option is selected, device 600 displays an animation to guide the user to select the next avatar feature in avatar feature region 807. For example, in FIG. 8F, device 600 highlights avatar hair affordance 809*b*, prompting the user to select avatar hair affordance 809*b* to advance to the next avatar feature for editing. In some embodiments, this animation is only displayed the first time the device displays the avatar editing user interface.

Figure 8G:
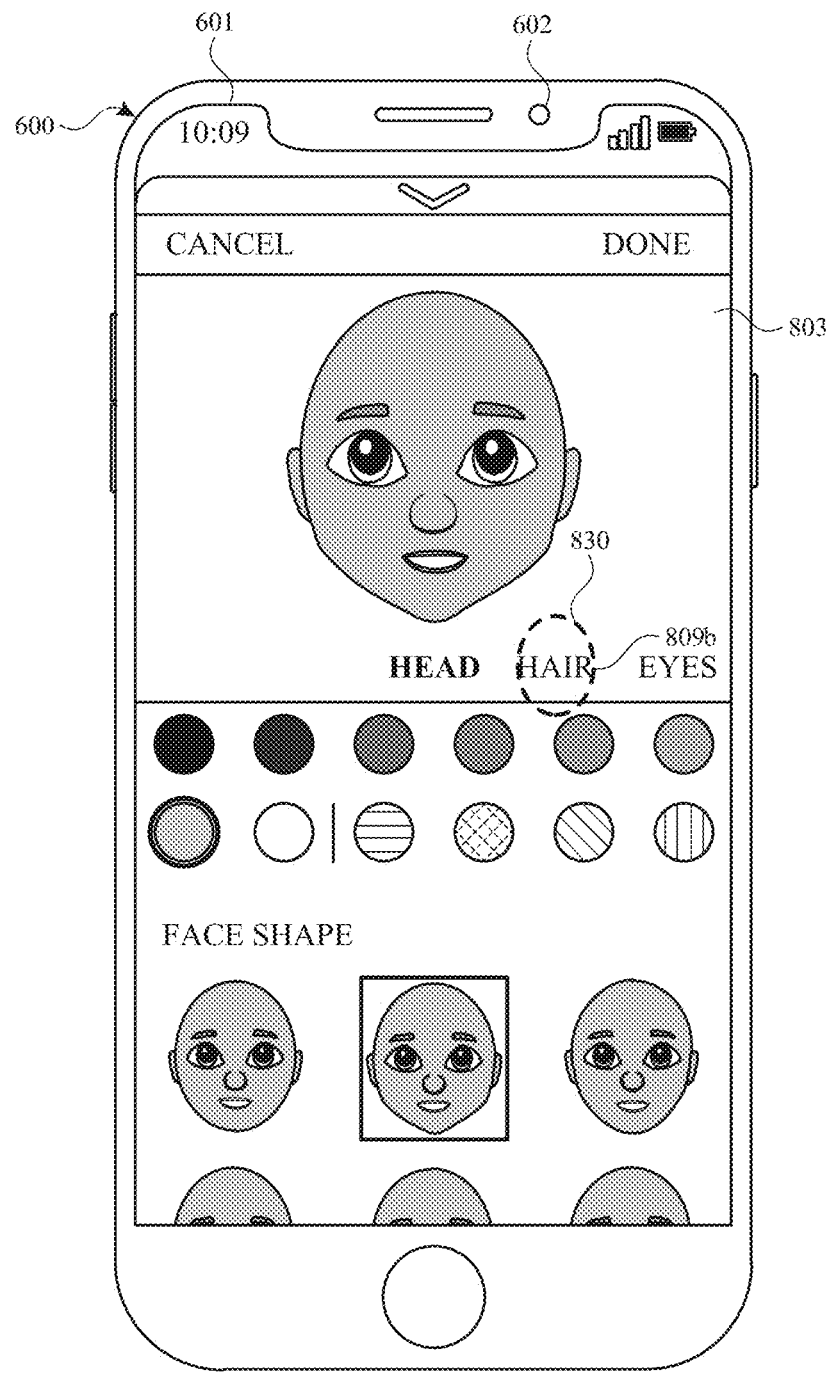

In FIG. 8G, device 600 detects selection of avatar hair affordance 809*b* in response to receiving input 830 (e.g., a touch input on display 601) on avatar hair affordance 809*b*. In response to detecting selection of avatar hair affordance 809*b*, device 600 updates avatar display region 803 to indicate the avatar hair feature is selected and updates avatar characteristics region 804 to display avatar feature characteristics and feature options corresponding to the avatar hair feature. This transition is shown in FIGS. 8H-8O.

In some embodiments, respective avatar feature affordances 809 can be selected by a tap gesture on the respective avatar feature affordance 809 or by a swipe gesture on avatar feature region 807 (or, optionally, a swipe gesture on any location of avatar display region 803 other than on avatar 805). In such embodiments, the swipe gesture can scroll avatar feature region 807 horizontally to position a desired avatar feature affordance 809 directly beneath avatar 805. In response to detecting lift-off of the touch, device 600 selects the avatar feature affordance (including highlighting the affordance) that is positioned directly beneath avatar 805 after scrolling has finished.

Figure 8H:
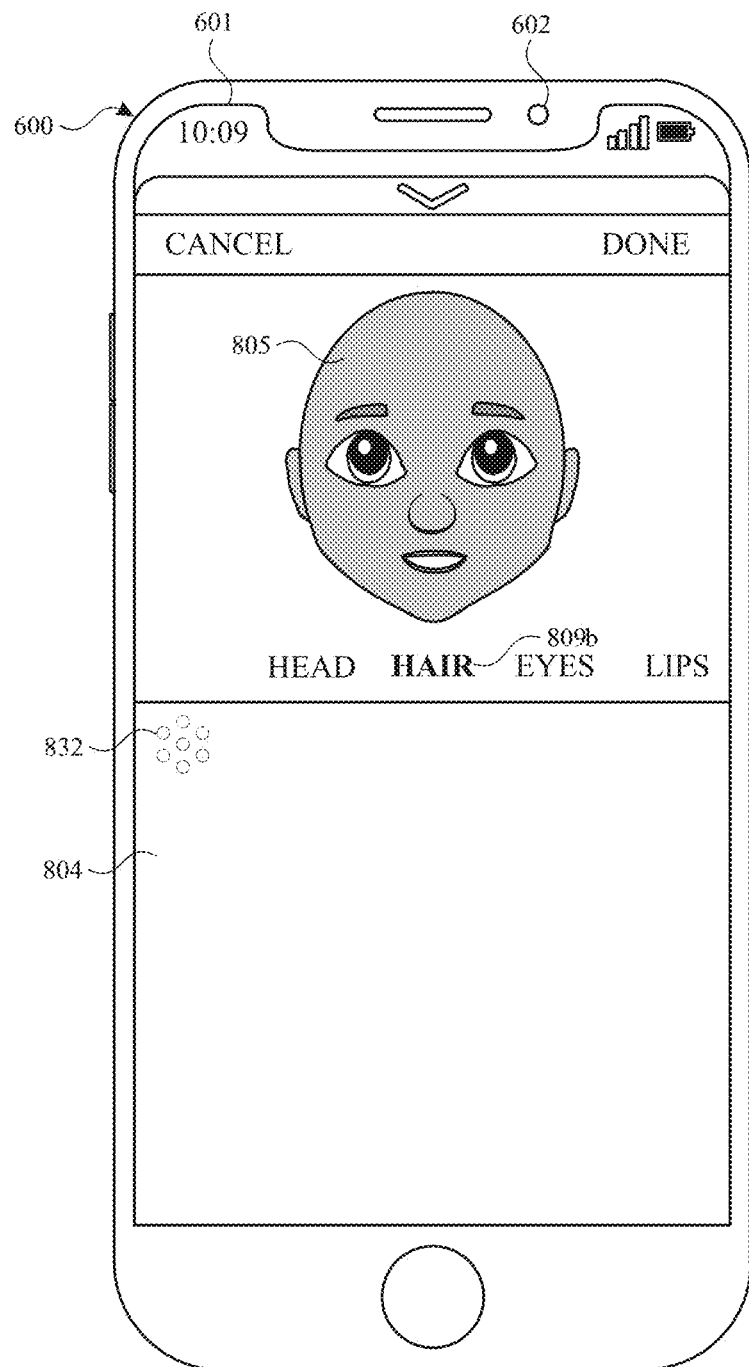

As shown in FIG. 8H, device 600 updates avatar display region 803 by highlighting avatar hair affordance 809*b* and displaying avatar feature affordances 809 shifted to the left so that avatar hair affordance 809*b* is positioned directly below avatar 805. Avatar eyes affordance 809*c* is shifted to the left (with respect to its position in FIG. 8G), and avatar lips affordance 809*d* is now displayed at the far right edge of display 601.

Device 600 updates avatar characteristics region 804 by ceasing to display the avatar feature characteristics corresponding to the avatar face feature (e.g., skin tone characteristic 808 and face shape characteristic 810) and displaying new avatar feature characteristics and feature options corresponding to the newly selected avatar feature. In some embodiments, such as that shown in FIGS. 8H-8O, device 600 displays the new avatar feature characteristics and feature options in a cascading effect whereby the avatar feature characteristics corresponding to the avatar hair feature are displayed in avatar characteristics region 804 in order from side-to-side (e.g., left-to-right) and in order from top-to-bottom (e.g., from a first avatar feature characteristic at the top of avatar characteristics region 804 to a last avatar feature characteristic at the bottom of avatar characteristics region 804).

Figure 8I:
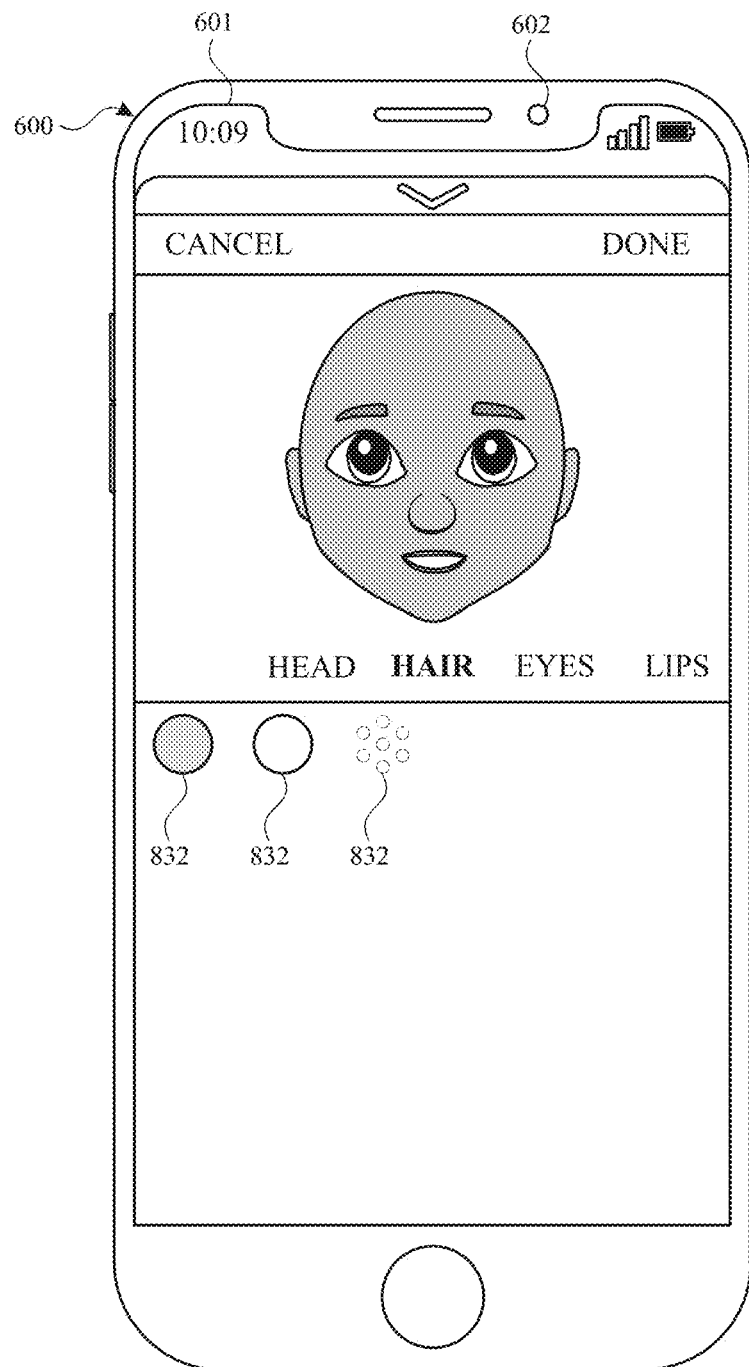
Figure 8J:
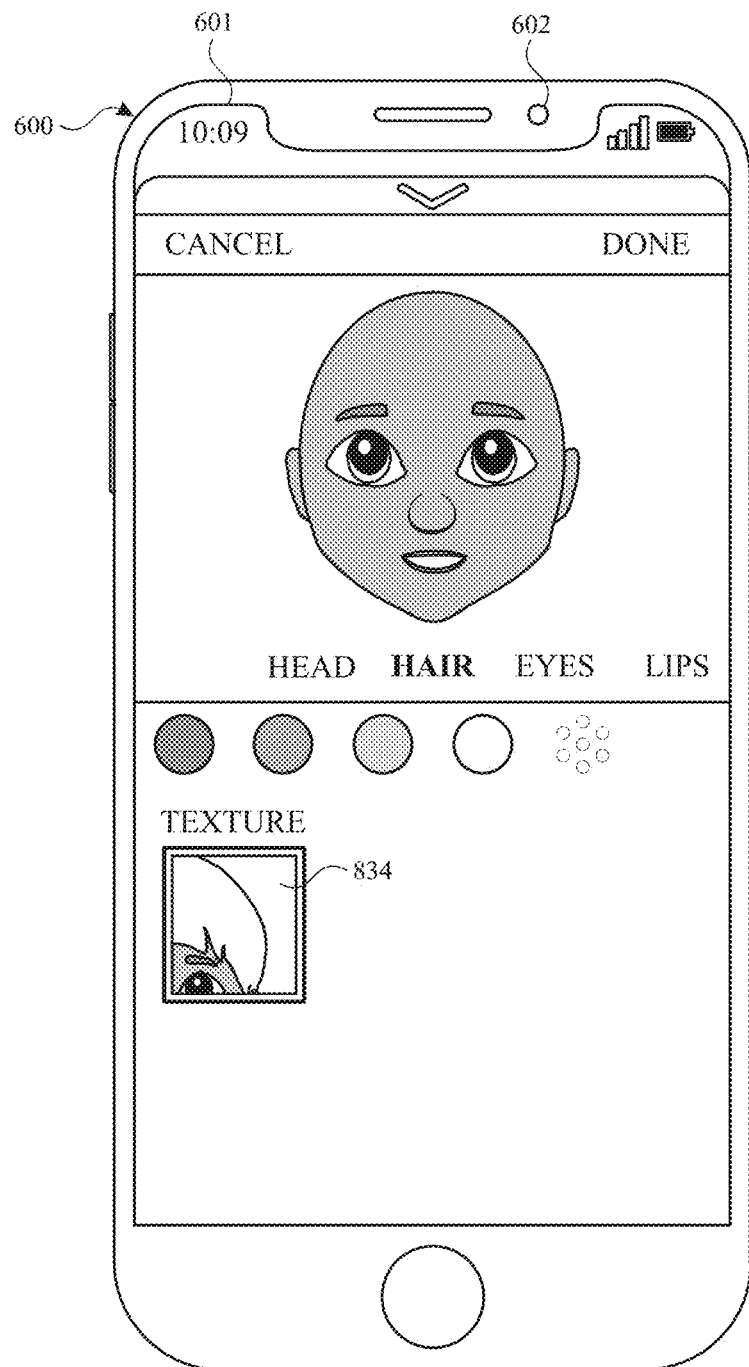
Figure 8K:
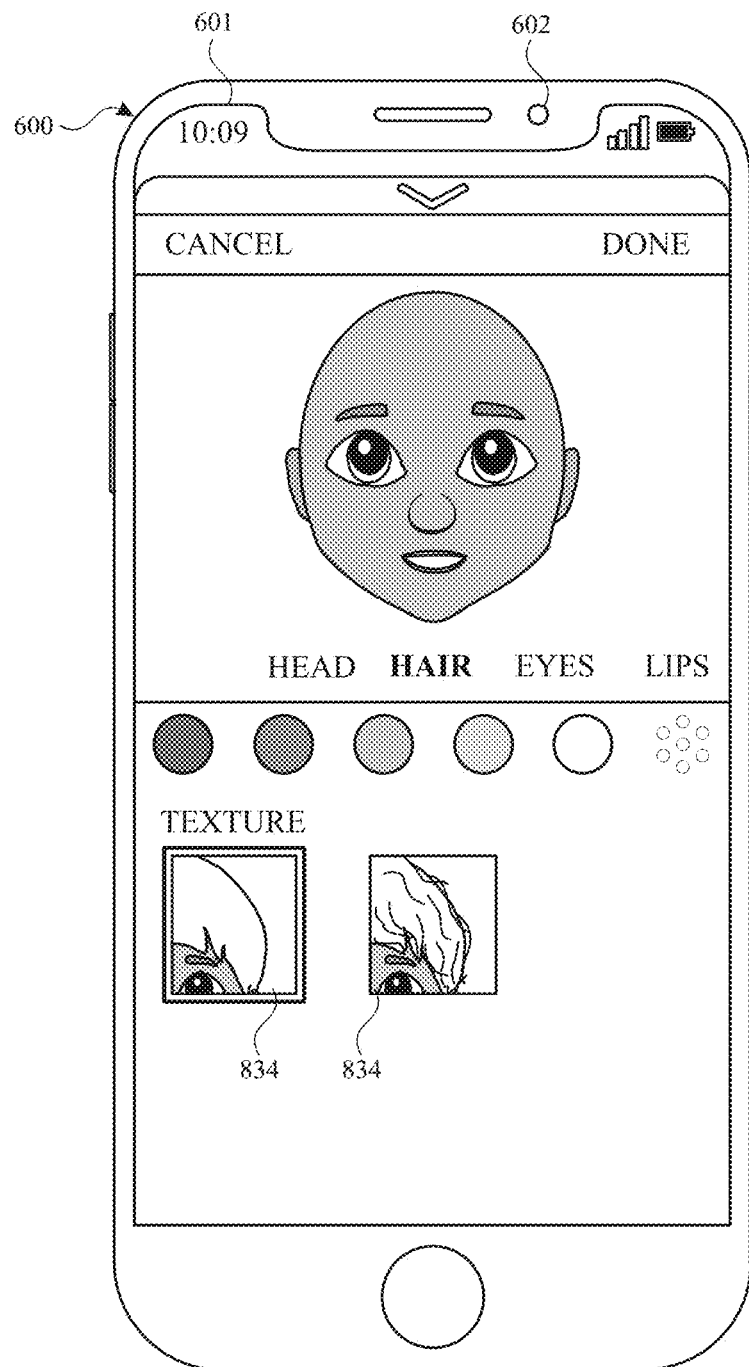
Figure 8L:
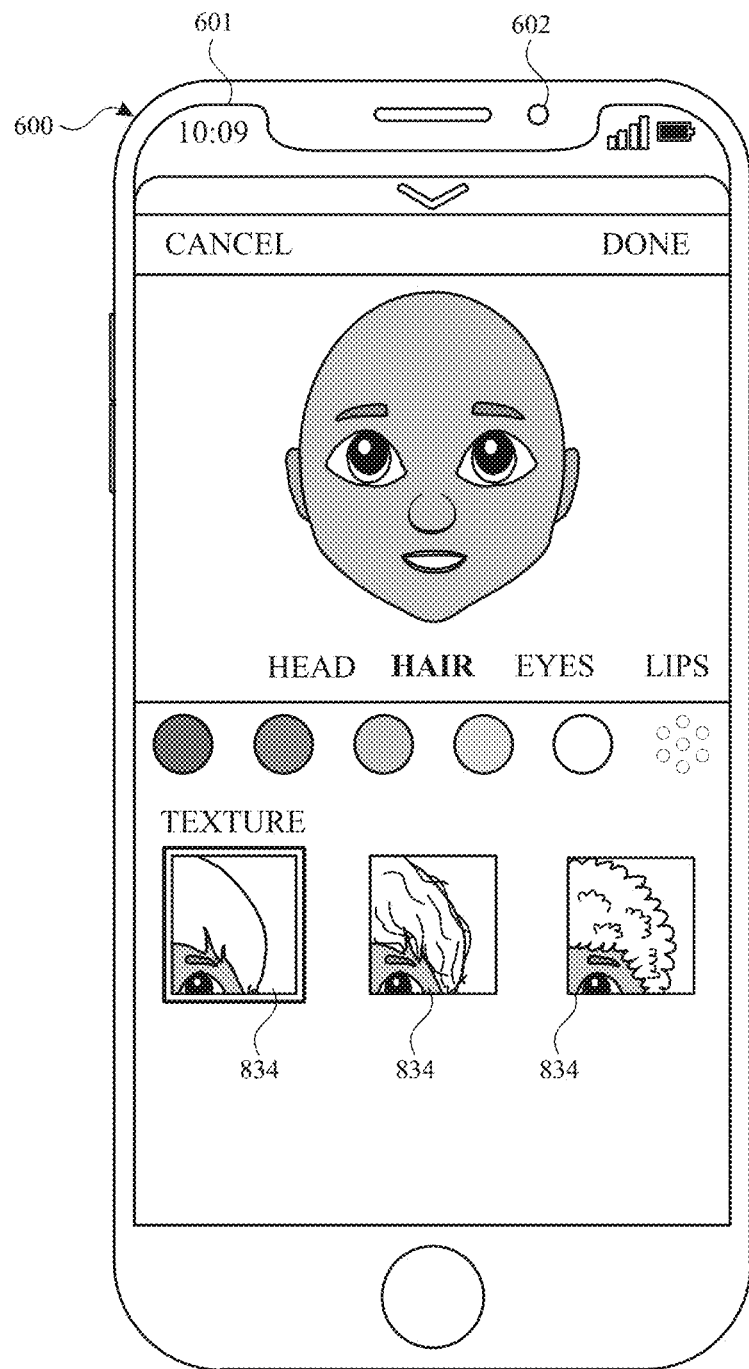
Figure 8M:
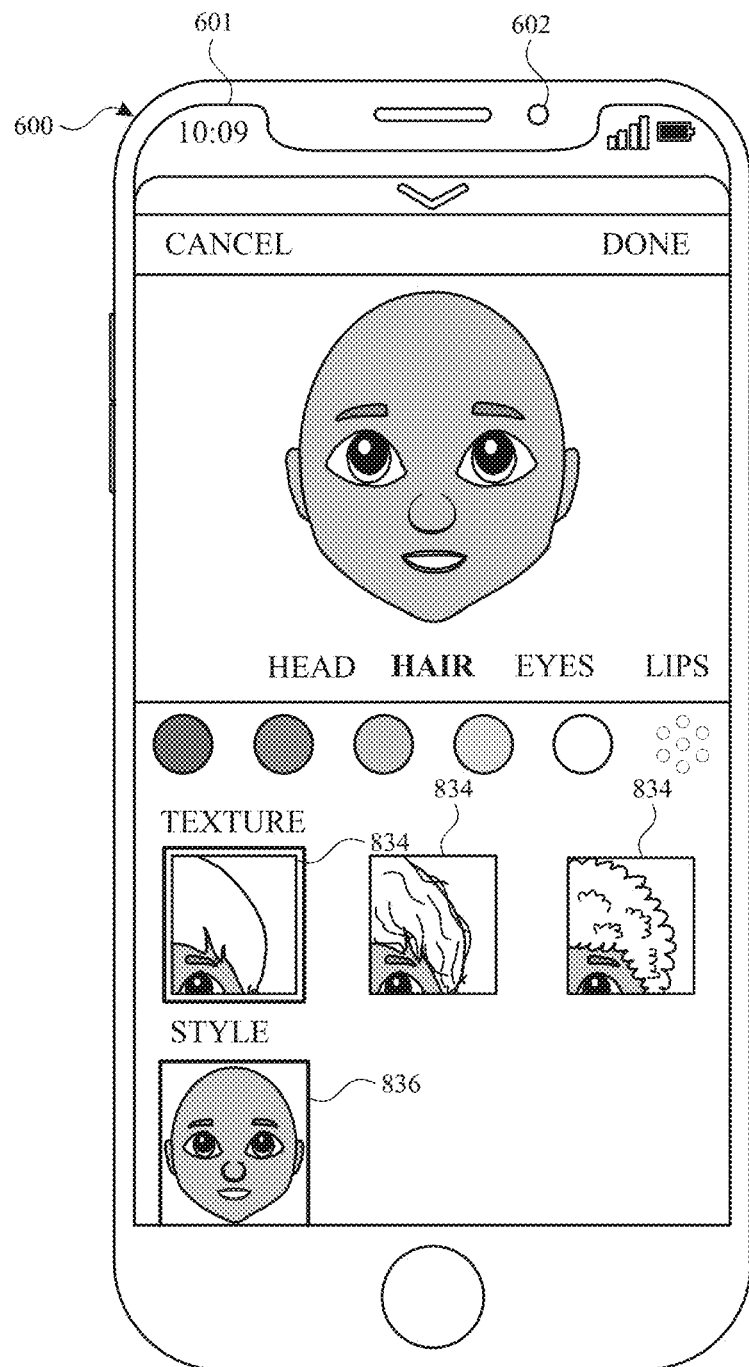
Figure 8N:
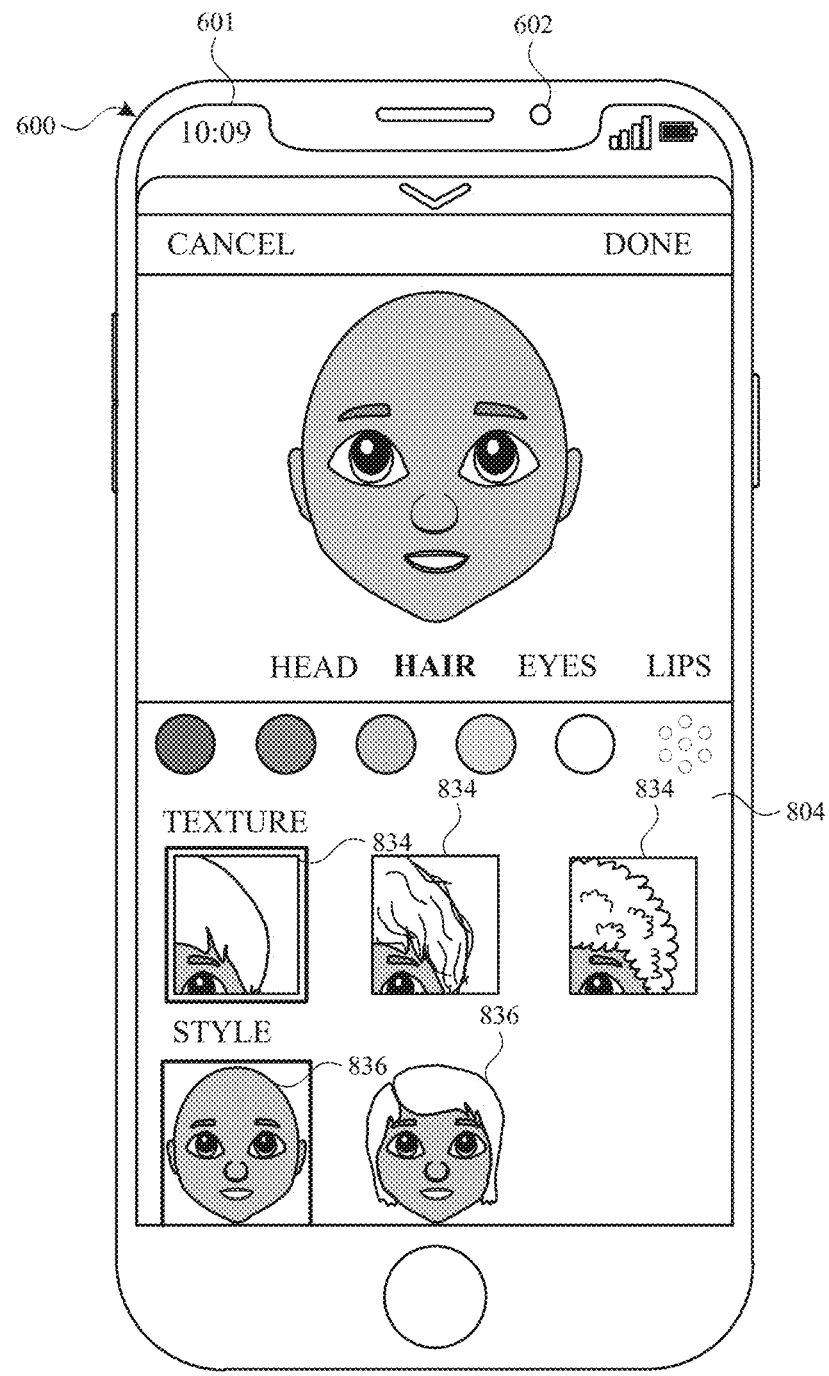

For example, FIGS. 8H and 8I show hair color options 832 appearing on display 601 with an animation of the hair color options sliding across display 601 from left-to-right. Before all hair color options 832 are populated, device 600 begins to display an animation of hair texture options 834 appearing on display 601 (starting in FIG. 8J) below hair color options 832, appearing one at a time, and in order from left-to-right (ending in FIG. 8L). After hair texture options 834 are populated, device 600 displays hairstyle options 836 on display 601 (starting in FIG. 8M) below hair texture options 834, appearing one at a time, and in order from left-to-right (ending in FIG. 8O). It should be appreciated that successive population of a respective set of feature options can begin either before the previous set of feature options is populated (e.g., similar to the timing of hair texture options 834 with respect to hair color options 832), or after the previous set of feature options is populated (e.g., similar to the timing of hairstyle options 836 with respect to hair texture options 834).

As discussed above, some of the feature options for a selected avatar feature are displayed in a sliding cascading effect as discussed above with respect to the appearance of hair color options, whereas other feature options for the selected avatar feature are displayed in an iteratively populating cascading effect as discussed with respect to hair texture options 834 and hairstyle options 836. Either of these cascading effects can be used for displaying population of feature options in accordance with any of the embodiments discussed herein.

Figure 8O:
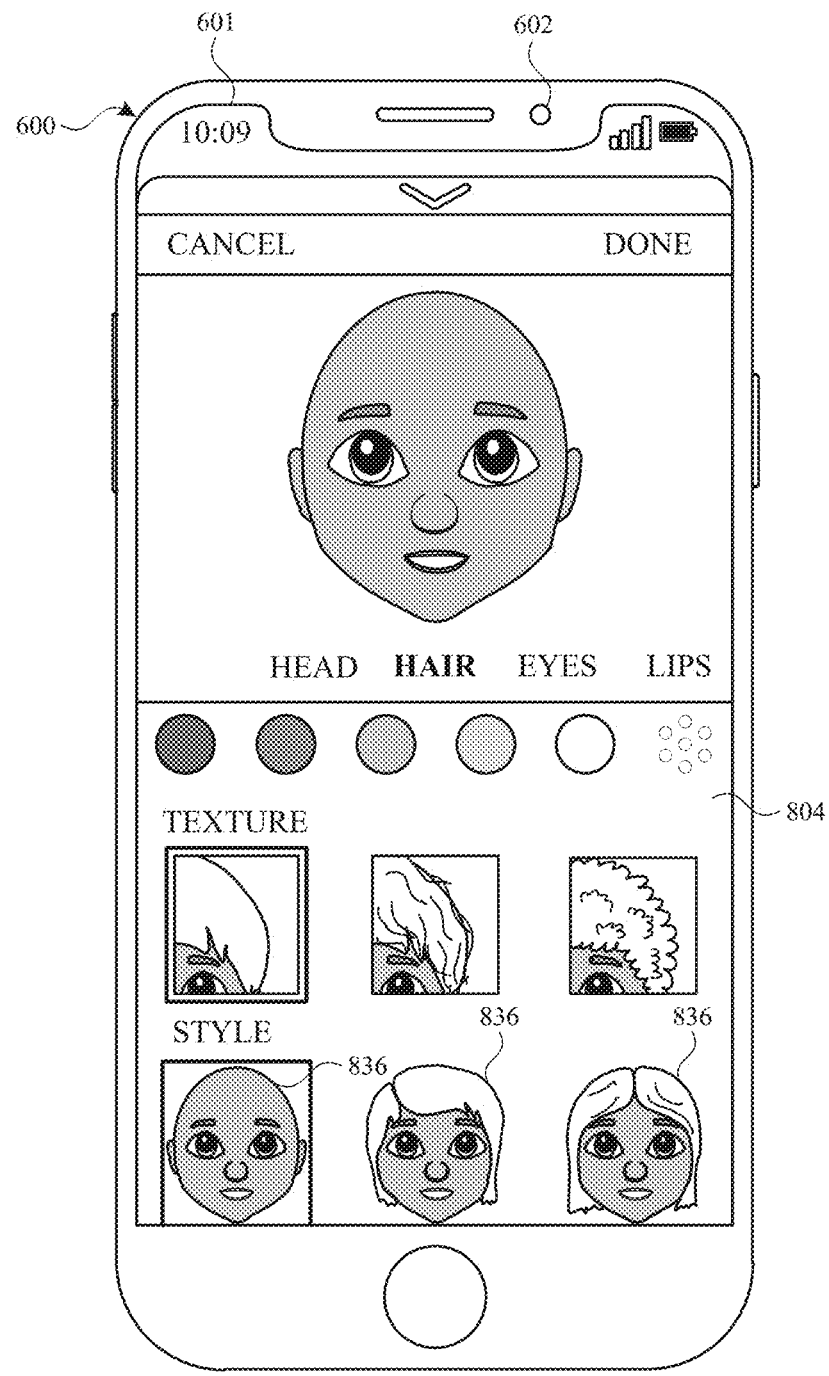
Figure 8P:
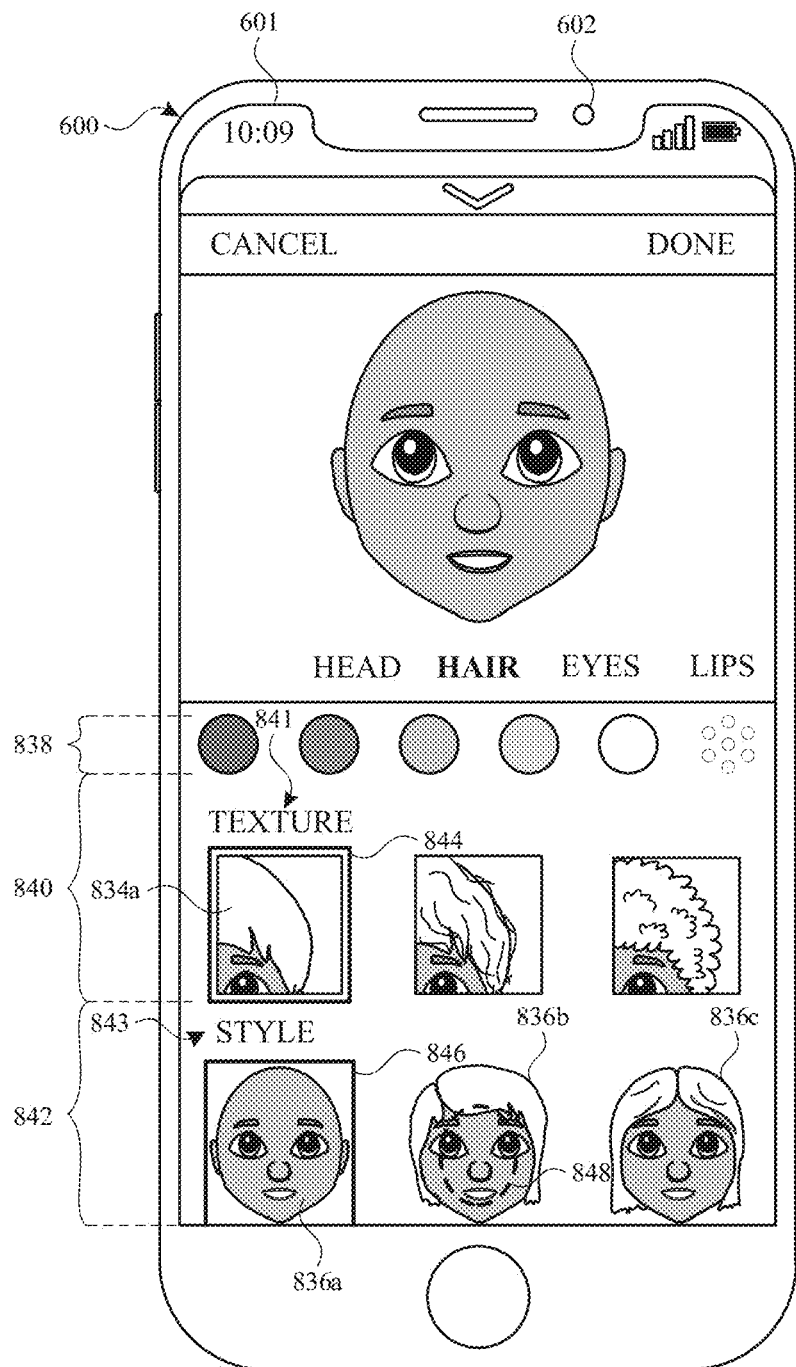

In FIG. 8P, device 600 displays hair color characteristic 838 having hair color options 832, hair texture characteristic 840 having hair texture options 834 and texture header 841, and hairstyle characteristic 842 having hairstyle options 836 and hairstyle header 843. None of the hair color options are selected in FIG. 8P. However, straight hair texture option 834a and bald hairstyle option 836a are selected as indicated by borders 844 and 846, respectively. Avatar 805 is shown having a bald hairstyle, however, the straight hair texture is not discernable on avatar 805 due to the bald hairstyle. However, the straight hair texture is reflected in pixie hairstyle option 836b and bob hairstyle option 836c, which show different hairstyles having straight hair texture.

Figure 8Q:
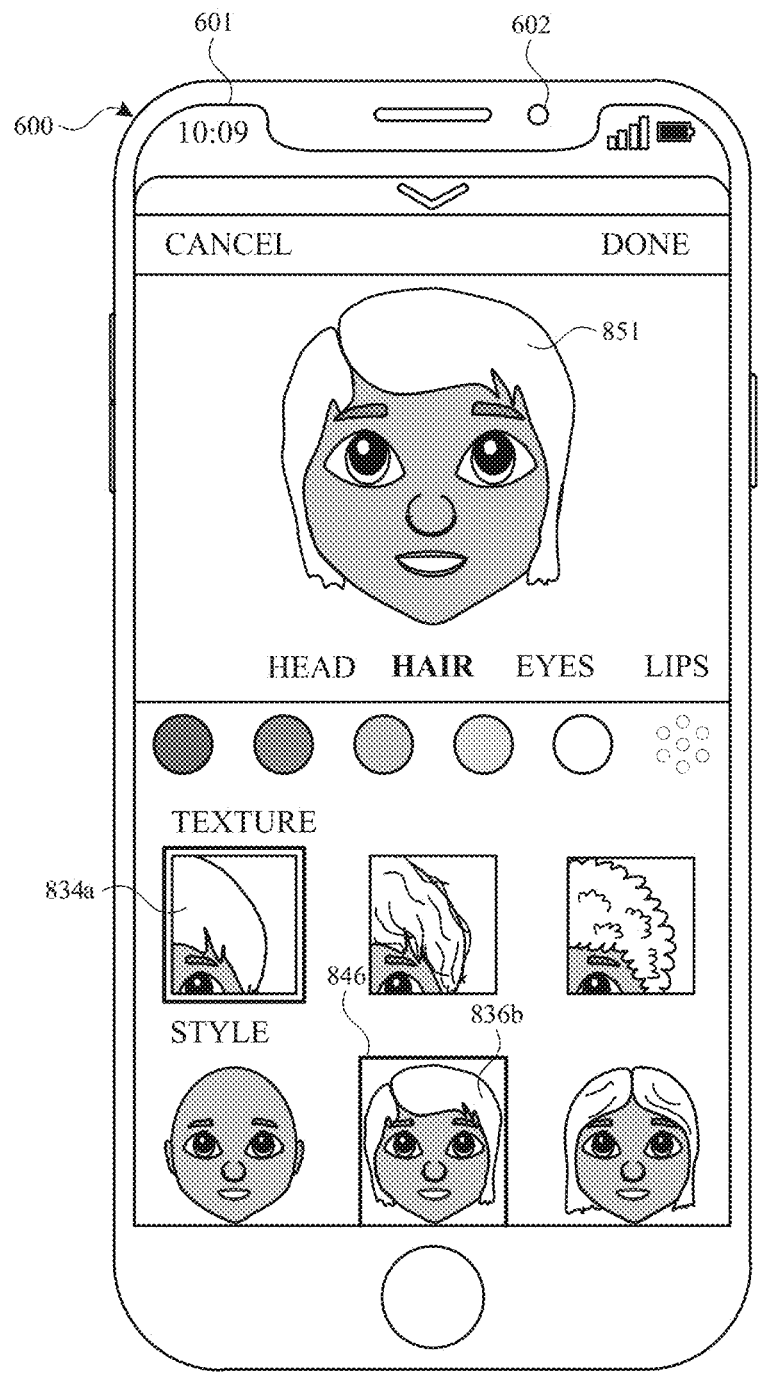

As shown in FIG. 8P, device 600 detects selection of pixie hairstyle option 836b in response to receiving input 848 (e.g., a touch input on display 601) on short hairstyle option 836b. In FIG. 8Q, device 600 displays avatar 805 having avatar hair 851 corresponding to pixie hairstyle option 836b selected in FIG. 8P and having a straight texture corresponding to selected straight hair texture 834a. Device 600 also displays border 846 moving from bald hairstyle option 836a to pixie hairstyle option 836b to provide a visual confirmation of the detected selection of pixie hairstyle option 836b.

In some embodiments, feature options include a zoomed-in (e.g., magnified) view of the respective avatar feature corresponding to the feature option. Such feature options are generally those for which a close-up view of the avatar feature is beneficial for illustrating sufficient detail to distinguish the different avatar feature options. For example, in FIG. 8R, device 600 shows hair texture options 834 corresponding to hair texture characteristic 840. Each of the hair texture options 834 show a magnified view of avatar hair so that the different hair textures represented by hair texture options 834 are better illustrated so they can be easily distinguished by the user. Straight hair texture option 834a shows a magnified view of avatar hair having a straight texture. Wavy hair texture option 834b shows a magnified view of avatar hair having a wavy texture. Curly hair texture option 834c shows a magnified view of avatar hair having a curly texture.

Figure 8R:
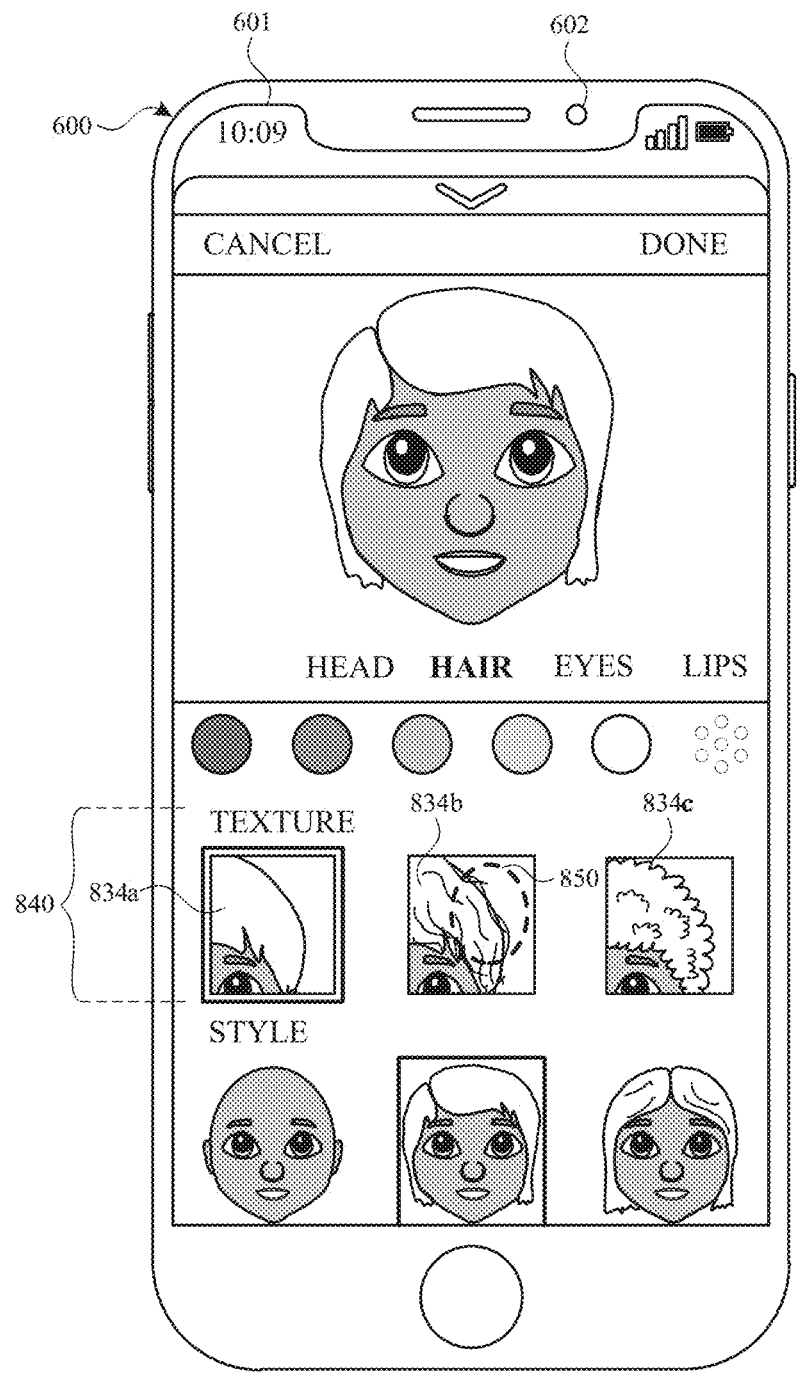

As shown in FIG. 8R, device 600 detects selection of wavy hair texture option 834b in response to receiving input 850 (e.g., a touch input on display 601) on wavy hair texture option 834b.

Figure 8S:
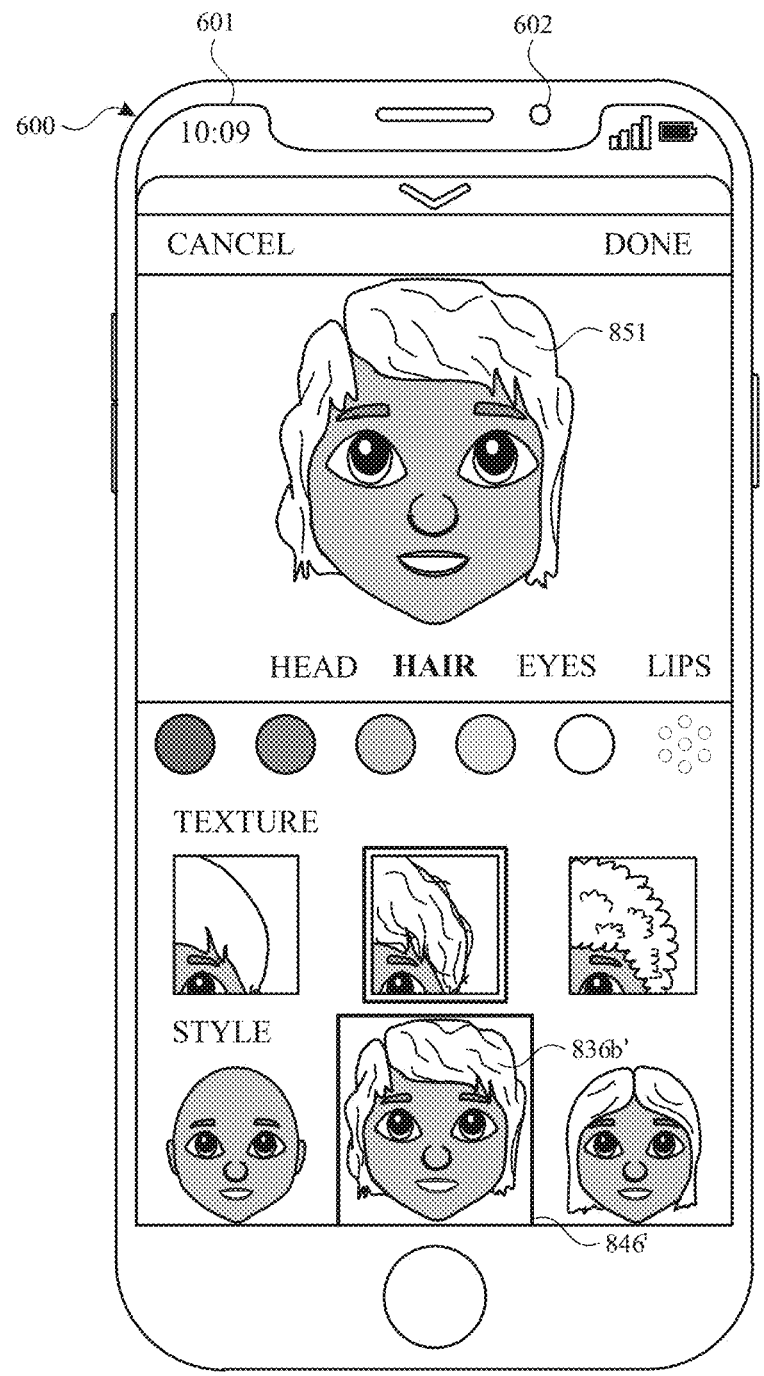
Figure 8T:
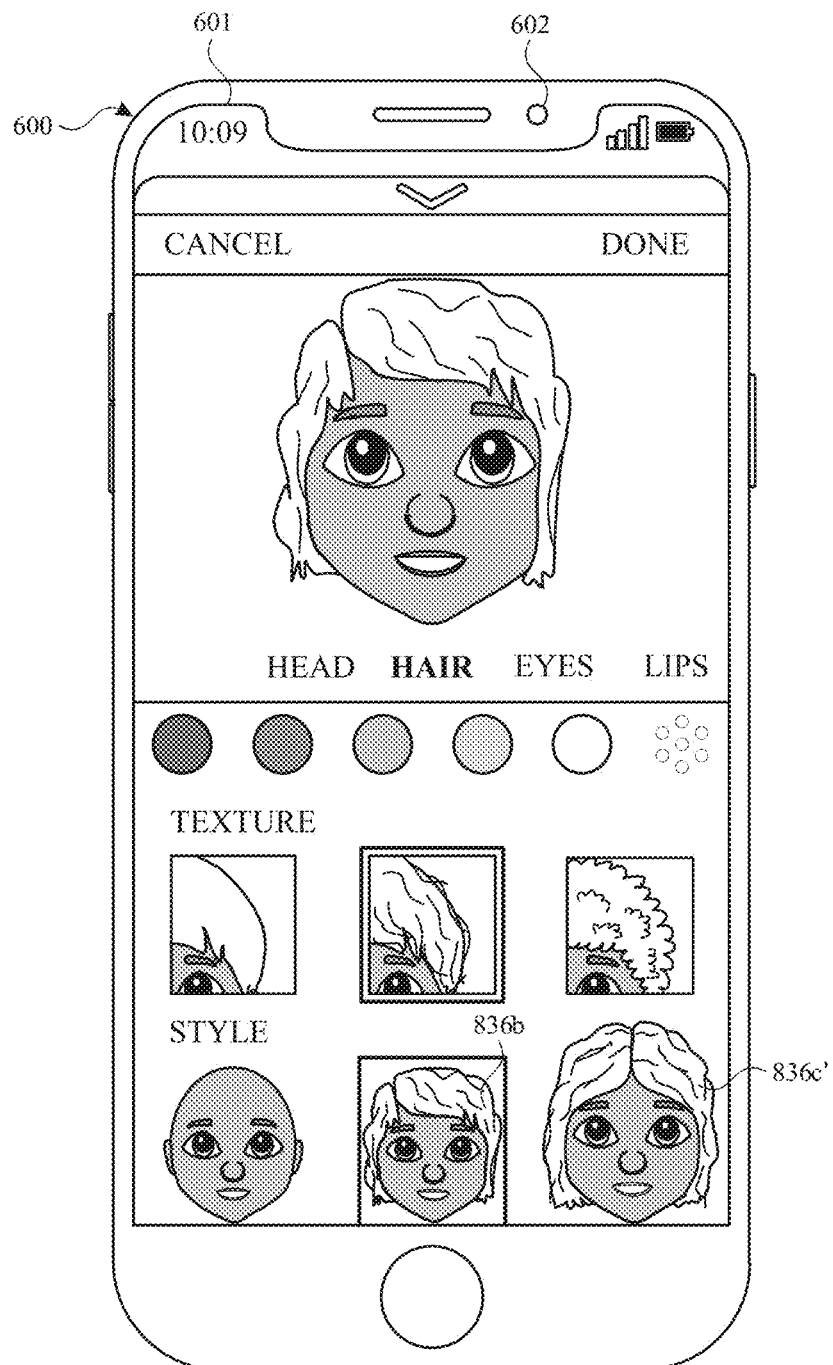
Figure 8U:
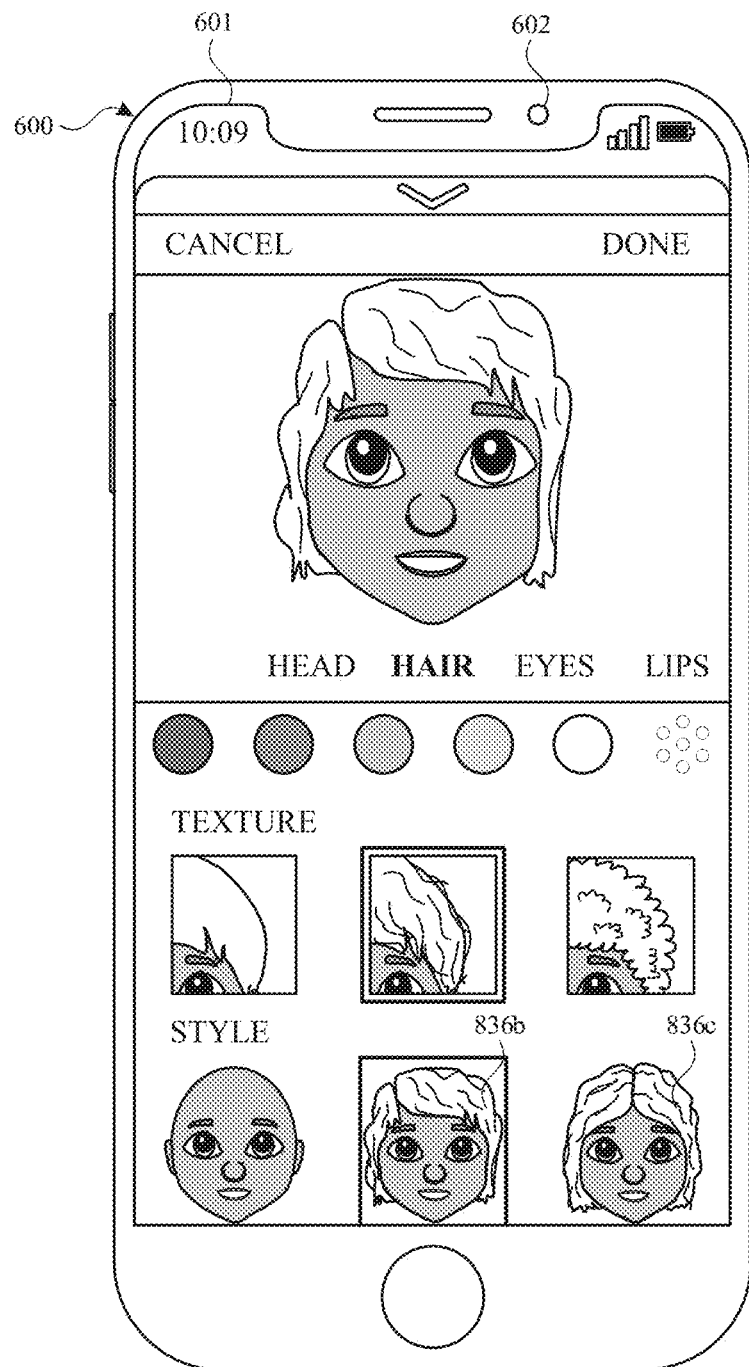

FIGS. 8S-8U illustrate device 600 updating avatar 805 and respective hairstyle feature options 836 in response detecting the selected wavy hair texture option 834b in FIG. 8R. For example, avatar hair 851 transitions from an appearance having straight hair texture in FIG. 8R to an appearance having wavy hair texture in FIG. 8S.

Additionally, in the embodiments discussed herein, feature options that illustrate avatar features affected by a selection of a different feature option are updated to reflect the selection of the different feature option. For example, in FIGS. 8S-8U, pixie hairstyle option 836b and bob hairstyle option 836c illustrate avatar hair (specifically, avatar hair that is affected by the selection of wavy hair texture option 834b), therefore each of the hairstyles shown in hairstyle options 836b and 836c are updated to show the respective hairstyle options transitioning from an appearance having straight hair texture in FIG. 8R to a different appearance having the selected wavy hair texture. Bald hairstyle option 836a does not display avatar hair. Therefore, bald hairstyle option 836a is not shown transitioning to a different appearance.

In some embodiments, when a feature option is selected for a particular avatar feature characteristic, the feature options shown for that characteristic do not change in response to the selection, whereas feature options for other avatar feature characteristics do change. For example, in FIGS. 8S-8U, hair texture options 834 do not change when wavy hair texture option 834b is selected, but hairstyle options 836 do change. Similarly, as shown in FIGS. 8AN-8AQ (discussed below), when a different hairstyle option is selected, the hairstyle options do not change, but other feature options (e.g., hair texture options) do change (e.g., changed hair texture options 834 in FIG. 8AQ).

The transition of pixie hairstyle option 836b and bob hairstyle option 836c is shown in FIGS. 8S-8U. Pixie hairstyle option 836b is displayed transitioning from an appearance having the straight hair texture in FIG. 8R to a different appearance having the selected wavy hair texture in FIGS. 8S and 8T. This transition includes enlarging the displayed pixie hairstyle option 836b and, optionally, border 846, during transition from the straight hair texture to the wavy hair texture (see enlarged pixie hairstyle option 836b' and enlarged border 846' in FIG. 8S), and then shrinking the pixie hairstyle option 836b back to its original size in FIG. 8T after the transition to the appearance with the wavy hair texture is complete. Bob hairstyle option 836c is displayed transitioning from an appearance having the straight hair texture in FIG. 8S to a different appearance having the selected wavy hair texture in FIGS. 8T and 8U. This transition includes enlarging the displayed bob hairstyle option 836c during transition from the straight hair texture to the wavy hair texture (see enlarged bob hairstyle option 836c' in FIG. 8T), and then shrinking the bob hairstyle option 836c back to its original size in FIG. 8U after the transition to the appearance with the wavy hair texture is complete.

Bob hairstyle option 836c is transitioned after pixie hairstyle option 836b is finished transitioning (e.g., after displaying enlarged pixie hairstyle option 836b' returning to its original size in FIG. 8T). This displayed effect of momentarily enlarging the transitioning feature options, combined with the timing of completing the transitions in a displayed order, gives a ripple effect appearance that provides a visual indication to the user that particular feature options are transitioning based on the user's selection of a different feature option (e.g. a feature option other than the one being transitioned). This visual effect also indicates to the user exactly when respective feature options are in the process of transitioning (e.g., when the feature option is enlarged), and also provides an indication of when the transition is complete (e.g., when the feature option returns to its smaller, original size). This also presents a visual confirmation to the user that particular feature options were not affected by the selection, because such feature options (if any) are not shown having a momentary enlargement.

Figure 8V:
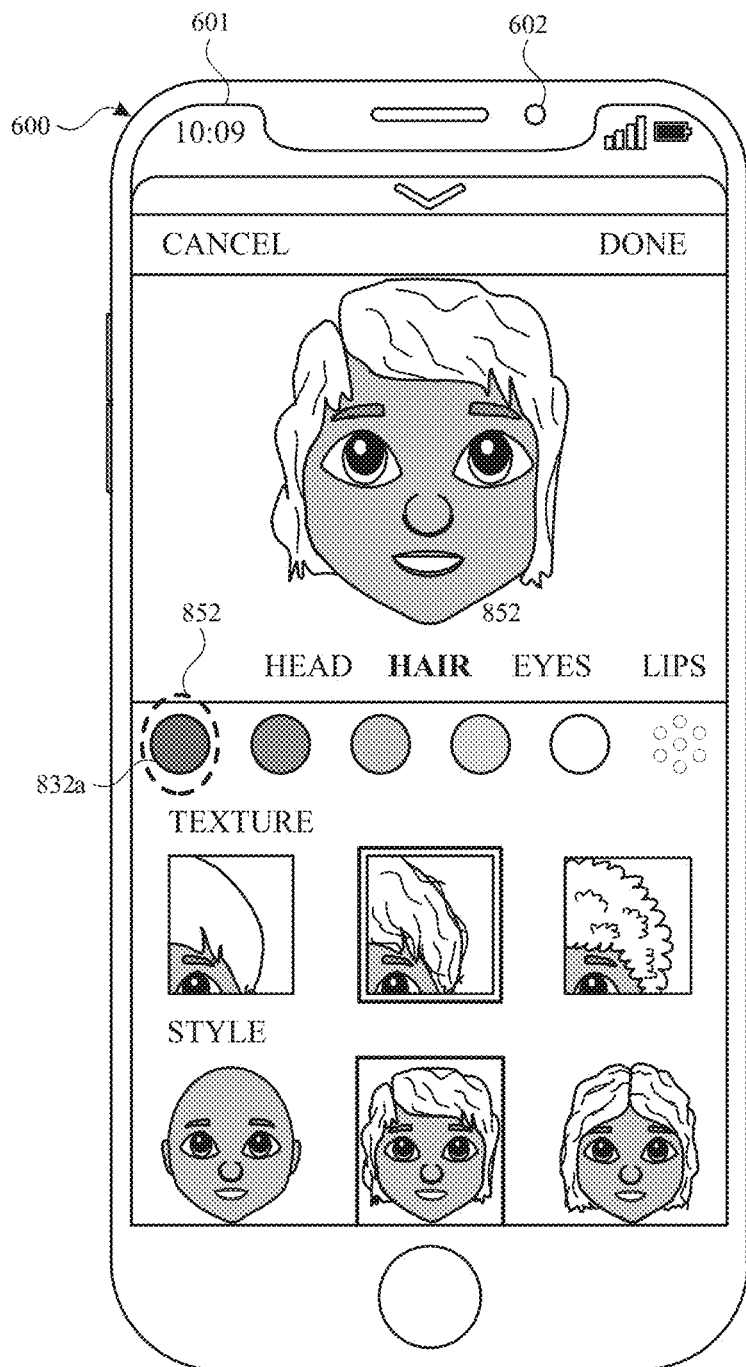

In FIG. 8V, device 600 detects a selection of hair color option 832a in response to receiving input 852 (e.g., a touch input on display 601) on hair color option 832a.

Figure 8W:
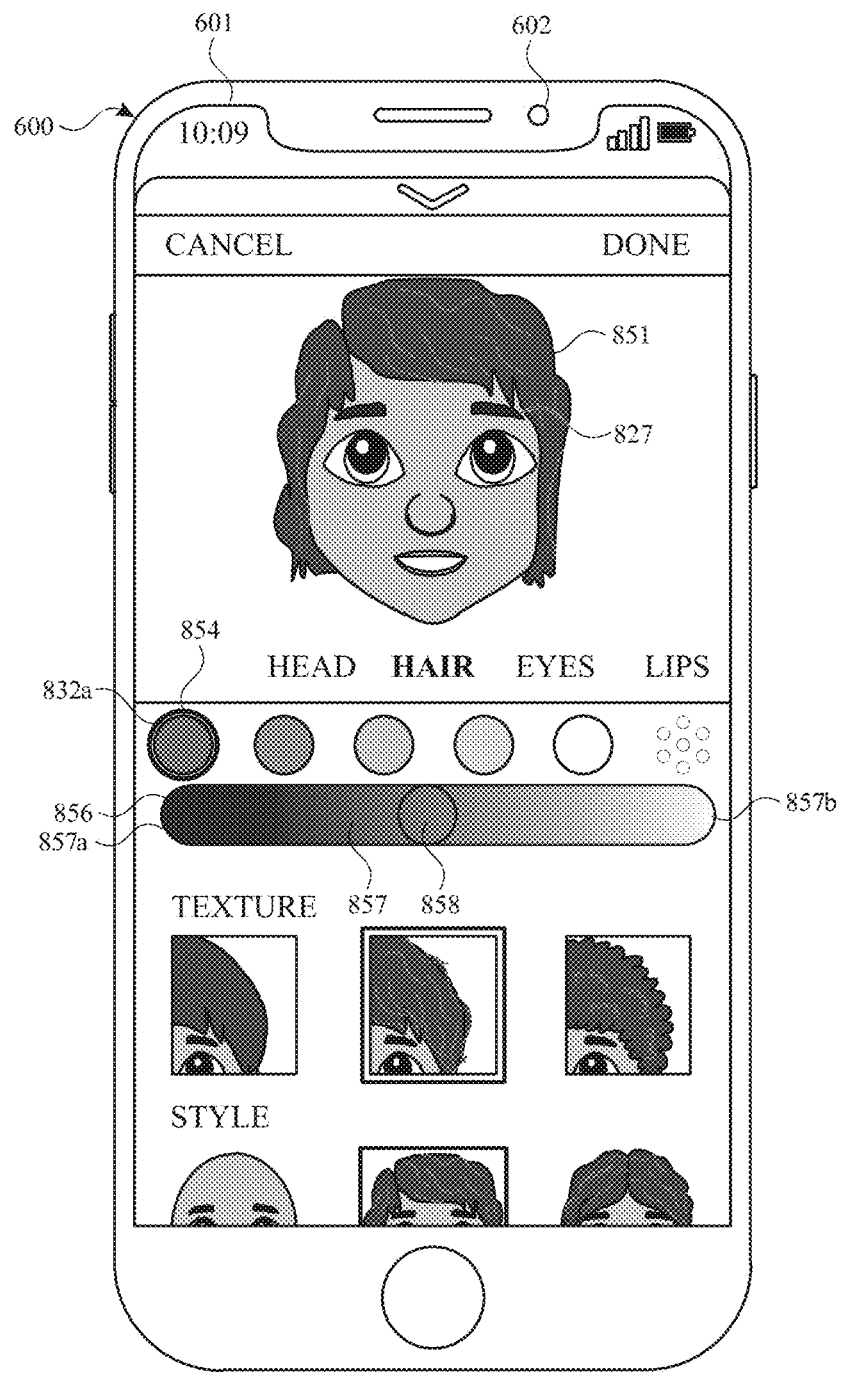

In FIG. 8W, device 600 indicates hair color option 832a is selected by displaying border 854 around hair color option 832a. Device 600 also modifies avatar hair 851, eyebrows 827, hair texture options 834, and hairstyle options 836 (e.g., 836b and 836c) to have a hair color matching selected hair color option 832a. In some embodiments, the color (or color properties) of eyebrows 827 is determined based on a combination of the skin tone color and the hair color. For example, a hue of eyebrows 827 can be determined based on the selected hair color and a luminance of eyebrows 827 can be determined based on the selected skin tone color. The transition of the hair texture options 834 and hairstyle options 836 can be displayed in accordance with the ripple appearance discussed above. For example, hair texture options 834a-834c transition (e.g., with momentary enlargement) in sequential order, followed by transition of hairstyle options 836b and 836c (e.g., with momentary enlargement) in sequential order.

Device 600 also displays hair color slider 856 for adjusting a gradient of selected hair color option 832a. Hair color slider 856 includes selector affordance 858 (also referred to herein as a thumb) having an initial (e.g., default) location within a gradient region 857 (also referred to herein as a track) that extends between a high gradient value 857a and a low gradient value 857b of selected color 832a. Selector affordance 858 can be moved within region 857 (e.g., in accordance with a magnitude and direction of an input on the slider) to adjust the gradient of selected color 832a based on the position of selector affordance 858 within the gradient region 857. Adjusting the gradient of selected hair color option 832a causes the device to modify any avatar features having the selected color 832a (including feature options showing such avatar features as well as the color of the selected hair color option (e.g., 832a changes in FIGS. 8AY and 8AZ as affordance 858 moves in region 857)). Unless specified otherwise, when reference is made herein to modifying a particular color option, the modification also applies to the respective feature associated with the color option and feature options showing the respective avatar feature.

In some embodiments, the gradient can represent various characteristics of the selected hair color such as, for example, shading, saturation, undertone, midtones, highlights, warmth, luminance, or hue. In some embodiments, the gradient can represent an undertone of the avatar hair that is different from the selected color and, optionally, based on a selected skin tone of the avatar. The gradient of the undertone can be adjusted by moving selector affordance 858 within the gradient region 857, which ultimately modifies the appearance of the selected hair color and avatar hair 851. In some embodiments, the undertone of the hair corresponds to a natural hair color that is determined based on a selected skin tone (skin color). For example, for darker skin tones, the hair has a darker undertone (e.g., a brown or black undertone), whereas lighter skin tones produce a lighter hair undertone (e.g., a blonde or red undertone). Adjusting the undertone gives the hair an appearance of having not only a particular color applied, but also an intensity of that color, based on the gradient of the undertone. For example, for avatar hair having a non-natural selected hair color (e.g., purple), adjusting an undertone to a low gradient value 857b, provides little or no natural hair color (e.g., brown) undertone. This emphasizes the purple hair color, giving the appearance that the avatar has heavily applied a purple hair dye. Conversely, adjusting the undertone to a high gradient value 857a emphasizes the natural undertone of the hair (or other avatar feature, such as avatar eyebrows or lips), giving the appearance that the avatar has lightly applied purple hair dye. By adjusting the position of selector affordance 858 along the slider, a user can adjust the gradient of the undertone that device 600 applies to selected color 832a.

In some embodiments, selector affordance 858 includes a color representing a currently selected gradient of selected color 832a. In its initial location, selector affordance 858 has a same color as selected color 832a when selected color 832a is initially displayed. In other words, selected color 832a has an initial (e.g., default or preselected) color the first time it is selected (e.g., see FIG. 8V). When hair color slider 856 is first displayed, selector affordance 858 has an initial location at the center of region 857 and a color corresponding to the initial color of selector color 832a. Moving the position of selector affordance 858 from its initial location to a different location causes the device to modify the gradient of the selected color 832a, the corresponding color of selector affordance 858, and any avatar features having the selected color 832a (including feature options showing such avatar features), based on the new location of selector affordance 858. In the embodiment illustrated in FIG. 8X, moving selector affordance 858 towards high gradient value 857a darkens selected color 832a, whereas moving selector affordance 858 towards low gradient value 857b lightens selected color 832a.

Figure 8X:
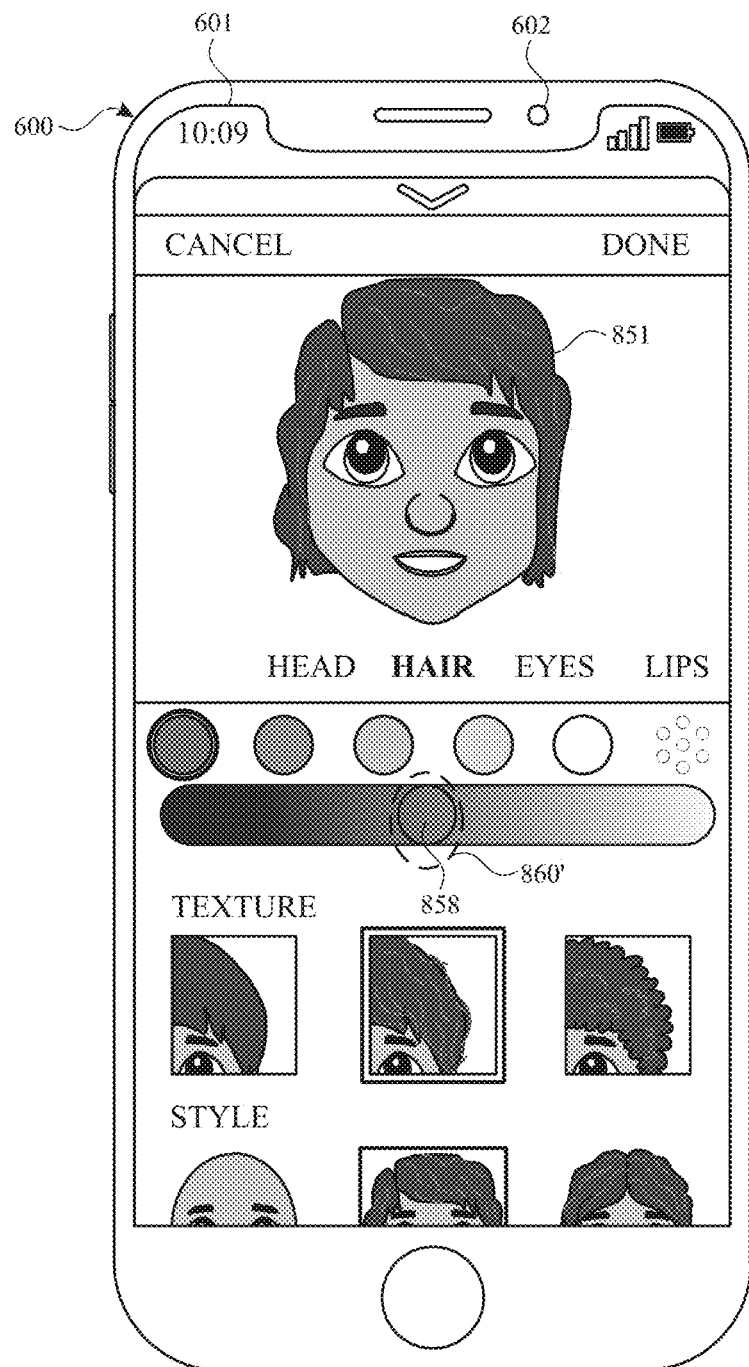
Figure 8Y:
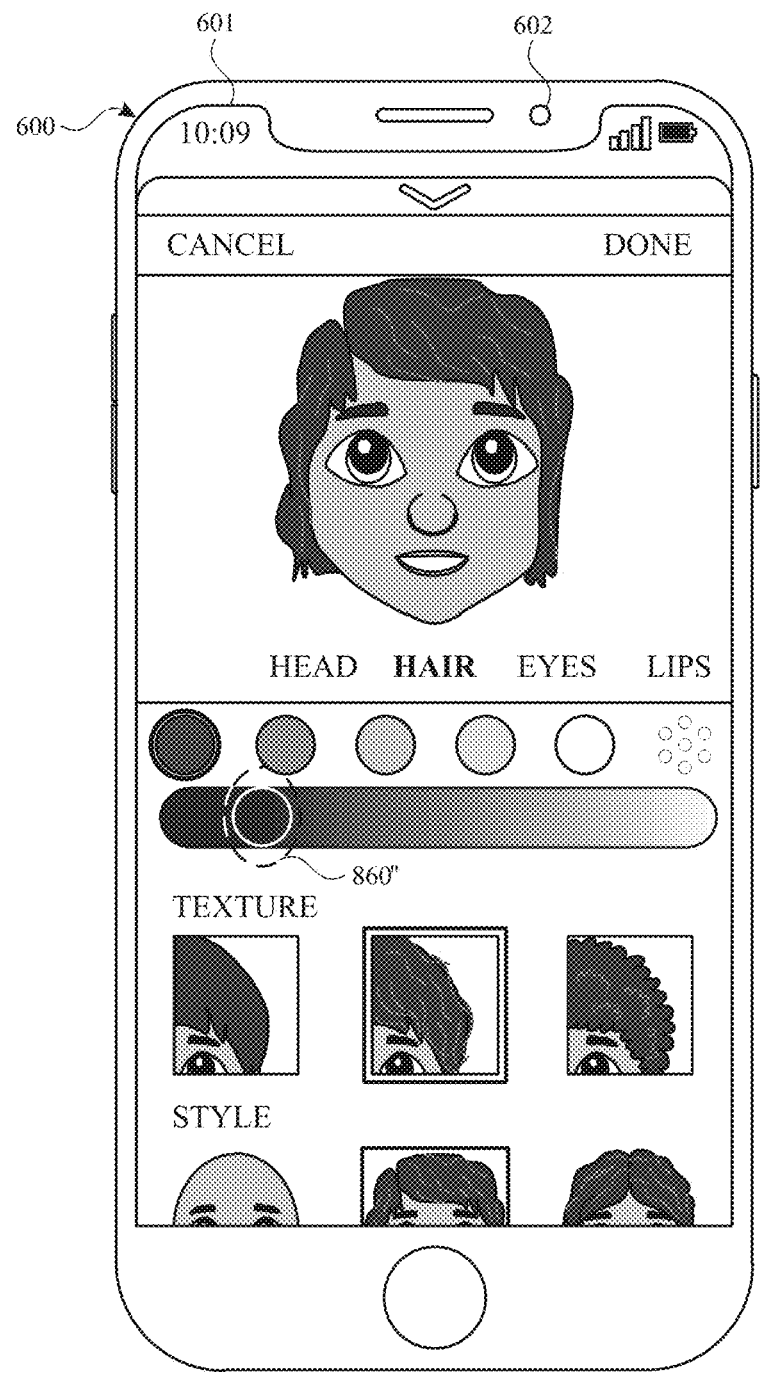
Figure 8Z:
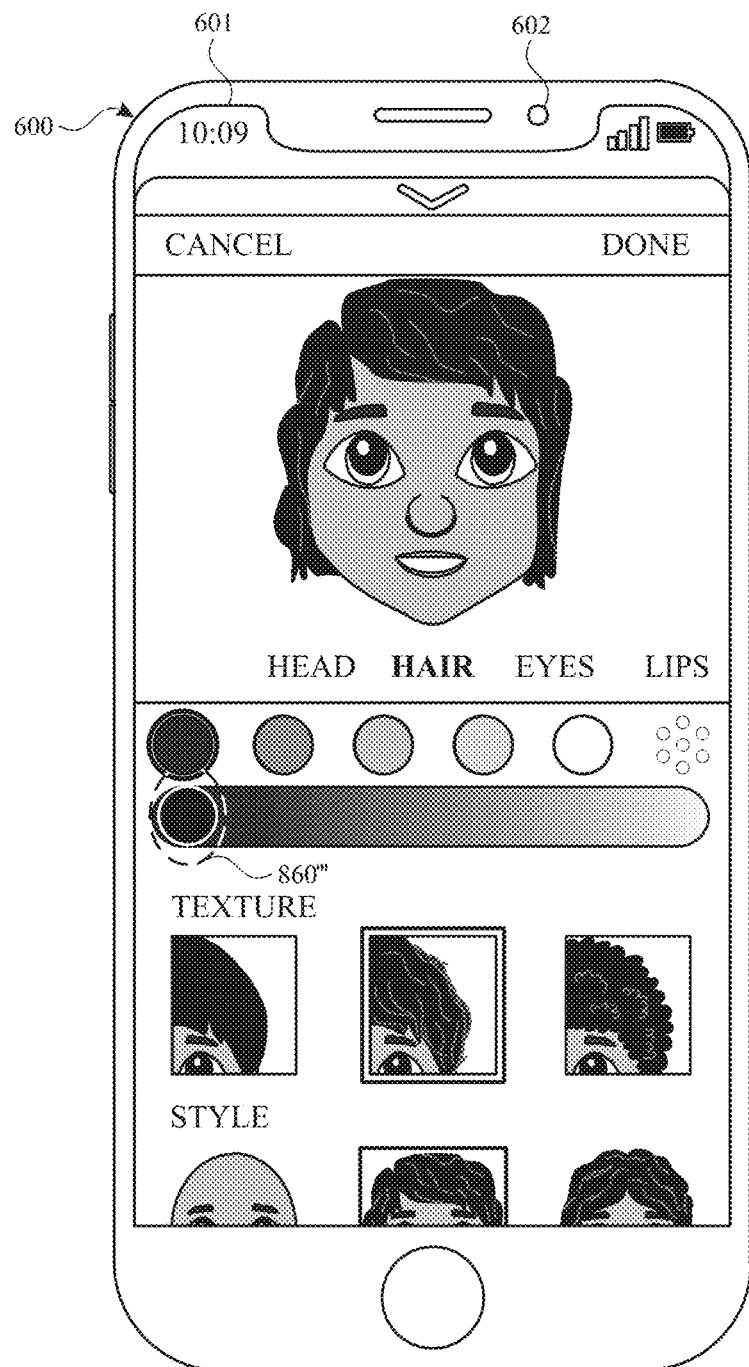
Figure 8A:
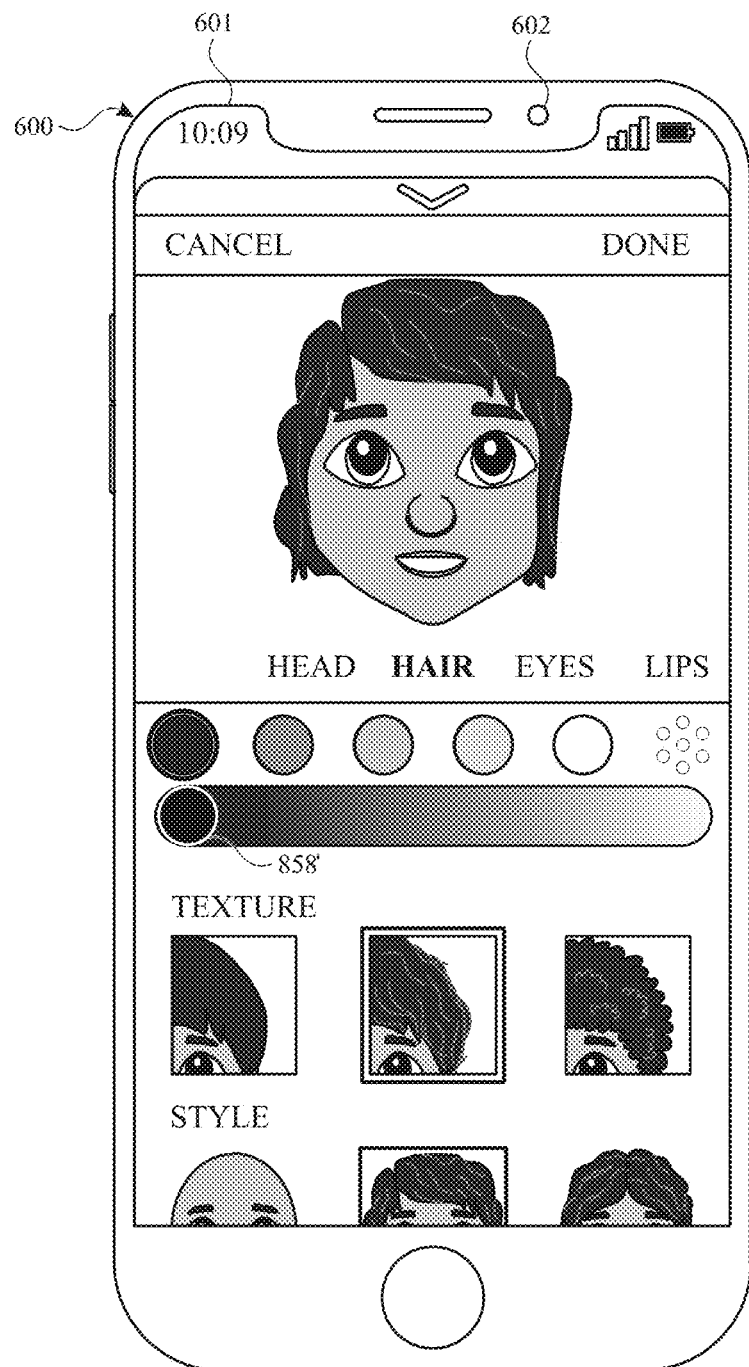
Figure 8A:
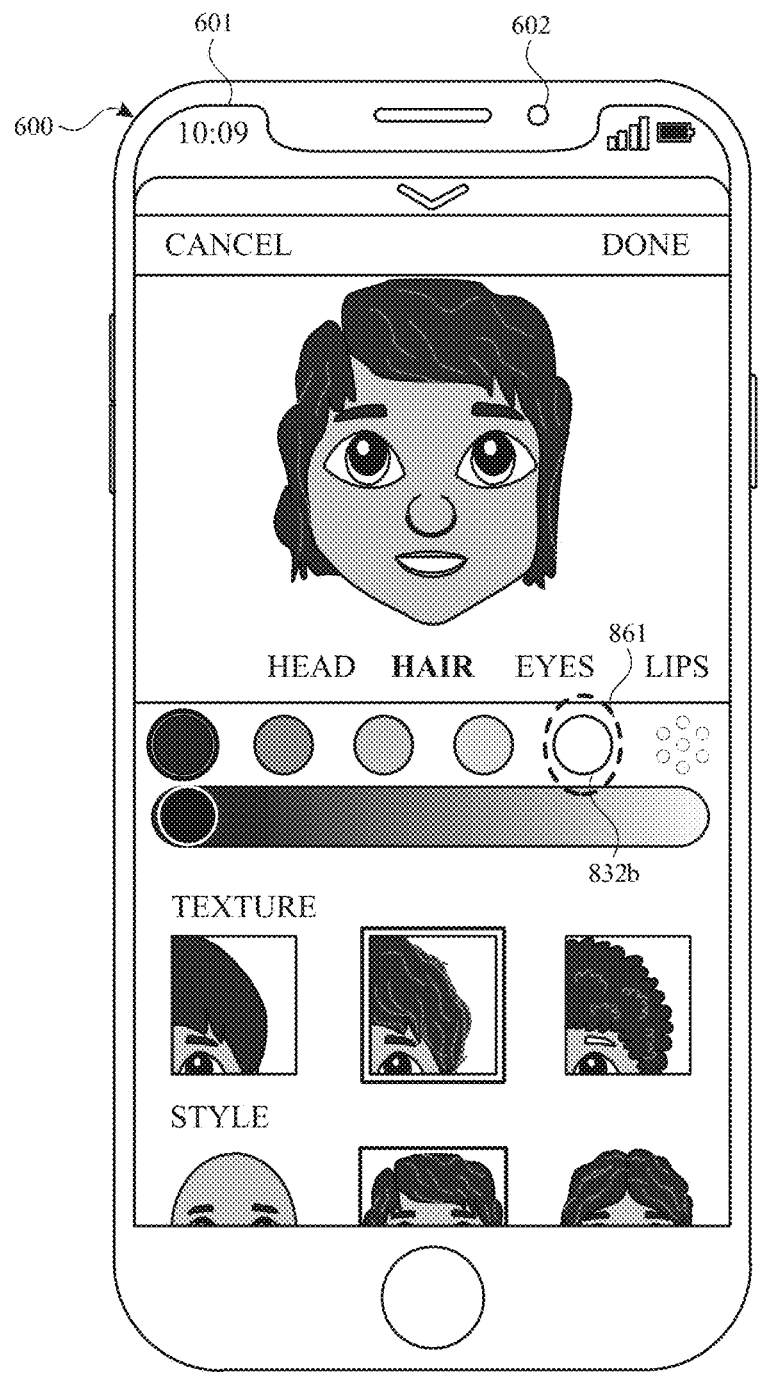
Figure 8A:
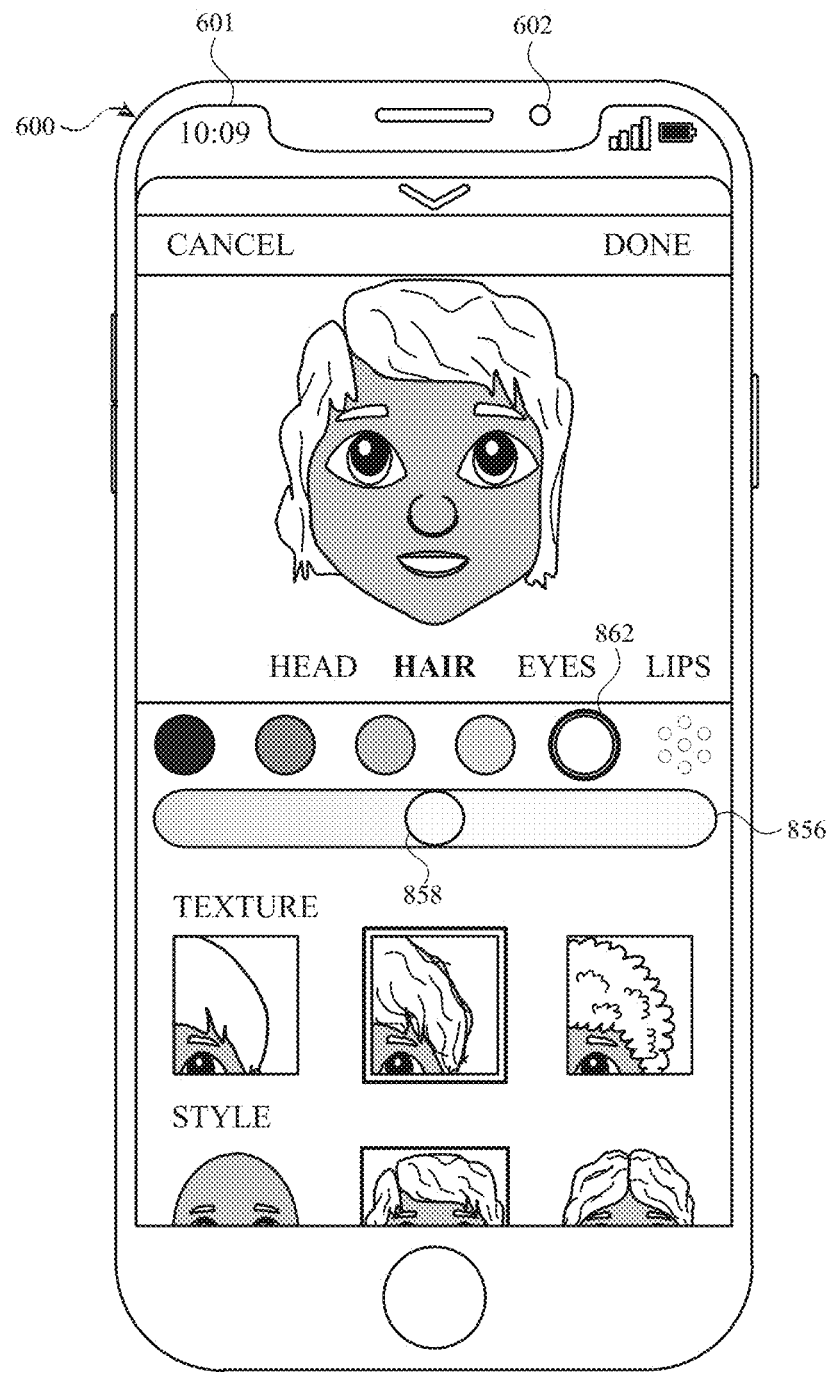
Figure 8A:
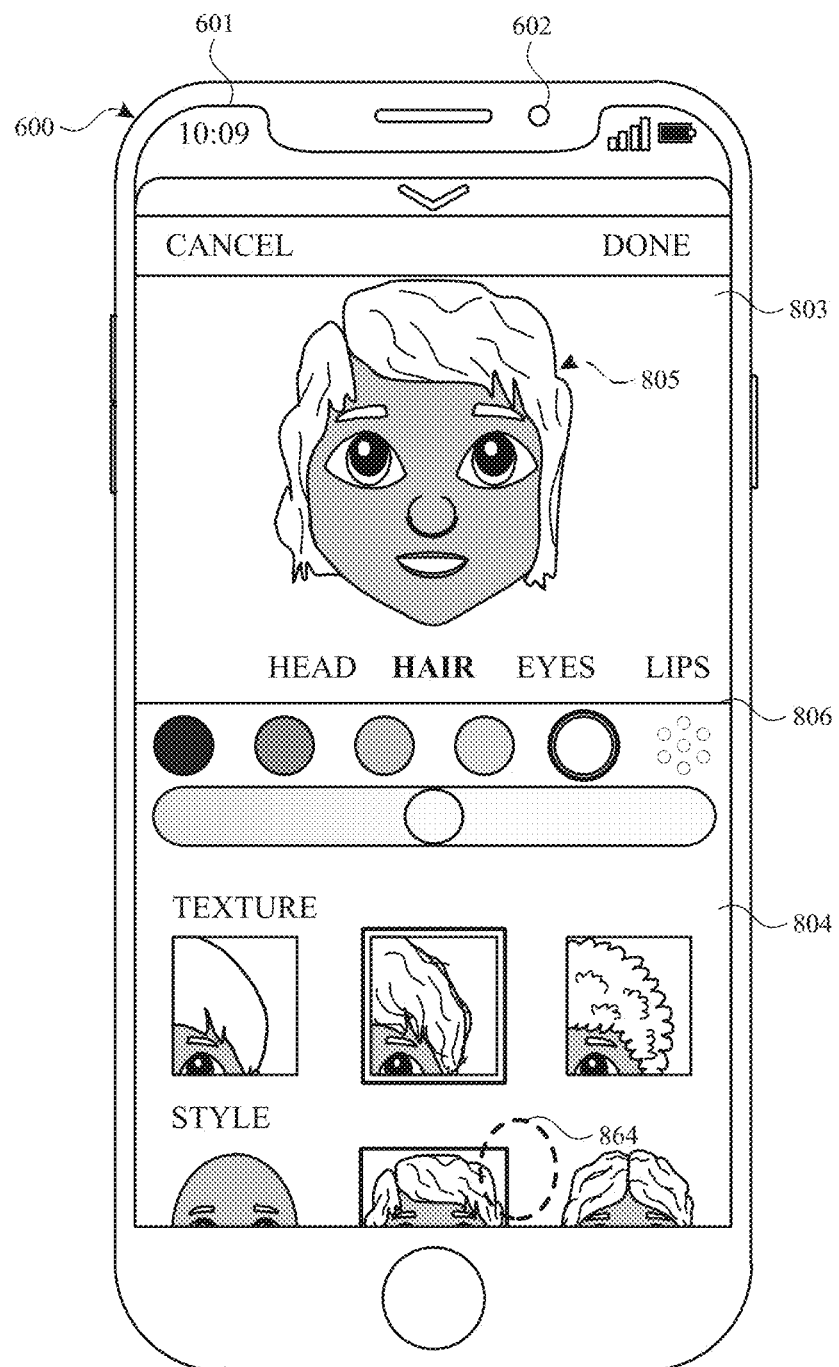
Figure 8A:
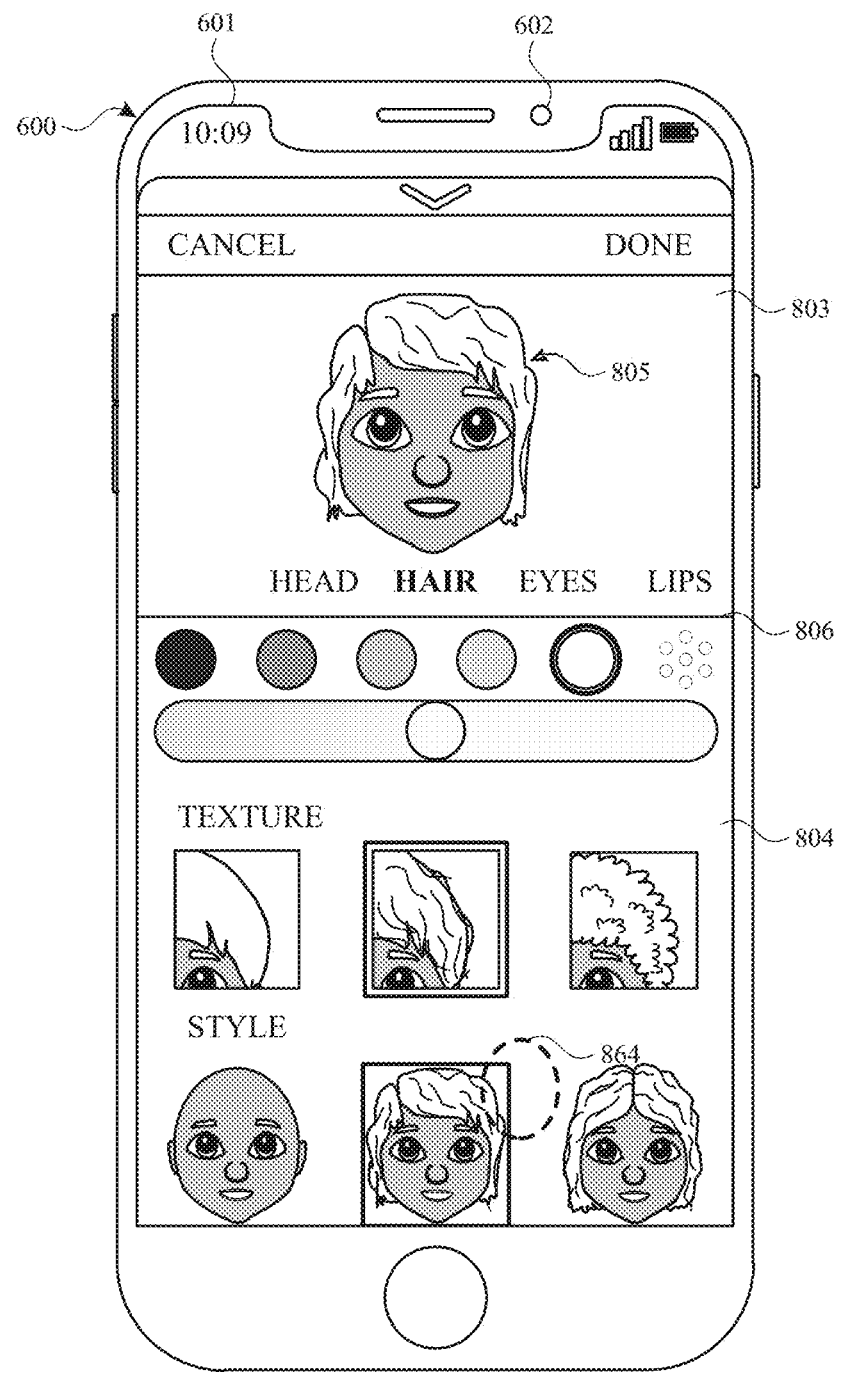
Figure 8A:
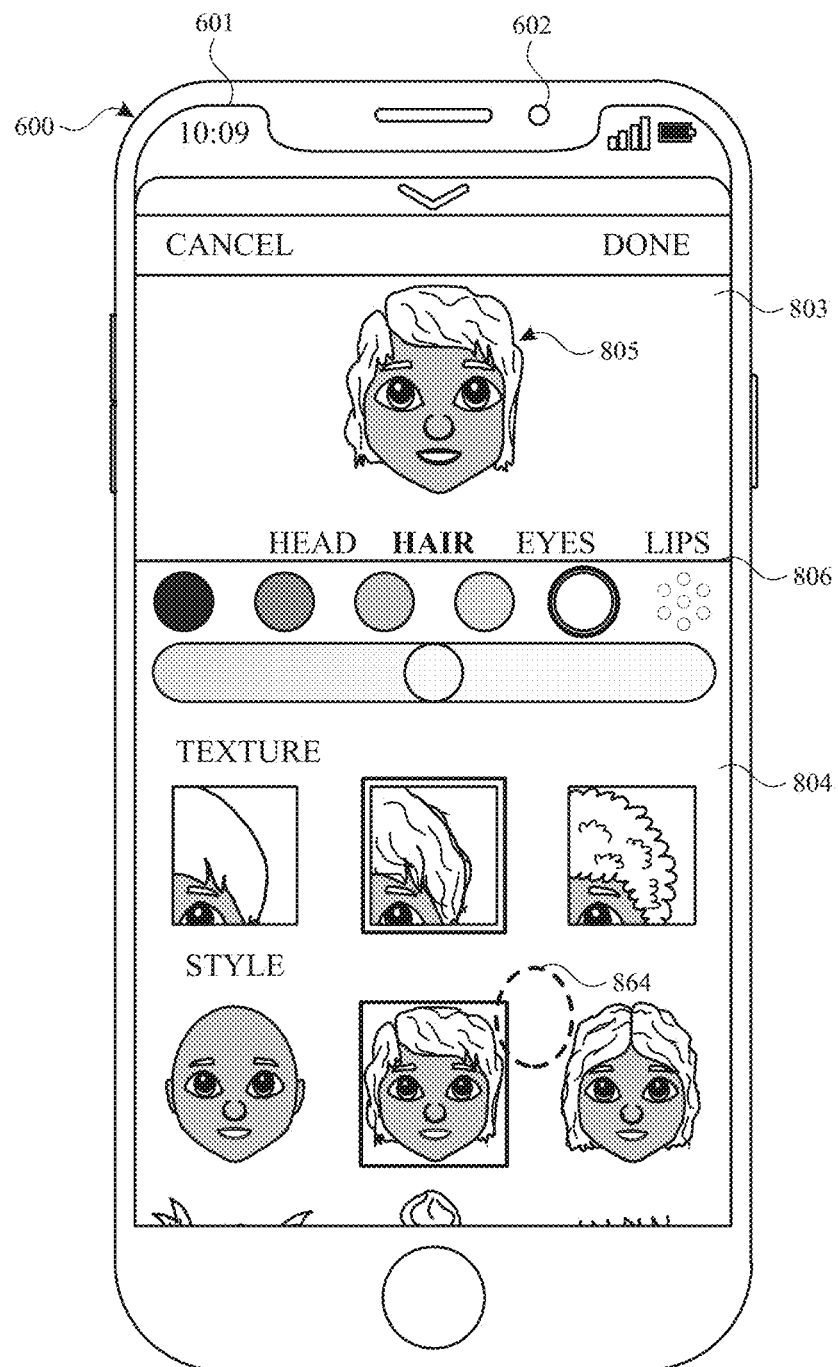
Figure 8A:
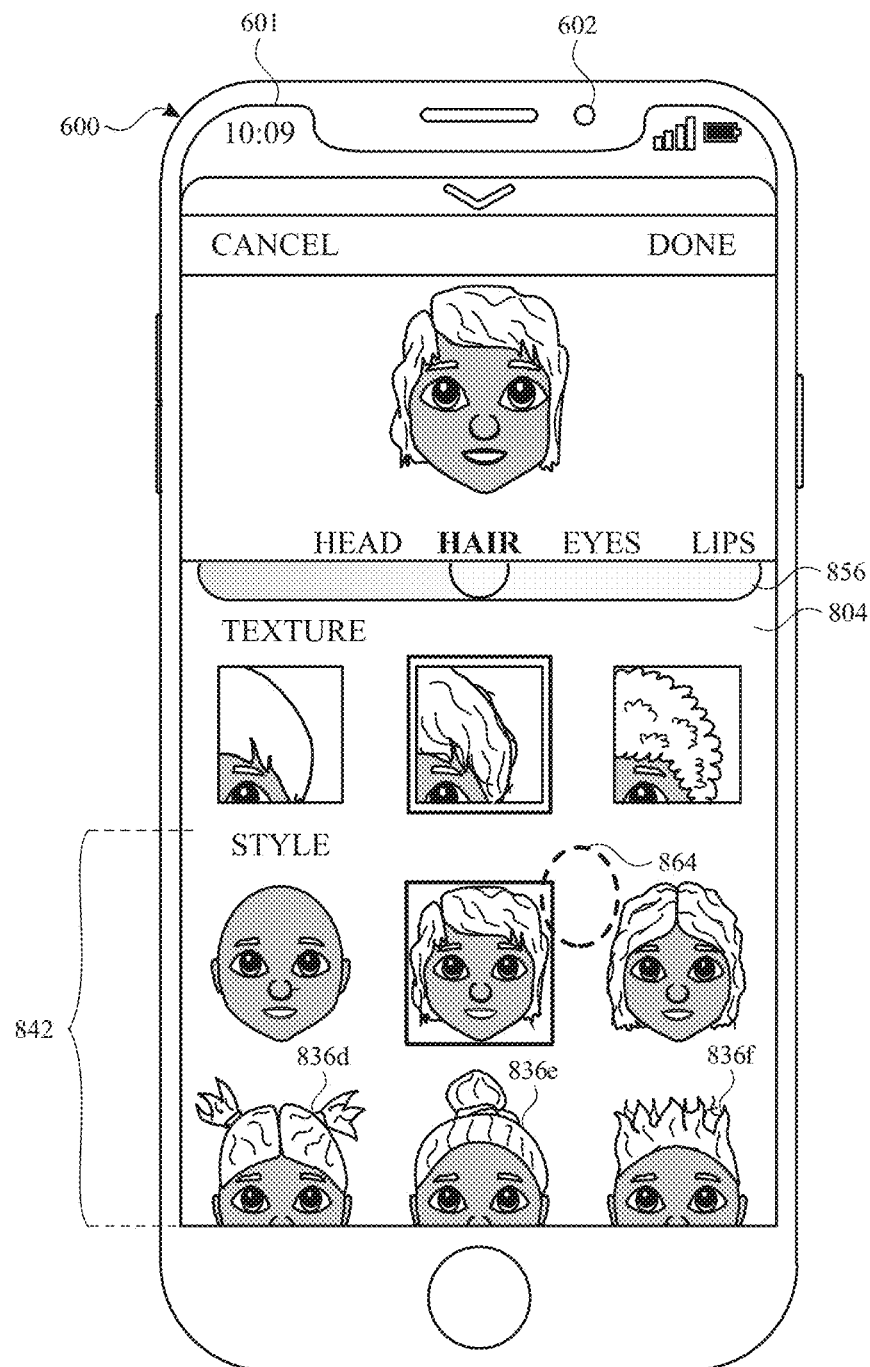
Figure 8A:
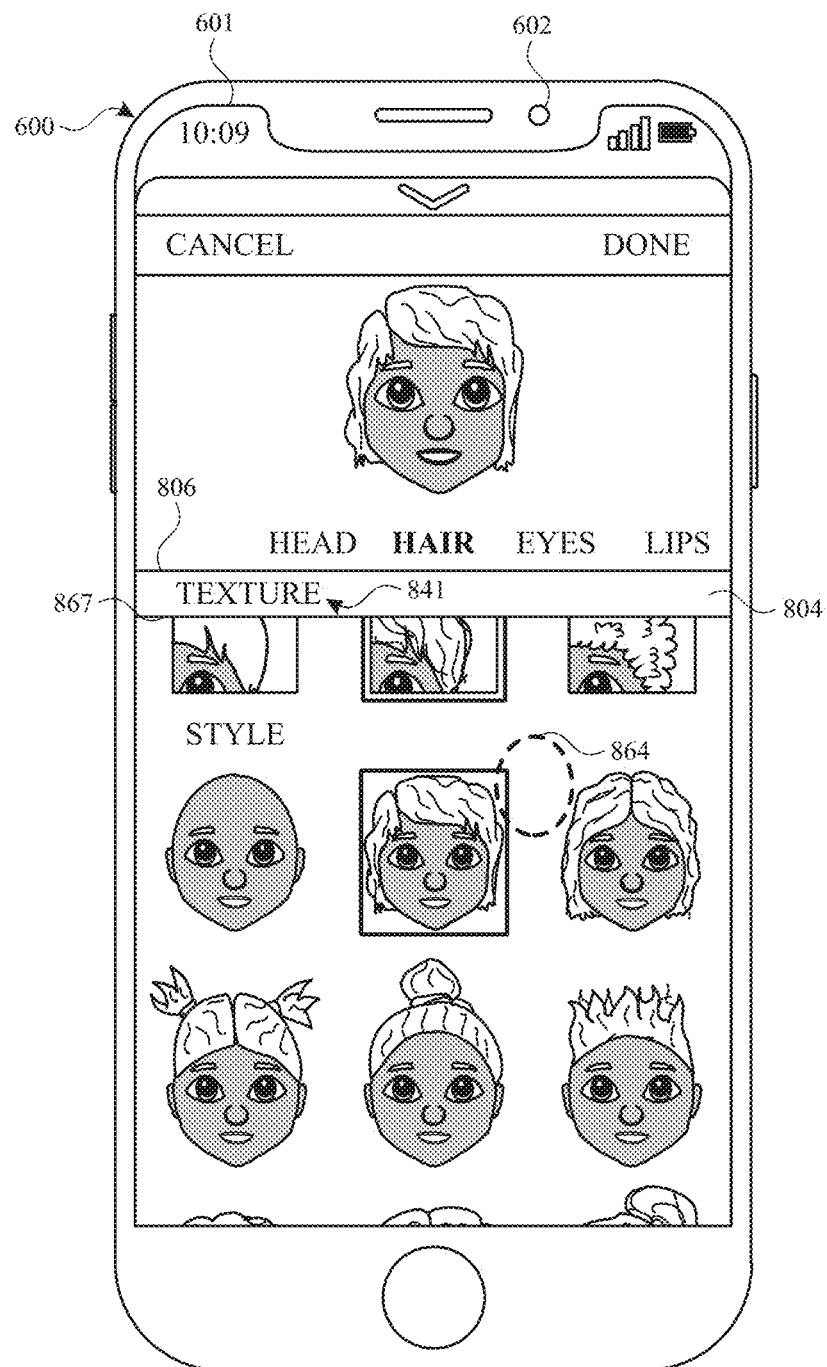
Figure 8A:
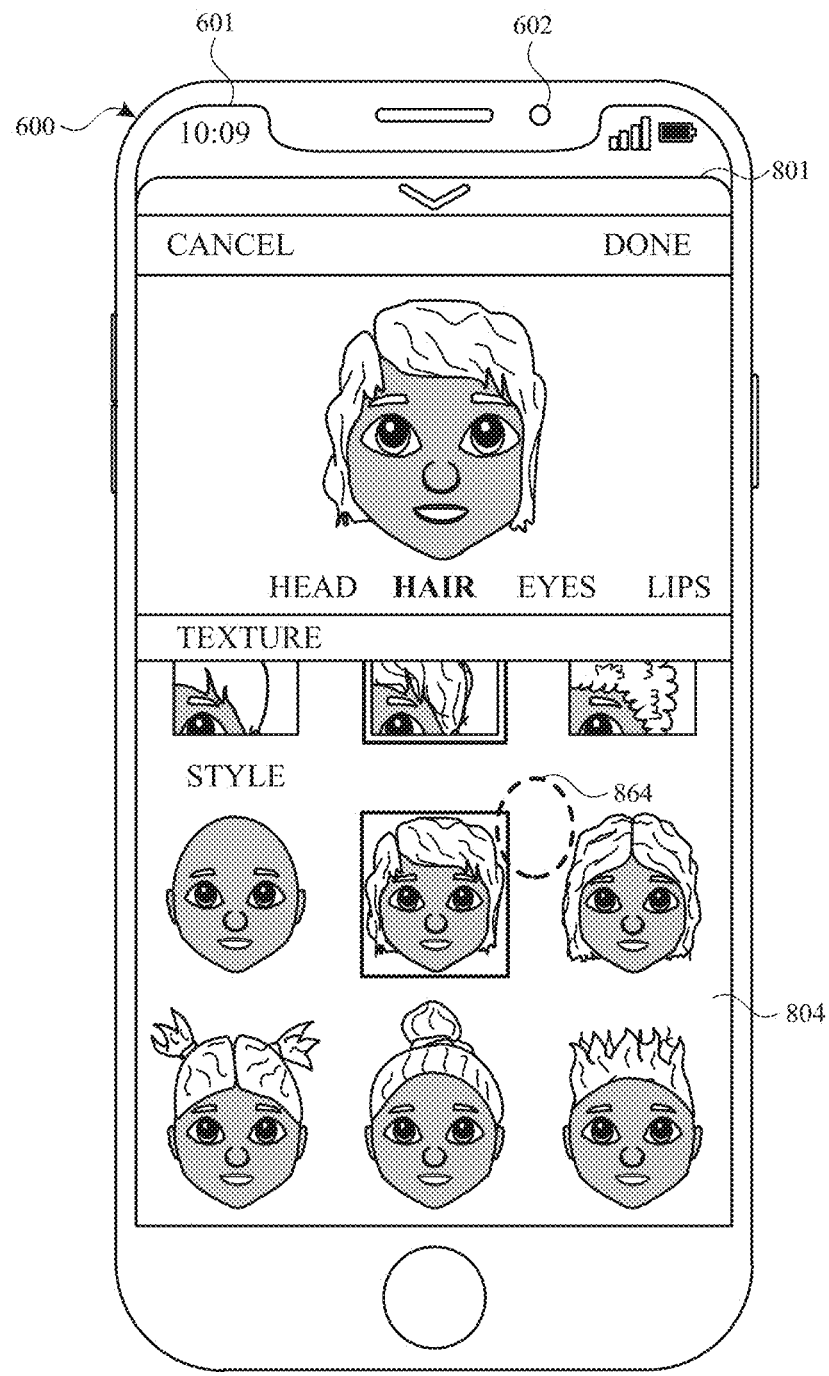
Figure 8A:
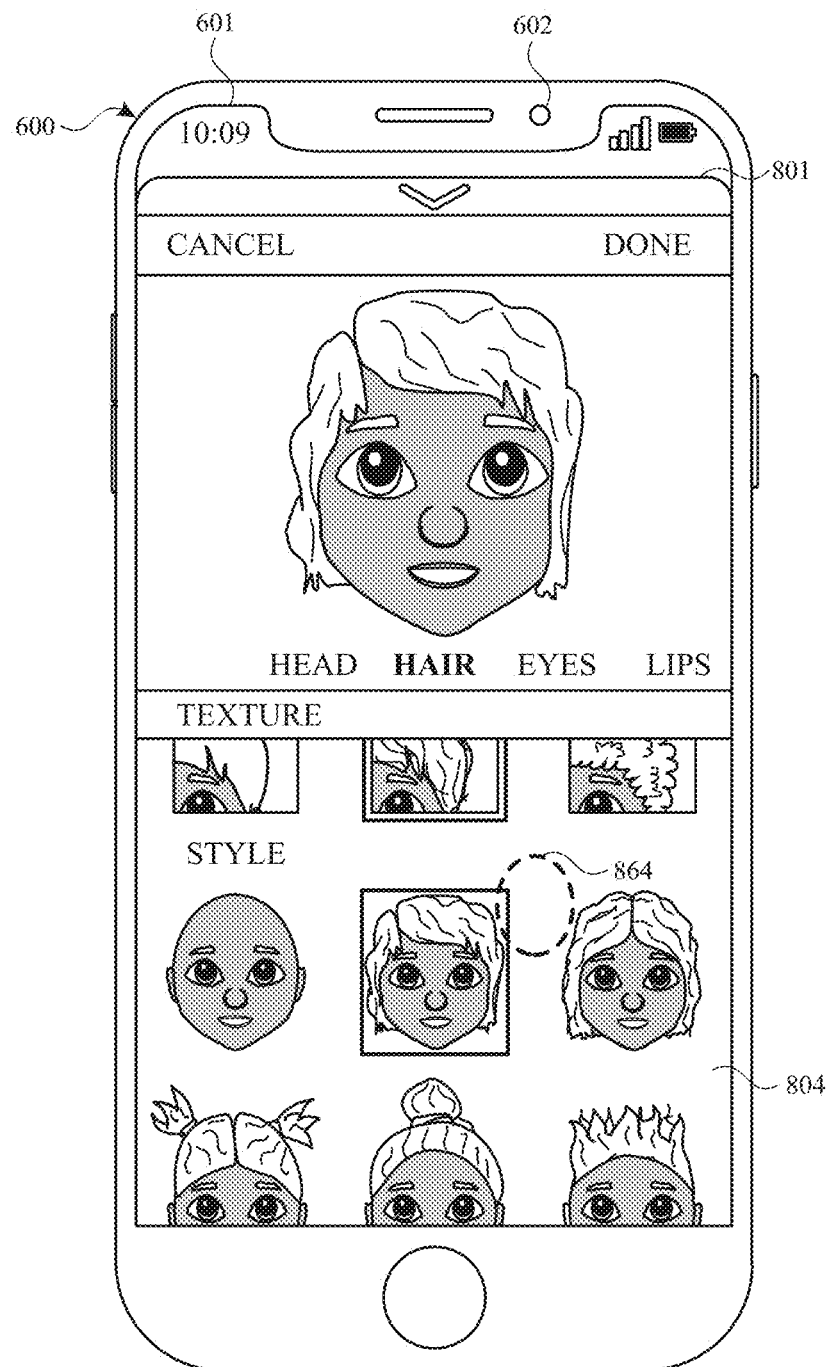
Figure 8A:
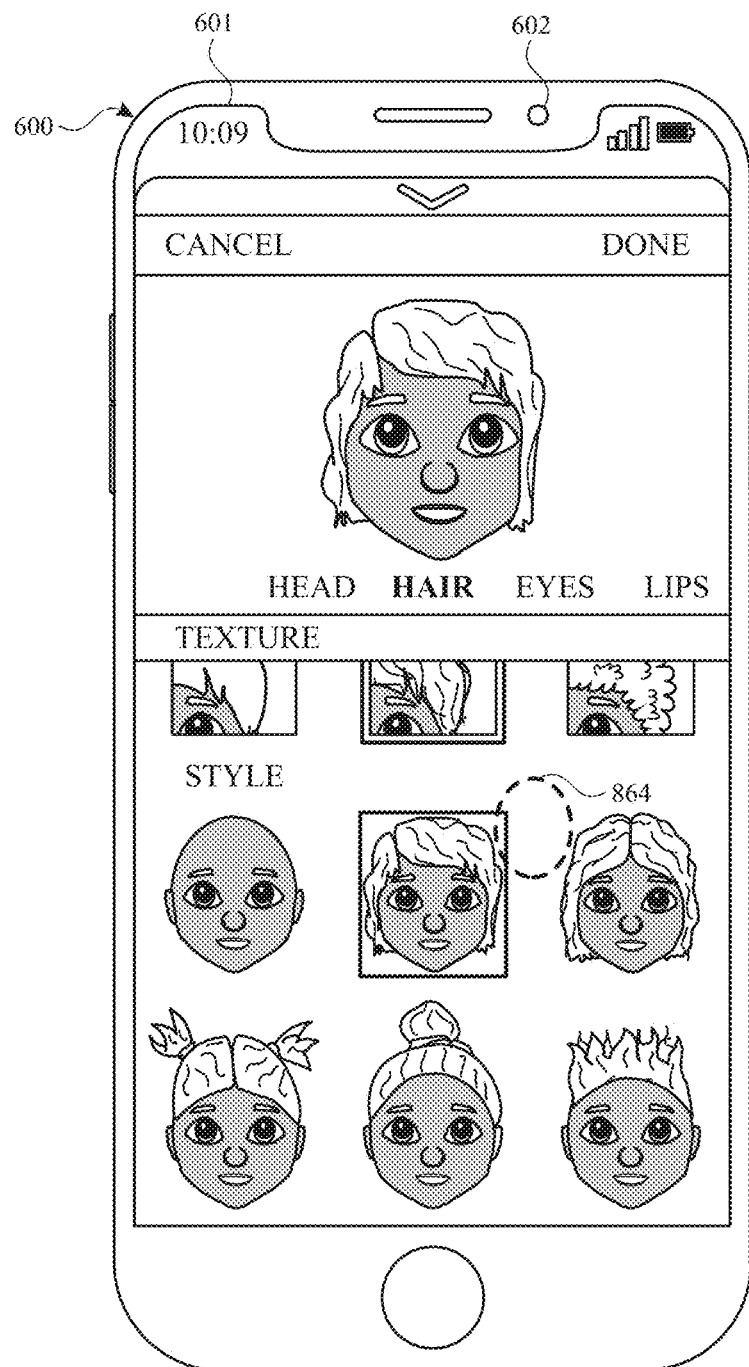
Figure 8A:
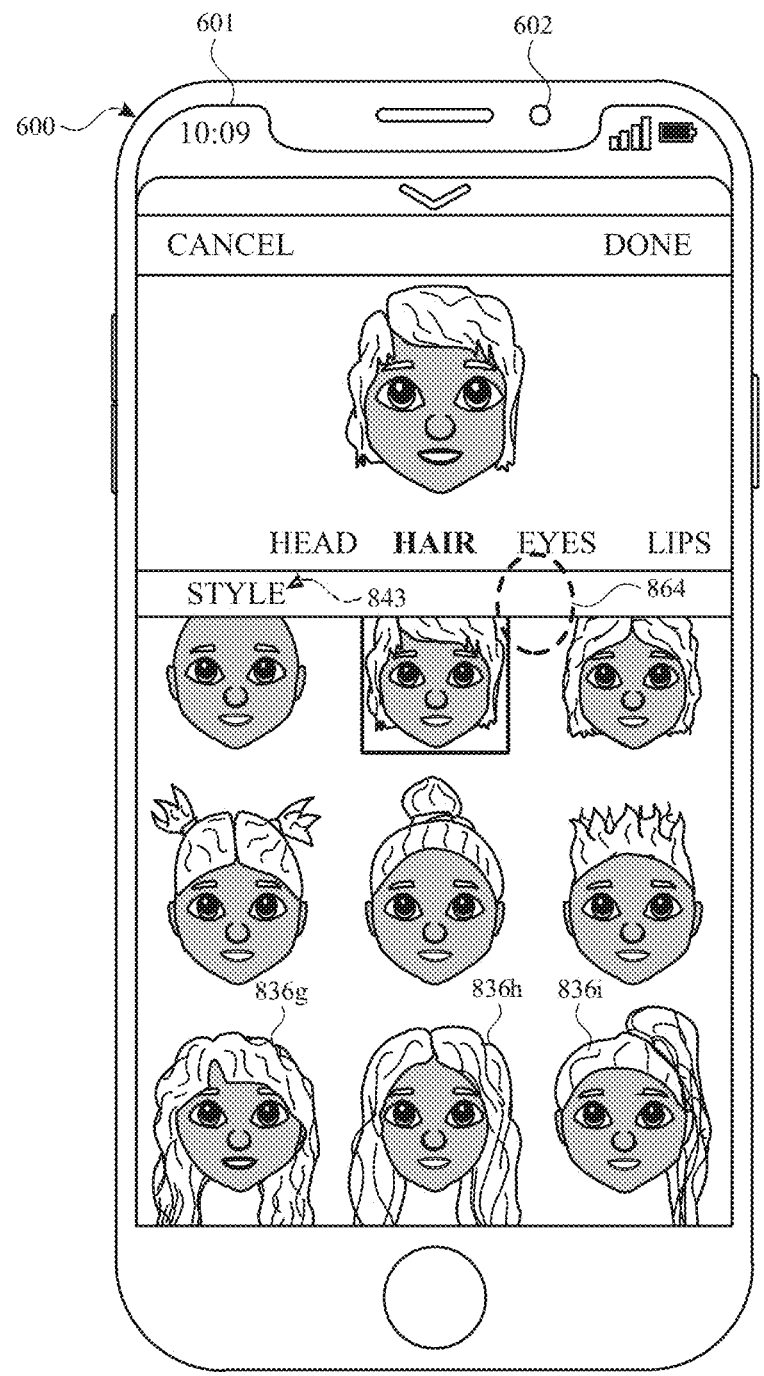
Figure 8A:
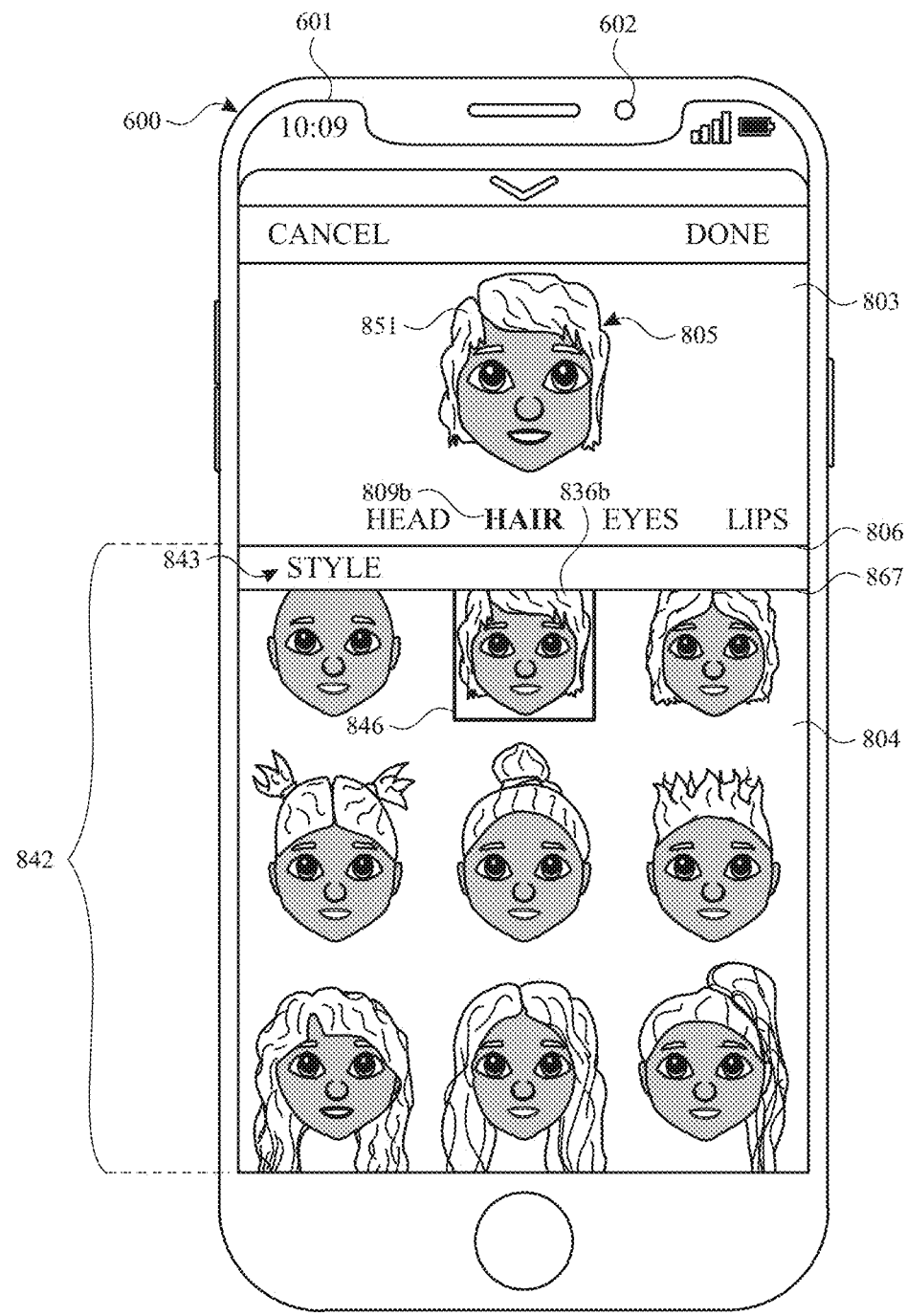
Figure 8A:
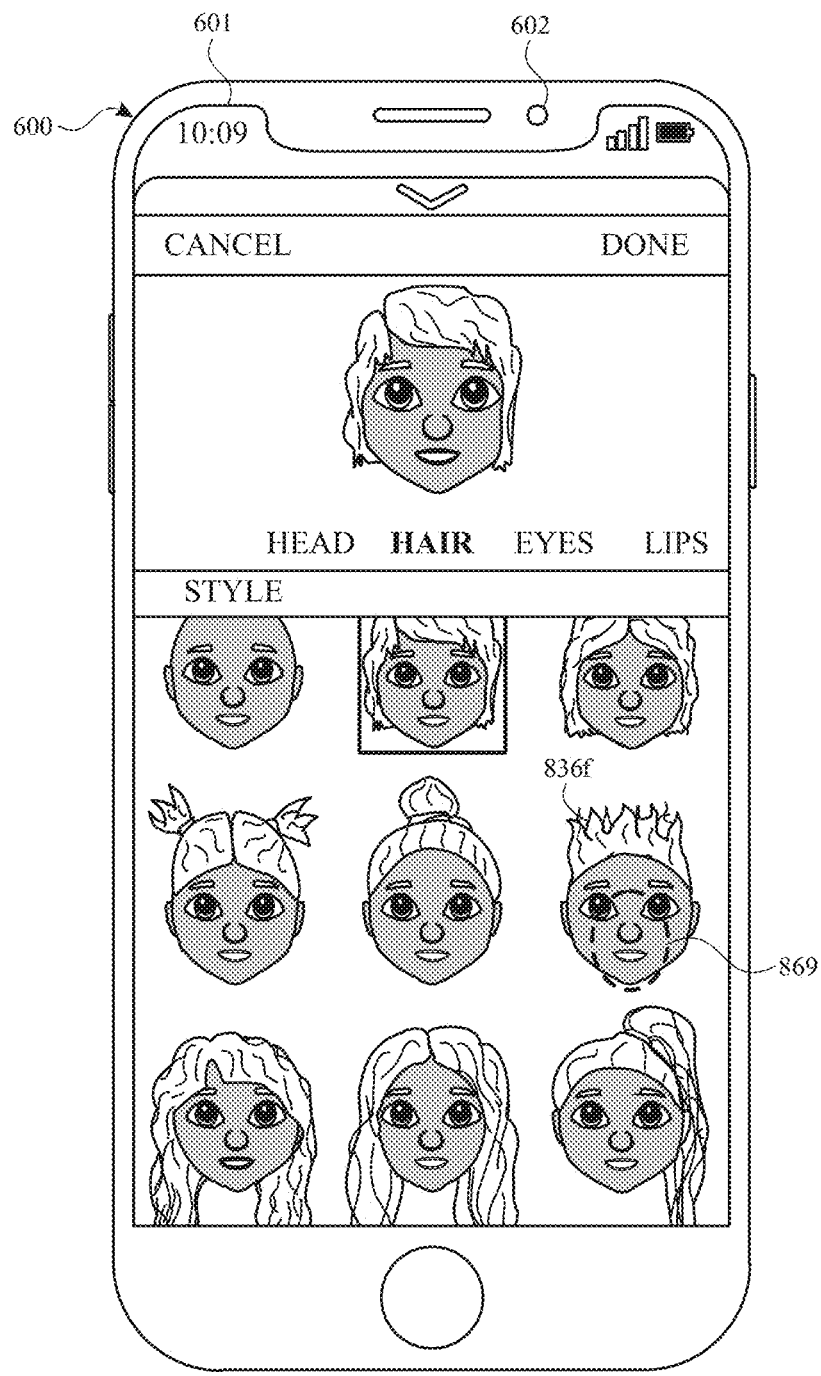
Figure 8A:
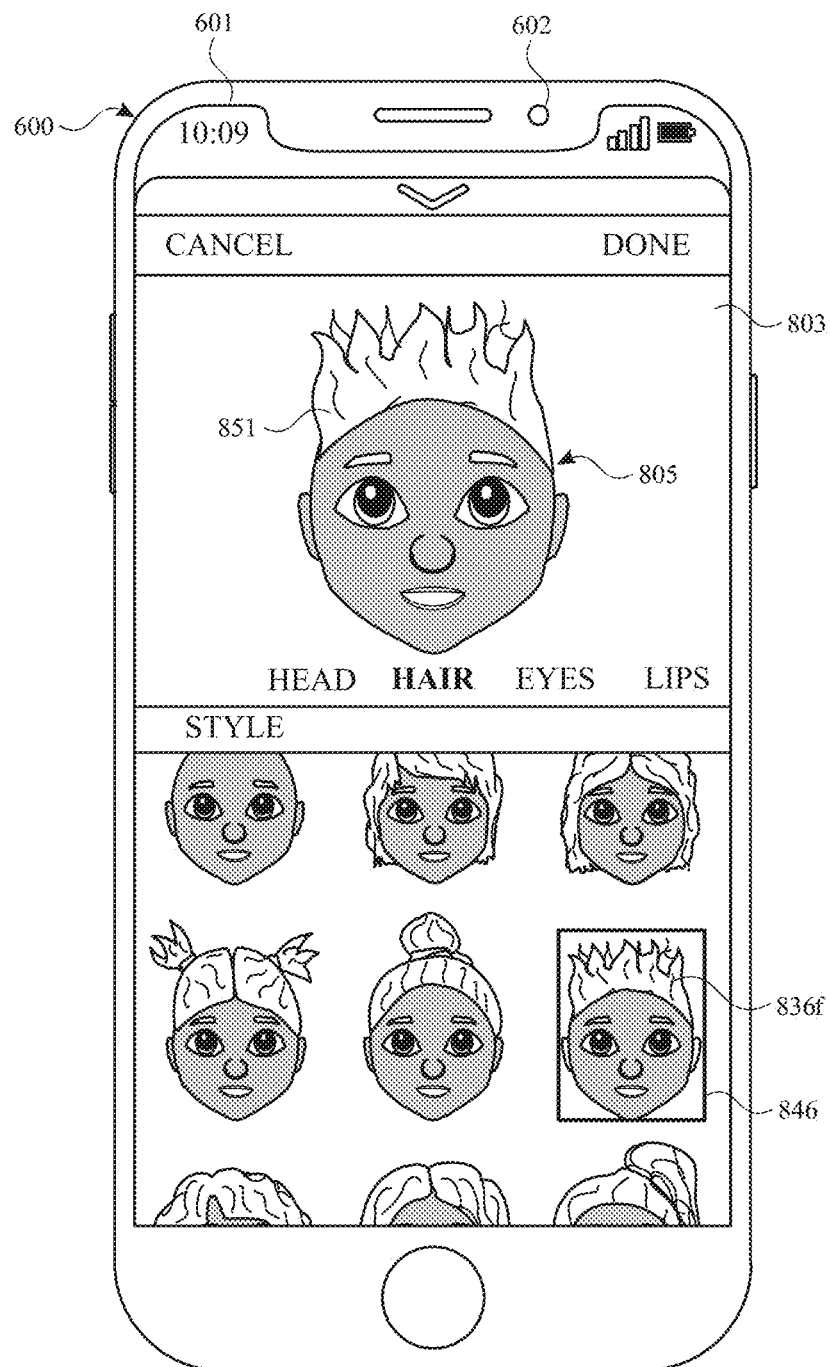
Figure 8A:
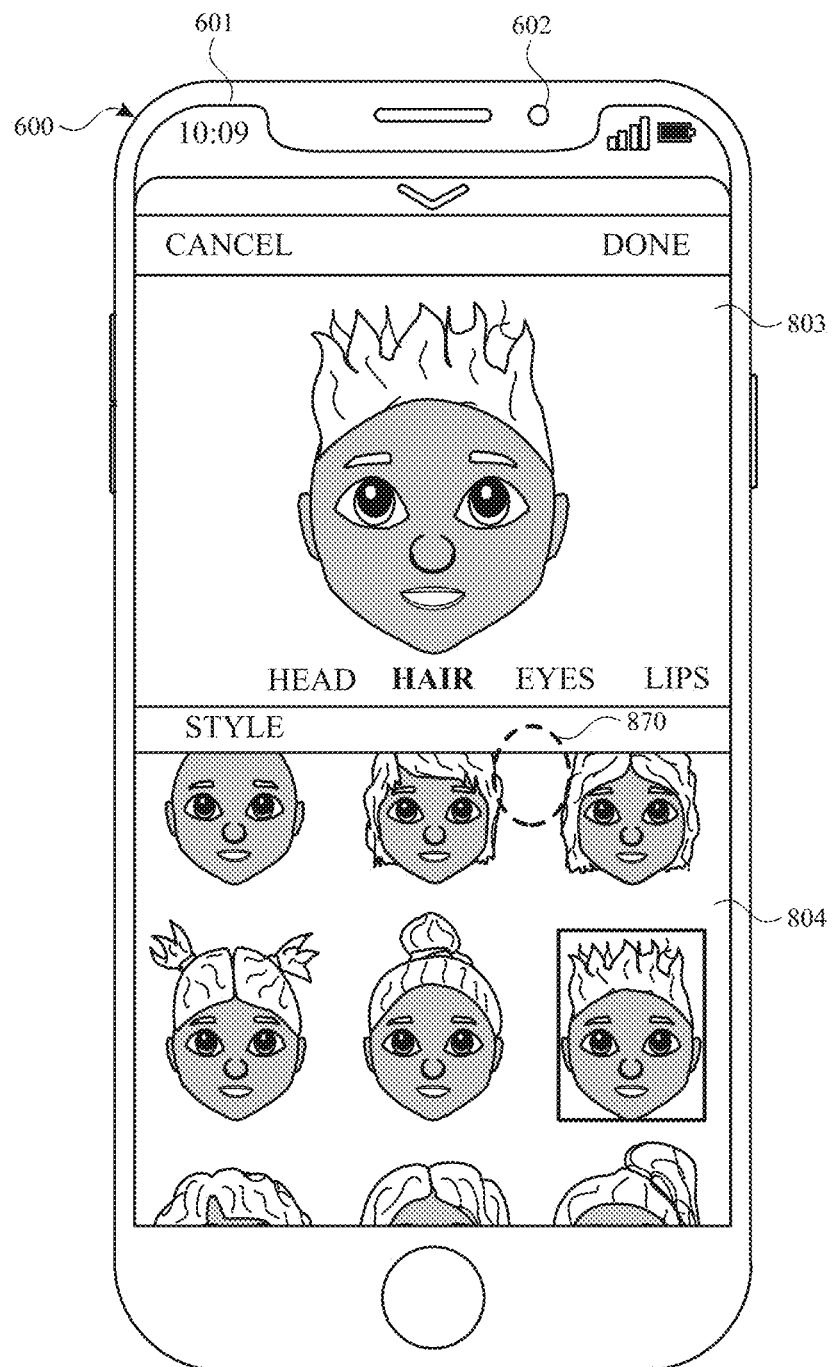
Figure 8A:
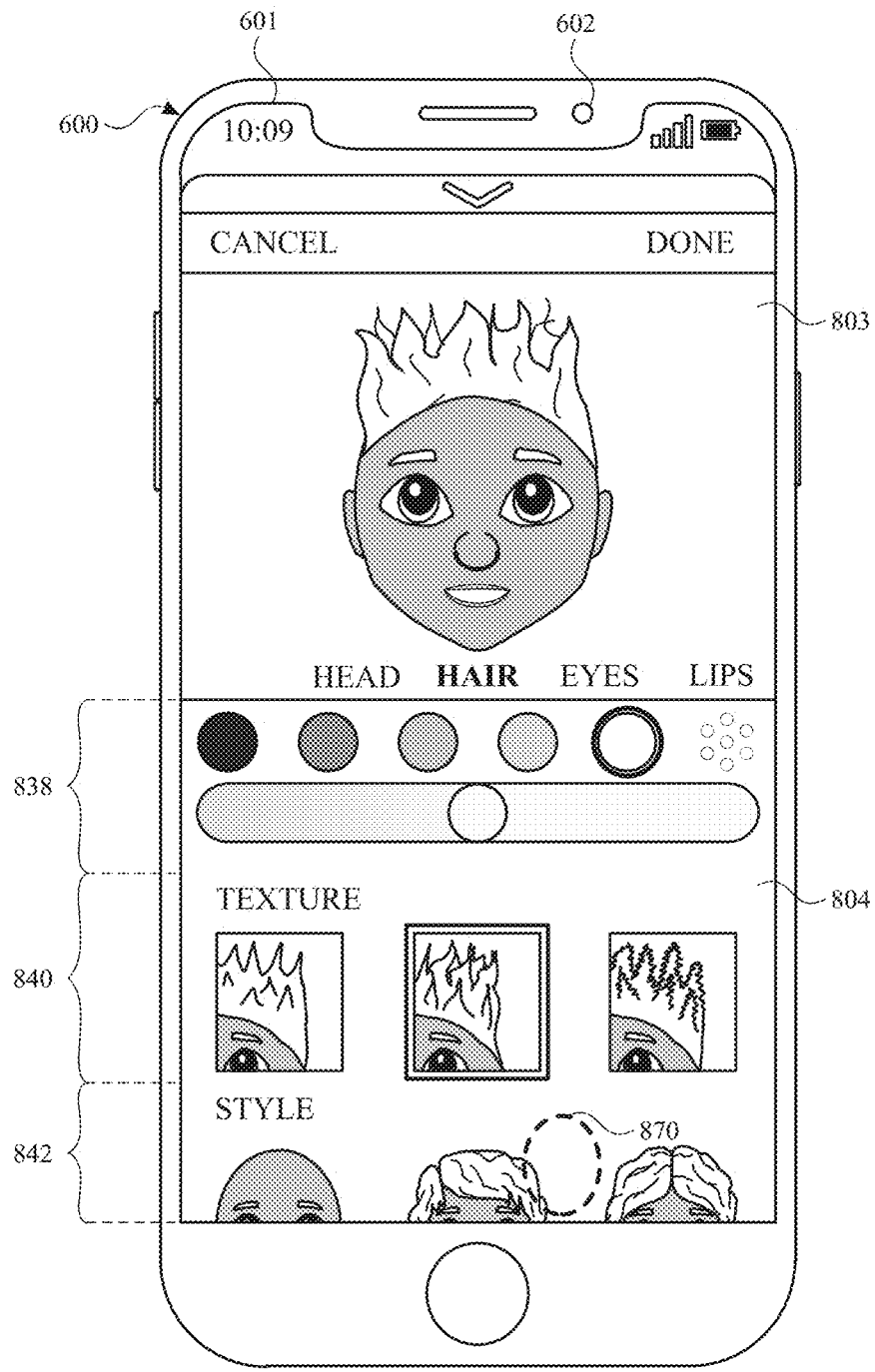
Figure 8A:
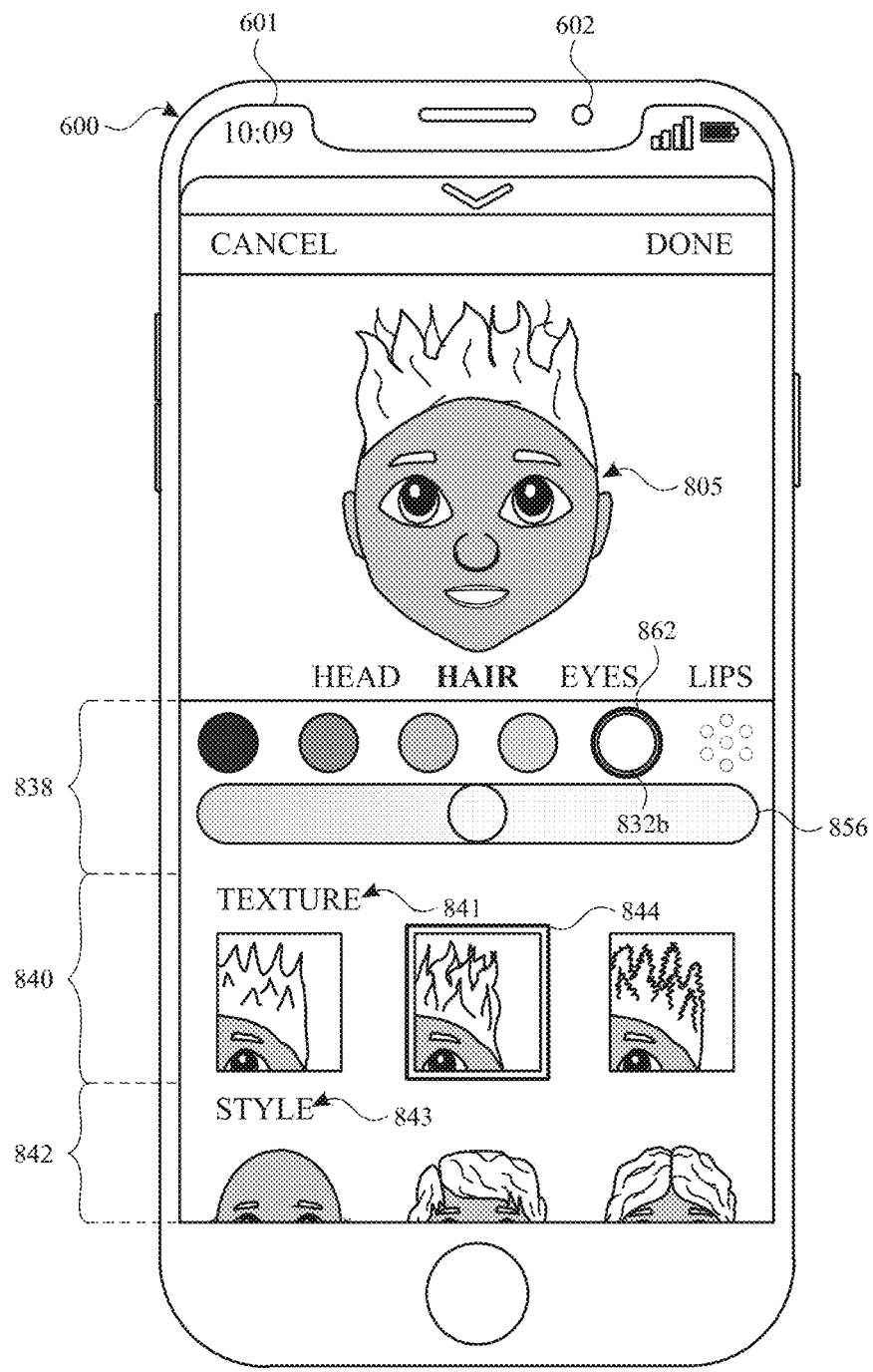
Figure 8A:
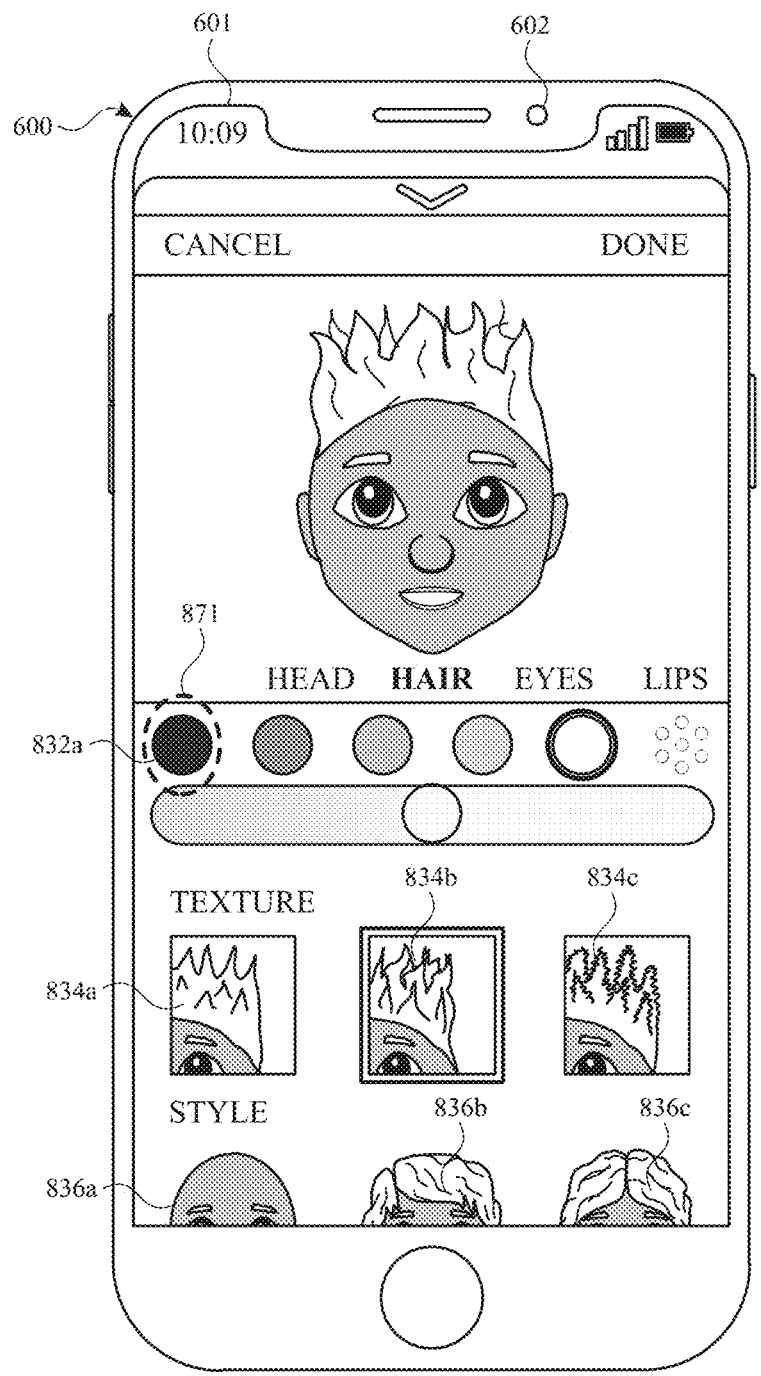
Figure 8A:
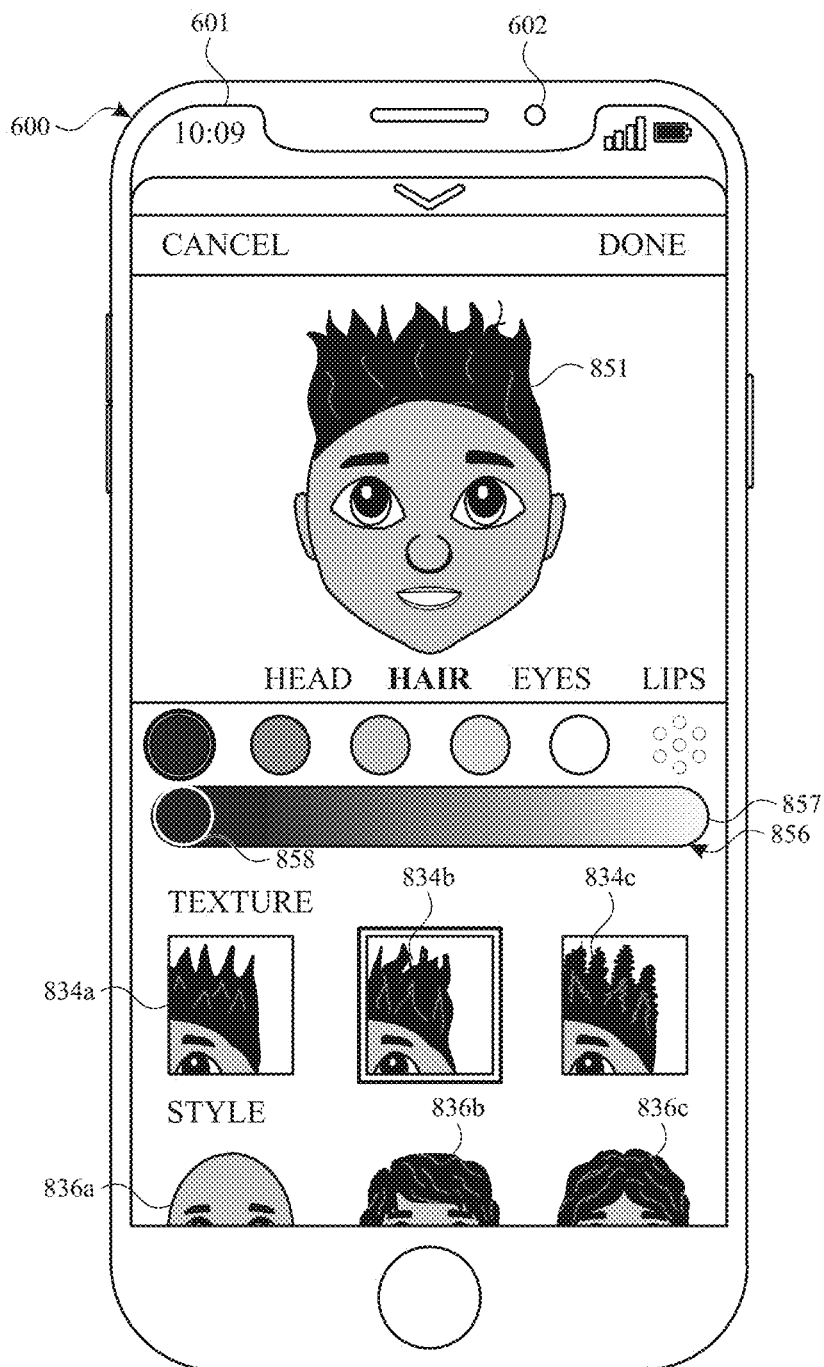
Figure 8A:
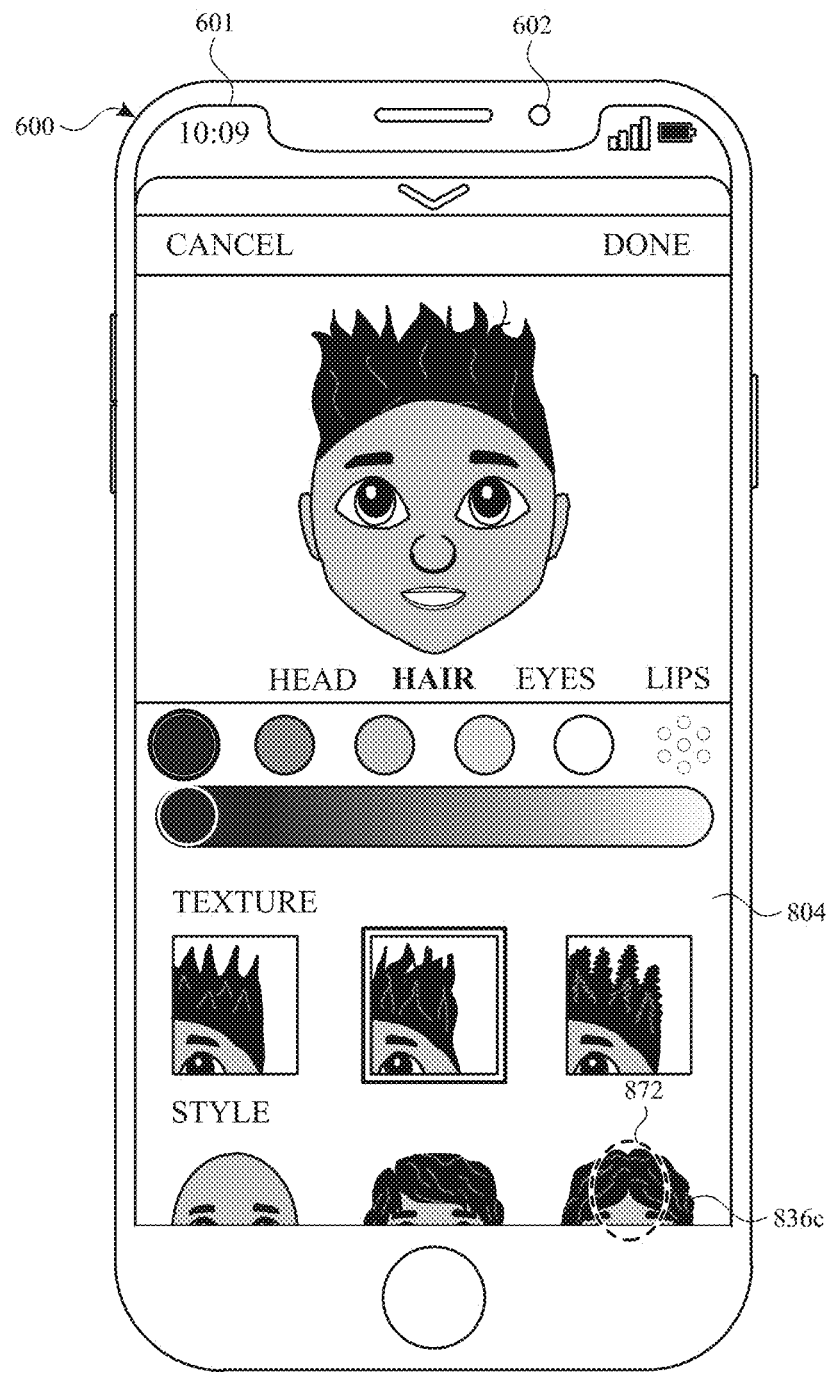
Figure 8A:
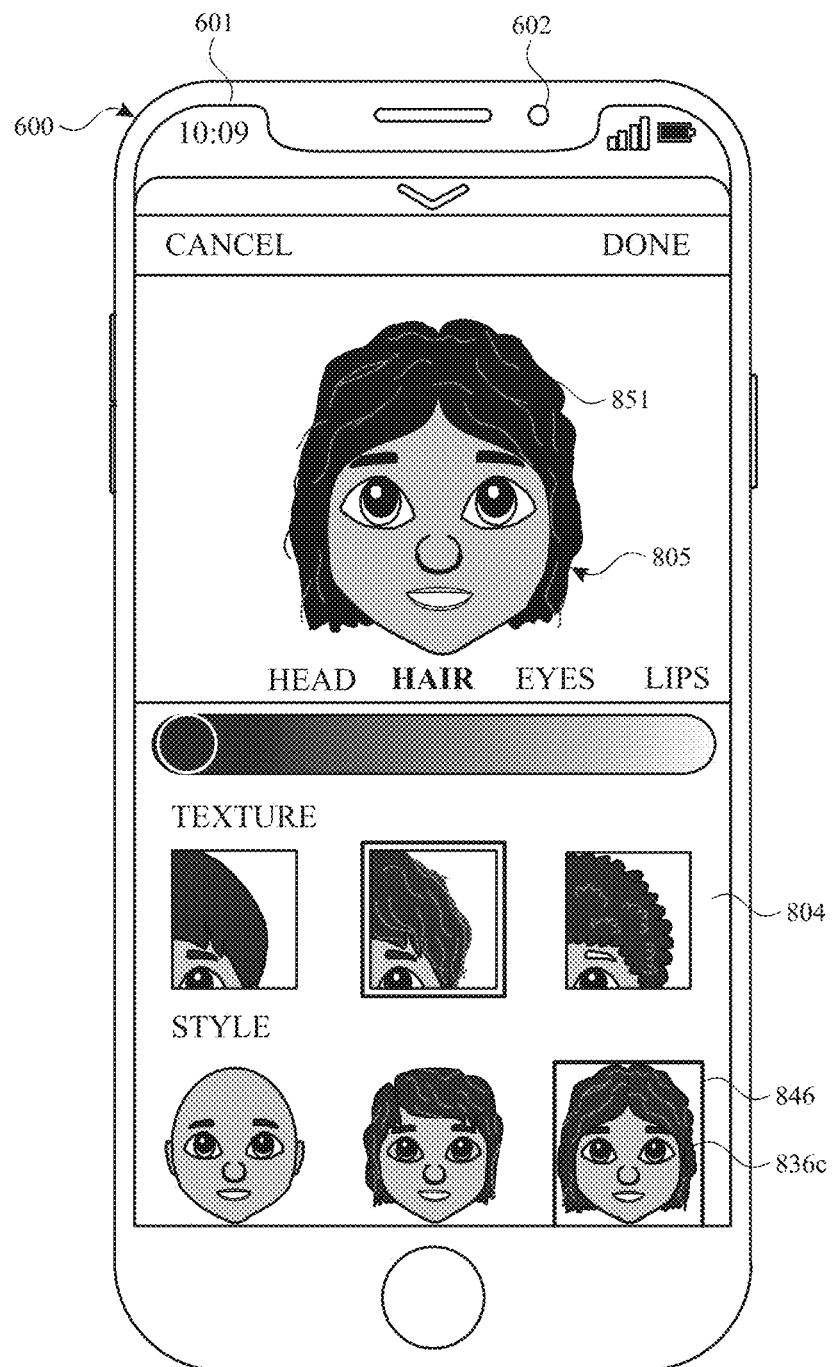
Figure 8A:
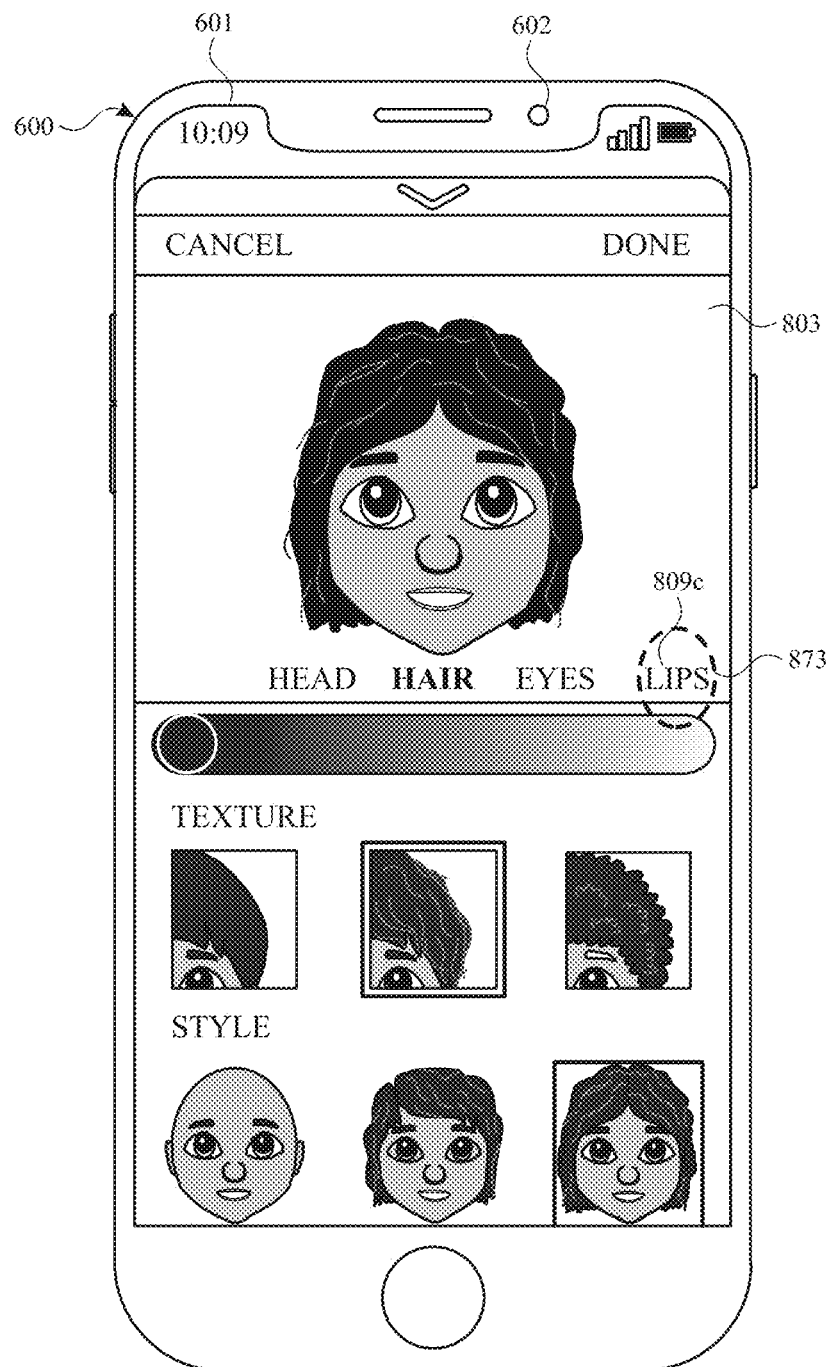
Figure 8A:
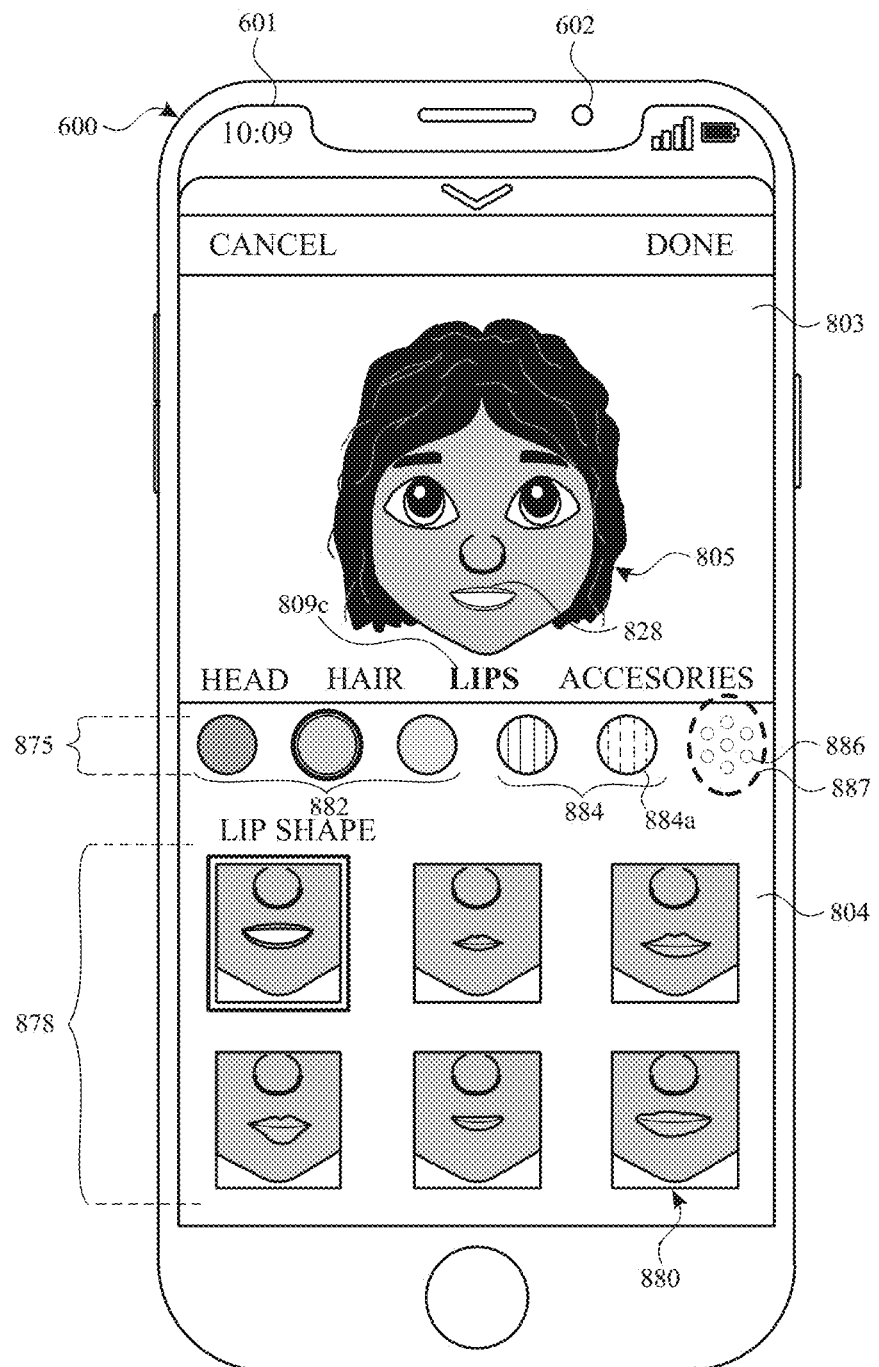
Figure 8A:
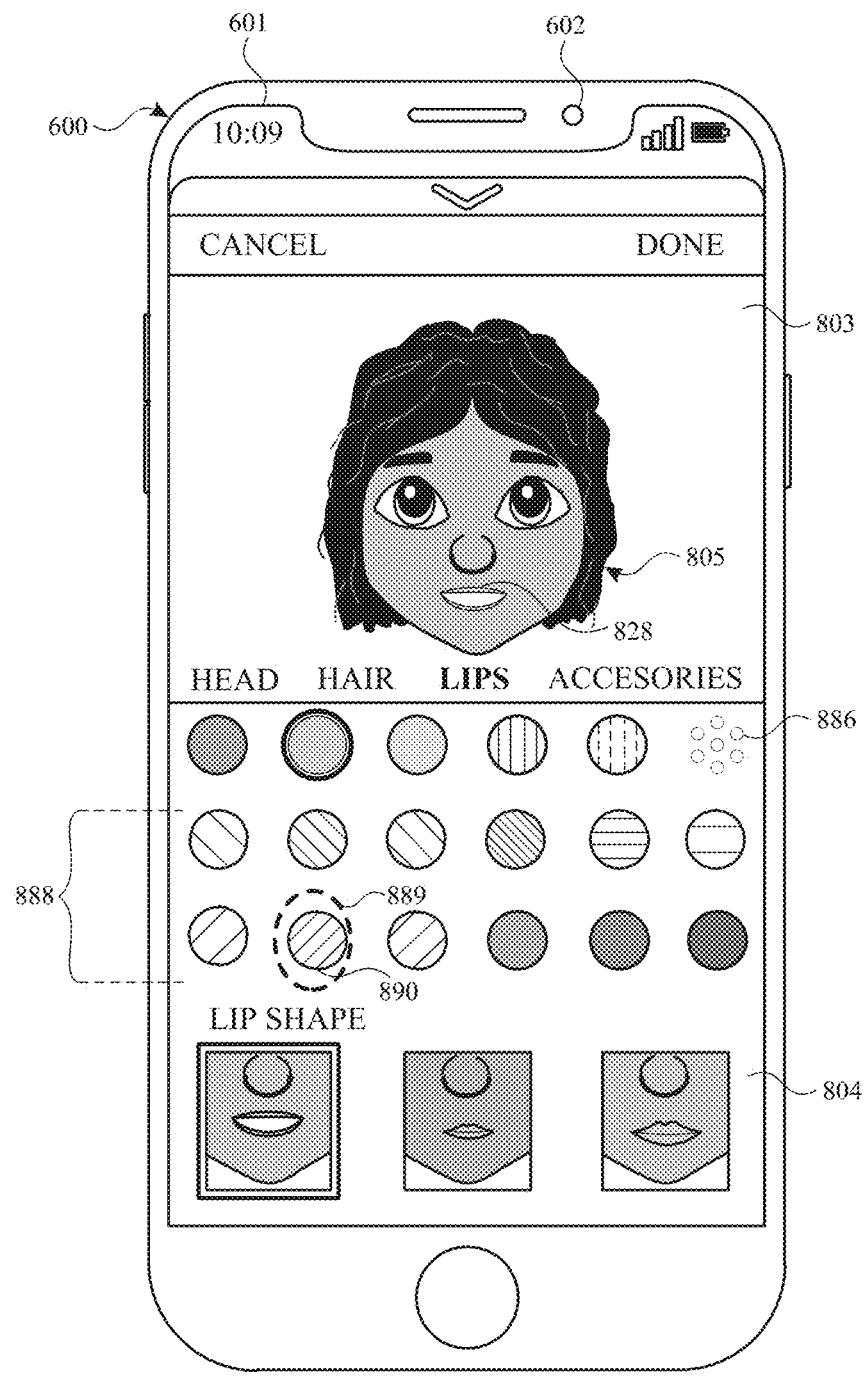
Figure 8A:
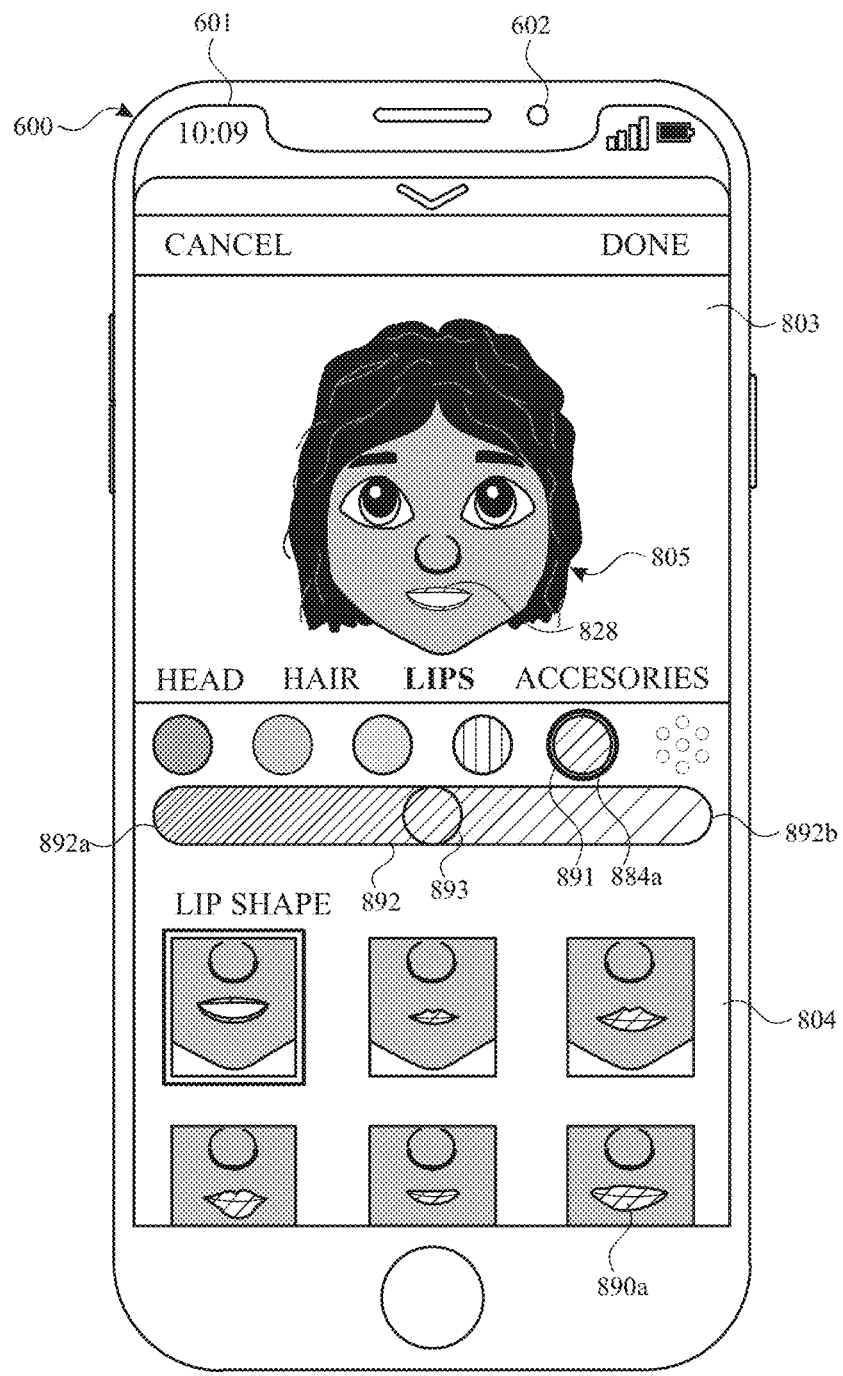
Figure 8B:
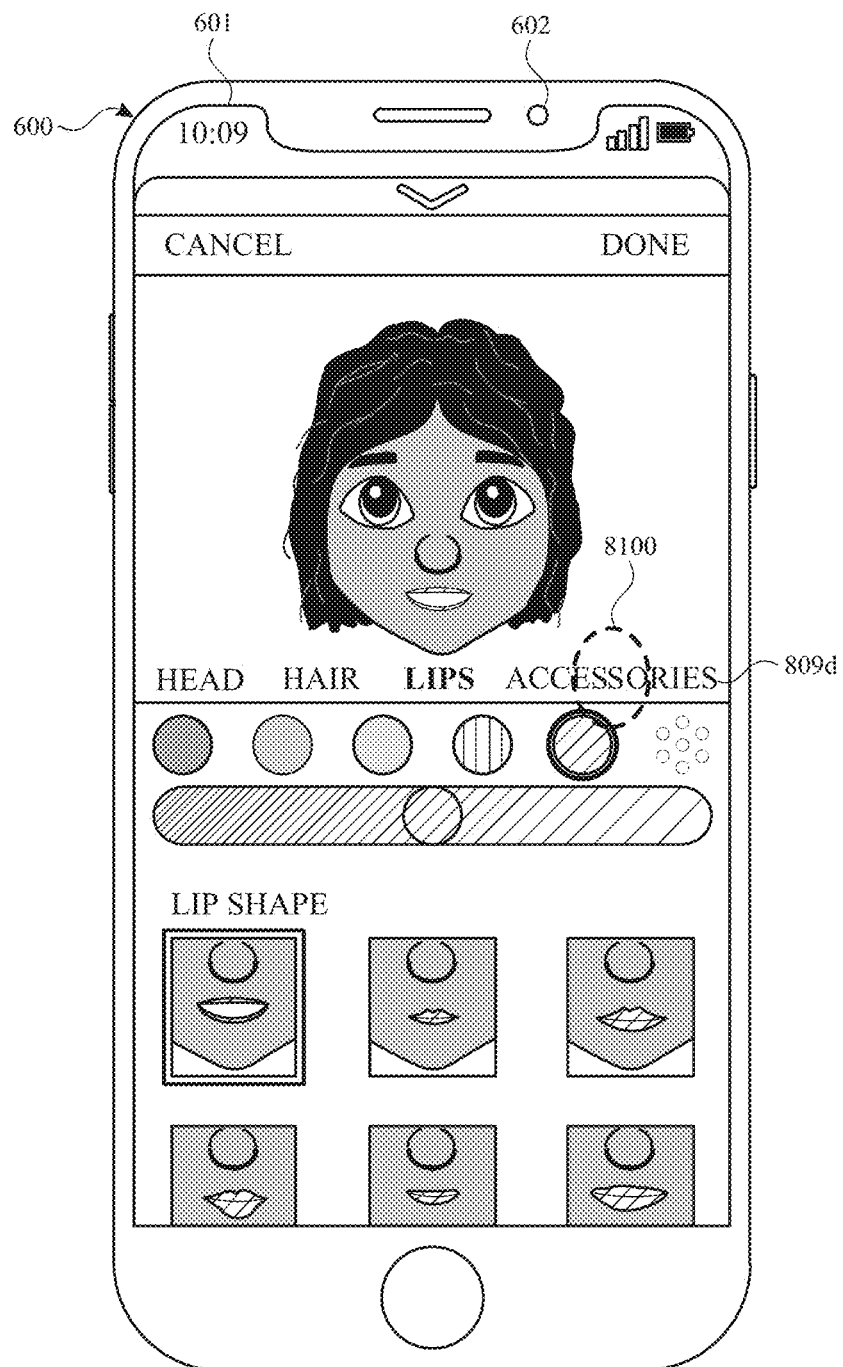
Figure 8B:
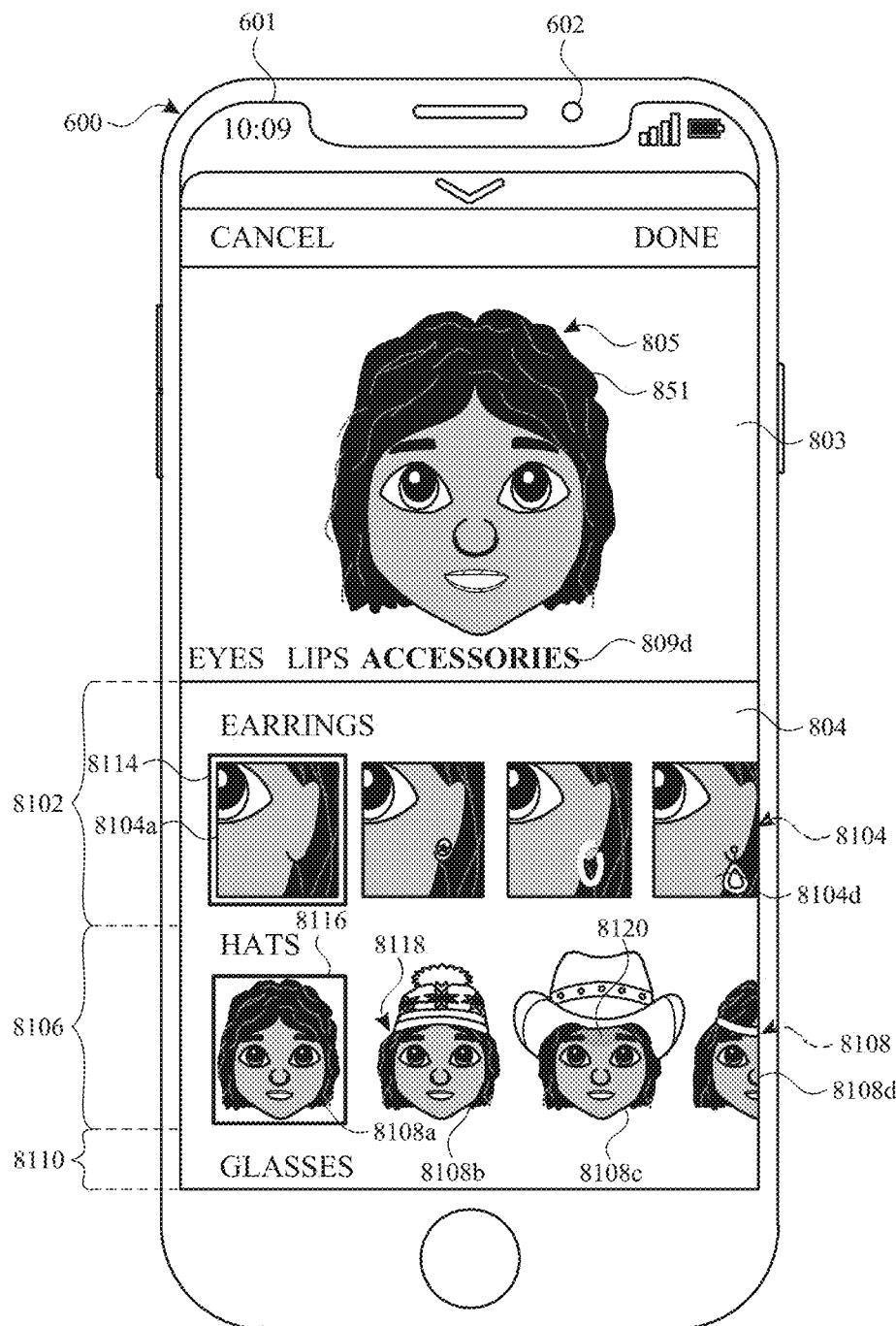
Figure 8B:
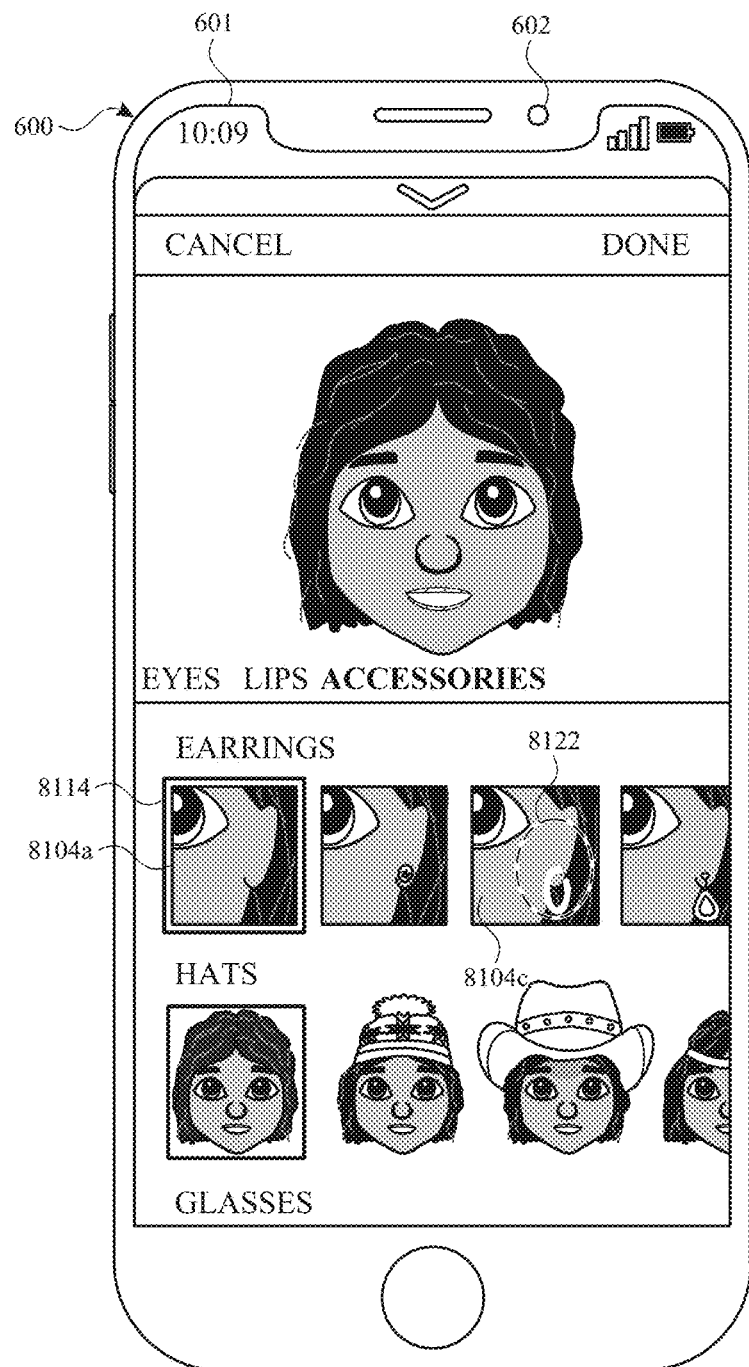
Figure 8B:
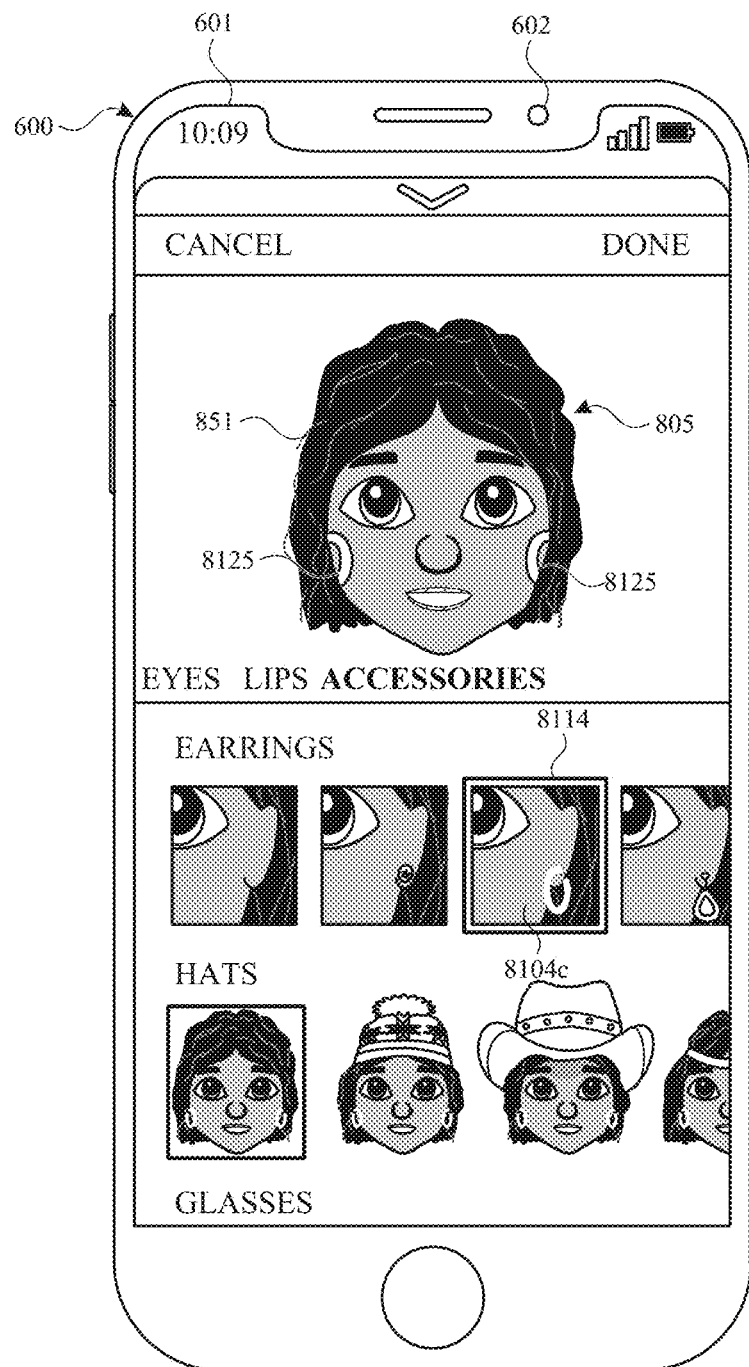
Figure 8B:
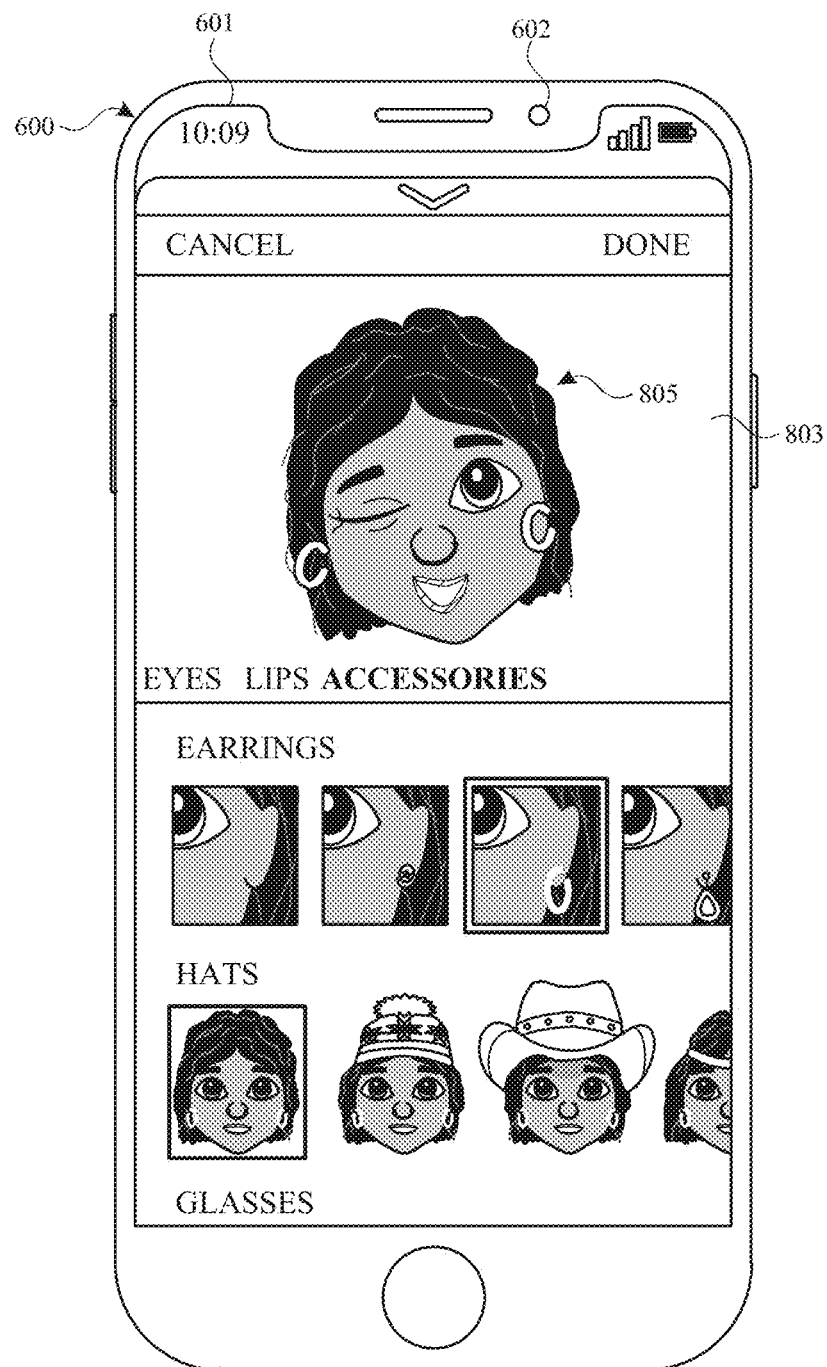
Figure 8B:
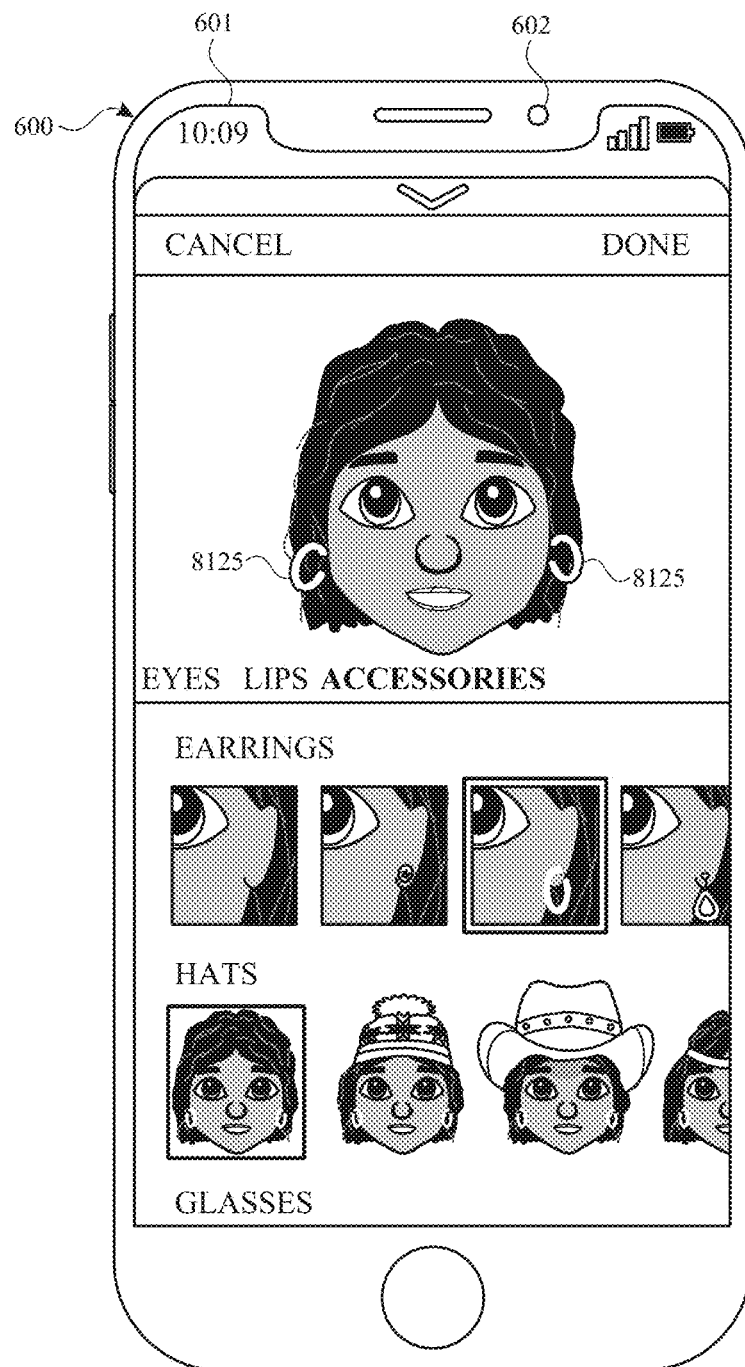
Figure 8B:
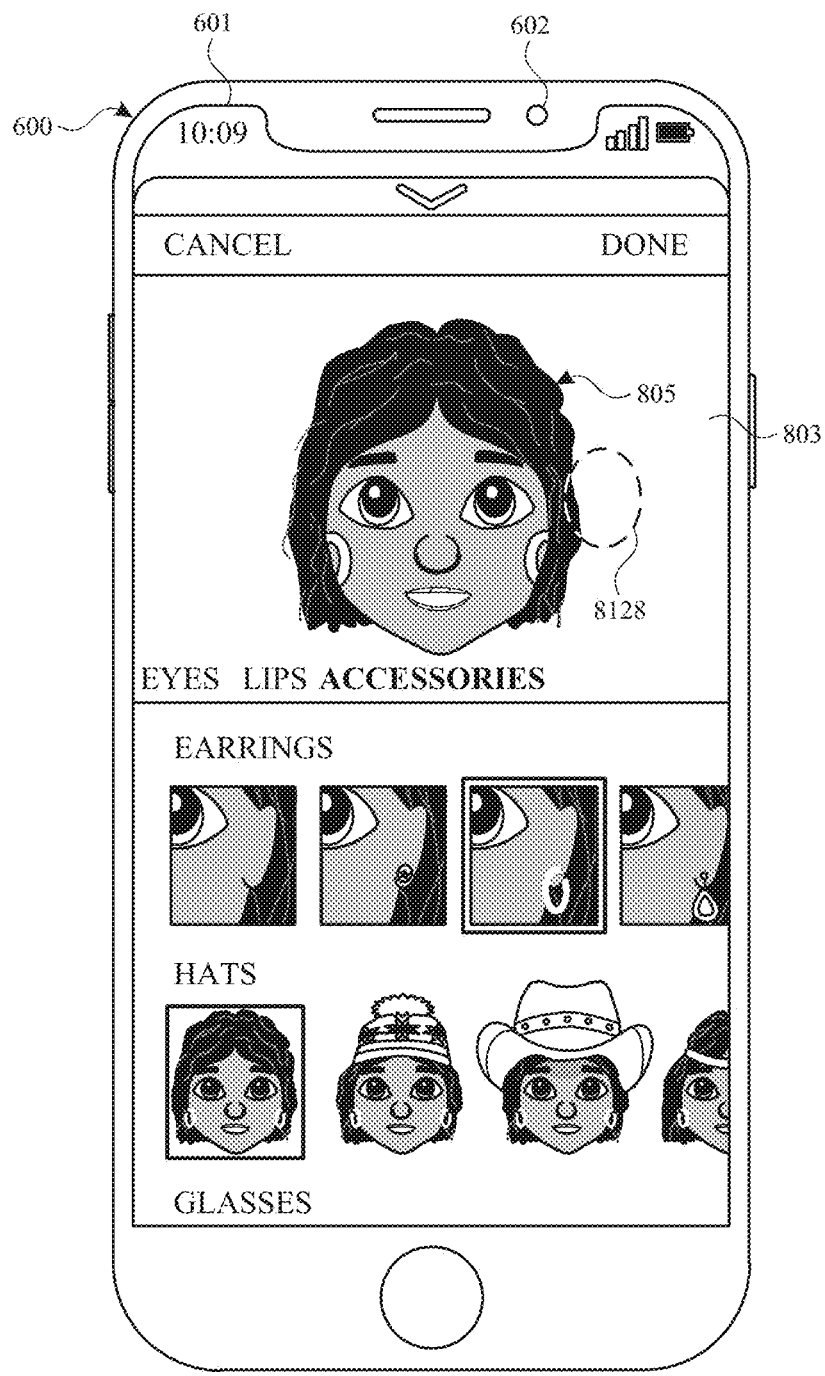
Figure 8B:
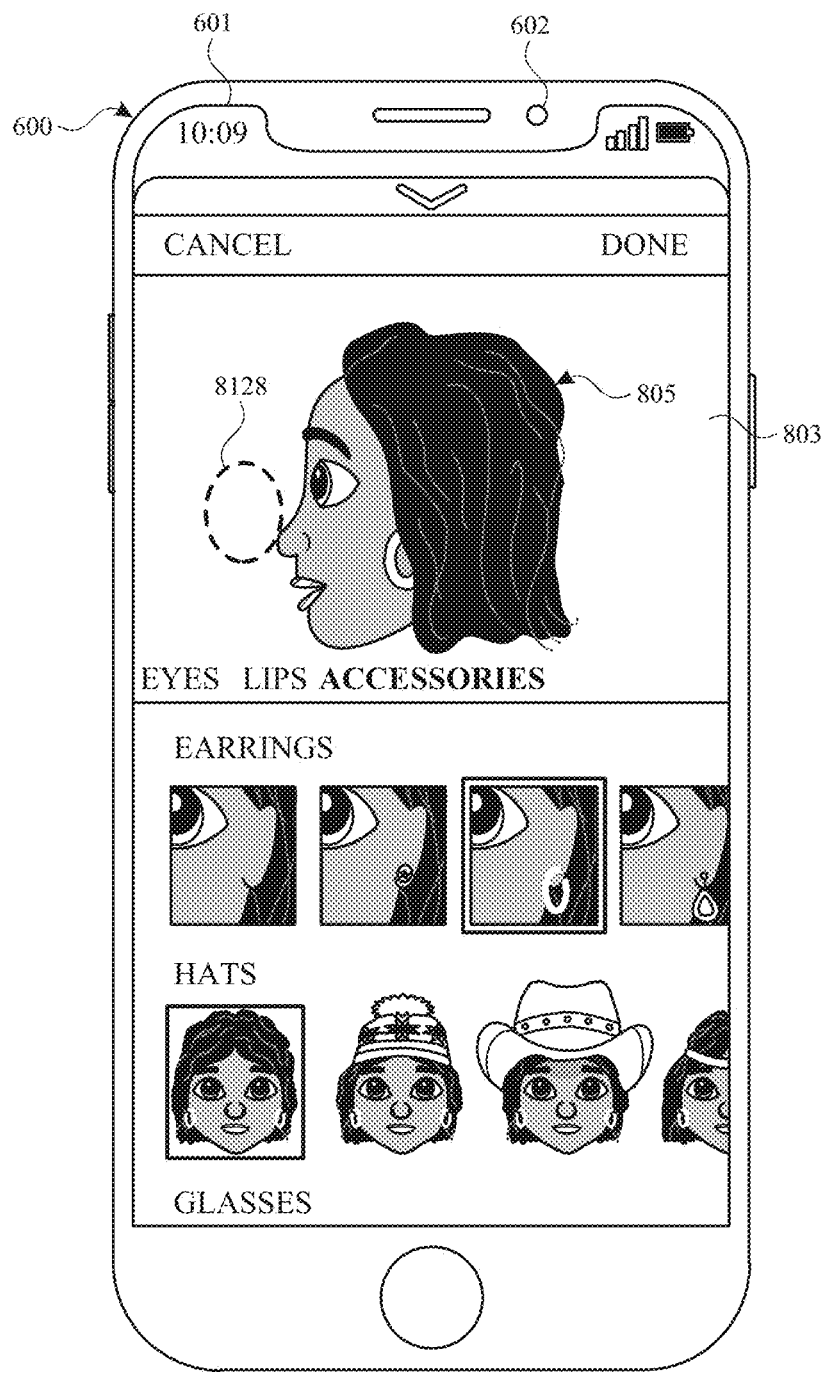
Figure 8B:
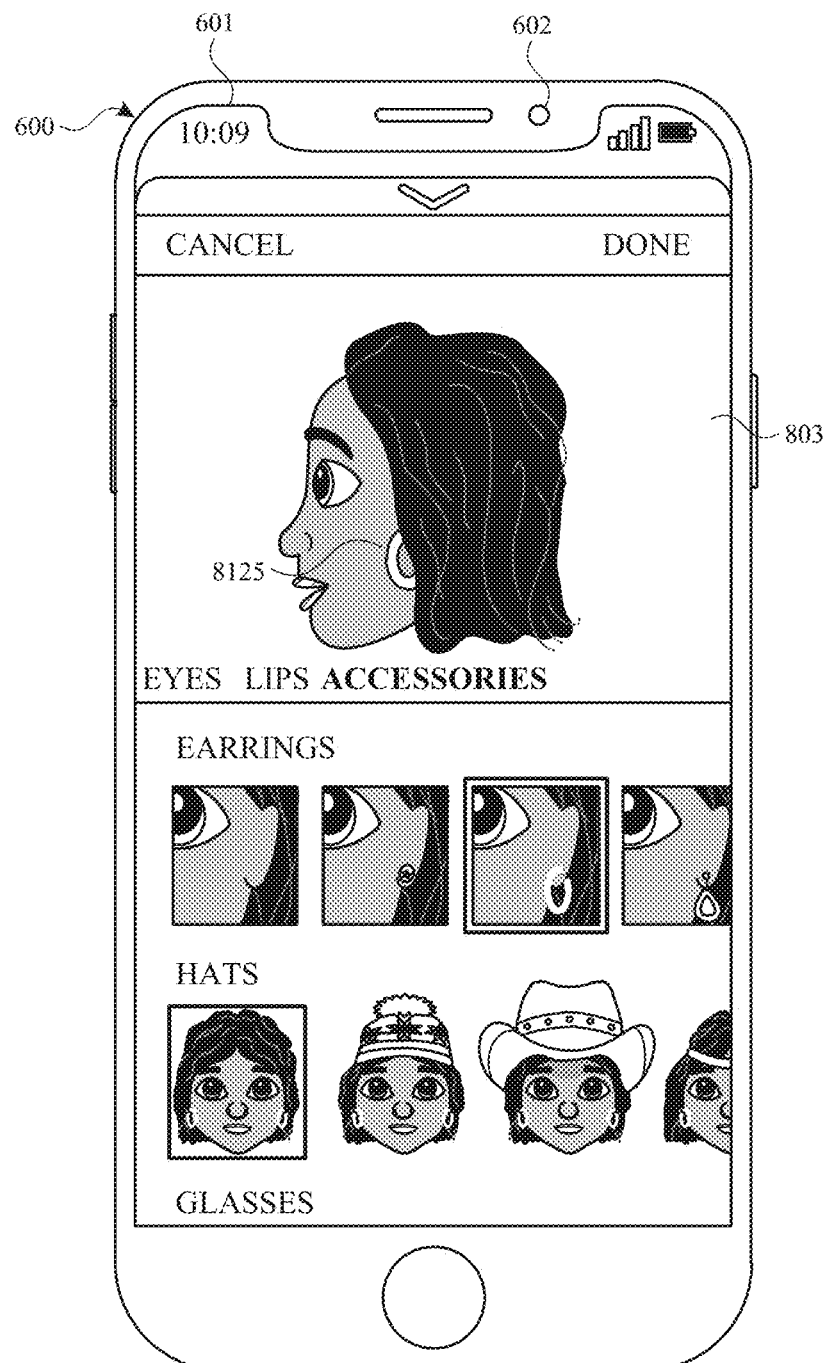
Figure 8B:
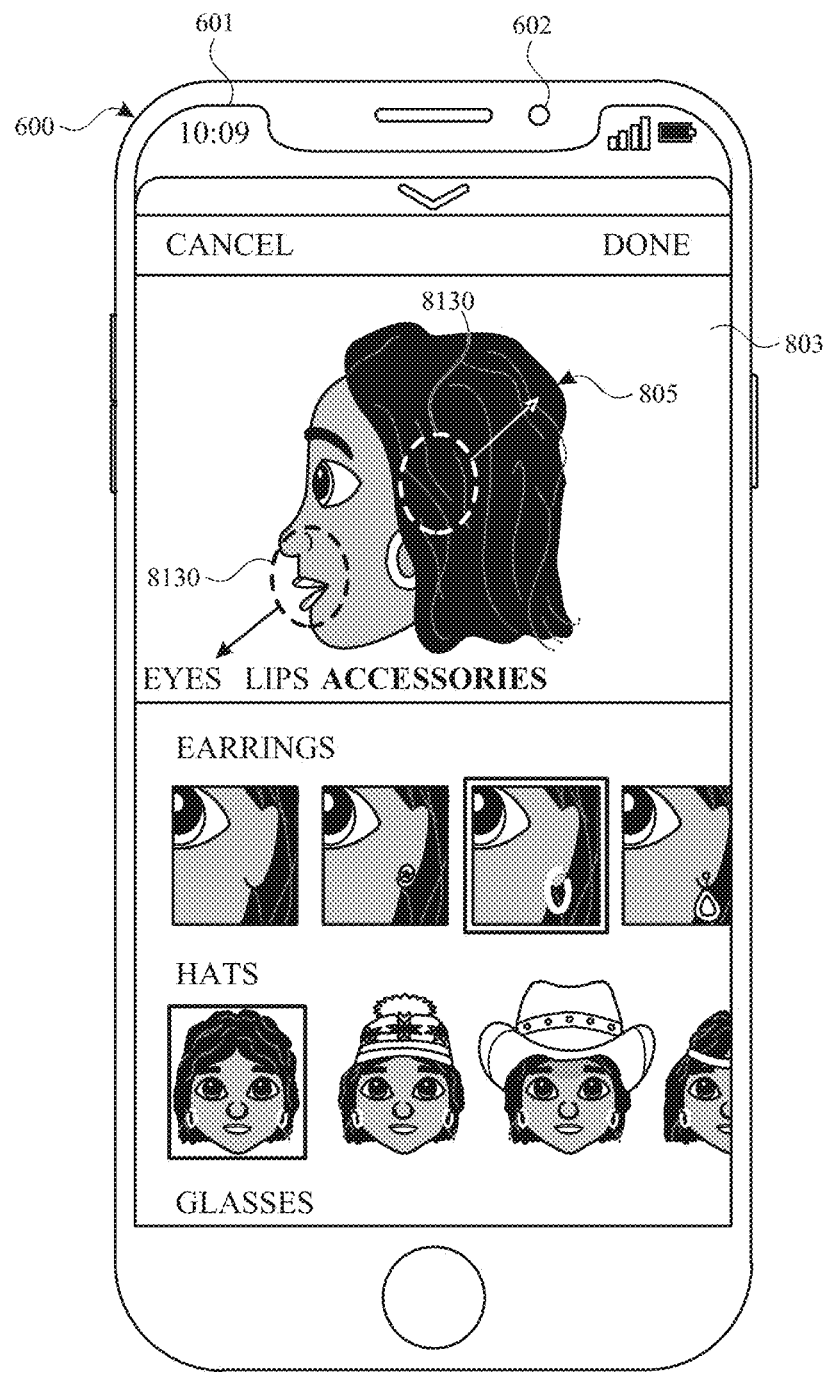
Figure 8B:
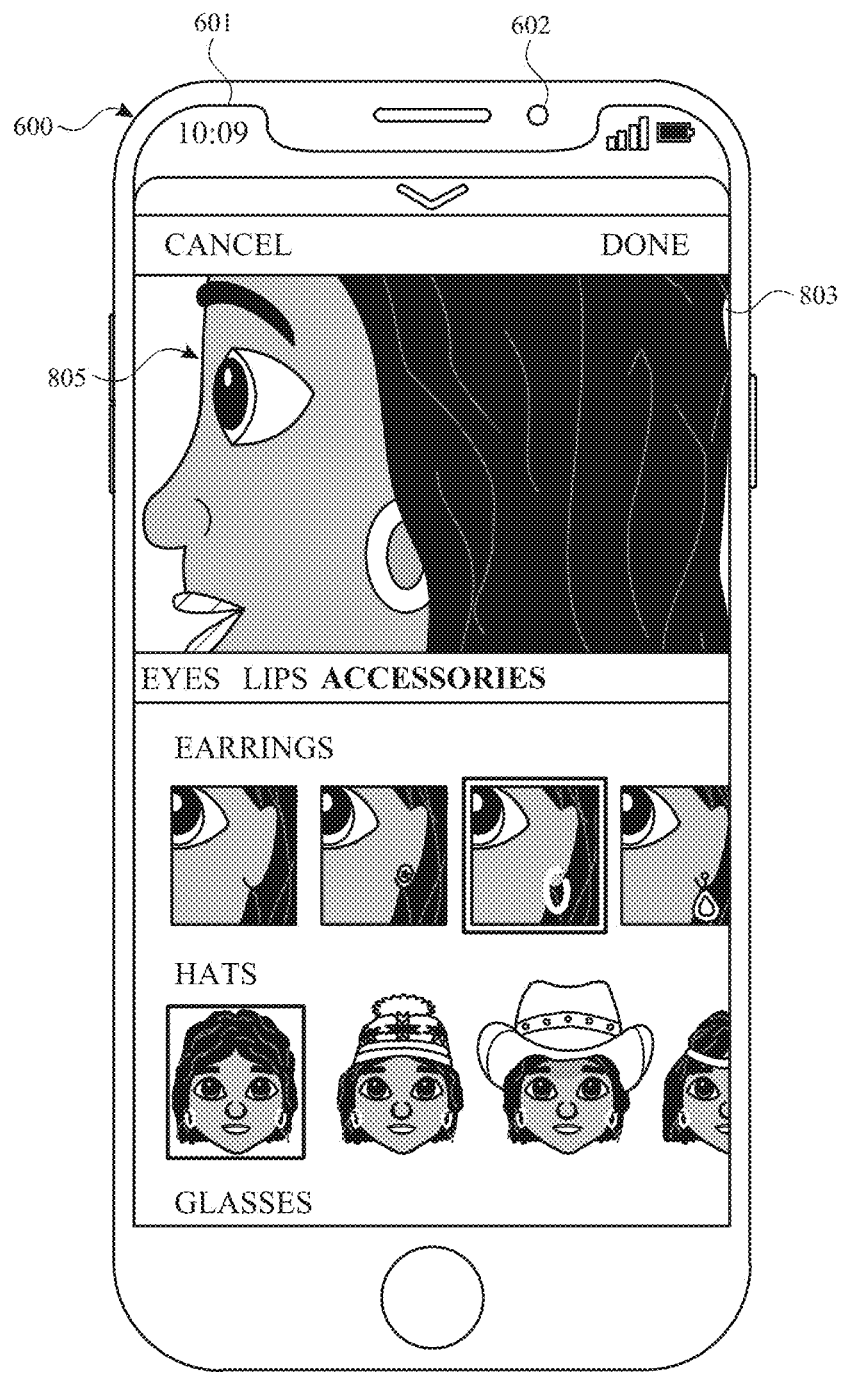
Figure 8B:
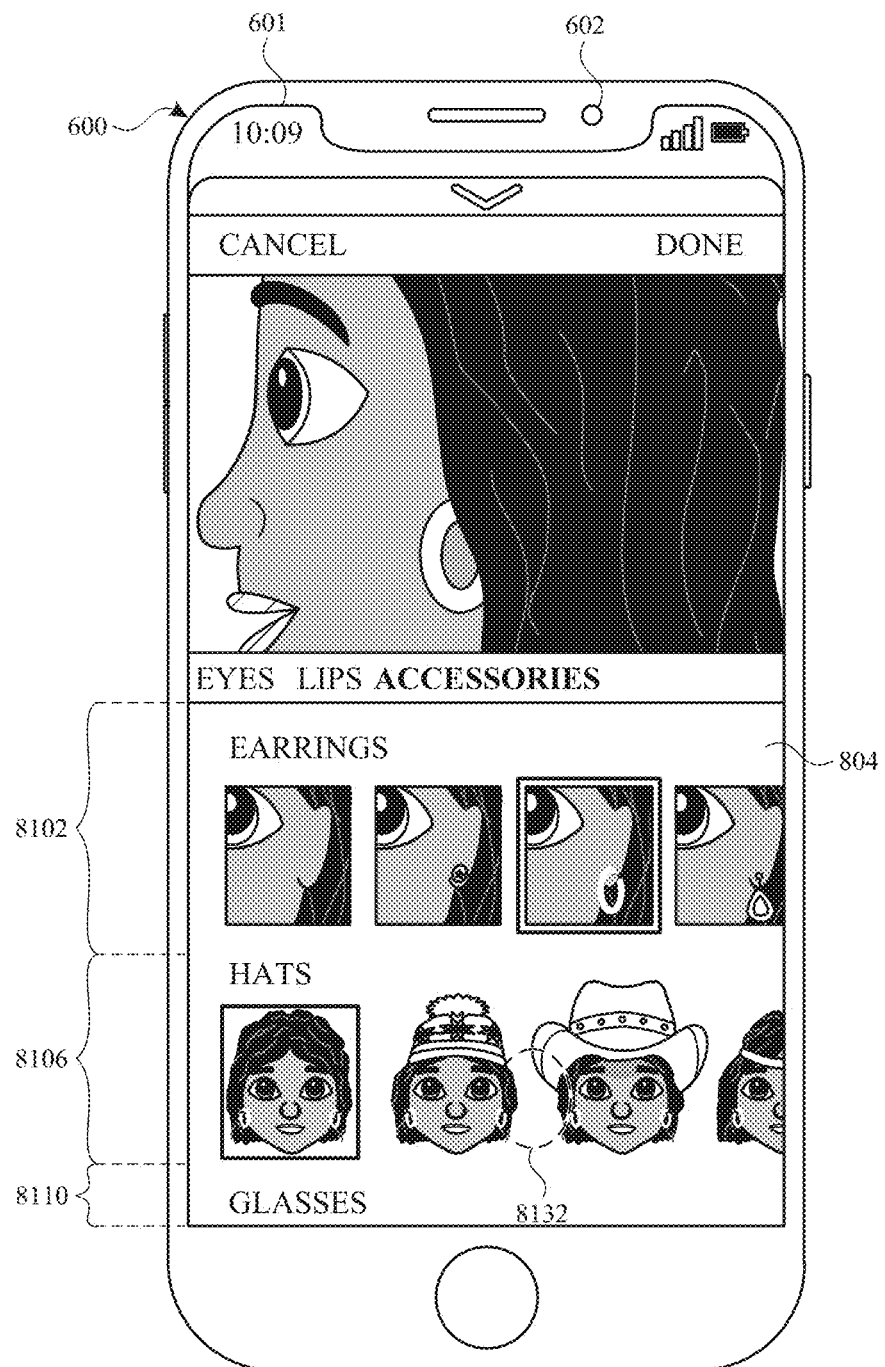
Figure 8B:
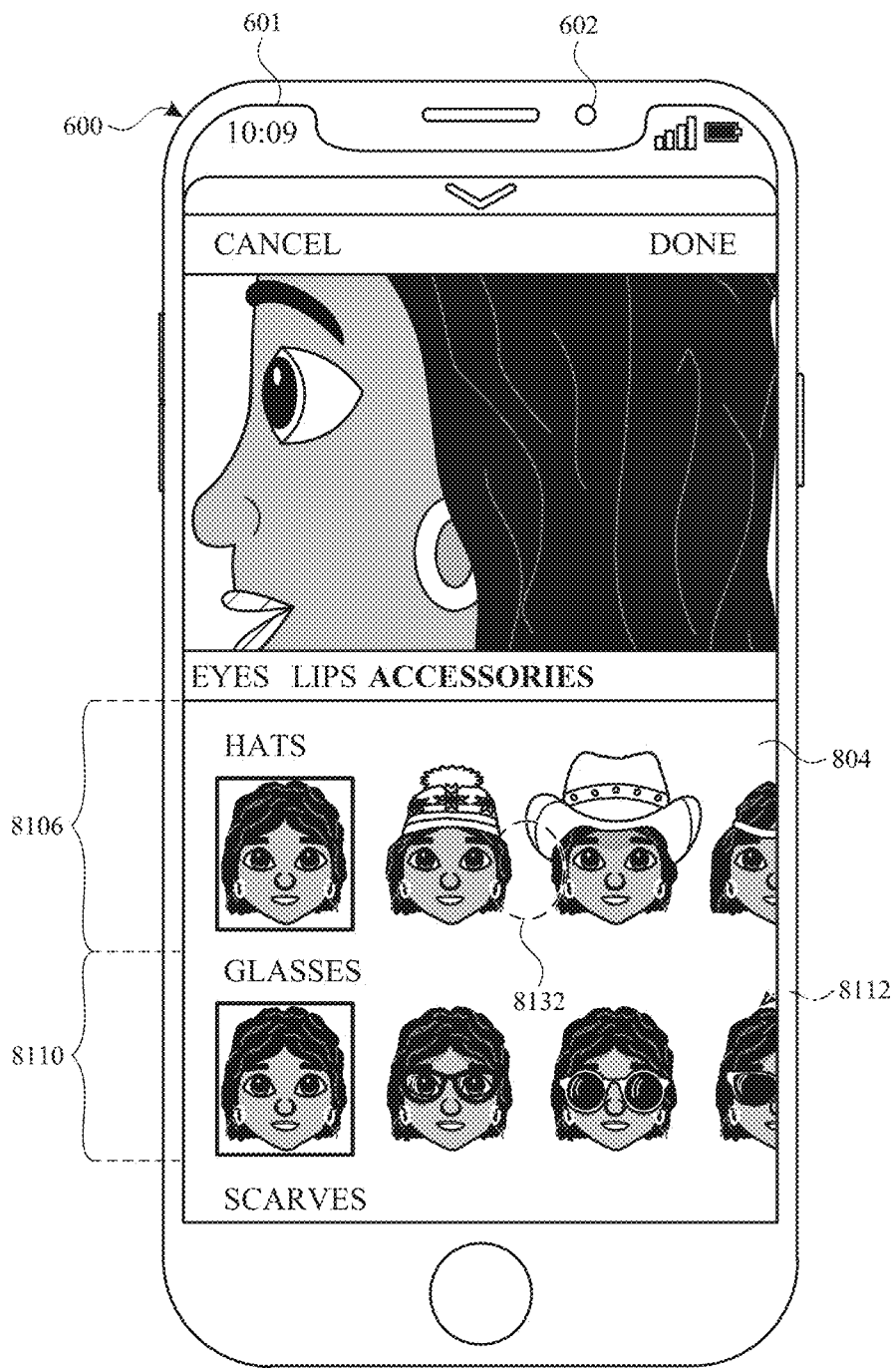
Figure 8B:
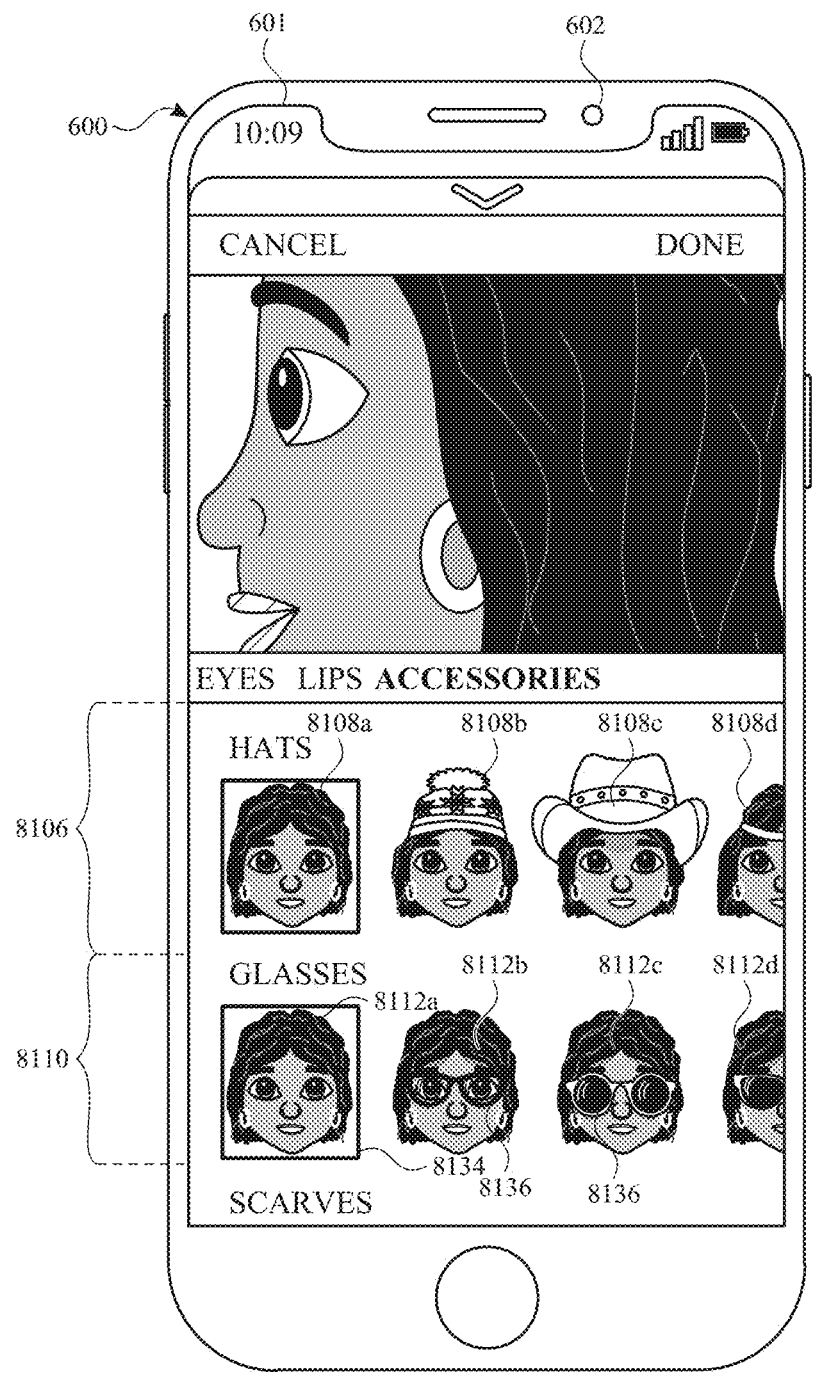
Figure 8B:
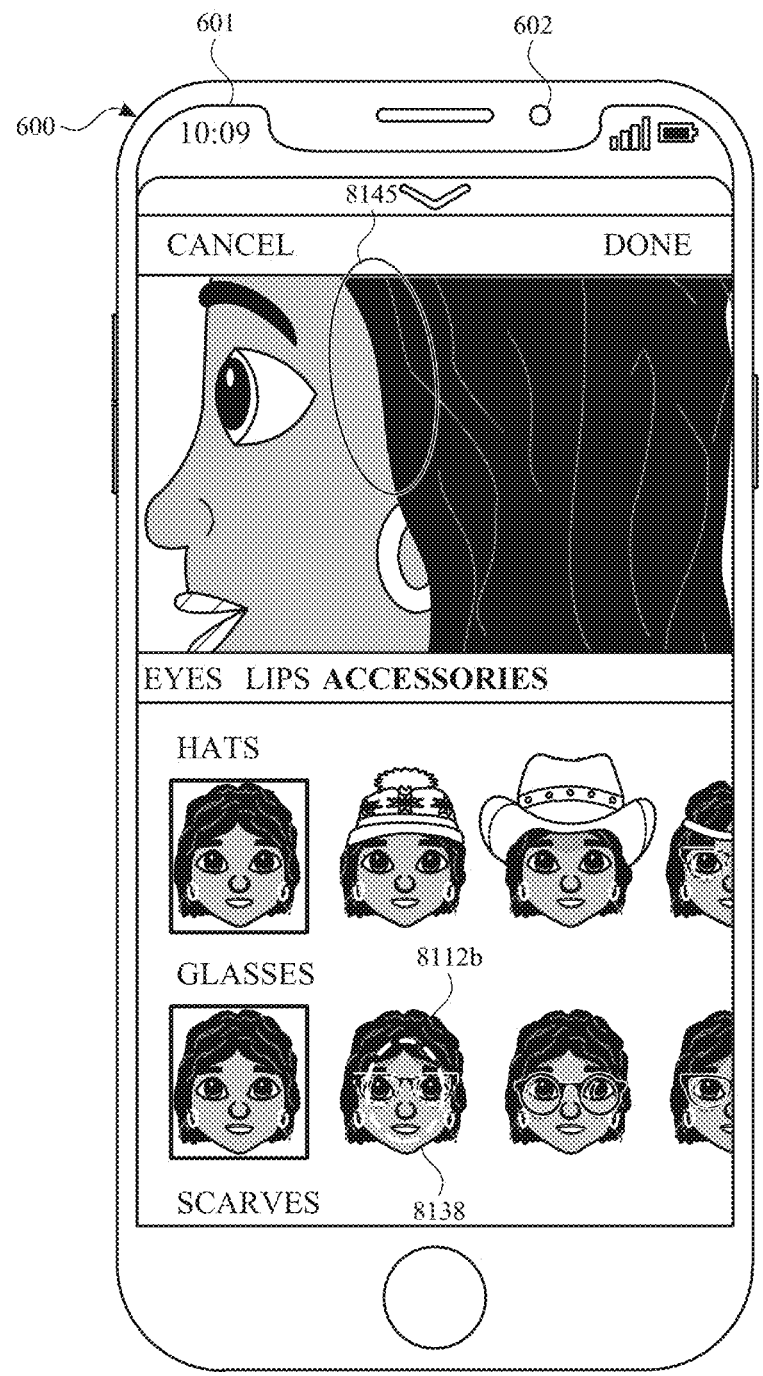
Figure 8B:
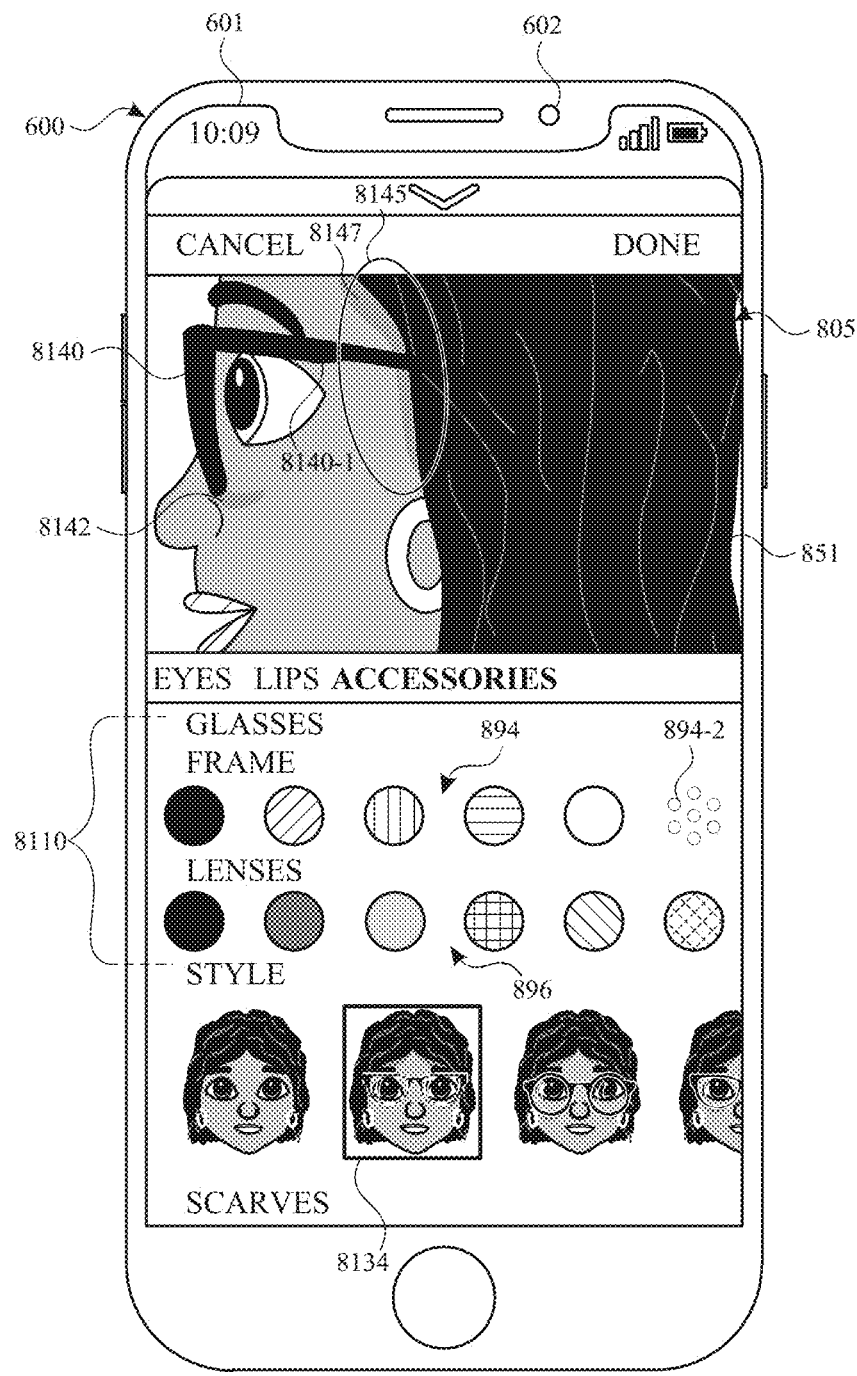
Figure 8B:
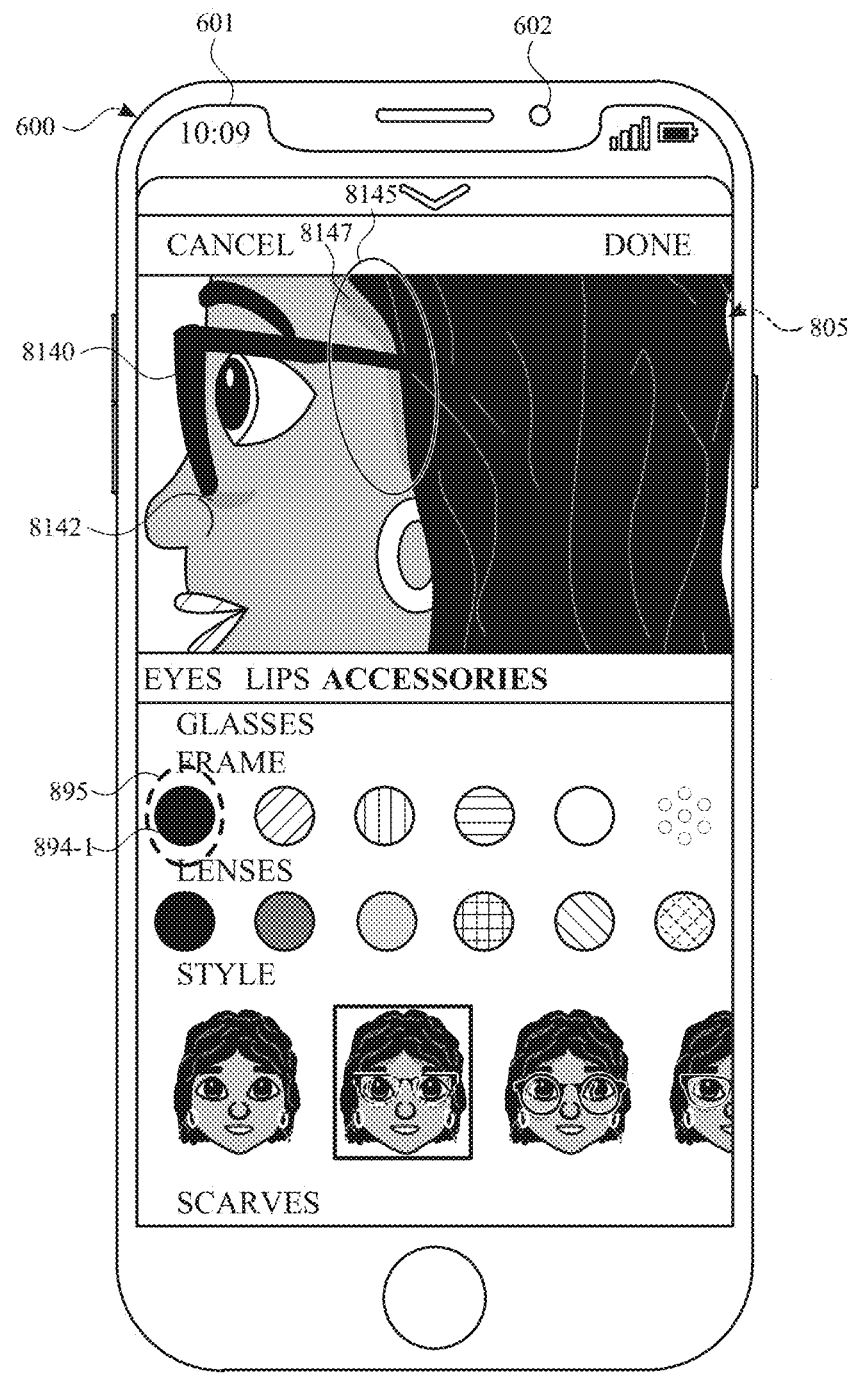
Figure 8B:
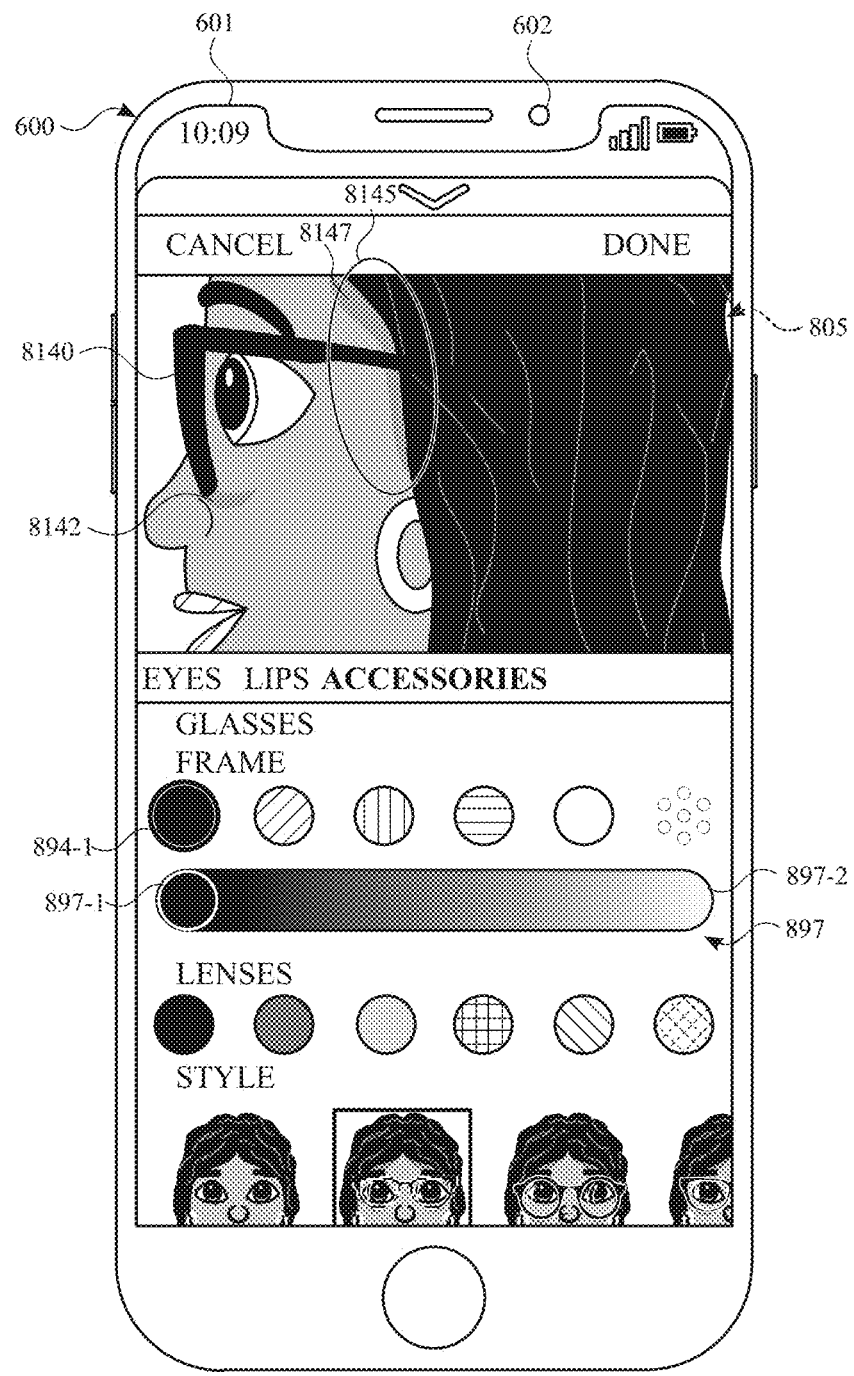
Figure 8B:
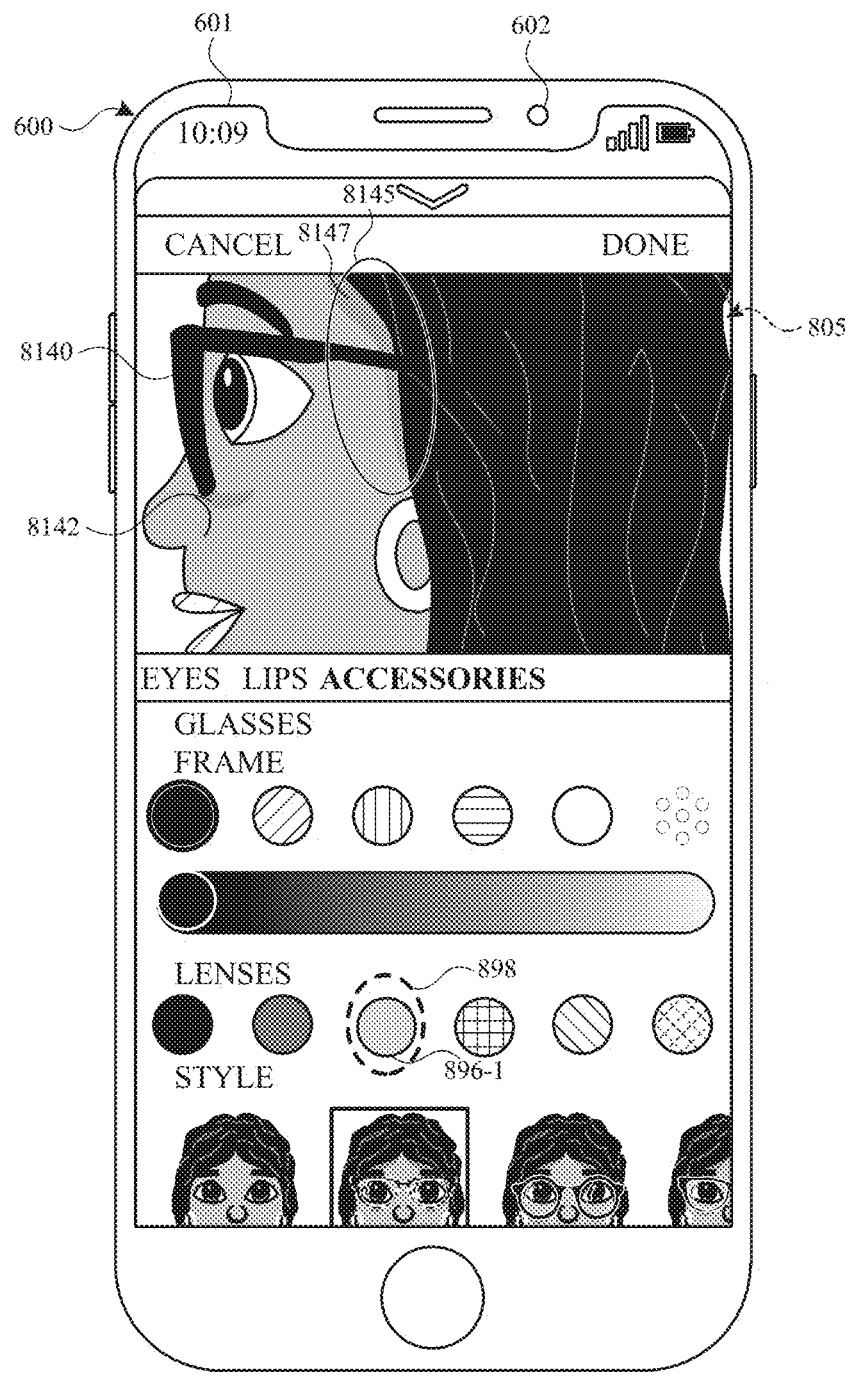
Figure 8B:
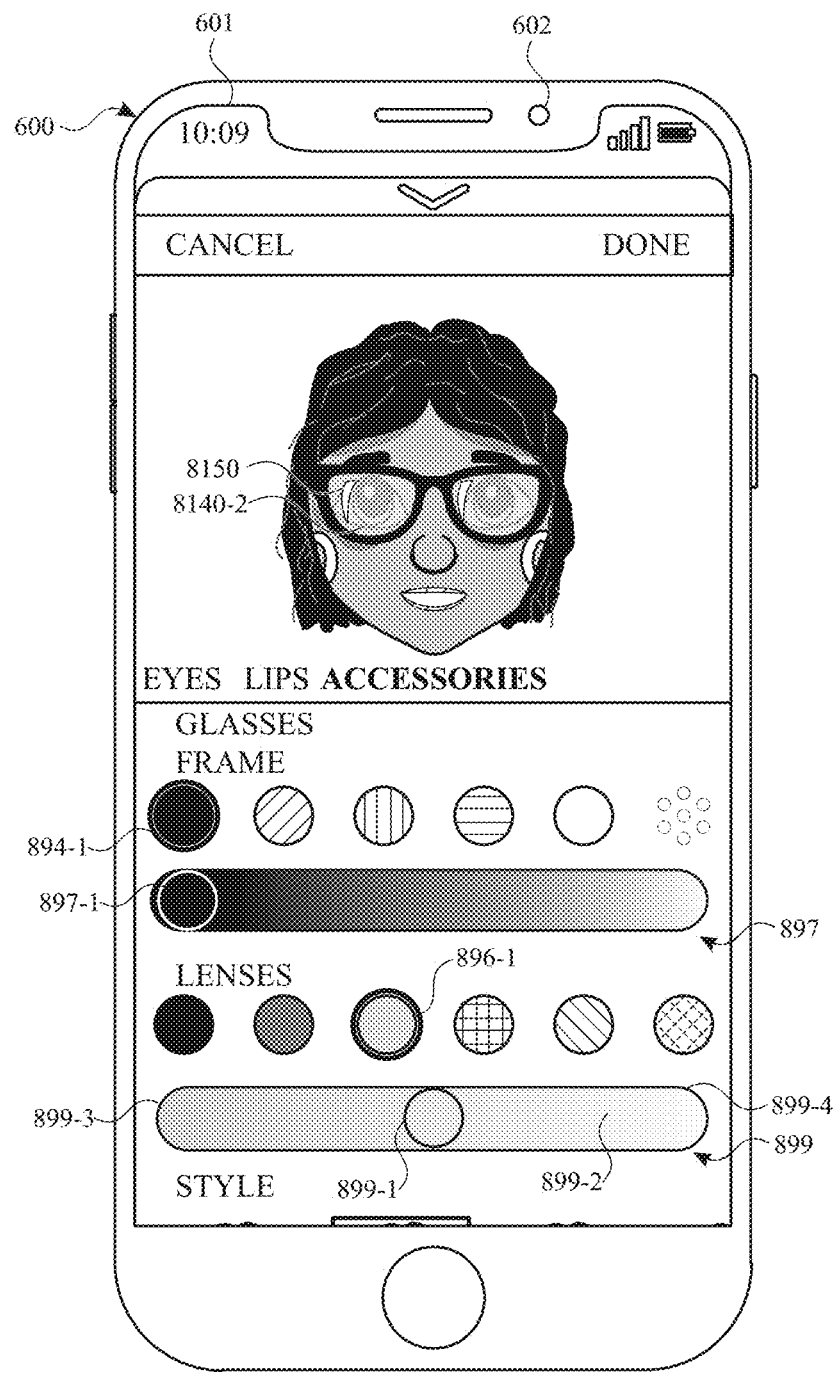
Figure 8B:
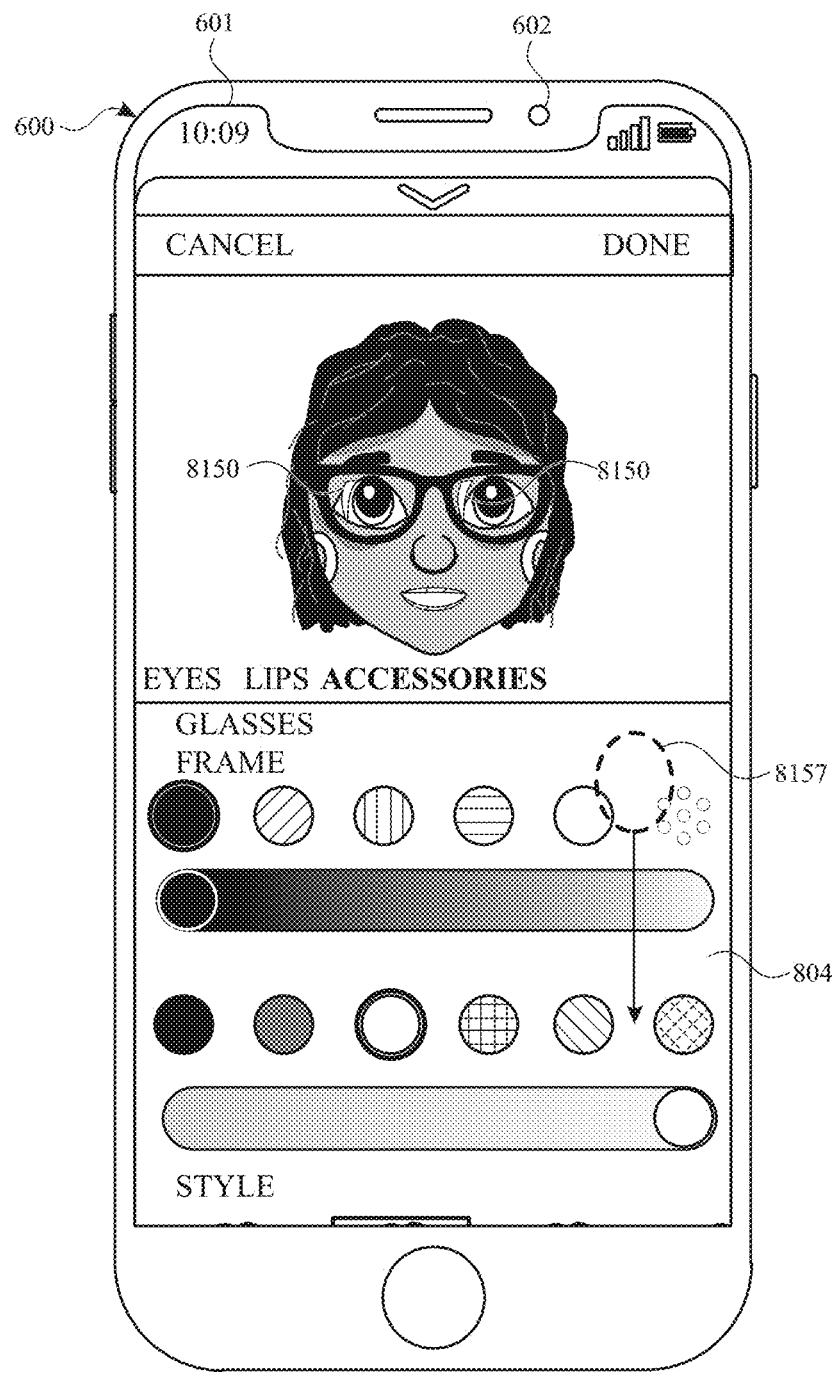
Figure 8B:
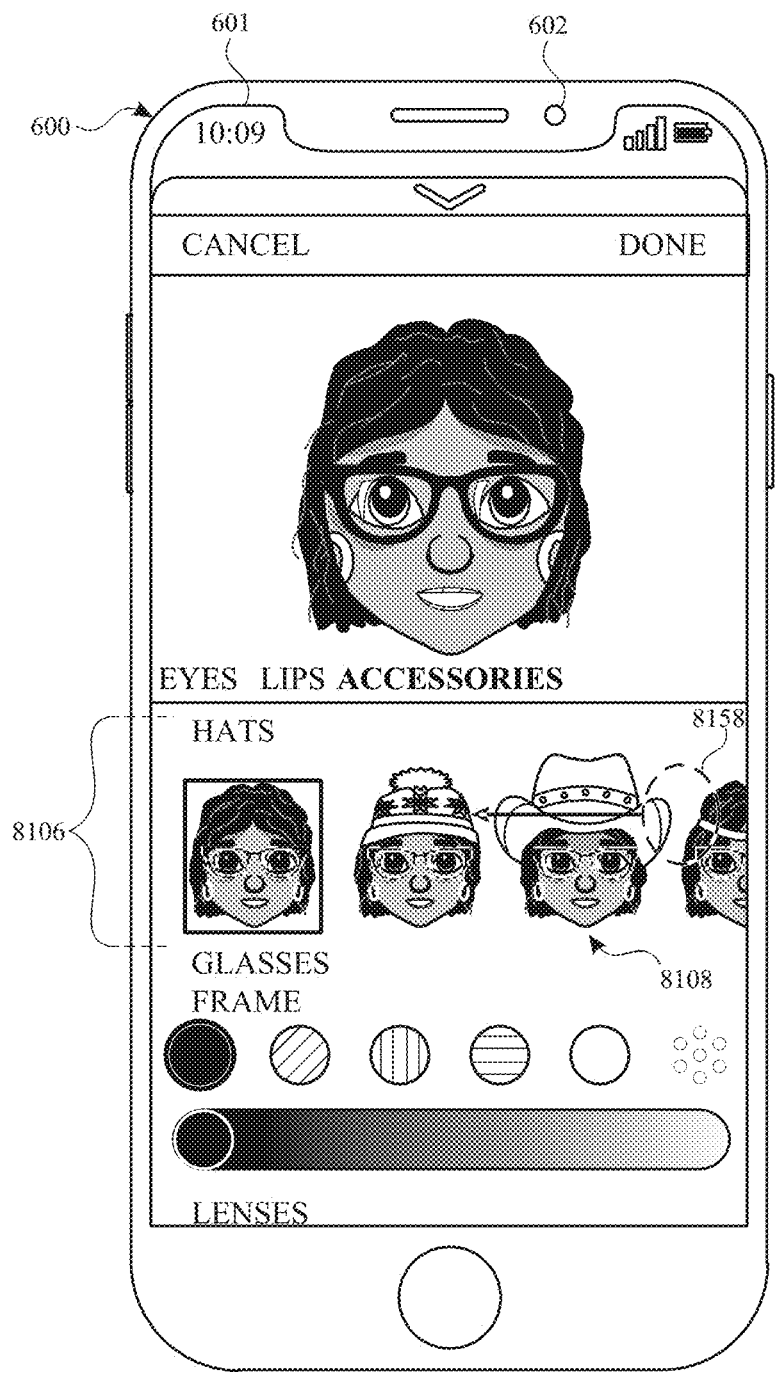
Figure 8B:
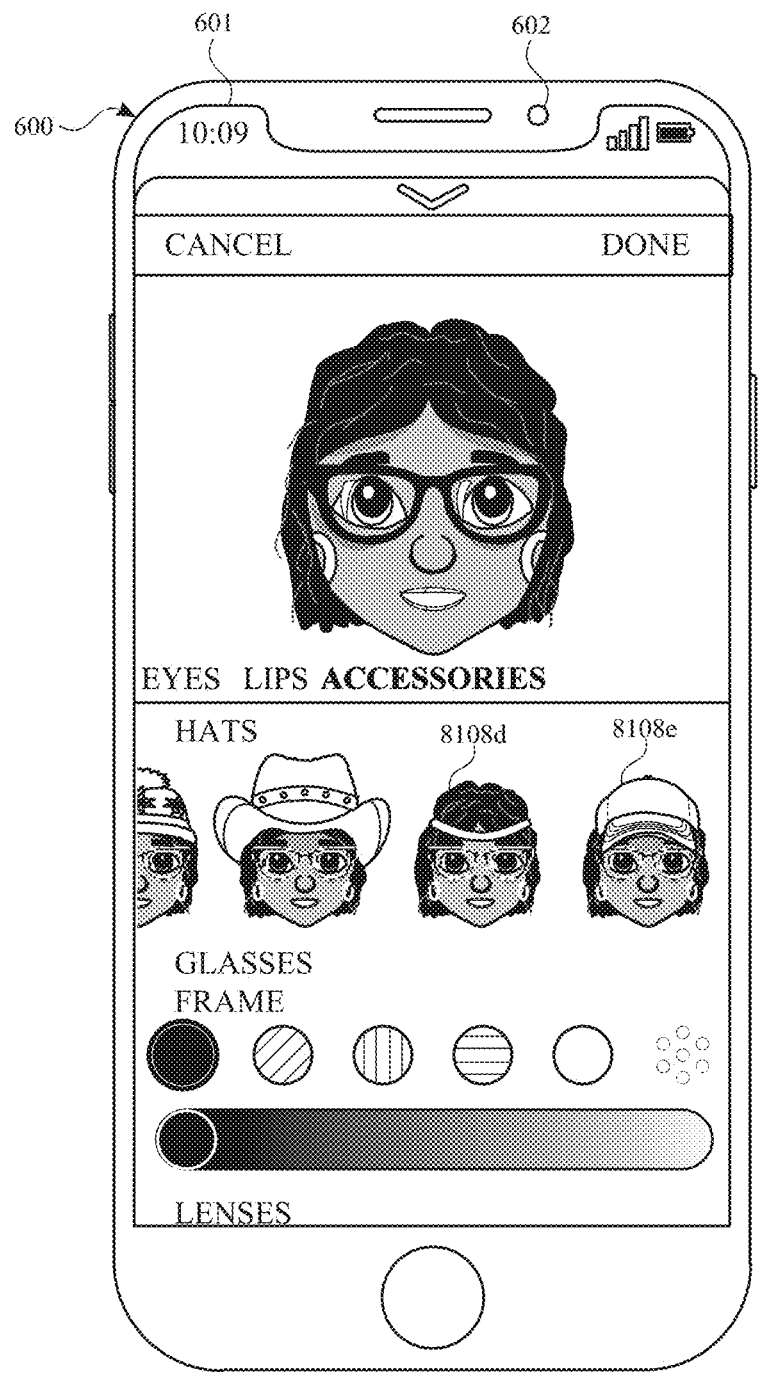
Figure 8B:
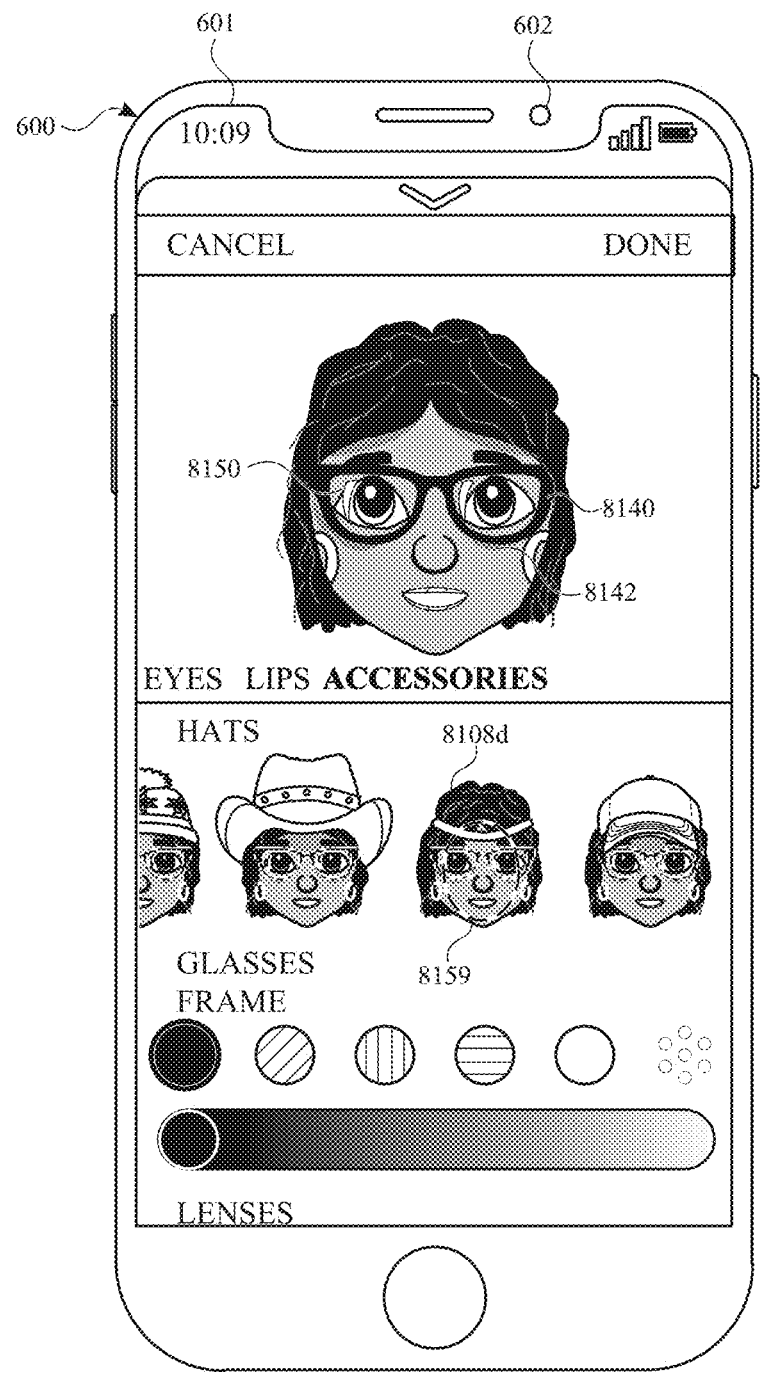
Figure 8B:
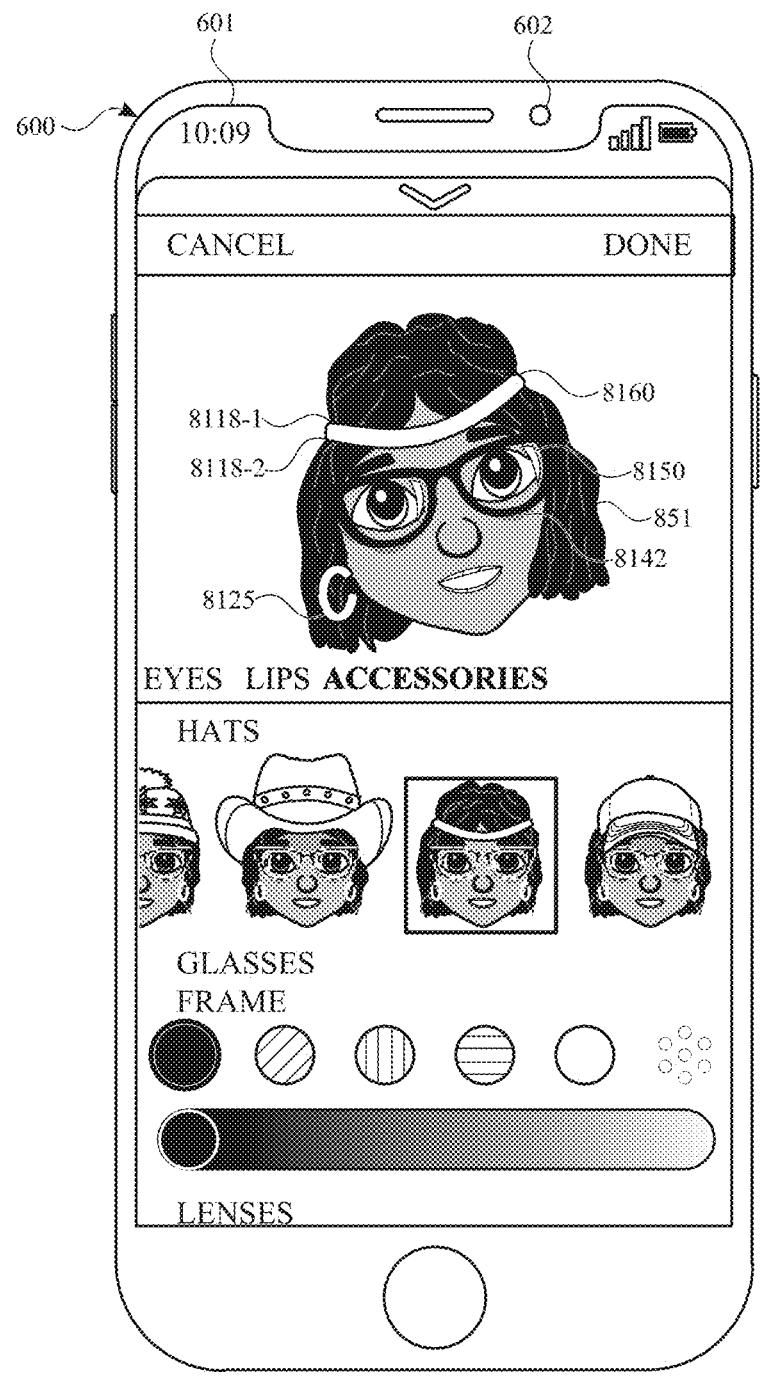
Figure 8B:
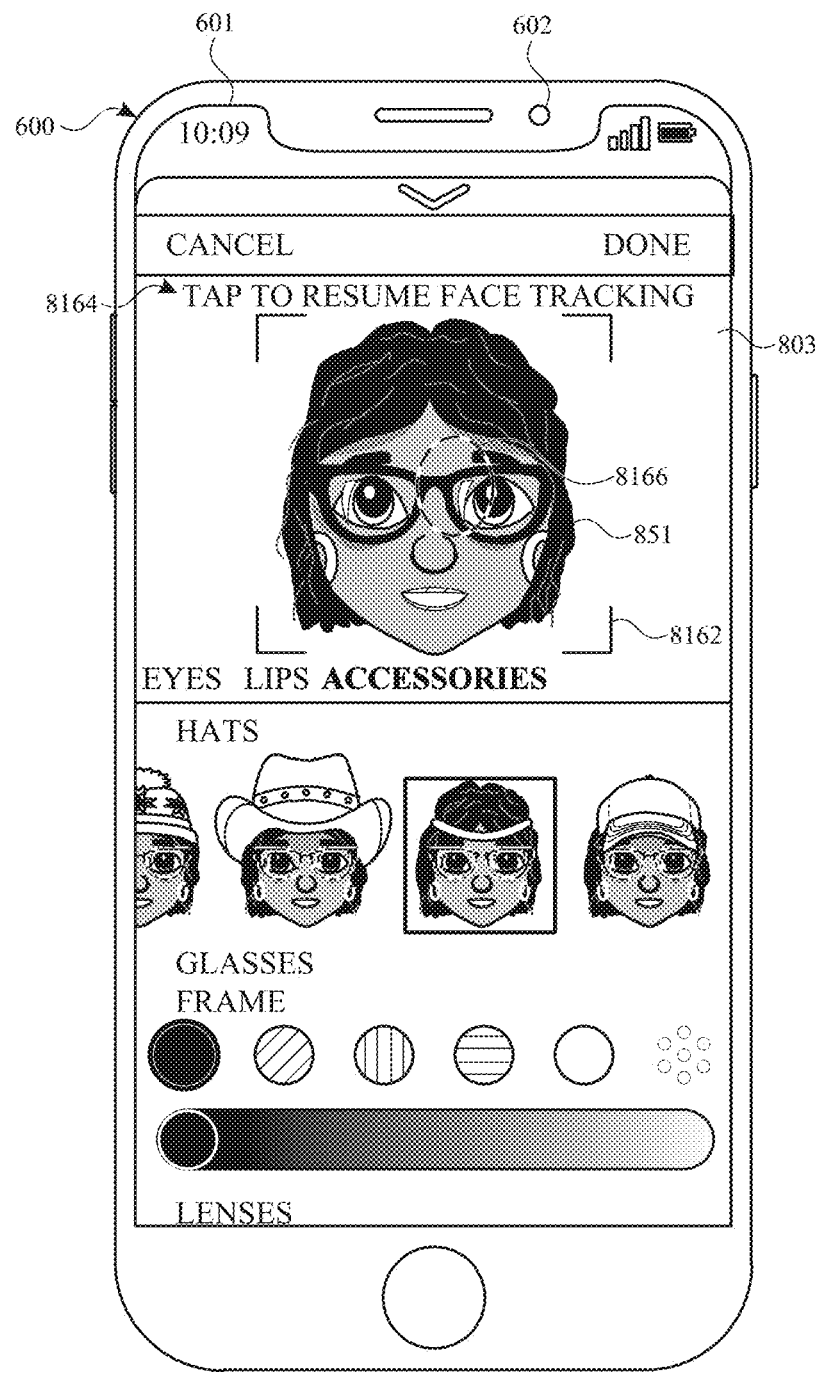
Figure 8C:
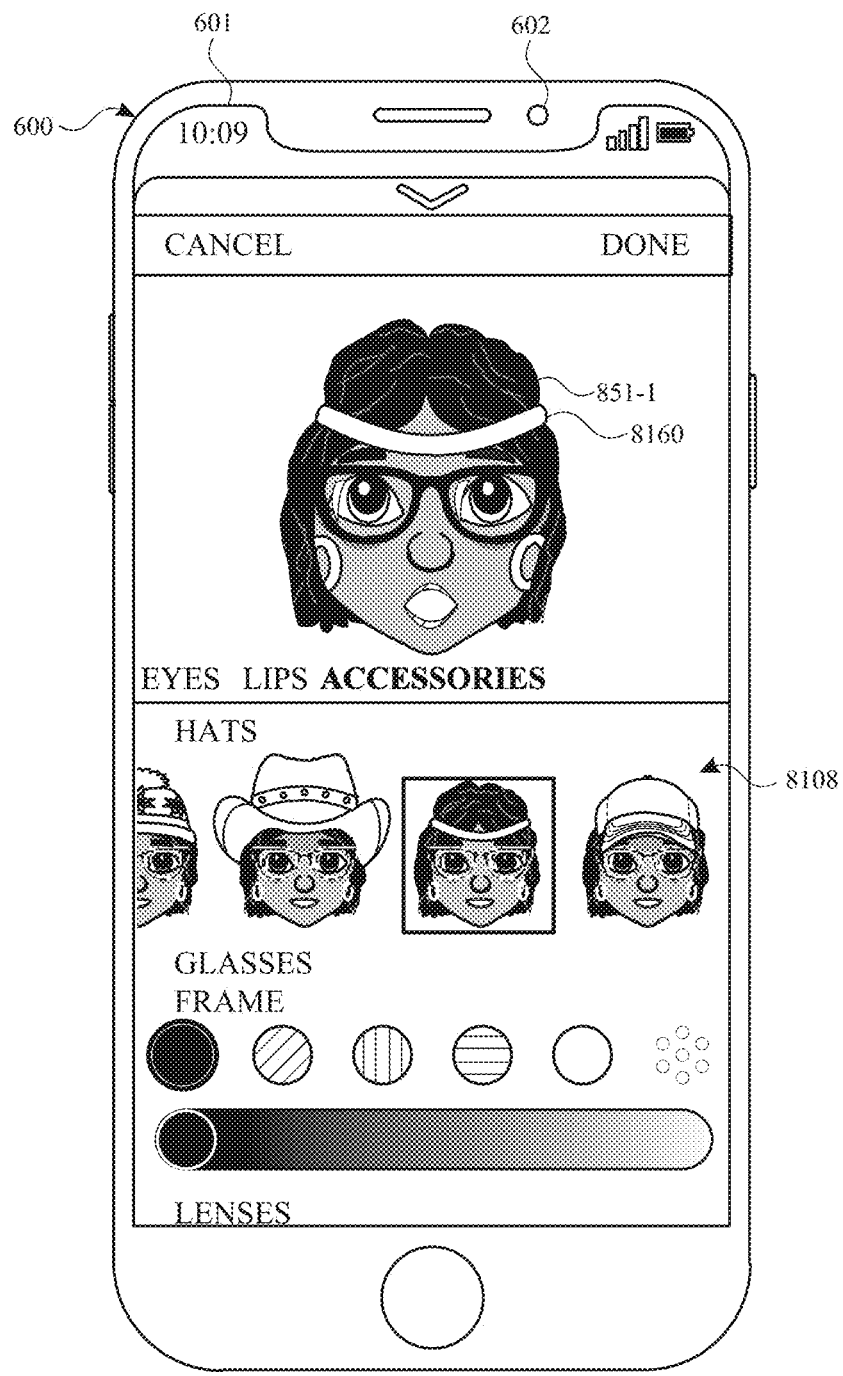
Figure 8C:
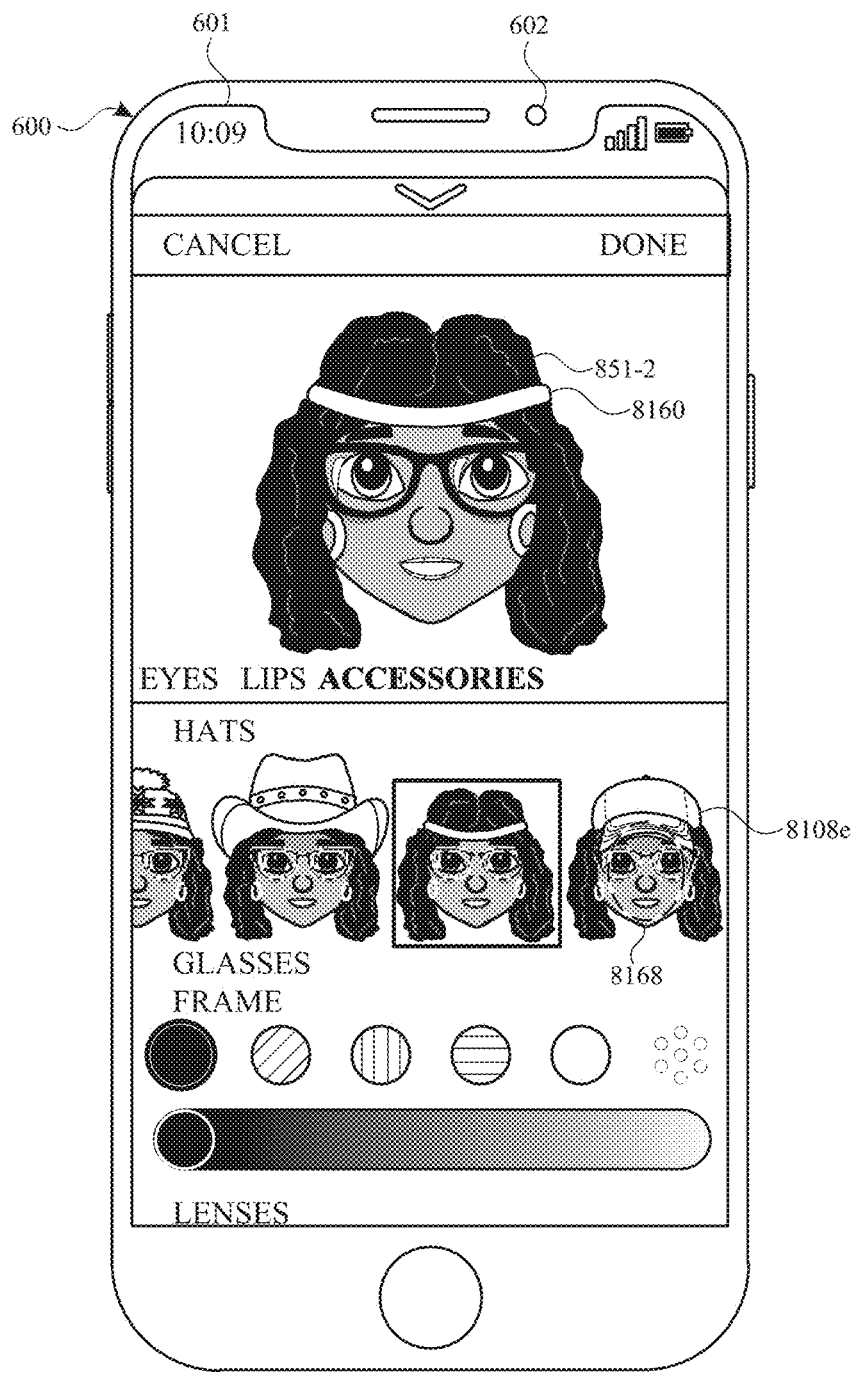
Figure 8C:
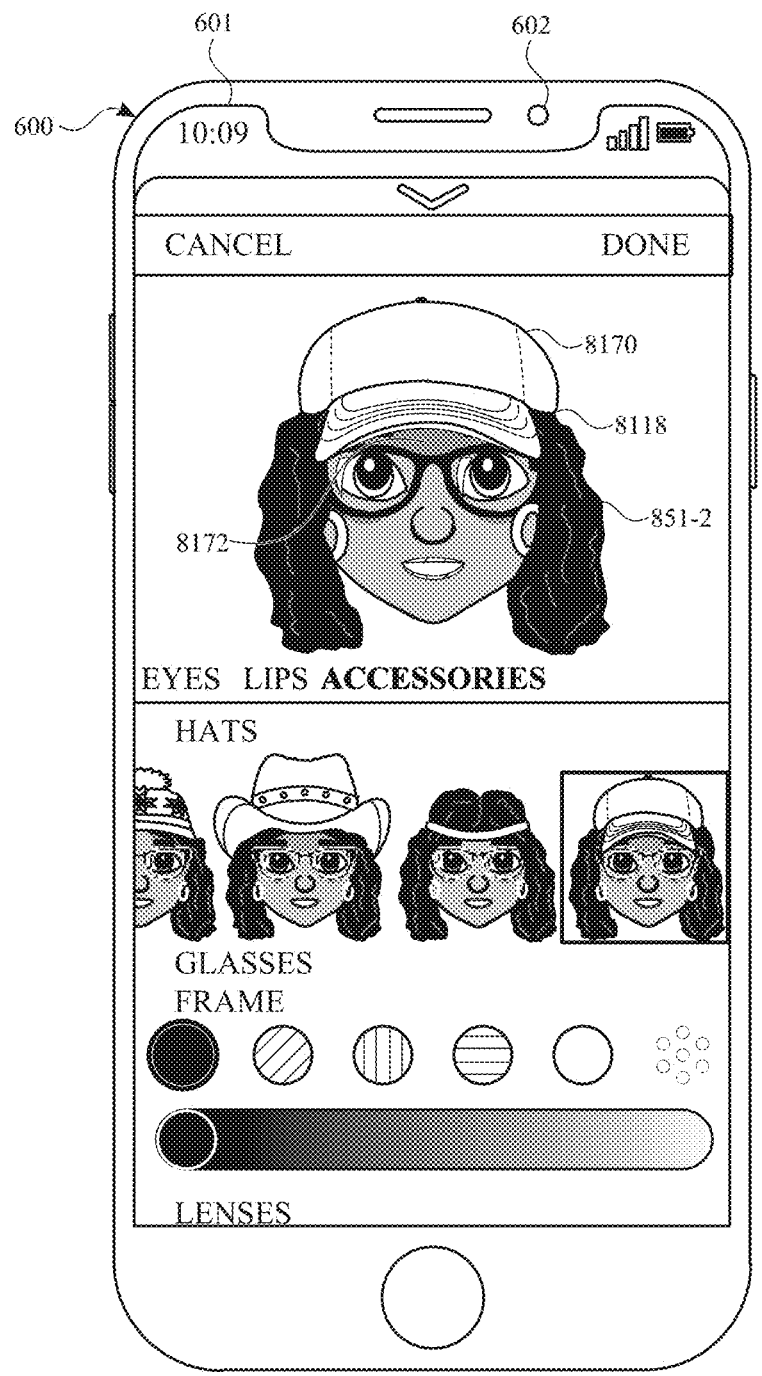
Figure 8C:
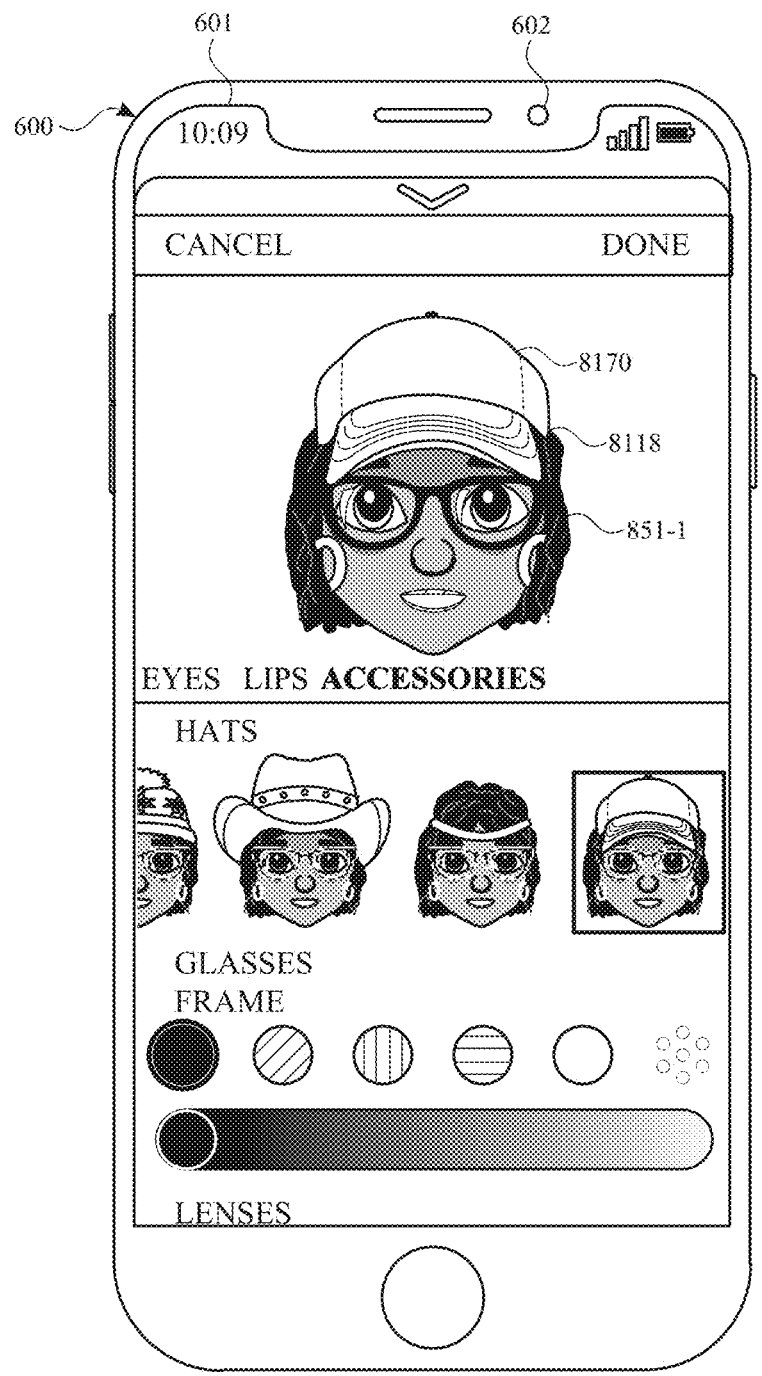
Figure 8C:
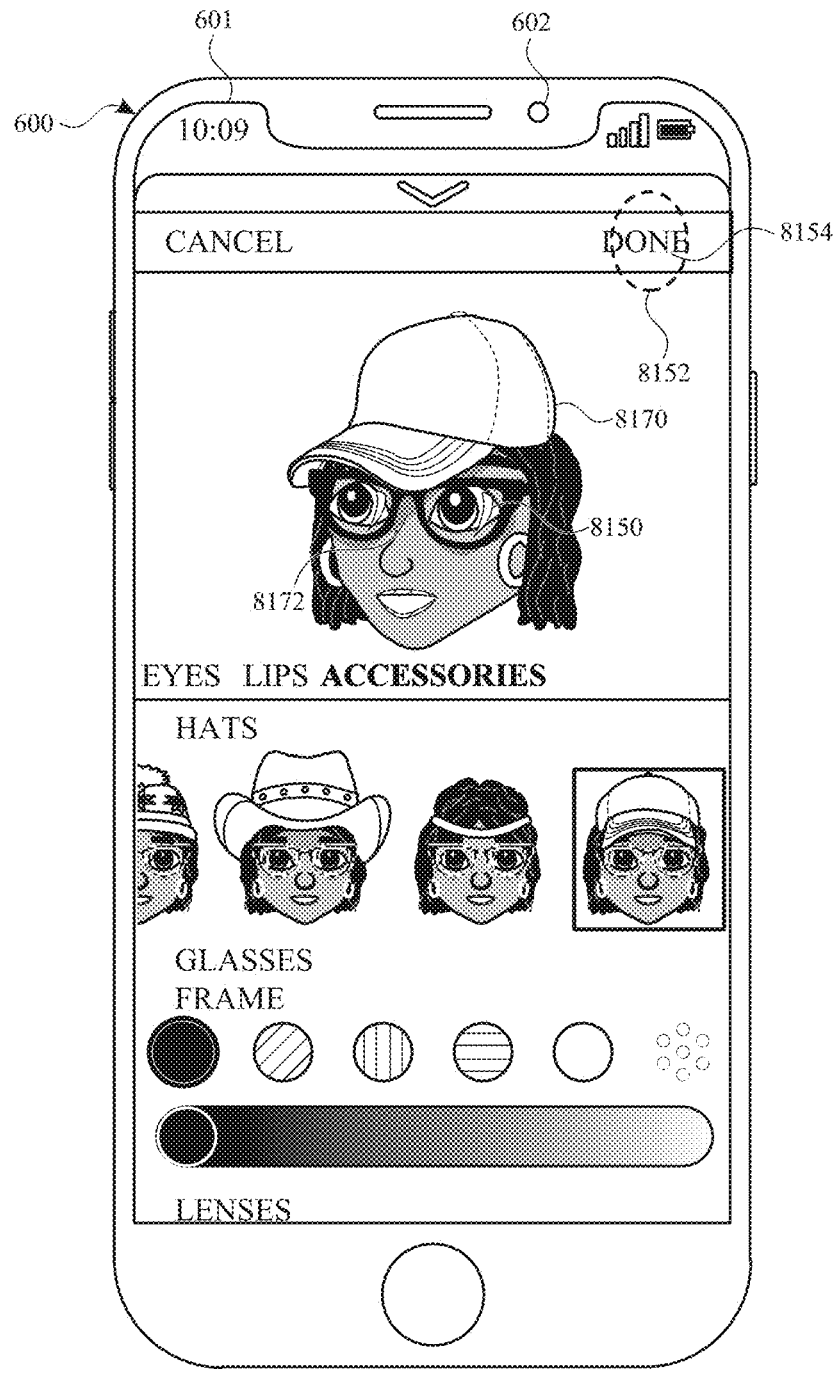
Figure 8C:

For example, in FIGS. 8X-8Z, device 600 detects touch-and-drag input 860 on selector affordance 858 and, in response, displays movement of selector affordance 858 within region 857 based on the dragging movement of input 860, and updates the color of selector affordance 858, selected color 832a, and the color of avatar hair 851 and any avatar hair displayed in the feature options (e.g., 834a-834c, 836b, and 836c) based on the locations of selector affordance 858 within region 857.

In FIG. 8X, input 860 has an initial position 860' corresponding to the initial location of selector affordance 858, which is the center of region 857. Because selector affordance 858 is in its initial (e.g., default) position, device 600 does not modify selected color 832a, the color of selector affordance 858, or any other displayed features having selected color 832a. In some embodiments, in response to detecting an input (e.g., input 860) on selector affordance 858, device 600 generates feedback such as, for example, a haptic feedback (e.g., a tactile output) that is optionally generated with or without an audio output when selector affordance 858 is located in its default location (or when selector affordance 858 is moved from a different location to the default location (e.g., the center of slider 856)). This provides feedback to notify a user when the selector affordance 858 is located in its initial (e.g., default) location corresponding to the initial color (e.g., value) of selected color 832a.

In FIG. 8Y, device 600 detects input 860 moving to second position 860" and, in response, displays selector affordance 858 at a second location corresponding to second position 860". The second location of selector affordance 858 corresponds to a greater gradient (e.g., a darker shading or greater undertone) of selected color 832a along region 857 (compared to the gradient shown in FIG. 8X). Accordingly, device 600 displays selector affordance 858 having a greater gradient based on the relative position of selector affordance 858 within region 857. Device 600 also updates selected color 832a, and any features (e.g., avatar hair 851, hair texture options 834a-834c, and hairstyle options 836b and 836c) displaying selected color 832a, to have the greater gradient (e.g., shading or undertone).

In FIG. 8Z, device 600 detects input 860 moving to third position 860''' and, in response, displays selector affordance 858 at a third location corresponding to third position 860'''. The third location of selector affordance 858 corresponds to a greater gradient (e.g., a darker shading or greater undertone) than that shown in FIG. 8Y. Accordingly, device 600 displays selector affordance 858 having the greater gradient based on the relative position of selector affordance 858 within region 857. Device 600 also updates selected color 832a, and the features displaying selected color 832a (e.g., avatar hair 851, hair texture options 834a-834c, and hairstyle options 836b and 836c), to have the greater gradient (e.g., a darker shading or greater undertone) shown in FIG. 8Z.

In FIG. 8AA, device 600 detects termination of input 860 (e.g., lift-off of the touch-and-drag input) when selector affordance 858 is at a location (e.g., 858') corresponding to location 860''' shown in FIG. 8Z. Accordingly, device 600 maintains the selected gradient of selected color 832a (and any features having the selected color 832a) at the time input 860 terminates. In some embodiments (e.g., see FIGS. 8AS and 8AT discussed below), device 600 retains the modified hair color slider 856, including the position of selector affordance 858 and the modified gradient of selected color 832a, even after a different color option 832 is selected.

In FIG. 8AB, device 600 detects a selection of hair color option 832b in response to receiving input 861 (e.g., a touch input on display 601) on hair color option 832b.

In FIG. 8AC, device 600 indicates hair color option 832b is selected by displaying border 862 around hair color option 832b. Device 600 also modifies displayed hair color slider 856 by moving selector affordance 858 to a default location for selected hair color option 832b, and updating the color of selector affordance 858 to a color corresponding to selected hair color option 832b. Device 600 also modifies avatar hair 851, hair texture options 834, and hairstyle options 836 (e.g., 836b and 836c) to have a hair color matching selected hair color option 832b. The transition of the hair texture options 834 and hairstyle options 836 is displayed in accordance with the ripple effect appearance discussed above. For example, hair texture options 834a-834c transition (e.g., with momentary enlargement) in sequential order, followed by transition of hairstyle options 836b and 836c (e.g., with momentary enlargement) in sequential order.

In FIGS. 8AD-AL, device 600 detects input 864, which is a touch-and-drag gesture on display 601, the initial touch corresponding to a location within avatar characteristics region 804. In response to detecting movement of input 864 in a vertical direction, device 600 scrolls the displayed avatar feature characteristics and corresponding feature options displayed in avatar characteristics region 804 based on the direction of movement of input 864 (e.g., based on the direction of the drag). Additionally, device 600 adjusts the size of avatar display region 803 (including displayed avatar 805 and, optionally, avatar feature region 807) and avatar characteristics region 804 based on the direction of the drag and the current states (e.g., sizes) of avatar display region 803 and avatar characteristics region 804.

For example, FIGS. 8AD-8AF illustrate avatar display region 803 and avatar 805 transitioning (e.g., condensing) from an initial, fully expanded state in FIG. 8AD to a condensed state in FIG. 8AF in response to detecting movement of input 864 in an upward direction (e.g., in a direction towards avatar display region 803). Simultaneous with the transition of avatar display region 803, device 600 displays avatar characteristics region 804 transitioning (e.g., expanding) from an initial state in FIG. 8AD to a fully expanded state in FIG. 8AF. FIG. 8AE shows avatar display region 803 (including avatar 805) and avatar characteristics region 804 each having respective intermediate states (e.g., sizes) when the relative location of input 864 is between the respective locations shown in FIGS. 8AD and 8AF. Thus, device 600 continually condenses the avatar display region 803 and avatar 805, while simultaneously expanding avatar characteristics region 804 (and shifting line 806 upward), in response to a drag gesture in an upward direction, until avatar display region 803 and avatar 805 reach the condensed state and avatar characteristics region 804 reaches the fully expanded state. When avatar display region 803 and avatar 805 are in the condensed state, device 600 does not further condense avatar display region 803 and avatar 805, or further expand avatar characteristics region 804, in response to further movement of the drag gesture in an upward direction (or in response to subsequent upward drag gestures). Rather, device 600 continues to scroll the avatar feature characteristics and feature options (see FIGS. 8AG-8AH revealing additional hairstyle options 836d-836f of hairstyle characteristic 842, and moving hair color characteristic 838, including hair color features 832 and hair color slider 856, off the displayed portion of avatar characteristics region 804) in response to further movement of the drag gesture in an upward direction (or in response to subsequent upward drag gestures on avatar characteristics region 804 when avatar display region 803 is in the condensed state).

Conversely, device 600 expands avatar display region 803 from a condensed (or intermediate) state in response to detecting movement of input 864 in a downward direction, as shown in FIGS. 8AH-8AJ. Simultaneous with the expansion of avatar display region 803, device 600 displays avatar characteristics region 804 transitioning (e.g., contracting) from its expanded state in FIG. 8AH (or intermediate state in FIG. 8AI) to its original state (e.g., size) in FIG. 8AJ. By expanding avatar display region 803 in response to the downward movement of input 864, device 600 magnifies avatar 805 so a user can more easily see avatar 805 without requiring the user to scroll back to the initial position of the avatar feature characteristics and feature options in avatar characteristics region 804 (e.g., see FIG. 8AD).

By condensing avatar display region 803, device 600 displays a larger avatar characteristics region 804 to show additional avatar feature characteristics and/or feature options. The sizes of the avatar feature characteristics and feature options do not change when avatar characteristics region 804 expands or contracts. Accordingly, device 600 displays more avatar feature characteristics and/or feature options as avatar characteristics region 804 expands, and displays fewer avatar feature characteristics and/or feature options as avatar characteristics region 804 contracts.

In some embodiments, as device 600 displays scrolling of avatar feature characteristics (e.g., 808, 810, 838, 840, 842) and their respective feature options (e.g., 812, 814, 832, 834, 836) device 600 maintains display of a respective header for an avatar feature characteristic positioned at the top of avatar characteristics region 804, when a portion of that avatar feature characteristic is scrolled partially off the top edge (e.g., below line 806) of avatar characteristics region 804. For example, as shown in FIG. 8AH, as hair texture characteristic 840 is scrolled off the displayed portion of avatar characteristics region 804, device 600 "freezes" texture header 841 at the top of avatar characteristics region 804 (e.g., directly below line 806). The "frozen" texture header 841 remains displayed at the top of avatar characteristics region 804 until the entirety of hair texture characteristic 840 is scrolled off avatar characteristics region 804 (e.g., in an upward direction) or until the entirety of hair texture characteristic 840 is positioned below line 806 (e.g., when no portion of hair texture characteristic 840 is scrolled off the top edge of avatar characteristics region 804). In some embodiments, when the "frozen" header is released from the position below line 806, it is replaced with a header of an adjacent avatar feature characteristic (e.g., see hairstyle header 843 in FIG. 8AL). In some embodiments, a frozen header (e.g., texture header 841) is visually distinguished from feature options in avatar characteristics region 804. For example, as shown in FIG. 8AH, texture header 841 is visually distinguished by lines 806 and 867.

In FIGS. 8AK and 8AL, device 600 detects input 864 moving in an upward direction (after moving downward as shown in FIGS. 8AI and 8AJ), and condenses avatar display region 803 and avatar 805, while simultaneously expanding avatar characteristics region 804, and moving hairstyle header 843 to the edge of avatar characteristics region 804 (replacing texture header 841), as discussed above. The movement of input 864 also scrolls the content displayed in avatar characteristics region 804 to display additional hairstyle options 836*g*-836*i*.

In FIG. 8AM, device 600 detects termination (e.g., lift-off) of input 864. Device 600 displays avatar display region 803 and avatar 805 having the condensed state, and avatar characteristics region 804 having the fully expanded state. Avatar characteristics region 804 shows hairstyle characteristic 842 having hairstyle options 836*a*-836*i* (each with wavy hair texture based on prior selection of wavy hair texture option 834*b* in FIG. 8R and hair color based on hair color option 832*b* selected in FIG. 8AB) and hairstyle header 843 positioned below line 806 and visually distinguished from hairstyle options 836*a*-836*c*, by line 867. Pixie hairstyle 836*b* is shown selected as indicated by border 846 positioned around pixie hairstyle 836*b* and as indicated by avatar hair 851 having the pixie hairstyle (and also wavy hair texture) displayed on avatar 805. Avatar hair affordance 809*b* is highlighted to indicate the avatar hair feature is currently selected for editing.

In some embodiments, avatar display region 803 and avatar 805 transition from the condensed state directly to the fully expanded state in response to detecting a selection of a feature option. For example, in FIG. 8AN, device 600 detects input 869 (e.g., touch input on display 601) at a location corresponding to spiked hairstyle option 836*f* In response to detecting selection of spiked hairstyle option 836*f*, device 600 displays avatar display region 803 and avatar 805 having the fully expanded state in FIG. 8AO. Device 600 modifies avatar hair 851 to match the selected spiked hairstyle option 836*f* (with wavy hair texture based on prior selection in FIG. 8R and hair color based on hair color option 832*b* selected in FIG. 8AB). Device 600 also indicates selection of spiked hairstyle option 836*f* by removing border 846 from pixie hairstyle option 836*b*, and displaying border 846 around spiked hairstyle option 836*f*.

In FIGS. 8AP and 8AQ, device 600 detects input 870, which is a touch-and-drag gesture on display 601, the initial touch corresponding to a location within avatar characteristics region 804. Device 600 detects movement of input 870 in a downward direction and, in response, scrolls the feature options (e.g., hairstyle options 836*a*-836*i*) and hairstyle header 843 in a downward direction to display hair color characteristic 838, hair texture characteristic 840 and a portion of hairstyle characteristic 842, as shown in FIG. 8AQ.

In FIG. 8AR, device 600 detects termination (e.g., lift-off) of input 870. Device 600 displays hair color characteristic 838 having hair color slider 856 and hair color options 832 (including selected hair color option 832*b* indicated by border 862), hair texture characteristic 840 having texture header 841 and hair texture options 834*a*-834*c* (including selected wavy hair texture option 834*b* indicated by border 844), and hairstyle characteristic 842 having hairstyle header 843 and hairstyle options 836*a*-836*c*.

In FIG. 8AS, device 600 detects input 871 (e.g., touch input) on hair color option 832*a*. In response, device 600 displays avatar hair 851 transitioning from selected color 832*b* in FIG. 8AS to a color corresponding to selected color 832*a* in FIG. 8AT (which is the color that resulted from the modifications discussed above with respect to FIGS. 8X-8AA). Because only the selected hair color changed with the input 871, avatar hair 851 is still displayed with the spiked hairstyle corresponding to selected spiked hairstyle option 836*f*, and the wavy hair texture corresponding to selected wavy hair texture option 834*b*. Additionally, device 600 displays the feature options that include a hair color each transitioning from the displayed state in FIG. 8AS to the displayed state in FIG. 8AT. Accordingly, device 600 displays hair texture options 834*a*-834*c* and hairstyle options 836*b* and 836*c* transitioning from a hair color corresponding to hair color option 832*b* to a hair color corresponding to hair color option 832*a*. This transition can include the ripple effect appearance (e.g., sequential transition with momentary enlargement of transitioning feature options) discussed above.

As shown in FIG. 8AT, device 600 also displays, in response to detecting input 871, hair color slider 856 transitioning to the retained modified setting for color 832*a* that was previously set in response to input 860 discussed above with respect to FIGS. 8X-8AA. This includes displaying selector affordance 858 transitioning to the same modified color as color option 832*a* and a same modified location within color shade region 857 as that shown in FIG. 8AA immediately prior to device 600 detecting input 861 on hair color option 832*b*.

In FIG. 8AU, device 600 detects input 872 (e.g., touch input) on bob hairstyle option 836*c*, which is shown partly off-screen in avatar characteristics region 804. In response, device 600 displays avatar hair 851 transitioning from the spiked hairstyle to a bob hairstyle corresponding to selected bob hairstyle option 836*c*, as shown in FIG. 8AV. Device 600 also displays a slight scrolling of avatar characteristics region 804 to display a full representation of selected bob hairstyle option 836*c* (and removing hair color options 832), and displays border 846 around bob hairstyle option 836*c* to indicate selection of this feature option. Because no other feature options are selected by input 872, no avatar features other than avatar hair 851 are modified. Additionally, because no other displayed feature options display a sufficient amount of avatar hair to illustrate the selected hairstyle, device 600 does not display any feature options updating.

In FIG. 8AW, device 600 detects input 873 (e.g., touch input) on avatar lips affordance 809*c*. In response to detecting input 873, device 600 updates, as shown in FIG. 8AX, avatar display region 803 to indicate the avatar lips feature is selected (e.g., by bolding avatar lips affordance 809*c* and positioning it directly below avatar 805) and updates avatar characteristics region 804 to display avatar feature characteristics and feature options corresponding to the avatar lips feature. The avatar feature characteristics and feature options displayed in FIGS. 8AX-8BA correspond to the avatar lips feature. Accordingly, in response to detecting selections of any such feature options, device 600 modifies avatar lips 828 shown on avatar 805 and, in some cases, updates representations of avatar lips displayed in the feature options, depending on whether the selected feature option shows avatar lips.

As shown in FIG. 8AX, updated avatar characteristics region 804 includes lips color characteristic 875 having various lip color options and lip shape characteristic 878 having lip shape options 880. The lip color options include natural lip color options 882, non-natural lip color options 884, and a color picker option 886. Natural lip color options 882 represent natural human lip color options that, in some embodiments, are determined based on a selected skin tone for avatar 805. Non-natural lip color options 884, in some embodiments, are not determined based on a selected skin tone and, instead, represent colors that might correspond to lipstick colors or other colors that are not natural to a human's lips (e.g., blue, green, etc.). Color picker option 886 is a selectable option that displays additional color choices that can be selected for adjusting the color of the avatar's lips. In some embodiments, the lip color options (e.g., 882, 884, 886) are scrollable in a horizontal direction in response to an input (e.g., tap, swipe, drag, etc.) on the lip color options. Scrolling the lip color options displays additional lip color options (e.g., 882, 884, 886). In some embodiments, color picker option 886 is positioned at an end of the lip color options and is not displayed until the lip color options are scrolled to the end of the lip color options.

In FIG. 8AX, device 600 detects input 887 (e.g., a touch gesture on display 601) on color picker option 886. In FIG. 8AY, in response to detecting input 887, device 600 displays expanded color palette 888 displaying a variety of color options, including natural lip color options and non-natural lip color options. In some embodiments, expanded color palette 888 can be displayed as a pop-up menu that appears over a portion of avatar characteristics region 804, including any displayed avatar feature characteristics and feature options.

In FIG. 8AY, device 600 detects input 889 (e.g., a touch gesture on display 601) on selected lip color option 890.

In FIG. 8AZ, in response to detecting selection of selected lip color option 890, device 600 displays avatar lips 828 updated to match the color of selected lip color option 890. In addition, lip shape options (e.g., lip shape option 880a) are updated (e.g., in accordance with the ripple effect appearance discussed herein) to include selected lip color option 890. Device 600 also updates one of the lip color options (represented as lip color option 884a in FIG. 8AX) to match selected lip color option 890, and displays border 891 around the updated lip color option 884a.

Device 600 also displays lip color slider 892, which can be controlled in a manner similar to other color sliders discussed herein. Lip color slider 892 includes selector affordance 893 that can be positioned along the lip color slider to adjust a gradient of selected lip color 884a from a high gradient value at 892a to a low gradient value at 892b. In some embodiments, the gradient can represent various characteristics of the selected lip color such as, for example, shading, saturation, undertone, midtones, highlights, warmth, or hue. In some embodiments, the gradient can represent an undertone of the avatar lips that is different from the selected color and, optionally, based on a selected skin tone of the avatar. The gradient of the undertone can be adjusted by moving selector affordance 893 along the lip color slider 892, which ultimately modifies the appearance of the selected lip color and avatar lips 828. For example, the undertone of the selected color can be a red color, or some other color corresponding to a natural skin tone (e.g., brown), whereas the selected lip color (e.g., selected lip color 884a) can be any color (including any non-natural color). Adjusting the undertone gives the avatar's lips an appearance of having not only a particular color applied to the lips, but also an intensity of that color, based on the gradient of the undertone. For example, for avatar lips having a non-natural selected lip color (e.g., green), adjusting an undertone to a low gradient value 892b, provides little or no natural lip color (e.g., red) undertone. This emphasizes the green lip color, giving the appearance that the avatar has heavily applied green lipstick, or lips of an unnatural color. Conversely, adjusting the undertone to a high gradient value 892a emphasizes the undertone of the lips, giving the appearance that the avatar has lightly applied green lipstick. By adjusting the position of selector affordance 893 along the slider, a user can adjust the gradient of the undertone that device 600 applies to selected color 884a.

In FIG. 8BA, device 600 detects input 8100 (e.g., touch input) on avatar accessories affordance 809d. In response to detecting input 8100, device 600 updates, as shown in FIG. 8BB, avatar display region 803 to indicate the avatar accessories feature is selected (e.g., by bolding avatar accessories affordance 809d and positioning it directly below avatar 805) and updates avatar characteristics region 804 to display avatar feature characteristics and feature options corresponding to avatar accessories features. The avatar feature characteristics and feature options displayed in FIGS. 8BA-8CF correspond to avatar accessories features. Accordingly, in response to detecting selections of any such feature options, device 600 modifies avatar 805 based on the selected feature option and, in some cases, updates representations of avatar accessories displayed in the feature options, based on the selected feature option.

As shown in FIG. 8BB, avatar characteristics region 804 includes earrings characteristic 8102 having earring options 8104, hat characteristic 8106 having hat options 8108, and glasses characteristic 8110 having glasses options 8112 (shown in FIG. 8BM). Device 600 displays border 8114 around earring option 8104a to indicate earring option 8104a (no earrings) is currently selected. Device 600 also displays border 8116 around hat option 8108a to indicate hat option 8108a (no hat) is currently selected. Device 600 displays avatar 805 having no earrings and no hat, based on the selected earring option 8104a and hat option 8108a.

In some embodiments, feature options can be scrolled horizontally to display additional feature options. For example, in FIG. 8BB, device 600 displays earring option 8104d and hat option 8108d partially off-screen, indicating earring options 8104 and hat options 8108 can be scrolled horizontally (e.g., in response to a horizontal swipe or touch-and-drag gesture as shown in FIGS. 8BV-8BW).

In some embodiments, device 600 displays feature options to represent a potential appearance of the avatar (e.g., avatar 805) if the respective feature option is selected. In some embodiments, however, device 600 displays feature options that do not completely represent a potential appearance of the avatar if the respective feature option is selected. For example, device 600 can display feature options having a representation of an avatar feature with a portion of the respective avatar feature omitted. Omitting a portion of the respective avatar feature from the feature option shows other avatar features in the feature option that would otherwise be obstructed by the omitted portion if it were displayed, but does not fully represent a potential appearance of the avatar if the feature option is selected. For example, in FIG. 8BB, device 600 displays earring options 8104 having a representation of avatar hair (e.g., avatar hair 851), but with a portion of the avatar hair omitted so that a representation of an avatar ear and, in some cases, an earring are displayed. The portion of avatar hair is omitted from earring options 8104 to display an unobstructed view of the various earring options that can be selected. However, earring options 8104 do not represent a potential appearance of avatar 805 if the earring options are selected, because the currently selected avatar hairstyle (e.g., indicated by avatar hair 851) covers the avatar's ears (and potentially any selected avatar earrings). Thus, in some embodiments, certain avatar feature options do not affect the position of other avatar features when they are selected. For example, an avatar accessory option that corresponds to a nose ring would not result in a modification (e.g., an adjustment to the geometry of the feature due to the resulting placement of the avatar feature on the avatar) to other avatar features such as the avatar hair. Similarly, an avatar accessory option that corresponds to certain earrings would not result in a modification to avatar hair.

Device 600 also displays hat characteristic 8106 having hat options 8108. The displayed hat options 8108 represent potential changes to avatar 805 if a respective hat option is selected. In addition to modifying avatar 805 to include the selected hat, such potential changes include a reshaping of avatar hair 851 and a lighting affect such as casting a shadow on the face of avatar 805. In FIG. 8BB, the reshaping of avatar hair 851 is represented in hat options 8108b-8108c (additional hat options 8108d and 8108e are shown in FIG. 8BW and discussed in greater detail below). For example, beanie hat option 8108b shows a hat having a hatline 8118 (e.g., at a location where the hat (opening at the bottom of the hat) meets the hair on the avatar's head) that is narrower than a displayed width of the hair in hat option 8108b. Therefore, device 600 displays the hair having a reshaped (e.g., modified) appearance in which the avatar hair is tucked in at the hatline 8118, giving the realistic appearance that the hat is compressing the avatar's hair to conform to the avatar head. This effect is also displayed in cowboy hat option 8108c and in headband hat option 8108d. In headband hat option 8108d, device 600 displays a headband compressing the avatar hair, which again reshapes the avatar hair to conform to the hatline of the headband, but also gives the appearance that the avatar hair is both compressed at the hatline of the headband (e.g., tucked under the headband) and protruding over the top of the headband. Avatar 805 is shown in FIGS. 8BY-8CB when headband hat option 8108d is selected, discussed in greater detail below.

Hat option 8108c also illustrates a potential change to avatar 805 that would display a lighting effect on avatar 805. For example, cowboy hat option 8108c includes a large hat (e.g., a cowboy hat) that casts a shadow 8120 on the avatar's forehead, below the brim of the cowboy hat. By displaying hat option 8108c with a cowboy hat, reshaped hairline, and shadow 8120, device 600 indicates that selection of hat option 8108c would result in a modification to avatar 805 that includes displaying the cowboy hat on avatar 805, reshaping the hairline of avatar hair 851, and casting a shadow on the forehead of avatar 805 (e.g., see FIG. 8CC showing avatar 805 with a cap, reshaped hair, and shadow on forehead).

FIGS. 8BC and 8BD illustrate device 600 detecting input 8122 (e.g., a touch input) to select earring option 8104c, and indicating selection of earring option 8104c by moving border 8114 from earring option 8104a to earring option 8104c. FIG. 8BD also illustrates device 600 displaying avatar 805 having avatar earrings 8125 corresponding to the earrings displayed in selected earring option 8104c. Earrings 8125 are partially obstructed by avatar hair 851 positioned over the avatar's ears. However, earrings 8125 are large enough that they extend beyond avatar hair 851 and, therefore, are partially displayed protruding from under avatar hair 851. Device 600 also updates hat options 8108 to show earrings applied to the displayed hat options 8108 as shown in FIG. 8BD.

In some embodiments, device 600 detects a user's face positioned in a field of view of a camera (e.g., camera 602), and modifies (e.g., continuously) an appearance of avatar 805 based on detected changes in the user's face (e.g., changes in pose of the user's face, changes in the relative position of facial features, etc.). For example, in FIG. 8BE, device 600 displays real-time modifications to the facial features of avatar 805 based on corresponding changes detected in the user's face. In FIG. 8BE, device 600 detects (e.g., using camera 602) a user tilting their head to the side, winking their eye, and smiling. Device 600 modifies avatar 805 in real time to mirror the detected user movements.

In FIG. 8BF, device 600 detects (e.g., using camera 602) the user returning to a neutral position where the user is not tilting their head, smiling, or winking. Device modifies avatar 805 in real time to mirror the user returning to the neutral position.

In some embodiments, device 600 modifies selected avatar features, such as those represented in avatar 805, based on a physics model applied to the respective selected avatar features. For example, in FIG. 8BF, when device 600 displays avatar 805 returning to the neutral position, avatar earrings 8125 are shown swaying to reflect the physics of the tilting motion of the user's head. It should be appreciated that the physics model is not limited to the earrings 8125. Physics models can be applied to other selected avatar features.

In some embodiments, device 600 modifies a displayed orientation and/or magnification of avatar 805 in response to detected input on avatar display region 803 or more specifically, in some embodiments, on avatar 805. For example, in FIG. 8BG, device 600 detects input 8128 (e.g., a touch-and-drag gesture or swipe gesture) on avatar display region 803. In response to detecting movement of input 8128 from an initial location in FIG. 8BG to a second location in FIG. 8BH, device 600 displays a rotation of avatar 805 corresponding to the movement of input 8128. In FIG. 8BH, device 600 shows a resulting profile view of avatar 805.

In some embodiments, device 600 displays selected avatar features moving, in response to the detected input on avatar display region 803 (or avatar 805), based on an applied physics model. For example, in FIG. 8BI, device 600 shows earring 8125 swaying toward the front of the face of avatar 805 in response to the displayed rotation of avatar 805 in FIGS. 8BG and 8BH.

In FIG. 8BJ, device 600 detects input 8130 (e.g., a de-pinch gesture) on avatar 805 and, in response, magnifies avatar 805 based on movement of input 8130 (e.g., a length of the de-pinch gesture), as shown in FIG. 8BK.

In FIGS. 8BL and 8BM, device 600 detects input 8132 (e.g., a touch-and-drag gesture or swipe gesture) on avatar characteristics region 804 and scrolls the displayed avatar feature characteristics (e.g., 8102, 8106, 8110) and feature options (e.g., 8104, 8108, 8112) based on the direction of movement of input 8132. Avatar 805 remains displayed with the magnified appearance. In some embodiments, the magnified appearance allows a user to better view avatar 805 and, in some embodiments, apply various accessories to avatar 805 such as, for example, makeup, tattoos, scars, freckles, birthmarks, and other custom features or accessories for the avatar.

In FIG. 8BN, device 600 detects termination of input 8132 (e.g., lift-off of the touch-and-drag gesture) and displays avatar characteristics region 804 having hat characteristic 8106 with hat options 8108a-8108d, and glasses characteristic 8110 with glasses options 8112a-8112d. Avatar 805 remains displayed with the magnified appearance. Device 600 displays border 8134 around glasses option 8112a to indicate glasses option 8112a (no glasses) is currently selected. Device 600 displays glasses options 8112b-8112d having a lighting effect (e.g., light reflection 8136 on the lenses of the glasses).

In FIG. 8BO, device 600 detects input 8138 (e.g., touch gesture) on glasses option 8112b. As shown in FIG. 8BP, device 600 removes border 8134 from glasses option 8112a and displays it around glasses option 8112b, in response to detecting input 8138 on glasses option 8112b. In addition, device 600 modifies avatar 805 and hat options 8108 (shown in FIG. 8BV) to include avatar glasses 8140 corresponding to the glasses style displayed in selected glasses option 8112b. Device 600 also modifies an appearance of avatar 805 based on the selected avatar feature option (e.g., glasses 8140).

For example, as shown in FIGS. 8BO and 8BP, device 600 adjusts (e.g., modifies) the position of a portion 8145 of avatar hair 851, in response to detecting selection of avatar glasses option 8112b, and displays avatar glasses 8140 positioned on the face of avatar 805. Modified portion 8145 of avatar hair 851 is displayed pushed aside to accommodate frame 8140-1 of avatar glasses 8140. Additionally, device 600 produces a lighting effect on avatar 805 by displaying shadow 8147 adjacent modified portion 8145 of avatar hair 851 and displaying shadow 8142 under the avatar's eyes. Device 600 displays shadows 8142 and 8147 to illustrate the lighting effect caused by adding avatar glasses 8140 to avatar 805. The lighting effect can also be illustrated by displaying reflection 8150 (similar to light reflection 8136) on the lenses of avatar glasses 8140 (see FIG. 8BT). In some embodiments, the lighting effect is determined based on a position of avatar 805, glasses 8140, and hair 851 with respect to a light source (e.g., a light source detected in the field of view of camera 602 or a simulated light source).

In response to detecting input 8138, device 600 also expands glasses characteristic 8110 to display color options for both the frame 8140-1 and lenses 8140-2 (e.g., see FIG. 8BT) of selected glasses 8140. Frame color options 894 include various color options (including expandable color picker option 894-2) that can be selected to change the color of glasses frame 8140-1. Lenses color options 896 include various color options that can be selected to change aspects of the lenses 8140-2 of glasses 8140. In some embodiments, frame color options 894 include an expandable color picker option (e.g., 894-2). In some embodiments, lenses color options 896 do not include an expandable color picker option.

In FIG. 8BQ, device 600 detects input 895 on frame color option 894-1, and displays frame color slider 897 in FIG. 8BR. Frame color slider 897 is similar to other color sliders discussed herein and can be used to adjust a color (or other aspects) of glasses frame 8140-1 in accordance with the various color slider embodiments discussed herein. In some embodiments, selecting a frame color option 894 also changes the color of frame 8140-1 of glasses 8140. In FIG. 8BQ, however, color option 894-1 corresponds to a current color of frame 8140-1 that has been previously selected and modified (e.g., using frame color slider 897). Thus, when device 600 displays frame color slider 897, the color slider is displayed having the previously modified settings (e.g., selector affordance 897-1 is positioned to the far left end of track 897-2, and color option 894-1 matches the color setting for slider 897), as shown in FIG. 8BQ.

In FIG. 8BS, device 600 detects input 898 on lenses color option 896-1, and displays lenses color slider 899 (in addition to frame color slider 897), as shown in FIG. 8BT. Device 600 also zooms out and rotates the displayed view of avatar 805 so that glasses lenses 8140-2 are shown. Avatar's eyes are slightly visible through lenses 8140-2 and reflections 8150 are shown on the lenses 8140-2. In some embodiments, when a first slider (e.g., slider 897) is displayed, and device 600 detects a selection of a color option (e.g., 896-1) associated with a different feature than the first slider, device hides the first slider and displays a second slider (e.g., slider 899) for the selected color option for the different feature.

Lenses color slider 899 is similar to other sliders discussed herein and can be used to adjust a color (or other aspects) of glasses lenses 8140-2 in accordance with the various slider embodiments discussed herein. In the embodiment illustrated in FIG. 8BT, lenses color slider 899 controls an opacity of lenses 8140-2 (although it could be used to control or adjust a color or other color properties discussed herein). In response to detecting movement of selector affordance 899-1 along track 899-2, device 600 modifies an opacity of lenses 8140-2. For example, as selector affordance 899-1 is moved towards end 899-3, device 600 increases the opacity of lenses 8140-2. As selector affordance 899-1 is moved towards end 899-4, device 600 decreases the opacity of lenses 8140-2. As shown in FIG. 8BT, lenses 8140-2 have an opacity corresponding to the middle position of selector affordance 899-1 in track 899-2. When selector affordance 899-1 is moved to end 899-4, lenses 8140-2 have little or no opacity, as shown in FIG. 8BU.

In some embodiments, both frame color slider 897 and lenses color slider 899 adjust their respective avatar features in a same manner. For example, frame color slider 897 modifies color option 894-1 from a cooler tone to a warmer tone when selector affordance 897-1 moves to the left, and lenses color slider 899 modifies color option 896-1 from a cooler tone to a warmer tone when selector affordance 899-1 moves to the left. As another example, frame color slider 897 modifies color option 894-1 by increasing a first color value (e.g., red) when selector affordance 897-1 moves to the left and increasing a second color value (e.g., green) when selector affordance 897-1 moves to the right, and lenses color slider 899 modifies color option 896-1 by increasing the first color value when selector affordance 899-1 moves to the left and increasing the second color value when selector affordance 899-1 moves to the right.

In FIG. 8BU, device 600 detects vertical scrolling gesture 8157, and vertically scrolls avatar characteristics region 804 to display hats characteristic 8106 including hat options 8108, which are updated with glasses in accordance with the selections discussed above.

In FIG. 8BV, device 600 detects horizontal scrolling gesture 8158, and horizontally scrolls hat options 8108 to reveal headband hat option 8108d and cap option 8108e in FIG. 8BW.

In FIG. 8BX, device 600 detects input 8159 on headband hat option 8108*d*, and displays avatar 805 updated in FIG. 8BY to include headband 8160 corresponding to selected headband hat option 8108*d*. Headband 8160 compresses avatar hair 851 to the avatar head, and reshapes the hair to conform to a hatline 8118 of the headband. This gives the appearance that the avatar's hair 851 is both compressed by the headband (e.g., tucked under the headband) and protruding (e.g., puffing out) over the top of headband 8160 (e.g., over an upper hatline 8118-1 of the headband) and underneath it (e.g., under a lower hatline 8118-2 of the headband).

Avatar 805 is also displayed moving in response to a detected pose of a user's face (e.g., detected in camera 602). As a user moves their head, device 600 modifies avatar 805 in real time to mirror the user's movements. As the avatar 805 moves, earrings 8125 and avatar hair 851 sway in response to movement of the avatar head. In some embodiments, as device 600 modifies avatar 805 to mirror the real-time movements of the user, device 600 also modifies the lighting effects on avatar 805, including moving displayed locations of reflections 8150 and shadows 8142 based on a relative position of a modeled light source and avatar 805 (and selected avatar features such as avatar glasses 8140).

For example, in FIG. 8BX, device 600 displays avatar 805 in its default position (e.g., not magnified or rotated), and having avatar glasses 8140, with reflections 8150 on the lenses of avatar glasses 8140 and shadows 8142 positioned on the avatar's face beneath the avatar glasses. As device 600 modifies avatar 805 in response to movement of the user's face in FIG. 8BY, reflections 8150 move to different locations in the lenses and shadows (e.g., 8142) move on the face or disappear (in some embodiments, movement of hair 851 results in new shadows appearing dynamically on the avatar's face).

In some embodiments, device 600 modifies the physical movement of avatar features (e.g., such as avatar hair 851) based on the features applied to the avatar. For example, as shown in FIG. 8BY, headband 8160 is positioned on avatar 805 compressing hair 851 at lower hatline 8118-2. As avatar 805 moves, hair 851 swings out from lower hatline 8118-2 because headband 8160 compresses hair 851 at the lower hatline, restricting its movement. If the avatar was not wearing headband 8160, the avatar hair would swing out from the avatar's head at a higher position on the avatar head because there would be no headband to compress the avatar hair 851 to the avatar head at a lower position (e.g., at lower hatline 8118-2).

In some embodiments, if the user's face is not detected in the field of view of the camera (e.g., 602) for a threshold amount of time, device 600 stops modifying the avatar and displays a prompt indicating that face tracking is stopped and instructing the user to resume face tracking. For example, FIG. 6BZ shows avatar 805 in a neutral position in the center of avatar display region 803, with brackets 8162 displayed around the avatar and text 8164 instructing the user to resume face tracking. In some embodiments, device 600 resumes tracking the user's face (and modifying avatar 805) in response to detecting various inputs such as a user lifting device 600 (e.g., detected with gyroscope 536, motion sensor 538, accelerometer 534, etc.) or an input on display 601. In FIG. 8BZ, device 600 detects touch input 8166 on the avatar display region 803, and resumes face tracking as shown in FIG. 8CA.

In some embodiments, device 600 modifies some avatar features in response to changing other avatar features. For example, FIGS. 8CA and 8CB demonstrate how device 600 modifies hat options 8108 when different hairstyles or hair textures are selected for avatar 805. FIG. 8CA shows avatar 805 and hat options 8108 when avatar 805 has short, wavy hair 851-1 (e.g., a short hairstyle and wavy hair texture are selected in accordance with the embodiments discussed herein). FIG. 8CB shows avatar 805 and hat options 8108 when avatar 805 has long, curly hair 851-2 (e.g., a long hairstyle and curly hair texture are selected in accordance with the embodiments discussed herein). Avatar hair 851-2 has greater volume than avatar hair 851-1. When device 600 modifies avatar 805 from short, wavy hair 851-1 to long, curly hair 851-2, device 600 updates the sizes of headband 8160 and hat options 8108 based on the changing hair volume, but maintains a common hatline 8118 for all of the hat options 8108.

For example, in FIG. 8CA, hair 851-1 is a smaller, less voluminous hair feature, so device 600 displays headband 8160 having a smaller size (e.g., headband 8160 and hatline 8118 have a smaller circumference) that conforms to the avatar head. When avatar 805 is updated with avatar hair 851-2, device 600 increases the size of headband 8160 to accommodate the increased volume of hair 851-2 (e.g., headband 8160 and hatline 8118 have a greater circumference), as shown in FIG. 8CB. Additionally, because avatar hair 851-2 is a longer hairstyle, device 600 modifies the hair to stick out farther from hatline 8118 (compared to hair 851-1 shown in FIG. 8CA) when a hat is shown on avatar 805.

In addition, device 600 updates the displayed feature options based on the changed hair. For example, hat options 8108 shown in FIG. 8CA have a smaller size than the hat options 8108 shown in FIG. 8CB. Thus, device 600 increases the sizes of the hat options when the larger hair 851-2 is applied to avatar 805. Similarly, a hat that is applied to avatar 805 is larger when avatar has hair 851-2, than when avatar 805 has hair 851-1 (e.g., as shown in FIGS. 8CC and 8CD). In some embodiments, although the sizes of hat options 8108 change, all hat options 8108 have a common hatline 8118, and all hat options 8108 affect the shape of avatar hair 851 based on the respective hat being positioned on the avatar head as discussed above.

In some embodiments, when different avatar options are selected, the new selected avatar option is modified based on avatar features already present on the avatar. For example, in FIG. 8CA, avatar hair 851-1 is modified to accommodate avatar glasses 8140 as discussed above with respect to FIG. 8BP. When new avatar hair 851-2 is applied to avatar 805 in FIG. 8CB, the new avatar hair 851-2 is modified similar to avatar hair 851-1 to accommodate avatar glasses 8140. As another example, when an avatar hat option 8108 is selected, the size of the selected hat option is determined based on the current state of avatar hair 851 (e.g., hat options 8108 are displayed smaller when avatar 805 has avatar hair 851-1, and larger when avatar 805 has hair 851-2).

In FIG. 8CB, device 600 detects input 8168 on cap option 8108*e*. In FIG. 8CC, device 600 modifies avatar 805 to include cap 8170 corresponding to cap option 8108*e*. Cap 8170 has a same hatline 8118 as other hat options (e.g., matching hatline 8118-2 for headband 8160), with avatar hair 851-2 sticking out from hatline 8118 of cap 8170. Device 600 also displays large shadow 8172 under the bill of cap 8170.

In FIG. 8CD, device 600 returns to avatar hair 851-1. Because avatar hair 851-1 is less voluminous than avatar hair 851-2, device 600 reduces the size of cap 8170 and the other displayed hat options 8108. Because hair 851-1 is a shorter hairstyle, device 600 also modifies the avatar hair 851 to stick out less from hatline 8118 than hair 851-2 in FIG. 8CC.

In FIG. 8CE, device 600 detects movement of the user's head and modifies avatar 805 accordingly (e.g., turning the head and cap 8170 sideways to match the pose of the subject's head). When avatar 805 turns to the side, large shadow 8172 moves across the avatar's face in response to movement of the bill of cap 8170 relative to the modeled light source, and reflections 8150 move to the other side of the lenses 8140-2.

Device 600 also detects input 8152 (e.g., touch gesture) on done affordance 8154. In response, device 600 closes the avatar editing user interface and displays avatar 805 in avatar selection region 8156 of an application (e.g., a messaging application such as that discussed above with respect to FIGS. 6A-6AN), as shown in FIG. 8CF. Avatar 805 can be selected for use in the application (e.g., to send to John).

Figure 9:
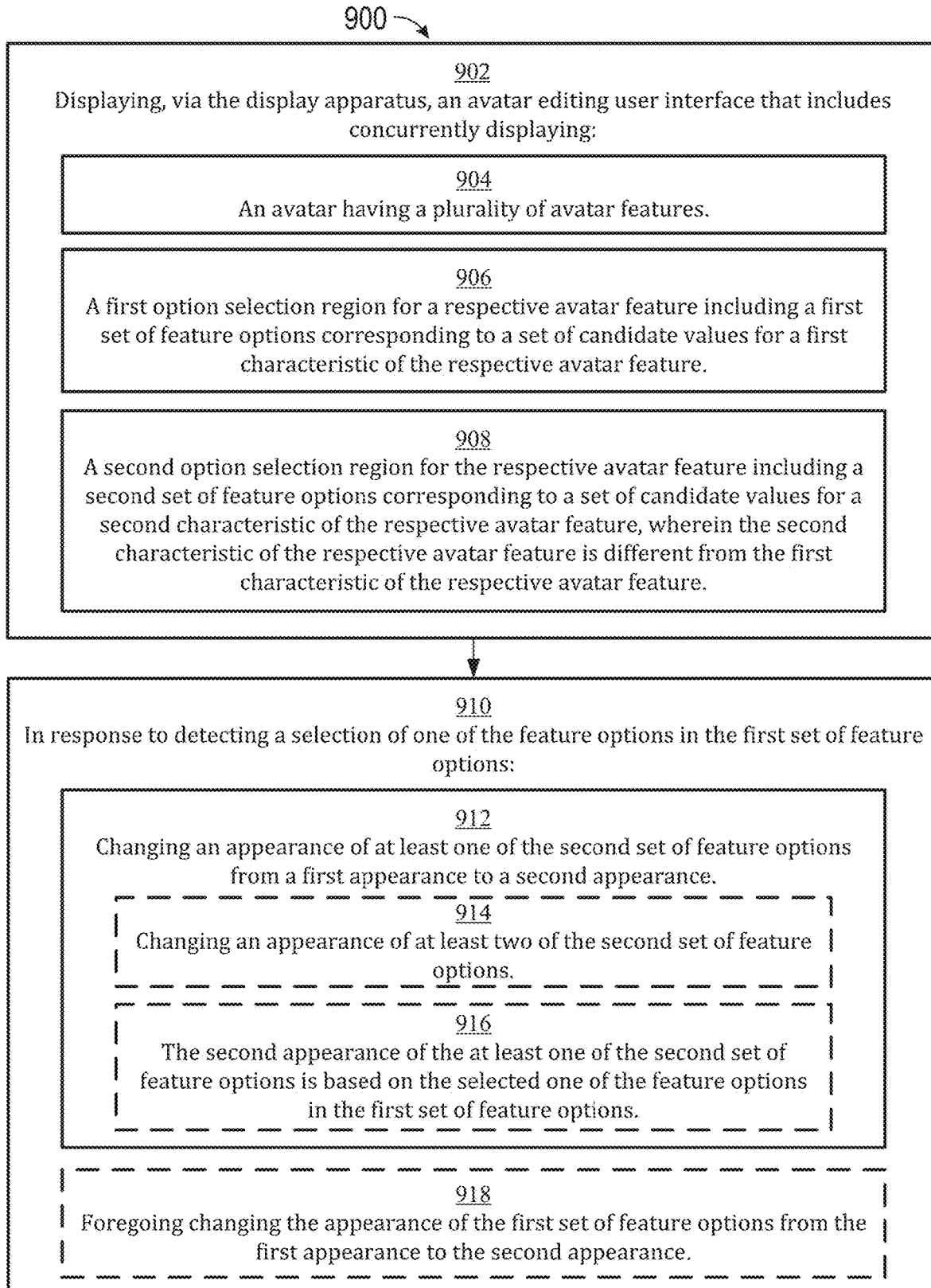
FIG. 9 is a flow diagram illustrating a method for displaying an avatar editing user interface.

FIG. 9 is a flow diagram illustrating a method for displaying an avatar editing user interface, in accordance with some embodiments. Method 900 is performed at a device (e.g., 100, 300, 500, 600) with a display apparatus. Some operations in method 900 are, optionally, combined, the orders of some operations are, optionally, changed, and some operations are, optionally, omitted.

As described below, method 900 provides an intuitive way for displaying an avatar editing user interface. The method reduces the cognitive burden on a user for managing avatars, thereby creating a more efficient human-machine interface. For battery-operated computing devices, enabling a user to modify characteristics of an avatar using an avatar editing user interface faster and more efficiently conserves power and increases the time between battery charges.

The electronic device displays (902), via the display apparatus, an avatar editing user interface (e.g., 801) that includes concurrently displaying: an avatar (904) (e.g., 805) having a plurality of avatar features (e.g., avatar hair, facial features (avatar lips, eyes, nose, etc.), accessories (e.g., earrings, sunglasses, hats)), a first option selection region (904) (e.g., 808) for a respective avatar feature, and a second option selection region (906) (e.g., 810) for the respective avatar feature.

The first option selection region (e.g., 808) for a respective avatar feature (e.g., a visually distinguished region that includes options selectable for modifying an avatar feature) includes (904) a first set of feature options (e.g., displayed representations of available modifications of a corresponding avatar feature) corresponding to a set of candidate values for a first characteristic (e.g., face shape, lip size, hair color, etc.) of the respective (e.g., currently selected) avatar feature. In some examples, the option selection regions (e.g., 808, 810) are configured to scroll vertically. In some examples, the feature options include graphical depictions of different feature options that may be selected to customize aspects of a particular avatar feature. In some examples, the feature options (e.g., 809) are configured to scroll horizontally. In some examples, the option selection regions (e.g., 808, 810) are configured to scroll along an axis that is different from the axis along which the feature options (e.g., 809) are configured to scroll, such as axes that are perpendicular to each other.

The second option selection region (e.g., 810) for the respective avatar feature includes (906) a second set of feature options corresponding to a set of candidate values for a second characteristic of the respective (e.g., currently selected) avatar feature. The second characteristic of the respective avatar feature is different from the first characteristic of the respective avatar feature.

In response (910) to detecting a selection (e.g., 850) of one of the feature options (e.g., 834*b*) in the first set of feature options (e.g., a user selection of a "wavy hair" feature option from the "hair texture" characteristic of a "hair" avatar feature), the electronic device changes (912) an appearance of at least one of the second set of feature options (e.g., 810) from a first appearance (e.g., 836*b*) to a second appearance (e.g., 836*b*') (e.g., of the second set of feature options). In some examples, a displayed feature option showing an avatar hairstyle transitions from a first appearance of the avatar's hair (e.g., a state in which the avatar's hair has a straight texture) to the second appearance in which the avatar's hair has a wavy texture.

Changing an appearance of at least one of the second set of feature options from a first appearance to a second appearance in response to detecting a selection of one of the feature options in the first set of feature options provides the user with feedback about the current state of the avatar and the available avatar feature options and provides visual feedback to the user confirming the selection of the one of the feature options in the first set of feature options. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, changing an appearance of at least one of the second set of feature options (e.g., 836) from the first appearance (e.g., 836*b*) to the second appearance (e.g., 836*b*') includes changing (914) an appearance at least two of the second set of feature options (e.g., from an appearance that corresponds to the first option from the first set of feature options to an appearance that corresponds to the second option from the second set of feature options).

In accordance with some embodiments, in response (910) to detecting the selection of the one of the feature options in the first set of feature options, foregoing (918) changing the appearance of the first set of feature options from the first appearance (e.g., 834) to the second appearance (e.g., 836*b*'). Foregoing changing the appearance of the first set of feature options from the first appearance (e.g., 834) to the second appearance (e.g., 836*b*') in response to detecting the selection of the one of the feature options in the first set of feature options provides the user with visual feedback indicating that the first set of feature options are not affected or updated in response to detecting the selection of the one of the first set of feature options. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the second appearance of the at least one of the second set of feature options (e.g., 836*b*) is based on the selected one of the feature options (e.g., 834*b*) in the first set of feature options (e.g., the device determines a first characteristic value corresponding to the selected one of the feature options in the first set of feature options and updates the at least one of the second set of feature options based on the first characteristic value).

In accordance with some embodiments, displaying at least one of the second set of feature options (e.g., 836*b*) changing from the first appearance to the second appearance includes a determination that the at least one of the second set of feature options includes at least a portion of an avatar feature corresponding to the selected one of the first set of feature options (e.g., when a hair texture option is selected, a plurality of hairstyle options change to show the selected hair texture if those hairstyle options include a representation of hair (e.g., as shown in FIGS. 8R to 8S). In some embodiments, feature options do not change if those feature options do not include a portion of a feature that is changed by the selected feature option. For example, when a hair texture option is selected, a "bald" hairstyle option does not change in appearance because the "bald" hairstyle option does not include a representation of avatar hair.

In accordance with some embodiments, in response to detecting the selection of the one of the feature options (e.g., 834*b*) in the first set of feature options, in accordance with a determination that a second one (e.g., 836*a*) of the second set of feature options does not include at least a second portion of an avatar feature corresponding to the selected one of the first set of feature options, the electronic device maintains the appearance of the second one of the second set of feature options. (e.g., when a hair color option is selected, a plurality of hairstyle options change if those hairstyle options include a representation of hair, but a "bald" hairstyle option does not change in appearance because the "bald" hairstyle does not include a representation of hair, as shown in FIGS. 8V to 8AC).

Maintaining the appearance of the second one of the second set of feature options in accordance with a determination that the second one of the second set of feature options does not include at least the second portion of the avatar feature corresponding to the selected one of the first set of feature options provides the user with visual feedback indicating that the second one of the second set of feature options is not affected or updated in response to detecting selection of the one of the first set of feature options. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, changing the appearance of the at least one of the second set of feature options (e.g., 836*b*) from the first appearance to the second appearance includes displaying an animation of the at least one of the second set of feature options changing from the first appearance to the second appearance (e.g., as shown in FIGS. 8R to 8AU). In some embodiments, an animation of the feature options changing appearance includes enlarging a changing feature option, showing the feature option changing (e.g., changing the texture or color of the hair shown in the feature option), and then shrinking the changed feature option to its original size. In some embodiments, this animated effect is performed in sequence for changing avatar features (e.g., a first feature option changes before a second feature option in the second set of feature options) in an order of the changing feature options (e.g., top-to-bottom and left-to-right) to give an animated ripple effect to the changing of feature options.

Displaying an animation of the at least one of the second set of feature options changing from the first appearance to the second appearance provides the user with feedback about the current state of the at least one of the second set of feature options and provides visual feedback to the user confirming the selection of one of the feature options in the first set of feature options. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the selected one of the feature options in the first set of feature options is a selected hair color (e.g., 832*a*, red) in a first set of hair color options (e.g., 832) and the at least one of the second set of feature options includes one or more of a hair length option (e.g., long, medium, short), a hair type option (e.g., 834, curly, straight, wavy, etc.), and a hairstyle option (e.g., 836). In accordance with some embodiments, changing the appearance of at least one of the second set of feature options from the first appearance to the second appearance includes changing one or more of the hair length option, the hair type option, and the hairstyle option from a first hair color to the selected hair color (e.g., as shown in FIGS. 8P to 8AV). Changing one or more of the hair length option, the hair type option, and the hairstyle option from a first hair color to the selected hair color provides the user with feedback about the current state of the avatar and the hair length option, the hair type option, and the hairstyle option and provides visual feedback to the user confirming the selection of the hair color option. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the selected one of the feature options (e.g., 834*b*) in the first set of feature options (e.g., 834) is a selected hair type (e.g., curly, straight, wavy) in a first set of hair type options, and the at least one of the second set of feature options includes one or more of a hair length option (e.g., long, medium, short, etc.) and a hairstyle option (e.g., 836*b*). In accordance with some embodiments, changing the appearance of at least one of the second set of feature options from the first appearance to the second appearance includes changing one or more of the hair length option and the hairstyle option from a first hair type to the selected hair type. Changing one or more of the hair length option and the hairstyle option from a first hair type to the selected hair type provides the user with feedback about the current state of the avatar and the hair length option and the hairstyle option and provides visual feedback to the user confirming the selection of the hair type option. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the second set of feature options includes a plurality of feature options arranged in an order in which a first feature option (e.g., 836a) is before a second feature option (e.g., 836b) in the order and the second feature option is before a third feature option (e.g., 836c) in the order. In accordance with some embodiments, changing the appearance of at least one of the second set of feature options from a first appearance to a second appearance includes: displaying a first animated transition of the first feature option of the second set of feature options from the first appearance to the second appearance; after displaying at least a portion of the first animated transition of the first feature option to the second appearance, starting a second animated transition of the second feature option of the second set of feature options from the first appearance to the second appearance; and after displaying at least a portion of the second animated transition of the second feature option to the second appearance, starting a third animated transition of the third feature option of the second set of feature options from the first appearance to the second appearance. In some embodiments, the first animated transition overlaps with the second animated transition and the second animated transition overlaps with the third animated transition. In some embodiments, the first feature option is adjacent to the second feature option which is adjacent to both the first feature option and the third feature option.

Displaying the first animated transition, then starting a second animated transition after displaying at least a portion of the first animated transition, then starting the third animated transition after displaying at least a portion of the second animated transition provides the user with feedback about the current state of the changed appearance of the first, second, and third feature options in the second set of feature options and provides visual feedback to the user indicating an order in which the first, second, and third feature options are transitioned. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, changing the appearance of at least one of the second set of feature options from the first appearance to the second appearance comprises: enlarging a size of a first one of the second set of feature options (e.g., 836b') and then reducing (e.g., to its original size) the size of the first one of the second set of feature options (e.g., 836b); and enlarging a size of a second one of the second set of feature options (e.g., 836c') and then reducing (e.g., to its original size) the size of the second one of the second set of feature options (e.g., 836c). In some embodiments, the second one of the feature options is enlarged before the first one of the feature options is reduced to its original size (e.g., the changing of the first and second feature options overlaps). Enlarging the sizes of the first and second ones of the second set of feature options provides the user with feedback about the current state of the changed appearance of the first and second ones of the second set of feature options and provides visual feedback to the user indicating the first and second ones of the second set of feature options are changing. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Reducing the sizes of the first and second ones of the second set of feature options provides the user with feedback about the current state of the changed appearance of the first and second ones of the second set of feature options and provides visual feedback to the user indicating when the change is complete. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device detects a change in a face in a field of view of one or more cameras (e.g., 602) of the electronic device. The electronic device changes an appearance of the avatar (e.g., 805) based on the detected change in the face (e.g. in addition to changing the appearance of the second set of feature options) (e.g., as shown in FIGS. 8BD to 8BE). Changing the appearance of the avatar based on the detected change in the face provides the user with options for controlling modifications to a virtual avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, after the electronic device (e.g., 600) detects the change in the face (e.g., 673), the electronic device determines that the face has not been detected in the field of view of the one or more cameras (e.g., 602) for a predetermined amount of time (e.g., ten seconds). In response to determining that the face has not been detected in the field of view of the one or more cameras for the predetermined amount of time, the electronic device ceases changing the appearance of the avatar (e.g., 805) based on the detected change in the face (e.g., transitioning the avatar to a non-interactive (static) state in which the avatar does not change in response to detecting changes in the face even if the face returns to the field of view of the one or more cameras after tracking has stopped). After ceasing changing the appearance of the avatar, the electronic device detects an input (e.g., 8166) (e.g., an input directed to the user interface such as a gesture on the user interface (e.g., a tap gesture on a "tap to resume tracking face" affordance), detection of device lift, etc.). When the user's face has not been detected in the field of view, the electronic device does not update the appearance of the avatar based on the detected change. Since the detected changes are not visible to the user, battery power and processing resources of the electronic device are preserved by not the changes. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting the input (e.g., 8166), the electronic device (e.g., 600) resumes changing the appearance of the avatar (e.g., 805) based on the detected change in the face (e.g., 673) (e.g., transitioning the avatar to an interactive state (e.g., 805 in FIG. 8CA) in which the avatar changes in response to detecting changes in the face). In some embodiments, transitioning the avatar to the non-interactive state (e.g., 805 in FIG. 8BZ) includes displaying an animation of the avatar transitioning from an appearance determined based on the detected face (e.g., 805 in FIG. 8BY) to a predetermined appearance (e.g., 805 in FIG. 8BZ). In some embodiments, transitioning the avatar to the interactive state includes displaying an animation of the avatar transitioning from a predetermined appearance to an appearance determined based on the detected face (e.g., 673). Detecting a movement of the device being raised indicates that changes in the detected face should be reflected in the appearance of the avatar. The appearance of the avatar provides feedback to the user indicating the types of characteristics of the avatar that can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to determining that the face (e.g., 673) has not been detected in the field of view of the one or more cameras (e.g., 602) for the predetermined amount of time, the electronic device (e.g., 600) displays an indication (e.g., 8164) (e.g., a message) that the face is not being detected in the field of view of the one or more cameras. In some embodiments, the indication is a message that informs the user of an action that can be taken to resume face tracking (e.g., "show your face," "tap to resume," etc.). In some embodiments, the indication is an animation indicating that the avatar (e.g., 805) is no longer being changed in response to detected changes in the user's face (e.g., an animation of the avatar transitioning to a static state). When the face is not detected in the field of view, the user is notified by a displayed indication that the face is not detected. This provides feedback to the user so that the user may take action to resume face tracking and informs the user of an action that can be taken to resume the face tracking (otherwise, the user may not be aware that the device has stopped face tracking or understand how to resume the tracking). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Stopping face tracking when the user is not detected also saves power and reduces wear and tear on the device (including the face tracking sensors). The notification informs the user how to resume tracking that was stopped to save power and reduce wear and tear on the device (including the face tracking sensors).

In some embodiments, the input is detecting (e.g., via an accelerometer and/or gyroscope of the electronic device) the device (e.g., 600) being raised (e.g., a user is picking up the device and, optionally, the user's face (e.g., 673) is detected in the field of view of the one or more cameras (e.g., 602)). In some embodiments, the input is a gesture (e.g., 8166) (e.g., a tap or swipe gesture) directed to the avatar editing user interface (e.g., 801). In some embodiments the gesture is an input anywhere on the user interface, including, for example, selection of an option, navigation to a new section of the user interface, selection of an affordance (e.g., a "begin tracking facial movements" affordance).

In accordance with some embodiments, the electronic device changes an appearance of the avatar based on an input (e.g., a gesture on the avatar to rotate or adjust a magnification of the avatar, or a detected change in a face in a field of view of a camera) (e.g., as shown in 8BG to 8BI). Changing the appearance of the avatar based on the input includes moving one or more of the plurality of avatar features (e.g., 8125) in accordance with one or more physics models (e.g., a model of inertia, a model of gravity, a force transfer model, a friction model). In some embodiments, the physics model specifies a magnitude and direction of movement of an avatar feature based on a magnitude and direction of the input (e.g., a gesture on the avatar to rotate or adjust a magnification of the avatar, or movement of the face or a portion of the face) and one or more predefined properties of the virtual avatar feature such as a simulated mass, simulated elasticity, simulated coefficient of friction or other simulated physical property.

Moving one or more of the avatar features based on a physics model for the virtual avatar enables the user to create a realistic and interactive virtual avatar that can communicate a wider range of non-verbal information. This enhances the operability of the device and makes the user-device interface more efficient (e.g., by helping the user to communicate an intended message using more realistic movements of the virtual avatar) which, additionally, reduces power usage and improves battery life of the device by enabling the user to use the device more quickly and efficiently.

In accordance with some embodiments, the electronic device detects a gesture (e.g., a pinch/de-pinch gesture, a swipe gesture) on the avatar (e.g., 805). In response to detecting the gesture on the avatar: in accordance with a determination that the gesture corresponds to a gesture of a first type (e.g., a pinch/de-pinch gesture), the electronic device adjusts a zoom level of the avatar based on the gesture (e.g., zoom-in on the displayed avatar if the gesture is a de-pinch gesture, and zoom-out from the displayed avatar if the gesture is a pinch gesture); and in accordance with a determination that the gesture corresponds to a gesture of a second type (e.g., a swipe gesture), the electronic device adjusts an orientation of the avatar based on the gesture (e.g., rotate the avatar in a direction corresponding to a direction of the swipe gesture) (e.g., as shown in FIGS. 8BG to 8BK). In response to detecting a selection of one of the feature options in the first set of feature options, the electronic device updates the avatar based on the selected feature option. In some embodiments, the zoom and rotate features are available when adding accessories to the avatar. For example, when the respective avatar feature corresponds to an avatar accessories feature, the first and/or second option selection regions include feature options corresponding to cosmetic enhancements (e.g., scars, birthmarks, freckles, tattoos, and paint schemes (e.g., corresponding to sports teams, makeup, etc.)). The zoom and rotate operations display the avatar at different zoom levels and angles so that the user can accurately place the selected feature options (e.g., cosmetic enhancements) on the avatar.

Adjusting the zoom level of the avatar based on the gesture provides the user with options for controlling modifications to the display of the avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Adjusting the orientation of the avatar based on the gesture provides the user with options for controlling modifications to the display of the avatar without requiring displayed user interface control (e.g., touch control) elements. Providing additional control options without cluttering the user interface with additional controls enhances the operability of the device making the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, a respective feature option (e.g., a feature option of the first or second sets of feature options) includes a representation of the respective (e.g., currently selected) avatar feature. The representation of the respective avatar feature is displayed having an enlarged view (e.g., zoomed-in) in comparison to the respective avatar feature of the displayed avatar. In some embodiments, the feature option corresponds to the avatar nose and includes a zoomed-in view of the avatar's nose and surrounding facial region, when compared to the avatar nose and surrounding facial region of the displayed avatar. In some embodiments, the second set of feature options includes one or more enlarged views of avatar features.

In accordance with some embodiments, a second respective feature option (e.g., 8116) includes a representation of the respective avatar feature and excludes (e.g., does not display) at least a portion of a different avatar feature (e.g., an avatar feature that, when displayed, obscures at least a portion of the respective avatar feature being modified using the respective feature options) (e.g., as shown in FIG. 8BB). In some embodiments, the feature option corresponds to avatar ears, and the representation of the avatar ears displayed in the feature option includes the avatar ears, but omits other avatar features, such as avatar hair that would, if displayed, obscure at least a portion of the avatar ears displayed in the feature option.

In accordance with some embodiments, displaying the avatar editing user interface further includes displaying an avatar feature subregion (e.g., a scrollable, textual listing of avatar feature options) (e.g., 807) including a plurality of affordances (e.g., 809) corresponding to avatar features (e.g., face, hair, eyes, accessories, etc.). The plurality of affordances include a first selected affordance (e.g., 809a, 809b, 809c, 809d) corresponding to the respective (e.g., a currently selected) avatar feature (e.g., the "hair" affordance 809b is highlighted to show the hair avatar feature is currently selected).

In accordance with some embodiments, in response to detecting the selection of the one of the feature options (e.g., 814b) in the first set of feature options (e.g., 814), the electronic device displays an animation of a visual effect (e.g., highlighting hair affordance 809b in FIG. 8F) associated with a second one of the plurality of affordances corresponding to avatar features. In some embodiments, after a first selection of a feature option, an animation is displayed on an affordance corresponding to a different avatar feature than the currently selected avatar feature, prompting a user to select the affordance to display an avatar editing user interface for the different avatar feature.

In accordance with some embodiments, in response to detecting selection of a second affordance (e.g., an "accessories" affordance 809D), the second affordance corresponding to a second avatar feature (e.g., avatar accessories), the electronic device: updates the first option selection region to display an updated first set of feature options (e.g., displayed earrings options) corresponding to a set of candidate values (e.g., different earring options such as hoop earrings, stud earrings, or no earrings) for a first characteristic (e.g., an earring characteristic) of the second avatar feature, and updates the second option selection region to display an updated second set of feature options (e.g., displayed hat options) corresponding to a set of candidate values (e.g., no hat, cowboy hat, headband, etc.) for a second characteristic (e.g., a hat characteristic) of the second avatar feature (e.g., as shown in FIGS. 8BA to 8BB).

Updating the first and second option selection regions in response to detecting selection of the second affordance corresponding to the second avatar feature provides the user with feedback confirming selection of the second avatar feature and provides visual feedback to the user indicating the avatar feature options available for the second avatar feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the avatar feature subregion (e.g., 807) is displayed in a first region (e.g., 803) of the avatar editing user interface. The first option selection region (e.g., 808) and the second option selection region (e.g., 810) are displayed in a second region (e.g., 804) of the avatar editing user interface, the second region displayed positioned below the first region.

In accordance with some embodiments, the first set of feature options includes a plurality of color affordances corresponding to colors, the plurality of color affordances including a first selected color affordance corresponding to a color of the respective (e.g., currently selected) avatar feature (e.g., as shown in FIG. 8W).

In accordance with some embodiments, in response to detecting a selection of one of the plurality of color affordances (e.g., 832), the electronic device displays a color picker user interface (e.g., 888, 892, 856, 822) (e.g., a user interface displaying colors that can be selected to modify the color of the selected color affordance) having a selected color corresponding to the selected color affordance and a plurality of other color options that are not included in the plurality of color affordances. In some embodiments, the color picker UI is displayed having a selected color that corresponds to the selected color affordance. The user can then adjust the color picker UI to refine the selected color or choose an entirely different color altogether. In some embodiments, displaying the color picker user interface includes replacing at least one of the first option selection region or the second option selection region with the color picker user interface. In some embodiments, the color picker UI replaces the first and second option selection regions with an animation showing the color picker UI sliding onto the screen (and over the first and second option selection regions) from a particular direction (e.g., bottom of screen, left side of screen, right side of screen, etc.). In some embodiments, the color picker UI is a pop-up screen that is displayed over the first and second option selection regions.

In some embodiments, in accordance with a determination that the plurality of color affordances (e.g., 812) correspond to colors for an avatar skin tone feature, the plurality of color affordances includes an expanded set of color affordances (e.g., shown in FIG. 8A) corresponding to colors for the avatar skin tone feature (e.g., an expanded color palette for selected an avatar skin tone). In some embodiments, the expanded color palette excludes an option (e.g., similar to 832) for expanding or reducing the size of the color palette when the colors correspond to an avatar skin tone feature. In some embodiments, the plurality of color affordances are not scrollable in a horizontal direction when displayed in an expanded state.

In accordance with some embodiments, the plurality of color affordances correspond to colors for an avatar feature of a first type (e.g., 828) (e.g., an avatar feature other than an avatar skin tone feature). In some embodiments, the electronic device (e.g., 600) displays a first portion (e.g., 882) of the plurality of color affordances. In some embodiments, the electronic device detects a gesture (e.g., a swipe gesture) on the plurality of color affordances (e.g., a swipe gesture on the color affordances). In response to detecting the gesture, the electronic device ceases to display the first portion of color affordances and displays a second portion of color affordances (e.g., scrolling the plurality of color affordances to reveal additional color affordances). In some embodiments, the second portion of color affordances including an affordance (e.g., 886) corresponding to an expanded set (e.g., 888) of color affordances different from the first portion of color affordances and the second portion of color affordances. Displaying an animation of the avatar transitioning from an interactive state to a non-interactive state provides visual feedback of the avatar's non-interactive appearance. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, at least one of the first characteristic or the second characteristic corresponds to a feature shape (e.g., face shape, nose shape, ear shape, etc.) of the respective avatar feature (e.g., avatar face).

In accordance with some embodiments, the respective avatar feature is an avatar face (e.g., FIG. 8B). The first characteristic and the second characteristic are selected from a group consisting of: head shape, skin color, nose size, nose shape, lip shape, lip color, ear size, facial hair style, and age.

In accordance with some embodiments, the respective avatar feature is avatar hair (e.g., FIG. 8O). The first characteristic and the second characteristic are selected from a group consisting of: hair color, hairstyle, length, hair type (e.g., curly, straight, wavy, etc.), hair part (e.g., the position of a part in the avatar's hair), hair worn up, hair worn down (e.g., the vertical position of the hair on the avatar's head), and hairline (e.g., receding, balding, widow's peak, mature, low, etc.).

In accordance with some embodiments, the respective avatar feature is avatar eyes. The first characteristic and the second characteristic are selected from a group consisting of: eye shape, eye color, eyelashes, and eyebrow shape.

In accordance with some embodiments, the respective avatar feature is accessories (e.g., FIG. 8BB). The first characteristic and the second characteristic are selected from a group consisting of: hats, glasses, earrings, and cosmetic enhancements (e.g., paint schemes (e.g., corresponding to sports teams, makeup, etc.), tattoos, freckles, birthmarks, scars).

In accordance with some embodiments, in response to detecting a vertical gesture (e.g., a vertical swipe gesture on the touch screen display at a location corresponding to the avatar editing user interface) on the avatar editing user interface, the electronic device scrolls the avatar editing user interface in a vertical direction corresponding to the vertical gesture. Scrolling the avatar editing user interface includes scrolling the first option selection region and second option selection region in the direction of the vertical gesture while maintaining a vertical position of a region including the displayed avatar (e.g., as shown in FIGS. 8AG to 8AH).

In accordance with some embodiments, in response to detecting a gesture (e.g., 830) (e.g., a horizontal swipe gesture on the touch screen display at a location corresponding to the avatar, or a touch gesture on an affordance corresponding to one of the avatar features) on an avatar feature subregion (e.g., 807) of the avatar editing user interface, the electronic device: displays the avatar feature subregion changing from a first appearance in which a first avatar feature (e.g., 809a) is selected to a second appearance in which a second avatar feature (e.g., 809b) is selected; ceases to display the first and second option selection regions (e.g., 808, 810); displays a third option selection region (e.g., 838) having a plurality of feature options (e.g., 832) arranged in an order in which a first feature option is before a second feature option in the order and the second feature option is before a third feature option in the order; displays a fourth option selection region (e.g., 840) having a plurality of feature options (e.g., 834) arranged in an order in which a first feature option is before a second feature option in the order and the second feature option is before a third feature option in the order. Displaying the third option selection region includes displaying a first animation that includes displaying the plurality of feature options of the third option selection region in order. Displaying the fourth option selection region includes: after displaying at least a portion of the first animation, starting a second animation that includes displaying the plurality of feature options of the fourth option selection region in order.

In accordance with some embodiments, the avatar is a first size (e.g., an enlarged size) or a second size (e.g., a reduced size). The electronic device detects a gesture (e.g., a tap gesture on a feature option or a vertical swipe gesture) on the avatar editing user interface (e.g., at a location corresponding to the first option selection region or the second option selection region), In accordance with a determination that the gesture corresponds to a selection (e.g., 869) of a feature option (e.g., 836f) in the first or second set of feature options, and the avatar is the second size (e.g., FIG. 8AN), the electronic device displays the avatar transitioning from the second size to the first size (e.g., FIG. 8AO) (e.g., if the avatar is a reduced size, and a feature option is selected, the avatar increases from the reduced size to an enlarged size as shown in FIGS. 8AN-8AO). In accordance with a determination that the gesture is a scroll gesture (e.g., a vertical swipe gesture on the first or second option selection region) and the avatar is the first size, the electronic device displays the avatar transitioning to the second size if the scroll gesture corresponds to a first scroll direction (e.g., a downward scrolling direction). In some embodiments, if the avatar is an enlarged size or an intermediate size, the avatar is condensed in response to detecting a scroll gesture in a downward scrolling direction. In some embodiments, if the avatar is the reduced size, the device does not further decrease the size of the avatar in response to a scroll gesture in the downward scrolling direction. In some embodiments, the device also scrolls the first and second option selection regions in response to a scroll gesture.). In accordance with a determination that the gesture is the scroll gesture and the avatar is the second size, the electronic device displays the avatar transitioning to the first size if the scroll gesture corresponds to a second scroll direction (e.g., an upward scrolling direction) opposite the first direction. In some embodiments, if the avatar is a reduced size or an intermediate size, the avatar is enlarged in response to detecting a scroll gesture in an upward scrolling direction. In some embodiments, if the avatar is the enlarged size, the device does not further increase the size of the avatar in response to a scroll gesture in the upward scrolling direction. In some embodiments, the device also scrolls the first and second option selection regions in response to a scroll gesture.

In accordance with some embodiments, in accordance with a determination that the gesture is the scroll gesture and the avatar is the first size, the electronic device foregoes displaying the avatar transitioning to the second size if the scroll gesture corresponds to the second scroll direction. In some embodiments, the avatar (e.g., 805) is condensed only when the scroll gesture is in a downward scrolling direction.

In accordance with some embodiments, prior to detecting the selection (e.g., 820) of the one of the feature options (e.g., 812), the avatar (e.g., 805) is displayed with a skin color that changes over time through a plurality of different color values (e.g., the avatar is displayed oscillating back and forth between two or more colors over time). In some embodiments, prior to detecting the selection of the one of the feature options, the avatar is displayed in a non-interactive state (e.g., 805 in FIG. 8A) (e.g., a static state in which the avatar has a predetermined appearance that does not change in response to detected changes in a user's face (e.g., 673)). In some embodiments, in response to detecting an input (e.g., 820) on the avatar editing user interface (e.g., 801) (e.g., selection of an avatar skin color option (e.g., 812a) from a plurality of user-selectable skin color options (e.g., 812)), the electronic device (e.g., 600) displays the avatar without the oscillating color effect (e.g., displaying the avatar with a static color scheme/single color) and displays the avatar transitioning from the non-interactive state to an interactive state (e.g., a dynamic state in which the avatar changes in response to detected changes in a user's face (e.g., detected via one or more cameras of the electronic device)).

Note that details of the processes described above with respect to method 900 (e.g., FIG. 9) are also applicable in an analogous manner to the methods described below and above. For example, method 700 optionally includes one or more of the characteristics of the various methods described above with reference to method 900. The method 700 for editing an avatar can be incorporated in the method for navigating an avatar user interface. For example, in some embodiments, the navigation user interface invokes a process for creating or editing a customizable avatar, which may be achieved in accordance with the method 900 described above with respect to FIG. 9. As additional examples, methods 1000, 1100, 1200, and 1400 optionally include one or more of the characteristics of the various methods described above with reference to method 900. For example, in some embodiments, the navigation user interface invokes a process for creating or editing a customizable avatar, which may be achieved in accordance with the methods described below with respect to FIGS. 10-12. As another example, in some embodiments, the navigation user interface invokes a process for modifying a virtual avatar, which may be achieved in accordance with the methods described below with respect to FIGS. 14A and 14B. For brevity, these details are not repeated.

Figure 10A:
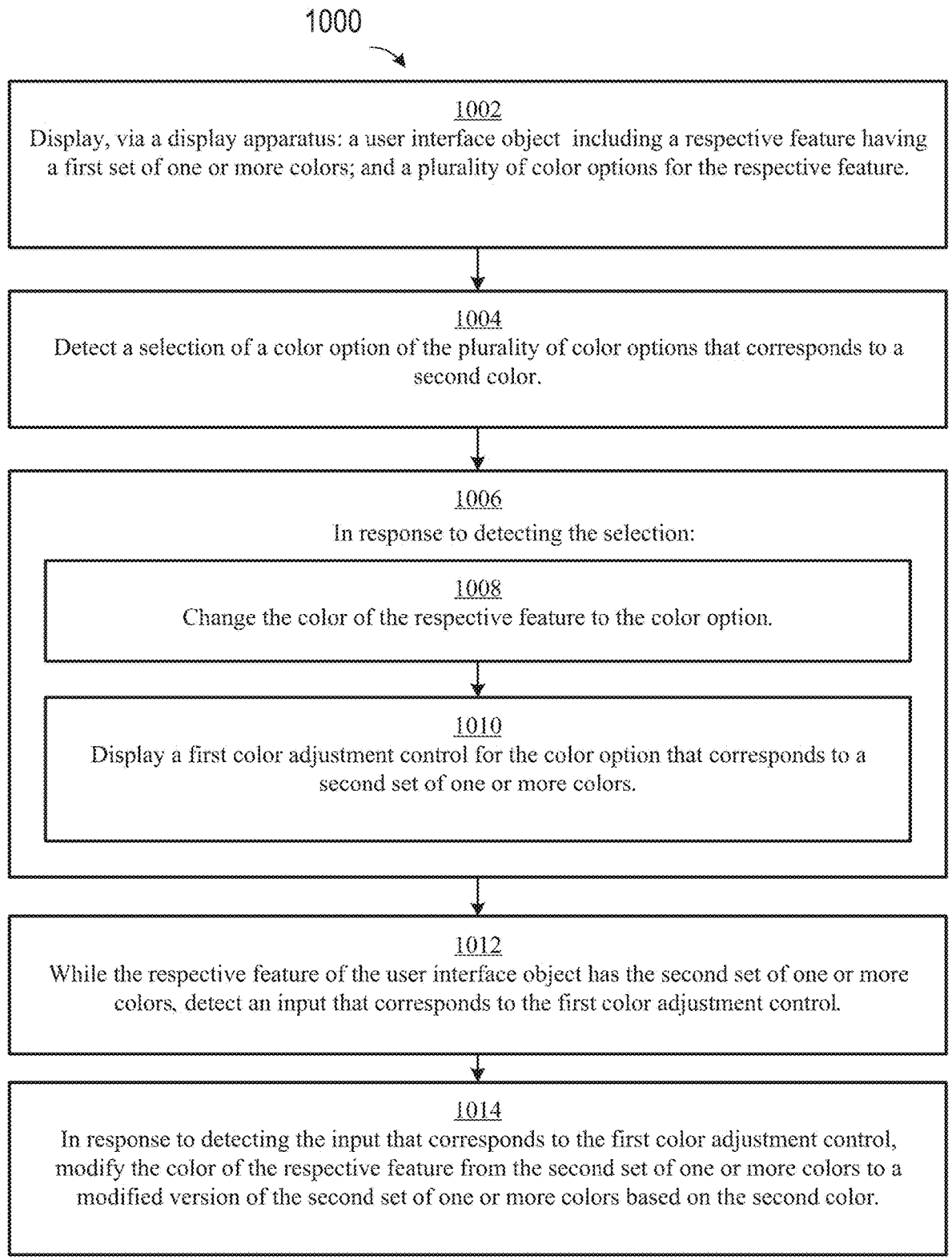

FIGS. 10A-10B are a flow diagram illustrating a method for displaying visual effects in an avatar editing application using an electronic device in accordance with some embodiments. Method 1000 is performed at a device (e.g., 100, 300, 500, 600) with a display apparatus. Some operations in method 1000 are, optionally, combined, the orders of some operations are, optionally, changed, and some operations are, optionally, omitted.

As described below, method 1000 provides an intuitive way for displaying visual effects in an avatar editing application. The method reduces the cognitive burden on a user for applying visual effects to an image viewed in an avatar editing application, thereby creating a more efficient human-machine interface. For battery-operated computing devices, enabling a user to display visual effects in an image faster and more efficiently conserves power and increases the time between battery charges.

In some embodiments, the electronic device (e.g., 600) displays (1002), via the display apparatus (e.g., 601): a user interface object (e.g., a virtual avatar 805) including a respective feature (e.g., 851, 8140) having a first set of one or more colors (e.g., a default set of one or more colors, including, in some embodiments, highlights, midtones, and/or shadows) and a plurality of color options (e.g., 832, 894) (e.g., a plurality of affordances, each corresponding to a color) for the respective feature (e.g., a first avatar feature; e.g., avatar skin tone, avatar eye color, avatar hair color, etc.). In some embodiments, the respective feature is an avatar skin tone. In some embodiments, the respective feature is an avatar eye color (e.g., 829). In some embodiments, the respective feature is an avatar hair color. Displaying an avatar with a respective feature that the user can change with color options provides visual feedback to the user confirming that the respective feature of the avatar is in a state where the color may be changed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) detects (1004) a selection (e.g., 895, 852) of a color option (e.g., 894-1, 832a) of the plurality of color options (e.g., 894, 832) that corresponds to a second color. In response to detecting the selection (1006): the electronic device changes (1008) the color of the respective feature (e.g., frames 8140-1, avatar hair 851) to the color option (e.g., changing an appearance of an avatar feature option that displays the respective avatar feature; e.g., changing an appearance of a virtual avatar (e.g., 805) having the respective avatar feature), and displays (1010) a first color adjustment control (e.g., 857, 897) (e.g., a slider user interface) for the color option that corresponds to a second set of one or more colors (e.g., a set of color changes resulting from changes to slider 856, 897). Displaying an avatar with a first color adjustment control provides visual feedback to the user confirming that the respective feature of the avatar has changed colors and is selected for further color modification. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Haptic feedback confirms that the changes have been received. Providing haptic feedback informs the user that input was received and that the change has been made.

In some embodiments, the first color adjustment control for the color option that corresponds to the second set of one or more colors includes a slider (e.g., 897) having a track (e.g., 897-2) and a thumb (e.g., 897-1) that moves in the track. In some embodiments, the input (e.g., 860) causes movement of the thumb in the track. In some embodiments, in response to detecting the input and in accordance with the thumb being moved to a predetermined position (e.g., 860') (e.g., a midpoint of the track; a position that corresponds to a default value for the second color), the device generates a haptic feedback. In some embodiments, movement of the thumb to positions other than the predetermined position does not generate a haptic feedback that includes a tactile output.

While the respective feature (e.g., 851) of the user interface object (e.g., 805) has the second set of one or more colors (e.g., 832*a*), the electronic device detects (1012) an input (e.g., 860) (e.g., drag gesture or tap gesture) that corresponds to the first color adjustment control. In response to detecting the input that corresponds to the first color adjustment control, the electronic device modifies (1014) the color of the respective feature from the second set of one or more colors to a modified version of the second set of one or more colors (e.g., a modified color of the respective avatar feature) based on the second color. In some embodiments, the slider user interface modifies a property (e.g., a hue, saturation, value/lightness) of the base selected color option. In some embodiments, the displayed color of the selected color option is also modified in response to the input on the slider user interface. In some embodiments, the plurality of color options includes a color palette as described with respect to method 900 and FIGS. 8AX-8AY. The modified appearance of the avatar provides feedback to the user indicating the types of characteristics of the avatar that can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting the input (e.g., 860) that corresponds to the first color adjustment control (e.g., 857), the electronic device (e.g. 600) modifies the color of the color option (e.g., 832*a*) from the second color to the modified version of the second set of one or more colors. In some embodiments, modifying the color of the respective feature (e.g., 851, 8140) from the second set of one or more colors to the modified version of the second set of one or more colors includes modifying a plurality of values (e.g., highlight, midtone, shadows) for the second set of one or more colors. In some embodiments, modifying the color of the respective feature from the second set of one or more colors to the modified version of the second set of one or more colors is further based on a magnitude and direction of the input (e.g., 860) that corresponds to the first color adjustment control (e.g., the red value of the color increases more the farther the input moves to the right and the green value of the color increases more the farther the input moves to the left).

In accordance with some embodiments, the electronic device (e.g. 600) displays (1016) a second plurality of color options (e.g., 896) for a second feature (e.g., 8140-2) (e.g., a portion of the respective (first) avatar feature or a second avatar feature different from the respective avatar feature). Displaying an avatar with a second plurality of color options for a second feature provides visual feedback to the user when the user changes the color of the second feature using the second plurality of color options. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) detects (1018) a selection (e.g., 898) of a second color option (e.g., 896-1) of the second plurality of color options. In some embodiments, in response (1020) to detecting the selection of the second color option, the electronic device changes (1022) a color of the second feature to the second color option and displays (1024) a second color adjustment control (e.g., 899) for the second color option that corresponds to a third set of one or more colors. Displaying the second color adjustment control provides visual feedback to the user that the color of the second feature may be changed with a different set of colors. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the respective feature and the second feature each correspond to portions of an avatar glasses feature (e.g., 8140), the plurality of color options (e.g., 884) correspond to colors for a frame (e.g., 8140-1) of the avatar glasses, and the second plurality of color options (e.g., 896) correspond to colors for lenses (e.g., 8140-2) of the avatar glasses. In some embodiments, the electronic device (e.g., 600) detects an input that corresponds to the second color adjustment control. In response to detecting the input that corresponds to the second color adjustment control, the electronic device modifies an opacity of the lenses of the avatar glasses (e.g., modifying the opacity of the lenses within a range from a maximum value that is completely reflective to a minimum value that is mostly transparent with little reflection). The appearance of the avatar glasses provides feedback to the user indicating the types of characteristics of the avatar that can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the selection of the second color option (e.g., 832*b*), device (e.g., 600) ceases displaying (e.g., in response to detecting the selection of the second color option) the first color adjustment control (e.g., 857) for the color option (e.g., 832*a*) that corresponds to the second set of one or more colors (e.g., hiding the first color slider). In accordance with some embodiments, after ceasing to display (e.g., in response to detecting the selection of the second color option) the first color adjustment control (e.g., 857) for the color option (e.g., 832*a*) that corresponds to the second set of one or more colors, the electronic device (e.g. 600) detects a subsequent selection (e.g., 871) of the color option (e.g., 832*a*) of the plurality of color options that corresponds to the second color. In response to detecting the subsequent selection, the electronic device resumes display of the first color adjustment control for the color option (e.g., see FIG. 8AT). In some embodiments, the first color adjustment control corresponds to the modified version of the second set of one or more colors (e.g., modifications of the color slider (including changes to the slider and the modified version of the second set of one or more colors) persist until they are changed by a subsequent input changing the color slider). In some embodiments, the setting of the color slider persists when the device navigates away from the displayed slider (e.g., by selecting a different avatar feature, selecting a different color affordance, scrolling the avatar options, etc.). In some embodiments, when the device navigates back to the modified slider (e.g., as shown in FIG. 8AT), the modified settings (e.g., position of the selector affordance and modified color) remain unchanged. Displaying the first color adjustment control again after ceasing to display the first color adjustment control provides visual feedback to the user that the state of the user interface is back in a mode where the color may be changed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, after ceasing to display the first color adjustment control (e.g., 857) that corresponds to the second set of one or more colors, the electronic device maintains display of the color option (e.g., 832*a*) of the plurality of color options having the modified version of the second set of one or more colors (e.g., as shown in FIG. 8AC).

In some embodiments, modifying the color of the respective feature from the second set of one or more colors to a modified version of the second set of one or more colors based on the second color includes one or more of the following steps. In accordance with a determination that the input (e.g., 860) that corresponds to the first color adjustment control (e.g., 822) includes movement in a second direction, the device (e.g., 600) increases a red value of the second set of one or more colors. In accordance with a determination that the input that corresponds to the first color adjustment control includes movement in a third direction, increase a green value of the second set of one or more colors.

In some embodiments, while the respective feature of the user interface object has the third set of one or more colors, the electronic device (e.g. 600) detects an input (e.g., drag gesture or tap gesture) that corresponds to the second color adjustment control (e.g., 899). In response to detecting the input that corresponds to the second color adjustment control, the electronic device modifies the color of the respective feature from the third set of one or more colors to a modified version of the third set of one or more colors (e.g., a modified color of the respective avatar feature) based on the second color. In some embodiments, this includes one or more of the following steps. In accordance with a determination that the second input that corresponds to the second color adjustment control includes movement in the second direction, increase a red value of the third set of one or more colors. In accordance with a determination that the second input that corresponds to the second color adjustment control includes movement in the third direction, increase a green value of the third set of one or more colors. Modifications of the set of colors are tied to the movement of the user input. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to a determination that the input that corresponds to the first color adjustment control (e.g., 897) includes a first direction, the electronic device (e.g. 600) modifies the second set of one or more colors in a first manner (e.g., adjusting a color gradient of the second set of one or more colors in a first direction (e.g., from cooler tones to warmer tones) based on movement of the input on the first color slider in the first direction). In some embodiments, in response to a determination that a second input that corresponds to the second color adjustment control (e.g., 899) includes the first direction, modifying the third set of one or more colors in the first manner (e.g., adjusting a gradient of the third set of one or more colors based on movement of the input on the second color slider in the first direction (e.g., the same first direction as a movement of the first color slider), in the same manner as the gradient of the second set of one or more colors were adjusted (e.g., also from cooler tones to warmer tones)). Modifications of the set of colors are tied to the movement of the user input. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1000 (e.g., FIG. 10) are also applicable in an analogous manner to the methods described below and above. For example, method 700 optionally includes one or more of the characteristics of the various methods described above with reference to method 1000. The method 700 for editing an avatar can be incorporated in the method for navigating an avatar user interface. For example, in some embodiments, the navigation user interface invokes a process for creating or editing a customizable avatar, which may be achieved in accordance with the method 1000 described above with respect to FIG. 10. As additional examples, methods 900, 1100, 1200, and 1400 optionally include one or more of the characteristics of the various methods described above with reference to method 1000. For example, in some embodiments, the navigation user interface invokes a process for creating or editing a customizable avatar, which may be achieved in accordance with the methods described below with respect to FIGS. 11-12. As another example, in some embodiments, the navigation user interface invokes a process for modifying a virtual avatar, which may be achieved in accordance with the methods described below with respect to FIGS. 14A and 14B. For brevity, these details are not repeated.

Figure 11A:
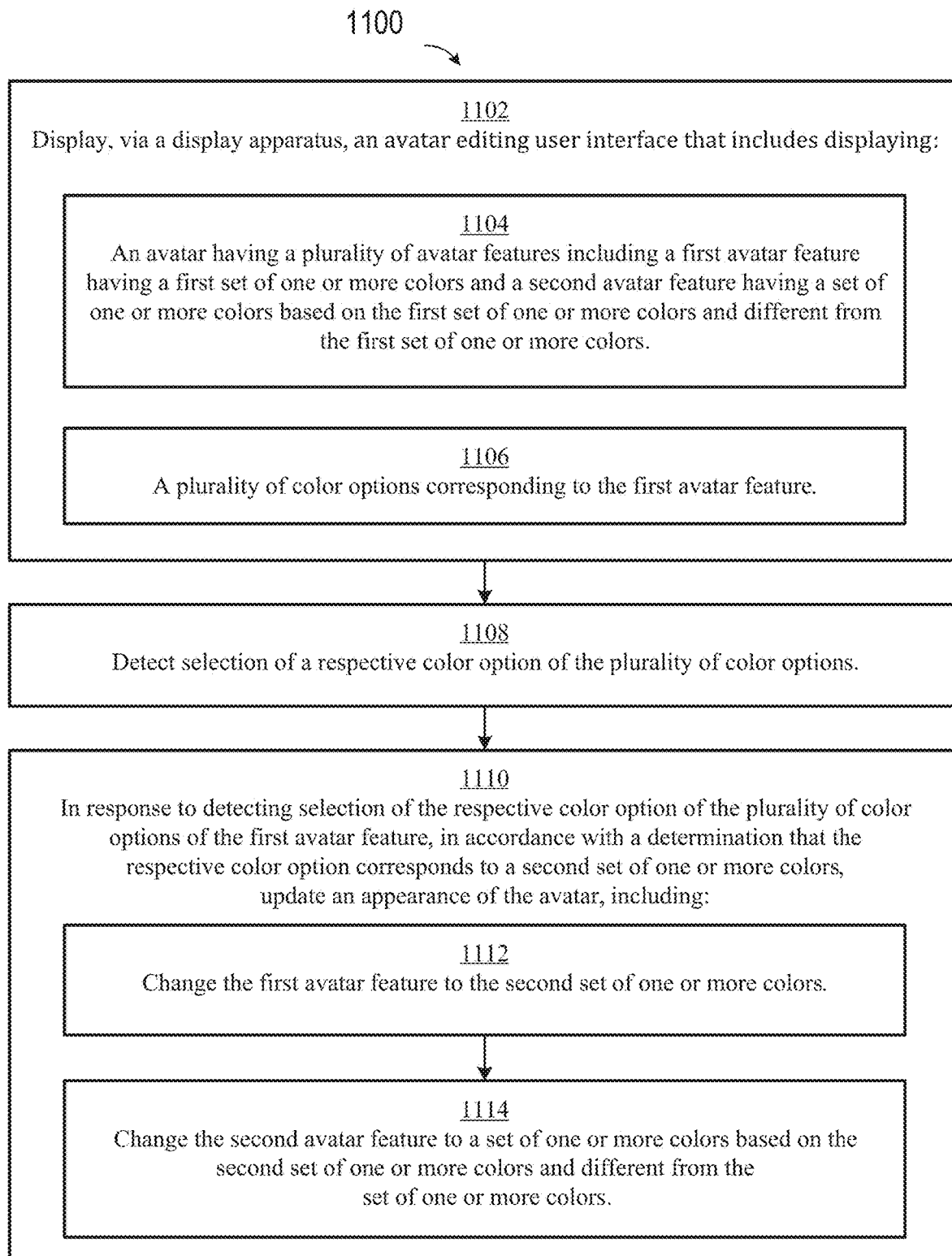
FIGS. 11A and 11B are a flow diagram illustrating a method for displaying an avatar editing user interface.
Figure 11B:
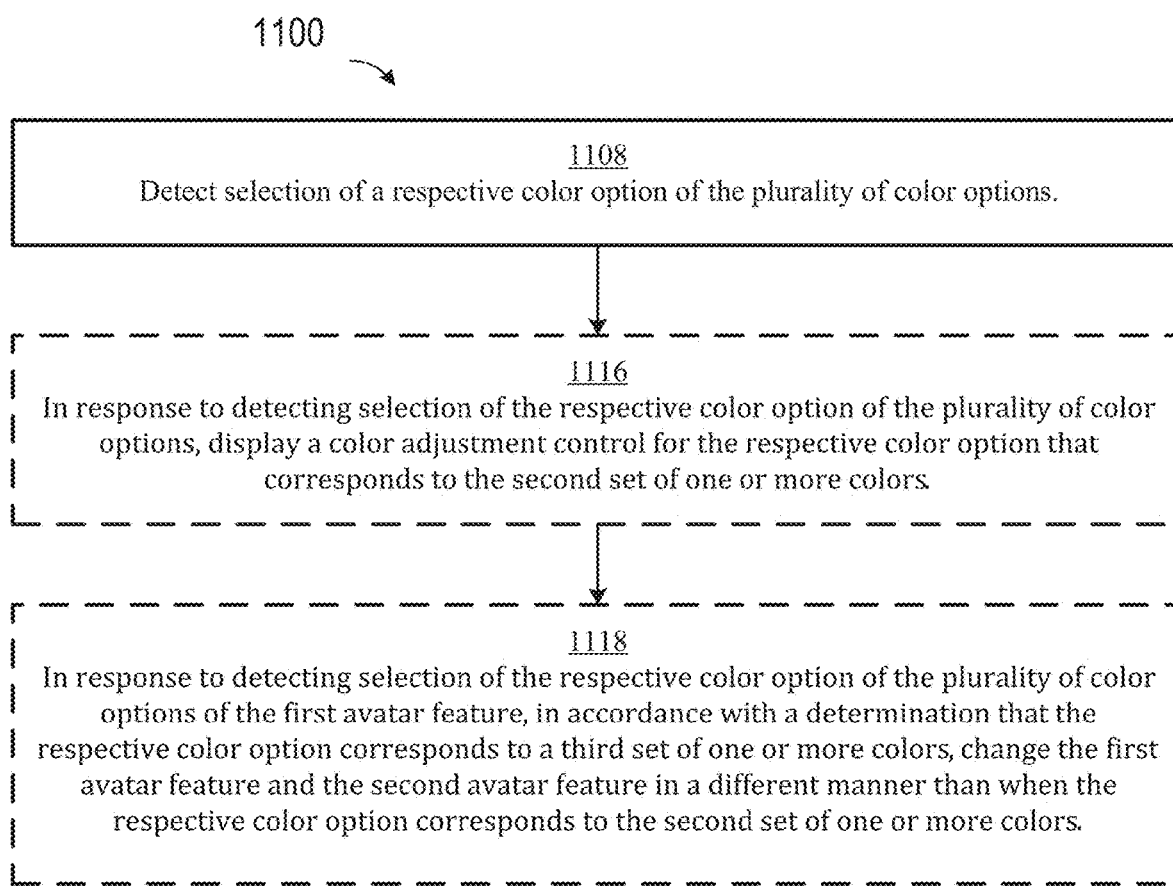

FIGS. 11A and 11B are a flow diagram illustrating a method for displaying an avatar editing user interface, in accordance with some embodiments. Method 1100 is performed at a device (e.g., 100, 300, 500, 600) with a display apparatus. Some operations in method 1100 are, optionally, combined, the orders of some operations are, optionally, changed, and some operations are, optionally, omitted.

As described below, method 1100 provides an intuitive way for displaying an avatar editing user interface. The method reduces the cognitive burden on a user for managing avatars, thereby creating a more efficient human-machine interface. For battery-operated computing devices, enabling a user to modify characteristics of an avatar using an avatar editing user interface faster and more efficiently conserves power and increases the time between battery charges.

The electronic device (e.g. 600) displays (1102), via the display apparatus (e.g. 601), an avatar editing user interface (e.g., 801) that includes displaying (1104): an avatar (e.g., 805) having a plurality of avatar features (e.g., avatar hair, facial features (avatar lips, eyes, nose, etc.), accessories (e.g., earrings, sunglasses, hats)) including a first avatar feature (e.g., skin tone) having a first set of one or more colors and a second avatar feature (e.g., 827, 829) (e.g., facial hair, eyebrows, lips) having a set of one or more colors based on the first set of one or more colors and different from the first set of one or more colors. Displaying the avatar editing user interface also includes displaying (1106) a plurality of color options (e.g., 812) (e.g., a plurality of affordances, each corresponding to a color) corresponding to the first avatar feature. The electronic device detects (1108) selection (e.g., 820) of a respective color option (e.g., 812a) of the plurality of color options. The appearance of the avatar provides feedback to the user indicating the types of characteristics of the avatar that can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting selection of the respective color option (e.g., 812a) of the plurality of color options of the first avatar feature (e.g., skin tone), in accordance with a determination that the respective color option corresponds to a second set of one or more colors, the electronic device (e.g. 600) updates (1110) an appearance of the avatar (e.g., 805). In some embodiments, updating the appearance of the avatar includes one or more of the following steps. One step includes changing (1112) the first avatar feature (e.g., face of avatar 805) to the second set of one or more colors. Another step includes changing (1114) the second avatar feature (e.g., 827) to a set of one or more colors based on the second set of one or more colors and different from the second set of one or more colors (e.g., the selected color of the first avatar feature provides a color characteristic (e.g., undertone, hue, shading, saturation, midtone, highlight, warmth, etc.) for the modified color of the second avatar feature). The selection of a respective color option for a first avatar feature and changing the first avatar feature in accordance with the selection provides feedback to the user of the modified first avatar feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting selection (e.g., 820) of the respective color option (e.g., 812a) of the plurality of color options of the first avatar feature, in accordance with a determination that the respective color option corresponds to a third set of one or more colors, the electronic device (e.g. 600) changes (1118) the first avatar feature and the second avatar feature (e.g., 827) in a different manner (e.g., changing the first and second avatar features based on the selected color option corresponding to the third set of one or more colors rather than the second set of one or more colors; e.g., when the selected color option corresponds to the third set of one or more colors, adjusting a highlight of the first and second avatar features based on the selected color option) than when the respective color option corresponds to the second set of one or more colors (e.g., when the selected color option corresponds to the second set of one or more colors, adjusting a midtone of the first and second avatar features). In some embodiments, the relationship between the selected color option and the first and second avatar features is different for the third set of colors than it is for the second set of one or more colors. For example, the selected color option corresponding to the second set of one or more colors is used to adjust highlights for the first and/or second avatar features, whereas the selected color option corresponding to the third set of one or more colors is used to adjust midtones for the first and/or second avatar features. The selection of a respective color option for a first avatar feature and changing the first avatar feature in accordance with the selection provides feedback to the user of the modified first avatar feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device (e.g. 600) displays, via the display apparatus (e.g. 601), a second plurality of color options (e.g., 832) corresponding to a third avatar feature (e.g., 851) (e.g., hair color). Device detects selection (e.g., 852) of a first color option (e.g., 832a) of the second plurality of color options. In response to detecting selection of the first color option of the second plurality of color options of the third avatar feature, and in accordance with a determination that the first color option corresponds to a fourth set of one or more colors, the electronic device updates the appearance of the avatar (e.g., 805). Updating the avatar includes changing the third avatar feature (e.g., 851) to the fourth set of one or more colors and changing the second avatar feature (e.g., eyebrow color 827) to a set of one or more colors based on the fourth set of one or more colors and different from the fourth set of one or more colors. In some embodiments, the avatar's facial hair color (e.g., eyebrow color) is affected by both the hair color and the skin tone. The appearance of the avatar provides feedback to the user indicating the types of characteristics of the avatar that can be customized. The selection of a first color option for a third avatar feature and changing the third avatar feature in accordance with the selection provides feedback to the user of the modified first avatar feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device (e.g. 600) detects selection (e.g., 861) of a second color option (e.g., 832*b*) of the second plurality of color options (e.g., 832). In response to detecting selection of the second color option of the second plurality of color options of the third avatar feature and in accordance with a determination that the first color option corresponds to a fifth set of one or more colors, the electronic device changes the third avatar feature (e.g., skin tone) and the second avatar feature (e.g., 827) in a different manner (e.g., changing the third and second avatar features based on the second color option corresponding to the fifth set of one or more colors rather than the fourth set of one or more colors) than when the first color option is selected. In some embodiments, the relationship between the selected color option (e.g., the second color option) and the third and second avatar features is different for the fifth set of colors than it is for the fourth set of one or more colors. For example, the selected color option corresponding to the fourth set of one or more colors is used to adjust highlights for the third and/or second avatar features, whereas the selected color option corresponding to the fifth set of one or more colors is used to adjust midtones for the third and/or second avatar features. In some embodiments, the first avatar feature corresponds to avatar hair color. In some embodiments, the second avatar feature corresponds to avatar eyebrows. In some embodiments, the third avatar feature corresponds to avatar skin tone. The selection of a second color option for a second avatar feature and changing the second avatar feature in accordance with the selection provides feedback to the user of the modified second avatar feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the third avatar feature (e.g., avatar skin tone) and the second avatar feature (e.g., 827) (e.g., avatar eyebrows) are changed in a first manner that includes adjusting a first color property (e.g., a color hue) based on the second set of one or more colors corresponding to the first avatar feature (e.g., avatar hair color). In some embodiments, the third avatar feature and the second avatar feature are changed in a second manner that includes adjusting a second color property (e.g., a color luminance) that is different from the first color property based on the fourth set of one or more colors corresponding to the third avatar feature (e.g., the avatar eyebrows are darker than the avatar skin tone). A third avatar feature and a second avatar feature are adjusted in accordance with a first color property corresponding to a first avatar feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting selection (e.g., 820) of the respective color option (e.g., 812*a*) of the plurality of color options (e.g., 812), the electronic device (e.g., 600) displays (1116) a color adjustment control (e.g., 822) (e.g., a slider user interface) for the respective color option that corresponds to the second set of one or more colors. In some embodiments, the color adjustment control is a color adjustment control as described with respect to method 1000 and FIGS. 10A-10B. The color adjustment control provides a visual representation of the color options that may be selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the second avatar feature corresponds to avatar lips (e.g., 828) having an avatar lip color that corresponds to the set of one or more colors based on the second set of one or more colors and different from the second set of one or more colors. In some embodiments, the device detects an input (e.g., drag gesture or tap gesture) that corresponds to the color adjustment control (e.g., 892, 893). In response to detecting the input, the electronic device (e.g. 600) modifies the avatar lip color of a first portion (e.g., outer portion (e.g. 828*a*)) of the avatar lips and maintains the avatar lip color of a second portion (e.g., inner portion (e.g., 828*b*)) of the avatar lips. The appearance of the second avatar feature provides feedback to the user indicating the types of characteristics of the avatar that can be customized. The selection of a color option for an avatar feature from the color adjustment control provides feedback to the user of the modified first avatar feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the first avatar feature corresponds to avatar skin. In some embodiments, the second avatar feature corresponds to avatar lips (e.g., 828). In some embodiments, the set of one or more colors based on the second set of one or more colors includes the second set of one or more colors and a red value (e.g., the avatar lips are based on the skin tone and a shade of red (e.g., a natural shade such as pink, or a shade representing a lipstick tint)). The appearance of the avatar skin tone provides feedback to the user indicating the skin tone of the avatar can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIG. 11) are also applicable in an analogous manner to the methods described below and above. For example, method 700 optionally includes one or more of the characteristics of the various methods described above with reference to method 1100. The method 700 for editing an avatar can be incorporated in the method for navigating an avatar user interface. For example, in some embodiments, the navigation user interface invokes a process for creating or editing a customizable avatar, which may be achieved in accordance with the method 900 described above with respect to FIG. 9. As additional examples, methods 1000, 1200, and 1400 optionally include one or more of the characteristics of the various methods described above with reference to method 1100. For example, in some embodiments, the navigation user interface invokes a process for creating or editing a customizable avatar, which may be achieved in accordance with the methods described below with respect to FIGS. 10-12. As another example, in some embodiments, the navigation user interface invokes a process for modifying a virtual avatar, which may be achieved in accordance with the methods described below with respect to FIGS. 14A and 14B. For brevity, these details are not repeated.

Figure 12A:
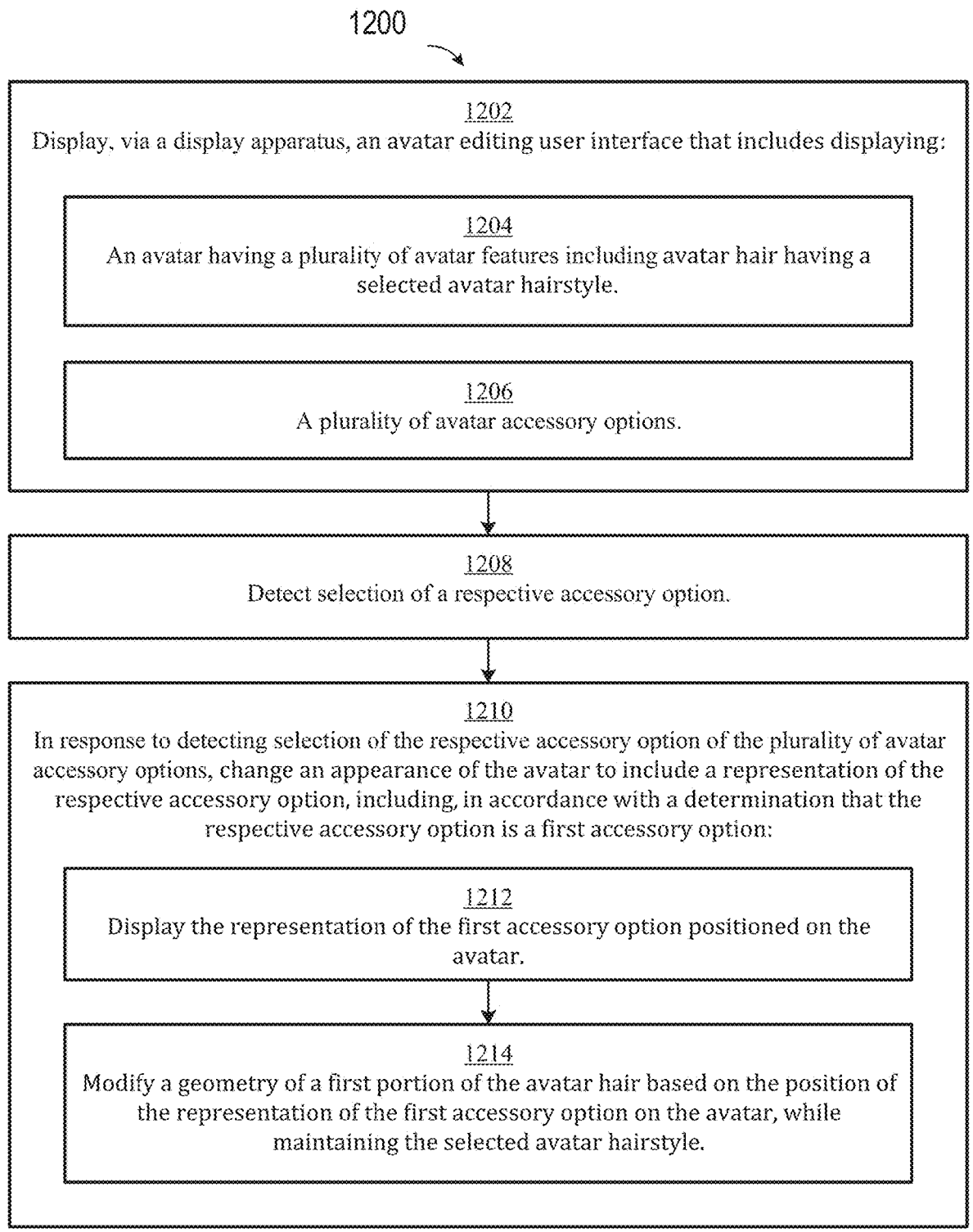

FIGS. 12A and 12B are a flow diagram illustrating a method for displaying an avatar editing user interface, in accordance with some embodiments. Method 1200 is performed at a device (e.g., 100, 300, 500, 600) with a display apparatus. Some operations in method 1200 are, optionally, combined, the orders of some operations are, optionally, changed, and some operations are, optionally, omitted.

As described below, method 1200 provides an intuitive way for displaying an avatar editing user interface. The method reduces the cognitive burden on a user for managing avatars, thereby creating a more efficient human-machine interface. For battery-operated computing devices, enabling a user to modify characteristics of an avatar using an avatar editing user interface faster and more efficiently conserves power and increases the time between battery charges.

The electronic device (e.g. 600) displays (1202), via the display apparatus (e.g. 601), an avatar editing user interface (e.g., 801) that includes displaying (1204): an avatar (e.g., 805) having a plurality of avatar features including avatar hair (e.g., 851) having a selected avatar hairstyle (e.g., 836*b*) (e.g., a particular styling of the avatar hair that was selected (e.g., by a user) for the avatar). The avatar editing user interface also includes (1206) a plurality of avatar accessory options (e.g., 8112) (e.g., affordances corresponding to various avatar accessories (e.g., glasses, hats, earrings, scarves, etc.)). The appearance of the avatar hair and avatar accessory options provides feedback to the user indicating the hairstyle and avatar accessories can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device (e.g. 600) detects (1208) selection of a respective accessory option (e.g., 8112*b*). In response to detecting the selection of the respective accessory option of the plurality of avatar accessory options (e.g., 8112), the electronic device changes (1210) an appearance of the avatar (e.g., 805) to include a representation of the respective accessory option (e.g., 8140), including, in accordance with a determination that the respective accessory option is a first accessory option (e.g., 8112*b*) (e.g., a glasses accessory option): displaying (1212) the representation of the first accessory option (e.g., 8140) positioned on the avatar (e.g., displaying the selected glasses on the avatar's face with the temple positioned along the side of the avatar's head and the earpiece positioned behind the avatar's ear). The electronic device modifies (1214) a geometry of a first portion (e.g., 8145) of the avatar hair based on the position of the representation of the first accessory option on the avatar, while maintaining the selected avatar hairstyle (e.g., a portion of the avatar hair located adjacent the glasses is displayed pushed aside to accommodate the presence of the glasses on the avatar's face, including the positioning of the temple and the earpiece behind the avatar's ear, while the remaining portions of the avatar hair remain unchanged to represent the selected avatar hairstyle). The appearance of the avatar accessory option provides feedback to the user indicating the accessories of the avatar can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, an appearance of the representation of the respective accessory option (e.g., 8108*d*) is based on one or more characteristics (e.g., hair type, hairstyle, hair length, etc.) of the avatar hair (e.g., 851). In some embodiments, the size of an accessory option (e.g., a hat (e.g., 8170)) is determined based on the avatar hair. For example, if the avatar hair has a small hairstyle (e.g., 851-1) (e.g., 836*c*) (a buzz or bald hairstyle), a hat has a small hatline circumference (e.g., hatline 8118 in FIG. 8CD). Conversely, if the avatar hair has a large hairstyle (e.g., 851-2) (e.g., large, curly hair) the hat has a large hatline circumference (e.g., hatline 8118 in FIG. CC). In some embodiments, the position of an accessory option (e.g., a hair bow) is determined based on the avatar hair. For example, if the avatar hair has a short hairstyle, the avatar bow is positioned close to the avatar head. Conversely, if the avatar hair has a long hairstyle, the bow can be positioned farther away from the head, depending on the length of the hair. The appearance of the avatar hair provides feedback to the user indicating the hairstyle of the avatar can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in accordance with a determination that the respective accessory option is a second accessory option (e.g., an accessory option different than the first accessory option; e.g., a hat, 8170): the electronic device (e.g. 600) displays the representation of the second accessory option (e.g., 8170) positioned on the avatar (e.g., displaying the selected hat on the avatar's head with a hatline (e.g., 8118) of the hat positioned on the avatar's head based on the type of hat selected). The electronic device modifies a geometry of a second portion of the avatar hair (e.g., hair at 8118, 8118-1, or 8118-2) different from the modified geometry of the first portion (e.g., 8145) of the avatar hair based on the position of the representation of the second accessory option on the avatar, while maintaining the selected avatar hairstyle (e.g., the avatar hair is modified at the hatline of the hat such that the avatar hair is compressed at the hatline, causing the hair positioned below and/or above the hatline (depending on the selected hat and hairstyle) to flared out in response to the compression of the hair at the hatline). The appearance of the avatar displayed with the accessory option provides feedback to the user indicating the customization of the avatar with the selected accessories. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, after displaying the representation (e.g., 8140) of the first accessory option position on the avatar, the electronic device (e.g. 600) detects (1216) selection (e.g., 8159) of a second respective accessory option (e.g., 8108*d*) (e.g., an avatar hat). In response to detecting the selection of the second respective accessory option of the plurality of avatar accessory options, the electronic device changes (1218) the appearance of the avatar (e.g., 805) to include a representation (e.g., 8160) of the second respective accessory option and the representation of the respective accessory option (e.g., the avatar is updated to include both an avatar hat and avatar glasses while maintaining the selected avatar hairstyle). The appearance of the avatar with the selected accessories provides feedback to the user indicating the accessories of the avatar can be customized. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device (e.g. 600) displays, via the display apparatus (e.g. 601), a plurality of avatar hairstyle options (e.g., 836) (e.g., including a hairstyle option corresponding to the selected avatar hairstyle). The electronic device detects selection (e.g., 872) of a second hairstyle option (e.g., 836*c* in FIG. 8AU) (e.g., a hairstyle option different from the currently selected hairstyle option). In response to detecting the selection of the second hairstyle option, the electronic device changes the appearance of the avatar (e.g., 805) from having the selected avatar hairstyle (e.g., 836*f*) to having the second hairstyle option. In some embodiments, this includes one or more of the following steps. In accordance with a determination that the respective accessory option is a first type of accessory option (e.g., avatar glasses (e.g., 8140) displayed on the avatar adjacent at least a portion of the avatar hair), displaying the avatar hair having the second hairstyle option modified in a first manner (e.g., 8145) based on the representation of the respective accessory option (e.g., the geometry of a first portion of the avatar hair is modified based on a position of the avatar glasses, while still maintaining the second avatar hairstyle). The appearance of the avatar displayed with the hairstyle option provides feedback to the user indicating the customization of the avatar with the selected hairstyle. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with a determination that the respective accessory option (e.g., 8108*d*) is a second type of accessory option (e.g., 8108) (e.g., a hat displayed on the avatar adjacent at least a portion of the avatar hair), the electronic device (e.g. 600) displays the avatar hair (e.g., 851) having the second hairstyle option (e.g., 836*c*) modified in a second manner (e.g., puffing out at 8118-1 or 8118-2) based on the representation of the respective accessory option (e.g., the geometry of a second portion of the avatar hair is modified based on a position of the hat, while still maintaining the second avatar hairstyle). The appearance of the avatar displayed with the accessory option provides feedback to the user indicating the customization of the avatar with the selected accessories. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in accordance with a determination that the respective accessory option is a third type (e.g., an accessory option that does not affect the displayed avatar hairstyle; e.g., a nose ring), the electronic device (e.g. 600) displays the avatar hair (e.g., 851) having the second hairstyle option (e.g., 836*c*) without modification (e.g., without modification based on the respective accessory option). The appearance of the avatar displayed with the hairstyle and accessory option provides feedback to the user indicating the customization of the avatar with the selected hairstyle. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting a selection of a third hairstyle option (e.g., 851-2 in FIG. 8CB) (e.g., a hairstyle option different from the currently selected hairstyle option), the electronic device (e.g. 600) changes the appearance of the avatar from having the selected avatar hairstyle (e.g., 851-1) to having the third hairstyle option and changes an appearance (e.g., position, size, shape, etc.) of the representation of the respective accessory option (e.g., 8160) based on the third hairstyle option. The appearance of the avatar displayed with the hairstyle option provides feedback to the user indicating the customization of the avatar with the selected hairstyle. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the respective accessory option is an avatar hat (e.g., 8160) and changing the appearance of the representation of the respective accessory option includes changing a size of the representation of the avatar hat based on a size (e.g., simulated hair volume) of the third hairstyle option (e.g., 851-2) (e.g., selecting a larger hairstyle increases the size of the hat to accommodate the larger hairstyle; e.g., selecting a smaller hairstyle decreases the size of the hat to accommodate the smaller hairstyle). In some embodiments, changing the appearance of the representation of the respective accessory option further includes changing a size of a hatline (e.g., a portion of the hat that fits onto the head to affix the hat to the head) of the representation of the avatar hat based on the size of the third hairstyle option (e.g., a circumference of the hatline changes (increases or decreases) based on the size of the hairstyle option). In some embodiments, the hatline remains at a same location relative to the head such that the hatline continues to intersect the head at the same location, but has a different circumference). The appearance of the avatar displayed with a hat option provides feedback to the user indicating the customization of the avatar with the selected hat. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the first accessory option is an avatar hat (e.g., 8160) and displaying the representation of the first accessory option positioned on the avatar (e.g., 805) includes displaying the avatar hat positioned over a portion of the avatar hair (e.g., 851) (e.g., the avatar hat is displayed overlaid on a top portion of the avatar head and adjacent hair). In some embodiments, modifying the geometry of the portion of the avatar hair includes displaying the avatar hair having a compressed appearance at a location (e.g., 8118-1 or 8118-2) adjacent a hatline (e.g., a portion of the hat that fits onto the head to affix the hat to the head) of the avatar hat and expanding as the avatar hair extends from the location adjacent the hatline of the avatar hat (e.g., the avatar hair is modified at the hatline of the hat such that the avatar hair is compressed at the hatline, causing the hair positioned below and/or above the hatline (depending on the selected hat and hairstyle) to flared out in response to the compression of the hair at the hatline). The appearance of the avatar displayed with a hat option provides feedback to the user indicating the customization of the avatar with the selected hat. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, in response to detecting a selection (e.g., 8168) of a second avatar hat option (e.g., 8108e) of the plurality of avatar accessory options (e.g., 8108), the electronic device (e.g. 600) replaces the representation of the avatar hat (e.g., 8160) with a representation of the second avatar hat (e.g., 8170), while maintaining the hatline (e.g., 8118) and the geometry of the portion of the avatar hair having the compressed appearance at the location adjacent the hatline and expanding as the avatar hair extends from the location adjacent the hatline (e.g., different avatar hats have the same hatline; e.g., selecting a different avatar hat replaces the currently selected avatar hat with the different avatar hat while maintaining hatline and the shape of the avatar hair relative to the hatline). The appearance of the avatar displayed with a hat option provides feedback to the user indicating the customization of the avatar with the selected hat. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the avatar hair (e.g., 851) moves in accordance with a simulated physical reaction of the avatar hair to avatar movement based on a physics model (e.g., shown in FIG. 8BY) (e.g., a model of inertia, a model of gravity, a force transfer model, a friction model). The simulated physical reaction of the avatar hair to avatar movement based on the physics model changes when the first accessory option is an avatar hat (e.g., movement of the avatar hair changes when the avatar is wearing a hat). In some embodiments, when the avatar is not wearing a hat, the avatar hair moves with movement of the avatar head based on the physics model. In some embodiments, when the avatar is wearing a hat, movement of the avatar hair relative to the avatar head changes based on the position of the hat on the avatar head. In some embodiments, the physics model specifies a magnitude and direction of movement of an avatar feature based on a magnitude and direction of the input (e.g., 8XX) (e.g., a gesture on the avatar to rotate or adjust a magnification of the avatar, or movement of the face or a portion of the face) and one or more predefined properties of the virtual avatar feature such as a simulated mass, simulated elasticity, simulated coefficient of friction or other simulated physical property. In some embodiments, the simulated physical reaction of the avatar hair changes because the attachment point for the hair shifts from where the hair is attached to the head to the hatline.

In accordance with some embodiments, the first accessory option is avatar glasses (e.g., 8140) and modifying the geometry of the portion of the avatar hair (e.g., 851) includes displaying the portion (e.g., 8145) of the avatar hair positioned so as to avoid obstructing at least a portion of the avatar glasses (e.g., the hair on the side of the avatar head, above the avatar ears, is moved behind or to the side or otherwise positioned behind the temples of the glasses). In some embodiments, the first accessory option is avatar glasses and displaying the representation of the first accessory option positioned on the avatar includes: displaying a representation of a reflection (e.g., 8150) on a lens portion (e.g., 8140-2) of the avatar glasses (e.g., the representation of the reflection is overlaid on the representation of the glasses) (e.g., the position of the reflection on the glasses is determined based on a relative position of the displayed glasses and a simulated light source that is, optionally, determined based on a detected light source in a field of view of a camera) and displaying a representation of a shadow cast by the representation of the avatar glasses that is displayed on at least a portion of the avatar (e.g., the representation of the shadow cast by the glasses is overlaid on the representation of the avatar with an opacity less than 100%) (e.g., a portion of the avatar that is determined based on a relative position of the displayed avatar and a simulated light source that is, optionally, determined based on a detected light source in a field of view of a camera). The appearance of the avatar displayed with a glasses option provides feedback to the user indicating the customization of the avatar with the selected hat. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, displaying the representation of the first accessory option positioned on the avatar includes: displaying a representation of one or more shadows (e.g., 8142, 8147, 8172) cast (e.g., cast on the avatar) by the first accessory option (e.g., an avatar hat (e.g., 8170) or avatar glasses (e.g., 8140)) or the avatar hair (e.g., 851) (e.g., the representation of the shadow cast by the hair, glasses, and/or hat is overlaid on the representation of the avatar with an opacity less than 100%) (e.g., a portion of the avatar that is determined based on a relative position of the displayed avatar and a simulated light source that is, optionally, determined based on a detected light source in a field of view of a camera). The appearance of the avatar displayed with shadow provides feedback to the user indicating a more realistic representation of the avatar. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the first accessory option is an avatar earring (e.g., 8125). The avatar earrings move in accordance with a physics model (e.g., a model of inertia, a model of gravity, a force transfer model, a friction model) (In some embodiments, the avatar moves based on detected changes in a face within the field of view of one or more cameras of the electronic device). The appearance of the avatar displayed with earrings provides feedback to the user indicating the customization of the avatar with the selected earrings. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1200 (e.g., FIG. 12) are also applicable in an analogous manner to the methods described below/and above. For example, method 700 optionally includes one or more of the characteristics of the various methods described above with reference to method 1200. The method 700 for editing an avatar can be incorporated in the method for navigating an avatar user interface. For example, in some embodiments, the navigation user interface invokes a process for creating or editing a customizable avatar, which may be achieved in accordance with the method 900 described above with respect to FIG. 9. As additional examples, methods 1000, 1100, and 1400 optionally include one or more of the characteristics of the various methods described above with reference to method 1200. For example, in some embodiments, the navigation user interface invokes a process for creating or editing a customizable avatar, which may be achieved in accordance with the methods described below with respect to FIGS. 10-11. As another example, in some embodiments, the navigation user interface invokes a process for modifying a virtual avatar, which may be achieved in accordance with the methods described below with respect to FIGS. 14A and 14B. For brevity, these details are not repeated.

FIGS. 13A-13O illustrate exemplary user interfaces for modifying an avatar in an avatar navigation user interface. The user interfaces in these figures are used to illustrate the processes described below, including the processes in FIG. 14.

In FIG. 13A, device 600 displays messaging user interface 1303 similar to messaging user interface 603 in FIG. 6A. Device 600 detects input 1302 on application dock affordance 1310, and displays condensed avatar selection interface 1315 (similar to condensed avatar selection interface 668 in FIG. 6L) in FIG. 13B. Condensed avatar selection interface includes a scrollable listing of avatars 1320 (similar to the scrollable listing of avatar 675 in FIG. 6L), including customizable woman avatar 1321, monkey avatar 1322, and robot avatar 1323.

Figure 13B:
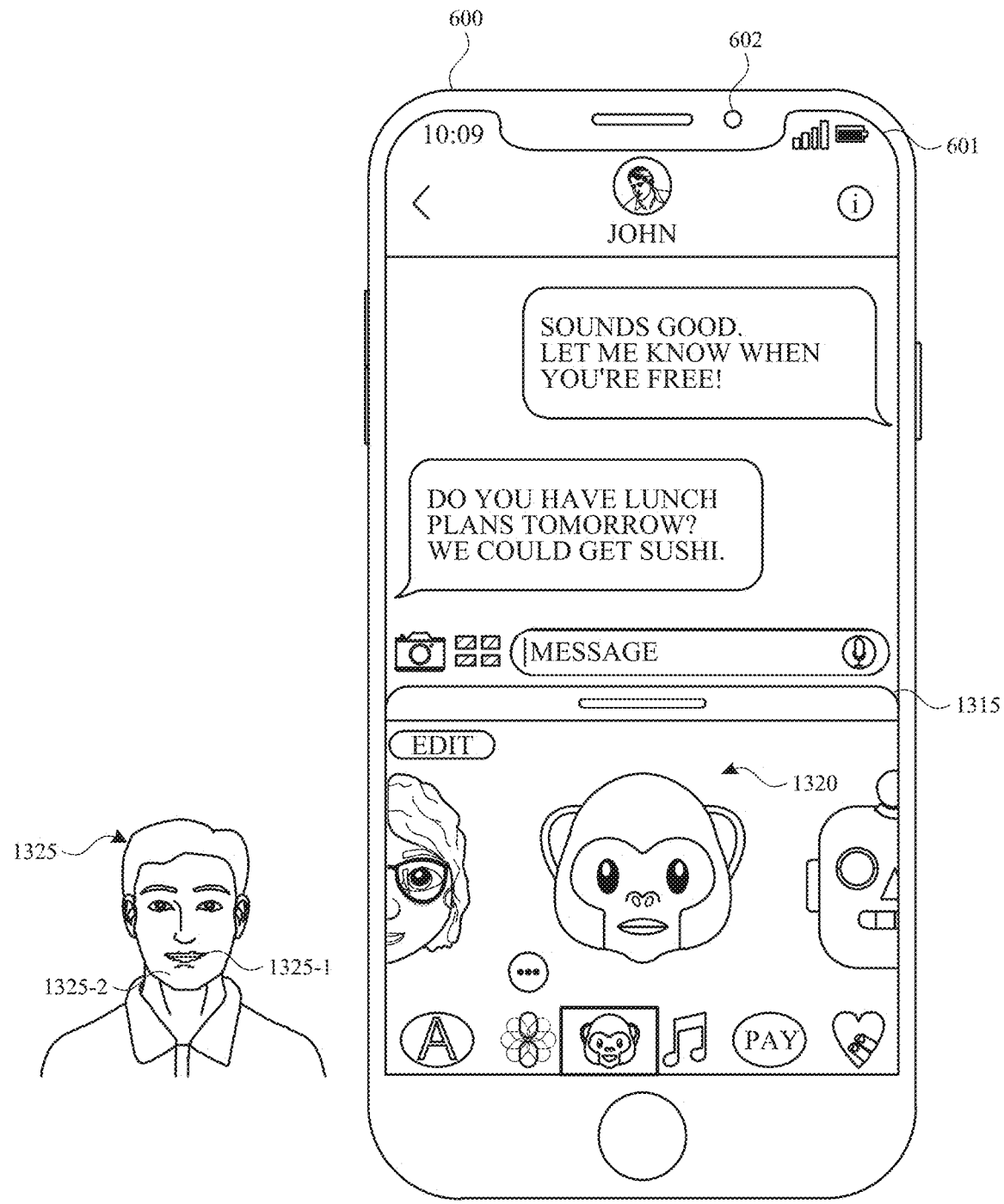

As shown in FIGS. 13B-13O, device 600 modifies avatars displayed in condensed avatar selection interface 1315 (e.g., monkey avatar 1322) in response to detected changes in a face. For reference, FIGS. 13B-13O include a representation of a face 1325 (e.g., a user's face) detected in a field of view of a camera (e.g., 602). FIGS. 13B-13O show modifications to various displayed avatars in response to detected changes in face 1325. In some embodiments, the view of face 1325 in FIGS. 13B-13O is shown from a perspective of the device, which is positioned facing face 1325. Thus, corresponding changes to the displayed avatar are shown in FIGS. 13B-13O mirrored with respect to the movements of face 1325.

In FIG. 13B, device 600 detects face 1325 facing forward with jaw 1325-2 and mouth 1325-1 closed. In response, device 600 modifies the displayed avatar, monkey avatar 1322, to have the same facial expression with jaw 1322-2 and mouth 1321-1 closed, matching that of mouth 1325-1.

Figure 13C:
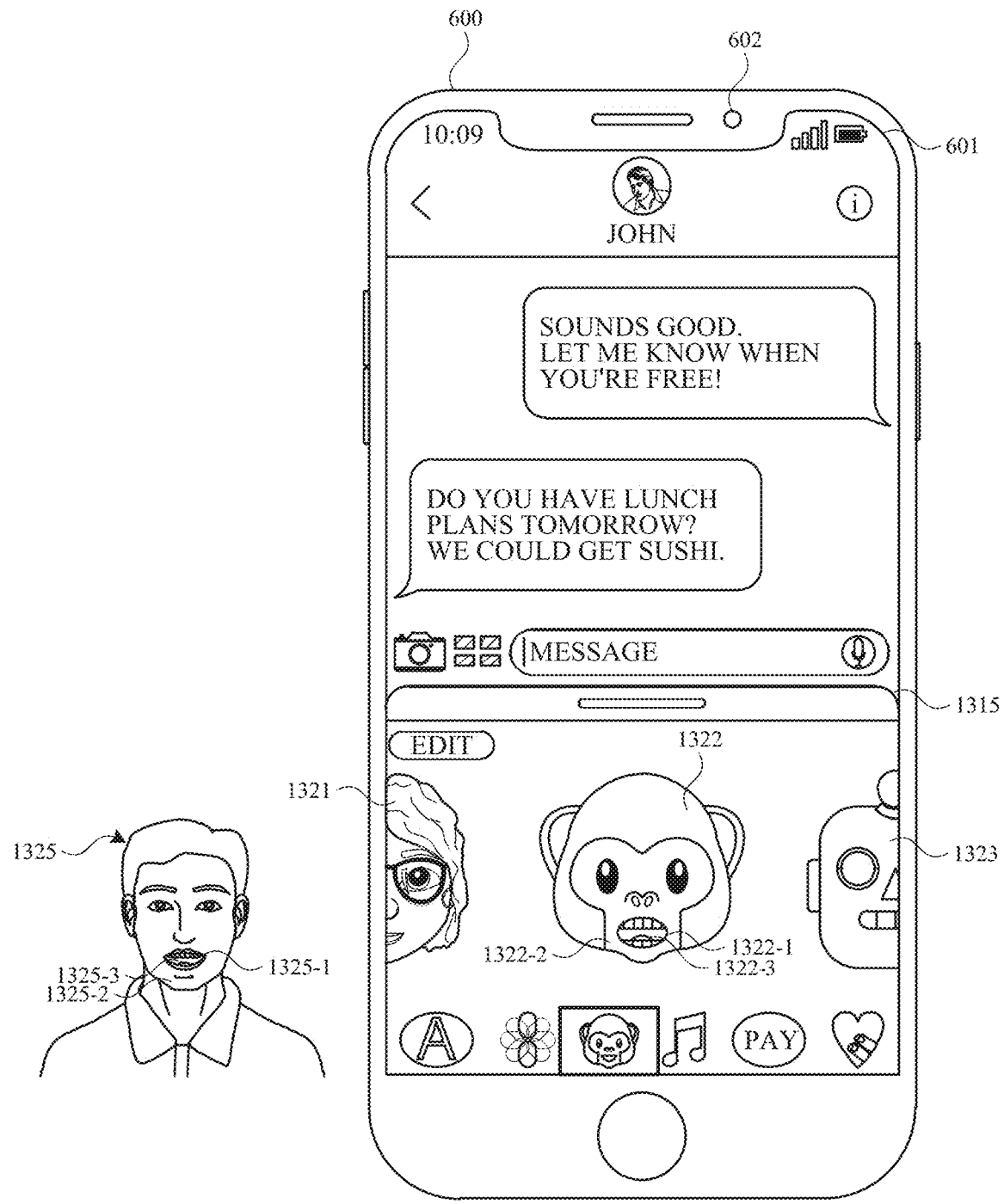

In FIG. 13C, device 600 detects jaw 1325-2 and mouth 1325-1 moving towards an open position and modifies jaw 1322-2 and mouth 1322-1 of monkey avatar 1322 to slightly opened positions to match the movement of jaw 1325-2 and mouth 1325-1. Tongue 1325-3 is not extended. Therefore, device 600 does not display the monkey avatar's tongue 1323-3 extended from mouth 1323-1, but instead, positioned inside mouth 1323-1.

In some embodiments, device 600 displays the avatar's tongue sticking out of the avatar's mouth in response to detecting the user's tongue extending from the user's mouth. For example, in FIG. 13D, jaw 1325-2 is slightly opened and tongue 1325-3 is extending from mouth 1325-1. As a result, device 600 modifies monkey avatar 1322 to extend tongue 1322-3 from mouth 1322-1, while jaw 1322-2 remains in a slightly opened position.

In some embodiments, device 600 displays the transition from no tongue extended (e.g., see tongue 1322-3 in FIG. 13C) to tongue extended (e.g., see tongue 1322-3 in FIG. 13D) as an animation of the tongue moving from inside the avatar's mouth (e.g., mouth 1322-1) to an extended pose. In some embodiments, the animation includes displaying the avatar's tongue curving over the avatar's teeth as the tongue moves from inside the mouth to the extended position. For example, in FIG. 13D, avatar tongue 1322-3 is slightly curved over the bottom teeth of the avatar's mouth. In some embodiments, device 600 displays the tongue going back into the avatar's mouth by reversing the tongue-extending animation (including optionally displaying a reversal of the curving motion of the avatar tongue).

Figure 13D:
Figure 13E:

In some embodiments, device 600 displays movement of an avatar tongue based on detected movement of features of the user's face other than the user's tongue (e.g., tilting or rotation of the user's head, or movement of jaw 1325-2 up/down and/or side-to-side). For example, FIG. 13E illustrates movement of monkey tongue 1322-3 in response to a detected change in the position of user jaw 1325-2. As device 600 detects user jaw 1325-2 moving down and user mouth 1325-1 opening wide, device 600 widens monkey mouth 1322-1 and lowers monkey jaw 1322-2. As monkey jaw 1322-2 is lowered, device 600 displays monkey tongue 1322-3 moving downward with jaw 1322-2 and hanging farther from mouth 1322-1. Device 600 can also modify the position of tongue 1322-3 based on other movements of user jaw 1325-2. For example, if the user moves his jaw side-to-side, avatar jaw 1322-2 and tongue 1322-3 move in accordance with the side-to-side movement of user jaw 1325-2. Similarly, if the user moves his jaw up (e.g., returning to the position in FIG. 13D, or tilting up as shown in FIG. 13H), device 600 displays avatar jaw 1322-2 and tongue 1322-3 moving accordingly (e.g., returning to the position shown in FIG. 13D, or angling upward as shown in FIG. 13H).

Figure 13F:

FIG. 13F shows another example of device 600 modifying movement of tongue 1322-3 based on movement of a user's facial feature other than the user's tongue. In FIG. 13F, user tilts his head to the side. In response to detecting the tilting of the user's head, device 600 modifies monkey avatar 1322 by tilting the monkey's head. As the monkey's head tilts, the position of tongue 1322-3 changes based on the tilt (e.g., both magnitude and direction) of the monkey's head and a modeled gravity of tongue 1322-2, which causes tongue 1322-3 to hang downward, but also tilt slightly with movement of the avatar's head and jaw 1322-2.

In some embodiments, device 600 modifies movement of an avatar tongue based on a physics model (e.g., a modeled gravity, inertia, etc.) applied to the avatar. As the avatar's tongue extends farther from the avatar's mouth, the tongue's response to the physics model is exacerbated based on the amount of tongue extended from the avatar's mouth. For example, in FIG. 13E, monkey tongue 1322-3 has greater curvature than shown in FIG. 13D. This is because device 600 displays tongue 1322-3 extending farther from mouth 1322-1 in FIG. 13E (compared to as shown in FIG. 13D), and the effects of a modeled gravity applied to tongue 1322-3 cause the tongue to hang lower from the mouth (causing increased curvature of the tongue over the monkey's teeth).

In some embodiments, device 600 does not modify the avatar to display particular facial expressions (or reduces the movement of avatar features (e.g., lips, mouth, etc.) that form the particular facial expressions) when the avatar's tongue is extended. This is to avoid modifying the avatar in a way that interferes with (e.g., impinges or collides with) the displayed avatar tongue. For example, device 600 can forego modifying the avatar's lips to form a lip pucker, closing the avatar mouth, extending the bottom lip (e.g., a pouting pose), or extending the lips and moving the mouth to a closed position (e.g., funneling the mouth).

Figure 13G:
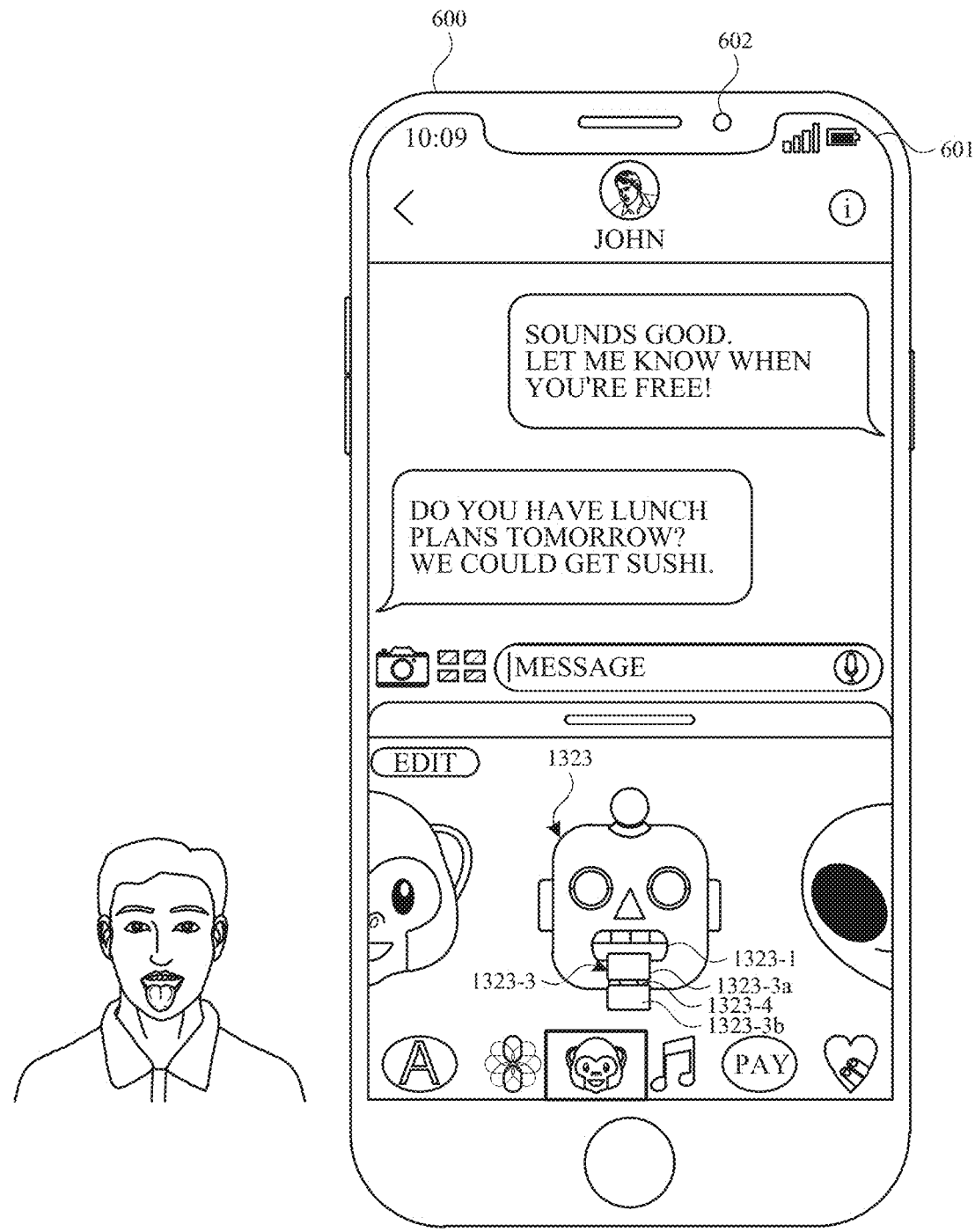
Figure 13H:
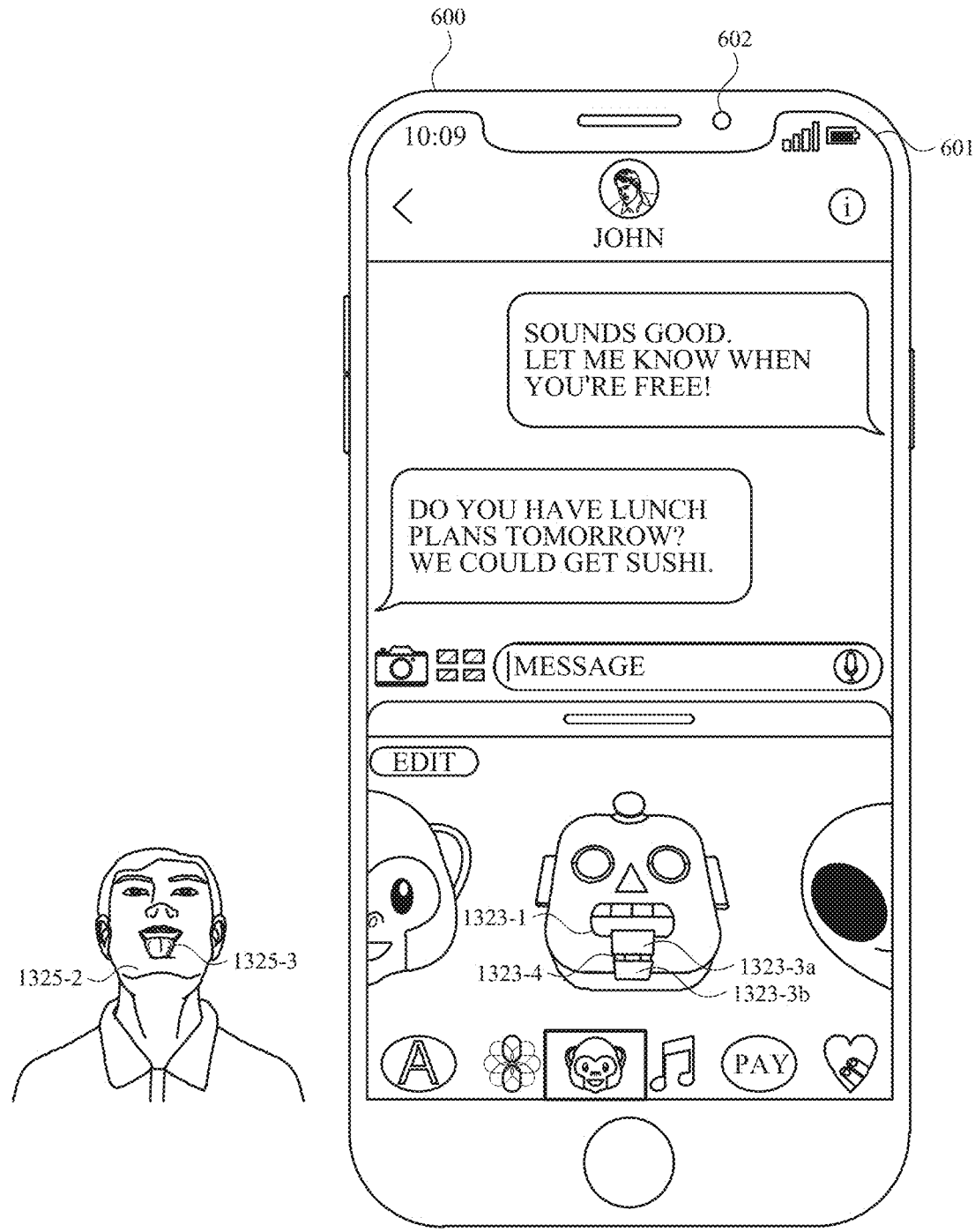

In FIG. 13F, device 600 detects input 1327 (e.g., a horizontal gesture (e.g., swipe or drag) or tap gesture on robot avatar 1323), and scrolls the listing of avatars 1320 to display robot avatar 1323 in the center of condensed avatar selection interface 1315, as shown in FIG. 13G.

When robot avatar 1323 is positioned in the center of condensed avatar selection interface 1315, device 600 begins modifying the robot avatar based on the detected face 1325. As shown in FIG. 13G, the user's head is no longer tilted, but user jaw 1325-2 and mouth 1325-1 are opened and tongue 1325-3 is extended. Device 600 modifies robot avatar 1323 to match the pose of face 1325 by opening robot mouth 1323-1 and extending robot tongue 1323-3. In some embodiments, robot avatar does not include a jaw that is distinguishable from the rest of the robot's head, but movement of the robot's jaw can be represented by increasing the vertical opening of robot mouth 1323-1.

As shown in FIG. 13G, robot tongue 1323-3 includes a hinged connection 1323-4 that divides robot tongue 1323-3 into a base portion 1323-3a (e.g., a proximal end of tongue 1323-3) that connects to robot mouth 1323-1 and a tip portion 1323-3b (e.g., a distal end of tongue 1323-3) that hangs and swings freely from the hinged connection 1323-4. In some embodiments, tip portion 1323-3b swings with movement of robot mouth 1323-1 and the robot's head.

For example, in FIG. 13H, device 600 detects the user's head tilted back with tongue 1325-3 extended. Device 600 modifies robot avatar 1323 by tilting the robot's head back with mouth 1323-1 open and tongue 1323-3 extended. As the robot head tilts back, tip portion 1323-3b sways towards the bottom of the robot's head (e.g., toward a chin region of the robot), as base portion 1323-3a moves with robot mouth 1323-1. As the user tilts his head back to the neutral position in FIG. 13I, device 600 tilts the robot avatar 1323 back to the neutral position and tip portion 1323-3b of avatar tongue 1323-3 sways back and forth from the hinged connection 1323-4 in response to the movement of the robot head, mouth 1323-1, and base portion 1323-3a.

Figure 13I:
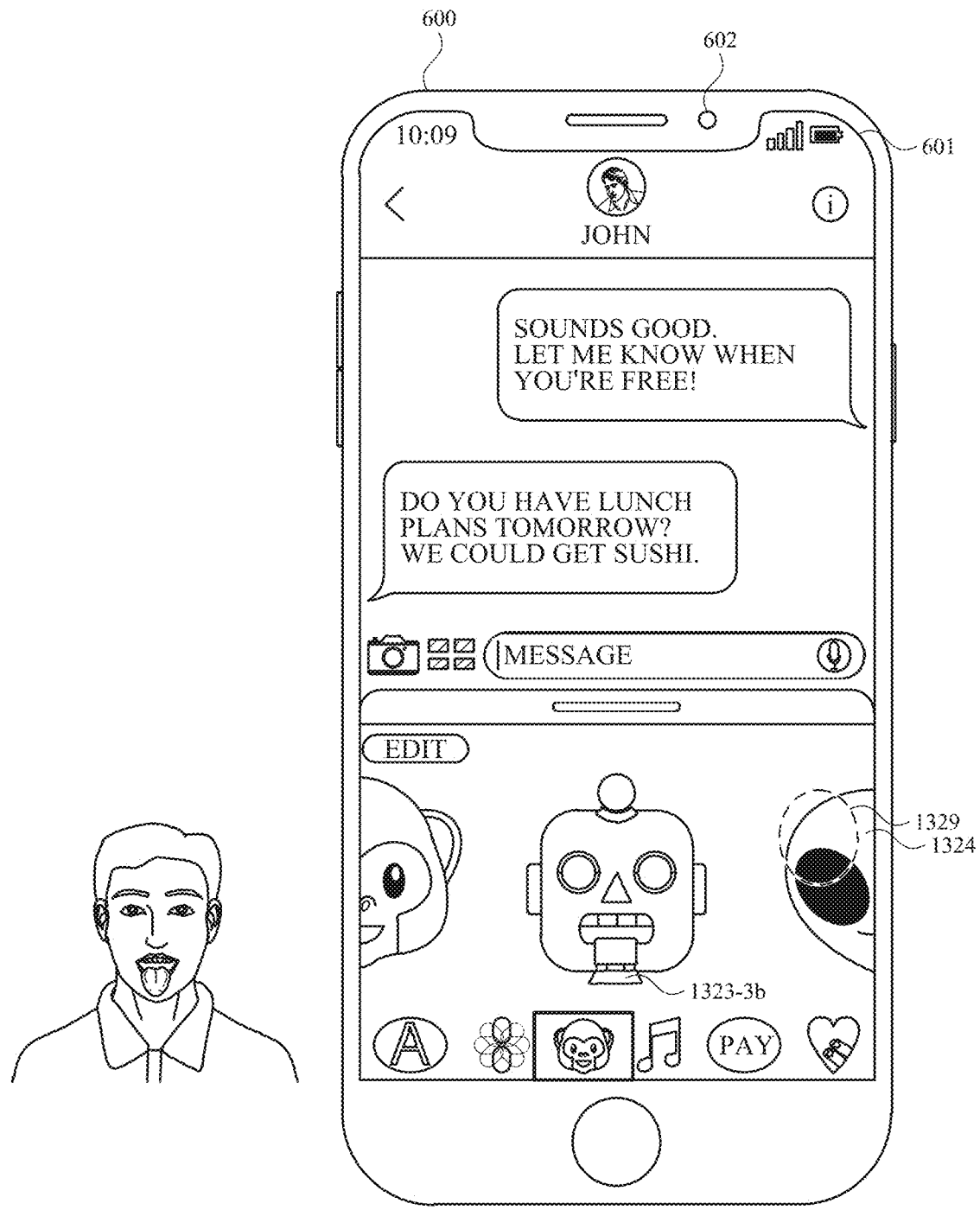
Figure 13J:
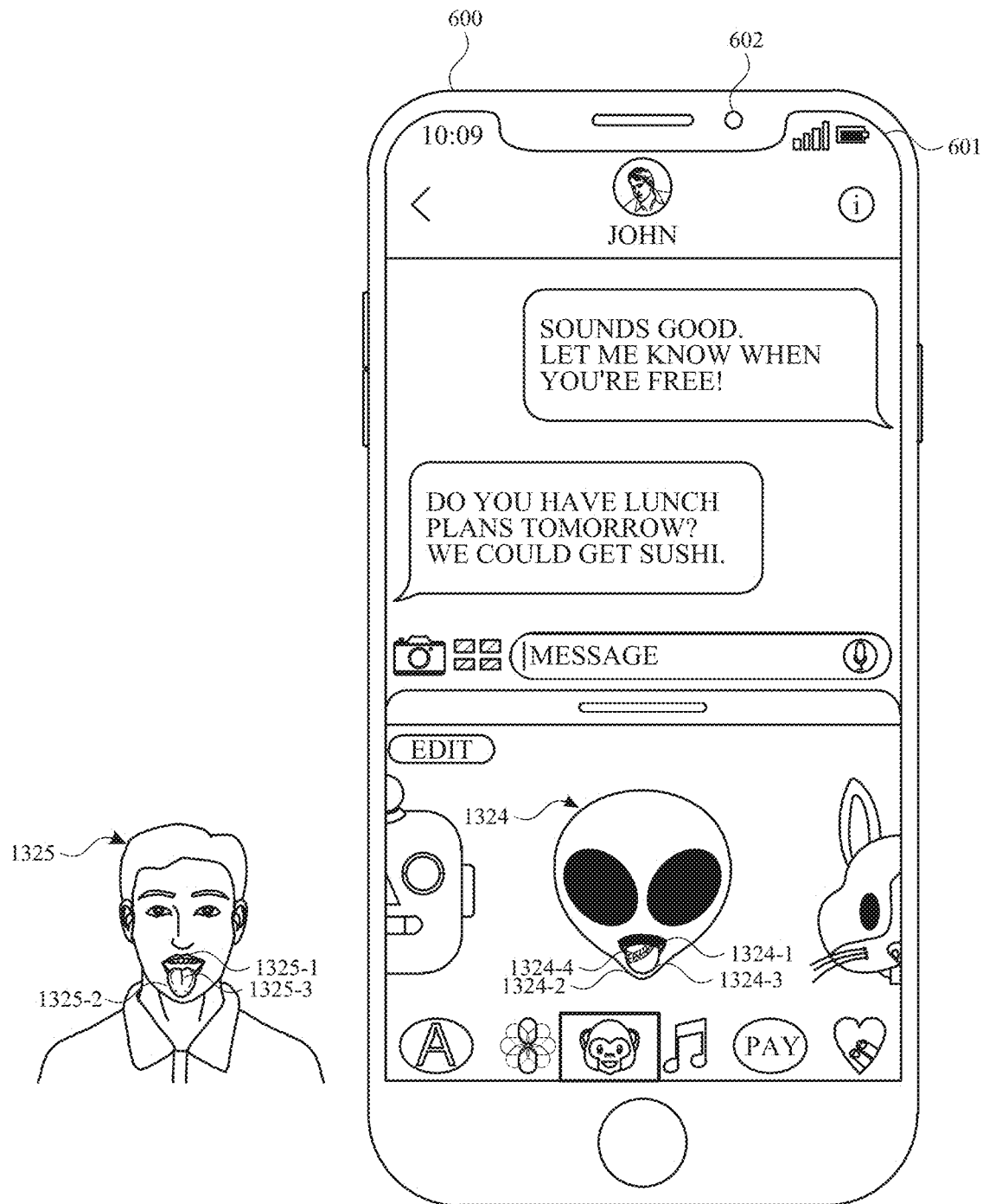

In FIG. 13I, device 600 detects input 1329 (e.g., a horizontal gesture (e.g., swipe or drag) or tap gesture on alien avatar 1324), and scrolls the listing of avatars 1320 to display robot avatar 1324 in the center of condensed avatar selection interface 1315, as shown in FIG. 13J.

Figure 13K:
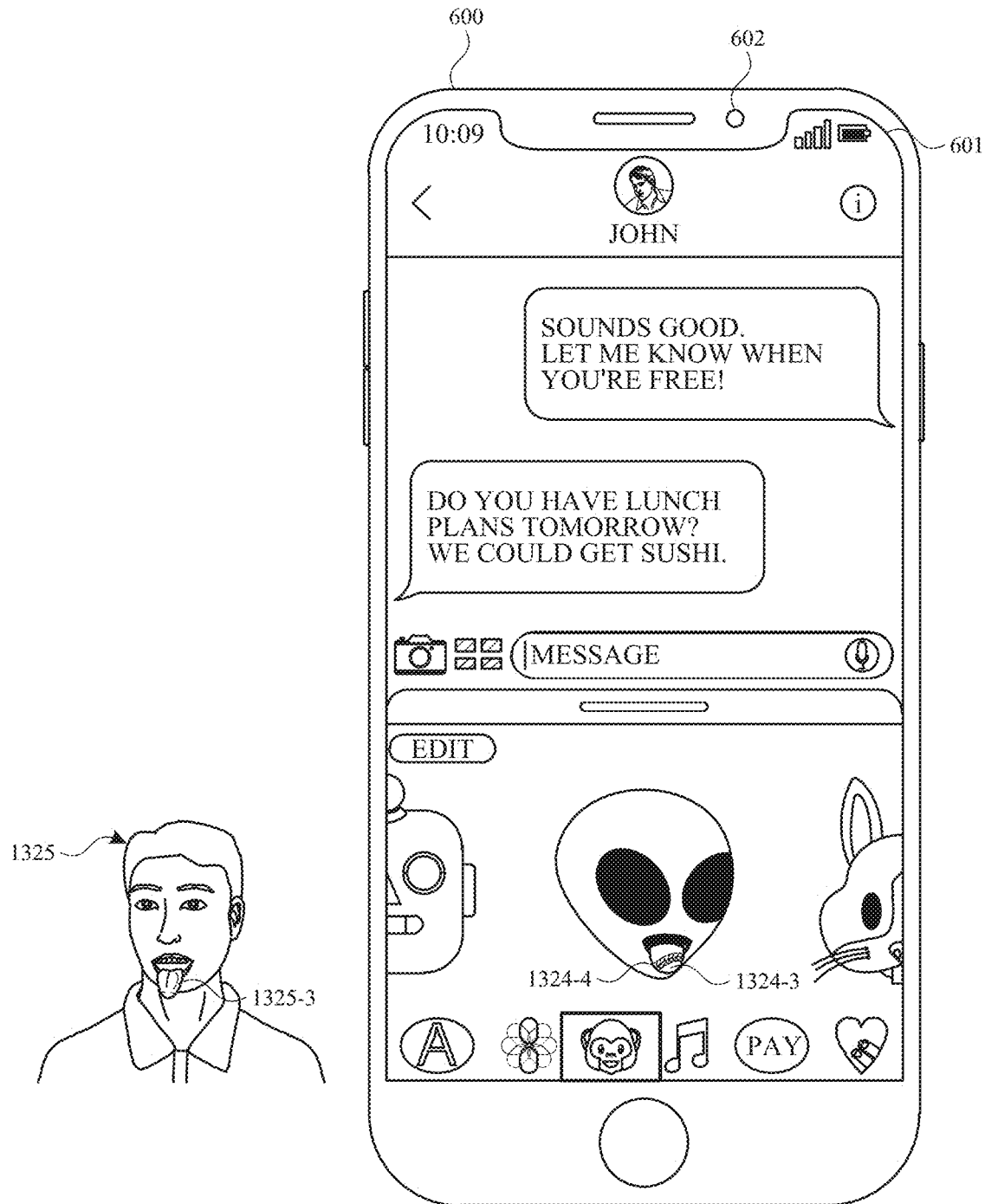
Figure 13L:

In some embodiments, device 600 displays an avatar tongue having a visual effect that is determined based on the specific avatar. For example, a robot avatar tongue has a hinged connection, a unicorn avatar has a glittery tongue, and an alien avatar has an iridescent effect. In some embodiments, the visual effect changes based on a displayed position of the avatar tongue. For example, FIGS. 13J-13L show a changing iridescent effect 1324-4 of alien tongue 1324-3. As alien tongue 1324-3 moves, the iridescent effect 1324-4 of the tongue changes (represented by a changing position of iridescent effect 1324-4 on tongue 1324-3). FIG. 13J shows alien tongue 1324-3 having iridescence 1324-4 when user face 1325 is facing forward with tongue 1325-3 extended. The alien's jaw 1324-2 and mouth 1324-1 are opened, and tongue 1324-3 is extended with iridescent effect 1324-4 located at the base of the tongue. In FIG. 13K, face 1325 rotates with tongue 1325-3 extended, and device 600 rotates alien avatar 1324 and alters the iridescence of tongue 1324-3 (represented by the changed position of iridescent effect 1324-4 on tongue 1324-3). In FIG. 13L, user slightly closes jaw 1325-2, which raises user tongue 1325-3. Device 600, modifies alien avatar 1324 by slightly closing jaw 1324-2, raising tongue 1324-3 and altering the iridescence of tongue 1324-3 (represented by the changed position of iridescent effect 1324-4 on tongue 1324-3).

Figure 13M:
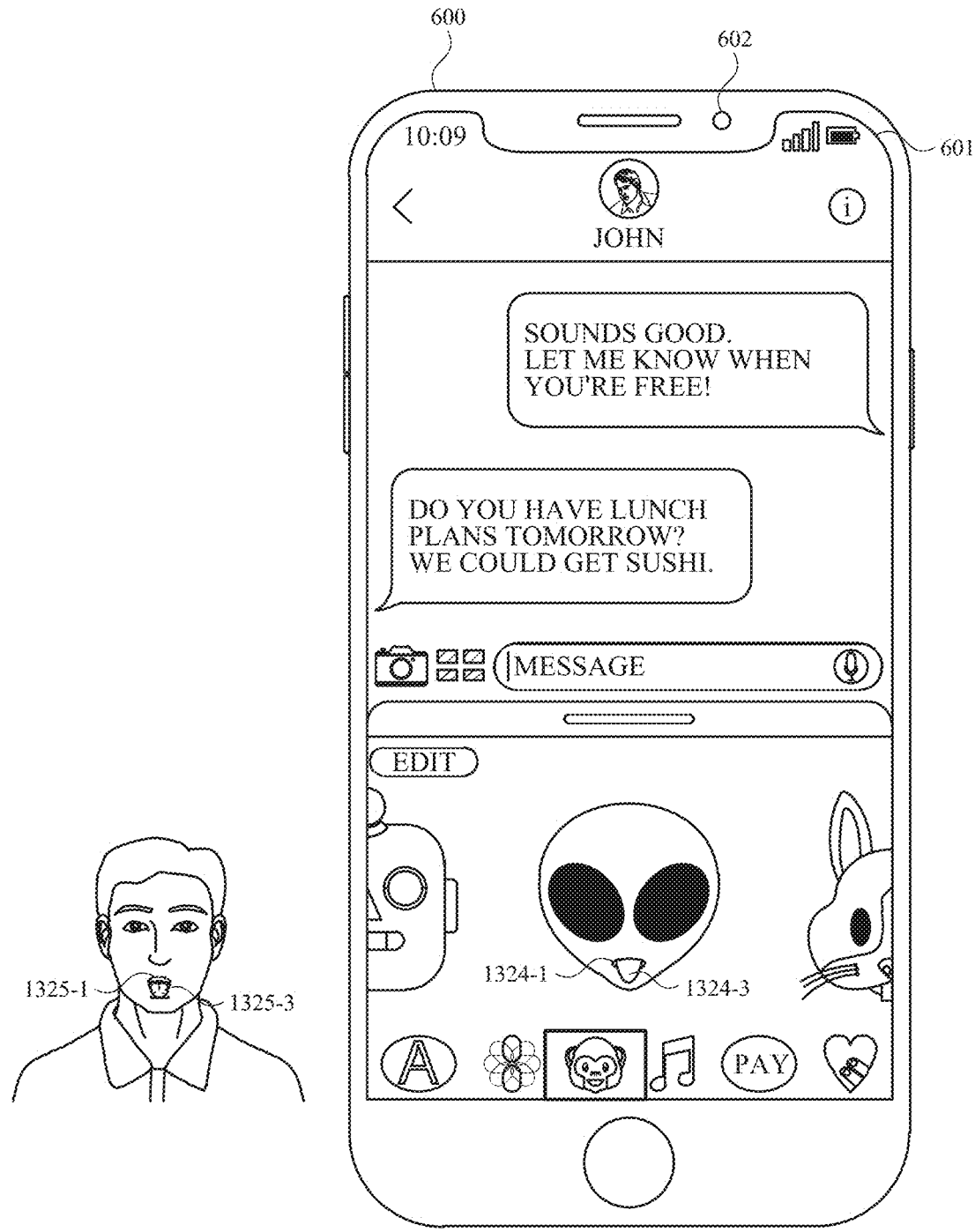
Figure 13N:

In some embodiments, device 600 displays an avatar tongue having different shapes depending on the position of the avatar's mouth (which is determined based on a detected position of the user's mouth). For example, when user mouth 1325-1 is opened, device 600 displays the avatar tongue having a flat shape as shown by monkey tongue 1322-3 in FIG. 13E and alien tongue 1324-3 in FIG. 13J. When user mouth 1325-1 is closed around tongue 1325-3, device 600 displays an avatar tongue having a cone or "strawberry" shape. For example, in FIGS. 13M and 13N, device 600 detects user mouth 1325-1 closed around tongue 1325-3 as the user retracts his tongue into mouth 1325-1. In response, device 600 displays alien mouth 1324-1 closed around tongue 1324-3, and tongue 1324-3 having a cone shape as it retracts into alien mouth 1324-1 in FIGS. 13M and 13N. In FIG. 13O, device 600 detects the user's tongue 1325-3 is no longer extended and mouth 1325-1 and jaw 1325-2 closed. Device 600 displays alien avatar 1324 with no tongue and mouth 1324-1 and jaw 1324-2 closed.

FIGS. 14A and 14B are a flow diagram illustrating a method for modifying an avatar in an avatar navigation user interface, in accordance with some embodiments. Method 1400 is performed at a device (e.g., 100, 300, 500, 600) with a display apparatus. Some operations in method 1400 are, optionally, combined, the orders of some operations are, optionally, changed, and some operations are, optionally, omitted.

As described below, method 1400 provides an intuitive way for modifying an avatar in an avatar navigation user interface. The method reduces the cognitive burden on a user for modifying avatars, thereby creating a more efficient human-machine interface. For battery-operated computing devices, enabling a user to modify characteristics of an avatar using an avatar navigation user interface faster and more efficiently conserves power and increases the time between battery charges.

The electronic device (e.g. 600) displays (1402), via the display apparatus (e.g. 601), a virtual avatar (e.g., 1322, 1323, 1324), having a plurality of avatar features (e.g., 1322-1, 1322-2, 1322-3) (e.g., a facial feature (e.g., eyes, mouth, part of mouth) or macro feature (e.g., head, neck)), that changes appearance in response to detected changes in pose (e.g., orientation, translation) (e.g., a change in a facial expression) of a face (e.g., 1325) in a field of view of the one or more cameras (e.g. 602). While the face is detected in the field of view of the one or more cameras, the face including a plurality of detected facial features including a first facial feature (e.g., 1325-2) other than a tongue of the user (e.g., a jaw), the electronic device detects (1404) movement of the first facial feature. Displaying the appearance of the avatar provides feedback to the user indicating the customization of particular features of the avatar. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to detecting (1406) movement of the first facial feature (e.g., 1325-2), the device (e.g., 600) performs one or more of the following steps. In accordance (1408) with a determination that the tongue of the user (e.g., 1325-3) meets respective criteria (e.g., tongue-display criteria) wherein the respective criteria include a requirement that the tongue of the user is visible (e.g., as shown in FIG. 13D) in order for the respective criteria to be met (e.g., the tongue of the user is visible and in a pose that is identified as being stuck out of the user's mouth), the electronic device (e.g. 600) displays an avatar tongue (e.g., 1322-3) (e.g., the avatar tongue is not persistently displayed (e.g., it is variably displayed) as part of the displayed virtual avatar). In some embodiments, the avatar tongue is displayed in accordance with a determination that a set of avatar tongue display criteria are met (e.g., a set of criteria that includes one or more of: detecting that a face detected in the field of view of the camera includes a visible tongue and detecting that the face includes a mouth open a threshold distance (e.g., a mouth having the lower jaw in a sufficiently downward position). Displaying the appearance of the avatar with an avatar tongue movement provides feedback to the user indicating the movement of the avatar tongue in accordance with the movement of the user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The electronic device (e.g. 600) modifies (1408) a position of the avatar tongue (e.g., 1322-3) based on (e.g., a direction and magnitude of) the movement of the first facial feature (e.g., 1325-2) (e.g., a position of the avatar tongue is determined based on the detected position (e.g., within a range from fully opened to fully closed) of the user's jaw). In some embodiments, in response to detecting movement of the first facial feature, an avatar feature (e.g., 1322-2) (e.g., an avatar feature other than the avatar tongue) that corresponds to the first facial feature is also modified/moved based on the detected movement of the first facial feature.). In accordance with a determination that the tongue of the user does not meet the respective criteria, the electronic device forgoes (1414) display of the avatar tongue.

In accordance with some embodiments, the avatar tongue (e.g., 1323-3) includes a first portion (e.g., 1323-3*a*) and a second portion (e.g., 1323-3*b*) and the second portion is connected to the first portion by a connector (e.g., 1323-4) (e.g., a hinge) that is more flexible than the first portion or the second portion (e.g., the avatar tongue has two or more segments that are joined at one or more hinges). In some embodiments, the avatar tongue is formed of hinged segments when the virtual avatar is a robot avatar (e.g., 1323). In some embodiments, the first portion and the second portion are rigid. In some embodiments, the first portion dangles freely when the avatar tongue is extended and moves in accordance with movement of the user's head (e.g., as shown in FIGS. 13G-13I).

In accordance with some embodiments, the avatar tongue (e.g., 1323-3) has a visual effect (e.g., 1324-4) (e.g., glitter, iridescence) that changes in response to modifying a position of the avatar tongue. In some embodiments, the virtual avatar is a unicorn and the avatar tongue includes a glittery effect that sparkles as the avatar tongue moves. In some embodiments, the virtual avatar is an alien (e.g., 1324) and the avatar tongue includes an iridescent effect that changes as the avatar tongue moves. The display of the visual effect of the avatar tongue movement provides feedback to the user indicating the movement of the avatar tongue in accordance with the movement of the user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, modifying the position of the avatar tongue (e.g., 1322-3) based on the movement of the first facial feature (e.g., 1325-2) includes one or more of the following steps. In accordance with a determination that the first facial feature moves in a first direction (e.g., the user's jaw moves to the left and/or up), the electronic device (e.g., 600) modifies (1410) the position of the avatar tongue in the first direction (e.g., moving the avatar tongue to the left and/or up). In accordance with a determination that the first facial feature moves in a second direction different from the first direction (e.g., the user's jaw moves to the right and/or down), the electronic device modifies (1412) the position of the avatar tongue in the second direction (e.g., moving the avatar tongue to the right and/or down). The display of the avatar tongue provides feedback to the user indicating the movement of the avatar tongue in accordance with the movement of a first facial feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, modifying the position of the avatar tongue (e.g., 1322-3) based on the movement of the first facial feature (e.g., 1325-2) includes one or more of the following steps. In accordance with a determination that the first facial feature moves by a first magnitude (e.g., the user's jaw moves 30 degrees to the right from a front-facing position), modifying the position of the avatar tongue by an amount proportional to the first magnitude (e.g., the avatar tongue moves 30 degrees to the right from a front-facing position). In accordance with a determination that the first facial feature moves by a second magnitude different from the first magnitude (e.g., the user's jaw moves 45 degrees to the right from a front-facing position), the electronic device (e.g. 600) modifies the position of the avatar tongue by an amount proportional to the second magnitude (e.g., the avatar tongue moves 45 degrees to the right from a front-facing position). The display of the avatar tongue provides feedback to the user indicating the movement of the avatar tongue in accordance with the movement of a first facial feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the avatar tongue (e.g., 1322-3) moves in accordance with a physics model (e.g., a model of inertia, a model of gravity, a force transfer model, a friction model). In some embodiments, a degree of movement (e.g., a degree of movement in accordance with the physics model based on movement of the head and/or a facial feature) of the avatar tongue increases (e.g., or decreases) based on an increasing (e.g., or decreasing) amount of the tongue extended from a mouth of the virtual avatar (e.g., 1322). The physical model allows the avatar tongue to be displayed realistically in accordance with the movement of the subject. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 130:
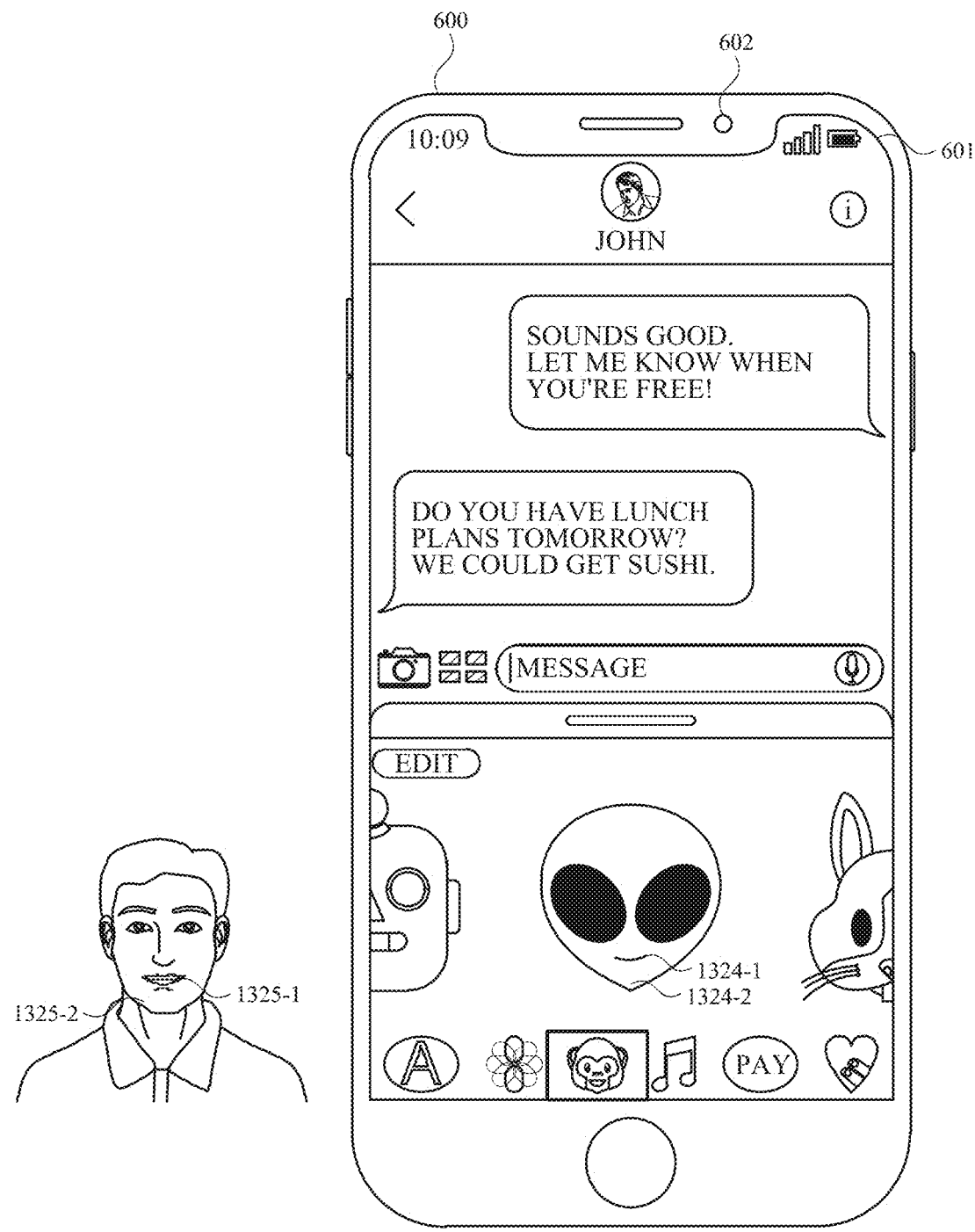

In accordance with some embodiments, while the avatar tongue (e.g., 1324-3) is displayed, the electronic device (e.g. 600) detects (1416) that the tongue (e.g., 1325-3) of the user no longer meets the respective criteria (e.g., tongue-display criteria). In response to detecting that the tongue of the user no longer meets the respective criteria, the electronic device ceases (1418) to display the avatar tongue (e.g., FIG. 130). In some embodiments, displaying the (e.g., previously undisplayed) avatar tongue includes displaying an animation of the avatar tongue extending from a mouth (e.g., 1322-1) of the virtual avatar (e.g., 1322). In some embodiments, ceasing to display the avatar tongue includes displaying an animation of the avatar tongue retracting into the mouth of the virtual avatar. In some embodiments, at least one of the animation of the tongue extending from the mouth of the virtual avatar or the animation of the tongue retracting into the mouth of the virtual avatar includes displaying a curving movement of the avatar tongue over one or more teeth (e.g., a lower set of teeth in the jaw of the virtual avatar) of the virtual avatar (e.g., the avatar tongue is shown moving such that it curves or arcs over teeth of the avatar, rather than extending/retracting in a linear motion). Ceasing display of the avatar tongue by retracting the tongue into the avatar's mouth provides feedback to the user indicating that the avatar no longer has a tongue feature displayed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the electronic device (e.g. 600) detects movement of a second facial feature (e.g., a user's mouth; 1325-1) to a first position (e.g., FIG. 130) (e.g., a closed position of the user's mouth). In response to detecting the movement of the second facial feature to the first position, the device performs one or more of the following steps. In accordance with a determination that the avatar tongue (e.g., 1324-2) is not displayed, the electronic device modifies a first avatar feature (e.g., avatar mouth 1324-1) (e.g., an avatar feature, other than an avatar jaw, that affects a position of the avatar tongue; e.g., the avatar's mouth, the avatar's lower lip, etc.) based on the movement of the second facial feature (e.g., modifying the avatar mouth to have a closed position corresponding to the closed position of the user's mouth). In accordance with a determination that the avatar tongue is displayed based on meeting the respective criteria, damping (e.g., eliminating or reducing an amplitude of) movement of the first avatar feature based on the movement of the second facial feature (e.g., damping movement of the avatar mouth in response to detecting the closed position of the user's mouth when the avatar tongue is displayed). In some embodiments, when the avatar tongue is displayed, certain portions of the avatar are not modified (or are modified by a limited amount) in response to detected changes in the user's face. In some embodiments, when the avatar tongue is displayed, the avatar is not modified to display certain poses (or certain poses are limited) in response to detected changes in the user's face. The display of the avatar tongue provides feedback to the user indicating the movement of the avatar tongue in accordance with the movement of a second facial feature. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the second facial feature is a mouth (e.g., 1325-1) of the user, the first position of the second facial feature corresponds to a position in which the mouth of the user is closed (e.g., with the jaw opened) and the first avatar feature is an avatar mouth. In some embodiments, a movement of the avatar's mouth is dampened, in comparison to movement of a mouth of a face detected in the field of view of one or more cameras (e.g. 602) of the device, so as to avoid the mouth fully closing and thereby colliding with or impinging on the extended avatar tongue. The display of the avatar tongue provides feedback to the user indicating the movement of the avatar tongue in accordance the user closing his mouth. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In accordance with some embodiments, the second facial feature is a bottom lip of the user, the first position of the second facial feature corresponds to a position in which the bottom lip of the user is extended (e.g., the user's bottom lip is sticking out in a pouting pose), and the first avatar feature is a bottom lip of the avatar. In some embodiments, a movement of the avatar's bottom lip is dampened, in comparison to movement of a bottom lip of a face detected in the field of view of one or more cameras (e.g. 602) of the device, so as to avoid the bottom lip fully colliding with or impinging on the extended avatar tongue.

In accordance with some embodiments, the second facial feature is an upper lip and bottom lip of the user, the first position of the second facial feature corresponds to a position in which the upper lip and bottom lip of the user are puckered, and the first avatar feature is an upper lip and bottom lip of the avatar. In some embodiments, a movement of the avatar's upper lip and bottom lip is dampened, in comparison to movement of a upper lip and bottom lip of a face detected in the field of view of one or more cameras (e.g. 602) of the device, so as to avoid the lips colliding with or impinging on the extended avatar tongue.

In accordance with some embodiments, the second facial feature is a mouth (e.g., 1325-1) of the user, the first position of the second facial feature corresponds to a position in which the mouth of the user is closing (e.g., an intermediate position of the mouth moving from an open position to a closed position with the user's lips puckered), and the first avatar feature is an avatar mouth. In some embodiments, a movement of the avatar's mouth is dampened, in comparison to movement of a mouth of a face detected in the field of view of one or more cameras (e.g. 602) of the device, so as to avoid the mouth closing and thereby colliding with or impinging on the extended avatar tongue.

In accordance with some embodiments, displaying the avatar tongue (e.g., 1322-3) includes one or more of the following steps. Detecting a position of a third facial feature (e.g., 1325-1) (e.g., a user's mouth). In accordance with a determination that the third facial feature has a first position (e.g., a substantially closed position), the electronic device (e.g. 600) displays the avatar tongue having a first shape (e.g., shown in FIGS. 13M and 13N) (e.g., a cone shape or "strawberry" shape). In accordance with a determination that the first facial feature has a second position different from the first position (e.g., a substantially opened position), the electronic device displays the avatar tongue having a second shape different from the first shape (e.g., a flat shape as shown in FIG. 13E). In some embodiments, the avatar tongue extends further out from the mouth when the avatar tongue has the second shape than when the avatar tongue has the first shape. The display of the avatar tongue provides feedback to the user indicating different tongue shapes depending on whether the mouth of the avatar is open or closed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1400 (e.g., FIG. 14) are also applicable in an analogous manner to the methods described above. For example, method 700 optionally includes one or more of the characteristics of the various methods described above with reference to method 1400. The method 700 for editing an avatar can be incorporated in the method for navigating an avatar user interface. For example, in some embodiments, the navigation user interface invokes a process for creating or editing a customizable avatar, which may be achieved in accordance with the method 900 described above with respect to FIG. 9. As additional examples, methods 1000, 1100, and 1200 optionally include one or more of the characteristics of the various methods described above with reference to method 1400. For example, in some embodiments, the navigation user interface invokes a process for creating or editing a customizable avatar, which may be achieved in accordance with the methods described below with respect to FIGS. 10-12. For brevity, these details are not repeated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources for sharing with other users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better represent a user in a conversation. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sending an avatar, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device comprising:
a display apparatus;
one or more input devices;
one or more processors; and
memory storing one or more programs configured to be executed by the one or more processors, the one or more programs including instructions for:
displaying, via the display apparatus, an avatar navigation user interface, the avatar navigation user interface including an avatar, wherein the avatar navigation user interface includes a subregion having a plurality of avatars, the plurality of avatars including a first set of avatars of a first type and a second set of avatars of a second type, wherein the first set of avatars of the first type are separated from the second set of avatars of the second type;
while the avatar navigation user interface is displayed, detecting a gesture, via the one or more input devices directed to the avatar navigation user interface; and
in response to detecting the gesture:
in accordance with a determination that the gesture is in a first direction, displaying an avatar of the first type in the avatar navigation user interface; and
in accordance with a determination that the gesture is in a second direction opposite the first direction, displaying an avatar of the second type different from the first type in the avatar navigation user interface.

2. The electronic device of claim 1, the one or more programs further including instructions for:
further in accordance with the determination that the gesture is in the first direction, forgoing displaying the avatar of the second type in the avatar navigation user interface; and
further in accordance with the determination that the gesture is in the second direction opposite the first direction, forgoing displaying the avatar of the first type in the avatar navigation user interface.

3. The electronic device of claim 1, the one or more programs further including instructions for:
after displaying the avatar of the first type, detecting a second gesture in the first direction; and
in response to detecting the second gesture, displaying a second avatar of the first type.

4. The electronic device of claim 1, the one or more programs further including instructions for:
after displaying the avatar of the second type, detecting a third gesture in the second direction; and
in response to detecting the third gesture, displaying a second avatar of the second type.

5. The electronic device of claim 1, wherein the avatar of the first type has an appearance of a human character.

6. The electronic device of claim 1, wherein the avatar of the second type has an appearance of a non-human character.

7. The electronic device of claim 1, wherein the avatar of the first type includes a plurality of avatar features that are configurable by a user.

8. The electronic device of claim 1, wherein the avatar of the second type does not include user configurable avatar features.

9. The electronic device of claim 1, wherein the avatar is a selected one of the plurality of avatars displayed at a location between one or more of the first set of avatars of the first type and one or more of the second set of avatars of the second type.

10. The electronic device of claim 9, wherein the first set of avatars of the first type includes the selected one of the plurality of avatars, the one or more programs further including instructions for:
in accordance with a determination that the gesture is in the first direction, replacing the selected one of the plurality of avatars with a different avatar of the first type; and
in accordance with a determination that the gesture is in the second direction, replacing the selected one of the plurality of avatars with an avatar of the second type.

11. The electronic device of claim 9, wherein the second set of avatars of the second type includes the selected one of the plurality of avatars, the one or more programs further including instructions for:
in accordance with a determination that the gesture is in the first direction, replacing the selected one of the plurality of avatars with an avatar of the first type; and
in accordance with a determination that the gesture is in the second direction, replacing the selected one of the plurality of avatars with a different avatar of the second type.

12. The electronic device of claim 1, wherein the avatar navigation user interface further includes an affordance associated with a function for removing the avatar from the displayed avatar navigation user interface, the one or more programs further including instructions for:
detecting, via the one or more input devices, a gesture directed to the affordance associated with the function; and
in response to detecting the gesture directed to the affordance associated with the function, removing the avatar from the displayed avatar navigation user interface.

13. The electronic device of claim 1, wherein the avatar navigation user interface is displayed in a messaging user interface.

14. The electronic device of claim 1, the one or more programs further including instructions for:
in accordance with a determination that the avatar navigation user interface does not include an avatar of the first type, displaying an avatar initiation user interface having an affordance associated with generating a new avatar of the first type;
while the avatar initiation user interface is displayed, detecting a gesture directed to the affordance associated with generating a new avatar of the first type; and
in response to detecting the gesture directed to the affordance associated with generating a new avatar of the first type, displaying an avatar editing user interface, wherein the avatar editing user interface is a user interface for generating a new avatar of the first type.

15. The electronic device of claim 1, the one or more programs further including instructions for:
in accordance with a determination that the avatar navigation user interface includes an avatar of the first type, displaying the avatar of the first type and an affordance associated with managing one or more features of the displayed avatar of the first type.

16. The electronic device of claim 1, the one or more programs further including instructions for:
displaying, via the display apparatus, an avatar library user interface including one or more saved avatars of the first type;
detecting selection of one of the saved avatars of the first type; and
in response to detecting selection of the one of the saved avatars of the first type, displaying a menu having one or more menu affordances associated with one of an edit function, a duplicate function, and a delete function for the one of the saved avatars of the first type.

17. The electronic device of claim 16, the one or more programs further including instructions for:
detecting selection of a first affordance associated with the duplicate function; and
in response to detecting selection of the first affordance, generating a duplicate version of the one of the saved avatars and displaying the duplicate version in an avatar editing user interface.

18. The electronic device of claim 16, the one or more programs further including instructions for:
detecting selection of a second affordance associated with the edit function; and
in response to detecting the gesture directed to the second affordance, displaying an avatar editing user interface including the one of the saved avatars.

19. The electronic device of claim 16, the one or more programs further including instructions for:
detecting selection of a third affordance associated with the delete function; and
in response to detecting selection of the third affordance, removing the displayed one of the saved avatars from the avatar library user interface.

20. The electronic device of claim 1, wherein displaying a respective avatar of the first or second type includes:
displaying, via the display apparatus, the respective avatar moving in a direction across the avatar navigation user interface in accordance with a magnitude and direction of the detected gesture, including:
in accordance with a determination that the respective avatar reaches a first position, displaying an animation of the respective avatar transitioning from a non-interactive state having a predetermined appearance to an interactive state having an appearance determined based on a detected face.

21. The electronic device of claim 20, wherein displaying, via the display apparatus, the respective avatar moving in a direction across the avatar navigation user interface in accordance with a magnitude and direction of the detected gesture includes:
in accordance with a determination that the respective avatar reaches a second position, displaying an animation of the respective avatar transitioning from the interactive state having the appearance determined based on the detected face to the non-interactive state having the predetermined appearance.

22. A non-transitory computer-readable storage medium storing one or more programs configured to be executed by one or more processors of an electronic device with a display apparatus and one or more input devices, the one or more programs including instructions for:
displaying, via the display apparatus, an avatar navigation user interface, the avatar navigation user interface including an avatar, wherein the avatar navigation user interface includes a subregion having a plurality of avatars, the plurality of avatars including a first set of avatars of a first type and a second set of avatars of a second type, wherein the first set of avatars of the first type are separated from the second set of avatars of the second type;

while the avatar navigation user interface is displayed, detecting a gesture, via the one or more input devices directed to the avatar navigation user interface; and in response to detecting the gesture:

in accordance with a determination that the gesture is in a first direction, displaying an avatar of the first type in the avatar navigation user interface; and in accordance with a determination that the gesture is in a second direction opposite the first direction, displaying an avatar of the second type different from the first type in the avatar navigation user interface.

23. A method, comprising:

at an electronic device having a display apparatus and one or more input devices:

displaying, via the display apparatus, an avatar navigation user interface, the avatar navigation user interface including an avatar, wherein the avatar navigation user interface includes a subregion having a plurality of avatars, the plurality of avatars including a first set of avatars of a first type and a second set of avatars of a second type, wherein the first set of avatars of the first type are separated from the second set of avatars of the second type;

while the avatar navigation user interface is displayed, detecting a gesture, via the one or more input devices directed to the avatar navigation user interface; and in response to detecting the gesture:

in accordance with a determination that the gesture is in a first direction, displaying an avatar of the first type in the avatar navigation user interface; and in accordance with a determination that the gesture is in a second direction opposite the first direction, displaying an avatar of the second type different from the first type in the avatar navigation user interface.

24. The non-transitory computer-readable storage medium of claim 22, the one or more programs further including instructions for:

further in accordance with the determination that the gesture is in the first direction, forgoing displaying the avatar of the second type in the avatar navigation user interface; and further in accordance with the determination that the gesture is in the second direction opposite the first direction, forgoing displaying the avatar of the first type in the avatar navigation user interface.

25. The non-transitory computer-readable storage medium of claim 22, the one or more programs further including instructions for:

after displaying the avatar of the first type, detecting a second gesture in the first direction; and in response to detecting the second gesture, displaying a second avatar of the first type.

26. The non-transitory computer-readable storage medium of claim 22, the one or more programs further including instructions for:

after displaying the avatar of the second type, detecting a third gesture in the second direction; and in response to detecting the third gesture, displaying a second avatar of the second type.

27. The non-transitory computer-readable storage medium of claim 22, wherein the avatar of the first type has an appearance of a human character.

28. The non-transitory computer-readable storage medium of claim 22, wherein the avatar of the second type has an appearance of a non-human character.

29. The non-transitory computer-readable storage medium of claim 22, wherein the avatar of the first type includes a plurality of avatar features that are configurable by a user.

30. The non-transitory computer-readable storage medium of claim 22, wherein the avatar of the second type does not include user configurable avatar features.

31. The non-transitory computer-readable storage medium of claim 22, wherein the avatar is a selected one of the plurality of avatars displayed at a location between one or more of the first set of avatars of the first type and one or more of the second set of avatars of the second type.

32. The non-transitory computer-readable storage medium of claim 31, wherein the first set of avatars of the first type includes the selected one of the plurality of avatars, the one or more programs further including instructions for:

in accordance with a determination that the gesture is in the first direction, replacing the selected one of the plurality of avatars with a different avatar of the first type; and in accordance with a determination that the gesture is in the second direction, replacing the selected one of the plurality of avatars with an avatar of the second type.

33. The non-transitory computer-readable storage medium of claim 31, wherein the second set of avatars of the second type includes the selected one of the plurality of avatars, the one or more programs further including instructions for:

in accordance with a determination that the gesture is in the first direction, replacing the selected one of the plurality of avatars with an avatar of the first type; and in accordance with a determination that the gesture is in the second direction, replacing the selected one of the plurality of avatars with a different avatar of the second type.

34. The non-transitory computer-readable storage medium of claim 22, wherein the avatar navigation user interface further includes an affordance associated with a function for removing the avatar from the displayed avatar navigation user interface, the one or more programs further including instructions for:

detecting, via the one or more input devices, a gesture directed to the affordance associated with the function; and in response to detecting the gesture directed to the affordance associated with the function, removing the avatar from the displayed avatar navigation user interface.

35. The non-transitory computer-readable storage medium of claim 22, wherein the avatar navigation user interface is displayed in a messaging user interface.

36. The non-transitory computer-readable storage medium of claim 22, the one or more programs further including instructions for:

in accordance with a determination that the avatar navigation user interface does not include an avatar of the first type, displaying an avatar initiation user interface having an affordance associated with generating a new avatar of the first type;

while the avatar initiation user interface is displayed, detecting a gesture directed to the affordance associated with generating a new avatar of the first type; and in response to detecting the gesture directed to the affordance associated with generating a new avatar of the first type, displaying an avatar editing user interface, wherein the avatar editing user interface is a user interface for generating a new avatar of the first type.

37. The non-transitory computer-readable storage medium of claim 22, the one or more programs further including instructions for:
in accordance with a determination that the avatar navigation user interface includes an avatar of the first type, displaying the avatar of the first type and an affordance associated with managing one or more features of the displayed avatar of the first type.

38. The non-transitory computer-readable storage medium of claim 22, the one or more programs further including instructions for:
displaying, via the display apparatus, an avatar library user interface including one or more saved avatars of the first type;
detecting selection of one of the saved avatars of the first type; and
in response to detecting selection of the one of the saved avatars of the first type, displaying a menu having one or more menu affordances associated with one of an edit function, a duplicate function, and a delete function for the one of the saved avatars of the first type.

39. The non-transitory computer-readable storage medium of claim 38, the one or more programs further including instructions for:
detecting selection of a first affordance associated with the duplicate function; and
in response to detecting selection of the first affordance, generating a duplicate version of the one of the saved avatars and displaying the duplicate version in an avatar editing user interface.

40. The non-transitory computer-readable storage medium of claim 38, the one or more programs further including instructions for:
detecting selection of a second affordance associated with the edit function; and
in response to detecting the gesture directed to the second affordance, displaying an avatar editing user interface including the one of the saved avatars.

41. The non-transitory computer-readable storage medium of claim 38, the one or more programs further including instructions for:
detecting selection of a third affordance associated with the delete function; and
in response to detecting selection of the third affordance, removing the displayed one of the saved avatars from the avatar library user interface.

42. The non-transitory computer-readable storage medium of claim 38, wherein displaying a respective avatar of the first or second type includes:
displaying, via the display apparatus, the respective avatar moving in a direction across the avatar navigation user interface in accordance with a magnitude and direction of the detected gesture, including:
in accordance with a determination that the respective avatar reaches a first position, displaying an animation of the respective avatar transitioning from a non-interactive state having a predetermined appearance to an interactive state having an appearance determined based on a detected face.

43. The non-transitory computer-readable storage medium of claim 42, wherein displaying, via the display apparatus, the respective avatar moving in a direction across the avatar navigation user interface in accordance with a magnitude and direction of the detected gesture includes:
in accordance with a determination that the respective avatar reaches a second position, displaying an animation of the respective avatar transitioning from the interactive state having the appearance determined based on the detected face to the non-interactive state having the predetermined appearance.

44. The method of claim 23, further comprising:
further in accordance with the determination that the gesture is in the first direction, forgoing displaying the avatar of the second type in the avatar navigation user interface; and
further in accordance with the determination that the gesture is in the second direction opposite the first direction, forgoing displaying the avatar of the first type in the avatar navigation user interface.

45. The method of claim 23, further comprising:
after displaying the avatar of the first type, detecting a second gesture in the first direction; and
in response to detecting the second gesture, displaying a second avatar of the first type.

46. The method of claim 23, further comprising:
after displaying the avatar of the second type, detecting a third gesture in the second direction; and
in response to detecting the third gesture, displaying a second avatar of the second type.

47. The method of claim 23, wherein the avatar of the first type has an appearance of a human character.

48. The method of claim 23, wherein the avatar of the second type has an appearance of a non-human character.

49. The method of claim 23, wherein the avatar of the first type includes a plurality of avatar features that are configurable by a user.

50. The method of claim 23, wherein the avatar of the second type does not include user configurable avatar features.

51. The method of claim 23, wherein the avatar is a selected one of the plurality of avatars displayed at a location between one or more of the first set of avatars of the first type and one or more of the second set of avatars of the second type.

52. The method of claim 51, wherein the first set of avatars of the first type includes the selected one of the plurality of avatars, the method further comprising:
in accordance with a determination that the gesture is in the first direction, replacing the selected one of the plurality of avatars with a different avatar of the first type; and
in accordance with a determination that the gesture is in the second direction, replacing the selected one of the plurality of avatars with an avatar of the second type.

53. The method of claim 51, wherein the second set of avatars of the second type includes the selected one of the plurality of avatars, the method further comprising:
in accordance with a determination that the gesture is in the first direction, replacing the selected one of the plurality of avatars with an avatar of the first type; and
in accordance with a determination that the gesture is in the second direction, replacing the selected one of the plurality of avatars with a different avatar of the second type.

54. The method of claim 23, wherein the avatar navigation user interface further includes an affordance associated with a function for removing the avatar from the displayed avatar navigation user interface, the method further comprising:
detecting, via the one or more input devices, a gesture directed to the affordance associated with the function; and in response to detecting the gesture directed to the affordance associated with the function, removing the avatar from the displayed avatar navigation user interface.

55. The method of claim 23, wherein the avatar navigation user interface is displayed in a messaging user interface.

56. The method of claim 23, the method further comprising:
   in accordance with a determination that the avatar navigation user interface does not include an avatar of the first type, displaying an avatar initiation user interface having an affordance associated with generating a new avatar of the first type;
   while the avatar initiation user interface is displayed, detecting a gesture directed to the affordance associated with generating a new avatar of the first type; and
   in response to detecting the gesture directed to the affordance associated with generating a new avatar of the first type, displaying an avatar editing user interface, wherein the avatar editing user interface is a user interface for generating a new avatar of the first type.

57. The method of claim 23, the method further comprising:
   in accordance with a determination that the avatar navigation user interface includes an avatar of the first type, displaying the avatar of the first type and an affordance associated with managing one or more features of the displayed avatar of the first type.

58. The method of claim 23, the method further comprising:
   displaying, via the display apparatus, an avatar library user interface including one or more saved avatars of the first type;
   detecting selection of one of the saved avatars of the first type; and
   in response to detecting selection of the one of the saved avatars of the first type, displaying a menu having one or more menu affordances associated with one of an edit function, a duplicate function, and a delete function for the one of the saved avatars of the first type.

59. The method of claim 58, the method further comprising:
   detecting selection of a first affordance associated with the duplicate function; and
   in response to detecting selection of the first affordance, generating a duplicate version of the one of the saved avatars and displaying the duplicate version in an avatar editing user interface.

60. The method of claim 58, the method further comprising:
   detecting selection of a second affordance associated with the edit function; and
   in response to detecting the gesture directed to the second affordance, displaying an avatar editing user interface including the one of the saved avatars.

61. The method of claim 58, the method further comprising:
   detecting selection of a third affordance associated with the delete function; and
   in response to detecting selection of the third affordance, removing the displayed one of the saved avatars from the avatar library user interface.

62. The method of claim 58, wherein displaying a respective avatar of the first or second type includes:
   displaying, via the display apparatus, the respective avatar moving in a direction across the avatar navigation user interface in accordance with a magnitude and direction of the detected gesture, including:
      in accordance with a determination that the respective avatar reaches a first position, displaying an animation of the respective avatar transitioning from a non-interactive state having a predetermined appearance to an interactive state having an appearance determined based on a detected face.

63. The method of claim 62, wherein displaying, via the display apparatus, the respective avatar moving in a direction across the avatar navigation user interface in accordance with a magnitude and direction of the detected gesture includes:
   in accordance with a determination that the respective avatar reaches a second position, displaying an animation of the respective avatar transitioning from the interactive state having the appearance determined based on the detected face to the non-interactive state having the predetermined appearance.

64. An electronic device comprising:
   a display apparatus;
   one or more input devices;
   one or more processors; and
   memory storing one or more programs configured to be executed by the one or more processors, the one or more programs including instructions for:
      displaying, via the display apparatus, an avatar navigation user interface, the avatar navigation user interface including an avatar, wherein the avatar navigation user interface includes a first affordance;
      while the avatar navigation user interface is displayed, detecting a gesture, via the one or more input devices directed to the avatar navigation user interface;
      in response to detecting the gesture:
         in accordance with a determination that the gesture is in a first direction, displaying an avatar of a first type in the avatar navigation user interface; and
         in accordance with a determination that the gesture is in a second direction opposite the first direction, displaying an avatar of a second type different from the first type in the avatar navigation user interface;
      while the avatar navigation user interface is displayed, detecting, via the one or more input devices, a gesture directed to the first affordance; and
      in response to detecting the gesture directed to the first affordance, displaying an avatar library user interface, the avatar library user interface including a second affordance and one or more avatars of the first type.

65. The electronic device of claim 64, the one or more programs further including instructions for:
   while the avatar library user interface is displayed, detecting, via the one or more input devices, a gesture directed to the second affordance; and
   in response to detecting the gesture directed to the second affordance, displaying an avatar editing user interface, wherein the avatar editing user interface is a user interface for generating a new avatar of the first type.

66. The electronic device of claim 65, the one or more programs further including instructions for:
   generating the new avatar of the first type; and
   displaying the new avatar in the avatar library user interface, wherein the new avatar is displayed at a position following a last one of the one or more avatars of the first type.

67. A non-transitory computer-readable storage medium storing one or more programs configured to be executed by one or more processors of an electronic device with a display apparatus and one or more input devices, the one or more programs including instructions for:
    displaying, via the display apparatus, an avatar navigation user interface, the avatar navigation user interface including an avatar, wherein the avatar navigation user interface includes a first affordance;
    while the avatar navigation user interface is displayed, detecting a gesture, via the one or more input devices directed to the avatar navigation user interface;
    in response to detecting the gesture:
        in accordance with a determination that the gesture is in a first direction, displaying an avatar of a first type in the avatar navigation user interface; and
        in accordance with a determination that the gesture is in a second direction opposite the first direction, displaying an avatar of a second type different from the first type in the avatar navigation user interface;
    while the avatar navigation user interface is displayed, detecting, via the one or more input devices, a gesture directed to the first affordance; and
    in response to detecting the gesture directed to the first affordance, displaying an avatar library user interface, the avatar library user interface including a second affordance and one or more avatars of the first type.

68. The non-transitory computer-readable storage medium of claim 67, the one or more programs further including instructions for:
    while the avatar library user interface is displayed, detecting, via the one or more input devices, a gesture directed to the second affordance; and
    in response to detecting the gesture directed to the second affordance, displaying an avatar editing user interface, wherein the avatar editing user interface is a user interface for generating a new avatar of the first type.

69. The non-transitory computer-readable storage medium of claim 68, the one or more programs further including instructions for:
    generating the new avatar of the first type; and
    displaying the new avatar in the avatar library user interface, wherein the new avatar is displayed at a position following a last one of the one or more avatars of the first type.

70. A method, comprising:
    at an electronic device having a display apparatus and one or more input devices:
        displaying, via the display apparatus, an avatar navigation user interface, the avatar navigation user interface including an avatar, wherein the avatar navigation user interface includes a first affordance;
        while the avatar navigation user interface is displayed, detecting a gesture, via the one or more input devices directed to the avatar navigation user interface;
        in response to detecting the gesture:
            in accordance with a determination that the gesture is in a first direction, displaying an avatar of a first type in the avatar navigation user interface; and
            in accordance with a determination that the gesture is in a second direction opposite the first direction, displaying an avatar of a second type different from the first type in the avatar navigation user interface;
        while the avatar navigation user interface is displayed, detecting, via the one or more input devices, a gesture directed to the first affordance; and
        in response to detecting the gesture directed to the first affordance, displaying an avatar library user interface, the avatar library user interface including a second affordance and one or more avatars of the first type.

71. The method of claim 70, the method further comprising:
    while the avatar library user interface is displayed, detecting, via the one or more input devices, a gesture directed to the second affordance; and
    in response to detecting the gesture directed to the second affordance, displaying an avatar editing user interface, wherein the avatar editing user interface is a user interface for generating a new avatar of the first type.

72. The method of claim 71, the method further comprising:
    generating the new avatar of the first type; and
    displaying the new avatar in the avatar library user interface, wherein the new avatar is displayed at a position following a last one of the one or more avatars of the first type.

73. An electronic device comprising:
    a display apparatus;
    one or more input devices;
    one or more processors; and
    memory storing one or more programs configured to be executed by the one or more processors, the one or more programs including instructions for:
        displaying, via the display apparatus, an avatar navigation user interface, the avatar navigation user interface including an avatar;
        while the avatar navigation user interface is displayed, detecting a gesture, via the one or more input devices directed to the avatar navigation user interface; and
        in response to detecting the gesture:
            in accordance with a determination that the gesture is in a first direction, displaying an avatar of a first type in the avatar navigation user interface, wherein displaying the avatar of the first type includes displaying the avatar of the first type transitioning from a non-interactive state to an interactive state; and
            in accordance with a determination that the gesture is in a second direction opposite the first direction, displaying an avatar of a second type different from the first type in the avatar navigation user interface, wherein displaying the avatar of the second type includes displaying the avatar of the second type transitioning from a non-interactive state to an interactive state.

74. An electronic device comprising:
    a display apparatus;
    one or more input devices;
    one or more processors; and
    memory storing one or more programs configured to be executed by the one or more processors, the one or more programs including instructions for:
        displaying, via the display apparatus, an avatar navigation user interface, the avatar navigation user interface including an avatar;
        while the avatar navigation user interface is displayed, detecting a gesture, via the one or more input devices directed to the avatar navigation user interface; and
        in response to detecting the gesture:
            in accordance with a determination that the gesture is in a first direction, displaying an avatar of a first type in the avatar navigation user interface, wherein displaying the avatar of the first type includes displaying the avatar of the first type transitioning from a non-interactive state to an interactive state; and in accordance with a determination that the gesture is in a second direction opposite the first direction, displaying an avatar of a second type different from the first type in the avatar navigation user interface, wherein displaying the avatar of the second type includes displaying the avatar of the second type transitioning from a non-interactive state to an interactive state.

75. A method comprising:

at an electronic device having a display apparatus and one or more input devices:

displaying, via the display apparatus, an avatar navigation user interface, the avatar navigation user interface including an avatar;

while the avatar navigation user interface is displayed, detecting a gesture, via the one or more input devices directed to the avatar navigation user interface; and in response to detecting the gesture:

in accordance with a determination that the gesture is in a first direction, displaying an avatar of a first type in the avatar navigation user interface, wherein displaying the avatar of the first type includes displaying the avatar of the first type transitioning from a non-interactive state to an interactive state; and in accordance with a determination that the gesture is in a second direction opposite the first direction, displaying an avatar of a second type different from the first type in the avatar navigation user interface, wherein displaying the avatar of the second type includes displaying the avatar of the second type transitioning from a non-interactive state to an interactive state.

* * * * *